US012652169B2

(12) United States Patent　　　　　(10) Patent No.:　　US 12,652,169 B2

Miyamoto et al.　　　　　　　　　　　(45) Date of Patent:　　　　Jun. 9, 2026

(54) INFORMATION PROCESSING DEVICE, MOBILE DEVICE, AND COMMUNICATION SYSTEM FOR SESSION KEY UPDATE

(71) Applicant: SONY SEMICONDUCTOR SOLUTIONS CORPORATION, Kanagawa (JP)

(72) Inventors: Takashi Miyamoto, Kanagawa (JP); Toru Akishita, Tokyo (JP); Yoshitomo Osawa, Tokyo (JP); Hirotake Yamamoto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 412 days.

(21) Appl. No.: 18/253,917

(22) PCT Filed: Nov. 16, 2021

(86) PCT No.: PCT/JP2021/042005

§ 371 (c)(1),
(2) Date: May 22, 2023

(87) PCT Pub. No.: WO2022/113812

PCT Pub. Date: Jun. 2, 2022

(65) Prior Publication Data

US 2024/0007286 A1　　　Jan. 4, 2024

(30) Foreign Application Priority Data

Nov. 30, 2020　　(JP) ................................. 2020-198251

(51) Int. Cl.
*H04L 9/08*　　　　　(2006.01)
*H04L 45/74*　　　　(2022.01)

(52) U.S. Cl.
CPC .............. *H04L 9/088* (2013.01); *H04L 45/74* (2013.01)

(58) Field of Classification Search
CPC ......... H04L 9/088; H04L 9/0861; H04L 9/16; H04L 9/3242; H04L 45/74
See application file for complete search history.

(56)　　　　　　References Cited

U.S. PATENT DOCUMENTS

2018/0048643 A1　　2/2018　Sharaga
2020/0045540 A1　　2/2020　Hutchison
　　　　　　　　(Continued)

FOREIGN PATENT DOCUMENTS

CN　　　　112448935　A　　3/2021
JP　　　2000-078555　A　　3/2000
　　　　　　　　(Continued)

OTHER PUBLICATIONS

International Search Report and Written Opinion of PCT Application No. PCT/JP2021/042005, issued on Feb. 15, 2022, 09 pages of ISRWO.
　　　　　　　　(Continued)

*Primary Examiner* — Han Yang
(74) *Attorney, Agent, or Firm* — CHIP LAW GROUP

(57)　　　　　　ABSTRACT

The present disclosure relates to an information processing device, a mobile device, and a communication system capable of updating a session key. A first secret is derived from a key schedule by using first communication including transmission or reception of a command for controlling second communication faster than the first communication or a response to the command, a first session key related to the first secret is derived, the first session key is used for encryption or message authentication of the first communication, a second session key is received, transmitted, or derived by using the first communication, the second session
　　　　　　　　(Continued)

key is used for encryption or message authentication of the second communication, a third session key is received, transmitted, or derived by using the first communication, and the third session key is used instead of the second session key.

20 Claims, 208 Drawing Sheets

(56)                    References Cited

U.S. PATENT DOCUMENTS

| | | | | |
|---|---|---|---|---|
| 2020/0092113 | A1* | 3/2020 | Hutchison | H04L 9/0894 |
| 2020/0296696 | A1* | 9/2020 | Goldhamer | H04W 4/40 |
| 2024/0007295 | A1* | 1/2024 | Miyamoto | H04L 9/0891 |

FOREIGN PATENT DOCUMENTS

| | | | |
|---|---|---|---|
| JP | 2003-092596 | A | 3/2003 |
| JP | 2009-218845 | A | 9/2009 |
| JP | 2018-121325 | A | 8/2018 |

OTHER PUBLICATIONS

"Security Protocol and Data Model (SPDM) Architecture White Paper", Distributed Management Task Force (DMTF), DSP0274, Version 1.1.0c, Jul. 15, 2020, 136 pages.

* cited by examiner

Figure 1:
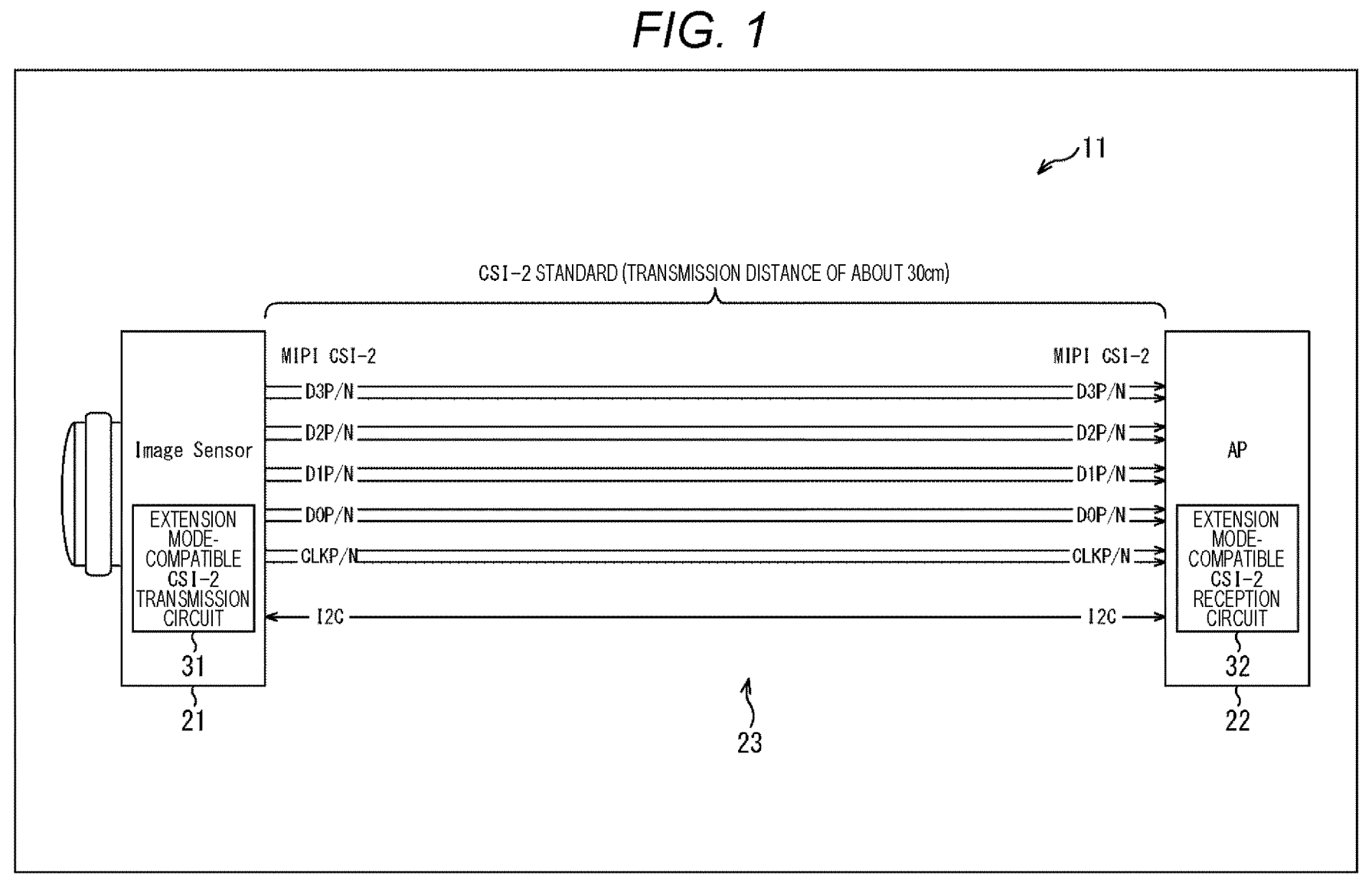

CSI-2 STANDARD (TRANSMISSION DISTANCE OF ABOUT 30cm)

MIPI CSI-2

Image Sensor

EXTENSION MODE-COMPATIBLE CSI-2 TRANSMISSION CIRCUIT

31

21

D3P/N
D2P/N
D1P/N
D0P/N
CLKP/N
I2C

23

AP

MIPI CSI-2

EXTENSION MODE-COMPATIBLE CSI-2 RECEPTION CIRCUIT

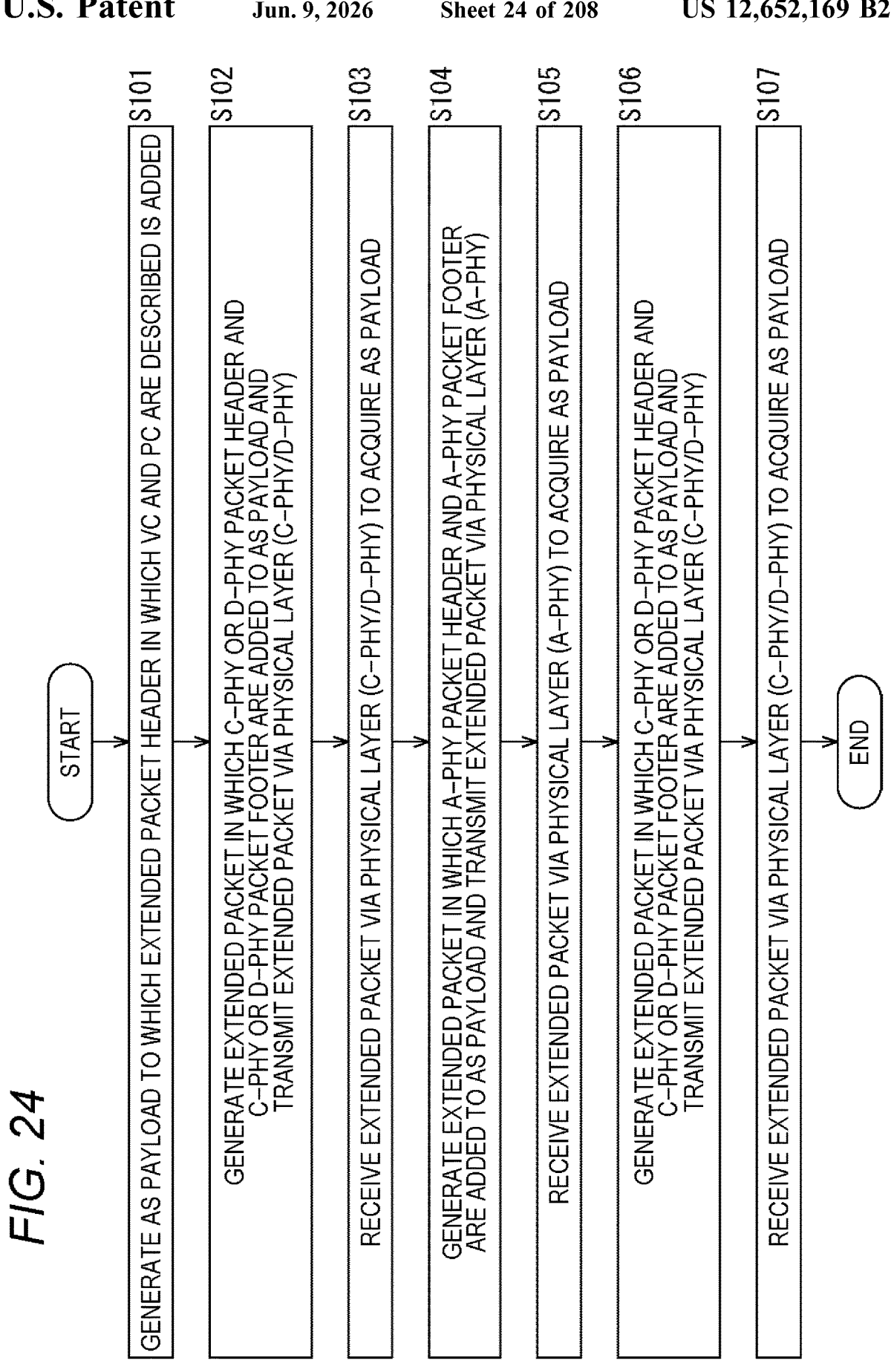

START

S101 GENERATE AS PAYLOAD TO WHICH EXTENDED PACKET HEADER IN WHICH VC AND PC ARE DESCRIBED IS ADDED

S102 GENERATE EXTENDED PACKET IN WHICH C-PHY OR D-PHY PACKET HEADER AND C-PHY OR D-PHY PACKET FOOTER ARE ADDED TO AS PAYLOAD AND TRANSMIT EXTENDED PACKET VIA PHYSICAL LAYER (C-PHY/D-PHY)

S103 RECEIVE EXTENDED PACKET VIA PHYSICAL LAYER (C-PHY/D-PHY) TO ACQUIRE AS PAYLOAD

S104 GENERATE EXTENDED PACKET IN WHICH A-PHY PACKET HEADER AND A-PHY PACKET FOOTER ARE ADDED TO AS PAYLOAD AND TRANSMIT EXTENDED PACKET VIA PHYSICAL LAYER (A-PHY)

S105 RECEIVE EXTENDED PACKET VIA PHYSICAL LAYER (A-PHY) TO ACQUIRE AS PAYLOAD

S106 GENERATE EXTENDED PACKET IN WHICH C-PHY OR D-PHY PACKET HEADER AND C-PHY OR D-PHY PACKET FOOTER ARE ADDED TO AS PAYLOAD AND TRANSMIT EXTENDED PACKET VIA PHYSICAL LAYER (C-PHY/D-PHY)

S107 RECEIVE EXTENDED PACKET VIA PHYSICAL LAYER (C-PHY/D-PHY) TO ACQUIRE AS PAYLOAD

END

AP(CCI) Payload

| Read ACCESS (Read Data) | ePH* (*=n) | AP(CCI) Payload | ePF1 | ePF0 |

FIG. 49

AP(CC1) Payload

Read ACCESS
(Read Data)

| ePH* (*=n) | AP(CC1) Payload | ePF1 | ePF0 |

FIG. 51

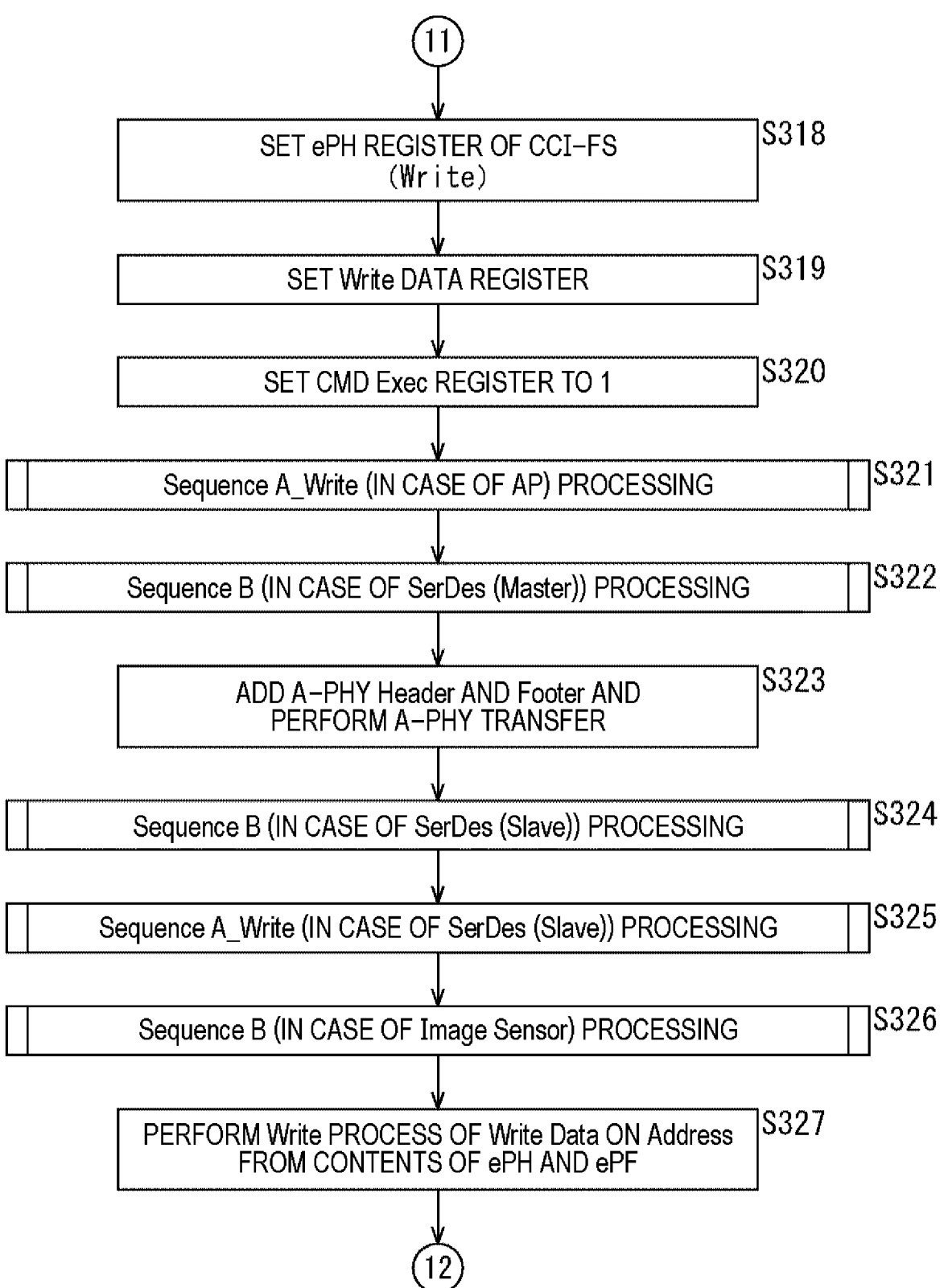

(11)

SET ePH REGISTER OF CCI-FS (Write) — S318

SET Write DATA REGISTER — S319

SET CMD Exec REGISTER TO 1 — S320

Sequence A_Write (IN CASE OF AP) PROCESSING — S321

Sequence B (IN CASE OF SerDes (Master)) PROCESSING — S322

ADD A-PHY Header AND Footer AND PERFORM A-PHY TRANSFER — S323

Sequence B (IN CASE OF SerDes (Slave)) PROCESSING — S324

Sequence A_Write (IN CASE OF SerDes (Slave)) PROCESSING — S325

Sequence B (IN CASE OF Image Sensor) PROCESSING — S326

PERFORM Write PROCESS OF Write Data ON Address FROM CONTENTS OF ePH AND ePF — S327

| bit assign | Name | Description | Remarks |
|---|---|---|---|
| ePH0[31:24] | eVC | extended Virtual Channel | ·eVC IN EXTENDED HEADER OF C-PHY AND D-PHY<br>·UNUSED (FIXED TO 0) IN CCI-FS |
| ePH0[23:16] | eDT | extended Data Type | ADD CCI-FS (I2C, I3C) |
| ePH0[15] | eCONT | Control Code Indicator | 1'b0: NORMAL DATA TRANSFER<br>1'b1: INDICATING CONTROL CODE OF I2C AND I3C.<br>·INDICATING S/Sr/ACK/NACK/P OR THE LIKE IN CASE OF I2C.<br>·USED IN CASE OF Clock Stretch. |
| ePH0[14:10] | Reserved | Reserved for future definition | Reseved |
| ePH0[9:8] | ePFEN | extended Packet Footer (ePF) Enable bitmap | 32b OR 64b Footer EXTENSION field |
| ePH0[7:0] | ePHEN | extended Packet Header (ePH) Enable bitmap | EXTENSION field FOR extended Packet Header |

| bit assign | Name | Description | Remarks |
|---|---|---|---|
| ePH1[31:16] | Source ID | Source ID. Device ID in which the packet is generated | |
| ePH1[15:0] | Packet Length | Length of Packet Data (unit:Byte) | DATA PACKET LENGTH |

| bit assign | Name | Description | Remarks |
|---|---|---|---|
| ePH2[31:24] | Security Descriptor | Security Descriptor | ADDED WHEN Security IS USED<br>default : SET TO 0 |
| ePH2[23:16] | Reserved | Reserved for future definition | Reseved |
| ePH2[15:0] | Message Counter | Message Counter | ·16-bit ROUNDING COUNTER. COUNTED UP EVERY PACKET HAVING First extended Packet Header, AND INITIAL VALUE IS SET TO 0.<br>·INDEPENDENT Message COUNTER IS USED IN COMMUNICATION VIA C/D-PHY HAVING VC. |

FIG. 59

| bit assign | Name | Description | Remarks |
|---|---|---|---|
| ePH3[31:25] | Destination ID | Destination ID. Device ID in which the packet is received finally | ADD Destination ID(CCI-FS) CORRESPONDING TO Slave Address (IN FINAL DESTINATION) |
| ePH3[24] | Read/Write flag | Read/Write flag in which the packet is received finally | Read:1,Write:INDICATING 0.(CCI-FS) |
| ePH3[23:8] | Destination Address | Destination Address is to access register address finally. | STORE REGISTER ADDRESS VALUE OF FINAL DESTINATION. |

FIG. 60

| eDT | Description |
|---|---|
| 0x00 to 0x07 | synchronization Short Packet Data Types |
| 0x08 to 0x0F | Generic Short Packet Data Types |
| 0x10 to 0x17 | Generic Long Packet Data Types |
| 0x18 to 0x1F | YUV Data |
| 0x20 to 0x26 | RGB Data |
| 0x27 to 0x2F | RAW Data |
| 0x30 to 0x37 | User Defined Byte-based Data |
| 0x38 | USL Command |
| 0x39 to 0x3D | Reserved for future use |
| 0x3E | Extended Packet mode(Use in PH only. Do not use in ePH) |
| 0x3F | For CSI-2 over C-PHY:Reserved for future use<br>For CSI-2 over D-PHY:Reserved for future use |
| 0x40 to 0xBF | Reserved for future use |
| 0xC0 to 0xCF | User Defined Byte-based Data<br>0xC0:For I2C<br>0xC1:For I3C |

FIG. 66

| Addr | bit assign | initial Value | Setting Data | Attribute | Detail | Remarks |
|---|---|---|---|---|---|---|
| 0x000 | [0] | 1'b1 | CCI-FS Capability Register | R0 | 1'b0:WITHOUT CCI-FS FUNCTION<br>1'b1:WITH CCI-FS FUNCTION | |
| 0x001 | [7:0] | 8'h10 | CCI-FS Version | R0 | Ver1.0 | |
| 0x002 | [0] | 1'b0 | CCI-FS Enable | RW | SWITCHING BETWEEN<br>CCI-FS FUNCTION ON/OFF | ·SWITCHING AVAILABLE IN A-PHY DIRECT CONNECTION<br>CONFIGURATION<br>·IN CASE WHERE SWITCHING IS USED IN A-PHY SerDes<br>CONFIGURATION, 1'b1 IS SET IN ADVANCE. |
| 0x010 | [7:0] | 8'h0 | eVC | RW | ePH0 INFORMATION | |
| 0x011 | [7:0] | 8'h0 | eDT | RW | | |
| 0x012 | [1:0] | 2'h0 | ePFEN | RW | | |
| 0x013 | [7:0] | 8'h0 | ePHEN | RW | | |
| 0x020 | [7:1] | 7'h0 | Source ID | R0 | ePH1 INFORMATION | INDICATING ID OF Device.<br>·IN CASE OF R0:UNIQUE VALUE IS REGISTERED WHEN IMPLEMENTED.<br>·IN CASE OF RW:IN CASE OF 7'h0, OWN DESTINATION IS SET.<br>SETTING IN AP IS PERFORMED AND SETTING IN Image Sensor IS<br>PERFORMED FROM AP SIDE. |
| | [0] | 1'h0 | Read/Write Source | RW | ePH1 INFORMATION | Reserved |
| 0x030 | [7:1] | 7'h0 | Destination ID | RW | ePH3 INFORMATION | |
| | [0] | 1'h0 | Read/Write Dest | RW | ePH3 INFORMATION | |
| 0x031 | [7:0] | 8'h0 | Destination Address[7:0] | RW | ePH3 INFORMATION | |
| 0x032 | [7:0] | 8'h0 | Destination Address[15:8] | RW | ePH3 INFORMATION | |
| 0x033 | [7:0] | 8'h0 | payload Length[7:0] | RW | ePH3 INFORMATION | |
| 0x034 | [15:8] | 8'h0 | payload Length[15:0] | RW | ePH4 INFORMATION | |
| 0x102 | [7:0] | 8'h0 | Read Data Length[7:0] | RW | | (BASICALLY, RESTRICTION IN RANGE OF Payload OF A-PHY IS PROVIDED) |
| 0x103 | [7:0] | 8'h0 | Read Data Length[15:8] | RW | | |
| 0x104 | [0] | 1'h0 | CMD Exec | RW | AFTER EXECUTION IS COMPLETED,<br>AUTOMATICALLY CLEARED | 1'b1:Read not Ready<br>1'b0:Read ready |
| 0x105 | [0] | 1'h0 | Read CMD Status | R0 | 1'b1:Read Ready<br>1'b0:Read not ready | |
| 0x106 | [7:0] | 8'h0 | Read Data[7:0] | R0 | | EXTENDABLE CONFIGURATION |
| 0x107 | [7:0] | 8'h0 | Read Data[15:8] | R0 | | EXTENDABLE CONFIGURATION |
| 0x108 | [7:0] | 8'h0 | Read Data[23:16] | R0 | | EXTENDABLE CONFIGURATION |
| 0x109 | [7:0] | 8'h0 | Read Data[31:24] | R0 | | EXTENDABLE CONFIGURATION |

FIG. 67

| Addr | bit assign | Initial Value | Setting Data Attribute | Detail | Remarks |
|---|---|---|---|---|---|
| IN CASE OF Bridge CONFIGURATION (IN SERDES CONFIGURATION OR THE LIKE, REGISTER CONFIGURATION Compatible WITH CONVENTIONAL GCI MAY BE USED) | | | | | |
| 0x110 | [7:1] | 7'h0 | Destination SID (CONNECTION DESTINATION) | RW | SLAVE DEVICE OF #1 → IN CASE WHERE Destination IS NOT REGISTERED, DISCARDING AND ERROR DETECTION ARE PERFORMED (HOWEVER, IN CASE OF End DEVICE, Source ID IS RETURNED TO BE TRANSFERRED AND IS NOT USED) |
| | [0] | 1'h0 | Read/Write | RW | WHEN GCI-FS IS Enabled, 1Write IS INVALID |
| 0x111 | [7:0] | 8'h0 | Address Register[15:8] (CONNECTION DESTINATION) | RW | |
| 0x112 | [7:0] | 8'h0 | Address Register[7:0] (CONNECTION DESTINATION) | RW | |
| 0x113 | [7:0] | 8'h0 | Attribution (CONNECTION DESTINATION) | RW | 0:I2C 1:I3C 2:A-PHY OTHERS:Reserved |
| 0x114 | [7:0] | 8'h0 | Timeout_No1[15:8] | RW | TIME SETTING FOR ACCESS TIME OUT |
| 0x115 | [7:0] | 8'h10 | Timeout_No1[7:0] | RW | ↑ |
| 0x120 | [7:1] | 8'h0 | Destination ID (CONNECTION DESTINATION) | RW | SLAVE DEVICE OF #2 |
| | [0] | 1'h0 | Read/Write | RW | |
| 0x121 | [7:0] | 8'h0 | Address Register[15:8] (CONNECTION DESTINATION) | RW | |
| 0x122 | [7:0] | 8'h0 | Address Register[7:0] (CONNECTION DESTINATION) | RW | |
| 0x123 | [7:0] | 8'h0 | Attribution (CONNECTION DESTINATION) | RW | 0:I2C 1:I3C 2:A-PHY OTHERS:Reserved |
| 0x124 | [7:0] | 8'h00 | Timeout_No2[15:8] | RW | TIME SETTING FOR ACCESS TIME OUT |
| 0x125 | [7:0] | 8'h10 | Timeout_No2[7:0] | RW | ↑ |
| | | | | | SLAVE DEVICE OF #3 …… |

FIG. 68

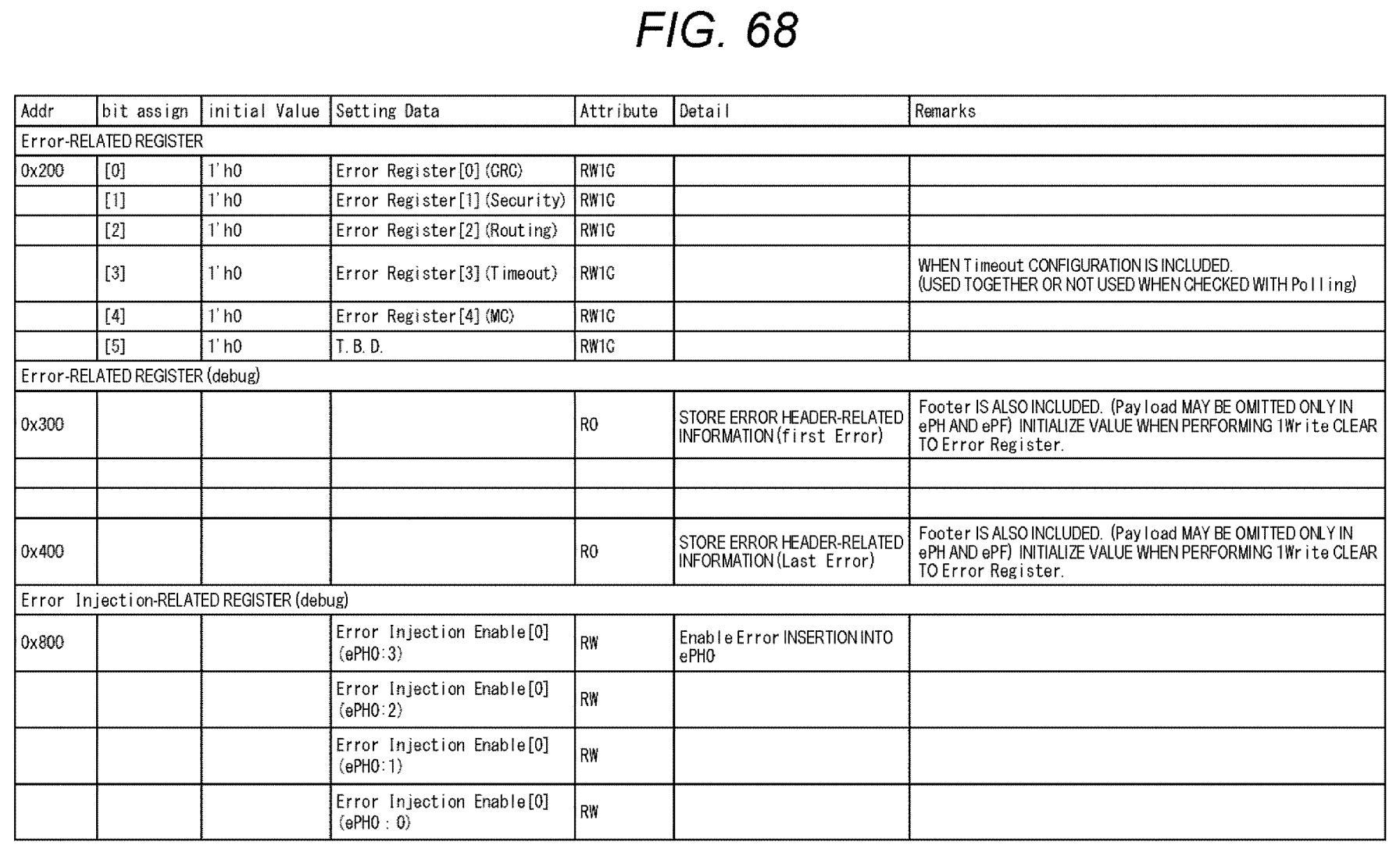

| Addr | bit assign | Initial Value | Setting Data | Attribute | Detail | Remarks |
|---|---|---|---|---|---|---|
| Error-RELATED REGISTER | | | | | | |
| 0x200 | [0] | 1'h0 | Error Register [0] (CRC) | RW1C | | |
| | [1] | 1'h0 | Error Register [1] (Security) | RW1C | | |
| | [2] | 1'h0 | Error Register [2] (Routing) | RW1C | | |
| | [3] | 1'h0 | Error Register [3] (Timeout) | RW1C | | WHEN Timeout CONFIGURATION IS INCLUDED. (USED TOGETHER OR NOT USED WHEN CHECKED WITH Polling) |
| | [4] | 1'h0 | Error Register [4] (MC) | RW1C | | |
| | [5] | 1'h0 | T.B.D. | RW1C | | |
| Error-RELATED REGISTER (debug) | | | | | | |
| 0x300 | | | | RO | STORE ERROR HEADER-RELATED INFORMATION (first Error) | Footer IS ALSO INCLUDED. (Payload MAY BE OMITTED ONLY IN ePH AND ePF) INITIALIZE VALUE WHEN PERFORMING 1Write CLEAR TO Error Register. |
| | | | | | | |
| | | | | | | |
| 0x400 | | | | RO | STORE ERROR HEADER-RELATED INFORMATION (Last Error) | Footer IS ALSO INCLUDED. (Payload MAY BE OMITTED ONLY IN ePH AND ePF) INITIALIZE VALUE WHEN PERFORMING 1Write CLEAR TO Error Register. |
| Error Injection-RELATED REGISTER (debug) | | | | | | |
| 0x800 | | | Error Injection Enable [0] (ePH0:3) | RW | Enable Error INSERTION INTO ePH0 | |
| | | | Error Injection Enable [0] (ePH0:2) | RW | | |
| | | | Error Injection Enable [0] (ePH0:1) | RW | | |
| | | | Error Injection Enable [0] (ePH0:0) | RW | | |

*FIG. 69*

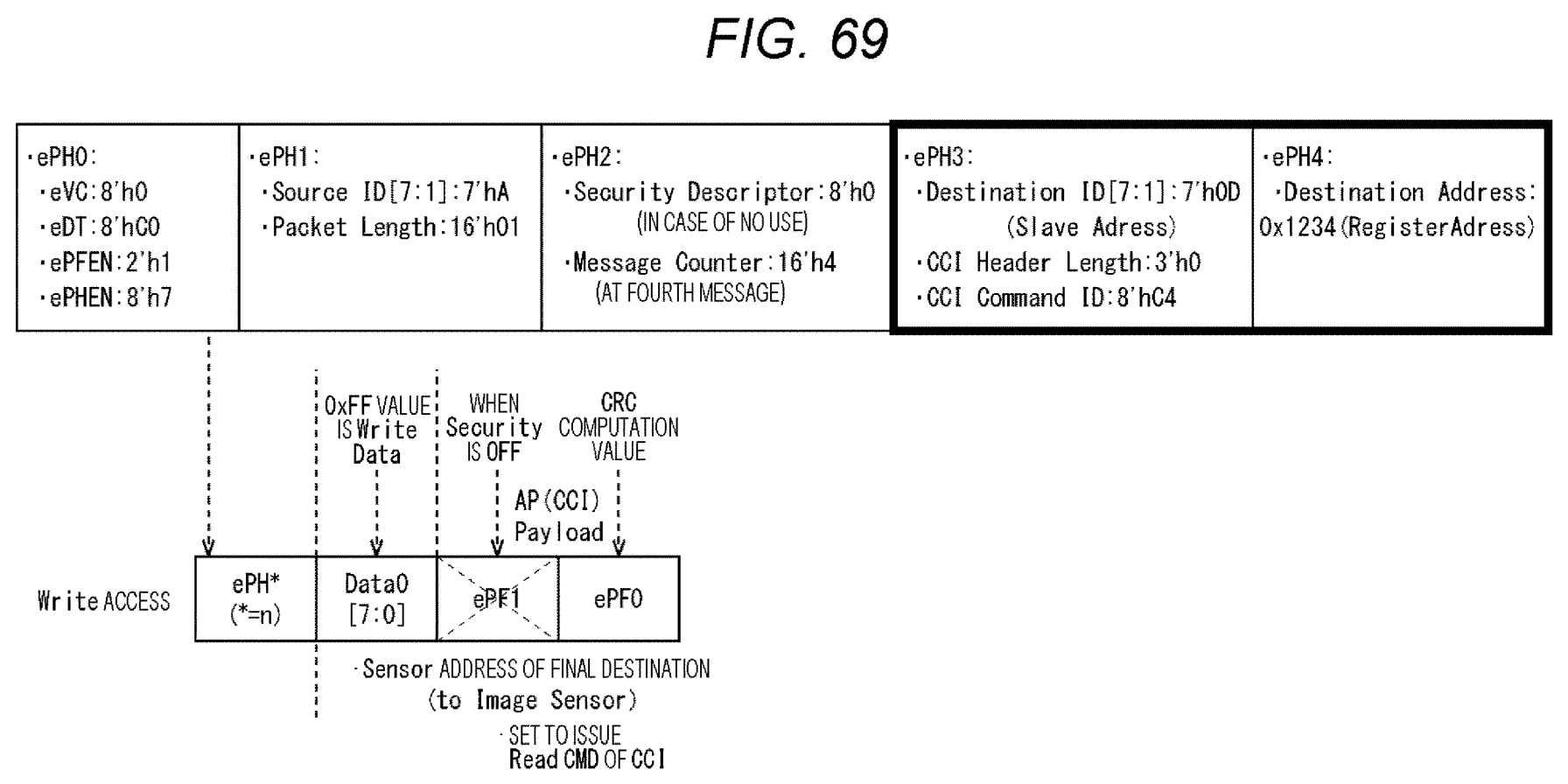

- ePH0:
  - eVC:8'h0
  - eDT:8'hC0
  - ePFEN:2'h1
  - ePHEN:8'h7

- ePH1:
  - Source ID[7:1]:7'hA
  - Packet Length:16'h01

- ePH2:
  - Security Descriptor:8'h0
    (IN CASE OF NO USE)
  - Message Counter:16'h4
    (AT FOURTH MESSAGE)

- ePH3:
  - Destination ID[7:1]:7'hOD
    (Slave Adress)
  - CCI Header Length:3'h0
  - CCI Command ID:8'hC4

- ePH4:
  - Destination Address:
    0x1234(RegisterAdress)

| ePH*<br>(*=n) | Data0<br>[7:0] | ePF1 | ePF0 |

WHEN
Security
IS OFF

CRC
COMPUTATION
VALUE

0xFF VALUE
IS Write
Data

AP(CCI)
Payload

Sensor ADDRESS OF FINAL DESTINATION
(to Image Sensor)

· SET TO ISSUE
Read CMD OF CCI

Write ACCESS

FIG. 82A
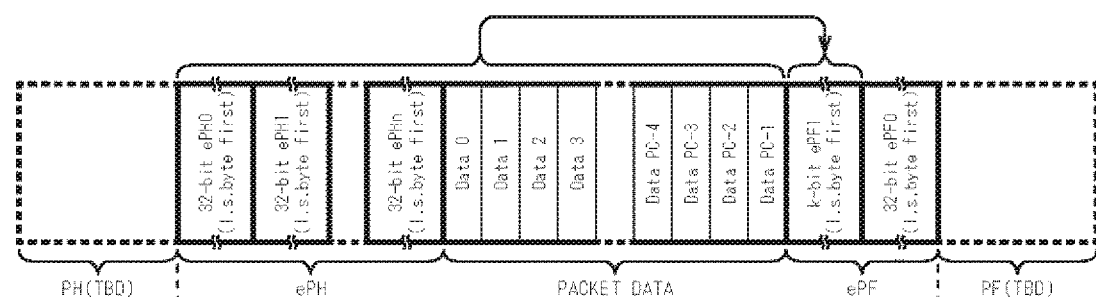
FIG. 82B
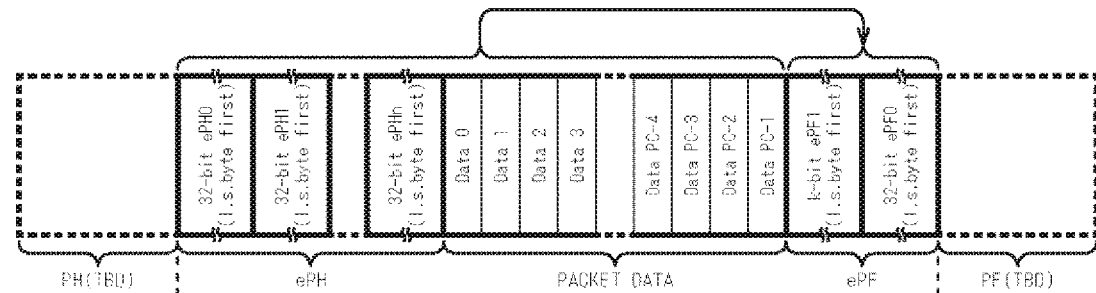
FIG. 82C
FIG. 82D

FIG. 85A

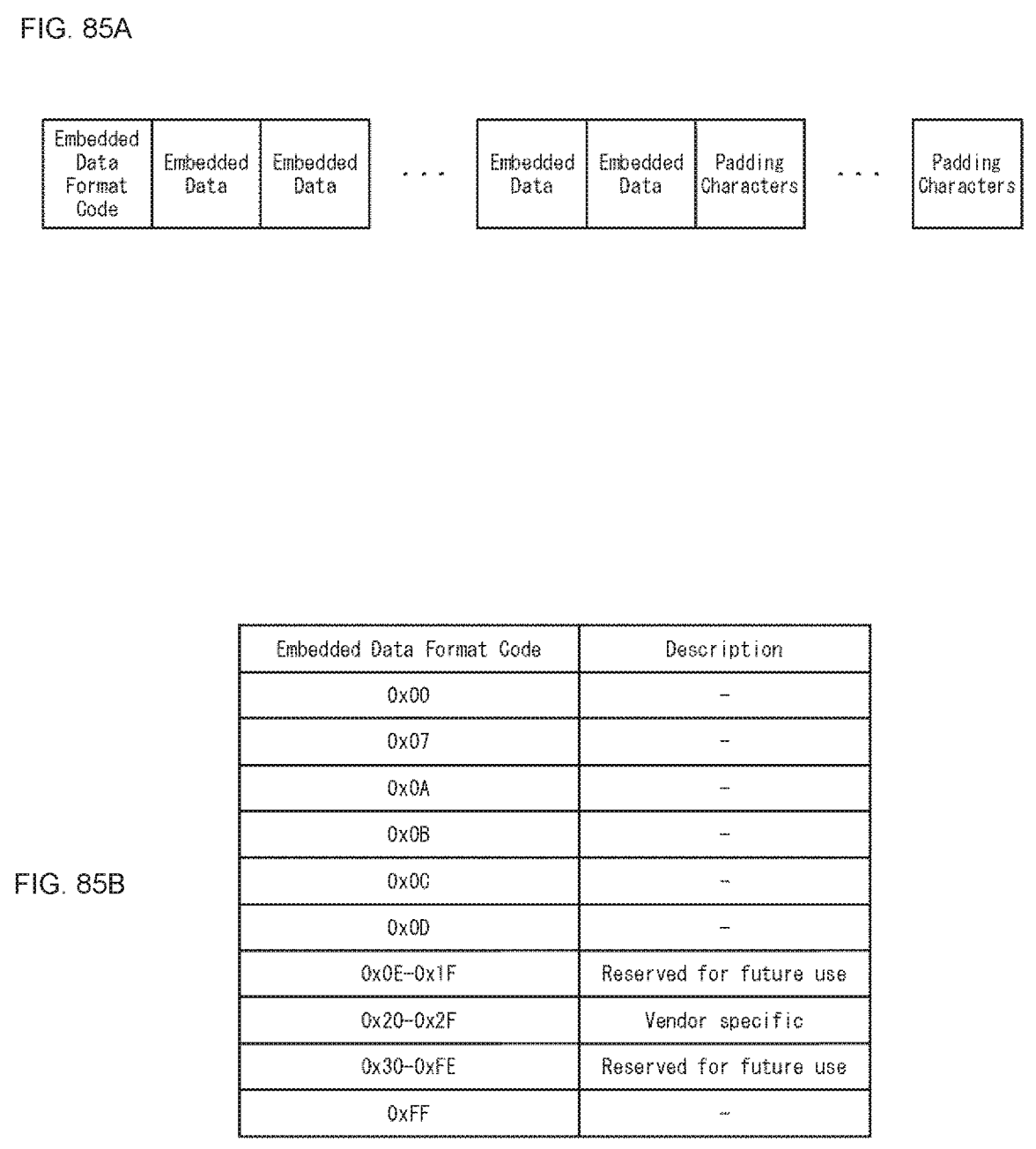

| Embedded Data Format Code | Embedded Data | Embedded Data | . . . | Embedded Data | Embedded Data | Padding Characters | . . . | Padding Characters |
|---|---|---|---|---|---|---|---|---|

FIG. 85B

| Embedded Data Format Code | Description |
|---|---|
| 0x00 | – |
| 0x07 | – |
| 0x0A | – |
| 0x0B | – |
| 0x0C | – |
| 0x0D | – |
| 0x0E–0x1F | Reserved for future use |
| 0x20–0x2F | Vendor specific |
| 0x30–0xFE | Reserved for future use |
| 0xFF | – |

Origin(0,0)

Column (=X)

Row (=Y)

| VC1 FS | Write #m+1 | Write #m+2 | | VC2 FS | Read1 #m+3 | Read2 #k+1 |
| VC1 Emb Data | | | | VC2 Emb Data | | |
| VC1 Img Data | | | | VC2 Img Data | | |
| VC1 Img Data | | | | VC2 Img Data | | |
| ... | | | | ... | | |
| VC1 Img Data | | | | VC2 Img Data | | |
| VC1 Img Data | | | | VC2 Img Data (Dummy if needed) | | |
| VC1 Emb Data | | | | VC2 Emb Data (Dummy if needed) | | |
| VC1 FE | Read1 #m+4 | Read2 #k+2 | | VC2 FE | Write #m+5 | Write #m+6 |
| | Write #m+7 | Write #m+8 | | | Read1 #m+9 | Read2 #k+3 |
| | Read1 #m+10 | Read2 #k+4 | | | Write #m+11 | Write #m+12 |

VC: Virtual Channel     FS: Frame Start     #:Message Counter     FE: Frame End
Emb: Embedded     Img: Image     UD: User Defined 128 bits Initial Counter Block (ICB) example for AES-GCM/GMAC

| Res 2 bits | eVC 6 bits | Source ID 16 bits | Final destination ID 16 bits | Additional message counter 40 bits | Message counter 16 bits | Pre-counter 32 bits: Initial value is $0^{30} \parallel 10$ |

96 bits Initialization Vector (IV) example for AES-GCM/GMAC

Fixed field

Invocation field: Nonce (number used once) against a given session key

FIG. 97

$GCM-AE_K(IV, P, A) = (C, T)$.

*FIG. 102*

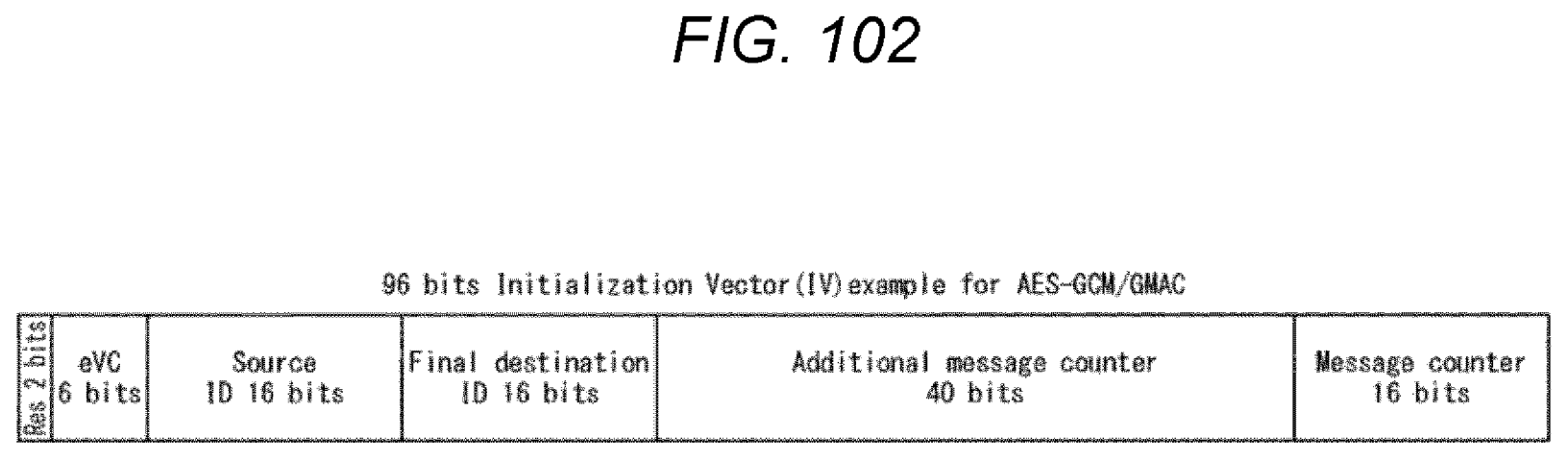

96 bits Initialization Vector (IV) example for AES-GCM/GMAC

| Res 2 bits | eVC 6 bits | Source ID 16 bits | Final destination ID 16 bits | Additional message counter 40 bits | Message counter 16 bits |
|---|---|---|---|---|---|

*FIG. 107*

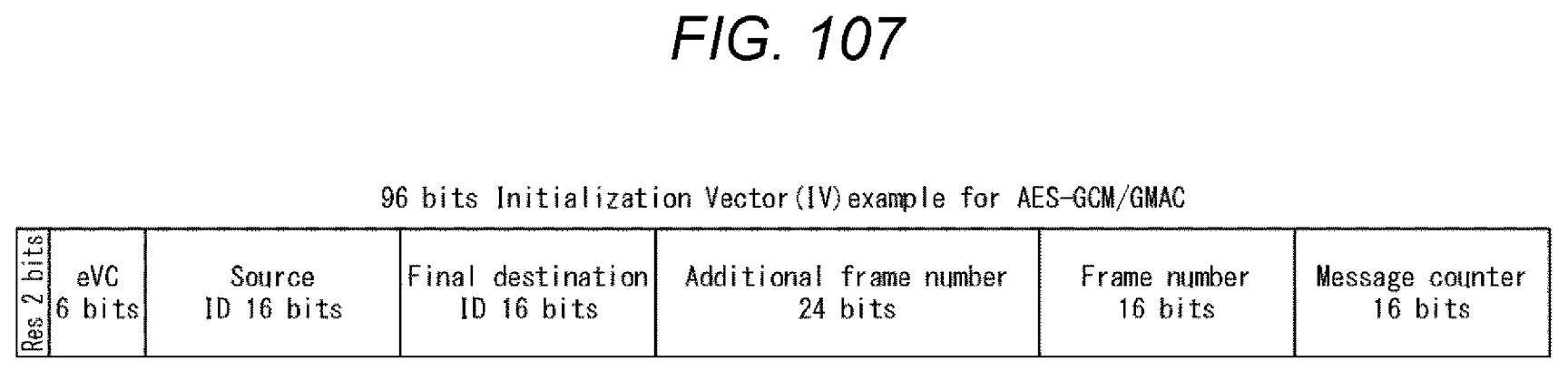

96 bits Initialization Vector (IV) example for AES-GCM/GMAC

| Res 2 bits | eVC 6 bits | Source ID 16 bits | Final destination ID 16 bits | Additional frame number 24 bits | Frame number 16 bits | Message counter 16 bits |
|---|---|---|---|---|---|---|

FIG. 109

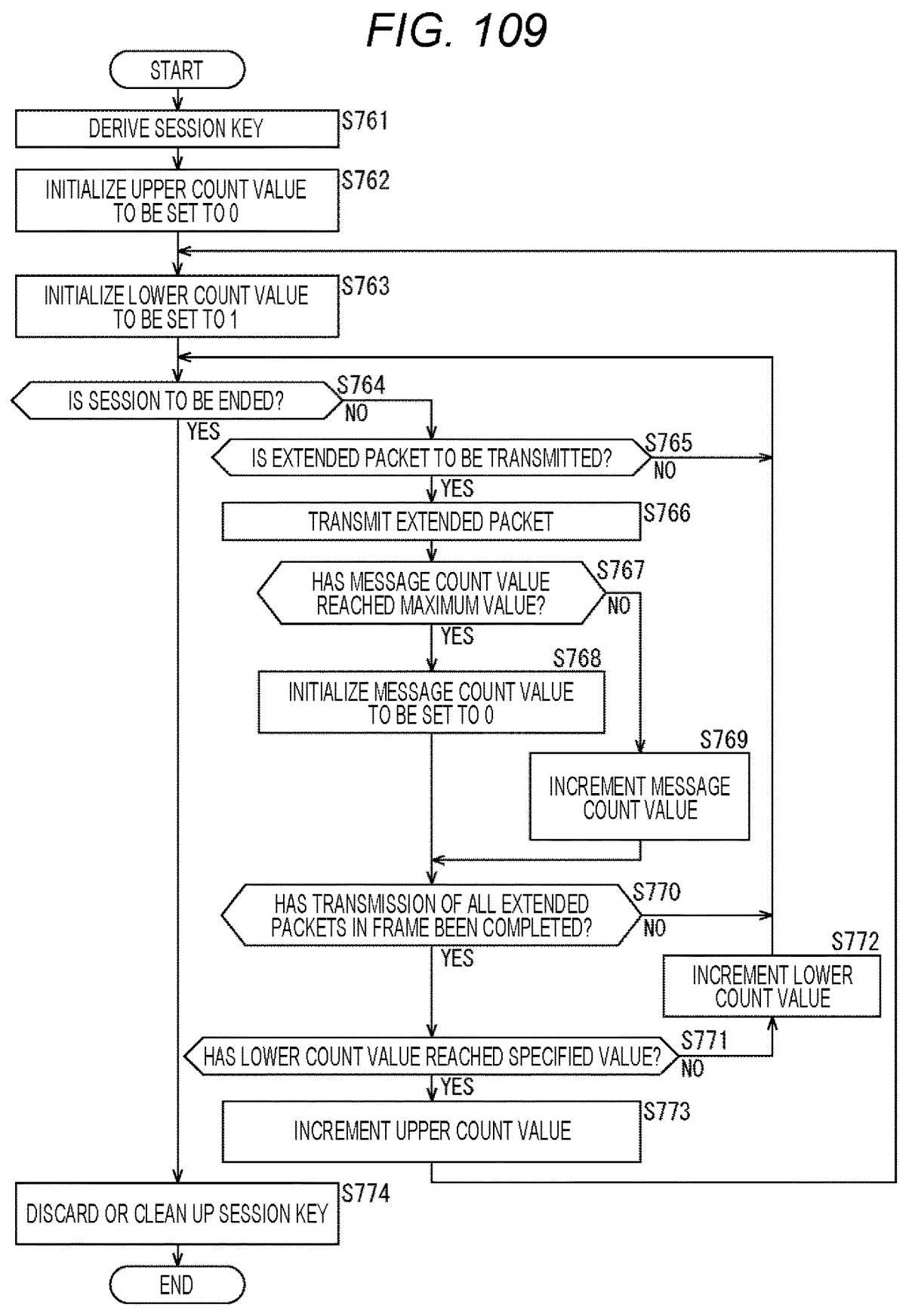

START

DERIVE SESSION KEY  S761

INITIALIZE UPPER COUNT VALUE
TO BE SET TO 0  S762

INITIALIZE LOWER COUNT VALUE
TO BE SET TO 1  S763

IS SESSION TO BE ENDED?  S764  NO

YES

IS EXTENDED PACKET TO BE TRANSMITTED?  S765  NO

YES

TRANSMIT EXTENDED PACKET  S766

HAS MESSAGE COUNT VALUE
REACHED MAXIMUM VALUE?  S767  NO

YES

INITIALIZE MESSAGE COUNT VALUE
TO BE SET TO 0  S768

INCREMENT MESSAGE
COUNT VALUE  S769

HAS TRANSMISSION OF ALL EXTENDED
PACKETS IN FRAME BEEN COMPLETED?  S770  NO

YES

INCREMENT LOWER
COUNT VALUE  S772

HAS LOWER COUNT VALUE REACHED SPECIFIED VALUE?  S771  NO

YES

INCREMENT UPPER COUNT VALUE  S773

DISCARD OR CLEAN UP SESSION KEY  S774

END

*FIG. 111*

| Security MAC | Description |
|--------------|-------------|
| 0x00 | Reserved for future use |
| 0x01 | Line-MAC |
| 0x02 | Frame-MAC |
| 0x03 | Reserved for future use |

FIG. 112A

| MESSAGE COUNTER | ROLLOVER PERIOD AT 60fps AND 2160 ROWS OF PIXELS |
|---|---|
| 16+16 bits | $2^{32} \div 60 \div 2163 \approx 9$ HOURS |
| 20+16 bits | $2^{36} \div 60 \div 2163 \approx 6$ DAYS |
| 24+16 bits | $2^{40} \div 60 \div 2163 \approx 98$ DAYS |
| 28+16 bits | $2^{44} \div 60 \div 2163 \approx 4$ YEARS |
| 32+16 bits | $2^{48} \div 60 \div 2163 \approx 69$ YEARS |

FIG. 112B

| FRAME COUNTER | ROLLOVER PERIOD AT 60fps AND EVERY INCREMENT |
|---|---|
| 4+16 bits | $2^{04} \times (2^{16}-1) \div 60 \approx 5$ HOURS |
| 8+16 bits | $2^{08} \times (2^{16}-1) \div 60 \approx 78$ HOURS |
| 12+16 bits | $2^{12} \times (2^{16}-1) \div 60 \approx 52$ DAYS |
| 16+16 bits | $2^{16} \times (2^{16}-1) \div 60 \approx 828$ DAYS |
| 20+16 bits | $2^{20} \times (2^{16}-1) \div 60 \approx 36$ YEARS |
| 24+16 bits | $2^{24} \times (2^{16}-1) \div 60 \approx 581$ YEARS |

FIG. 113A

| Salt 32 bits | Res 2 bits | eVC 6 bits | Additional message counter 40 bits | Message counter 16 bits |
|---|---|---|---|---|

FIG. 113B

| Salt 16 bits | Res 2 bits | eVC 6 bits | Source ID 16 bits | Final destination ID 16 bits | Additional frame number 24 bits | Frame number 16 bits |
|---|---|---|---|---|---|---|

FIG. 113C

| Salt 32 bits | Res 2 bits | eVC 6 bits | Session ID 8 bits | XOR Source ID & Final destination ID 16 bits | Additional message counter 16 bits | Message counter 16 bits |
|---|---|---|---|---|---|---|

FIG. 113D

| Res 2 bits | eVC 6 bits | ReqSessionID 16 bits | RspSessionID 16 bits | Additional message counter 40 bits | Message counter 16 bits |
|---|---|---|---|---|---|

FIG. 113E

| SPDM/HDCP | eVC 6 bits | eDT 8 bits | Session ID 8 bits | Source ID 16 bits | Final destination ID 16 bits | Additional message counter 24 bits | Message counter 16 bits |
|---|---|---|---|---|---|---|---|

FIG. 116

| Security protocol | Description |
|---|---|
| 0x00 | Reserved for future use |
| 0x01 | SPDM |
| 0x02 | HDCP |
| 0x03 | Reserved for future use |

Source ID 16 bits/Final Destination ID 16 bits

| Master/Slave address 7 bits (I2C OR I3C) | $0^9$ |
|---|---|

Source ID 16 bits/Final Destination ID 16 bits

| $0^8$ | Master/Slave address 7 bits (I2C OR I3C) | 0 |
|---|---|---|

FIG. 120

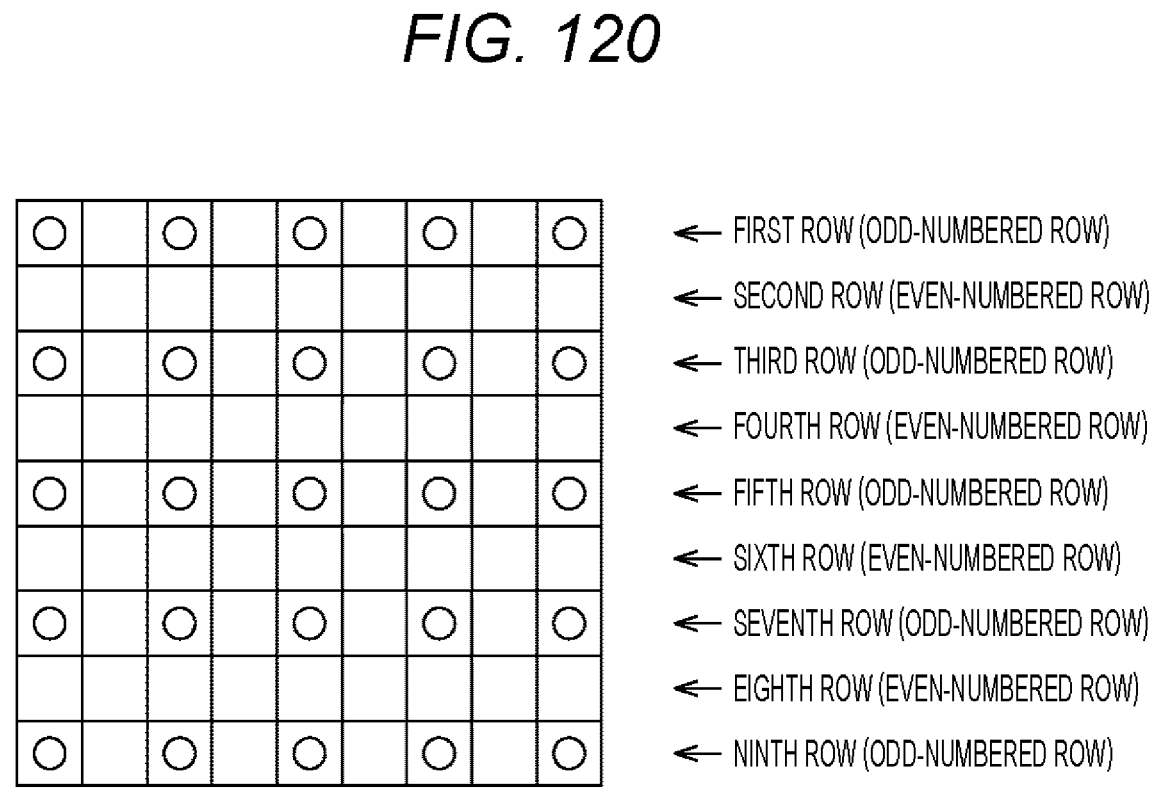

← FIRST ROW (ODD-NUMBERED ROW)

← SECOND ROW (EVEN-NUMBERED ROW)

← THIRD ROW (ODD-NUMBERED ROW)

← FOURTH ROW (EVEN-NUMBERED ROW)

← FIFTH ROW (ODD-NUMBERED ROW)

← SIXTH ROW (EVEN-NUMBERED ROW)

← SEVENTH ROW (ODD-NUMBERED ROW)

← EIGHTH ROW (EVEN-NUMBERED ROW)

← NINTH ROW (ODD-NUMBERED ROW)

FIG. 121

← FIRST ROW (ODD-NUMBERED ROW)

← SECOND ROW (EVEN-NUMBERED ROW)

← THIRD ROW (ODD-NUMBERED ROW)

← FOURTH ROW (EVEN-NUMBERED ROW)

← FIFTH ROW (ODD-NUMBERED ROW)

← SIXTH ROW (EVEN-NUMBERED ROW)

← SEVENTH ROW (ODD-NUMBERED ROW)

← EIGHTH ROW (EVEN-NUMBERED ROW)

← NINTH ROW (ODD-NUMBERED ROW)

FIG. 125

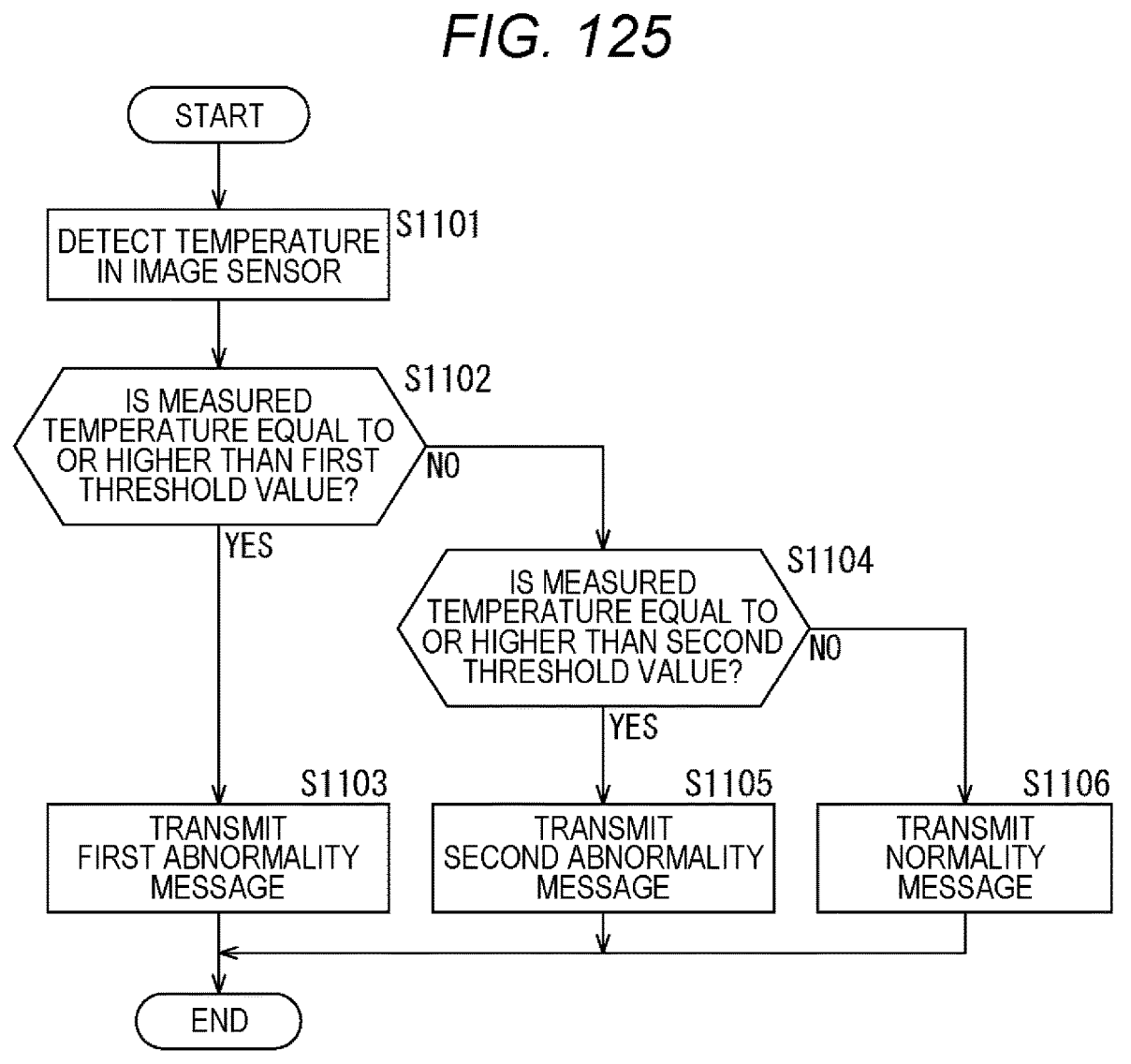

START

DETECT TEMPERATURE
IN IMAGE SENSOR          S1101

IS MEASURED
TEMPERATURE EQUAL TO
OR HIGHER THAN FIRST
THRESHOLD VALUE?          S1102

NO

YES

IS MEASURED
TEMPERATURE EQUAL TO
OR HIGHER THAN SECOND
THRESHOLD VALUE?          S1104

NO

YES

S1103
TRANSMIT
FIRST ABNORMALITY
MESSAGE

S1105
TRANSMIT
SECOND ABNORMALITY
MESSAGE

S1106
TRANSMIT
NORMALITY
MESSAGE

END

FIG. 149

HD : Hamming Distance

| HD≥1 COUNT | HD=1 COUNT |
|---|---|
| 0=0000 | 0=0000 |
| 1=0001 | 1=0001 |
| 2=0010 | 2=0011 |
| 3=0011 | 3=0010 |
| 4=0100 | 4=0110 |
| 5=0101 | 5=0111 |
| 6=0110 | 6=0101 |
| 7=0111 | 7=0100 |
| 8=1000 | 8=1100 |
| 9=1001 | 9=1101 |
| 10=1010 | 10=1111 |
| 11=1011 | 11=1110 |
| 12=1100 | 12=1010 |
| 13=1101 | 13=1011 |
| 14=1110 | 14=1001 |
| 15=1111 | 15=1000 |
| 16=0000 | 16=0000 |
| 17=0001 | 17=0001 |
| ... | ... |

FIG. 150

HD : Hamming Distance

| FIRST COUNTER HD ≥ 1 MODE INCREMENT | SECOND COUNTER HD ≥ 1 MODE DECREMENT | ADDITION VALUE OF FIRST COUNTER AND SECOND COUNTER |
|---|---|---|
| 0000 | 1111 | 1111 |
| 0001 | 1110 | 1111 |
| 0010 | 1101 | 1111 |
| 0011 | 1100 | 1111 |
| 0100 | 1011 | 1111 |
| 0101 | 1010 | 1111 |
| 0110 | 1001 | 1111 |
| 0111 | 1000 | 1111 |
| 1000 | 0111 | 1111 |
| 1001 | 0110 | 1111 |
| 1010 | 0101 | 1111 |
| 1011 | 0100 | 1111 |
| 1100 | 0011 | 1111 |
| 1101 | 0010 | 1111 |
| 1110 | 0001 | 1111 |
| 1111 | 0000 | 1111 |
| 0000 | 1111 | 1111 |
| 0001 | 1110 | 1111 |
| ... | ... | ... |

FIG. 151

| FIRST COUNTER HD=1 MODE INCREMENT | SECOND COUNTER HD=1 MODE INCREMENT | SUBTRACTION VALUE OF FIRST COUNTER AND SECOND COUNTER |
|---|---|---|
| 0=0000 | 0=0000 | 0000 |
| 1=0001 | 1=0001 | 0000 |
| 2=0011 | 2=0011 | 0000 |
| 3=0010 | 3=0010 | 0000 |
| 4=0110 | 4=0110 | 0000 |
| 5=0111 | 5=0111 | 0000 |
| 6=0101 | 6=0101 | 0000 |
| 7=0100 | 7=0100 | 0000 |
| 8=1100 | 8=1100 | 0000 |
| 9=1101 | 9=1101 | 0000 |
| 10=1111 | 10=1111 | 0000 |
| 11=1110 | 11=1110 | 0000 |
| 12=1010 | 12=1010 | 0000 |
| 13=1011 | 13=1011 | 0000 |
| 14=1001 | 14=1001 | 0000 |
| 15=1000 | 15=1000 | 0000 |
| 16=0000 | 16=0000 | 0000 |
| 17=0001 | 17=0001 | 0000 |
| ... | ... | ... |

FIG. 153

| Bit | Name | Description |
|---|---|---|
| ePH2[31:24] | Security Descriptor | Define the encrypted image data and ePF1 block for security. |
| ePH2[23:16] | Warning Descriptor | Define the warning information. |
| ePH2[15:0] | Message Counter | 16 bit wrap counter. The value is set to 0 in the first extension packet. This counter increments the value on every transmission of extended packet. After $2^{16}-1$, the value is set to 0. Each virtual channel has each independent Message Counter. |

FIG. 154

| Bit | Description |
|---|---|
| ePH2[23] | 1'b1 : Fatal warning.<br>1'b0 : No fatal warning. |
| ePH2[22] | 1'b1 : Sensor-internal warning.<br>1'b0 : No sensor-internal warning. |
| ePH2[21] | 1'b1 : Sensor-external warning.<br>1'b0 : No sensor-external warning. |
| ePH2[20] | 1'b1 : Power-source warning.<br>1'b0 : No power-source warning. |
| ePH2[19] | 1'b1 : Clock-source warning.<br>1'b0 : No clock-source warning. |
| ePH2[18] | 1'b1 : The others warning.<br>1'b0 : No the others warning. |
| ePH2[17] | Reserved for future use. |
| ePH2[16] | Reserved for future use. |

*FIG. 155*

| Bit | Name | Description |
|---|---|---|
| ePH2[23] | Physical attack detection | 1'b1 : Physical attack was detected.<br>1'b0 : Physical attack was not detected. |

FIG. 159

| Bit | Description |
|---|---|
| ePH2[31] | 1'b1 : Transmit encrypted payload.<br>1'b0 : Transmit payload in the clear. |
| ePH2[30] | 1'b1 : Transmit MAC as ePF1.<br>1'b0 : Not transmit MAC as ePF1. |
| ePH2[29] | 1'b1 : Physical attack was detected.<br>1'b0 : Physical attack was not detected. |
| ePH2[28:24] | Reserved for future use. |

FIG. 165

Responder flag fields definitions

| Byte | Bit | Field | Value |
|------|-----|-------|-------|
| 1 | 5 | HBEAT_CAP | If set, Responder supports HEARTBEAT messages |

*FIG. 166*

HEARTBEAT request message format

| Offset | Field | Bytes | Value |
|---|---|---|---|
| 0 | SPDMVersion | 1 | V1.1 = 0x11 |
| 1 | RequestResponseCode | 1 | 0xE8 = HEARTBEAT Request |
| 2 | Param1 | 1 | Reserved |
| 3 | Param2 | 1 | Reserved |

*FIG. 167*

HEARTBEAT_ACK response message format

| Offset | Field | Bytes | Value |
|---|---|---|---|
| 0 | SPDMVersion | 1 | V1.1 = 0x11 |
| 1 | RequestResponseCode | 1 | 0x68 = HEARTBEAT_ACK Response |
| 2 | Param1 | 1 | Reserved |
| 3 | Param2 | 1 | Reserved |

*FIG. 168*

HEARTBEAT_NAK response message format

| Offset | Field | Bytes | Value |
|---|---|---|---|
| 0 | SPDMVersion | 1 | TBD |
| 1 | RequestResponseCode | 1 | TBD = HEARTBEAT_NAK Response |
| 2 | Param1 | 1 | Reserved |
| 3 | Param2 | 1 | Reserved |

*FIG. 169*

END_SESSION_ACK response message format

| Offset | Field | Bytes | Value |
|---|---|---|---|
| 0 | SPDMVersion | 1 | V1.1 = 0x11 |
| 1 | RequestResponseCode | 1 | 0x6C = END_SESSION_ACK |
| 2 | Param1 | 1 | Reserved |
| 3 | Param2 | 1 | Reserved |

*FIG. 171*

END_SESSION_NAK response message format

| Offset | Field | Bytes | Value |
|--------|-------|-------|-------|
| 0 | SPDMVersion | 1 | TBD |
| 1 | RequestResponseCode | 1 | TBD = END_SESSION_NAK |
| 2 | Param1 | 1 | Reserved |
| 3 | Param2 | 1 | Reserved |

*FIG. 176*

ERROR response message format

| Offset | Field | Bytes | Value |
|---|---|---|---|
| 0 | SPDMVersion | 1 | TBD |
| 1 | RequestResponseCode | 1 | 0x7F = ERROR |
| 2 | Param1 | 1 | Error code |
| 3 | Param2 | 1 | Error data |
| 4 | ExtendedErrorData | 0-32 | Optional extended data |

*FIG. 177*

Error Code and Error Data

| Error code | Value | Description | Error data | ExtendedErrorData |
|---|---|---|---|---|
| Reserved | 0x00 | Reserved | Reserved | Reserved |
| Unspecified | 0x05 | Unspecified error occurred | 0x00 | No extended error data is provided |
| Reserved | 0x0b-0x40 | Reserved | Reserved | Reserved |
| Reserved | 0x44-0xFE | Reserved | Reserved | Reserved |
| Vendor/Other Standards Defined | 0xFF | Vendor or Other Standards defined | Shall indicate the registry or standard body using one of the values in the ID column in the Registry or standards body ID table. | See the ExtendedErrorData format for vendor or other standards-defined ERROR response message table for format definition. |

FIG. 178

ExtendedErrorData format for vendor or other standards-defined ERROR response message

| Offset | Field | Bytes | Description |
|---|---|---|---|
| 0 | Len | 1 | Length of the VendorID field. If the ERROR is vendor defined, the value of this field shall equal the Vendor ID Len, as the Registry or standards body ID table describes, of the corresponding registry or standard body name. If the ERROR is defined by a registry or a standard, this field shall be zero (0), which also indicates that the VendorID field is not present. The Error Data field in the ERROR message indicates the registry or standards body name, such as Param2, and is one of the values in the ID column in the Registry or standards body ID table. |
| 1 | VendorID | Len | The value of this field shall indicate the Vendor ID, as assigned by the registry or standards body. The Registry or standards body ID table describes the length of this field. Shall be in little endian format. The registry or standards body name in the ERROR is indicated in the Error Data field, such as Param2, and is one of the values in the ID column in the Registry or standards body ID table. |
| 1+Len | OpaqueErrorData | Variable | Defined by the vendor or other standards. |

FIG. 179

Registry or standards body ID

| ID | Vendor ID length (bytes) | Registry or standards body name | Description |
|----|--------------------------|--------------------------------|-------------|
| 0x6 | 2 | MIPI | The Manufacturer ID assigned by MIPI identifies the vendor. |

FIG. 180

VENDOR_DEFINED_REQUEST request message format

| Offset | Field | Bytes | Value |
|---|---|---|---|
| 0 | SPDMVersion | 1 | V1.1 = 0x11 |
| 1 | RequestResponseCode | 1 | 0xFE = VENDOR_DEFINED_REQUEST |
| 2 | Param1 | 1 | Reserved |
| 3 | Param2 | 1 | Reserved |
| 4 | StandardID | 2 | Shall indicate the registry or standards body by using one of the values in the ID column in the Registry or standards body ID table. |
| 6 | Len | 1 | Length of the Vendor ID field. If the VendorDefinedRequest is standard defined. Len shall be 0. If the VendorDefinedRequest is vendor-defined, Len shall equal Vendor ID Len, as the Registry or standards body ID table describes. |
| 7 | VendorID | Len | Vendor ID, as assigned by the registry or standards body. Shall be in little endian format. |
| 7+Len | ReqLength | 2 | Length of the VendorDefinedReqPayload. |
| 7+Len+2 | VendorDefinedReqPayload | ReqLength | The standard or vendor shall use this field to send the request payload. |

FIG. 181

VENDOR_DEFINED_RESPONSE response message

| Offset | Field | Bytes | Value |
|---|---|---|---|
| 0 | SPDMVersion | 1 | V1.1 = 0x11 |
| 1 | RequestResponseCode | 1 | 0x7E = VENDOR_DEFINED_RESPONSE |
| 2 | Param1 | 1 | Reserved |
| 3 | Param2 | 1 | Reserved |
| 4 | StandardID | 2 | Shall indicate the registry or standard body using one of the values in the ID column in the Registry or standards body ID table. |
| 6 | Len | 1 | Length of the Vendor ID field. If the VendorDefinedRequest is standards-defined, length shall be 0. If the VendorDefinedRequest is vendor-defined, length shall equal Vendor ID Len, as the Registry or standards body ID table describes. |
| 7 | VendorID | Len | Shall indicate the Vendor ID, as assigned by the registry or standards body. Shall be in little endian format. |
| 7+Len | ReqLength | 2 | Length of the VendorDefinedRespPayload. |
| 7+Len+2 | VendorDefinedRespPayload | ReqLength | Standard or vendor shall use this value to send the response payload. |

FIG. 183

KEY_UPDATE request message format

| Offset | Field | Bytes | Value |
|---|---|---|---|
| 0 | SPDMVersion | 1 | TBD |
| 1 | RequestResponseCode | 1 | 0xE9 = KEY_UPDATE Request |
| 2 | Param1 | 1 | Key Operation. See KEY_UPDATE Operations Table. |
| 3 | Param2 | 1 | Tag. This field shall contain a unique number to aid the responder in differentiating between the original and retry request. A retry request shall contain the same tag number as the original. |

KEY_UPDATE_ACK response message format

| Offset | Field | Bytes | Value |
|---|---|---|---|
| 0 | SPDMVersion | 1 | TBD |
| 1 | RequestResponseCode | 1 | 0x69 = KEY_UPDATE_ACK Response |
| 2 | Param1 | 1 | Key Operation. This field shall reflect the Key Operation field of the request. |
| 3 | Param2 | 1 | Tag. This field shall reflect the Tag number in the KEY_UPDATE request. |

KEY_UPDATE operations

| Value | Operation | Description |
|---|---|---|
| 0 | Reserved | Reserved |
| 1 | UpdateKey | Update the single-direction key. |
| 2 | UpdateAllKeys | Update keys for both directions. |
| 3 | VerifyNewKey | Ensure the key update is successful and the old keys can be safely discarded. |
| 4 | UpdateExportMaster | Update the Export Master Secret. |
| 5-255 | Reserved | Reserved |

*FIG. 185*

| Bit | Description |
|---|---|
| ePH2[TBD] | 1'b1 : Next session key will be used after the next ePH0.<br>1'b0 : Current session key will be used. |

FIG. 195

| Field | Bits | Value |
|---|---|---|
| KeyUpdateReq | 1 | 1'b1 : Session key update is necessary.<br>1'b0 : Session key update is unnecessary. |
| KeySwitchTiming | 1 | 1'b1 : Next session key will be used after the next frame start.<br>1'b0 : Current session key will be used until the next frame end. |

FIG. 205

| Field | Bits | Value |
|---|---|---|
| EvenOddKey | 1 | 1'b1 : Current session key is an odd key.<br>1'b0 : Current session key is an even key. |

| Field | Bits | Value |
|---|---|---|
| EvenOddKey | 1 | 1'b1 : Next session key is an odd key.<br>1'b0 : Next session key is an even key. |

| Bit | Description |
|---|---|
| ePH2[TBD] | 1'b1 : Current session key is an odd key.<br>1'b0 : Current session key is an even key. |

| Bit | Description |
|---|---|
| ePH2[TBD] | 1'b1 : Next session key is an odd key.<br>1'b0 : Next session key is an even key. |

INFORMATION PROCESSING DEVICE, MOBILE DEVICE, AND COMMUNICATION SYSTEM FOR SESSION KEY UPDATE

CROSS REFERENCE TO RELATED APPLICATIONS

This application is a U.S. National Phase of International Patent Application No. PCT/JP2021/042005 filed on Nov. 16, 2021, which claims priority benefit of Japanese Patent Application No. JP 2020-198251 filed in the Japan Patent Office on Nov. 30, 2020. Each of the above-referenced applications is hereby incorporated herein by reference in its entirety.

TECHNICAL FIELD

The present disclosure relates to an information processing device, a mobile device, and a communication system, and more particularly, to an information processing device, a mobile device, and a communication system capable of updating a session key.

BACKGROUND ART

Currently, in the Camera Serial Interface (CSI)-2 ver 4.0 in which standardization is in progress, two types of structures including a packet structure using the C-PHY for a physical layer and a packet structure using the D-PHY for a physical layer are defined.

Furthermore, in recent years, the CSI-2 standard has not been used only for mobile devices, but has been widely used for various applications such as in-vehicle and Internet of Things (IoT). As a result, it is assumed that existing packet structures cannot support these applications. Therefore, in the Mobile Industry Processor Interface (MIPI) Alliance, in order to support various applications, an extended packet obtained by extending a packet structure such as an existing packet header or packet footer is under consideration.

Meanwhile, in the Security Protocol and Data Model (SPDM) standard disclosed in Non Patent Document 1, a key schedule is published.

CITATION LIST

Non Patent Document

Non Patent Document 1: "Security Protocol and Data Model (SPDM) Specification", DSP0274, Version: 1.1.0, DMTF, 2020-07-15

SUMMARY OF THE INVENTION

Problems to be Solved by the Invention

However, when this SPDM is applied to the CSI-2 standard or the Display Serial Interface (DSI)-2 standard of the MIPI, the Export Master Secret does not support the key update function, and in a case where a session key derived from the Export Master Secret is applied, the session key cannot be updated. On the other hand, for example, in a case where a session key transmitted or received via communication protected by the SPDM is applied, it has been necessary to define update of a session key.

The present disclosure has been made in view of such circumstances, and enables a session key to be updated.

Solutions to Problems

According to an aspect of the present technology, there is provided an information processing device including a protection unit that protects first communication and second communication faster than the first communication, in which the first communication includes transmission or reception of a command to control the second communication or a response to the command, the protection unit derives a first secret from a key schedule by using the first communication, derives a first session key related to the first secret, and uses the first session key for encryption or message authentication of the first communication, the protection unit receives a second session key by using the first communication protected by the first session key, or derives or generates a second session key and transmits the second session key by using the first communication protected by the first session key, or derives a second secret from the key schedule to derive a second session key related to the second secret, and uses the second session key for encryption or message authentication of the second communication, the protection unit receives a third session key by using the first communication protected by the first session key, or derives or generates a third session key and transmits the third session key by using the first communication protected by the first session key, or derives a third session key related to the second secret in addition to the second session key, and the third session key is started to be used instead of the second session key.

According to an aspect of the present technology, there is provided a mobile device including a protection unit that protects first communication and second communication faster than the first communication, in which the first communication includes transmission or reception of a command to control the second communication or a response to the command, the protection unit derives a first secret from a key schedule by using the first communication, derives a first session key related to the first secret, and uses the first session key for encryption or message authentication of the first communication, the protection unit receives a second session key by using the first communication protected by the first session key, or derives or generates a second session key and transmits the second session key by using the first communication protected by the first session key, or derives a second secret from the key schedule to derive a second session key related to the second secret, and uses the second session key for encryption or message authentication of the second communication, the protection unit receives a third session key by using the first communication protected by the first session key, or derives or generates a third session key and transmits the third session key by using the first communication protected by the first session key, or derives a third session key related to the second secret in addition to the second session key, and the third session key is started to be used instead of the second session key.

According to an aspect of the present technology, there is provided a communication system including a protection unit that protects first communication and second communication faster than the first communication, in which the first communication includes transmission or reception of a command to control the second communication or a response to the command, the protection unit derives a first secret from a key schedule by using the first communication, derives a first session key related to the first secret, and uses the first session key for encryption or message authentication of the first communication, the protection unit receives a second session key by using the first communication protected by the first session key, or derives or generates a second session key and transmits the second session key by using the first communication protected by the first session key, or derives a second secret from the key schedule to derive a second session key related to the second secret, and uses the second session key for encryption or message authentication of the second communication, the protection unit receives a third session key by using the first communication protected by the first session key, or derives or generates a third session key and transmits the third session key by using the first communication protected by the first session key, or derives a third session key related to the second secret in addition to the second session key, and the third session key is started to be used instead of the second session key.

In an aspect of the present technology, a first secret is derived from a key schedule by using first communication including transmission or reception of a command to control second communication faster than the first communication or a response to the command, a first session key related to the first secret is derived, the first session key is used for encryption or message authentication of the first communication, a second session key is received by using the first communication protected by the first session key, or a derived or generated second session key is transmitted by using the first communication protected by the first session key, or a second secret is derived from the key schedule and a second session key related to the second secret is derived, the second session key is used for encryption or message authentication of the second communication, a third session key is received by using the first communication protected by the first session key, or a derived or generated third session key is transmitted by using the first communication protected by the first session key, or a third session key related to the second secret is derived in addition to the second session key, and the third session key is started to be used instead of the second session key.

BRIEF DESCRIPTION OF DRAWINGS

FIG. 1 is a block diagram illustrating a configuration example of a first embodiment of a communication system to which the present technology is applied.

4

Figure 13:
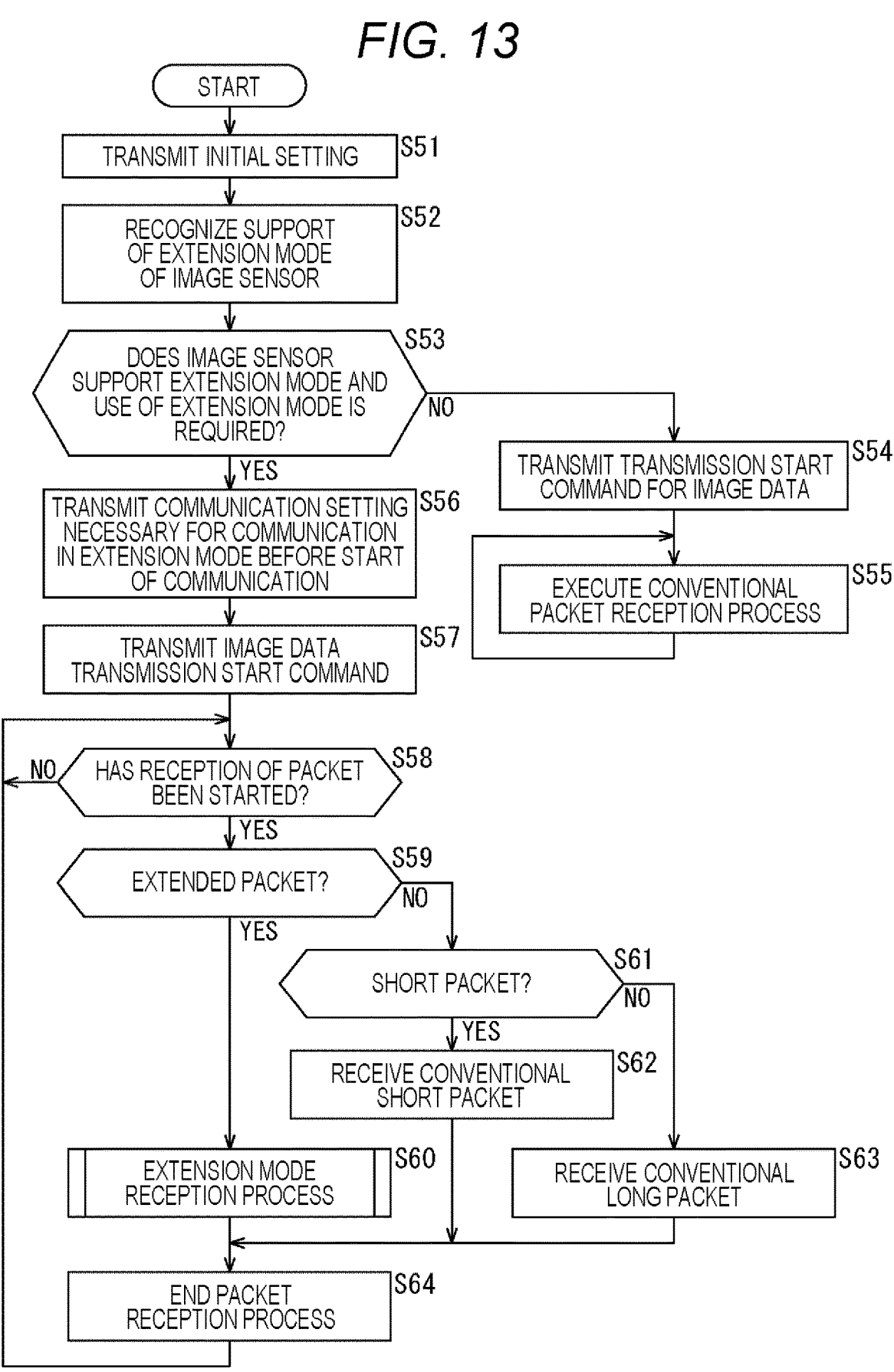

FIG. 13 is a flowchart for describing a process in which an application processor receives a packet.

Figure 14:
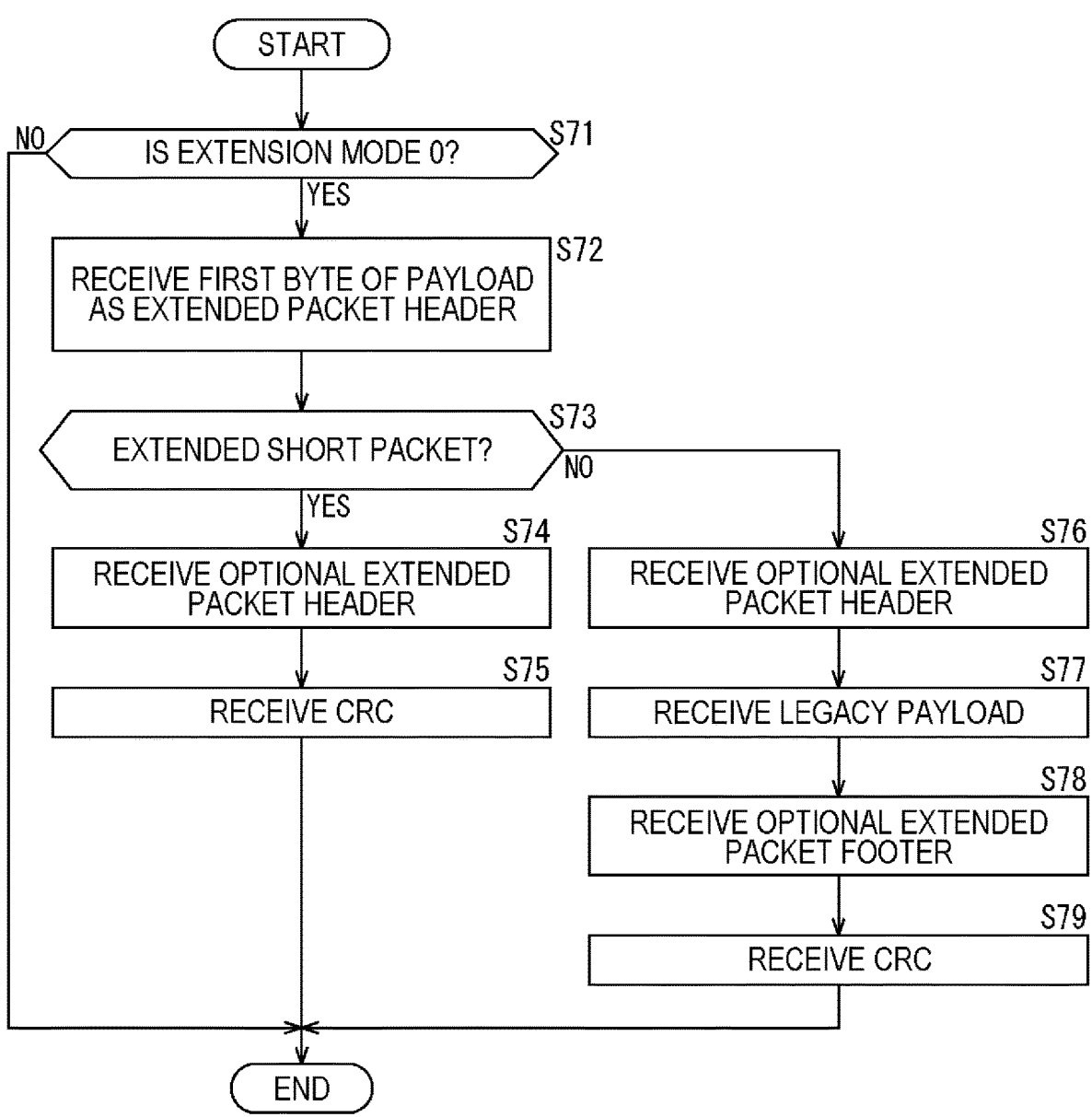

FIG. 14 is a flowchart for describing an extension mode reception process.

Figure 15:
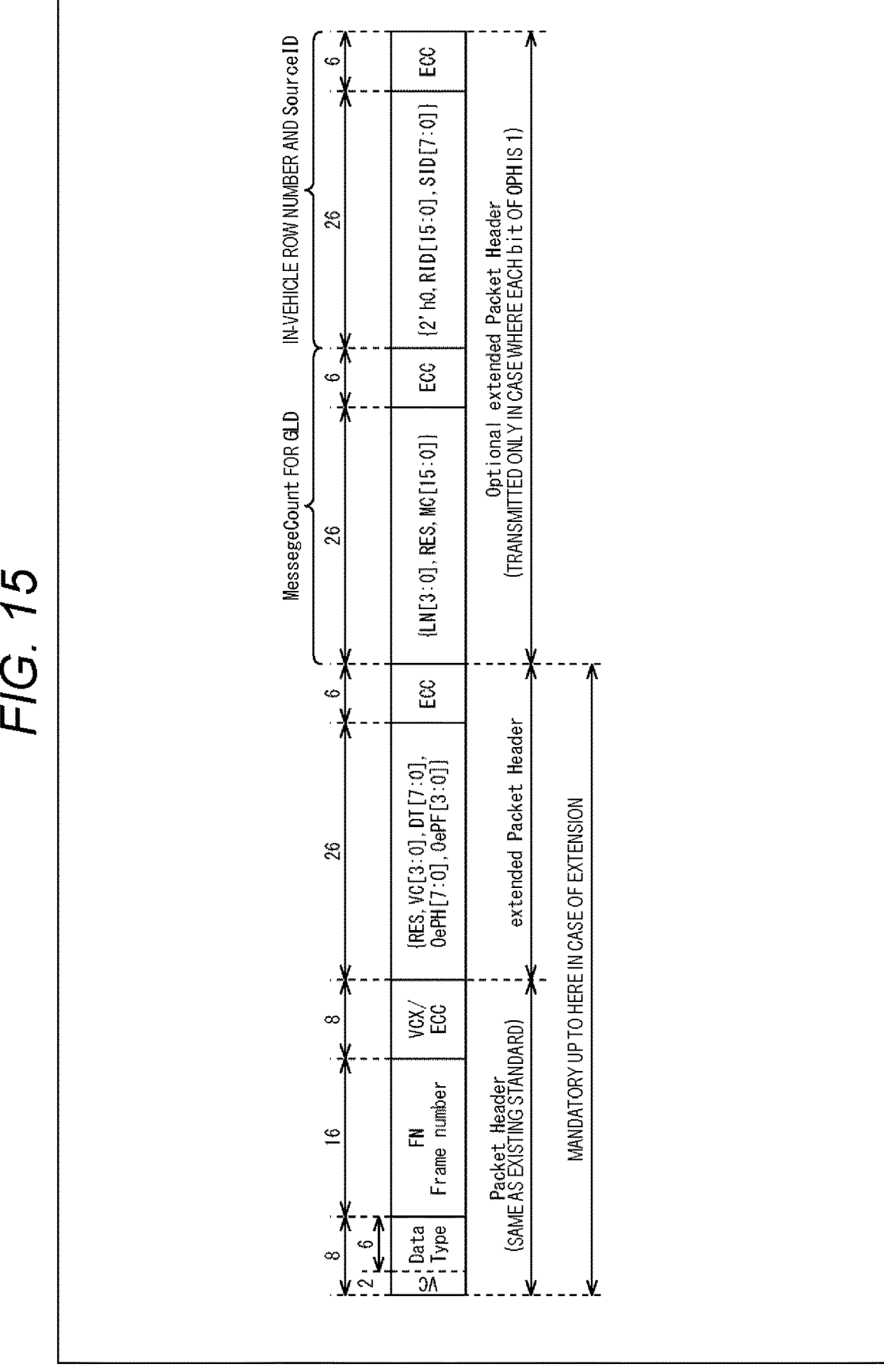

FIG. 15 is a diagram illustrating a second structure example of the overall packet structure of a D-PHY extended packet.

Figure 16:
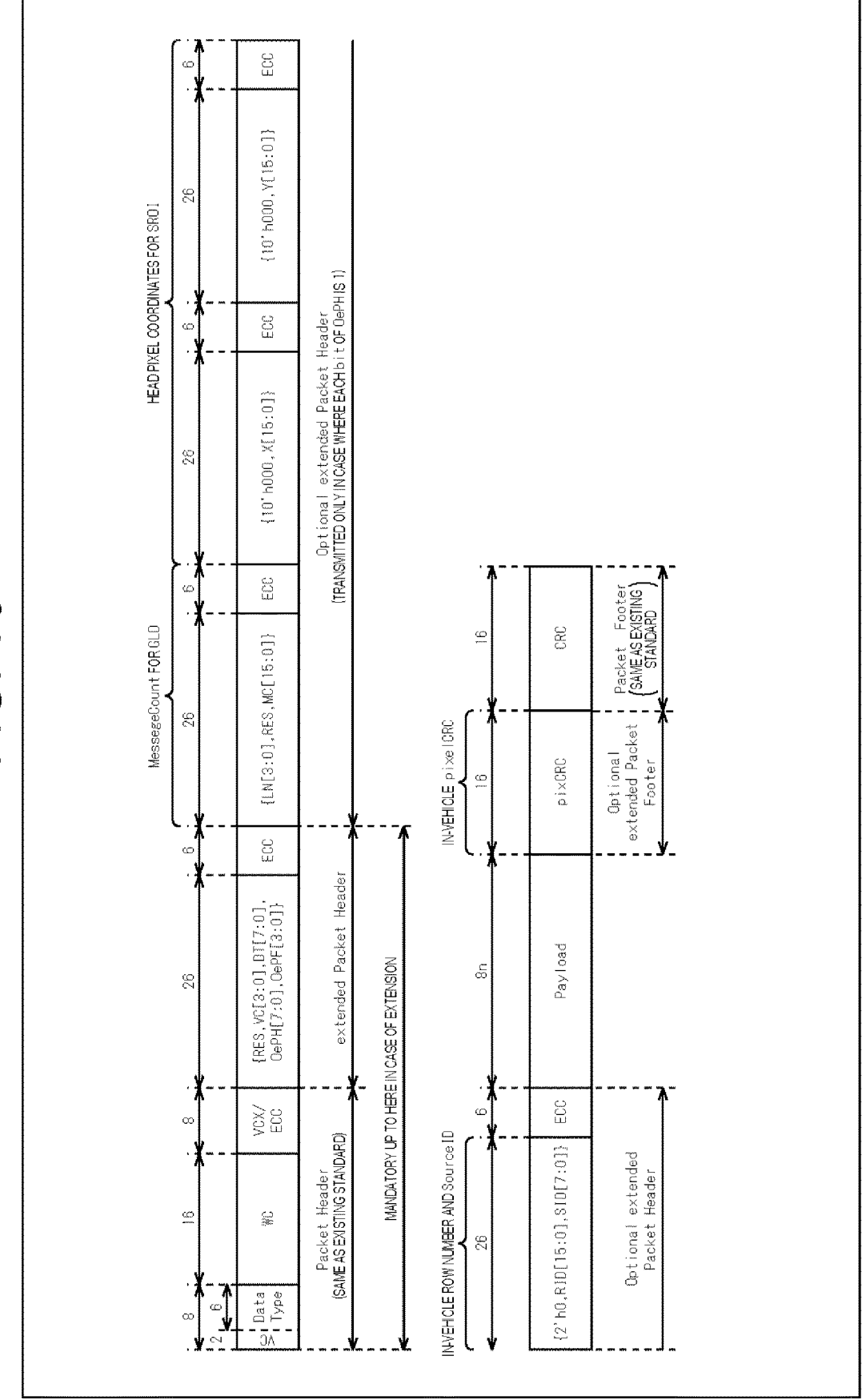

FIG. 16 is a diagram illustrating a second structure example of a packet structure of a D-PHY extended long packet.

Figure 17:
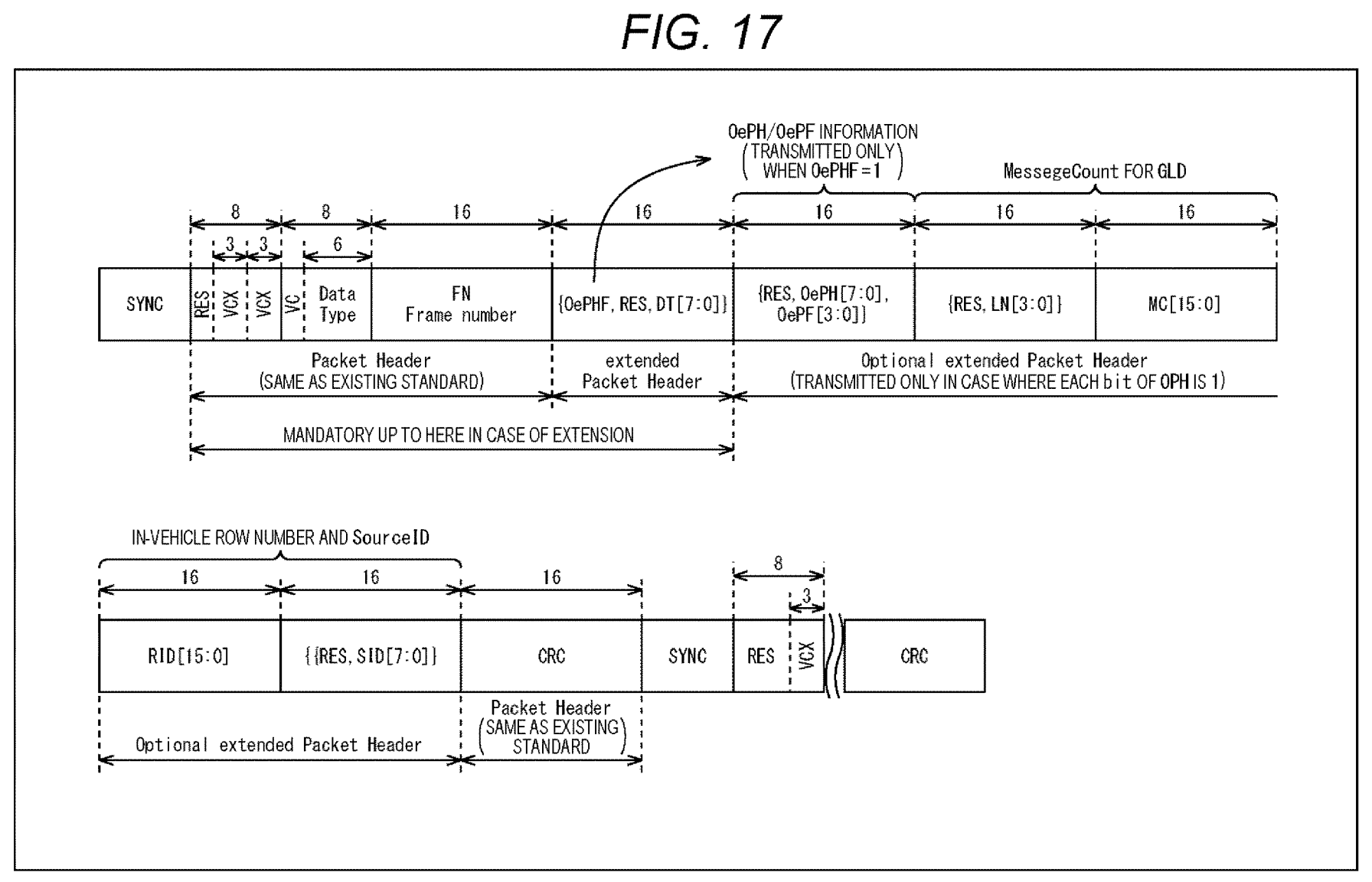

FIG. 17 is a diagram illustrating a second structure example of a packet structure of a C-PHY extended short packet.

Figure 18:
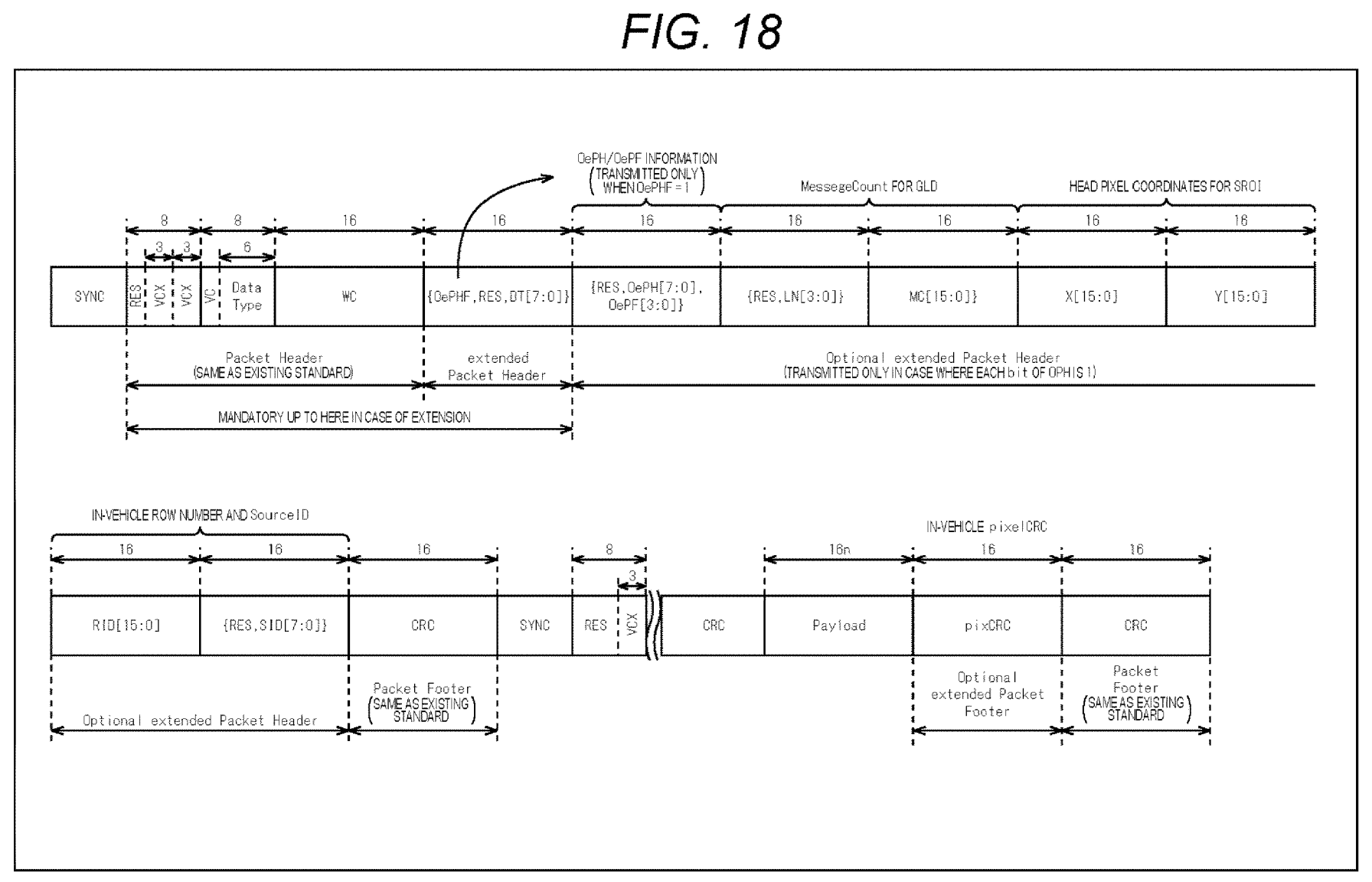

FIG. 18 is a diagram illustrating a second structure example of a packet structure of a C-PHY extended long packet.

Figure 19A:
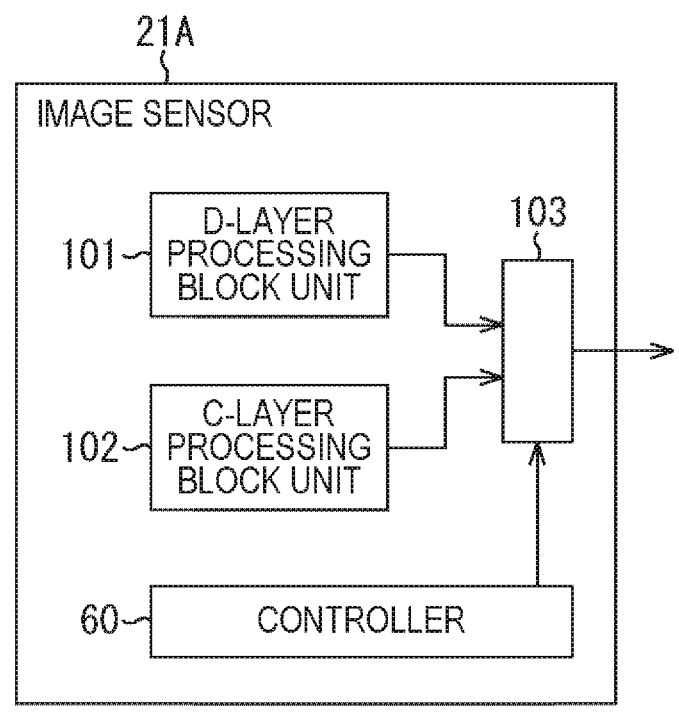
Figure 19B:
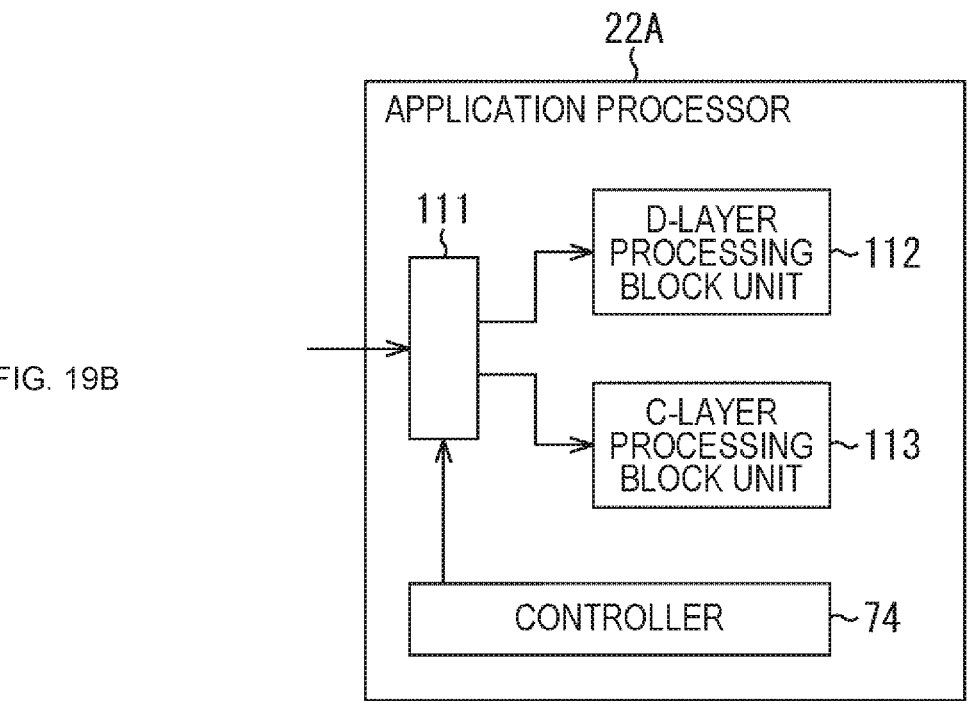

FIGS. 19A and 19B are block diagrams illustrating a modification example of a configuration for switching between the D-PHY and the C-PHY.

Figure 20:
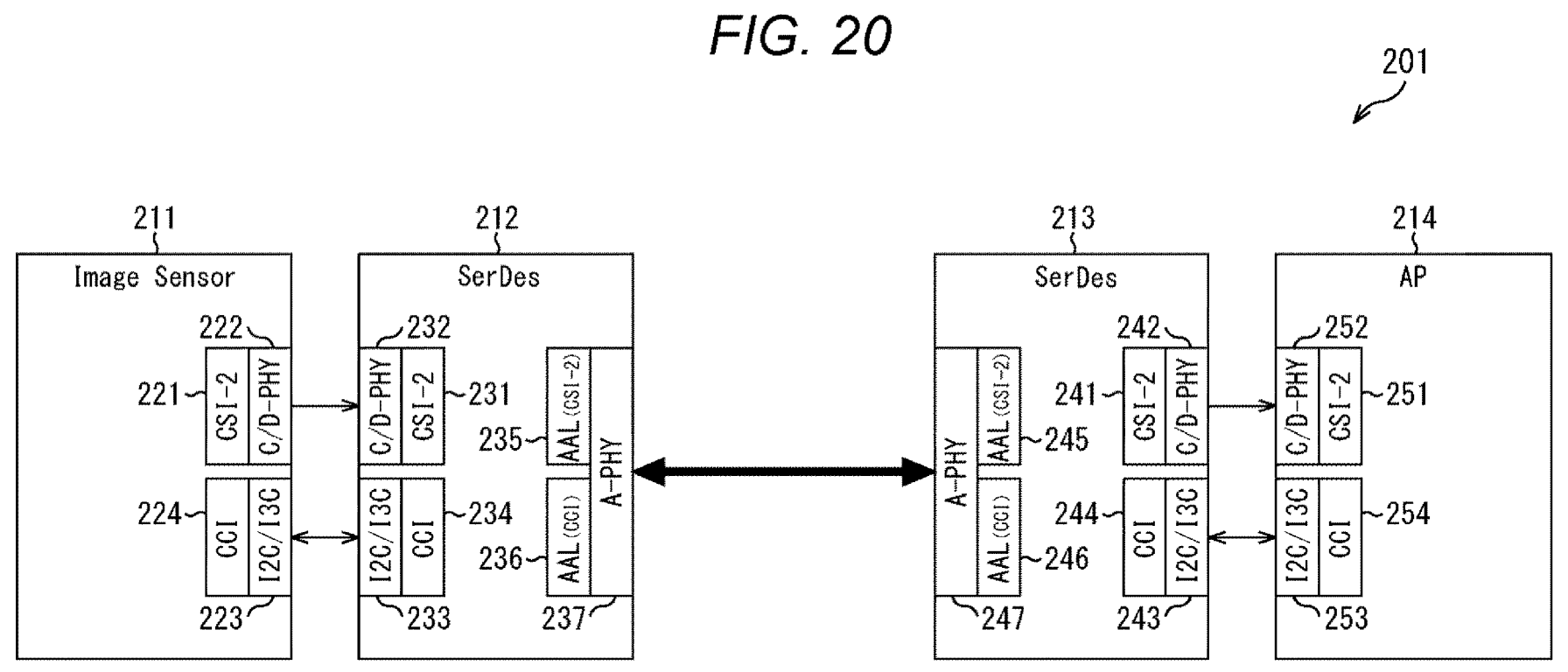

FIG. 20 is a block diagram illustrating a configuration example of a third embodiment of a communication system to which the present technology is applied.

Figure 21:
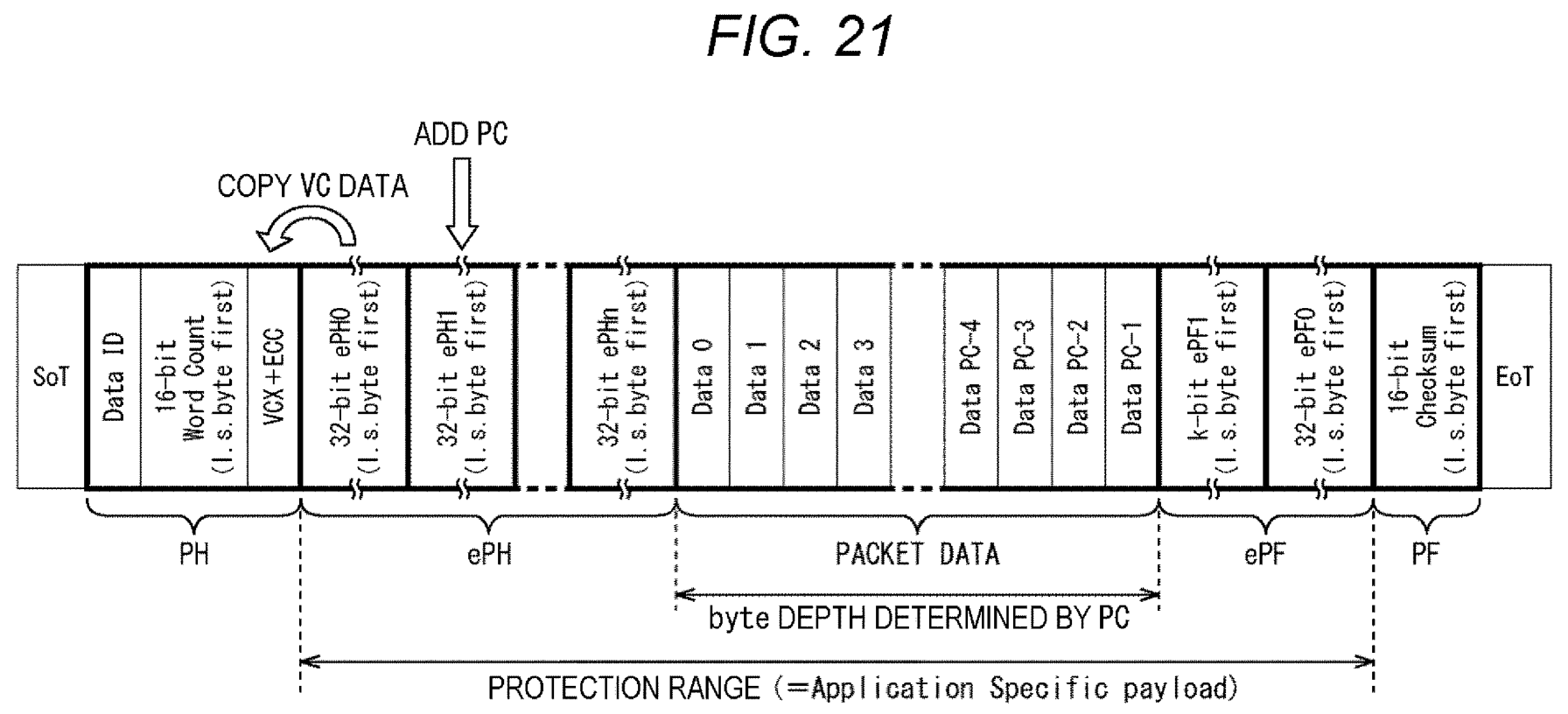

FIG. 21 is a diagram illustrating a structure example of a D-PHY extended packet corresponding to the definition of packet modification prohibition.

Figure 22:
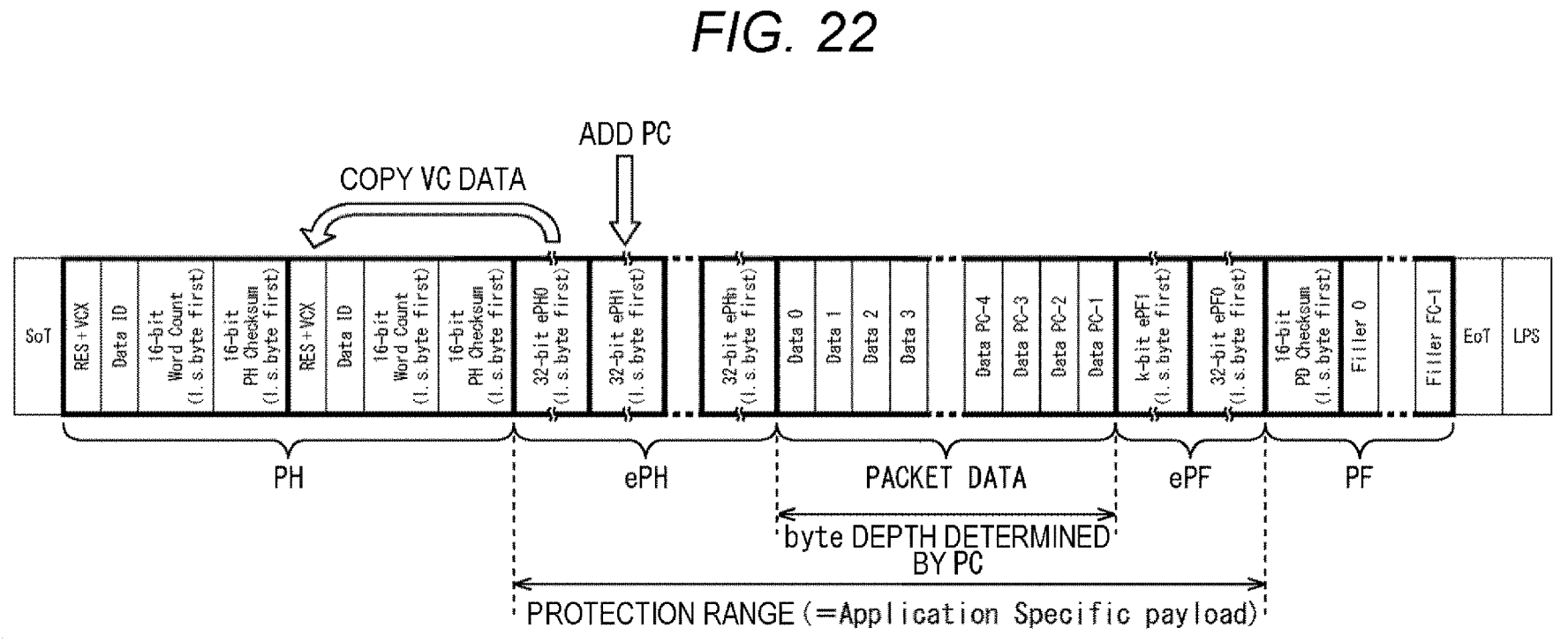

FIG. 22 is a diagram illustrating a structure example of a C-PHY extended packet corresponding to the definition of packet modification prohibition.

Figure 23:
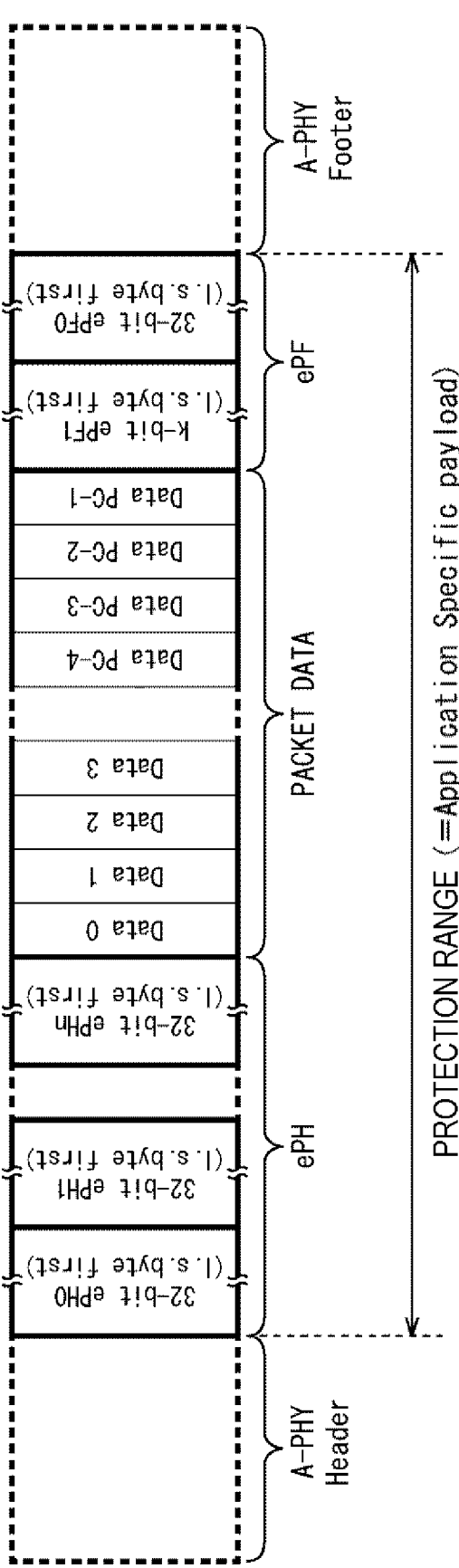

FIG. 23 is a diagram illustrating a structure example of an A-PHY extended packet corresponding to the definition of packet modification prohibition.

FIG. 24 is a flowchart illustrating a packet transmission/reception process adapted to the definition of packet modification prohibition.

Figure 25:
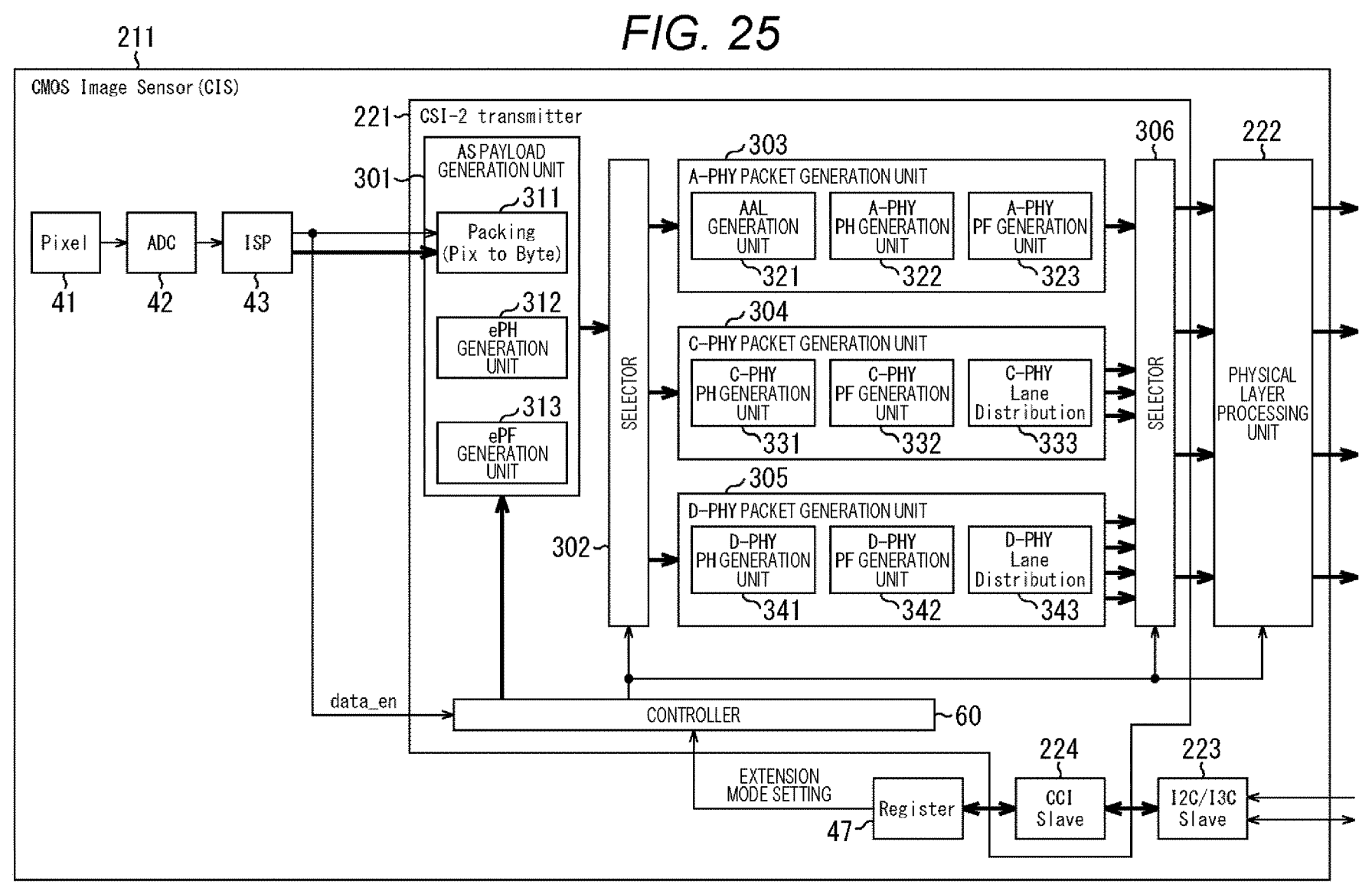

FIG. 25 is a block diagram illustrating a configuration example of an image sensor adapted to the definition of packet modification prohibition.

Figure 26:
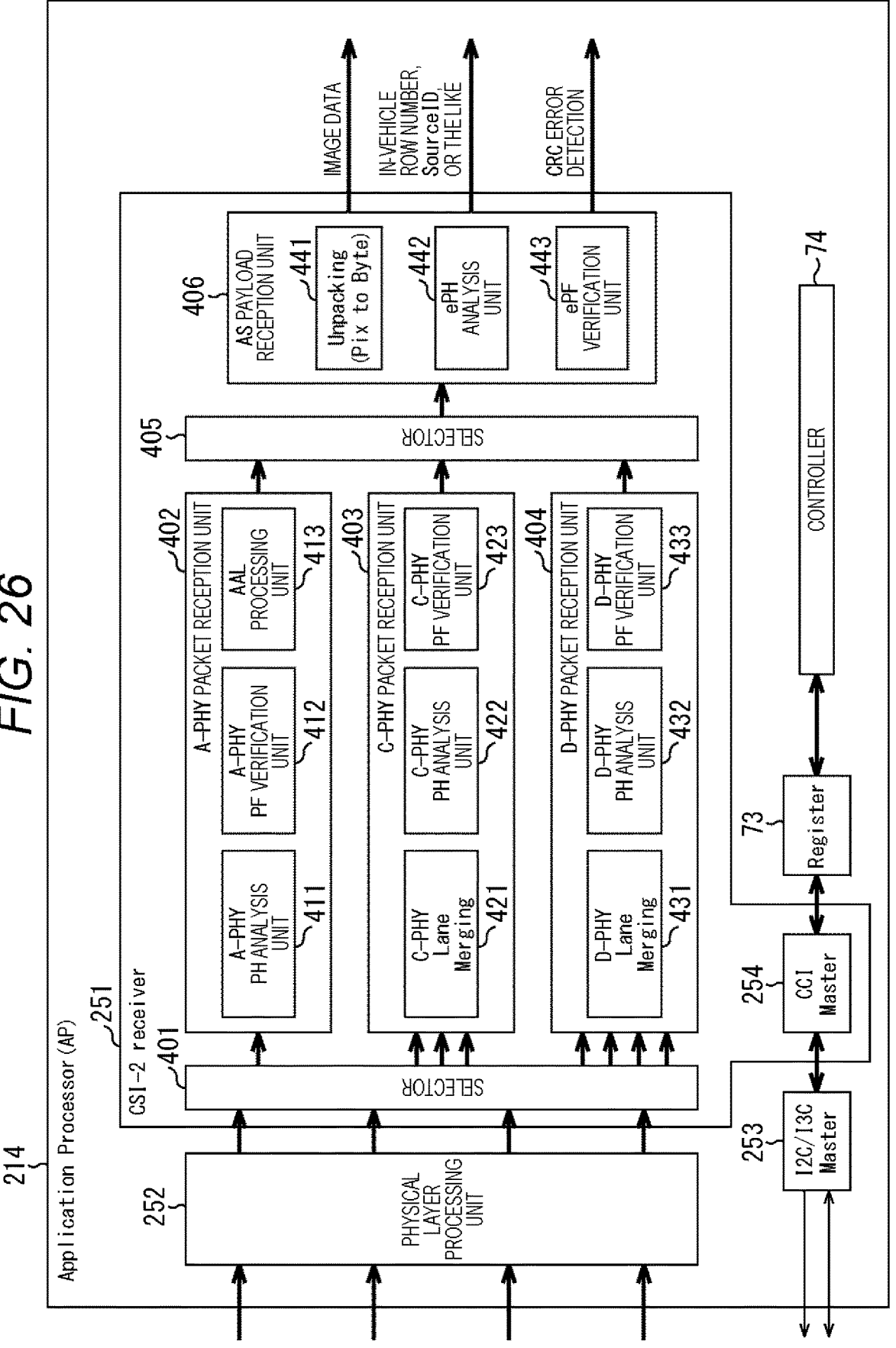

FIG. 26 is a block diagram illustrating a configuration example of an application processor adapted to the definition of packet modification prohibition.

Figure 27:
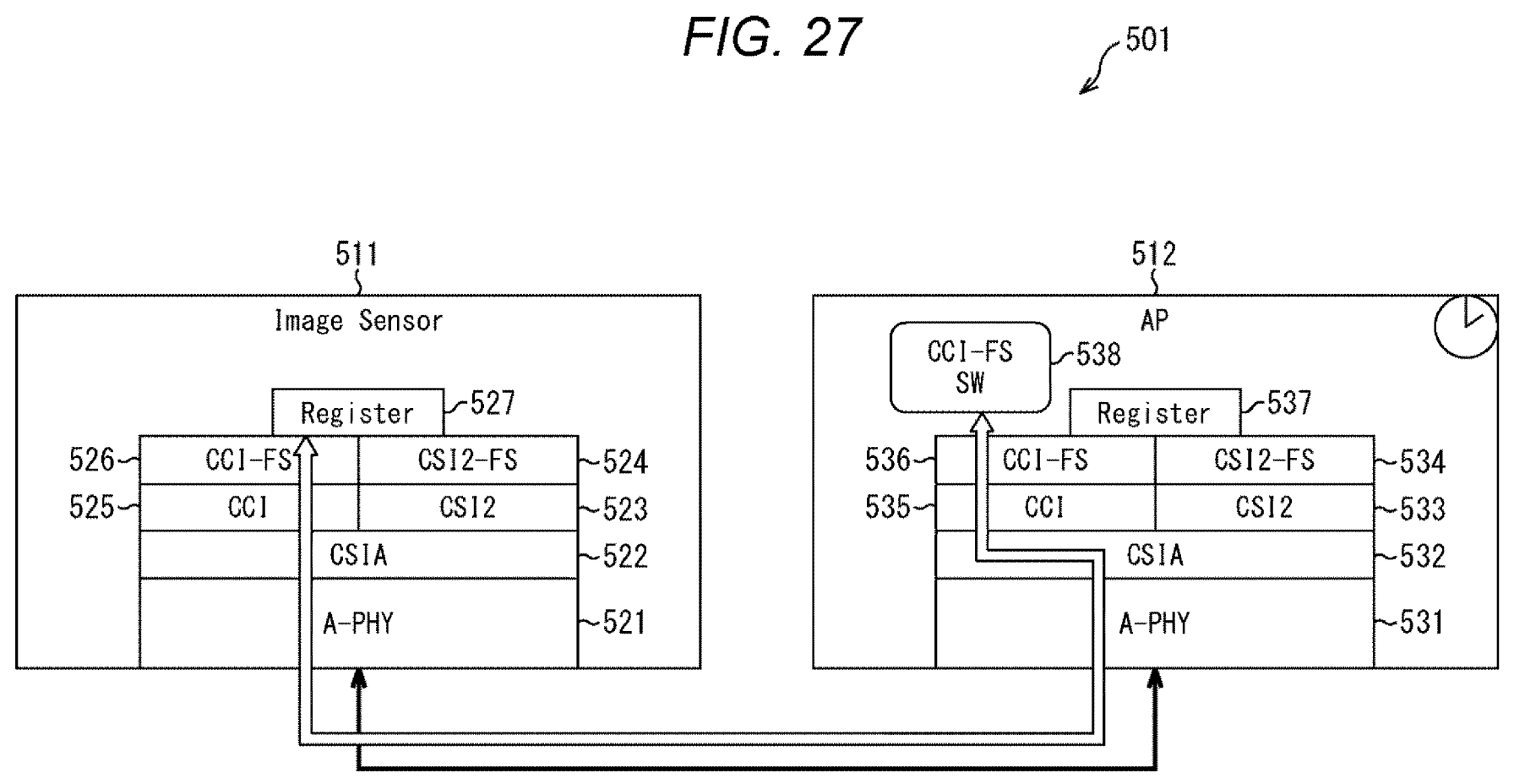

FIG. 27 is a block diagram illustrating a configuration example of a communication system in which the image sensor and the application processor have a direct connection configuration.

Figure 28:
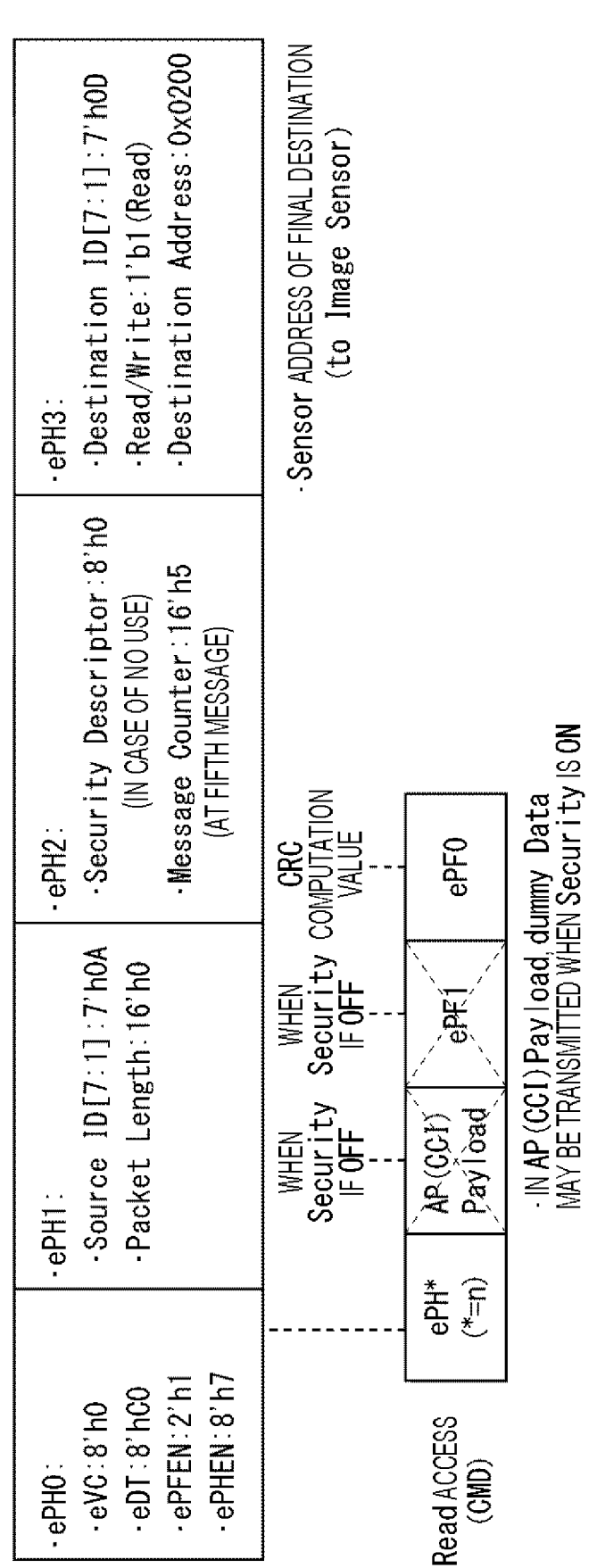

FIG. 28 is a diagram illustrating an example of a packet configuration of a read command generated on the application processor side.

Figure 29:
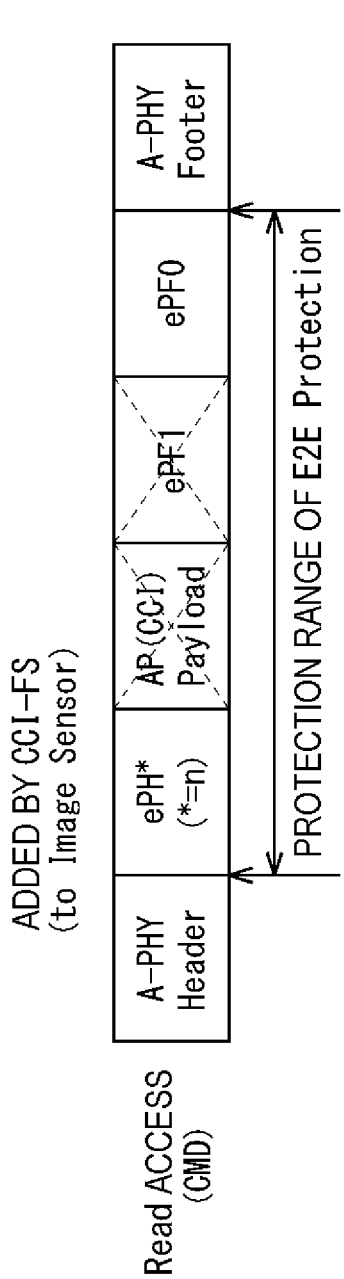

FIG. 29 is a diagram illustrating an example of a packet configuration of a read command to be A-PHY transferred.

Figure 30:
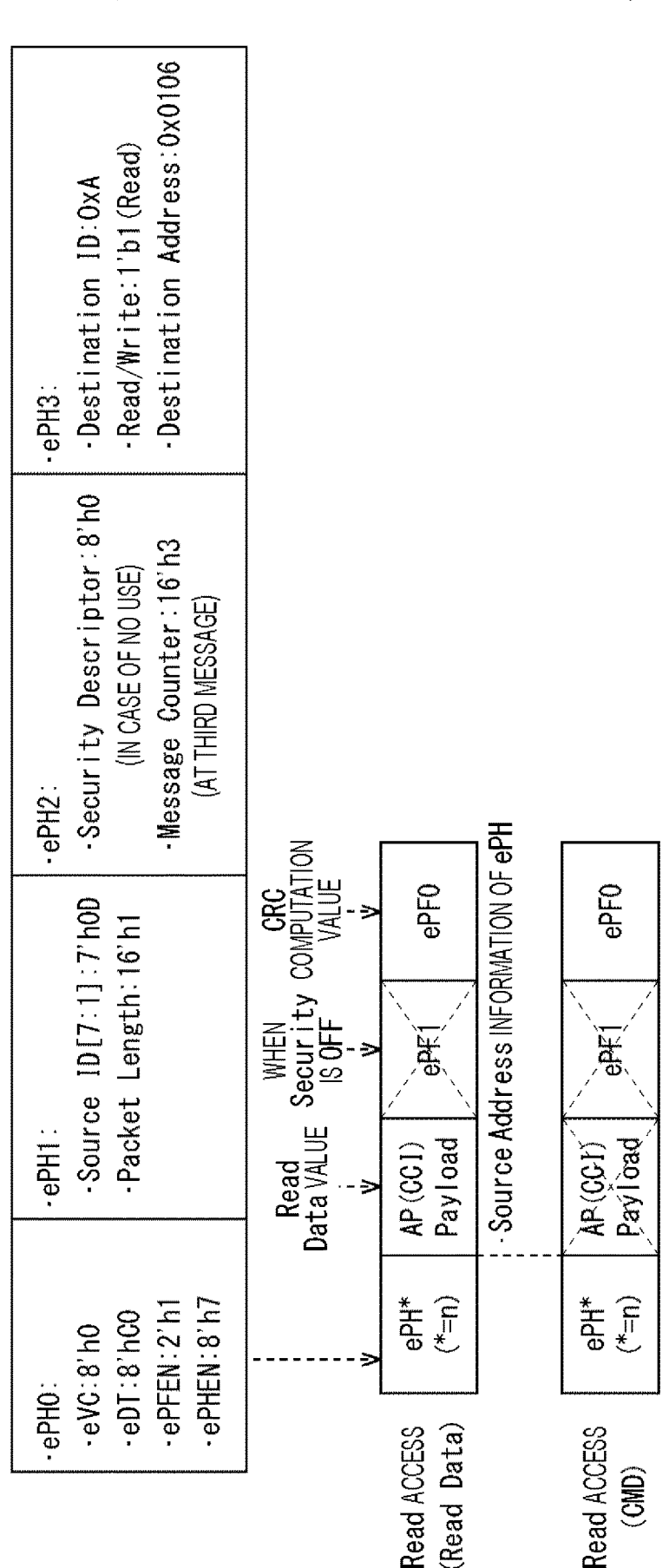

FIG. 30 is a diagram illustrating an example of a packet configuration of a read command and read data on the image sensor side.

Figure 31:
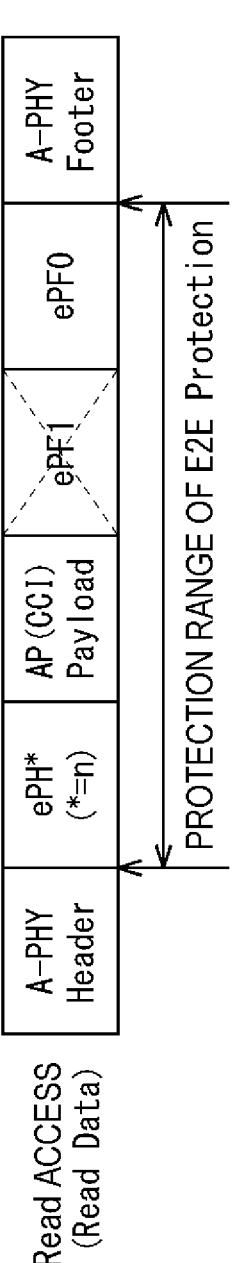

FIG. 31 is a diagram illustrating an example of a packet configuration of read data to be A-PHY transferred.

Figure 32:
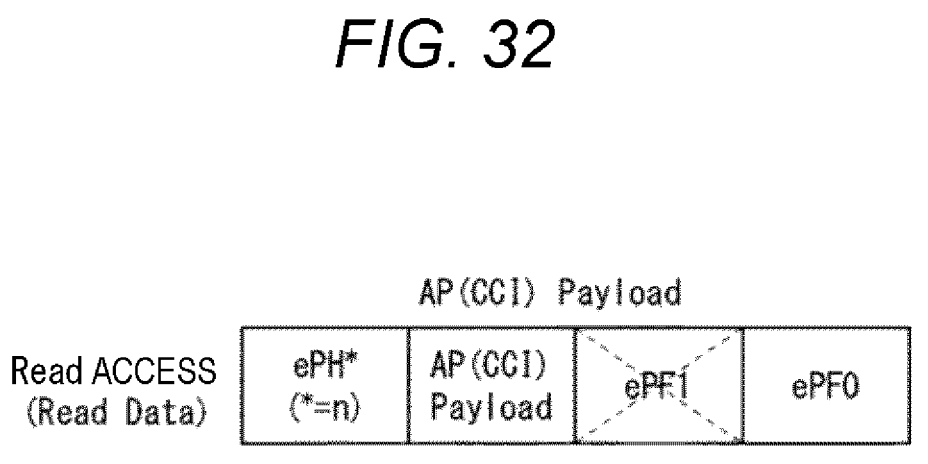

FIG. 32 is a diagram illustrating an example of a packet configuration of read data acquired on the application processor side.

Figure 33:
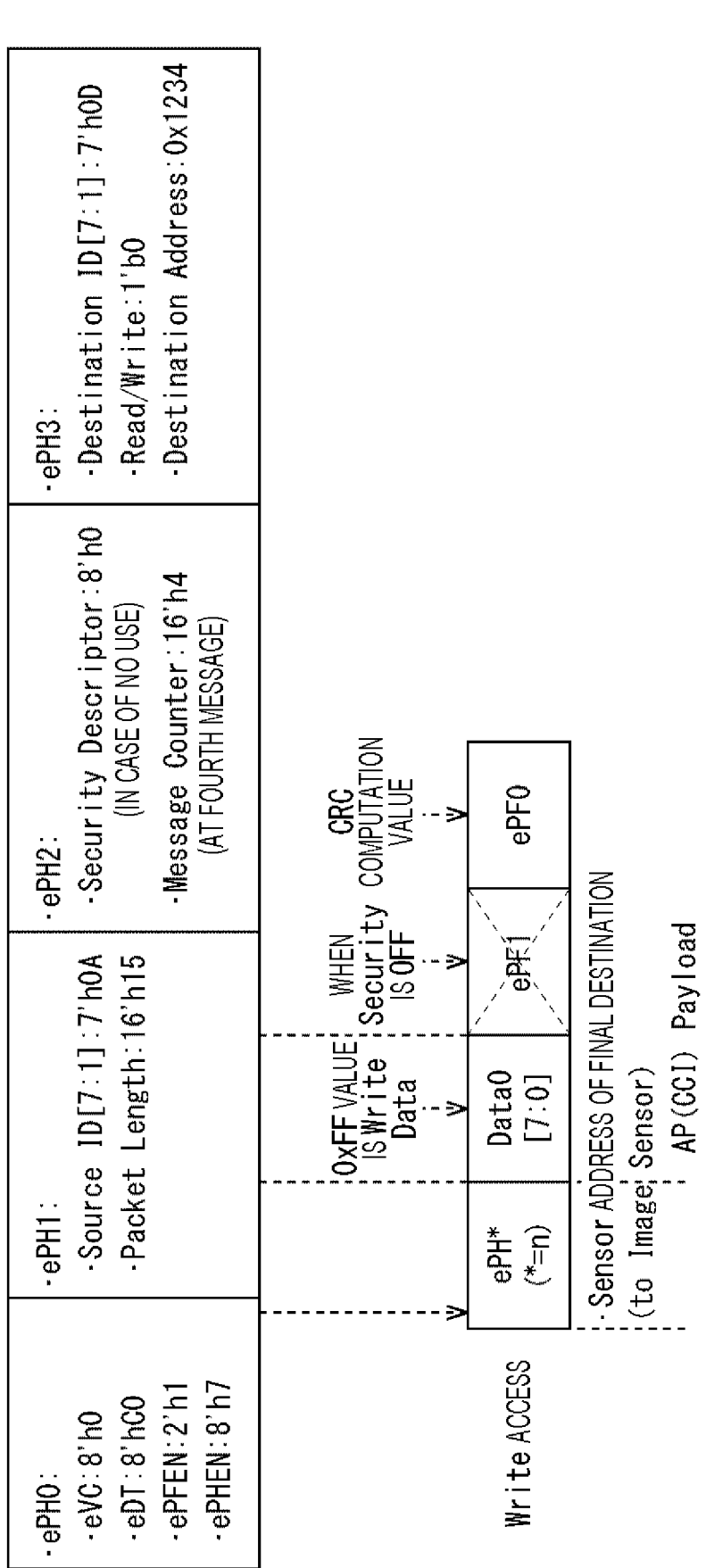

FIG. 33 is a diagram illustrating an example of a packet configuration of write data generated on the application processor side.

Figure 34:
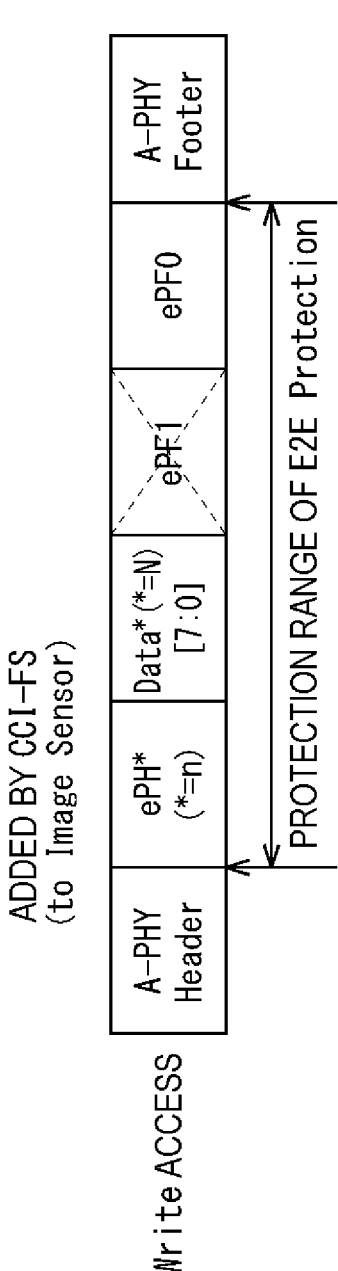

FIG. 34 is a diagram illustrating an example of a packet configuration of write data to be A-PHY transferred.

Figure 35:
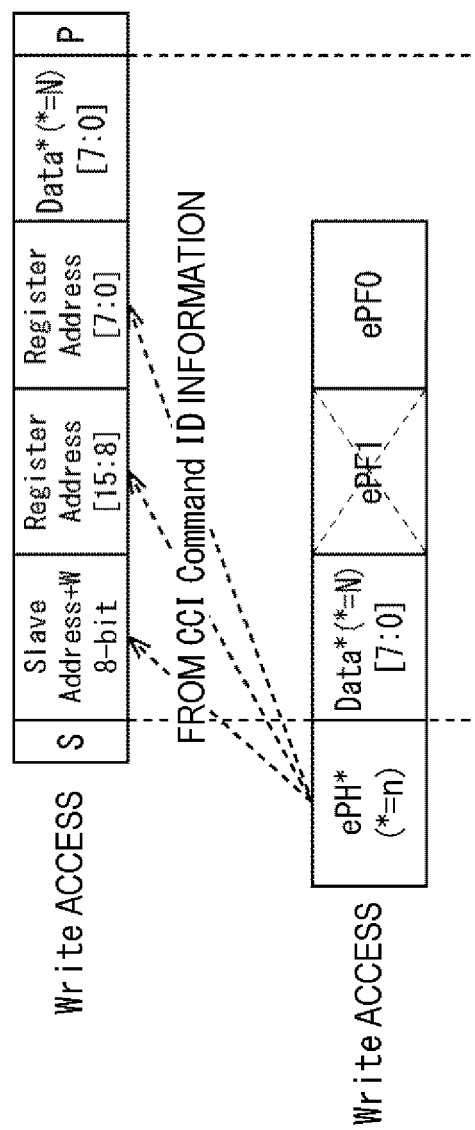

FIG. 35 is a diagram illustrating an example of a packet configuration of write data acquired on the image sensor side.

Figure 36:
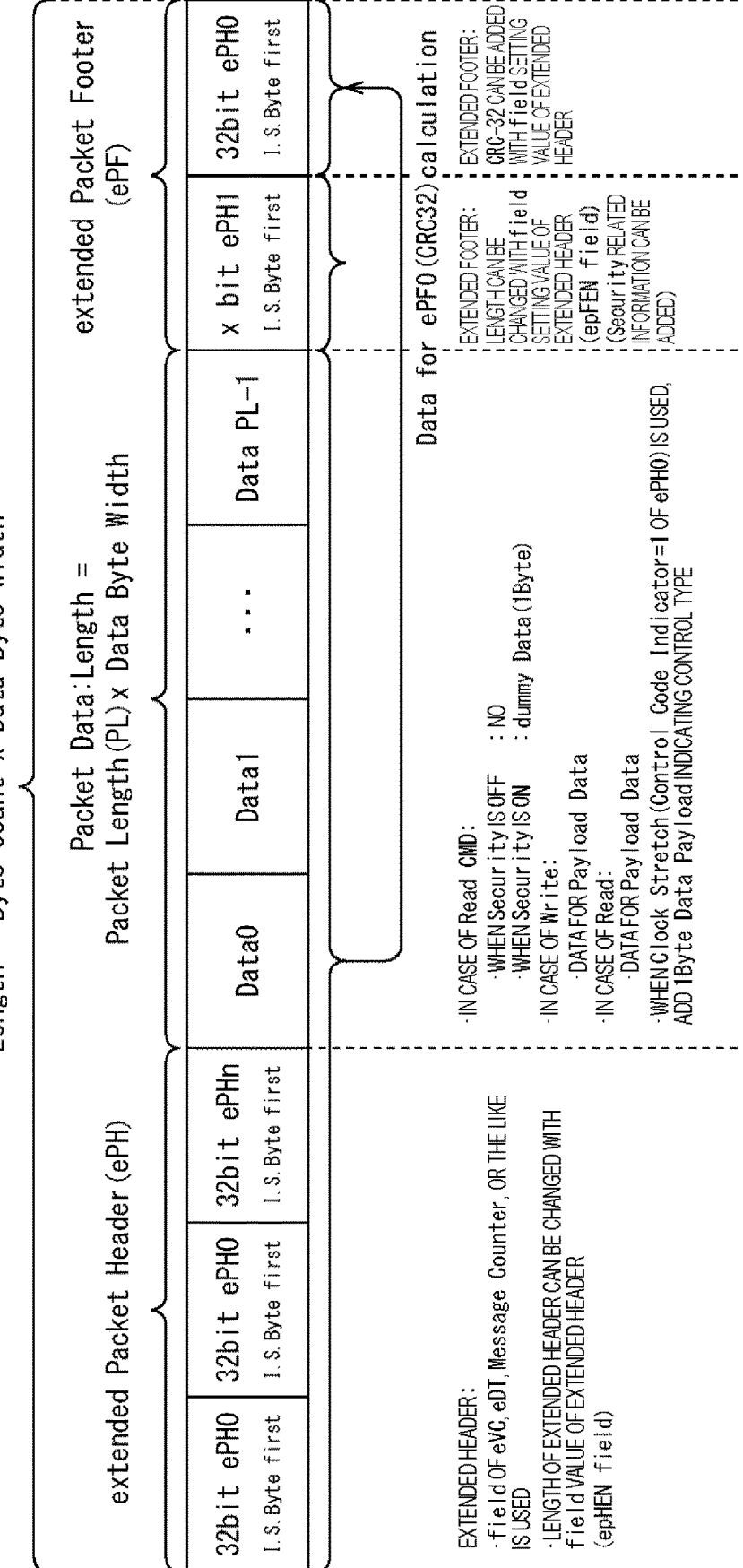

FIG. 36 is a diagram illustrating an outline of an extended packet header ePH and an extended packet footer ePF.

Figure 37:
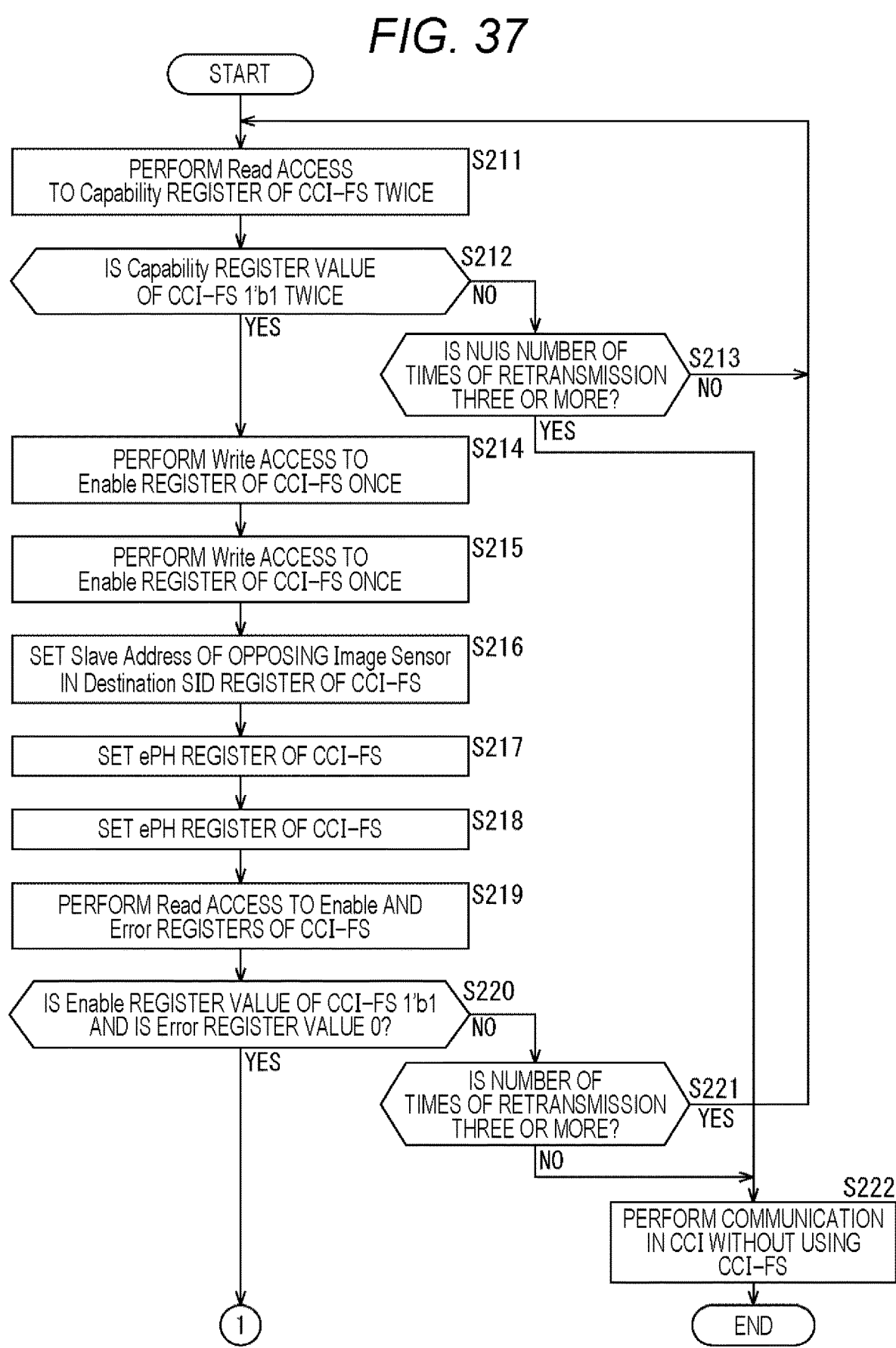

FIG. 37 is a flowchart illustrating initial setting and check operation of communication processing using CCI-FS.

Figure 38:
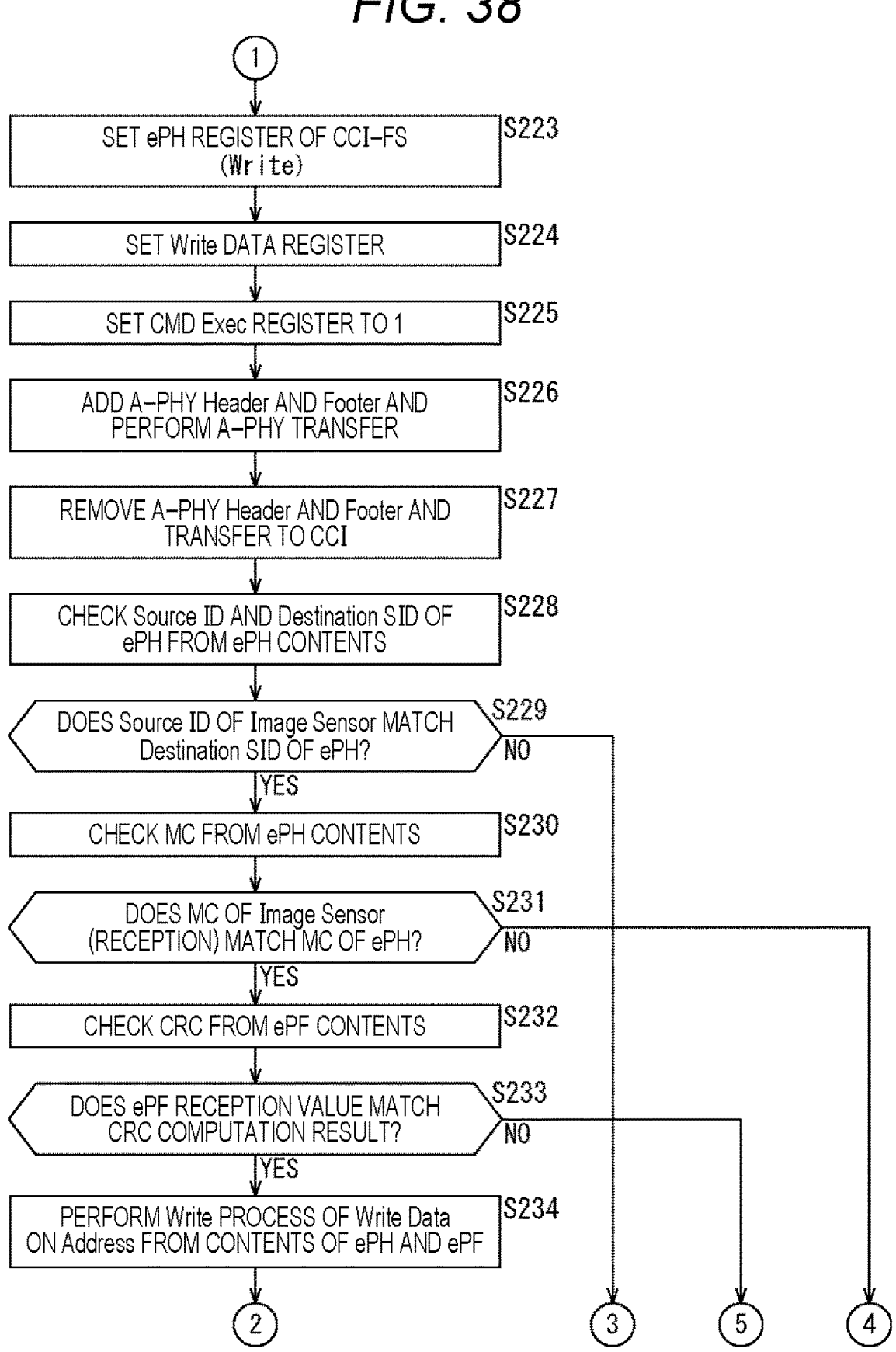

FIG. 38 is a flowchart for describing a write operation using CCI-FS.

Figure 39:
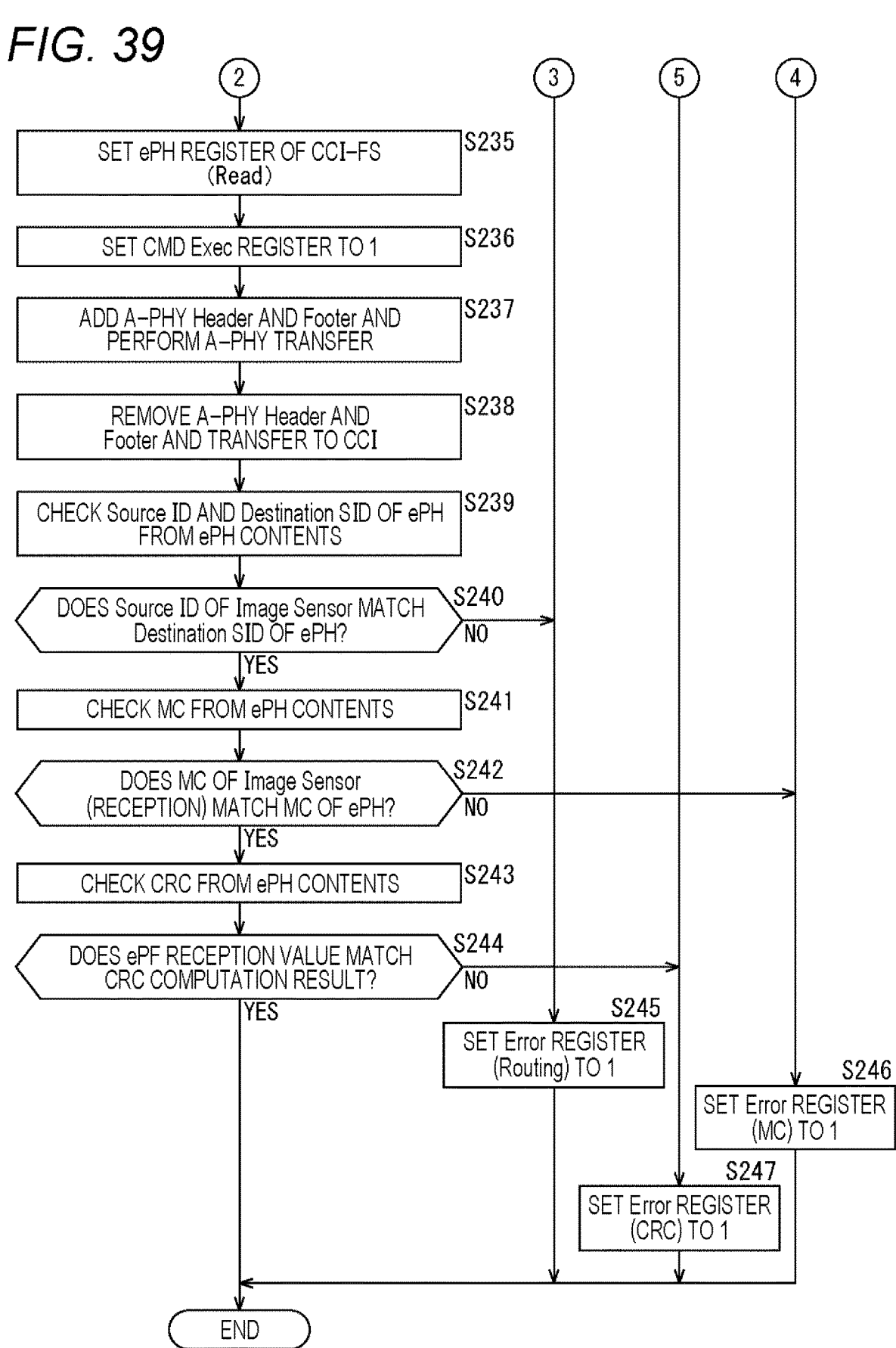

FIG. 39 is a flowchart for describing a read operation using CCI-FS.

Figure 40:
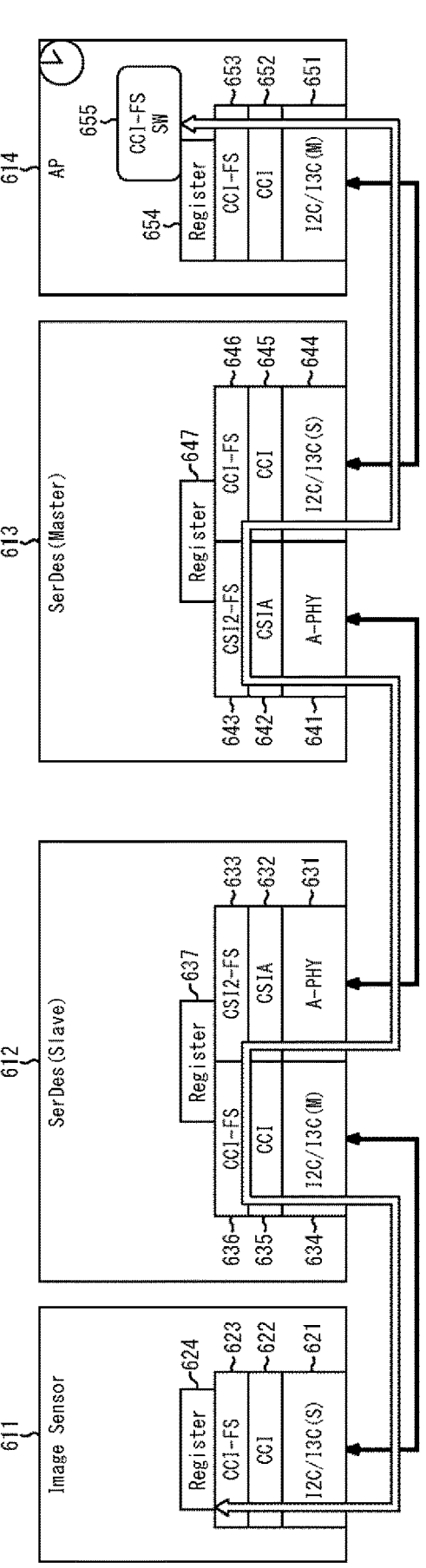

FIG. 40 is a block diagram illustrating a configuration example of a communication system in which an image sensor and an application processor have a SerDes connection configuration.

Figure 41:
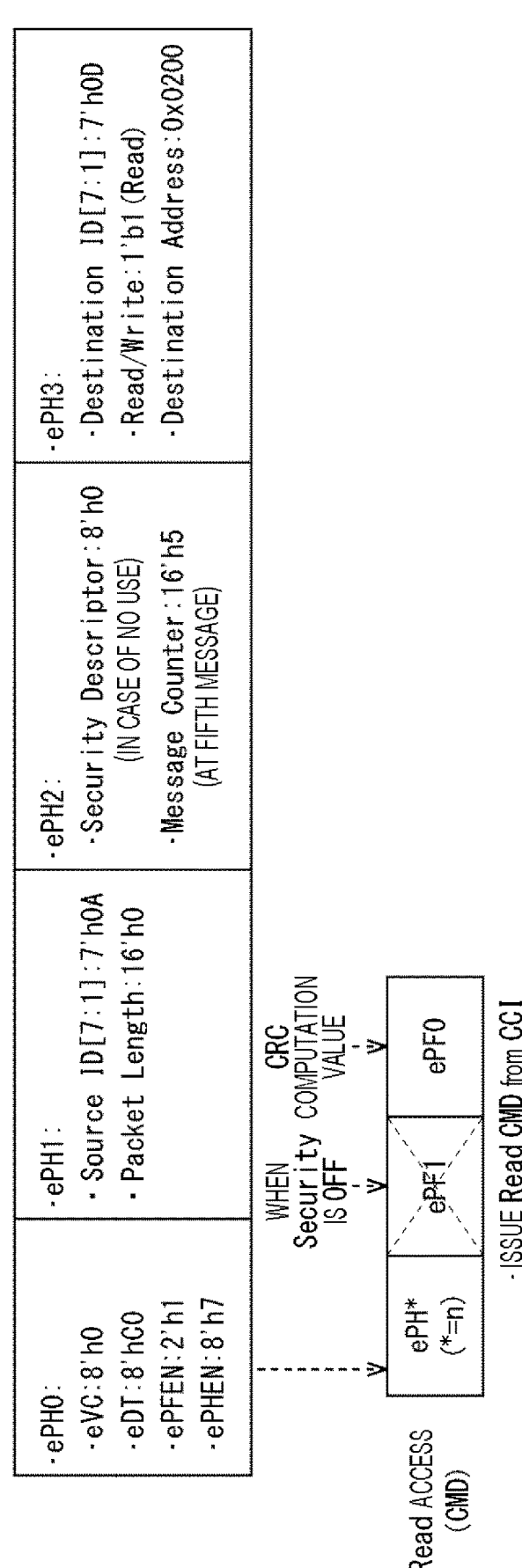

FIG. 41 is a diagram illustrating an example of a packet configuration of a read command generated on the application processor side.

Figure 42:

FIG. 42 is a diagram illustrating an example of a packet configuration of a read command output by I2C/I3C.

Figure 43:
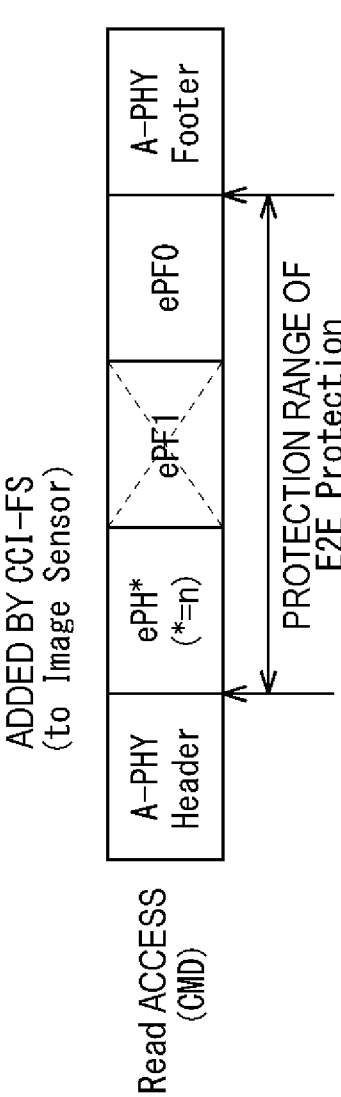

FIG. 43 is a diagram illustrating an example of a packet configuration of a read command to be A-PHY transferred.

Figure 44:
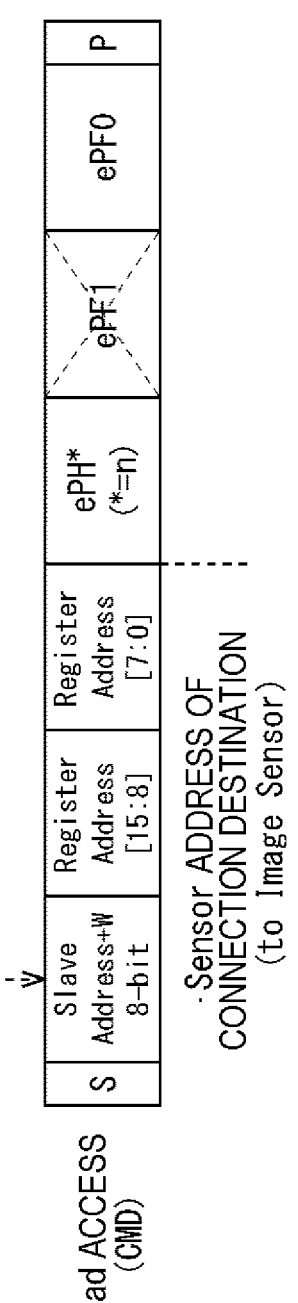

FIG. 44 is a diagram illustrating an example of a packet configuration of read data generated by a SerDes device on the slave side.

Figure 45:
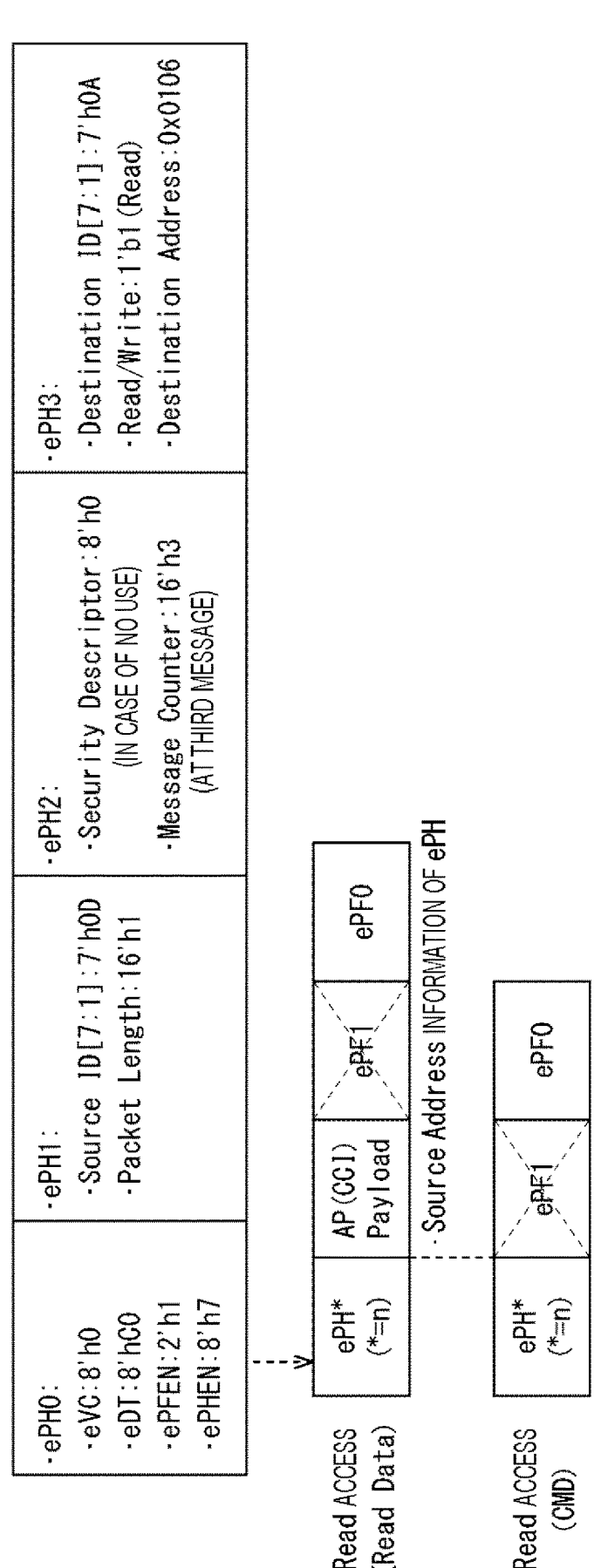

FIG. 45 is a diagram illustrating an example of a packet configuration of a read command and read data on the image sensor side.

Figure 46:
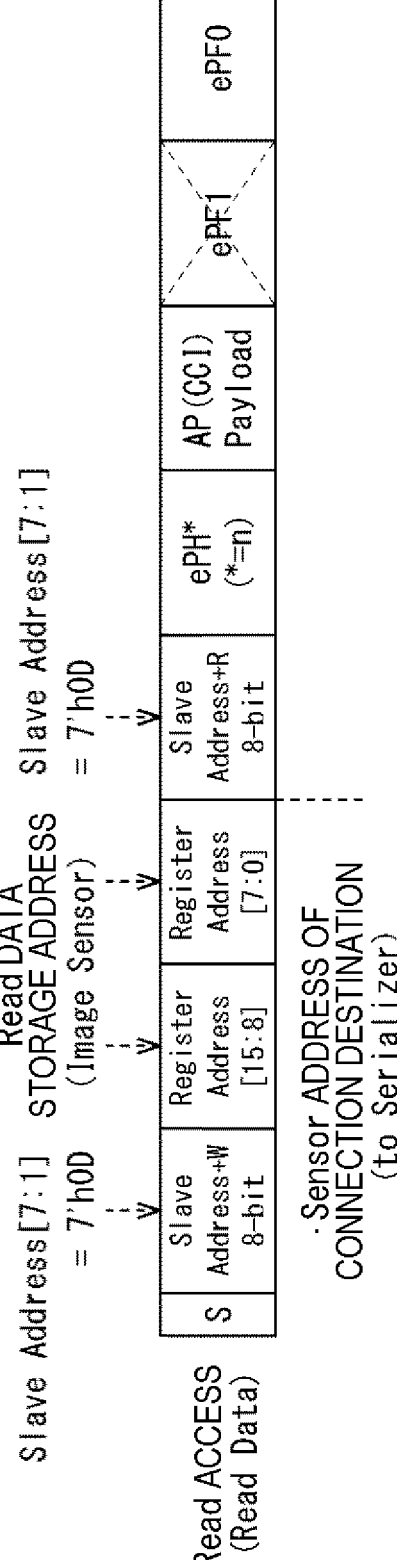

FIG. 46 is a diagram illustrating an example of a packet configuration of read data output by I2C/I3C.

Figure 47:
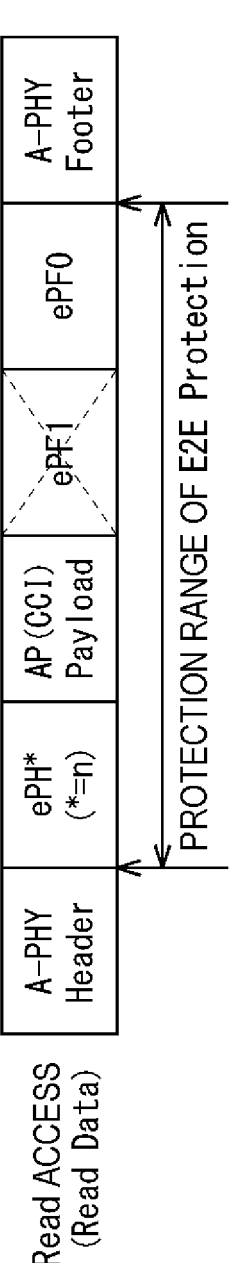

FIG. 47 is a diagram illustrating an example of a packet configuration of read data to be A-PHY transferred.

Figure 48:
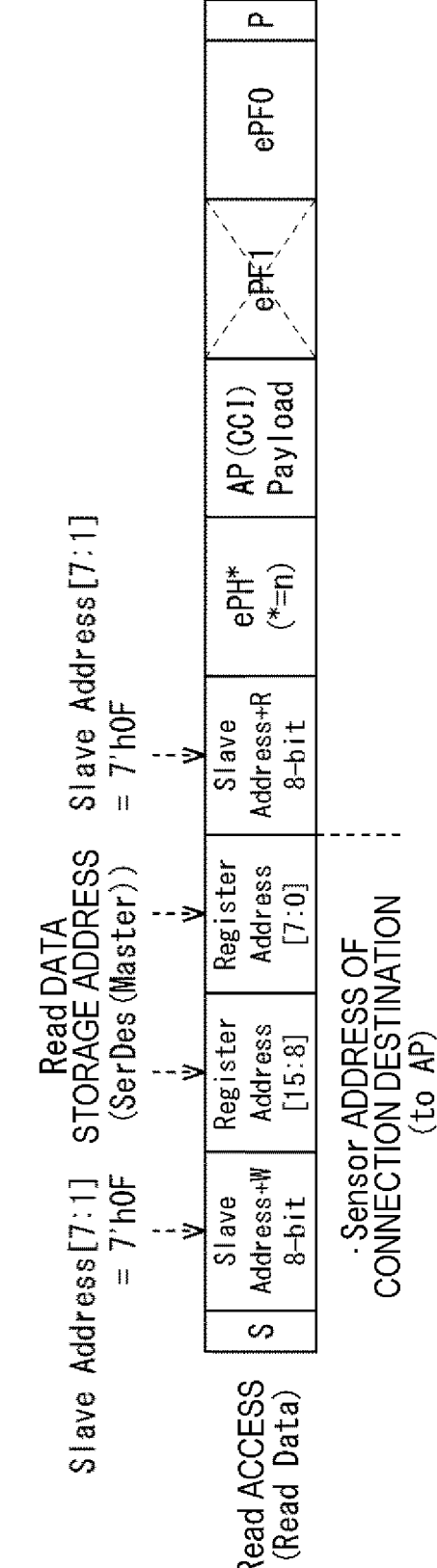

FIG. 48 is a diagram illustrating an example of a packet configuration of read data output by I2C/I3C.

Figure 49:
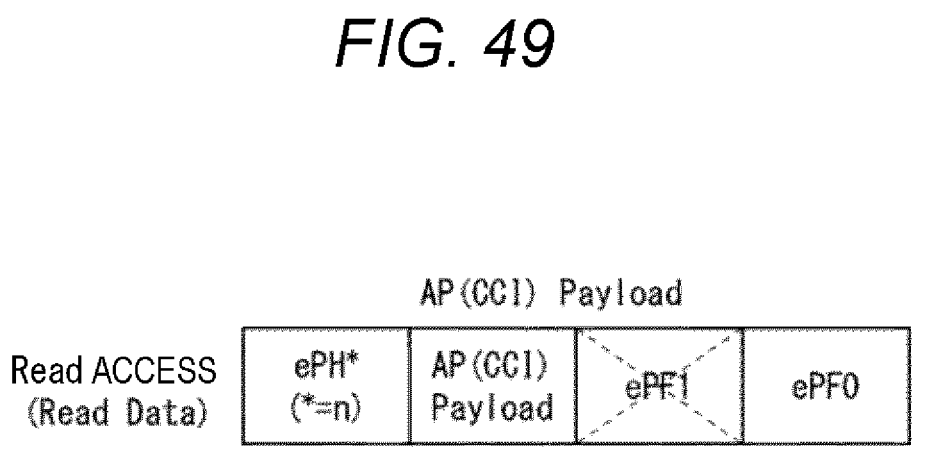

FIG. 49 is a diagram illustrating an example of a packet configuration of read data acquired on the application processor side.

Figure 50:
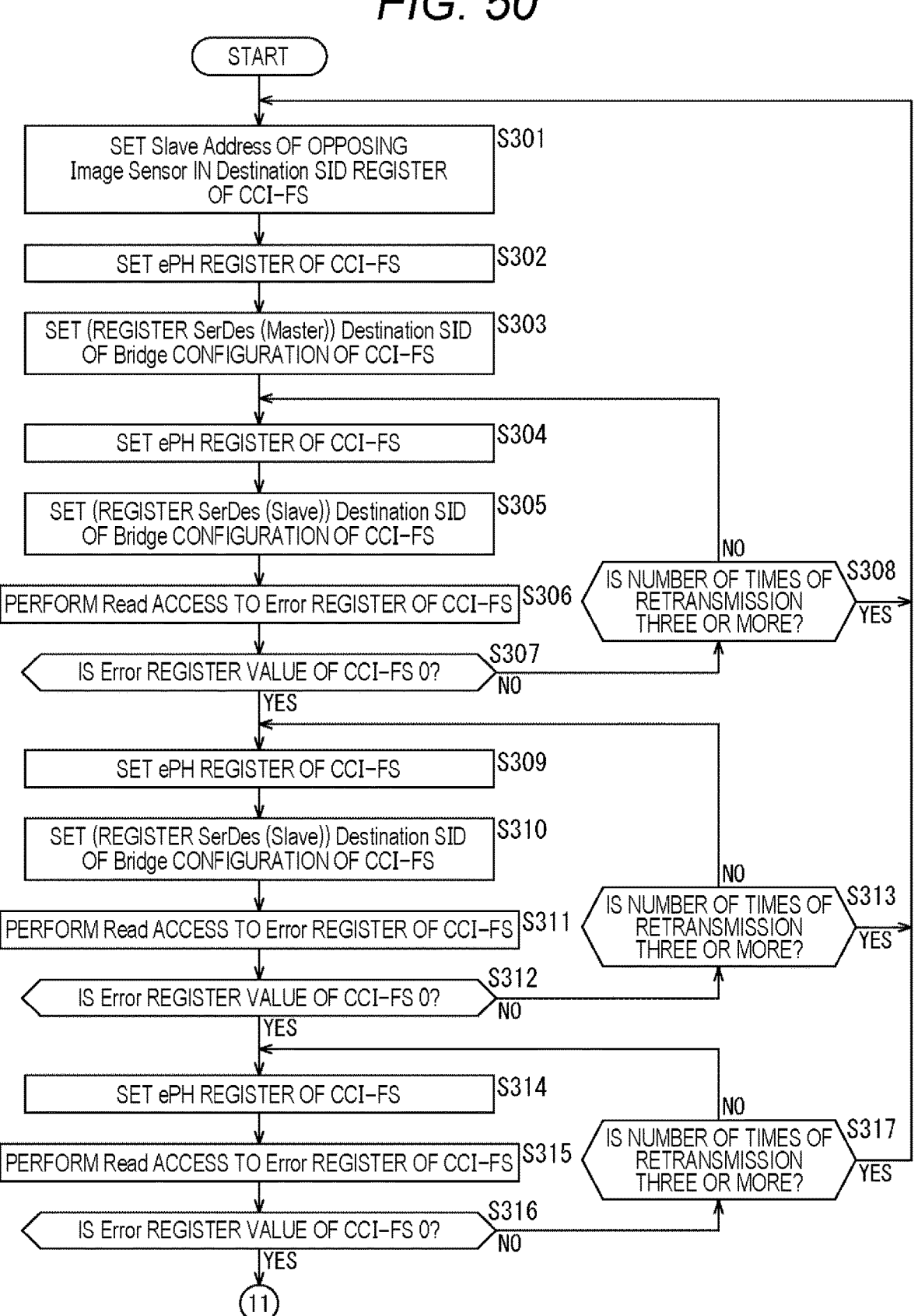

FIG. 50 is a flowchart illustrating initial setting and a check operation of communication processing using CCI-FS.

FIG. 51 is a flowchart for describing a write operation using CCI-FS.

Figure 52:
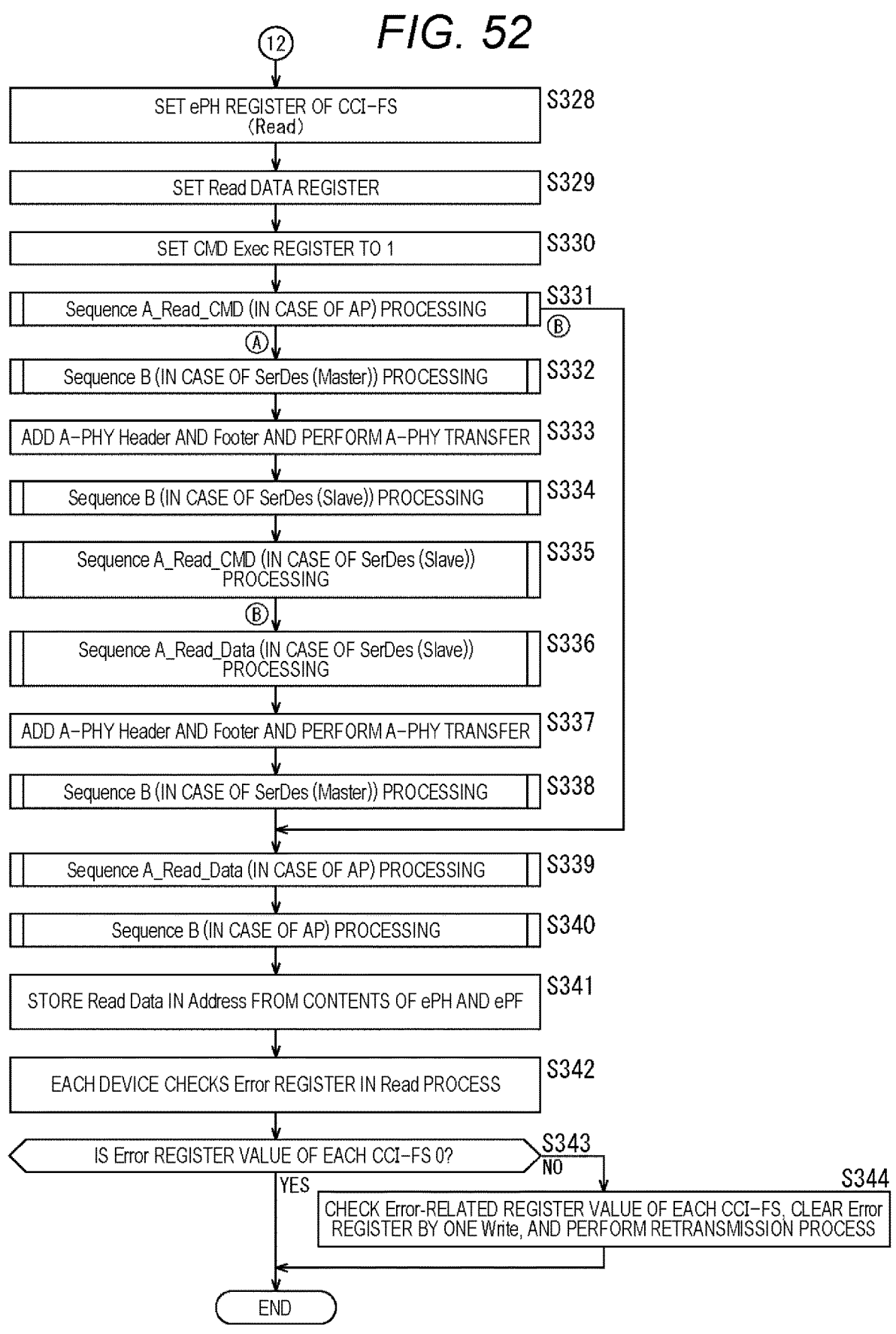

FIG. 52 is a flowchart for describing a read operation using CCI-FS.

Figure 53:
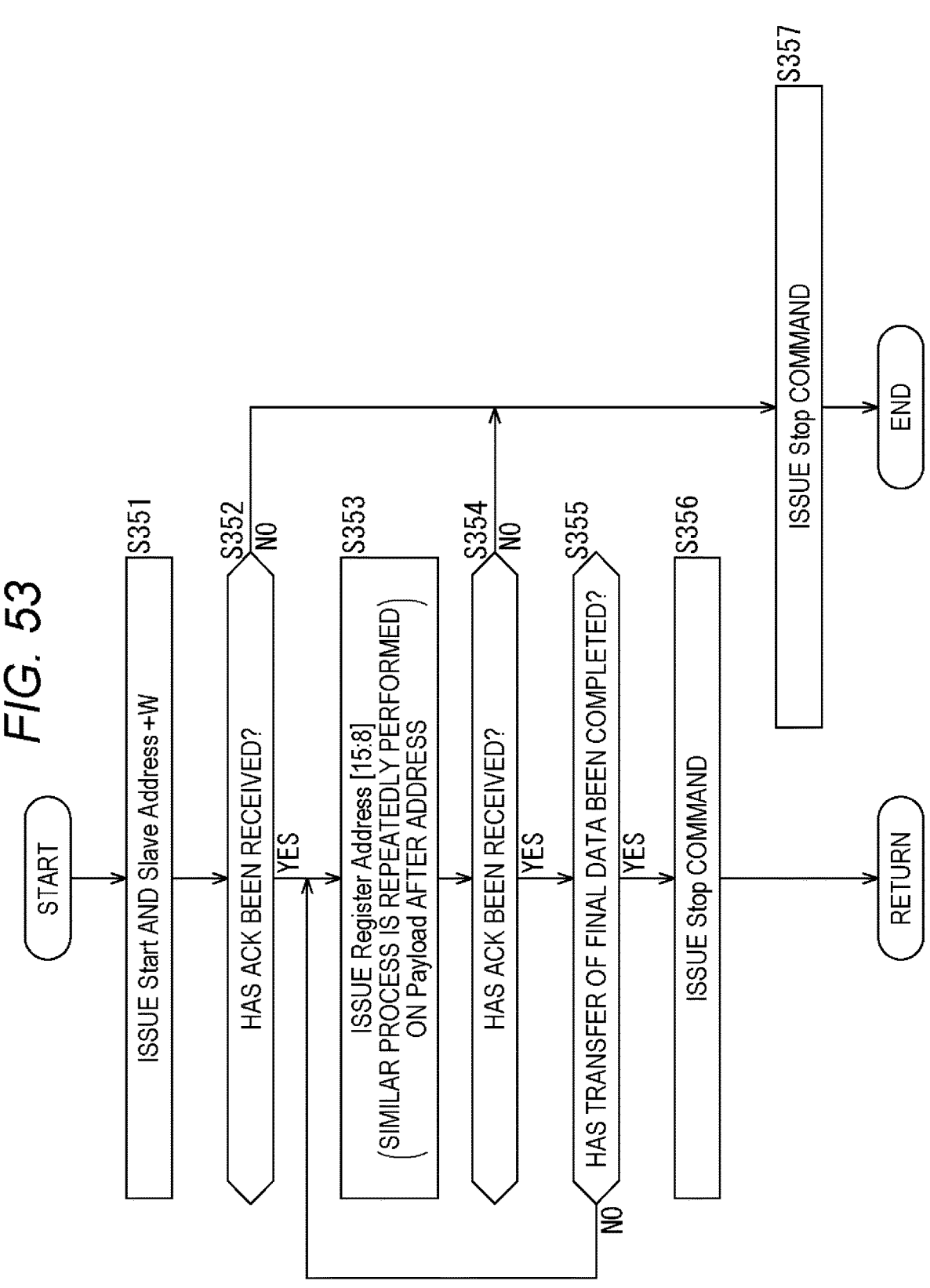

FIG. 53 is a flowchart for describing Sequence A_Write (in a case of AP) processing.

Figure 54:
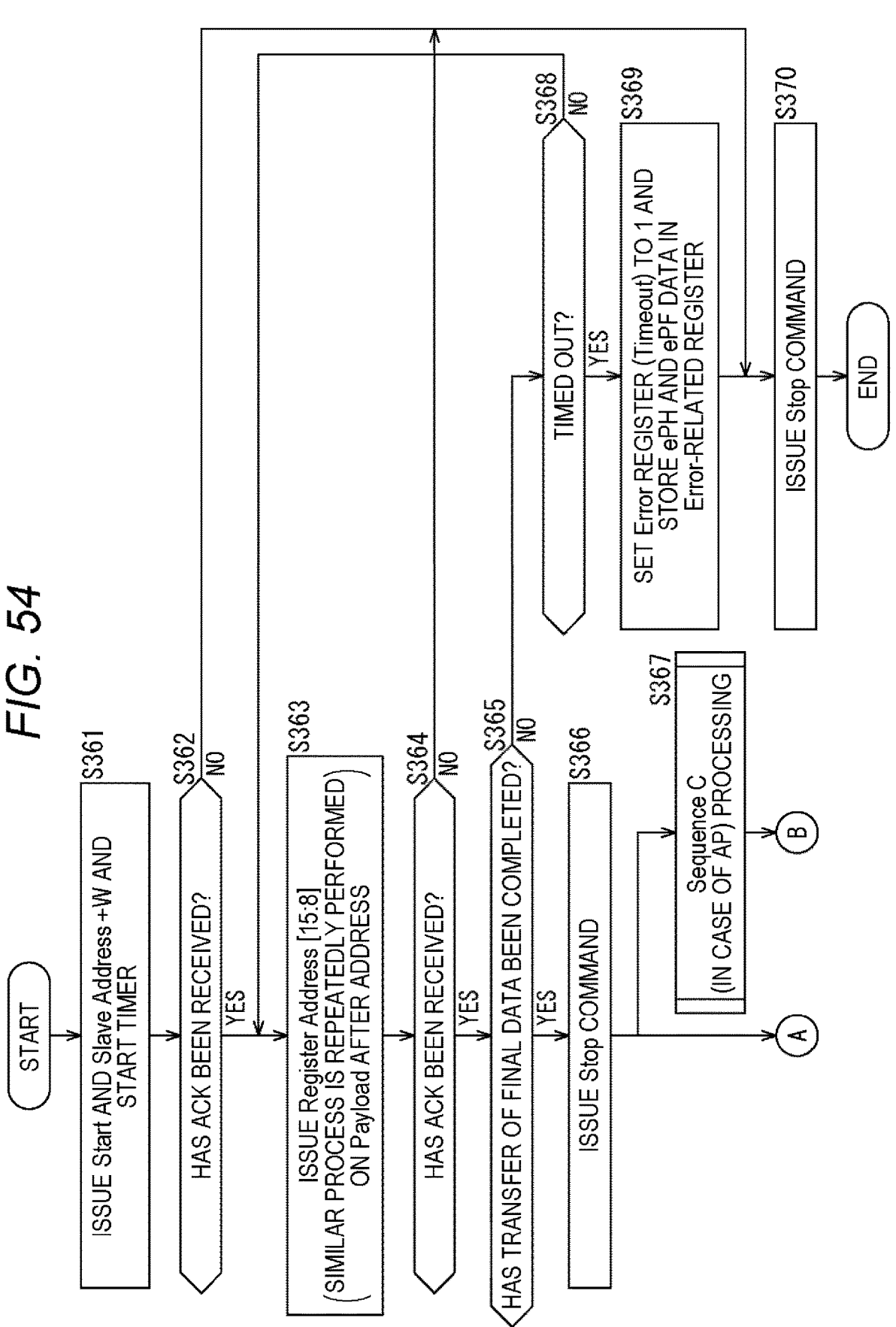

FIG. 54 is a flowchart for describing Sequence A_Read_CMD (in a case of AP) processing.

Figure 55:
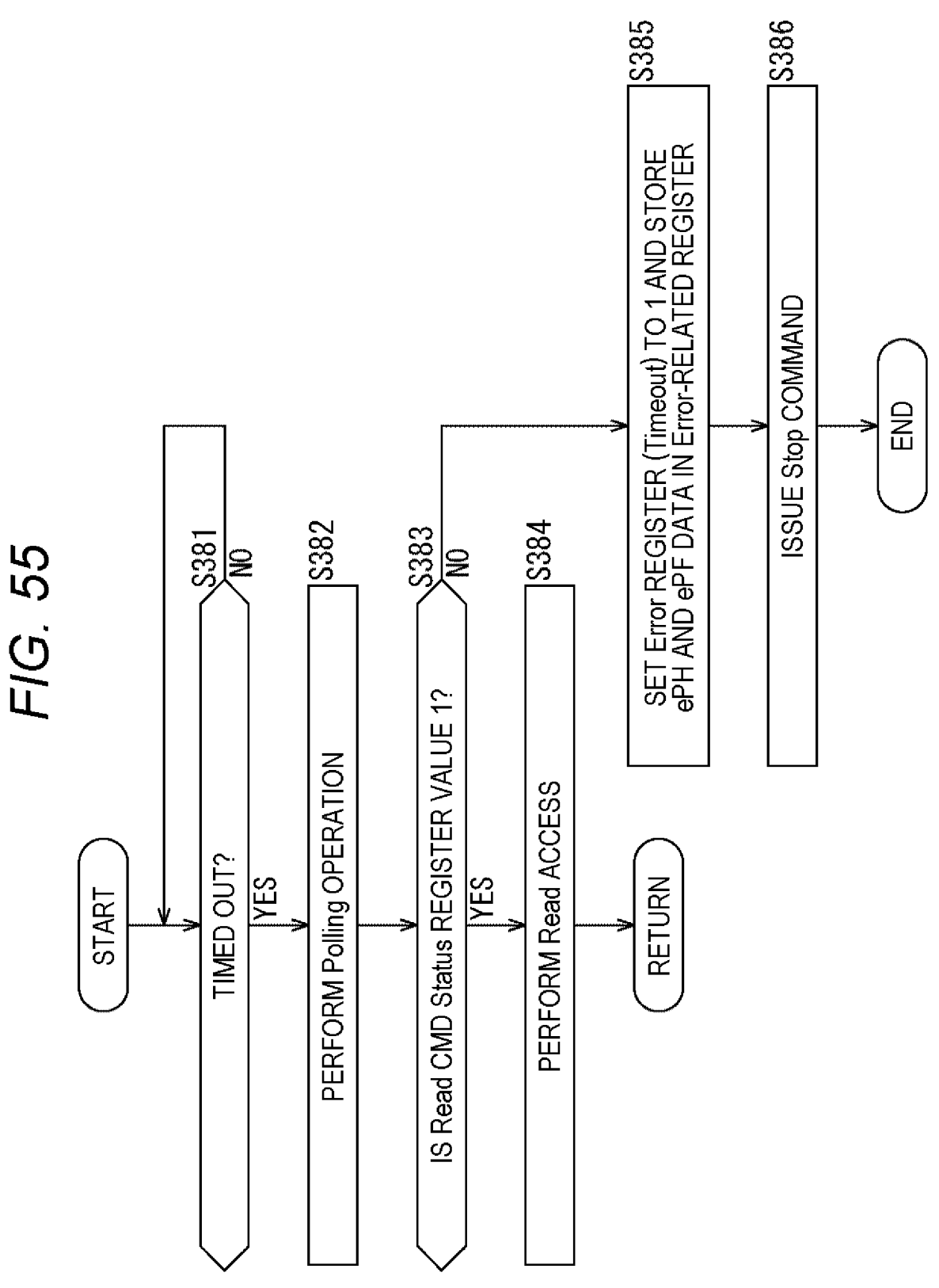

FIG. 55 is a flowchart for describing Sequence C (in a case of AP) processing.

Figure 56:
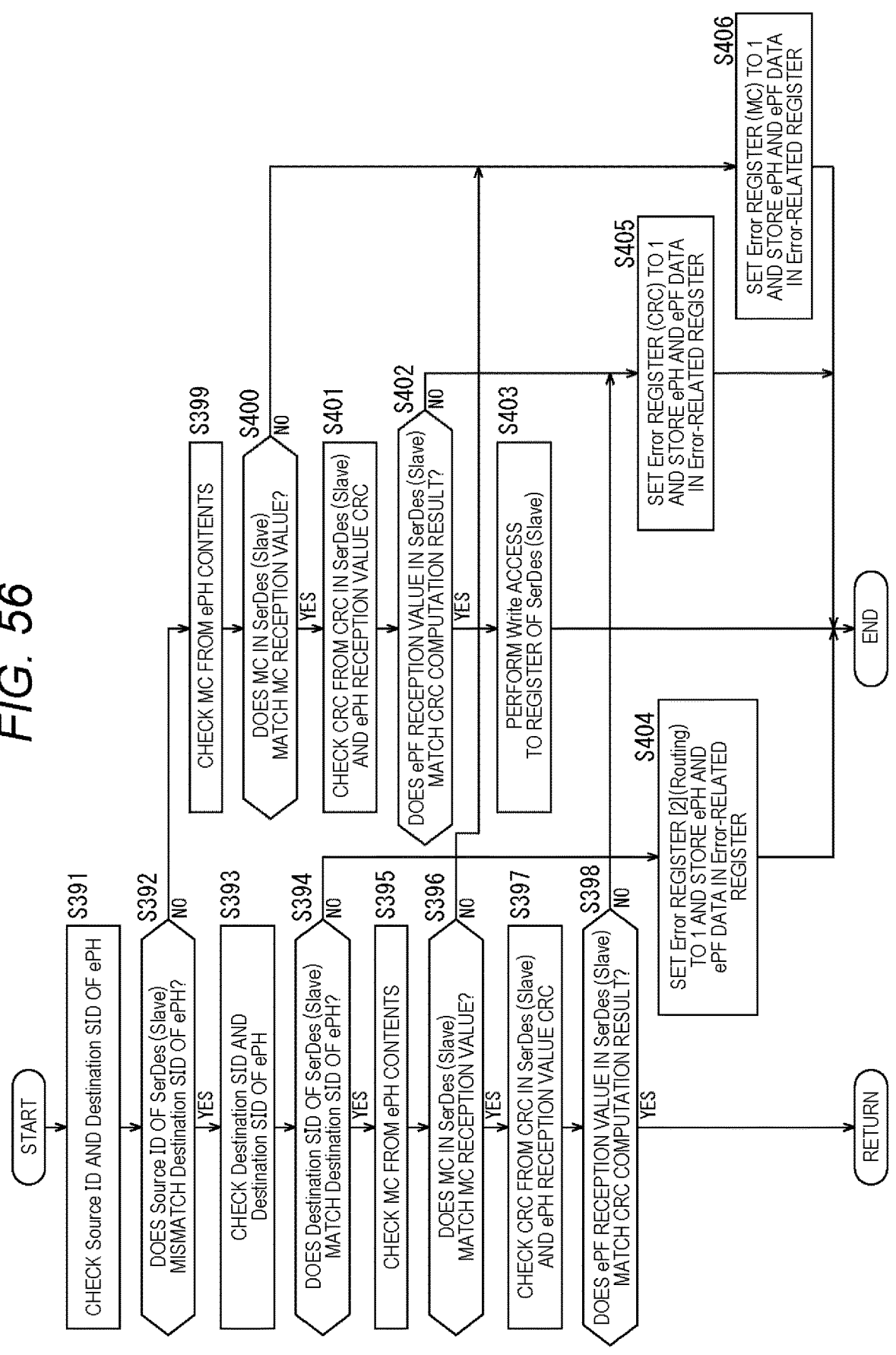

FIG. 56 is a flowchart for describing Sequence B (in a case of SerDes (slave)) processing.

Figure 57:
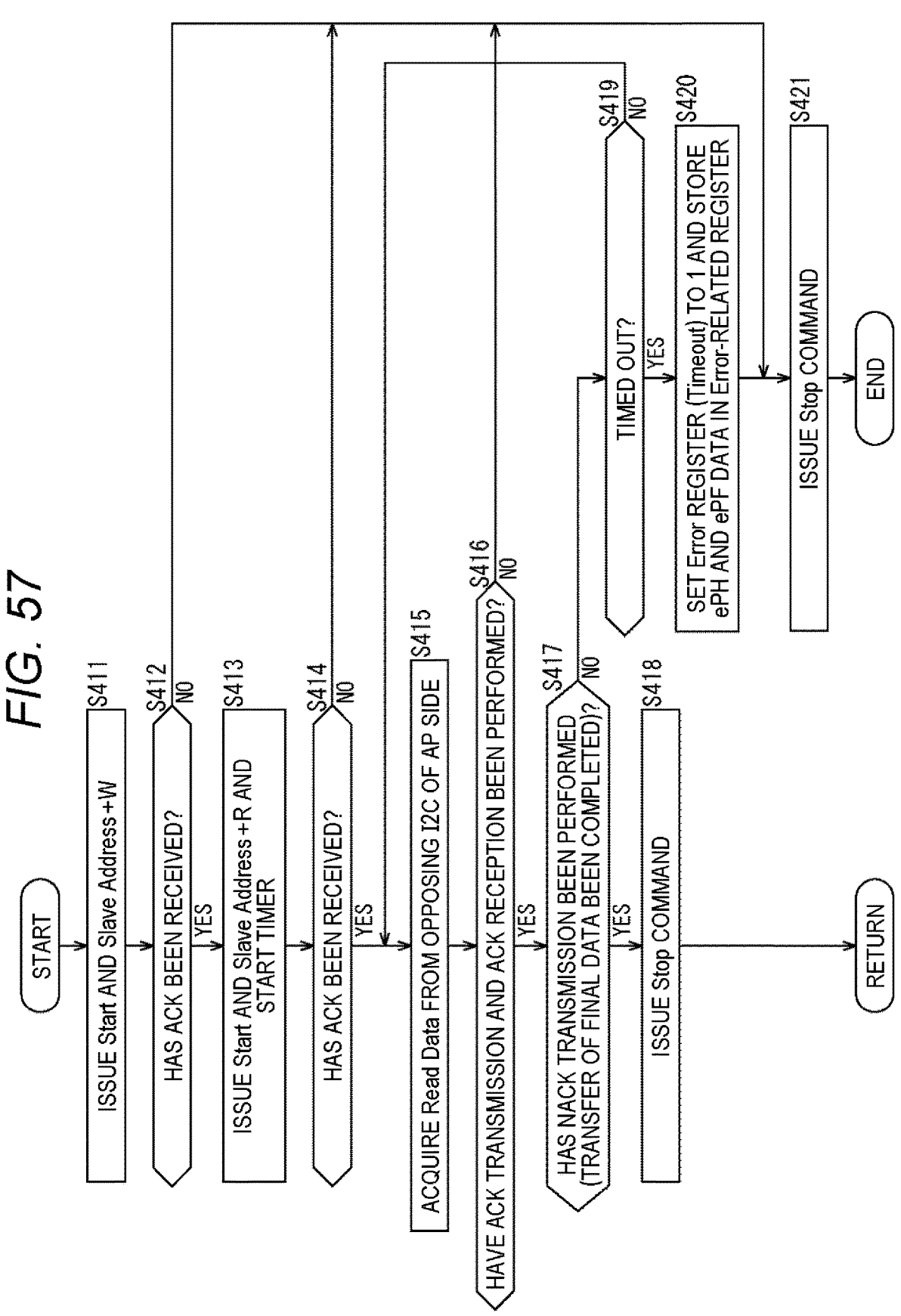

FIG. 57 is a flowchart for describing Sequence A_Read_Data (in a case of AP) processing.

FIG. 58 is a diagram illustrating details of an extended packet header ePH0, an extended packet header ePH1, and an extended packet header ePH2.

FIG. 59 is a diagram illustrating details of an extended packet header ePH3.

FIG. 60 is a diagram illustrating details of an extended DT of an extended packet header ePH.

Figure 61:
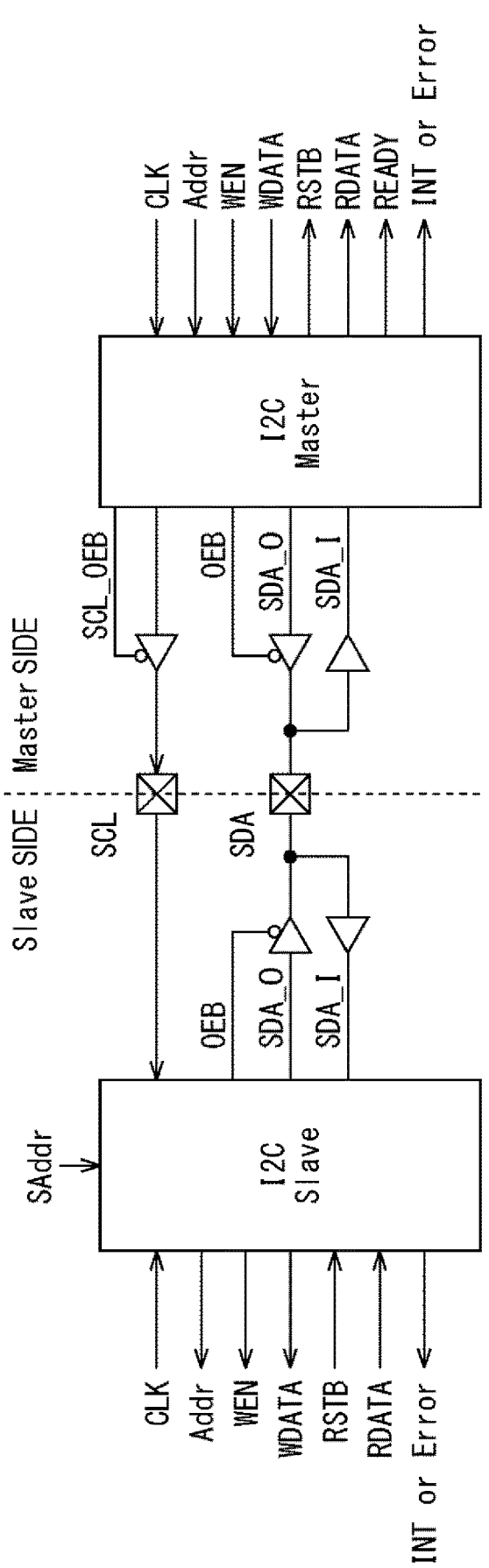

FIG. 61 is a block diagram illustrating a configuration example of conventional I2C in hardware.

Figure 62:
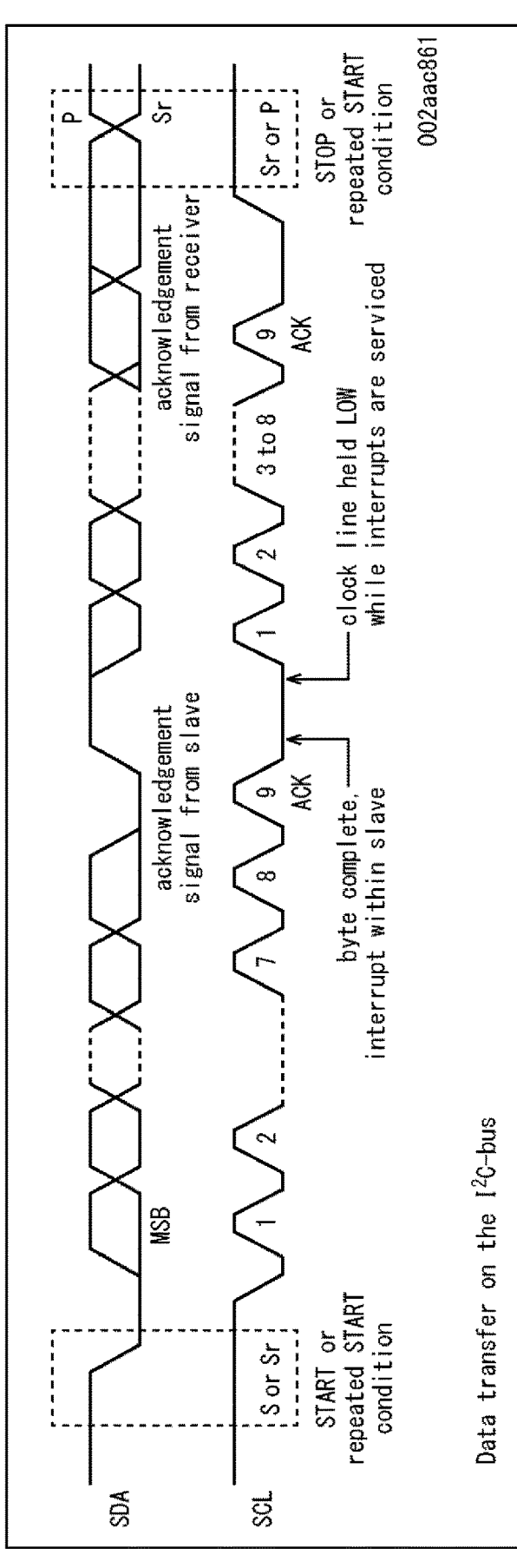

FIG. 62 is a diagram illustrating an example of a waveform at the time of data transfer on an I2C bus.

Figure 63:
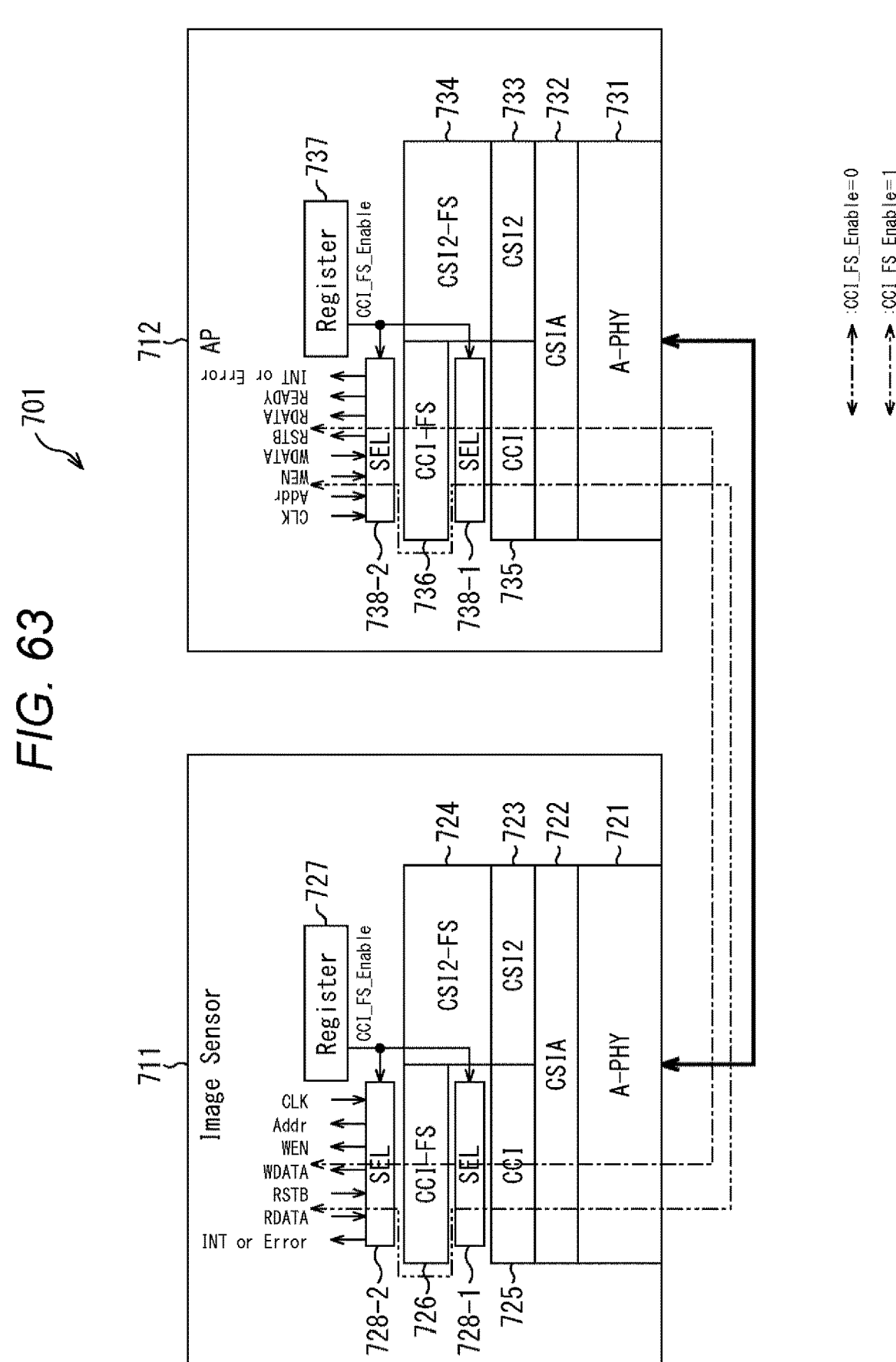

FIG. 63 is a block diagram illustrating a configuration example related to the CCI in a communication system having an A-PHY direct connection configuration.

Figure 64:
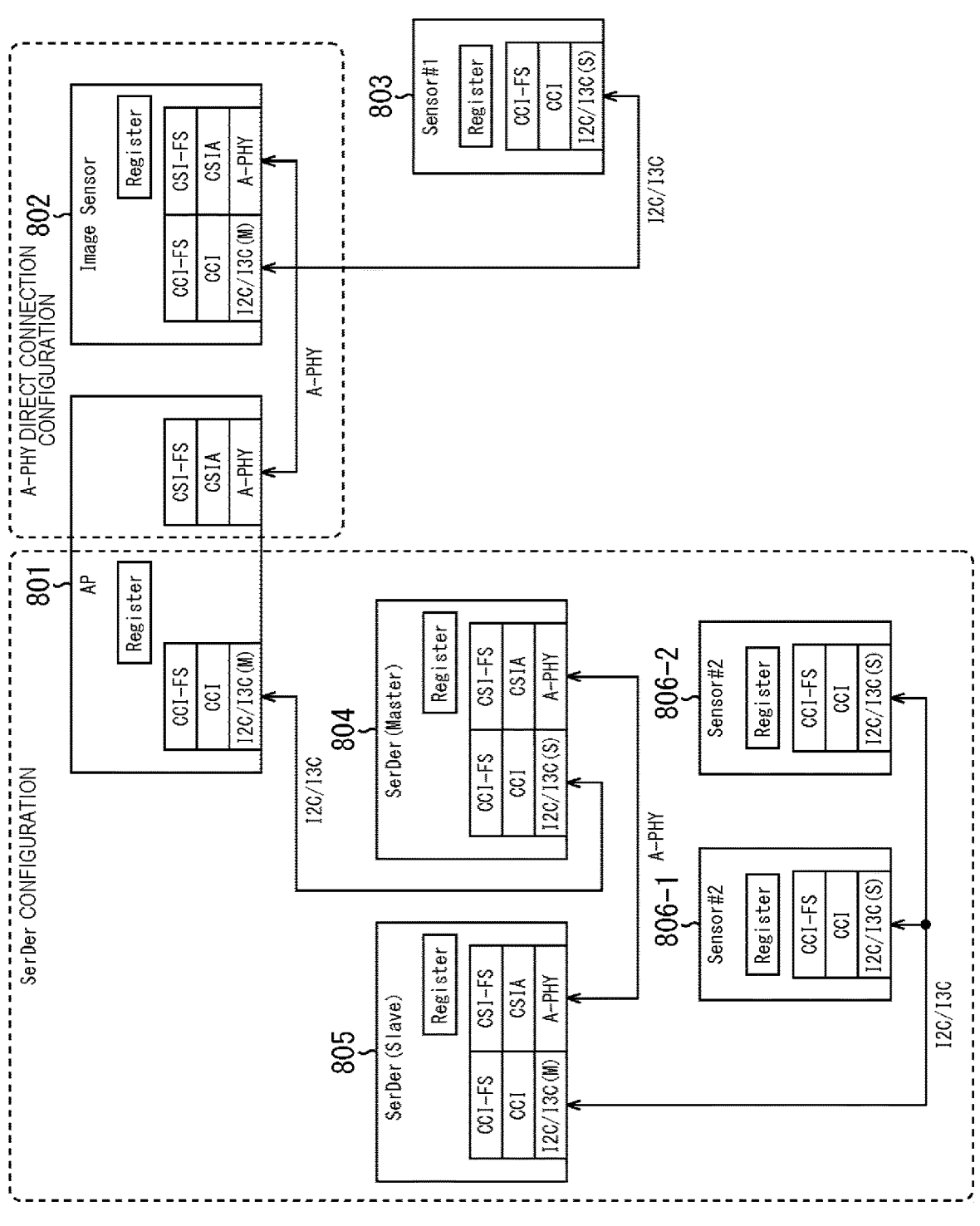

FIG. 64 is a diagram illustrating an example of a connection form of a network.

Figure 65:
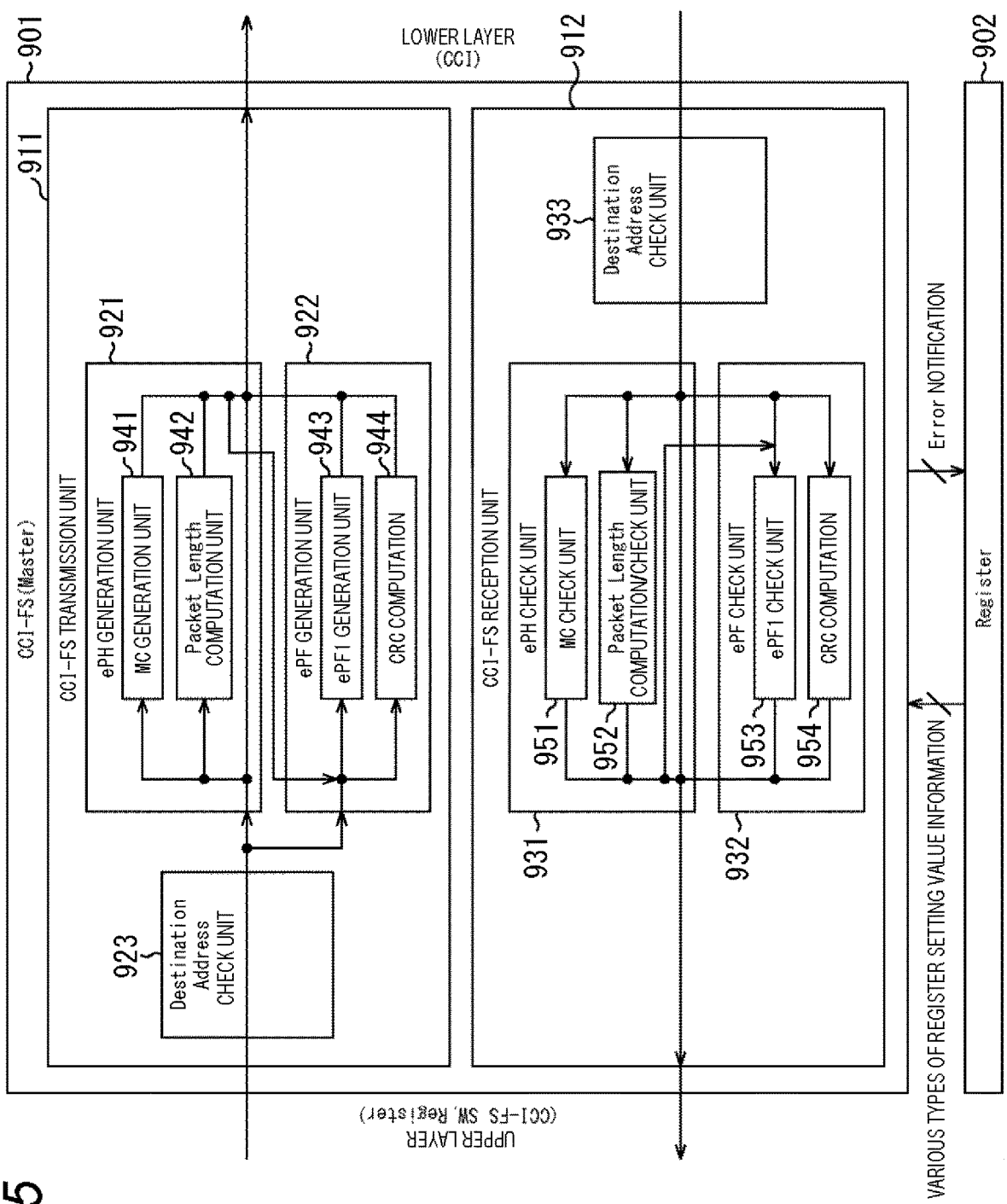

FIG. 65 is a block diagram illustrating an example of a circuit configuration of a CCI-FS processing unit.

FIG. 66 is a diagram illustrating a register configuration example.

FIG. 67 is a diagram illustrating a register configuration example in a case of a bridge configuration.

FIG. 68 is a diagram illustrating a register configuration example of an error-related register.

FIG. 69 is a diagram illustrating a modification example of the extended packet header ePH in the packet configuration of the write data generated on the application processor side.

Figure 70:
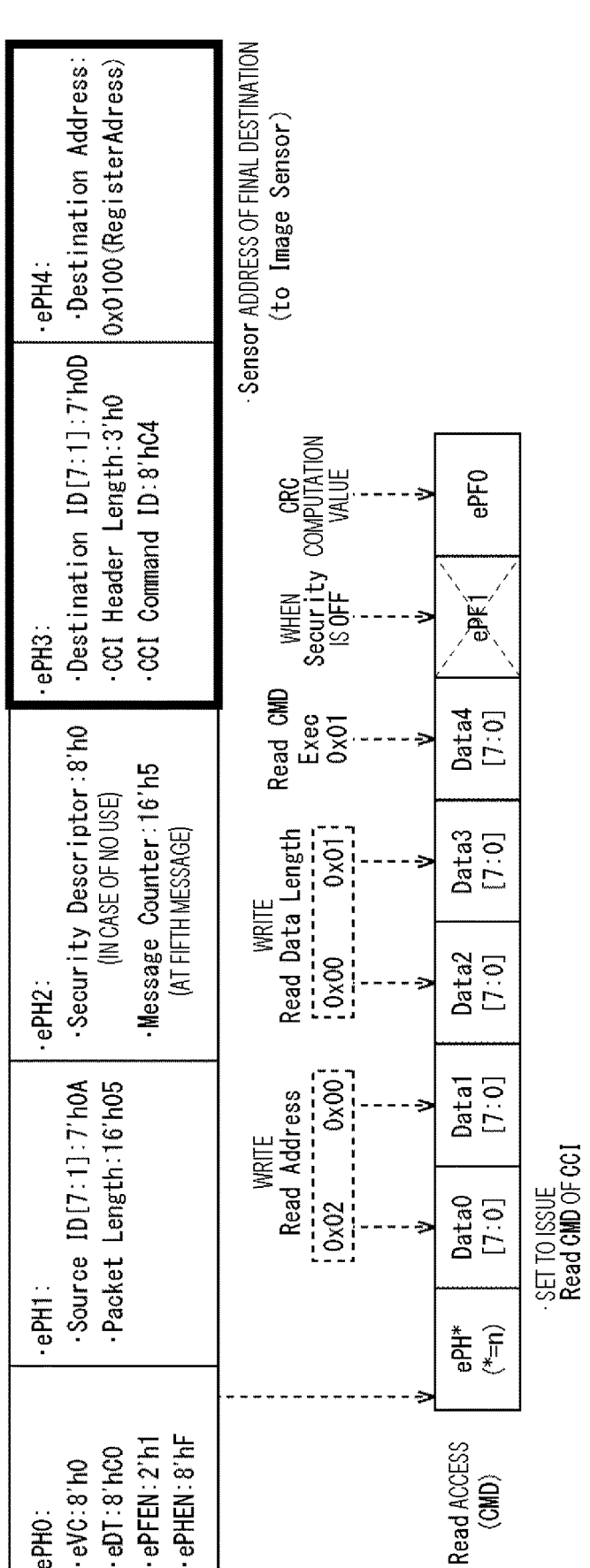

FIG. 70 is a diagram illustrating a modification example of the extended packet header ePH in the packet configuration of the read command generated on the application processor side.

Figure 71:
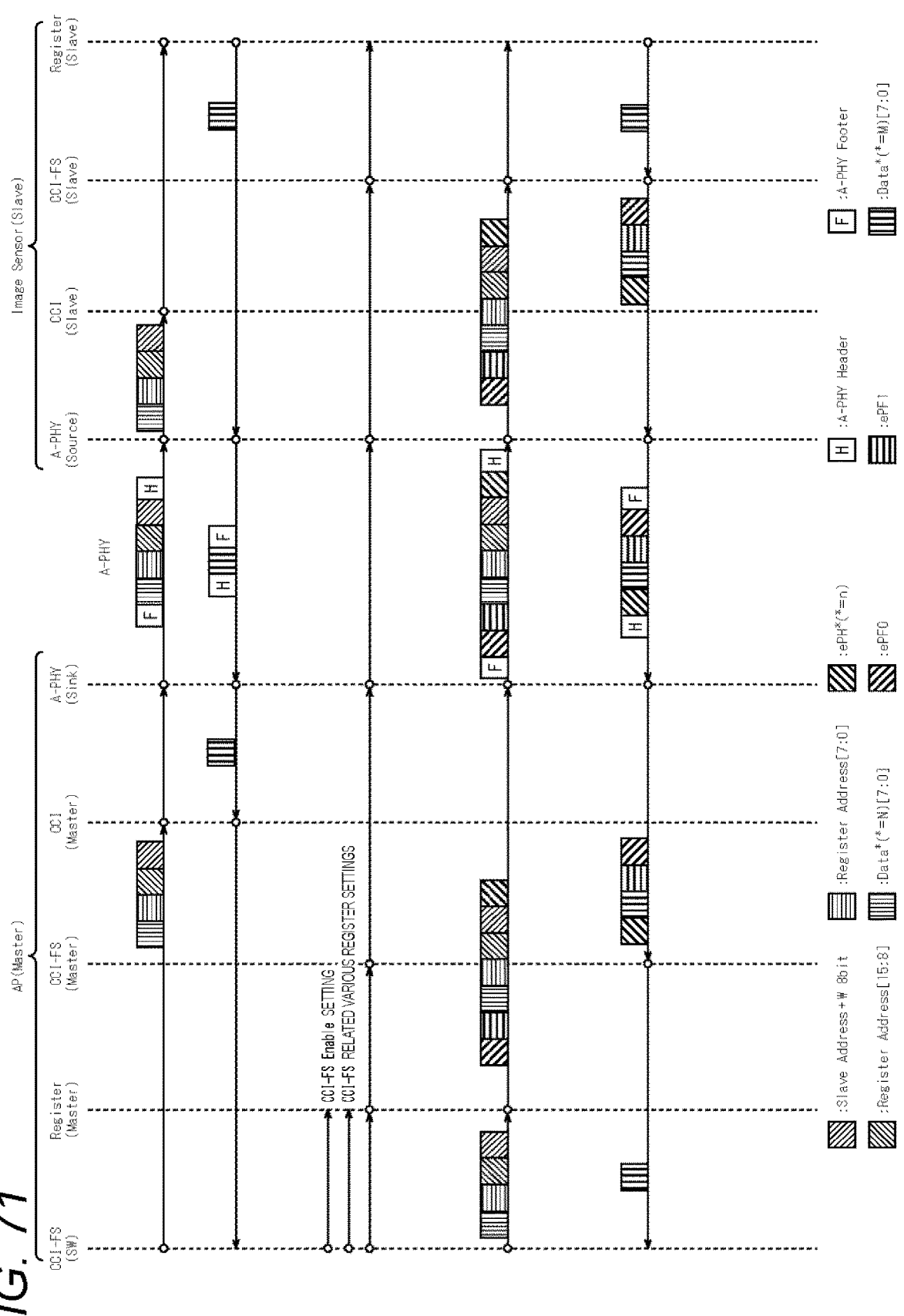

FIG. 71 is a diagram illustrating a flow between the application processor and the image sensor in the A-PHY direct connection configuration.

Figure 72:
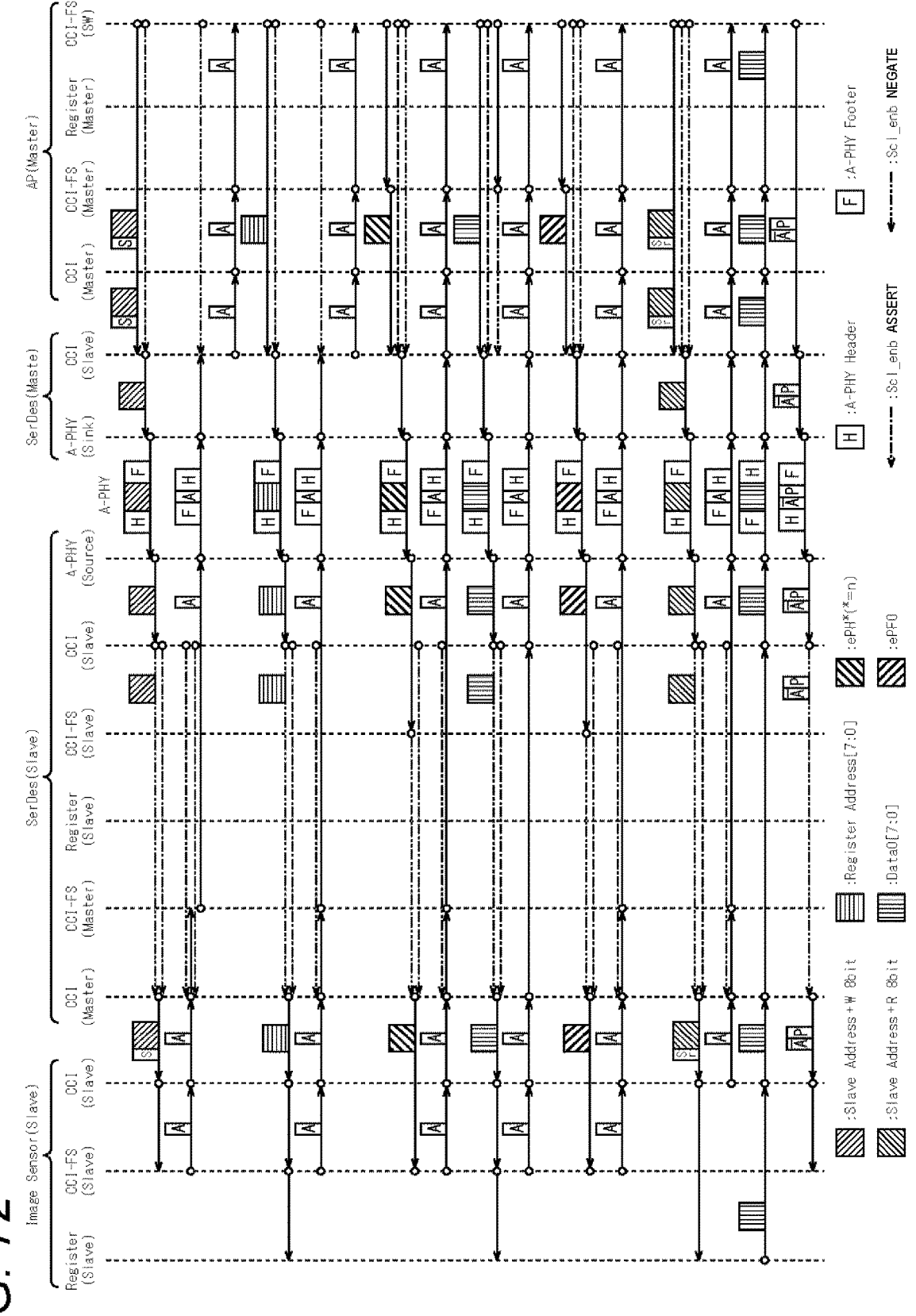

FIG. 72 is a diagram for describing a flow using the clock stretch method.

Figure 73:
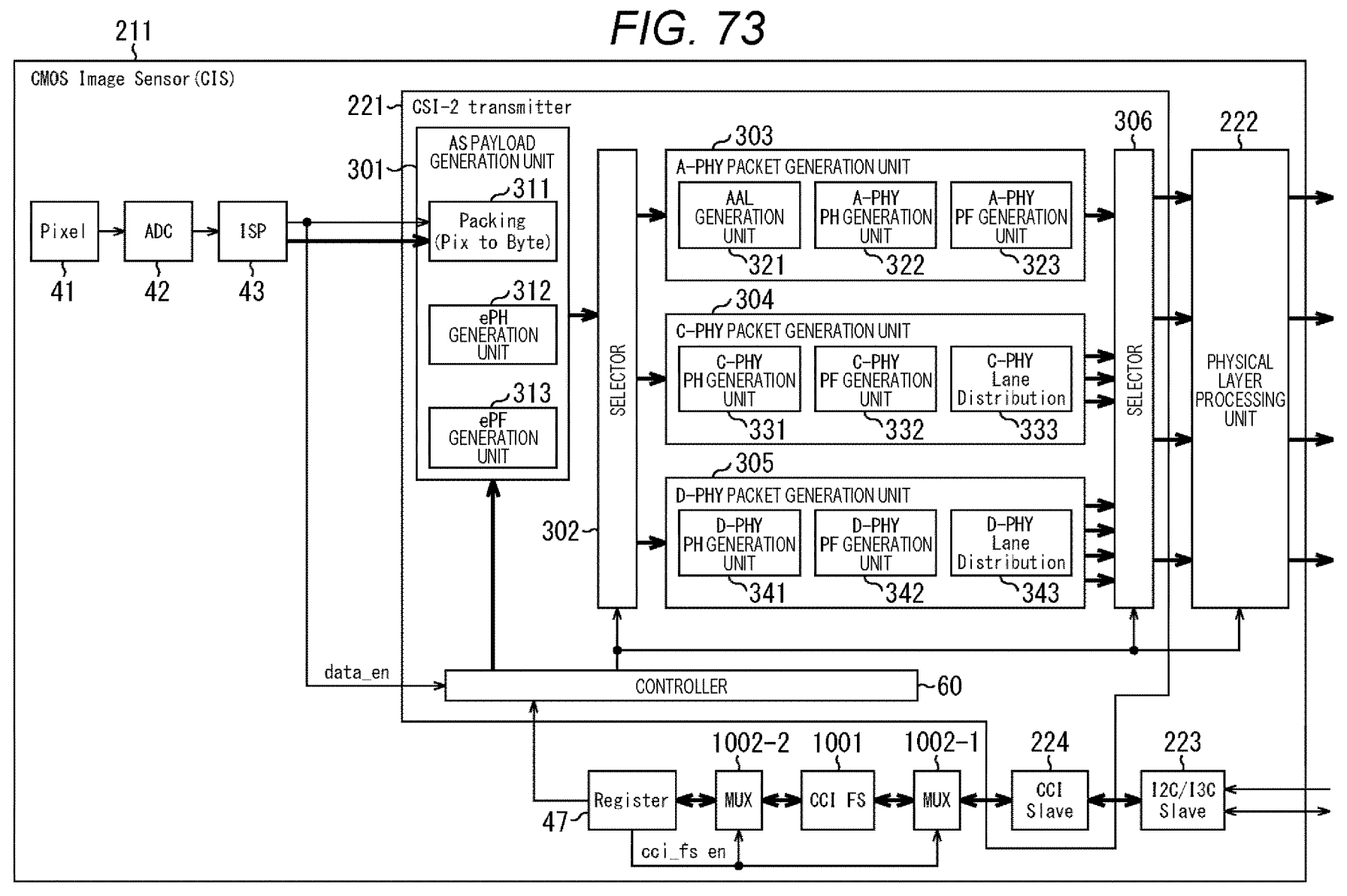

FIG. 73 is a block diagram illustrating a detailed configuration example of the image sensor including the CCI-FS processing unit.

Figure 74:
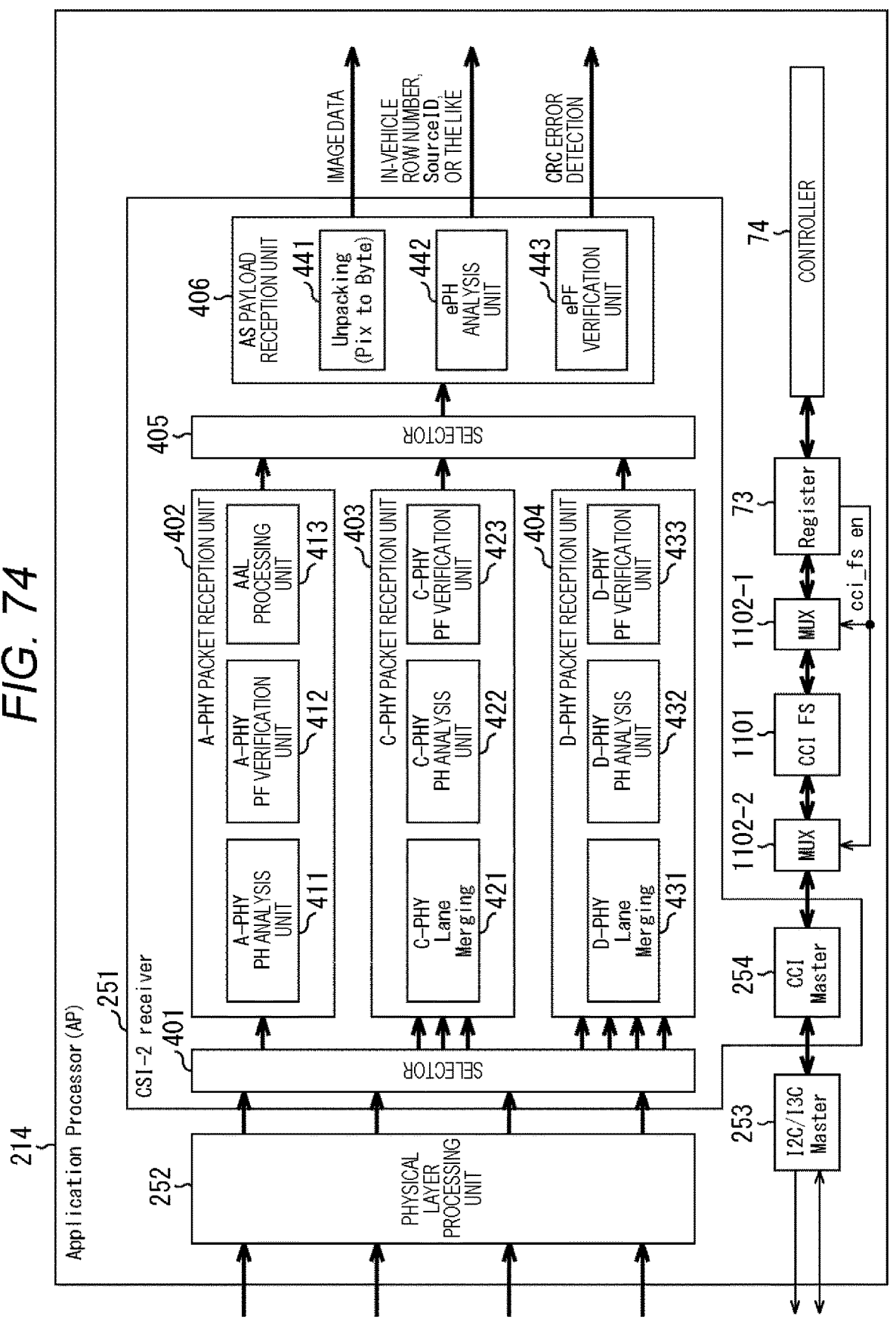

FIG. 74 is a block diagram illustrating a detailed configuration example of the application processor including the CCI-FS processing unit.

Figure 75A:
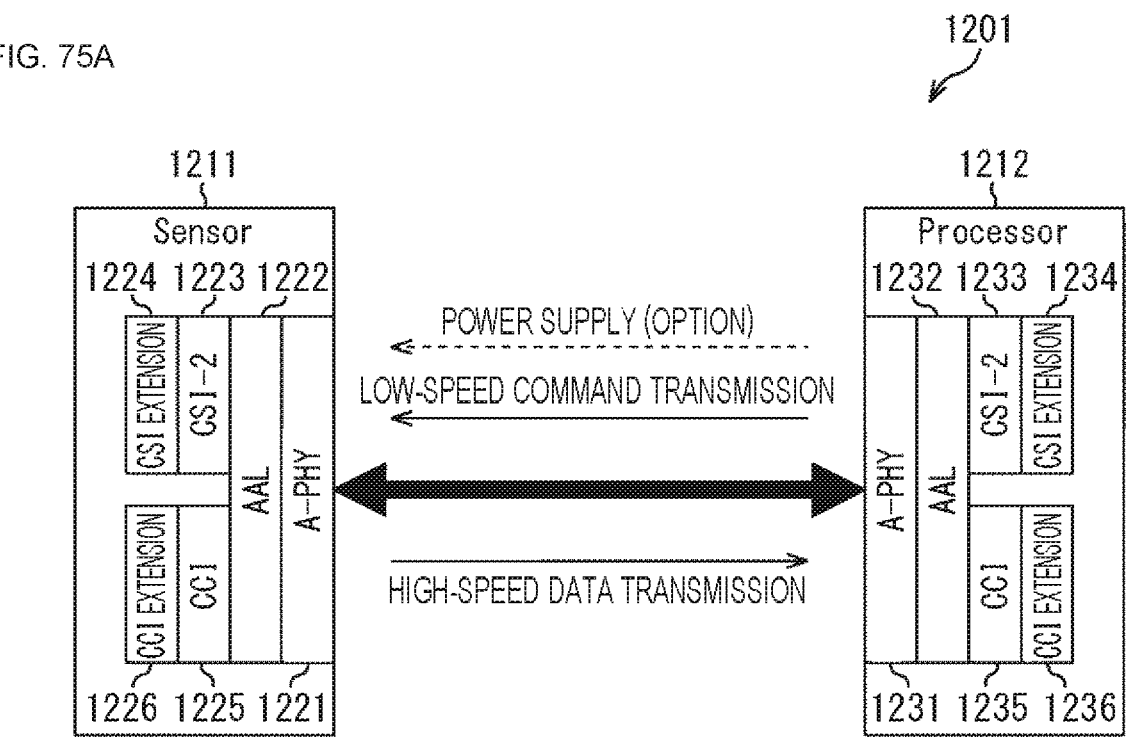
Figure 75B:
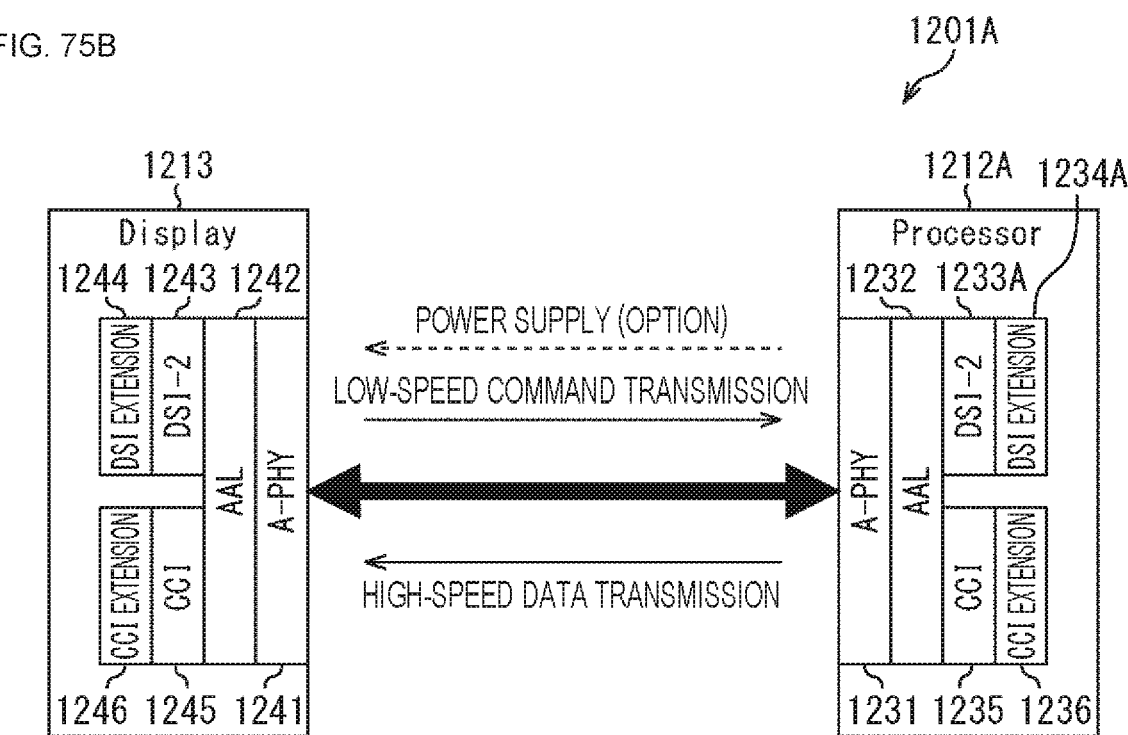

FIGS. 75A and 75B are block diagrams illustrating a configuration example of a fourth embodiment of a communication system to which the present technology is applied.

Figure 76:
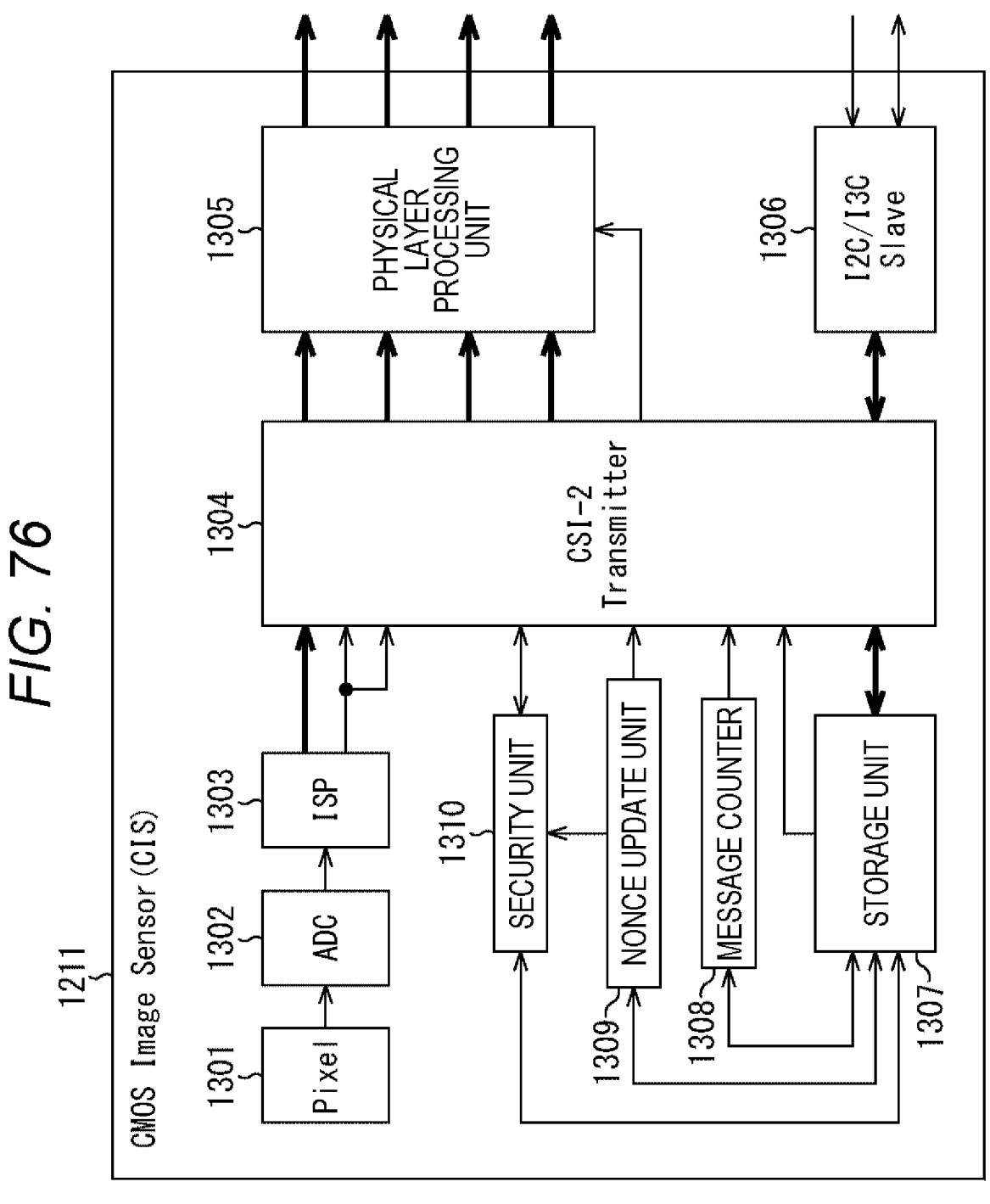

FIG. 76 is a block diagram illustrating a detailed configuration example of an image sensor.

Figure 77:
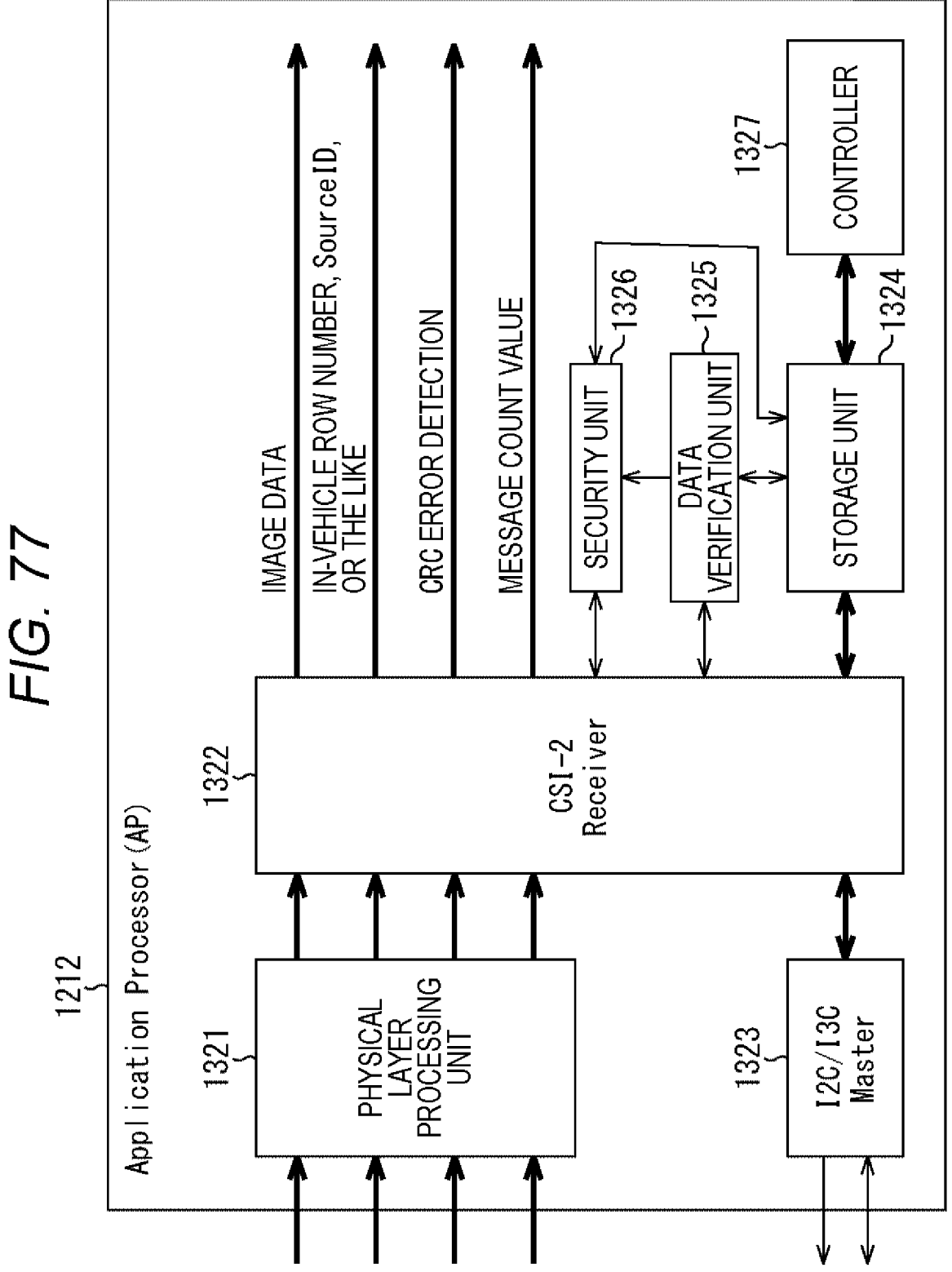

FIG. 77 is a block diagram illustrating a detailed configuration example of an application processor.

Figure 78:
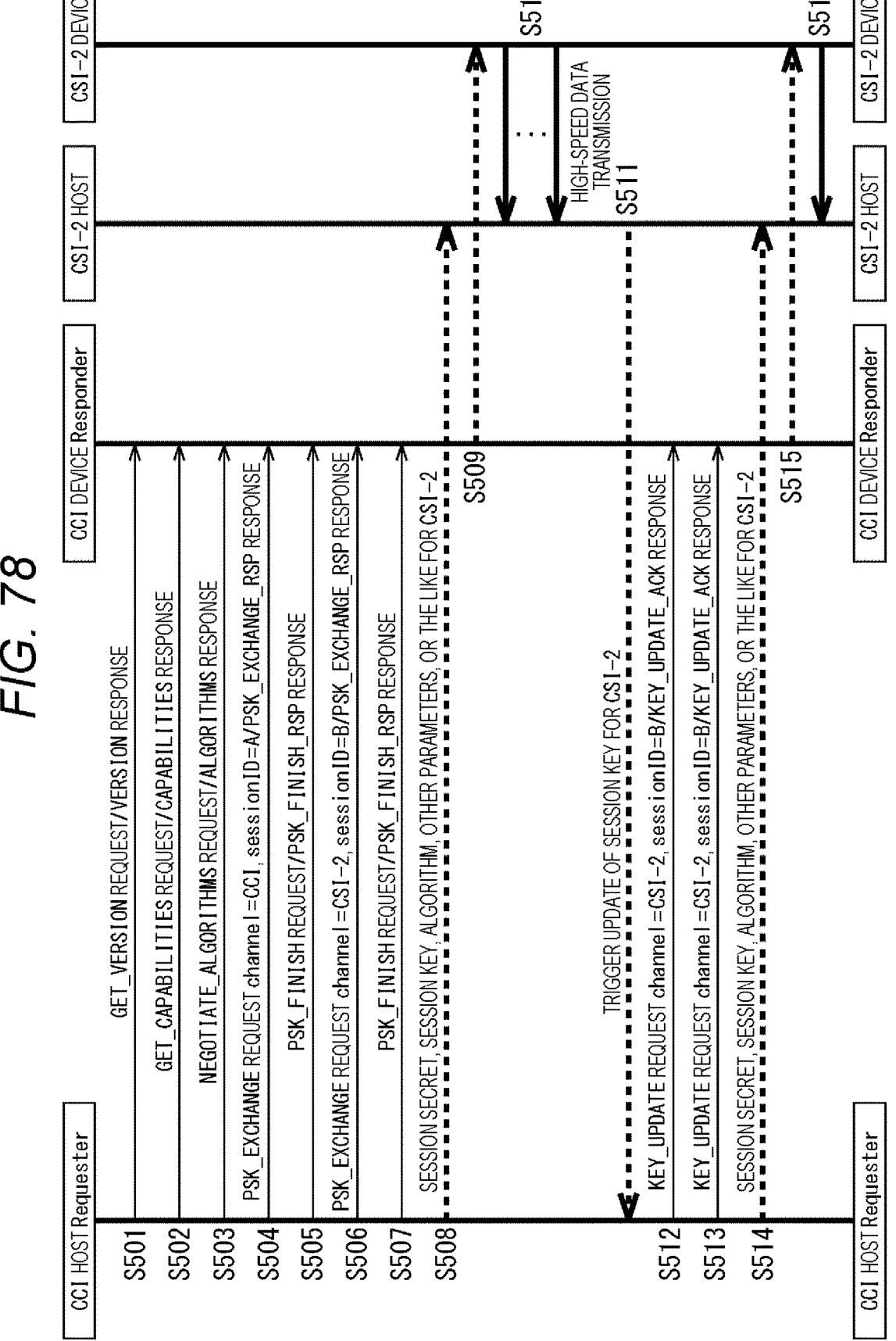

FIG. 78 is a flowchart illustrating a first processing example of communication processing.

Figure 79:
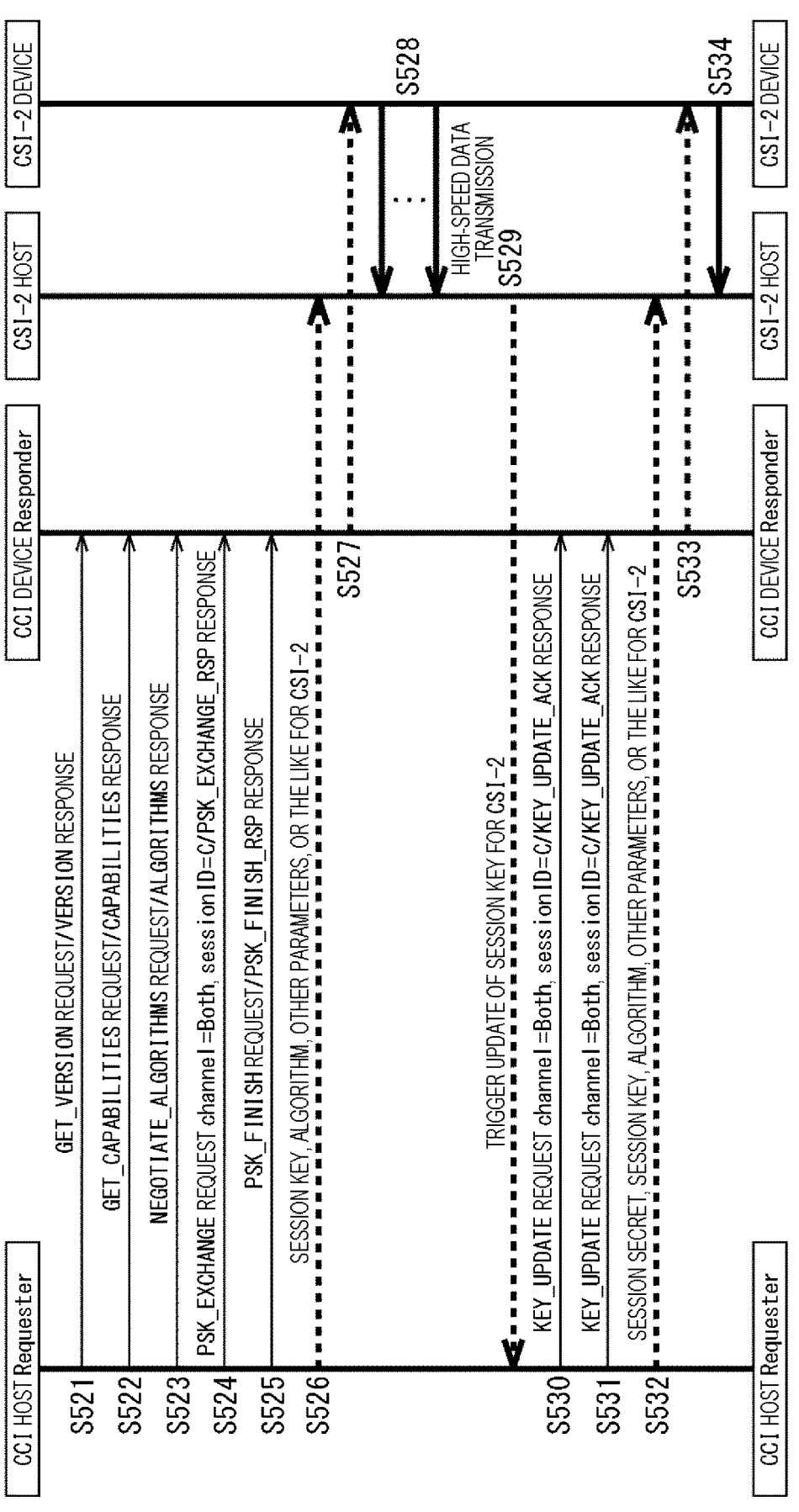

FIG. 79 is a flowchart illustrating the first processing example of the communication processing.

Figure 80:
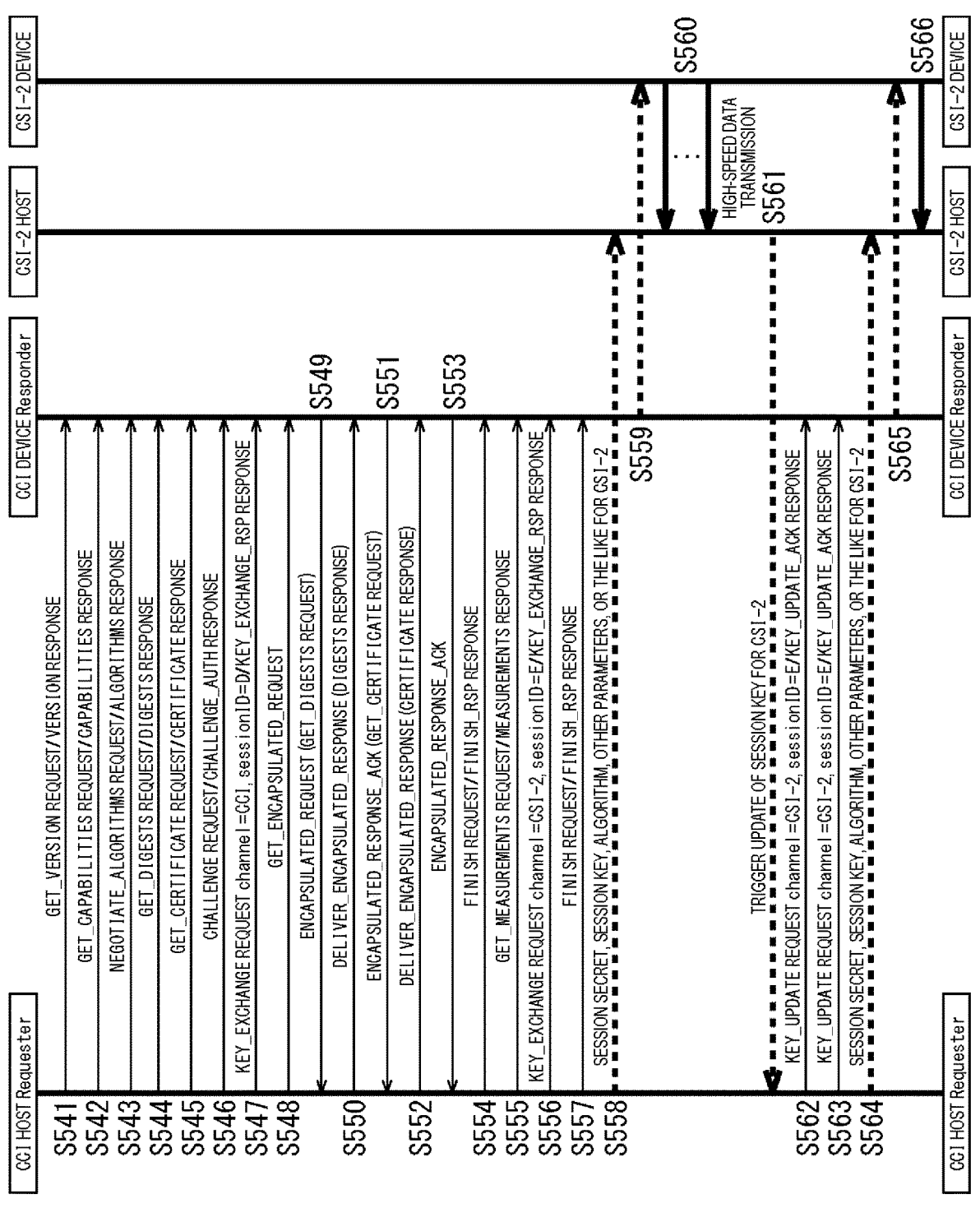

FIG. 80 is a flowchart illustrating the first processing example of the communication processing.

FIGS. 81A, 81B, 81C, and 81D are diagrams for describing a verification packet and a verification target packet.

FIGS. 82A, 82B, 82C, and 82D are diagrams for describing a verification packet and a verification target packet.

Figure 83:
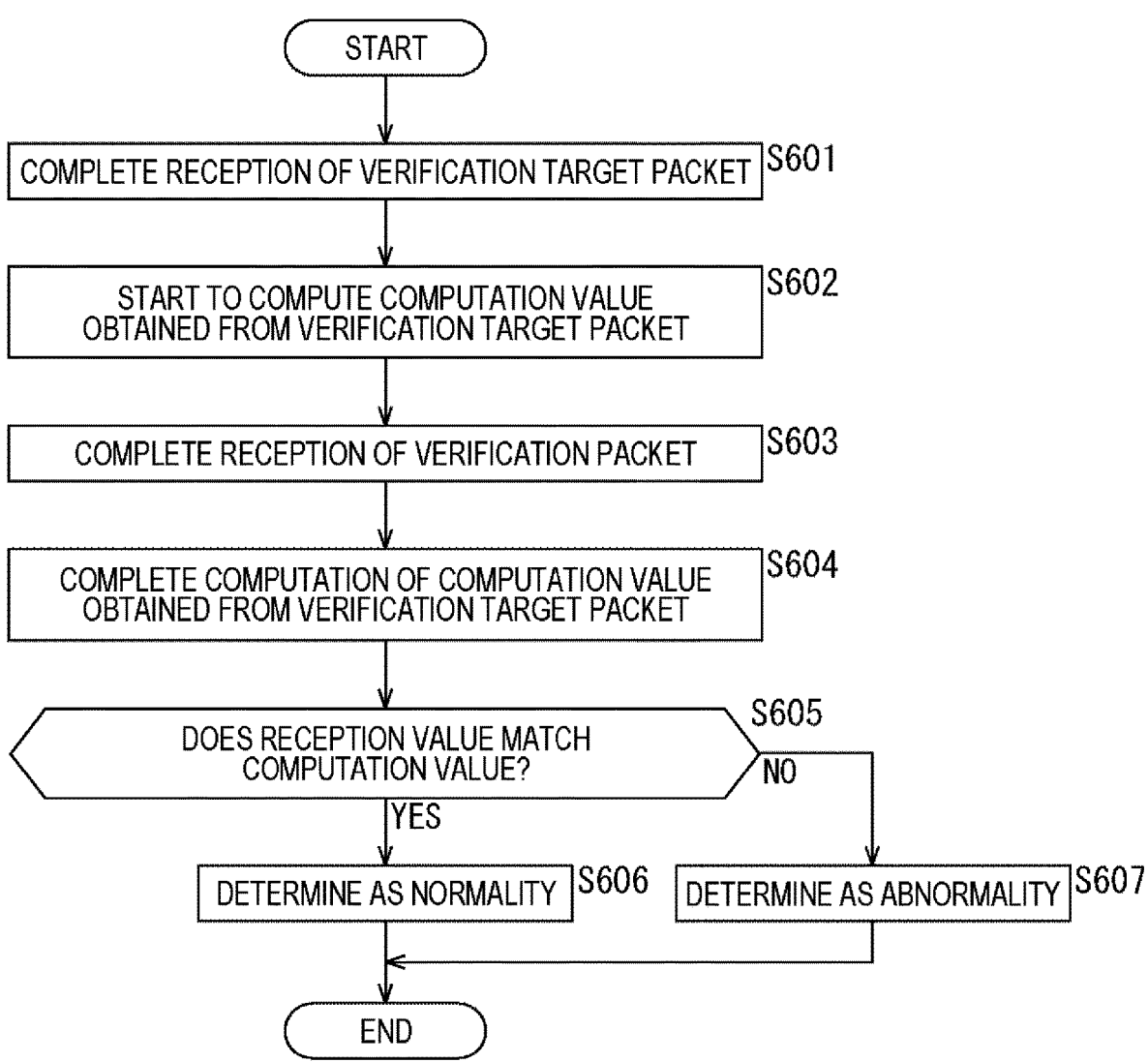

FIG. 83 is a flowchart for describing a data verification process.

Figure 84:
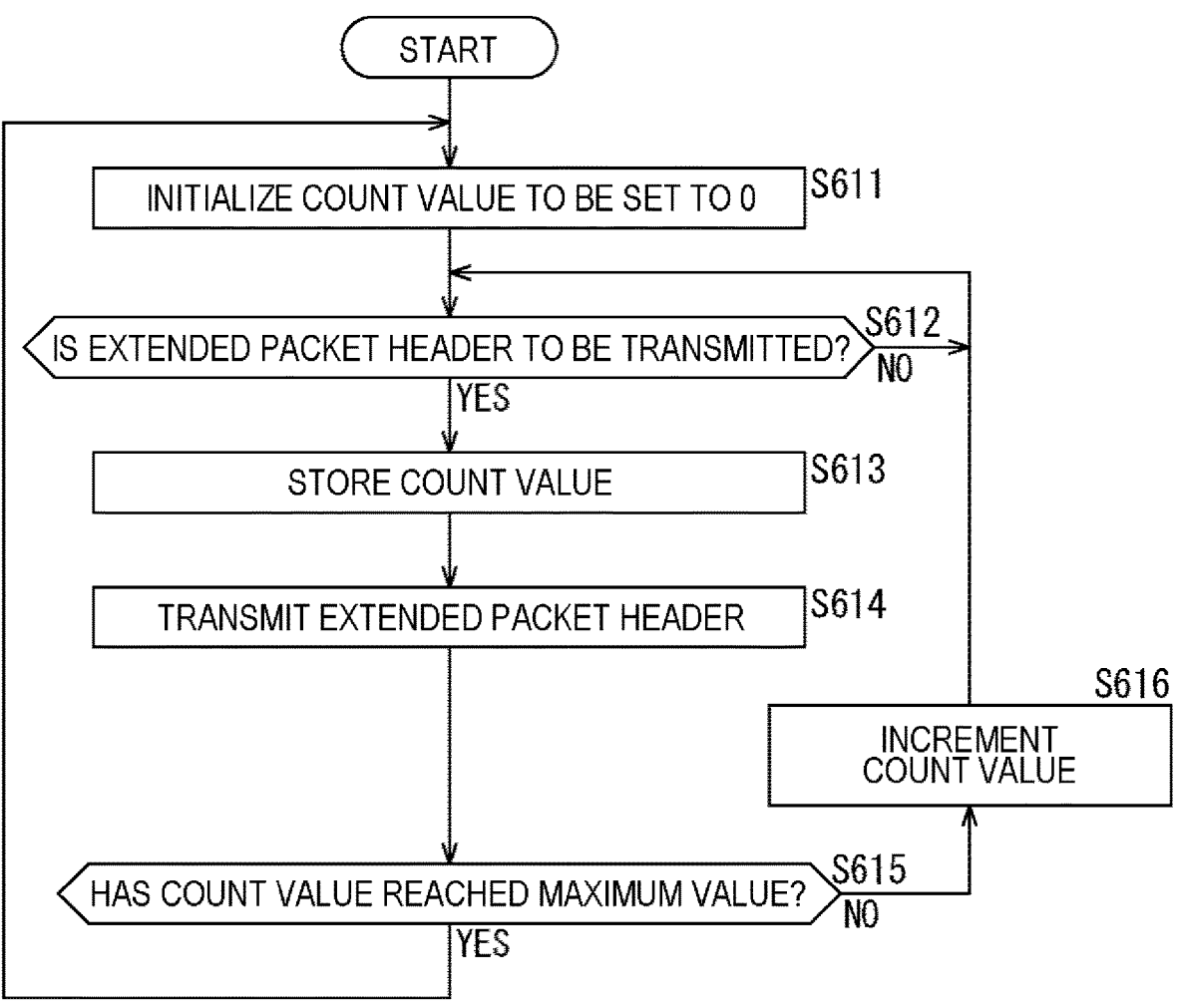

FIG. 84 is a flowchart illustrating a message count value transmission process.

FIGS. 85A and 85B are diagrams for describing embedded data.

Figure 86:
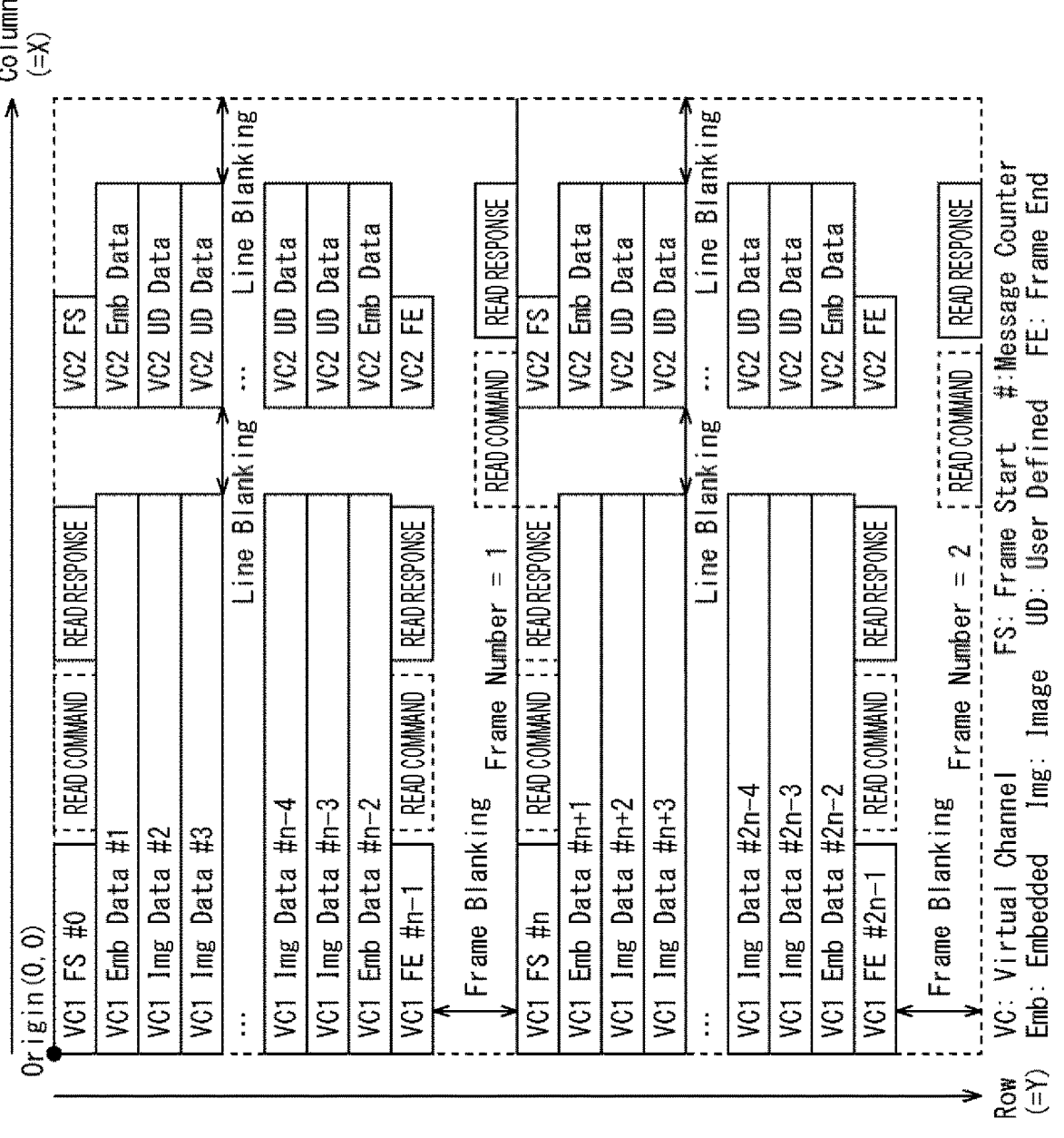

FIG. 86 is a diagram illustrating an example of a data structure of image data.

Figure 87:
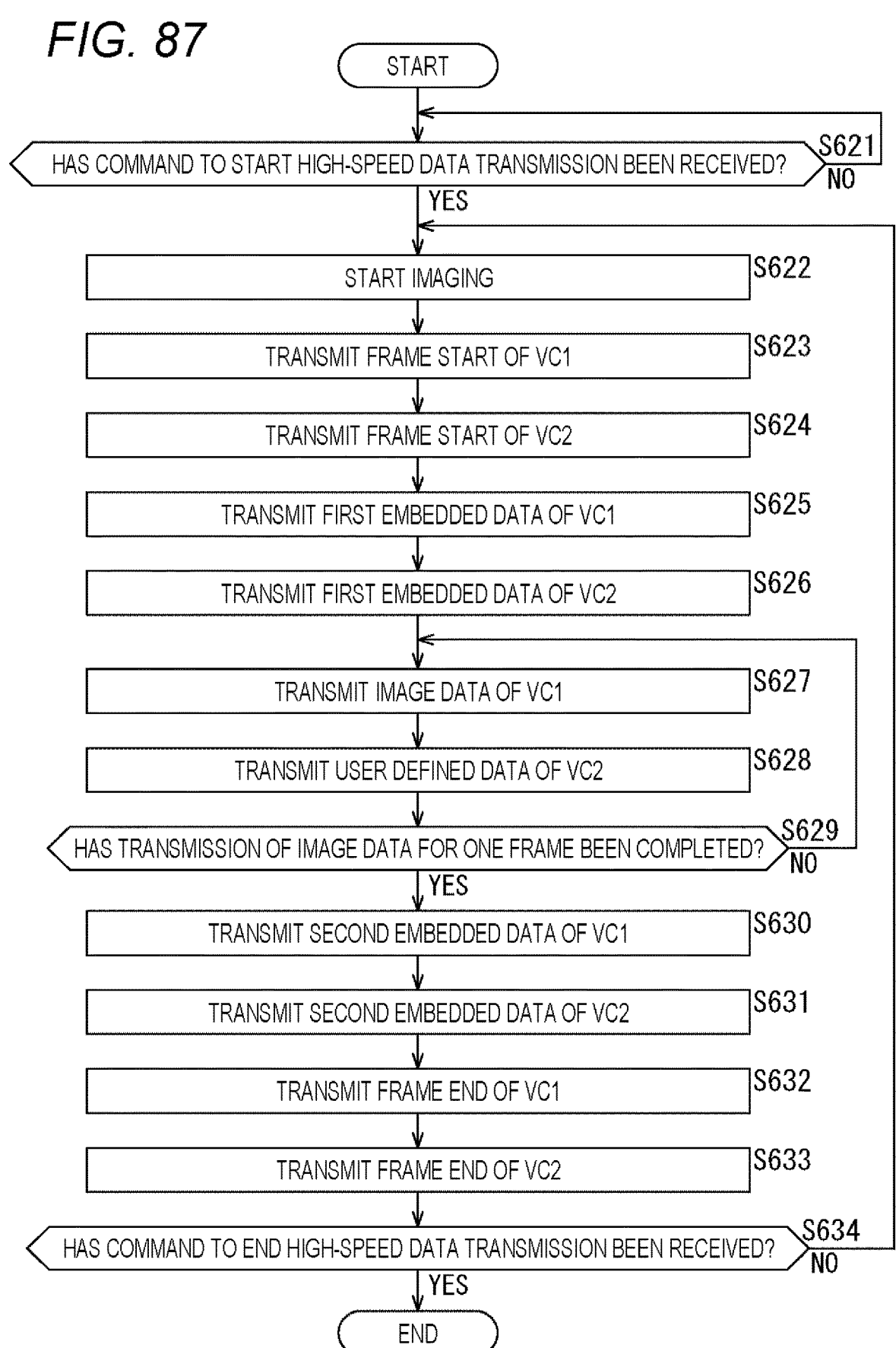

FIG. 87 is a flowchart illustrating an image data transmission process.

Figure 88:
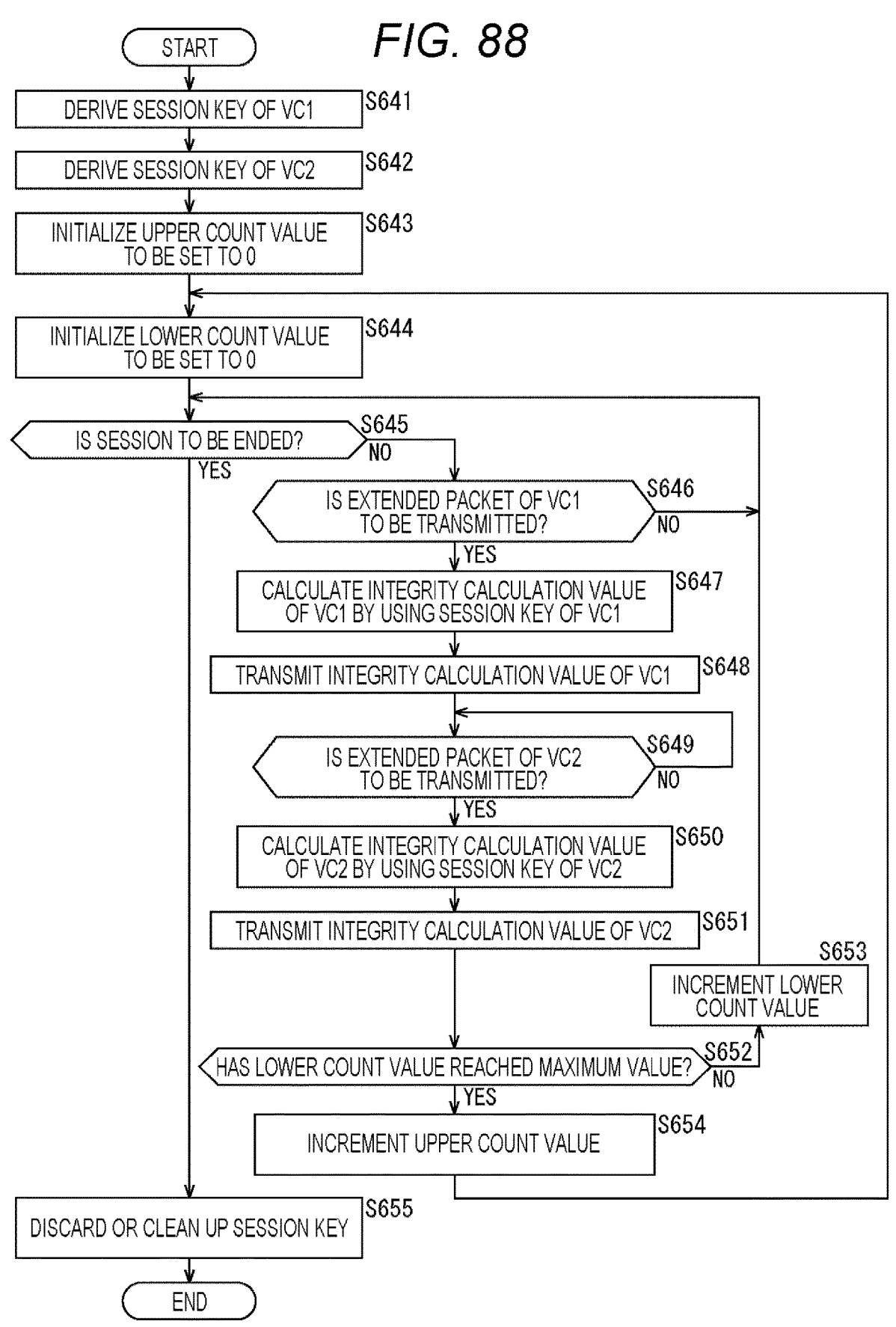

FIG. 88 is a flowchart illustrating an integrity calculation value transmission process.

Figure 89:
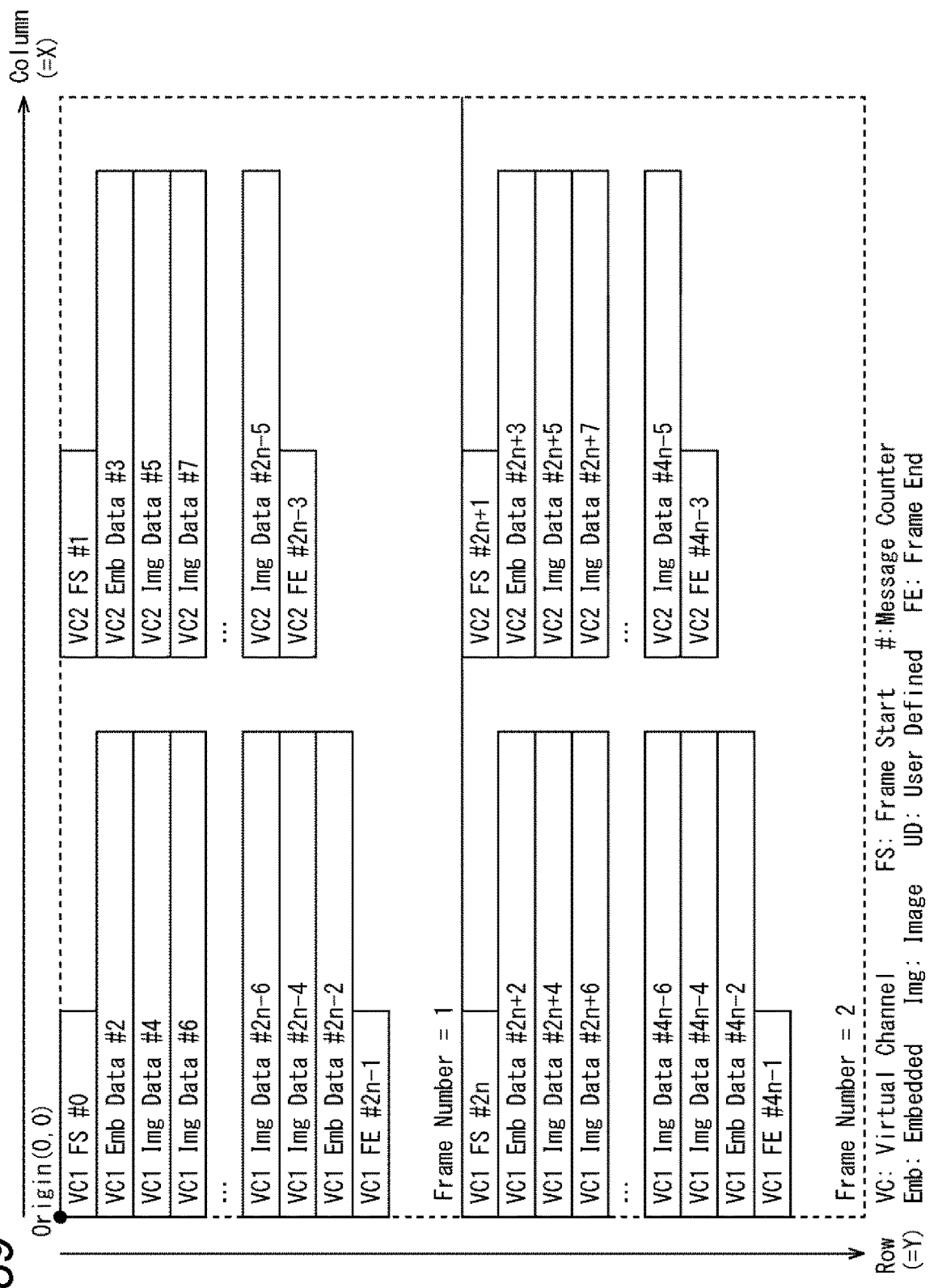

FIG. 89 is a diagram illustrating a first modification example of a data structure of image data.

Figure 90:
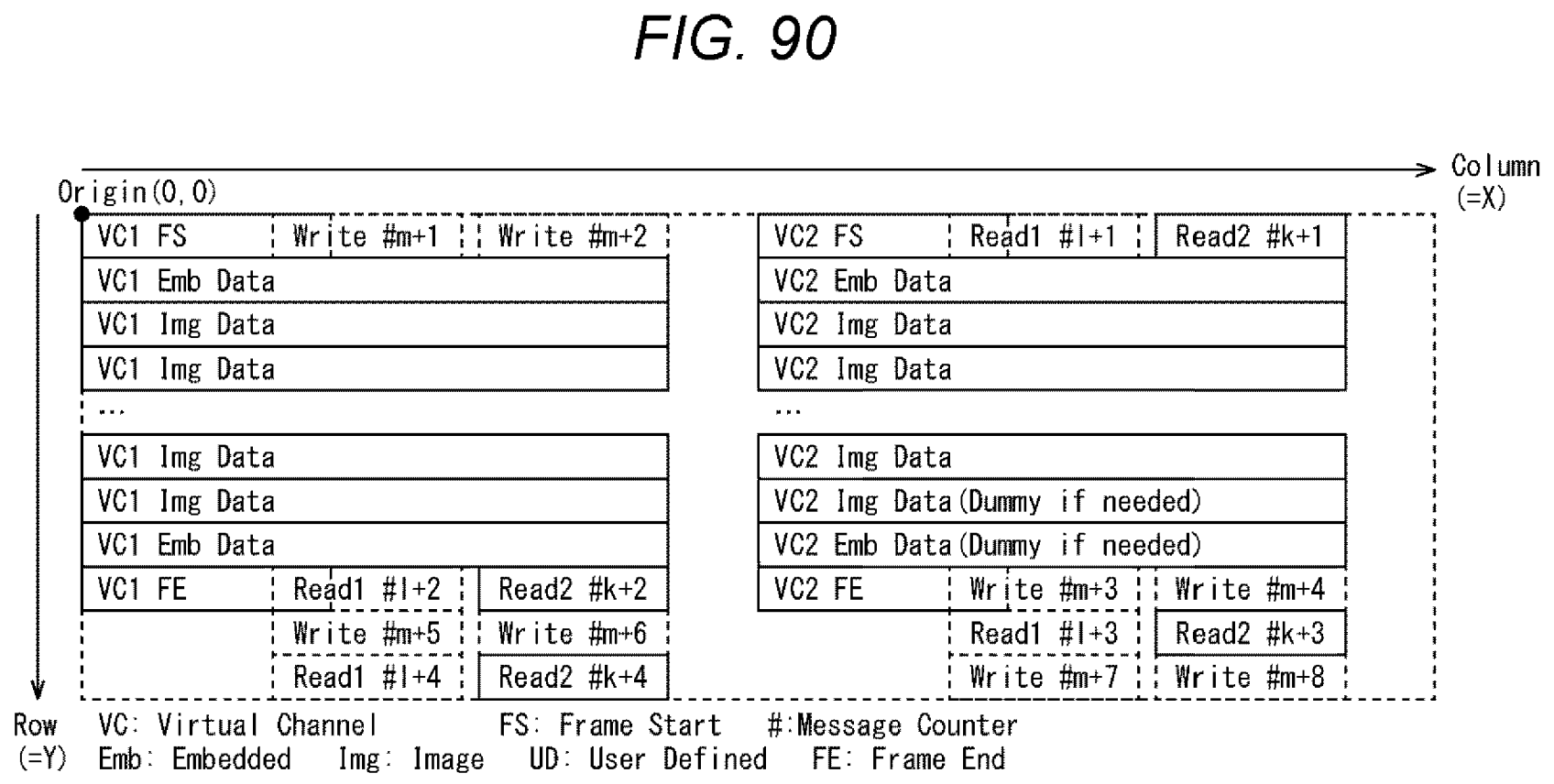

FIG. 90 is a diagram illustrating a second modification example of the data structure of the image data.

FIG. 91 is a diagram illustrating a third modification example of the data structure of the image data.

Figure 92:
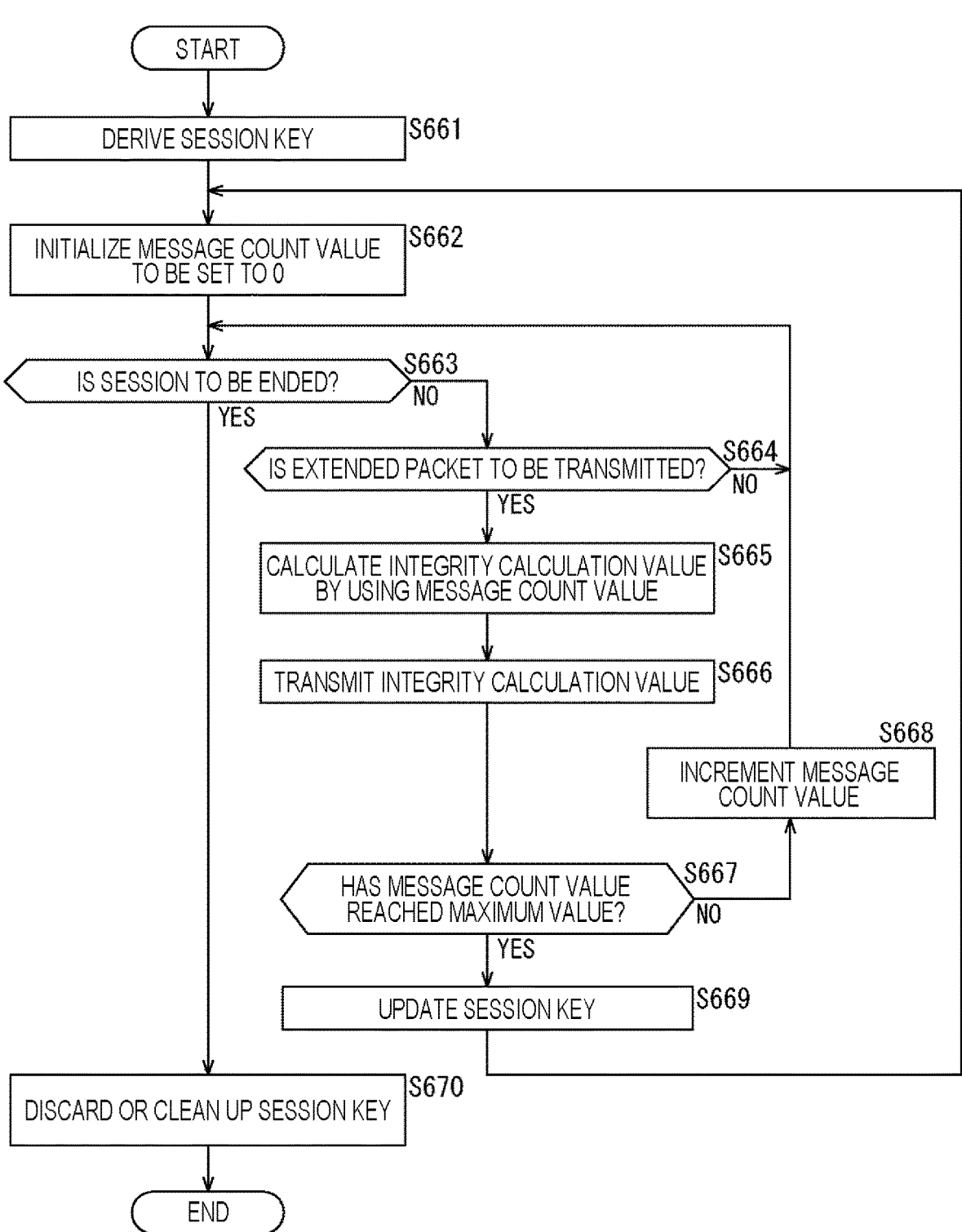

FIG. 92 is a flowchart illustrating a first processing example of integrity calculation value processing.

Figure 93:
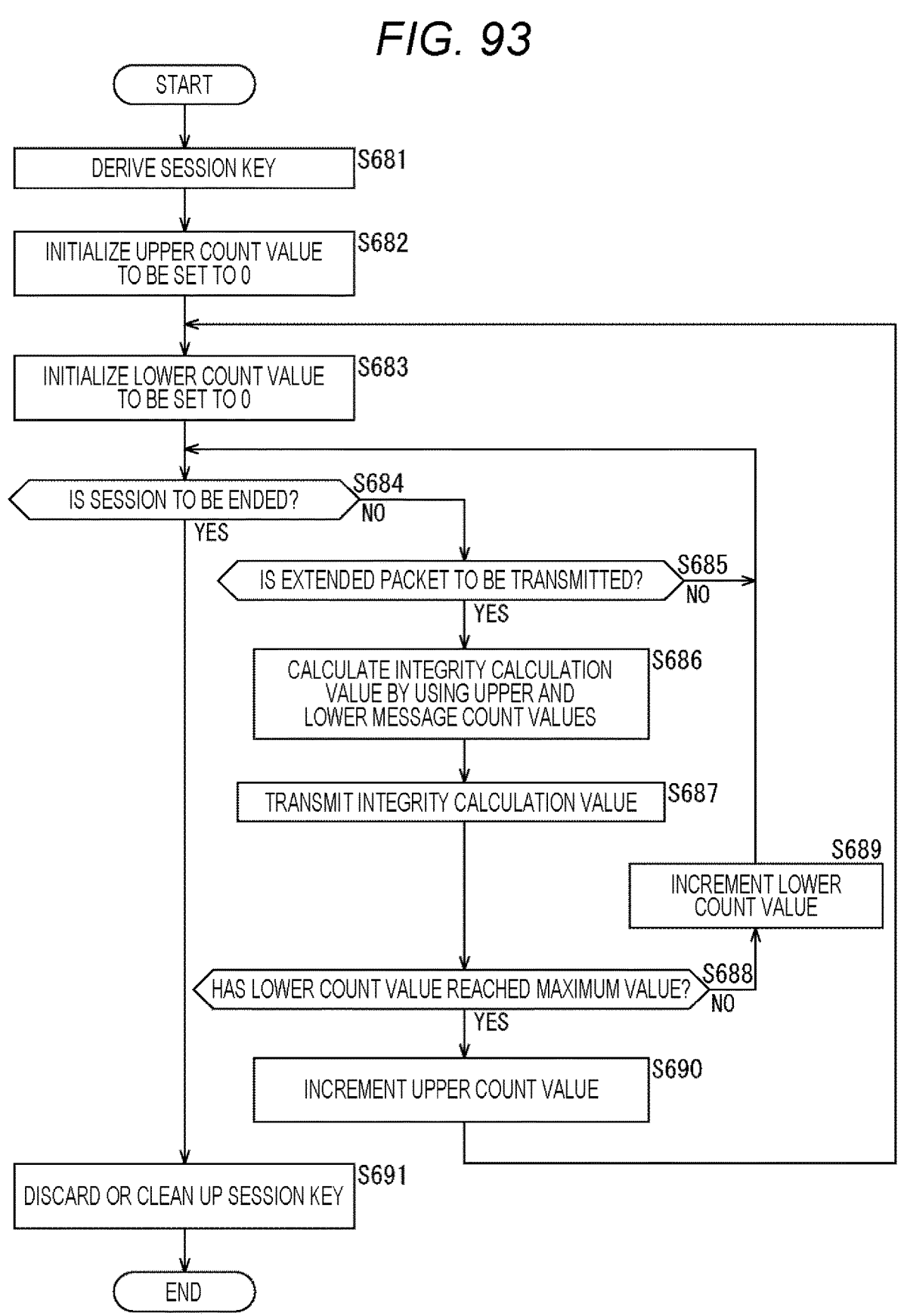

FIG. 93 is a flowchart illustrating a second processing example of the integrity calculation value processing.

Figure 94:
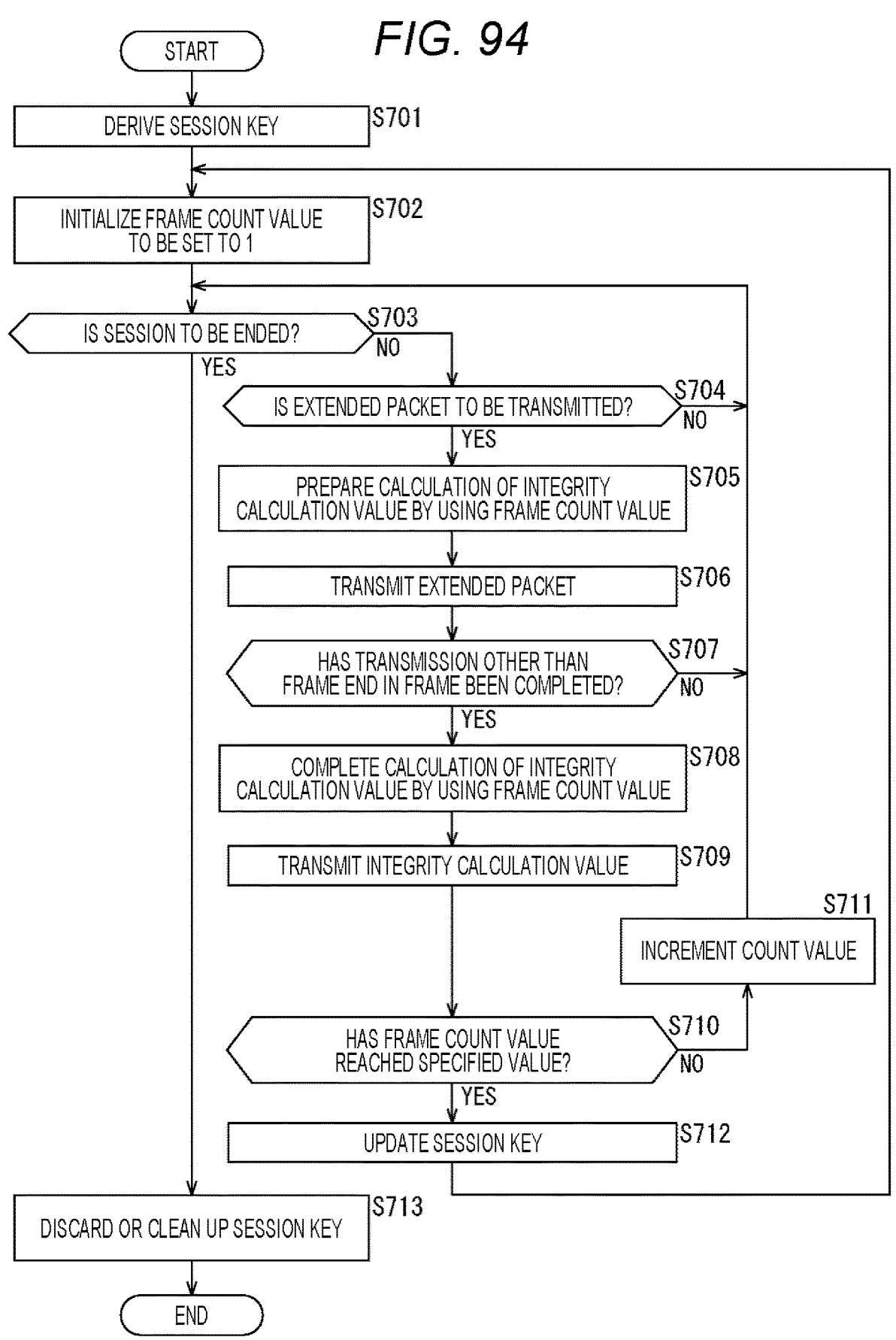

FIG. 94 is a flowchart illustrating a third processing example of the integrity calculation value processing.

Figure 95:
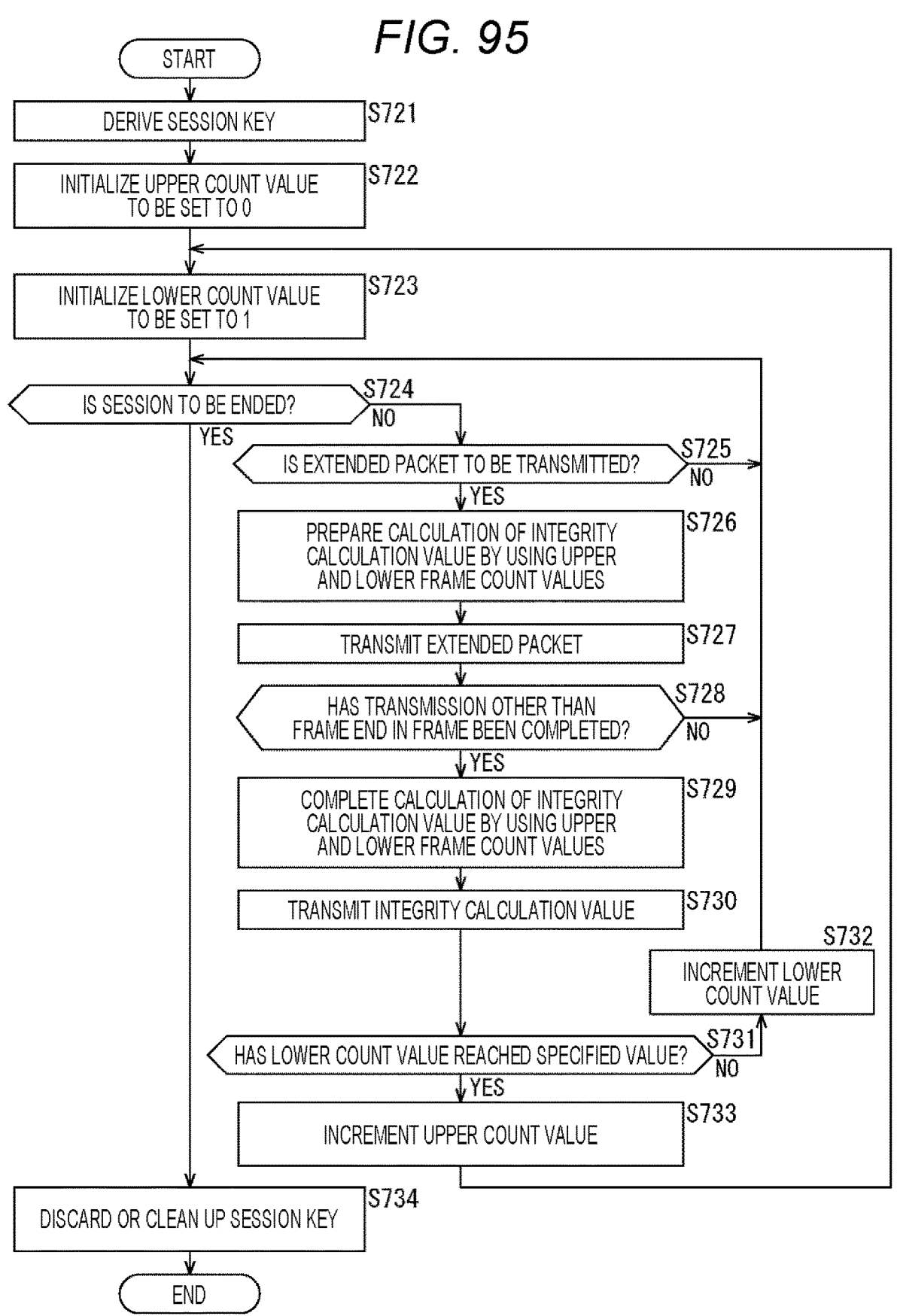

FIG. 95 is a flowchart illustrating a fourth processing example of the integrity calculation value processing.

Figure 96:
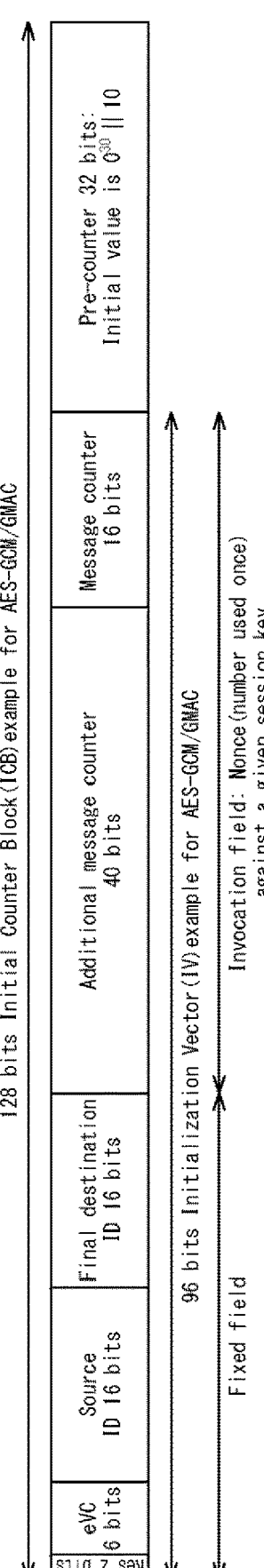

FIG. 96 is a diagram illustrating an example of an initial counter block in which an initialization vector is stored.

Figure 97:
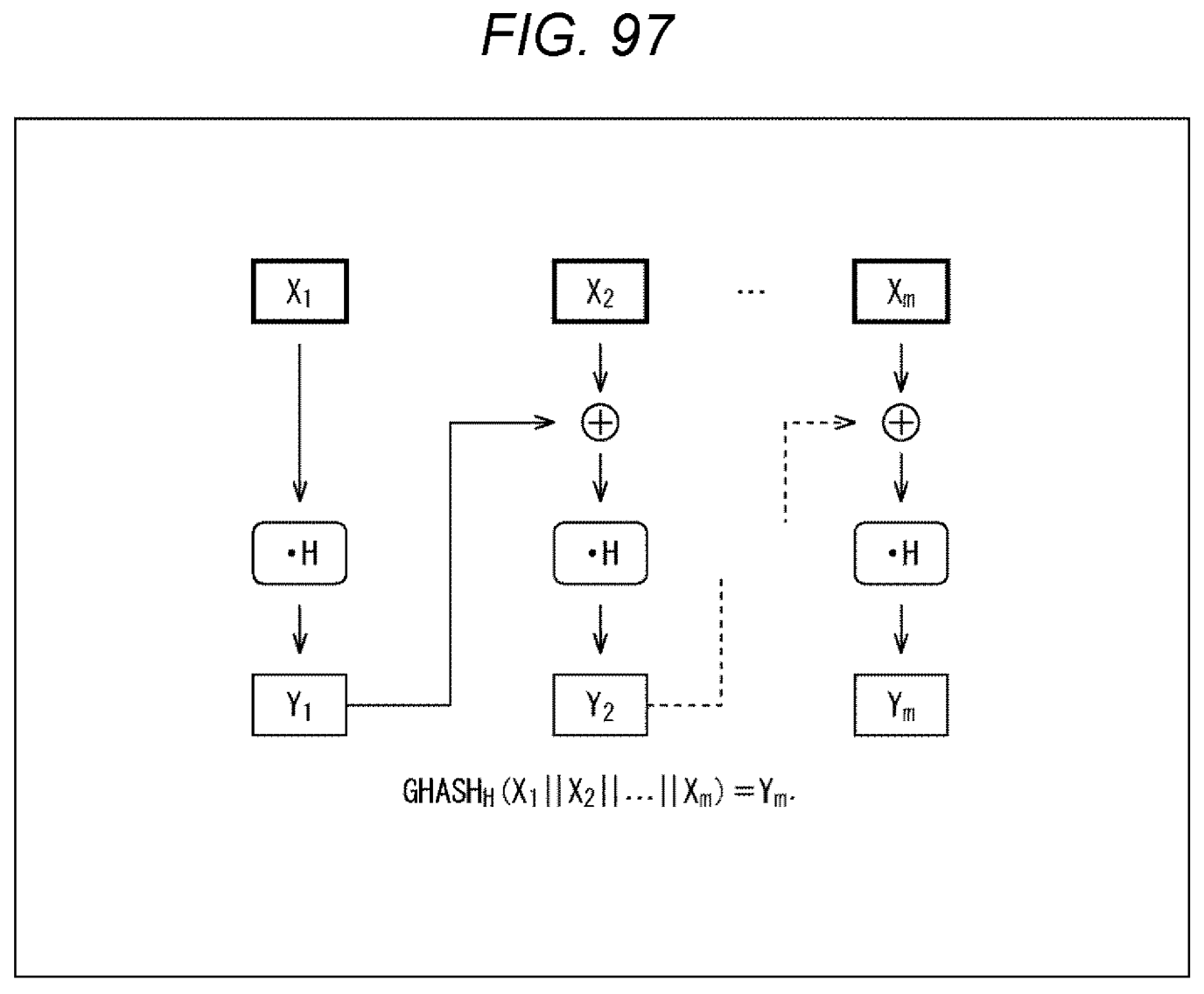

FIG. 97 is a diagram illustrating a GHASH function.

Figure 98:
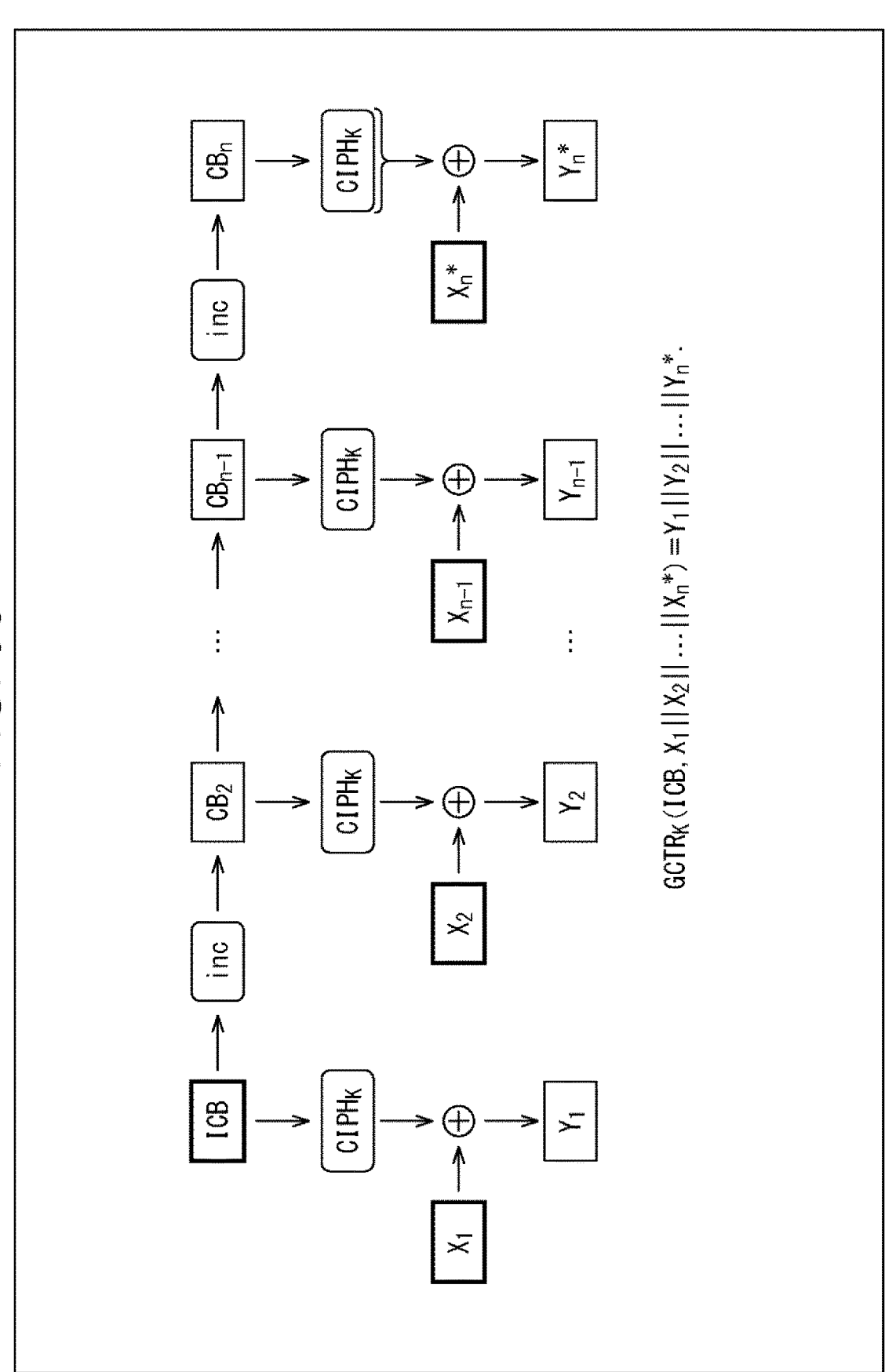

FIG. 98 is a diagram illustrating a GCTR function.

Figure 99:
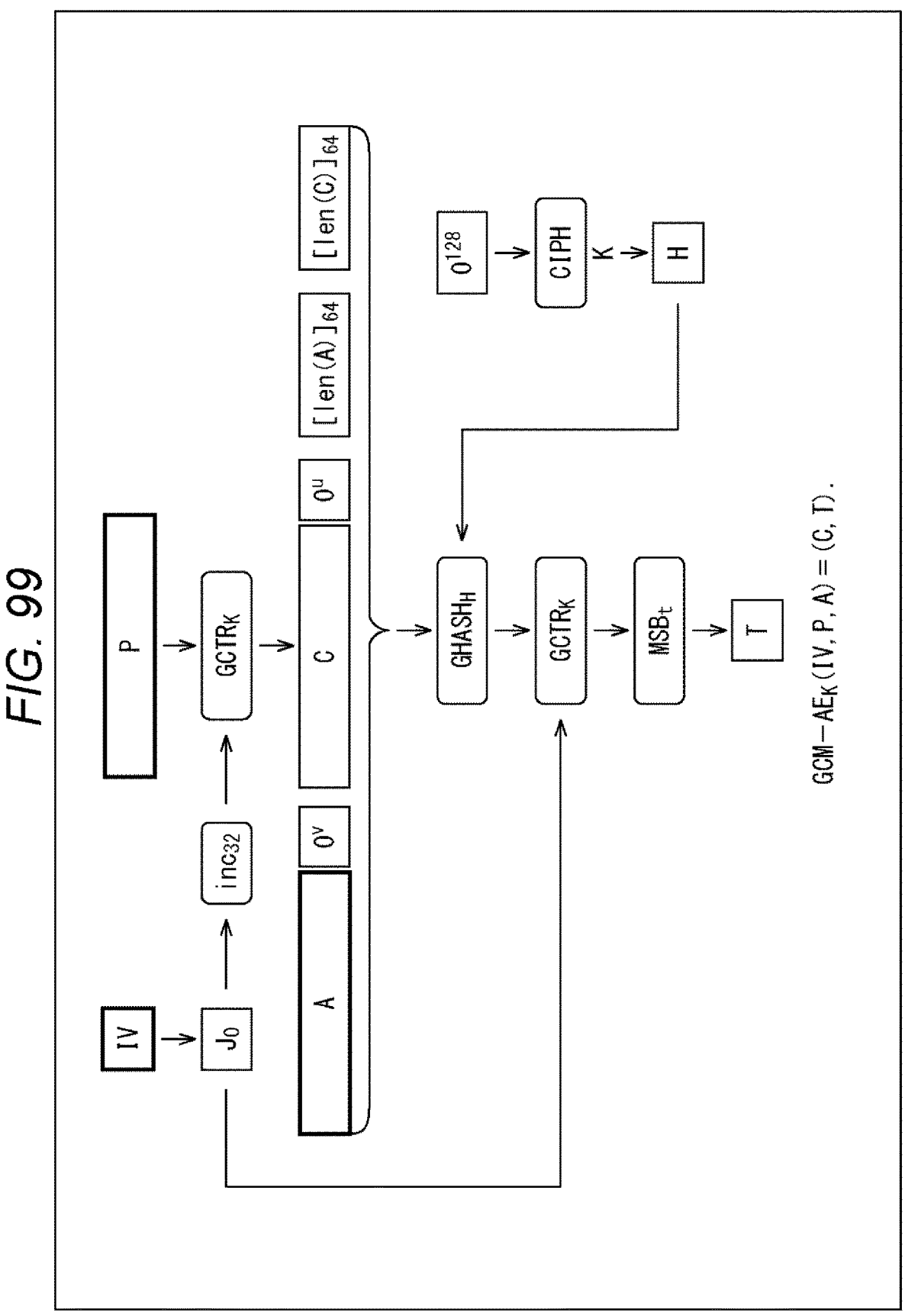

FIG. 99 is a diagram illustrating a GCM-AE function.

Figure 100:
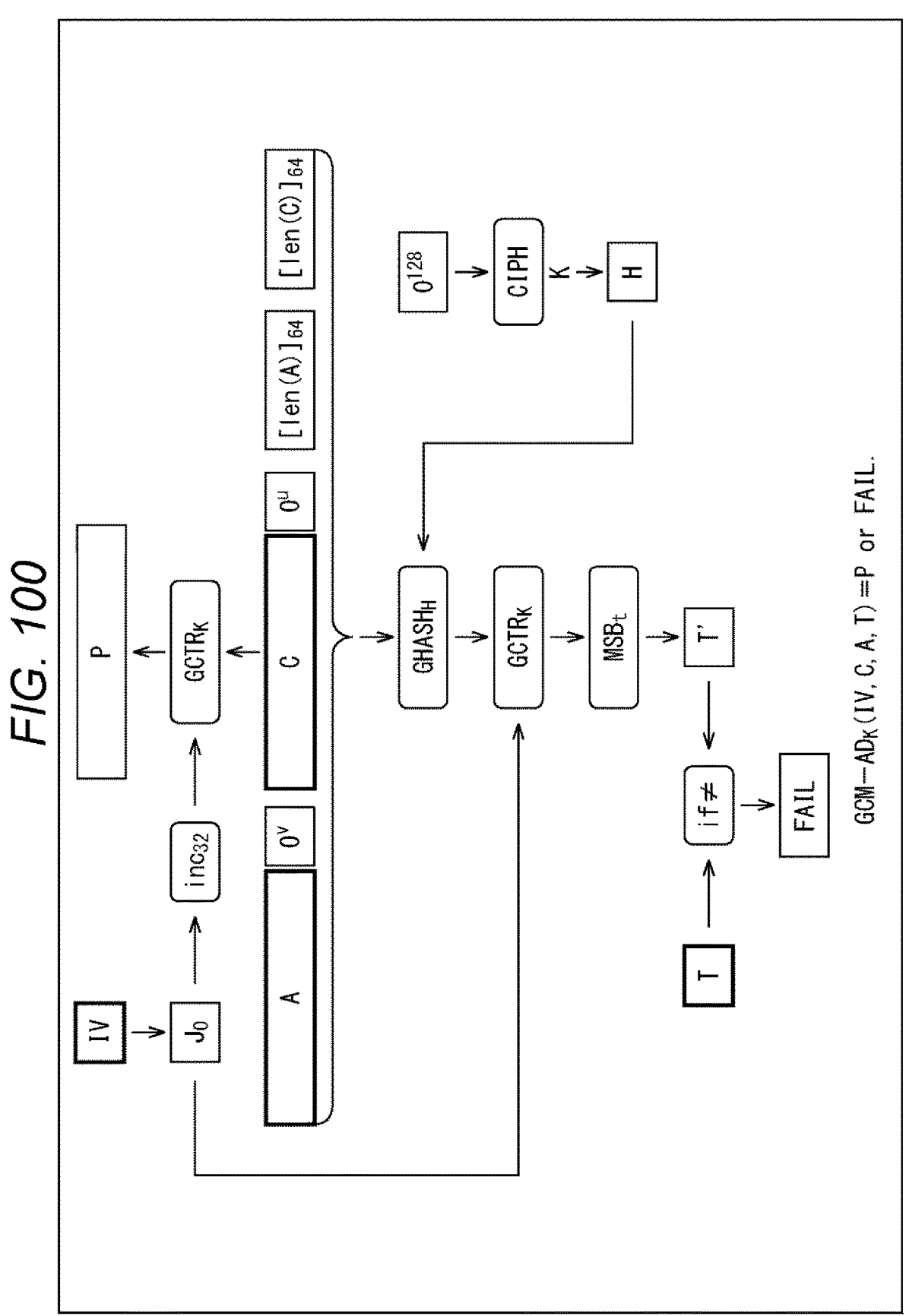

FIG. 100 is a diagram illustrating a GCM-AD function.

Figure 101:
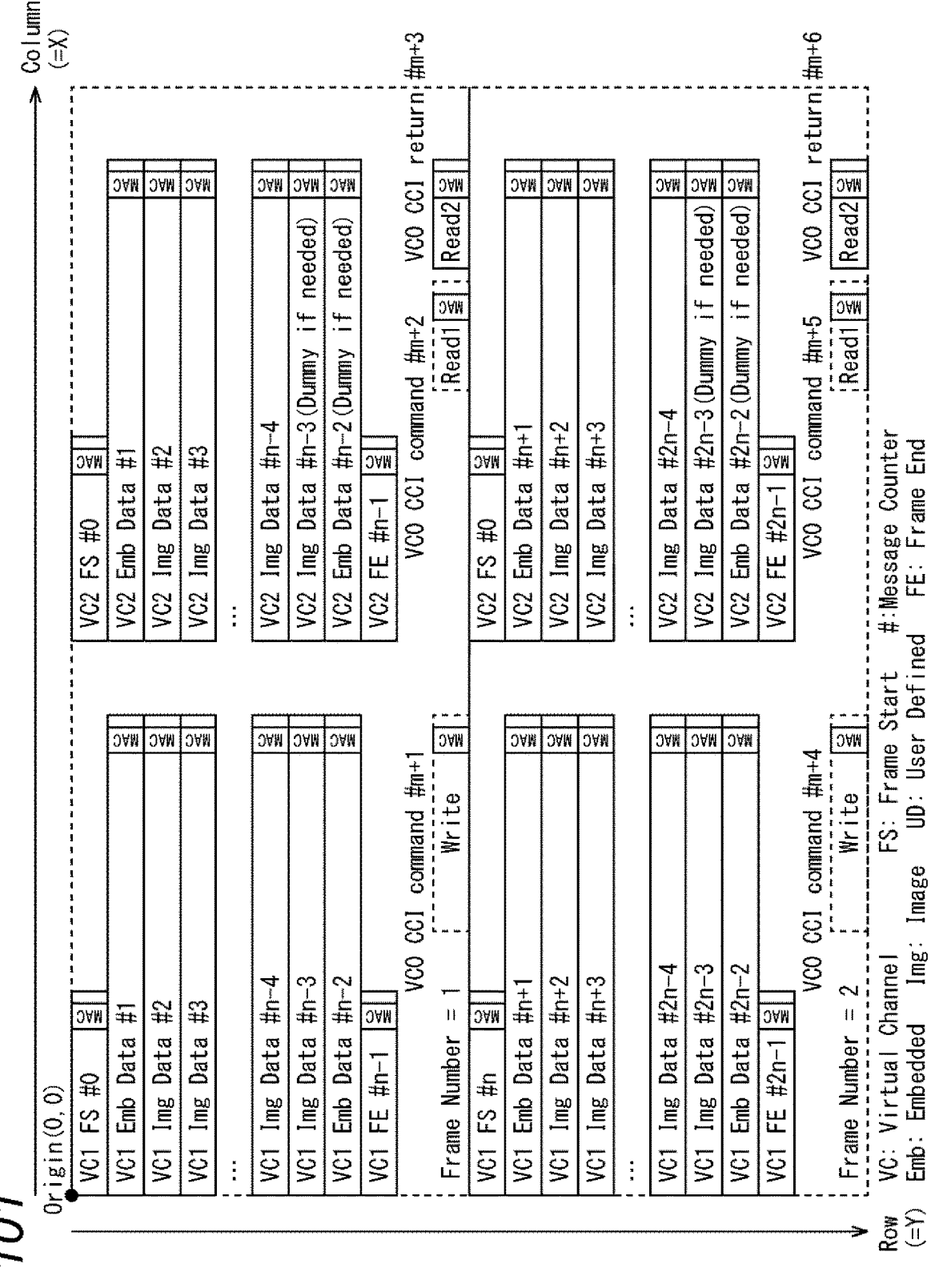

FIG. 101 is a diagram illustrating an example of a data structure of image data for transmitting integrity calculation value MAC for each line.

FIG. 102 is a diagram illustrating an example of an initialization vector.

Figure 103:
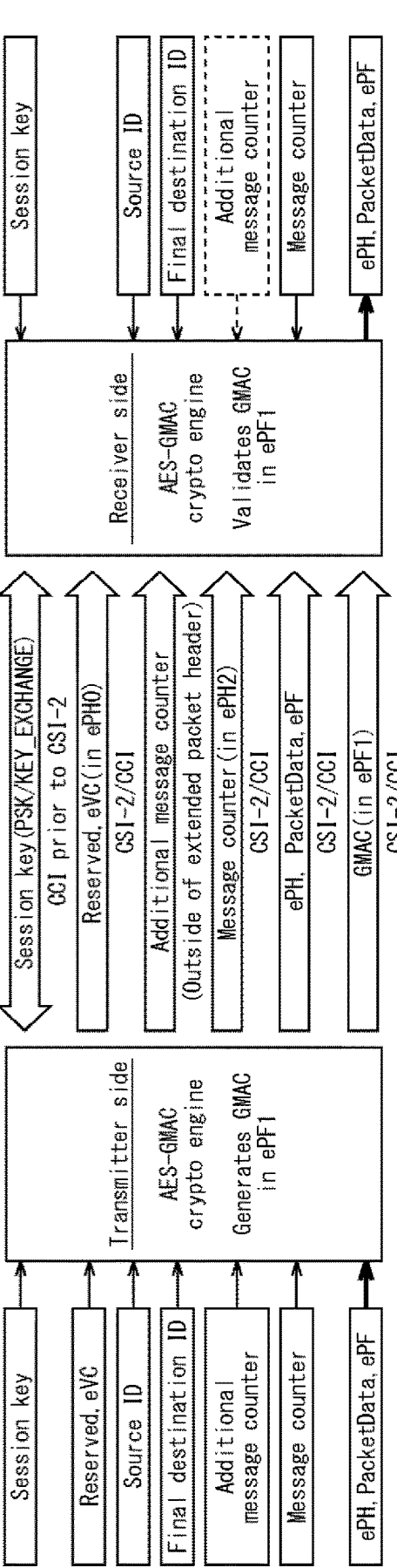

FIG. 103 is a diagram illustrating an example of transmitting an initialization vector from a transmission side to a reception side.

Figure 104:
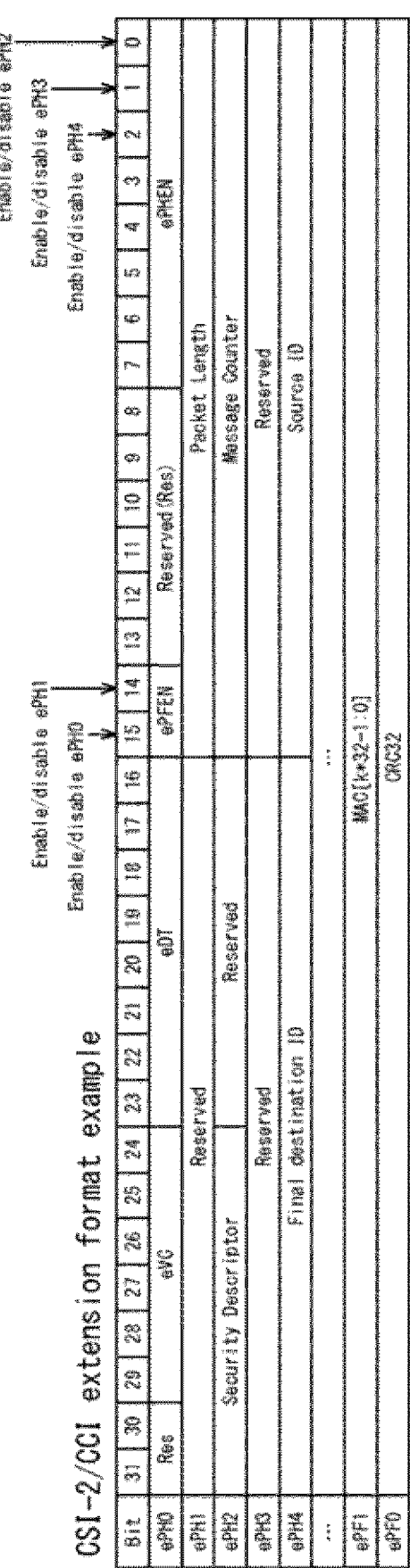

FIG. 104 is a diagram illustrating an example of an extended format of CSI-2 or CCI.

Figure 105:
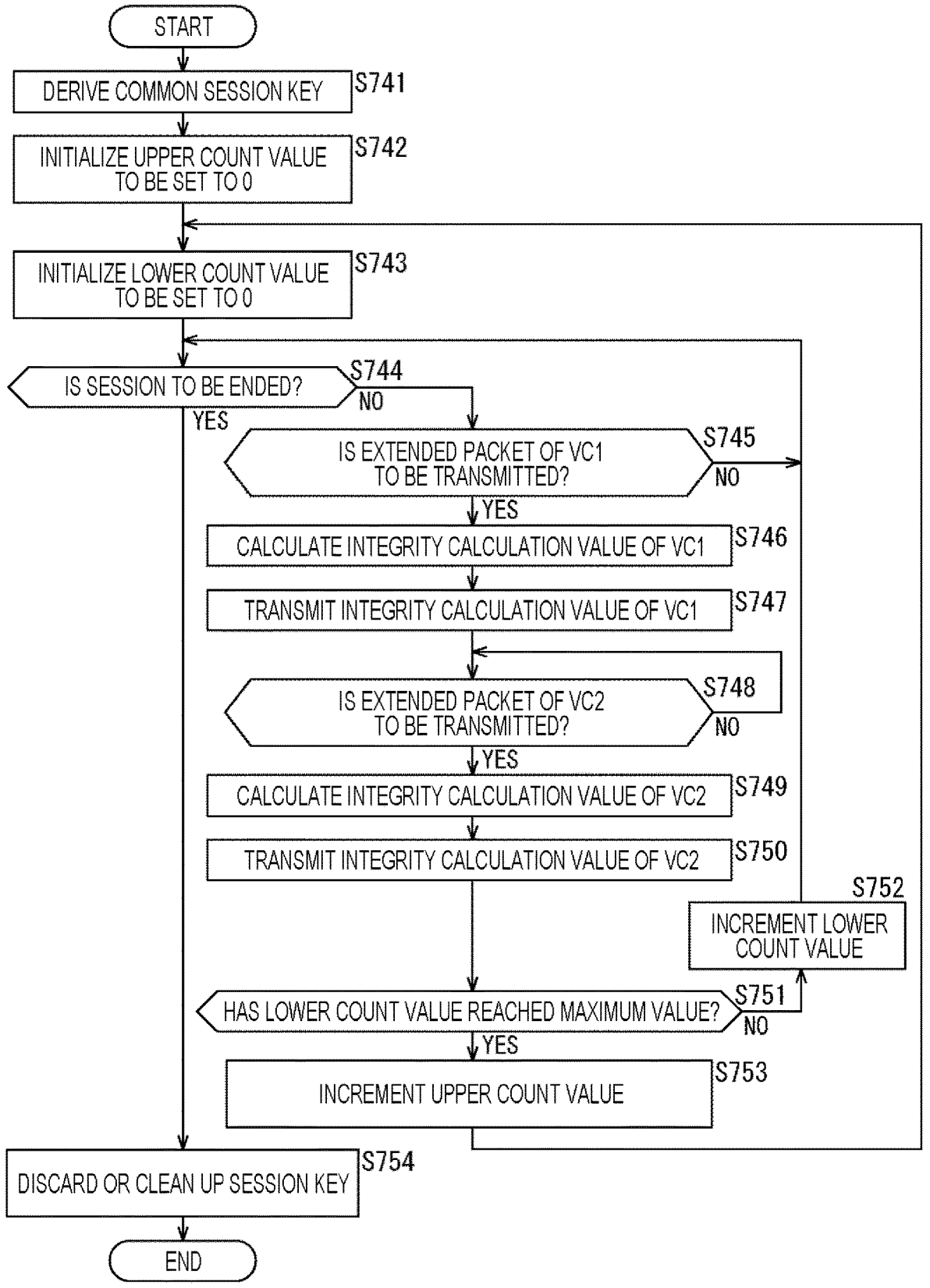

FIG. 105 is a flowchart illustrating a transmission process based on a line MAC method.

Figure 106:
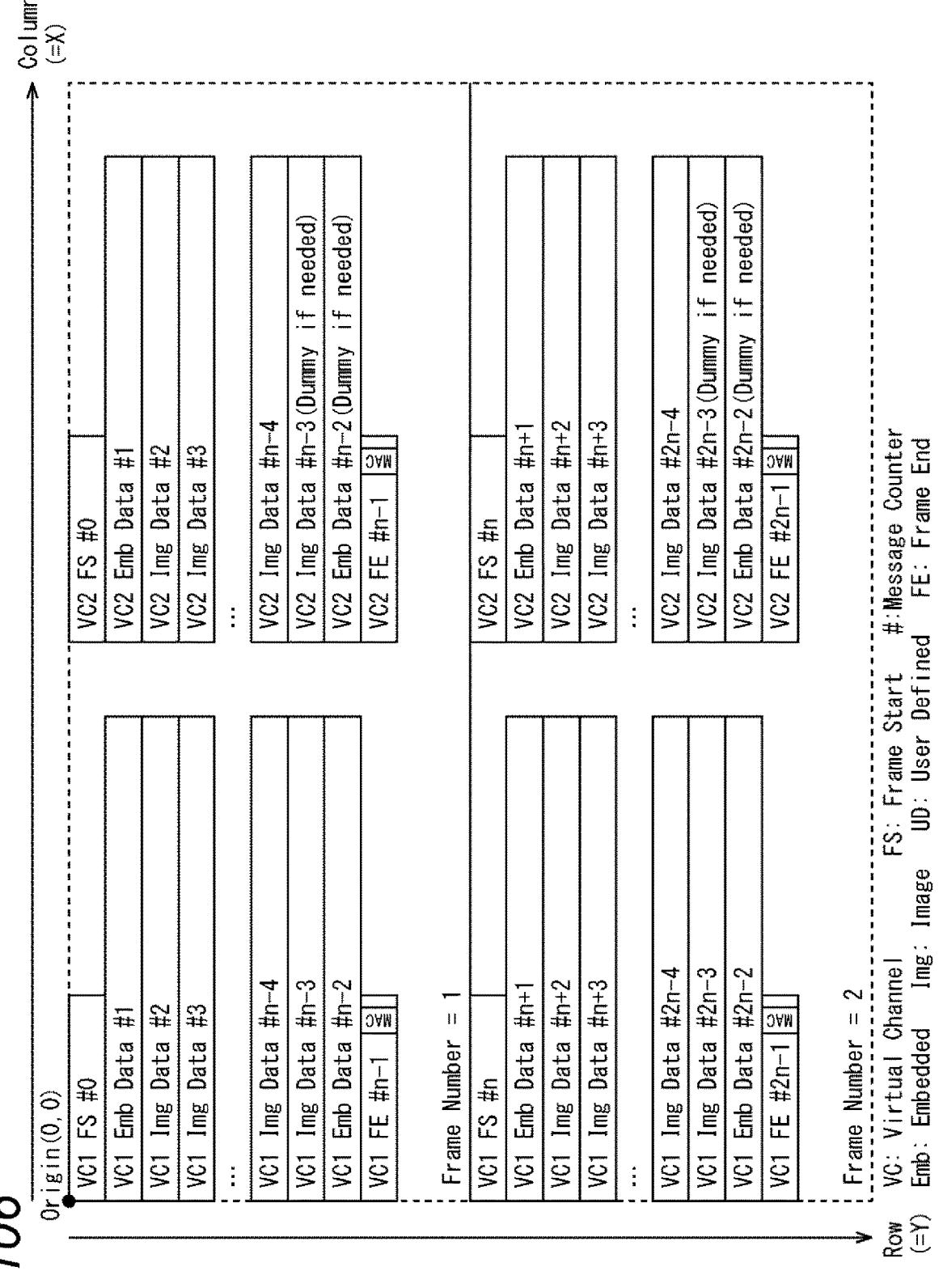

FIG. 106 is a diagram illustrating an example of a data structure of image data in which integrity calculation value MAC is arranged for each frame.

FIG. 107 is a diagram illustrating an example of an initialization vector.

Figure 108:
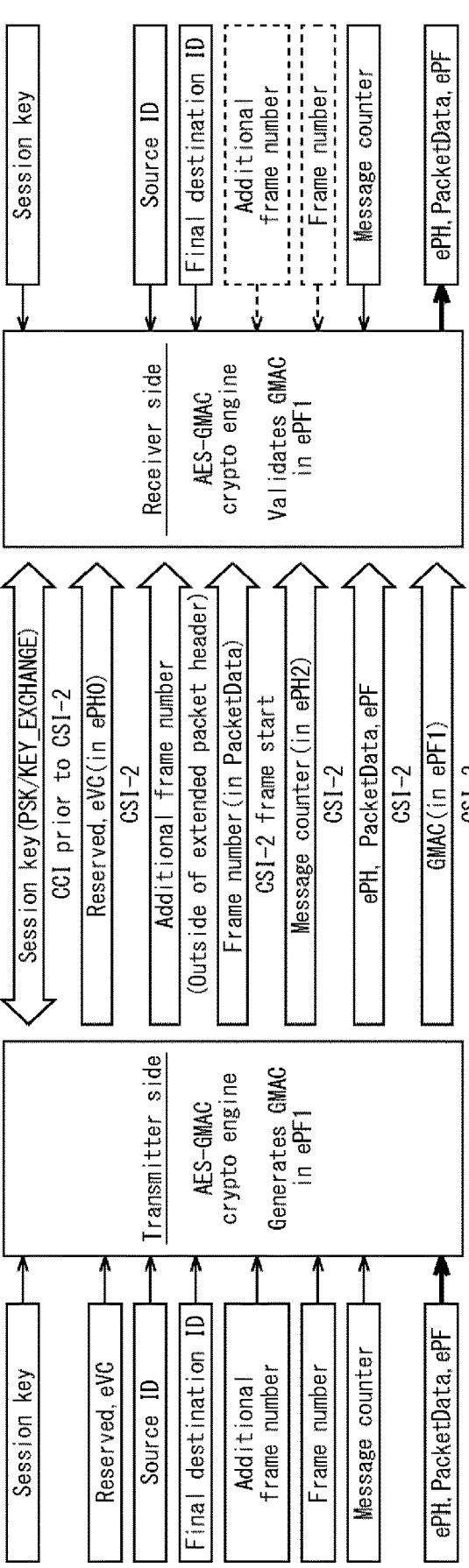

FIG. 108 is a diagram illustrating an example of transmitting an initialization vector from a transmission side to a reception side.

FIG. 109 is a flowchart illustrating a transmission process based on a frame MAC method.

Figure 110:
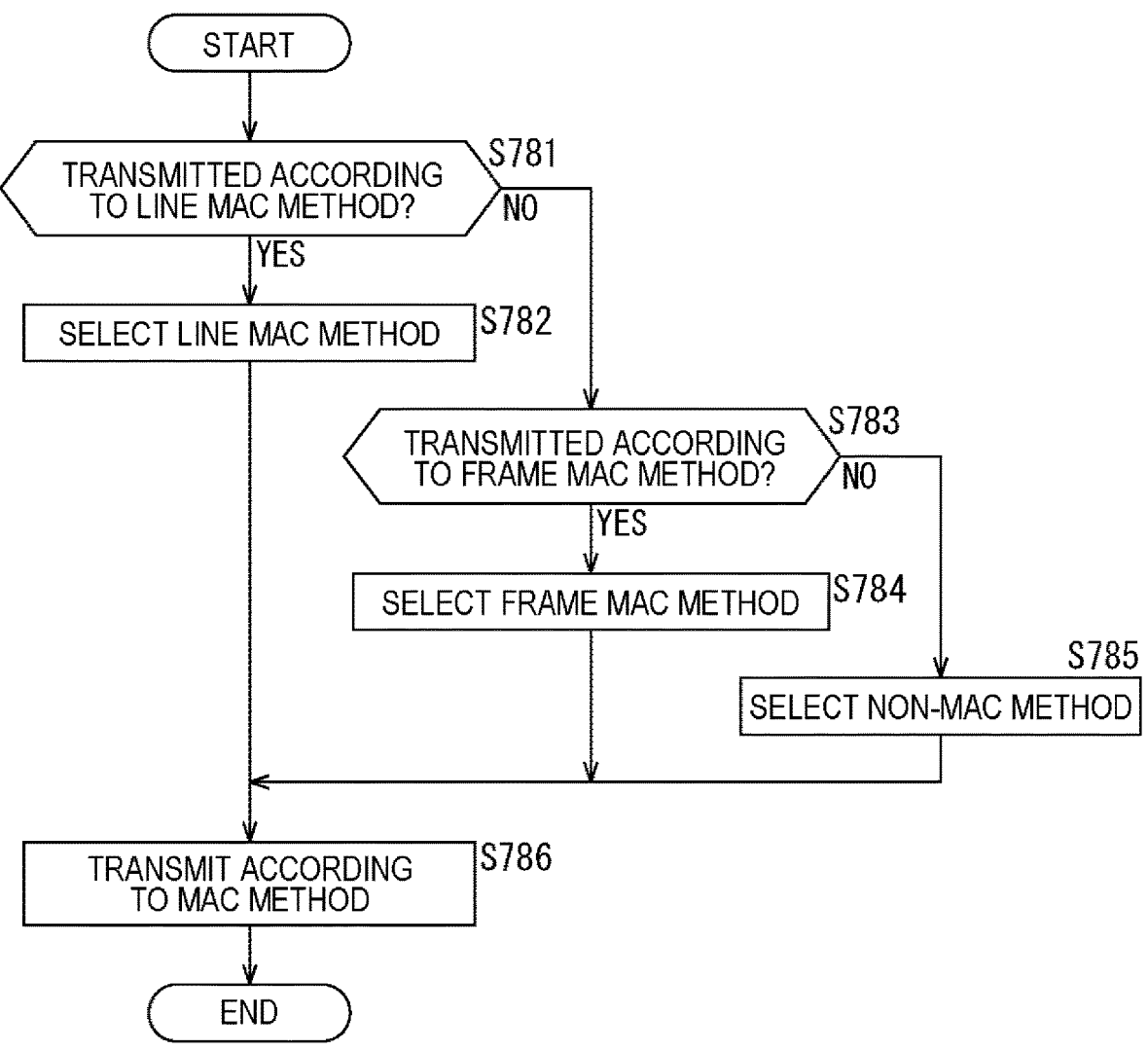

FIG. 110 is a flowchart for describing a selection process.

FIG. 111 is a diagram illustrating an example of security MAC information.

FIGS. 112A and 112B are diagrams illustrating an example of a rollover cycle of a message count value and a frame count value.

FIGS. 113A, 113B, 113C, 113D, and 113E are diagrams for describing a configuration of an initialization vector.

Figure 114:
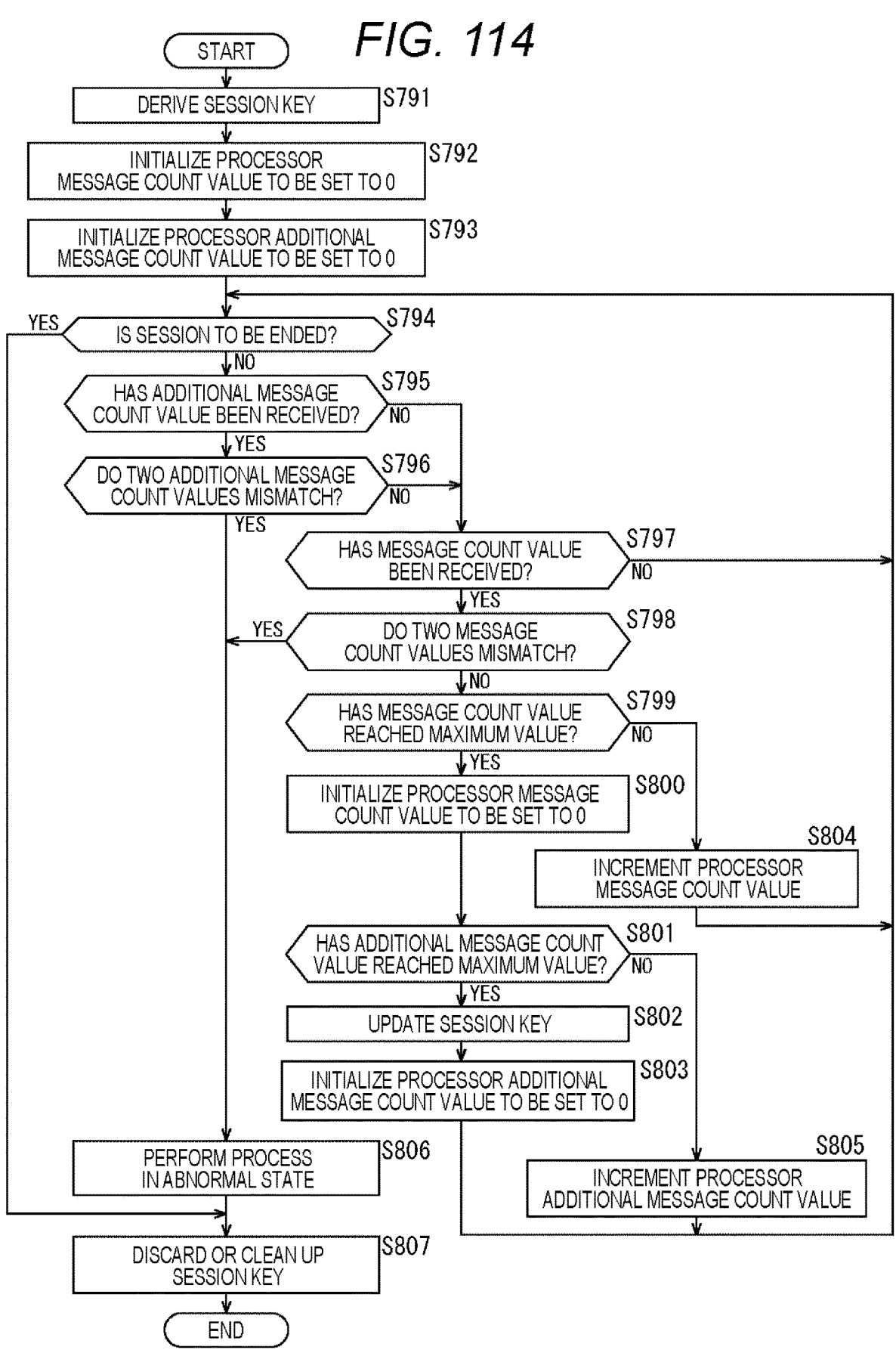

FIG. 114 is a flowchart for describing a data verification process.

Figure 115:
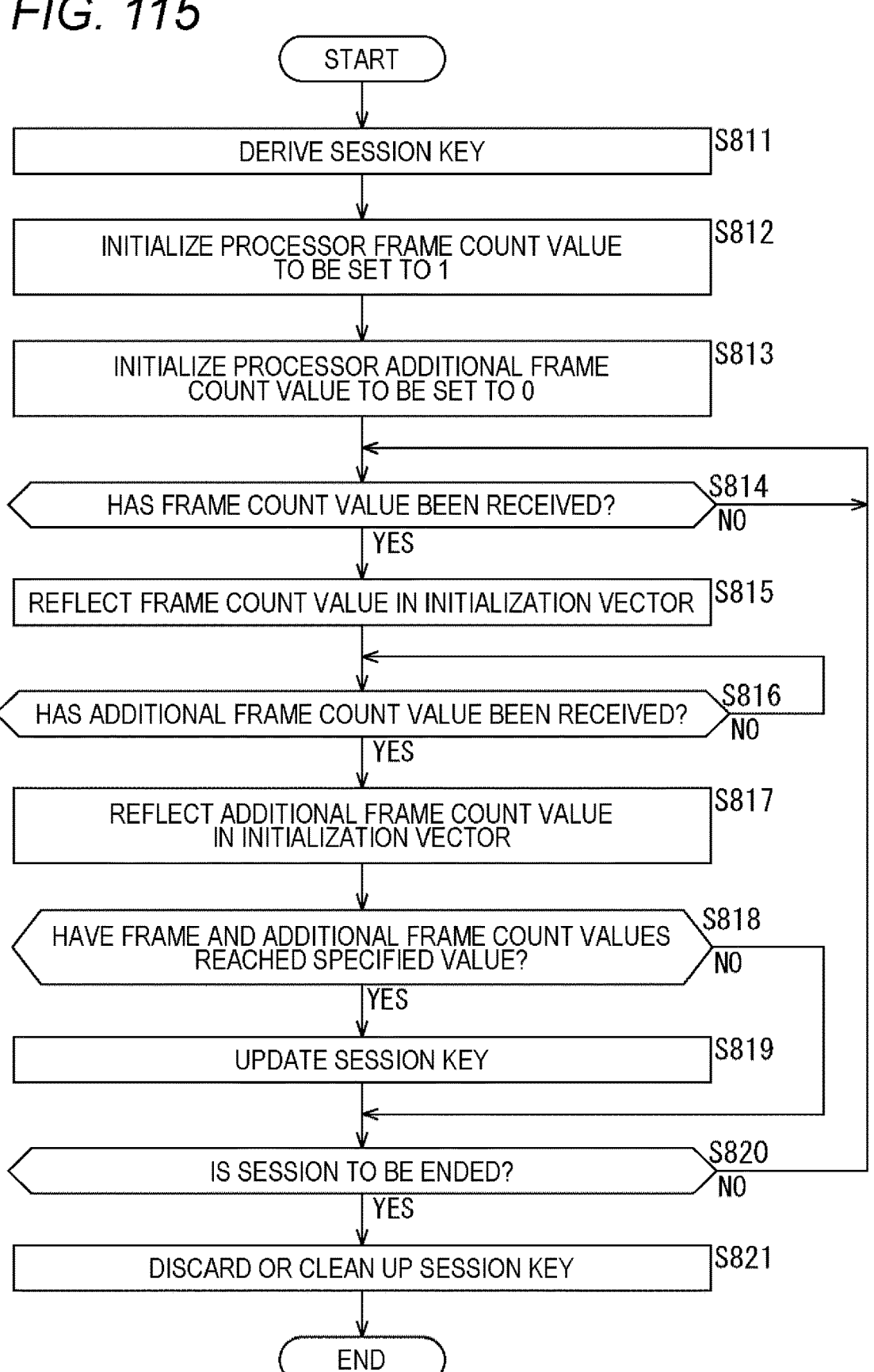

FIG. 115 is a diagram illustrating a reflection process.

FIG. 116 is a diagram illustrating an example of a security protocol.

Figure 117A:
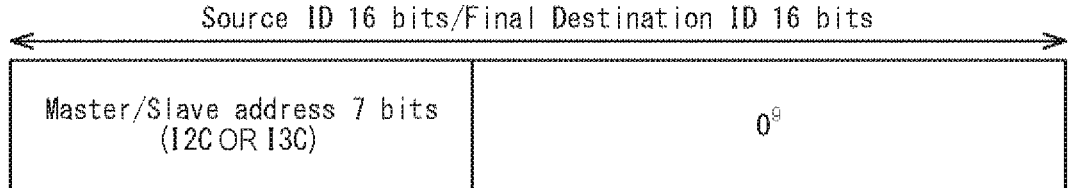
Figure 117B:
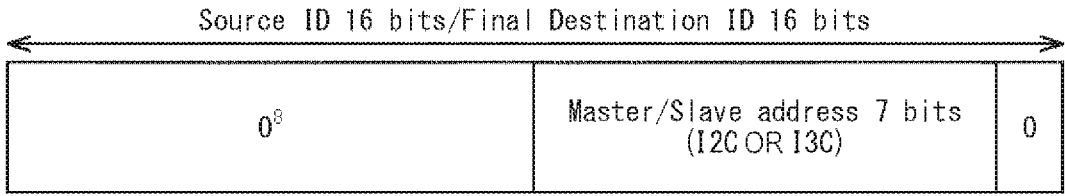

FIGS. 117A and 117B are diagrams illustrating an example of a source ID or a final destination ID.

Figure 118:
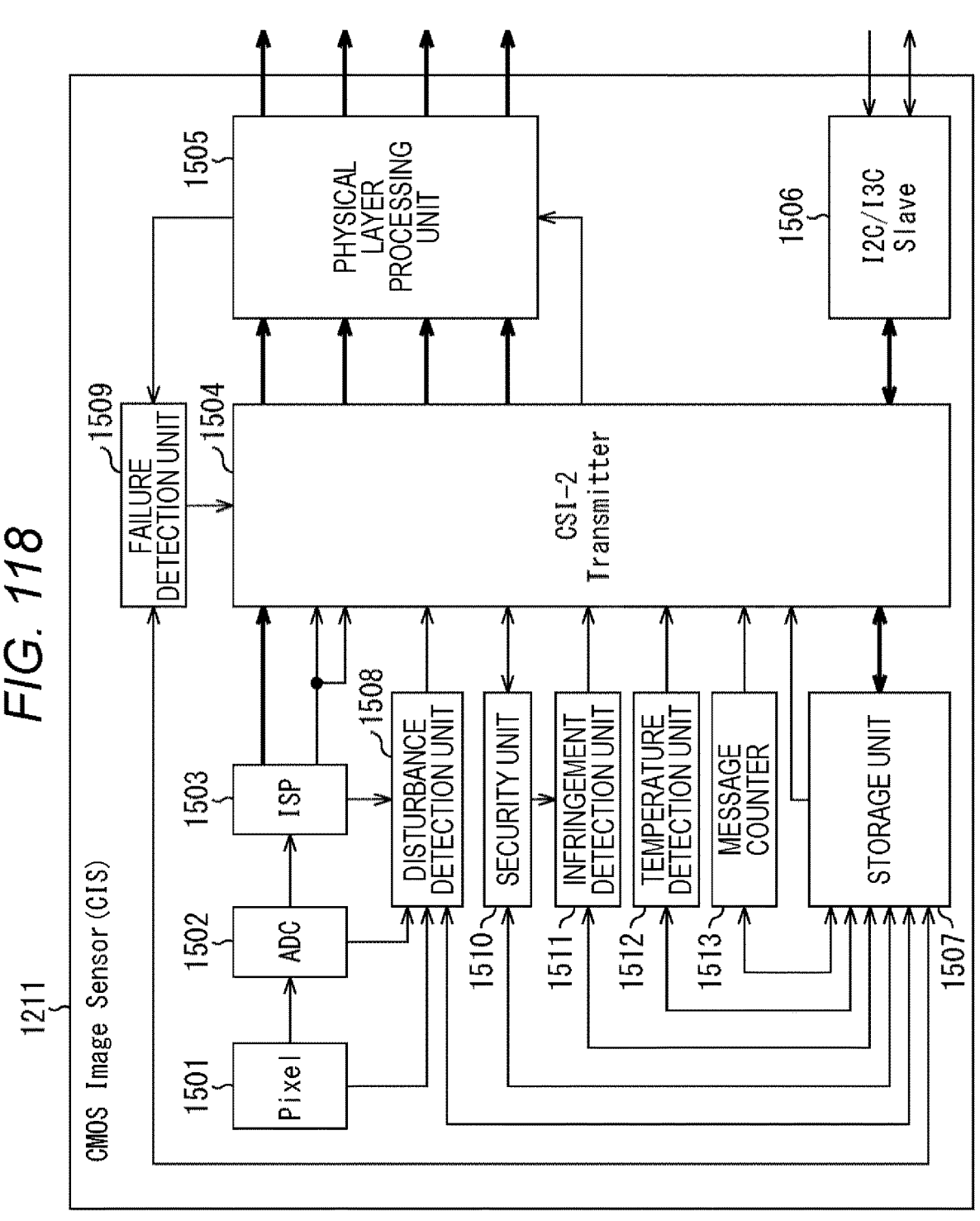

FIG. 118 is a block diagram illustrating a detailed configuration example of the image sensor that diagnoses the presence or absence of abnormality of the image sensor.

Figure 119:
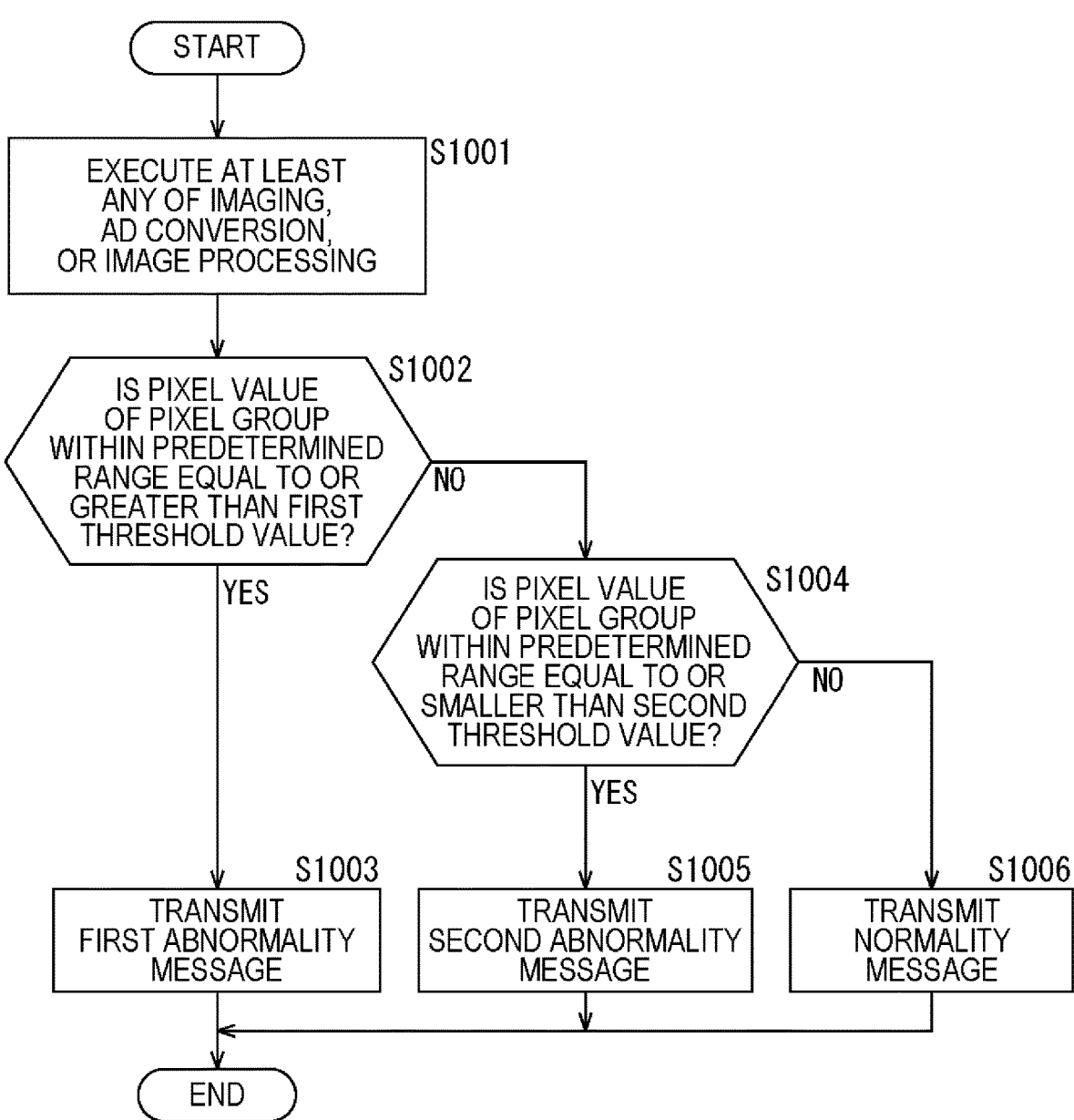

FIG. 119 is a flowchart for describing a disturbance detection process (part 1) performed by a disturbance detection unit.

FIG. 120 is a diagram illustrating a storage method in a case where a light emission pattern (light reception pattern) is stored as a storage pattern when a distance measuring sensor based on a ToF method is implemented by the image sensor.

Figure 121:
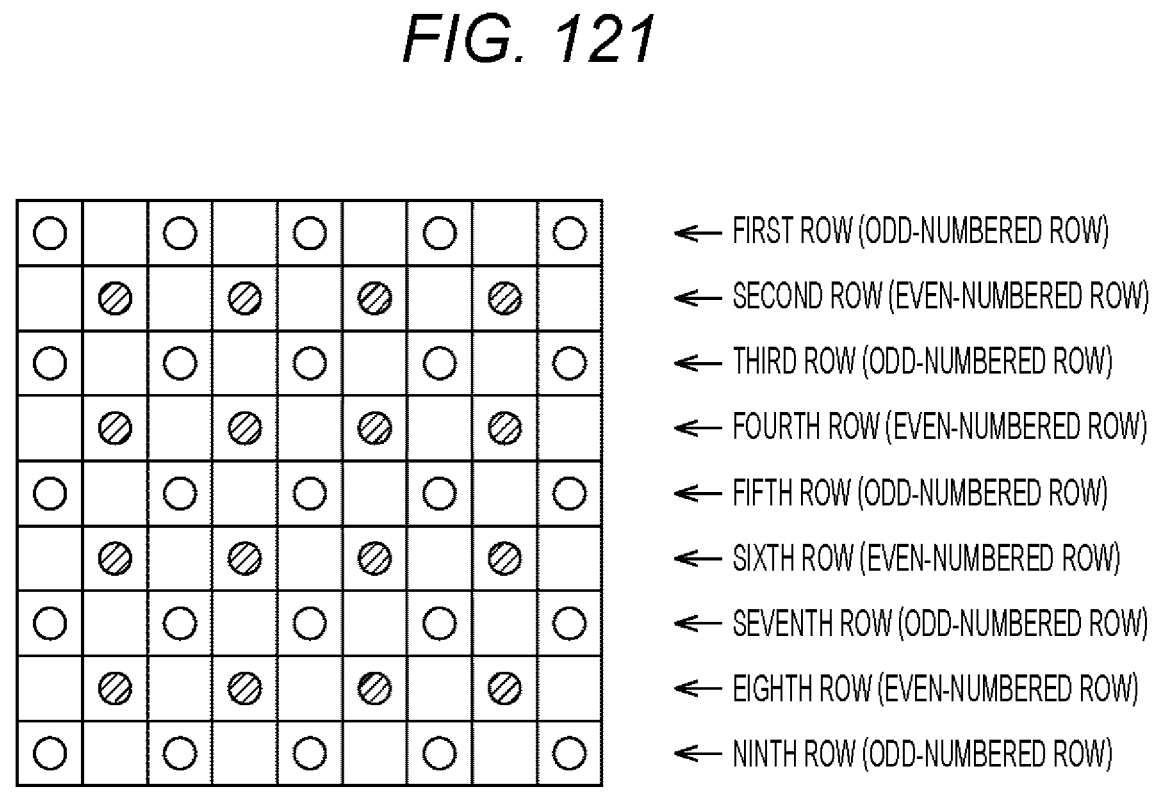

FIG. 121 is a diagram illustrating a storage method in a case where a light emission pattern (light reception pattern) is stored as a storage pattern when the distance measuring sensor based on the ToF method is implemented by the image sensor.

Figure 122:
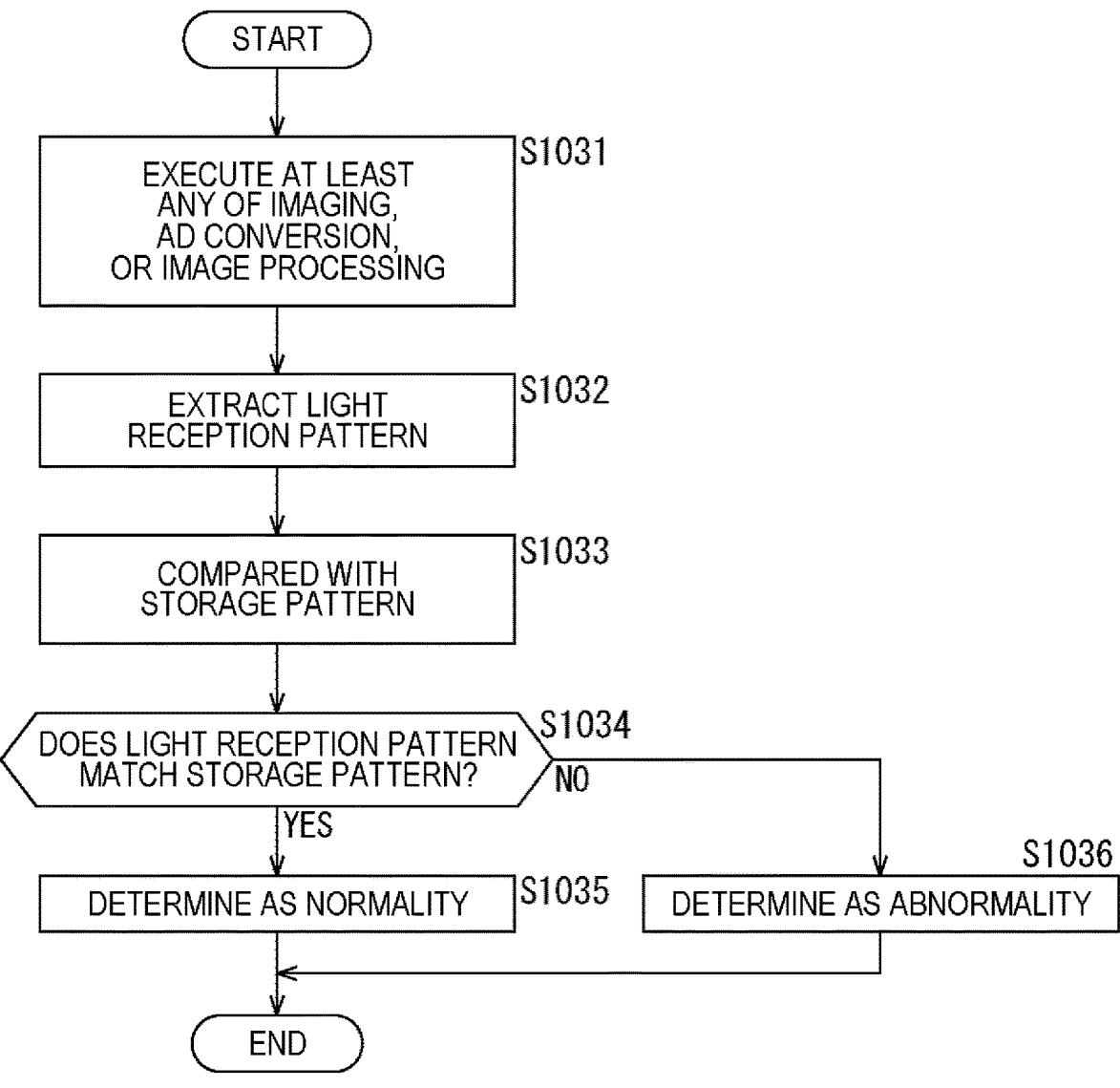

FIG. 122 is a flowchart for describing a disturbance detection process (part 2) performed by the disturbance detection unit.

Figure 123:
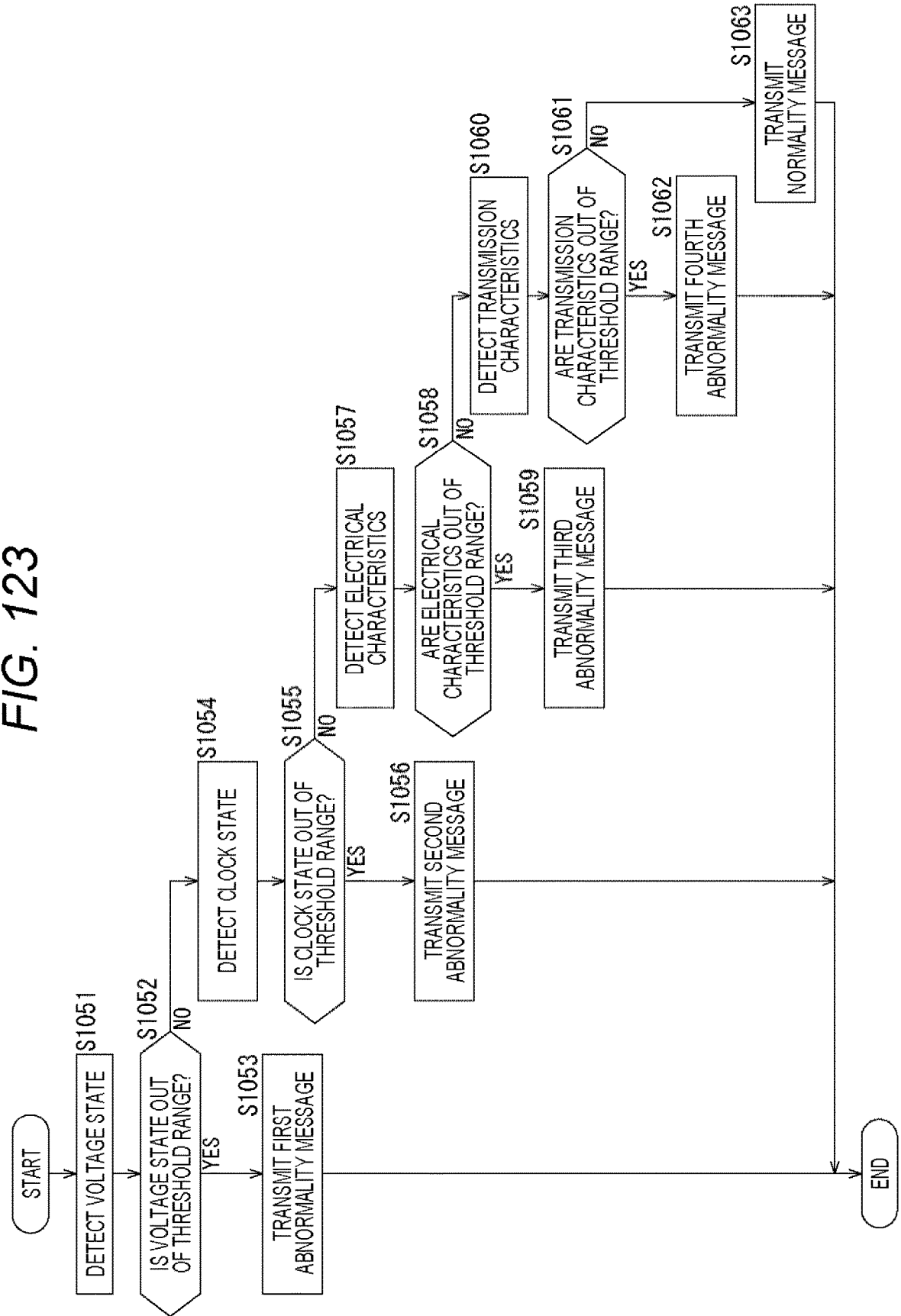

FIG. 123 is a flowchart for describing a failure detection process by a failure detection unit.

Figure 124:
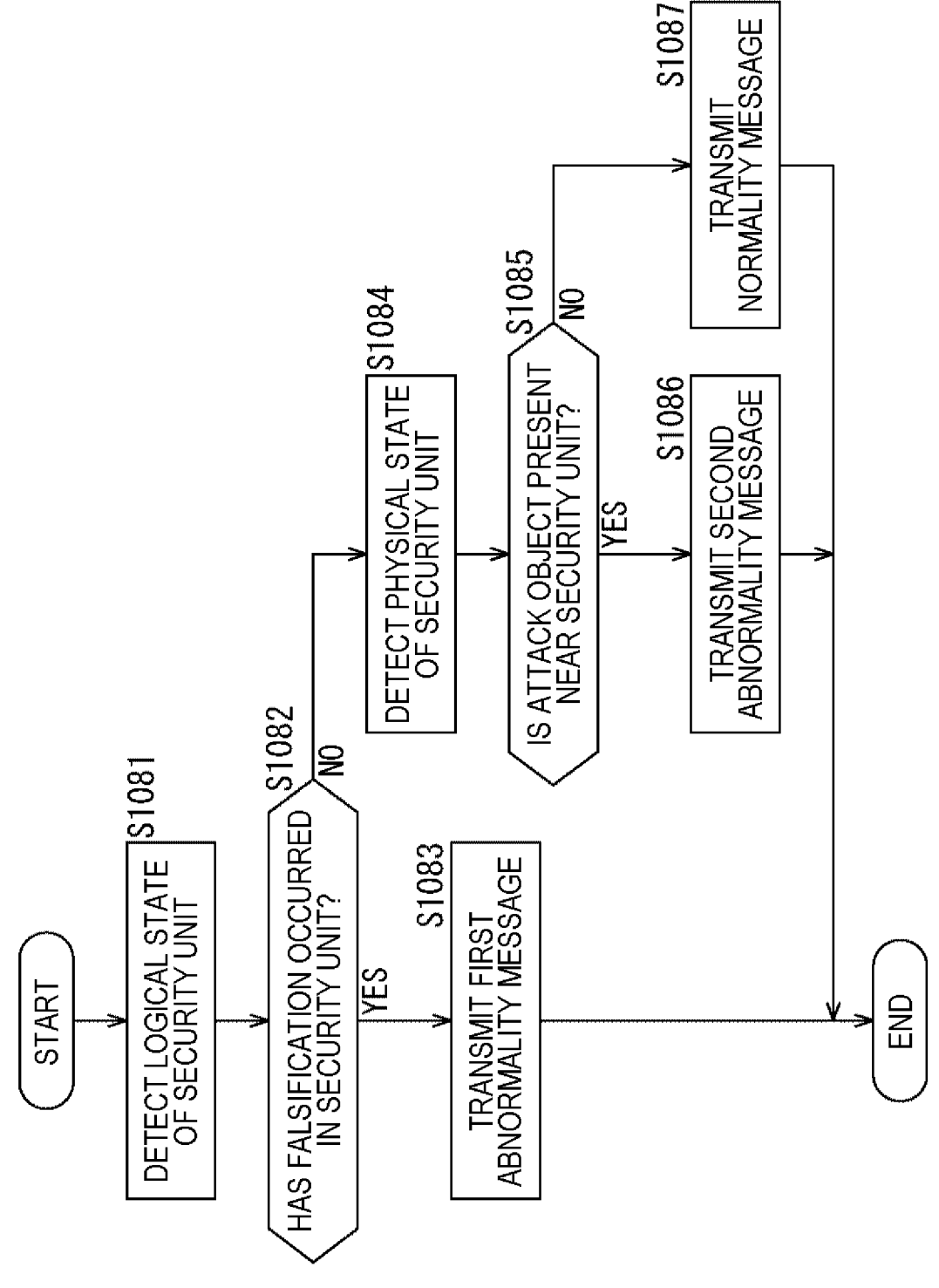

FIG. 124 is a flowchart illustrating a process in which an infringement detection unit detects an abnormality of a security unit.

FIG. 125 is a flowchart illustrating an abnormality detection process performed by a temperature measurement unit.

Figure 126:
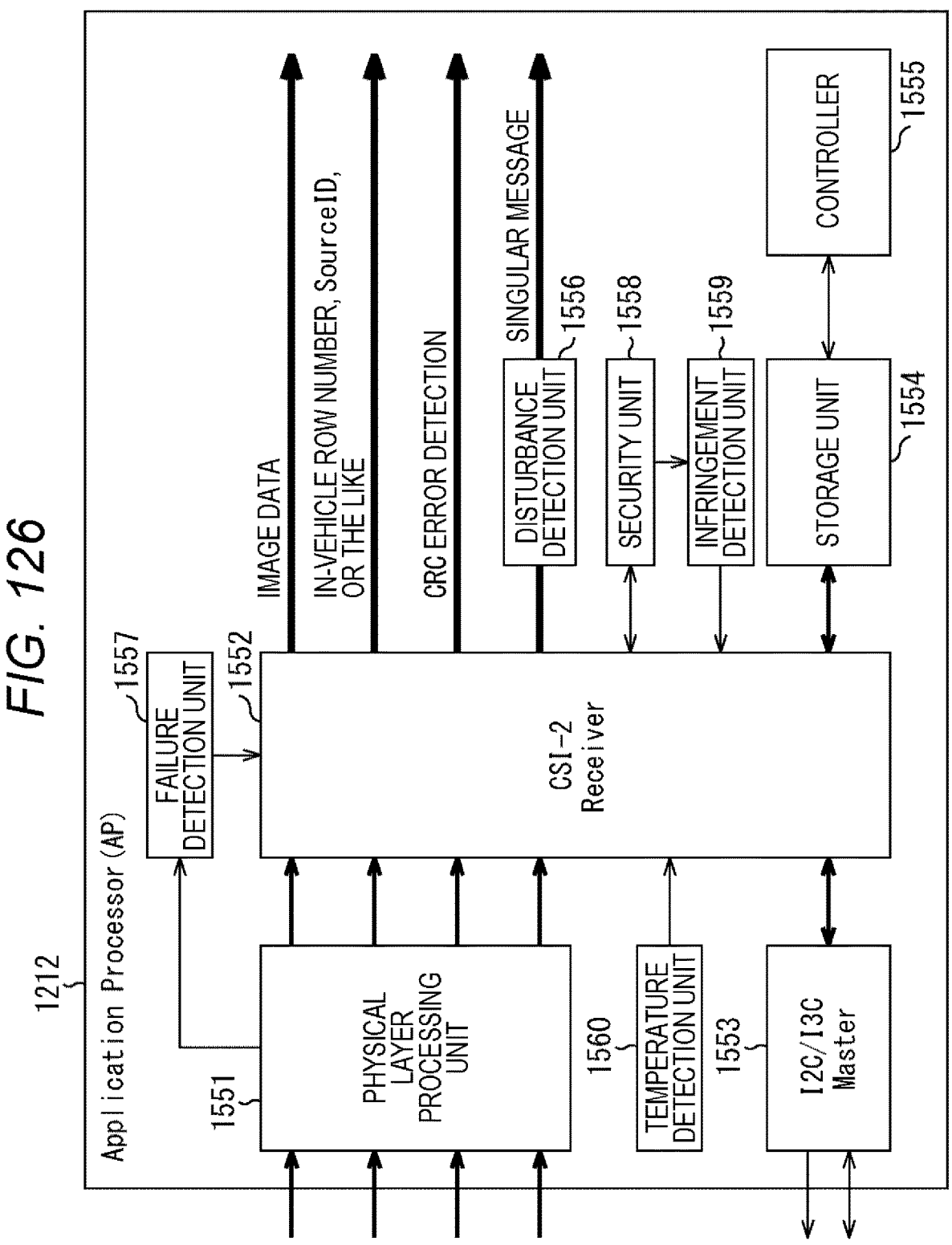

FIG. 126 is a block diagram illustrating a detailed configuration example of the application processor that detects the presence or absence of abnormality of the image sensor.

Figure 127:
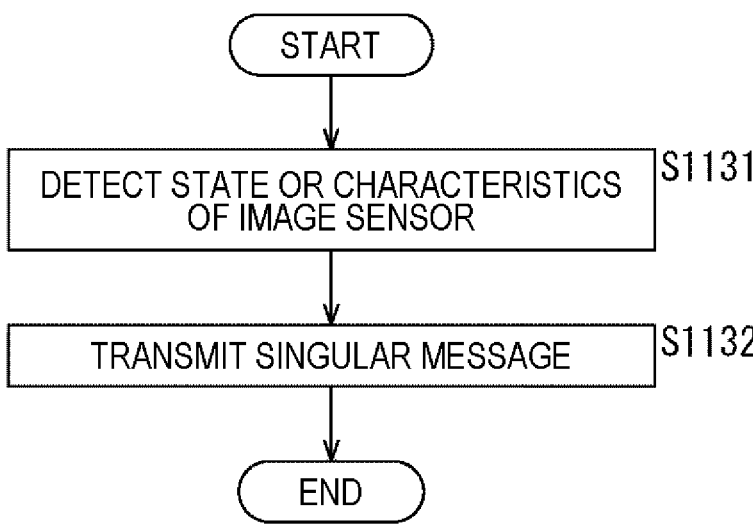

FIG. 127 is a flowchart illustrating a process of the image sensor when the application processor performs a process of detecting the presence or absence of abnormality of the image sensor.

Figure 128:
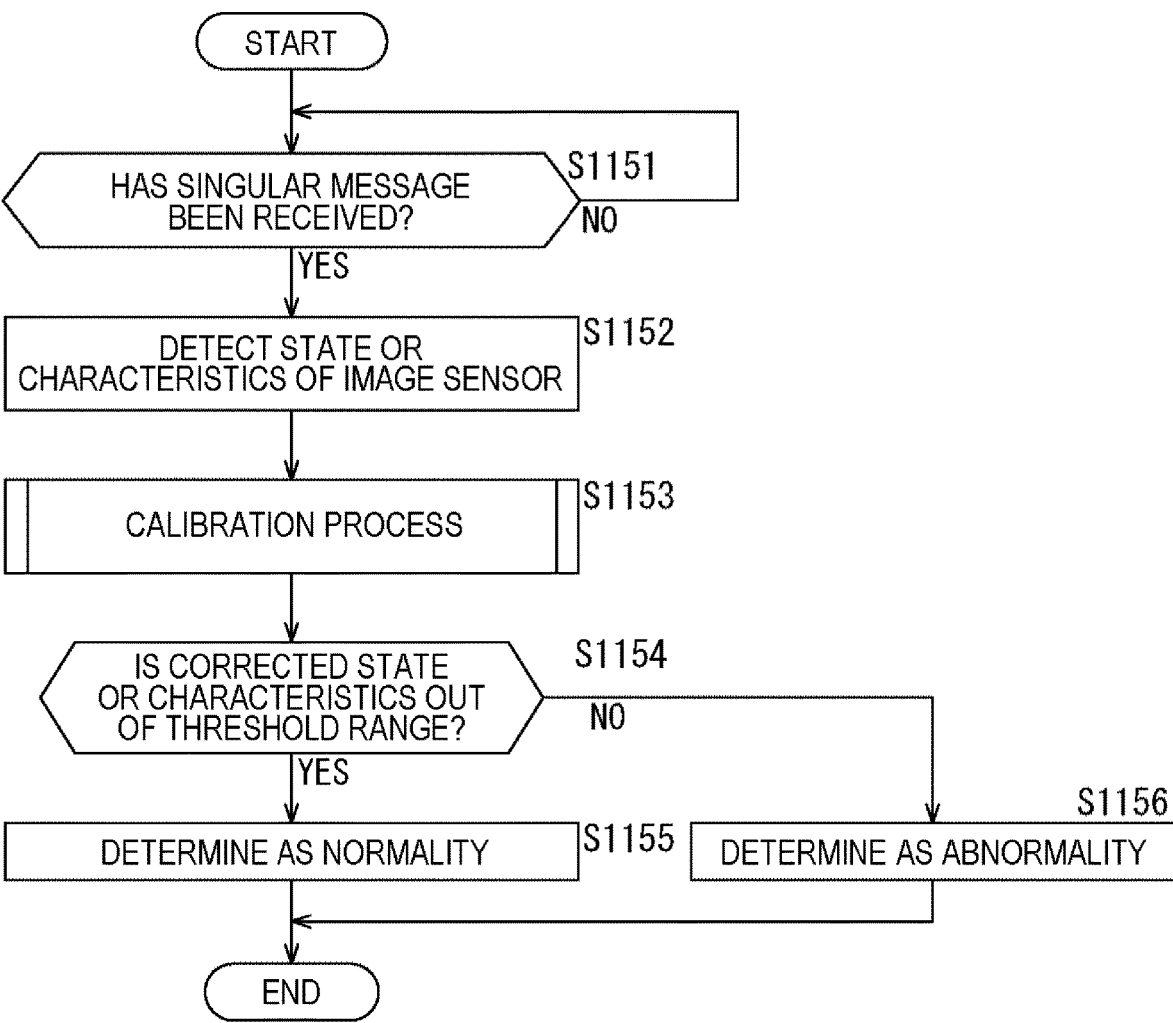

FIG. 128 is a flowchart illustrating a process of the application processor when the application processor performs the process of detecting the presence or absence of abnormality of the image sensor.

Figure 129:
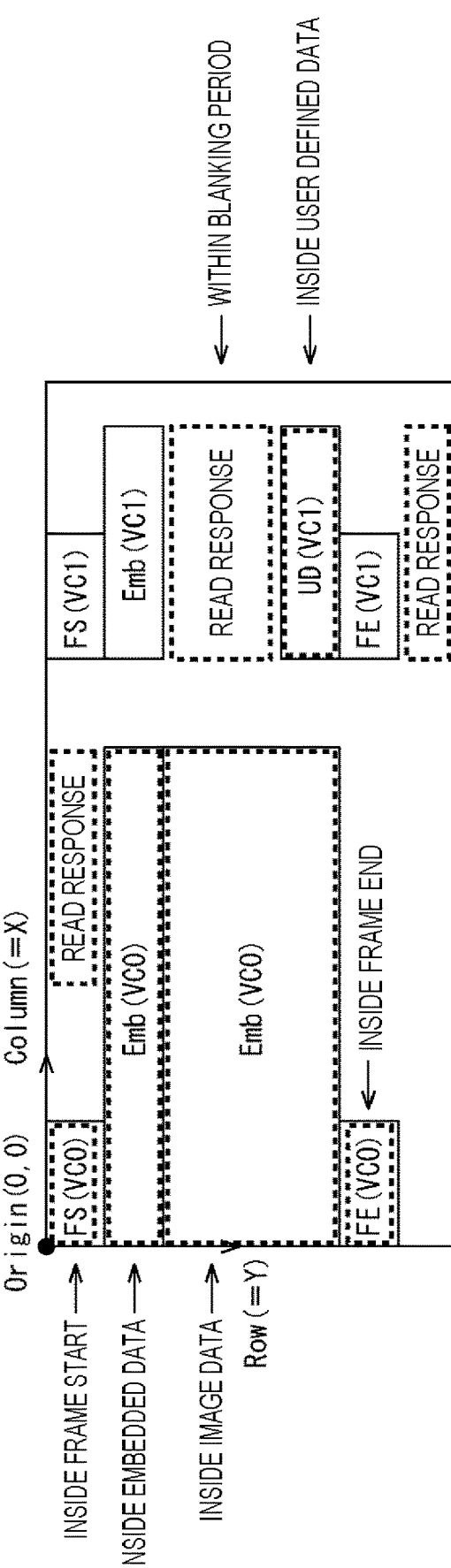

FIG. 129 is a diagram illustrating an example of a data structure of image data for describing a position where a singular message is stored when high-speed data transmission of the singular message is realized without inhibiting high-speed data transmission of the image data.

Figure 130:
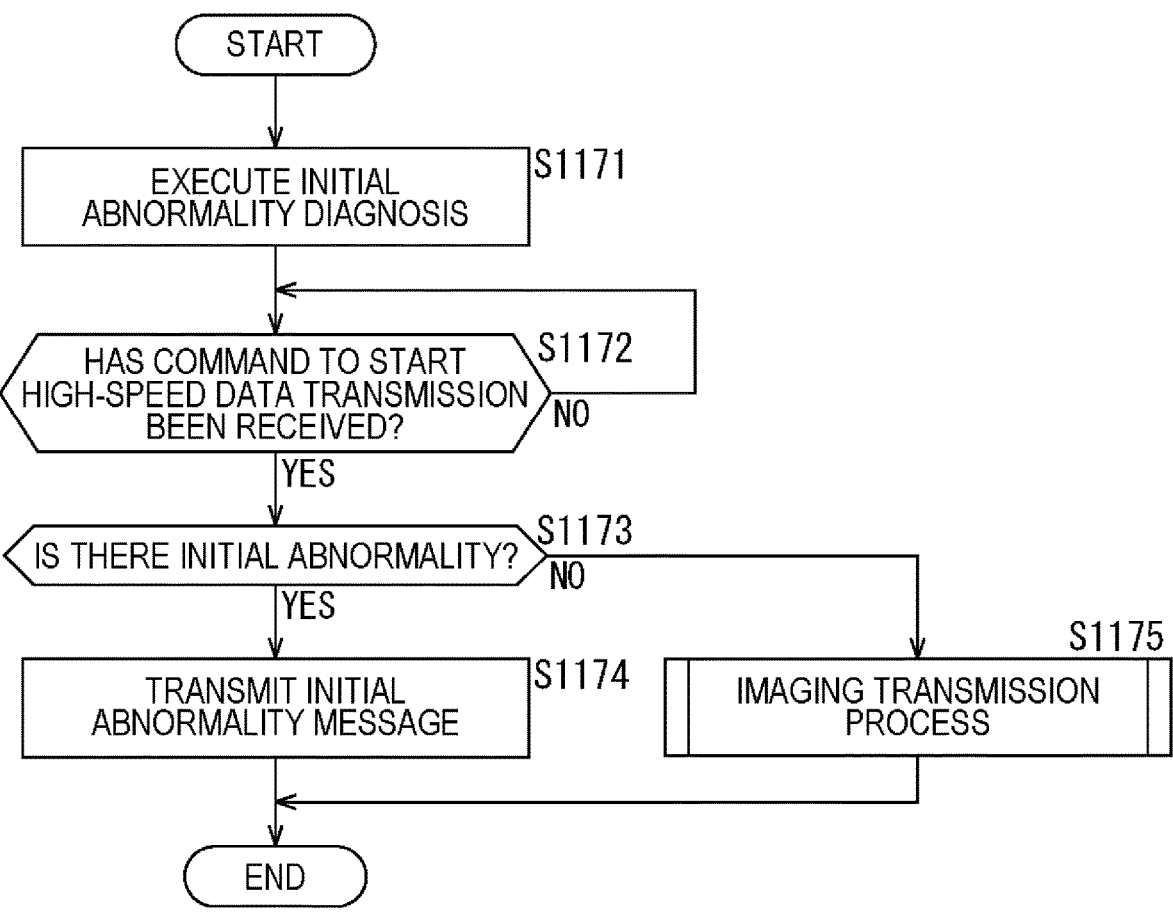

FIG. 130 is a flowchart illustrating processing in a case where high-speed data transmission of a singular message is executed without inhibiting high-speed data transmission of image data.

Figure 131:
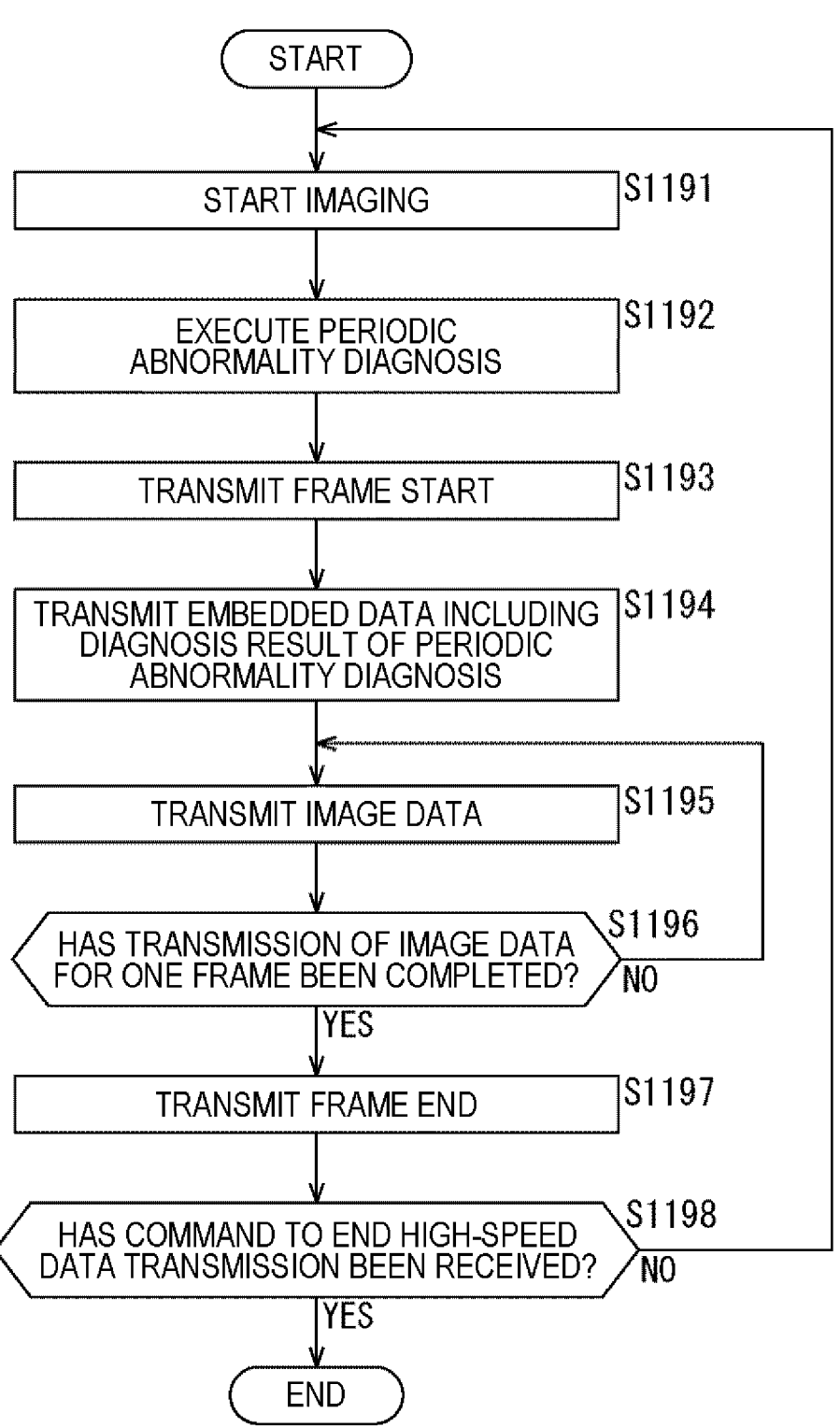

FIG. 131 is a flowchart illustrating an imaging transmission process (part 1).

Figure 132:
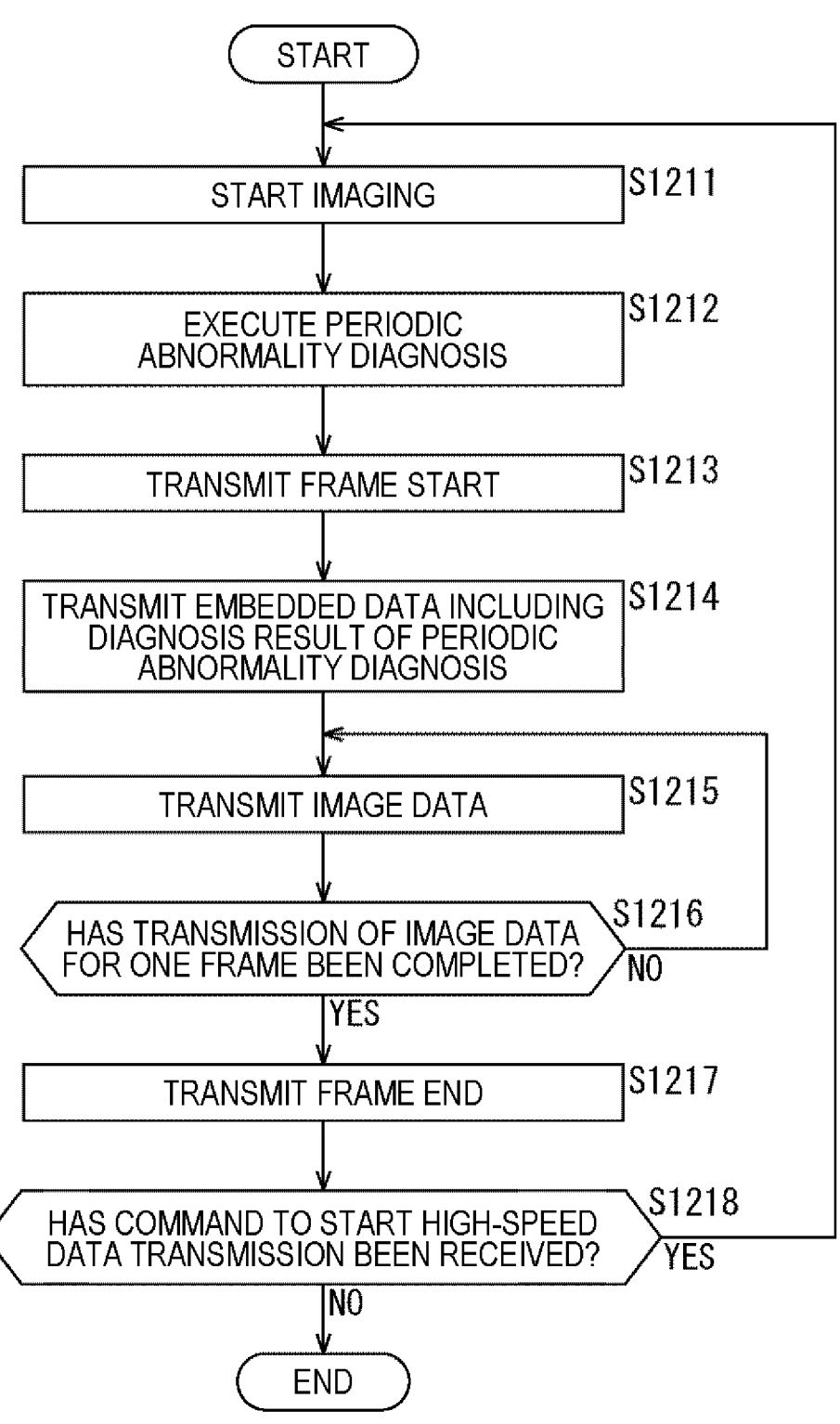

FIG. 132 is a flowchart illustrating an application example of the imaging transmission process (part 1).

Figure 133:
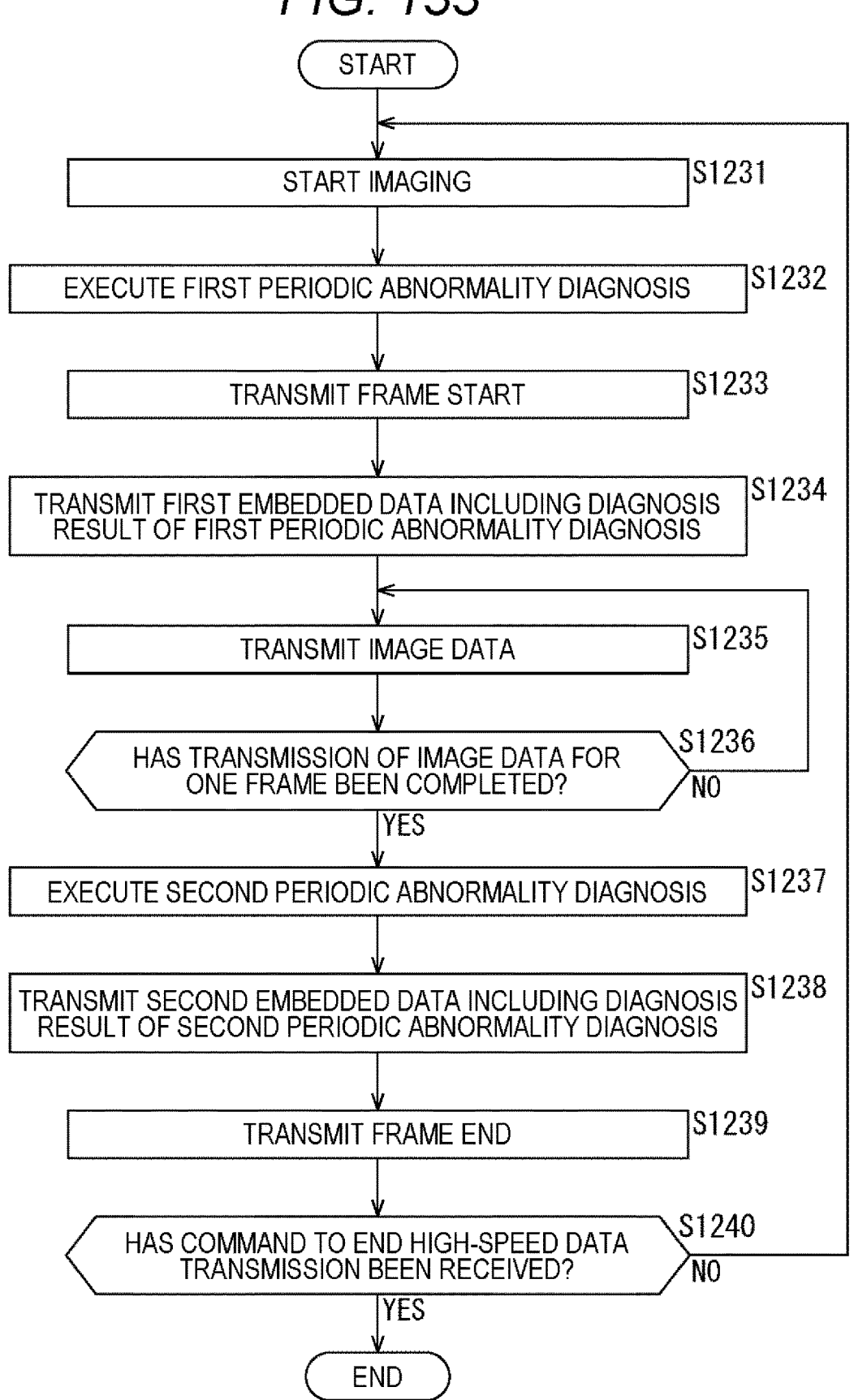

FIG. 133 is a flowchart illustrating an imaging transmission process (part 2).

Figure 134:
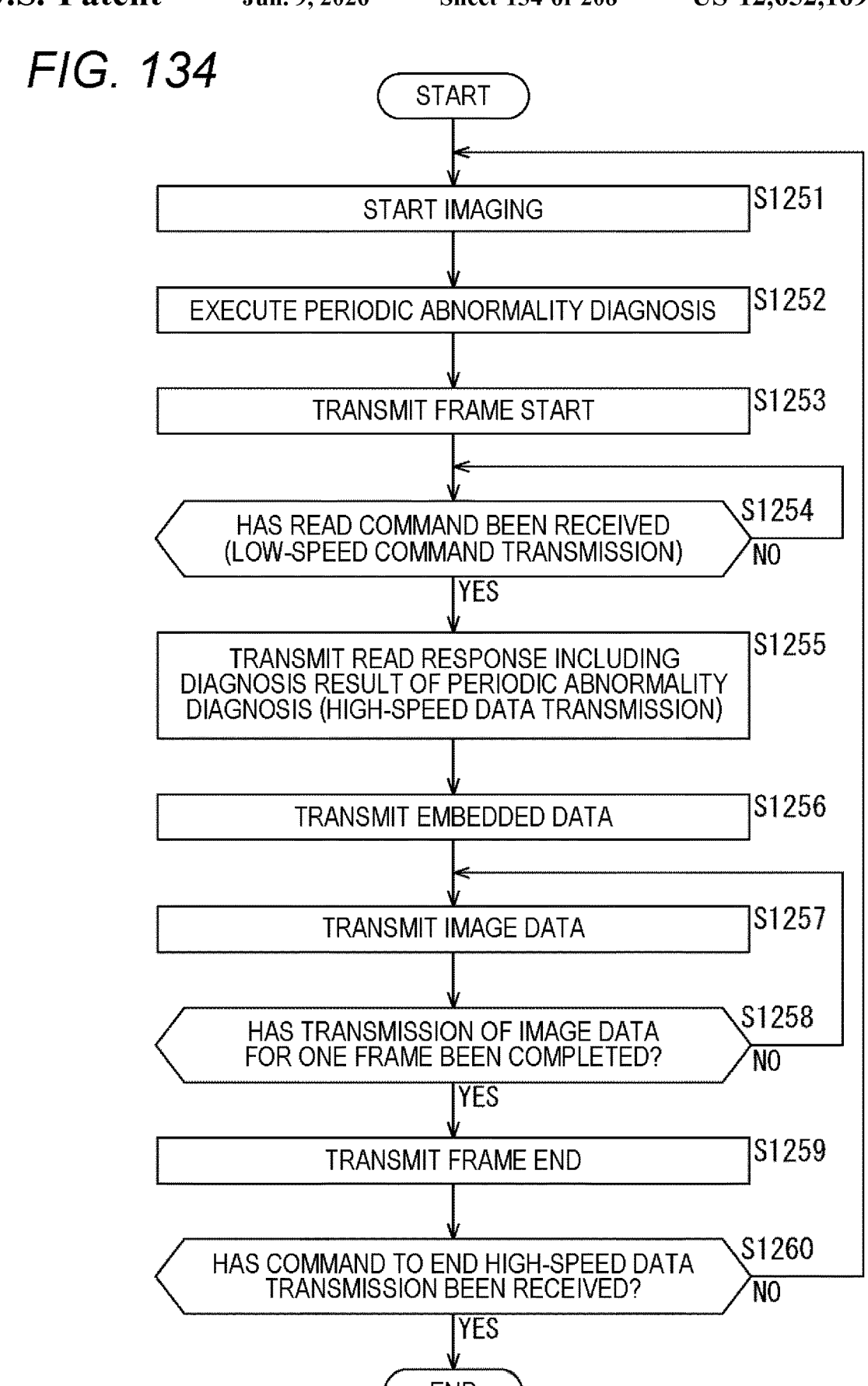

FIG. 134 is a flowchart illustrating an imaging transmission process (part 3) performed by the image sensor.

Figure 135:
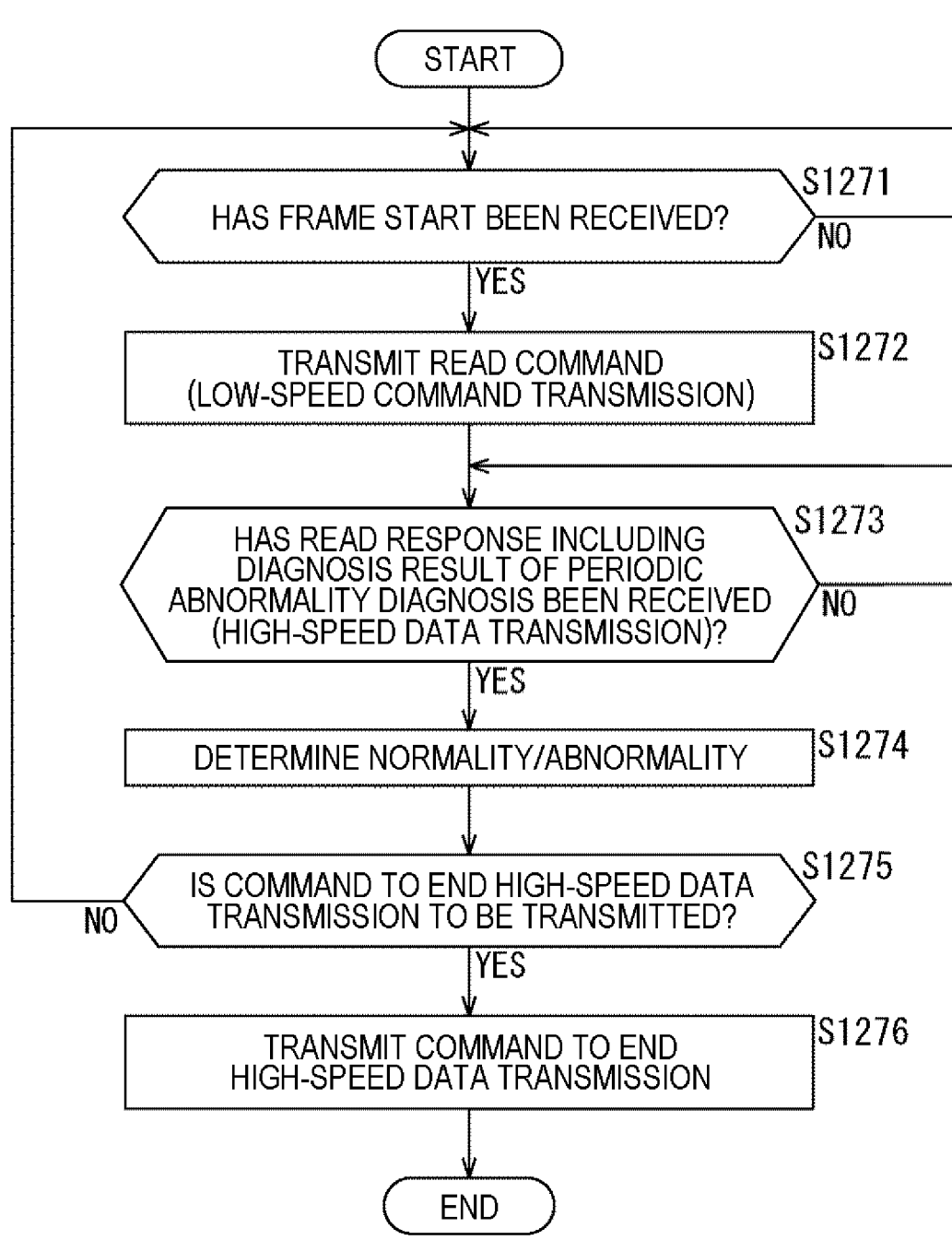

FIG. 135 is a flowchart illustrating an imaging transmission process (part 3) performed by the application processor.

Figure 136:
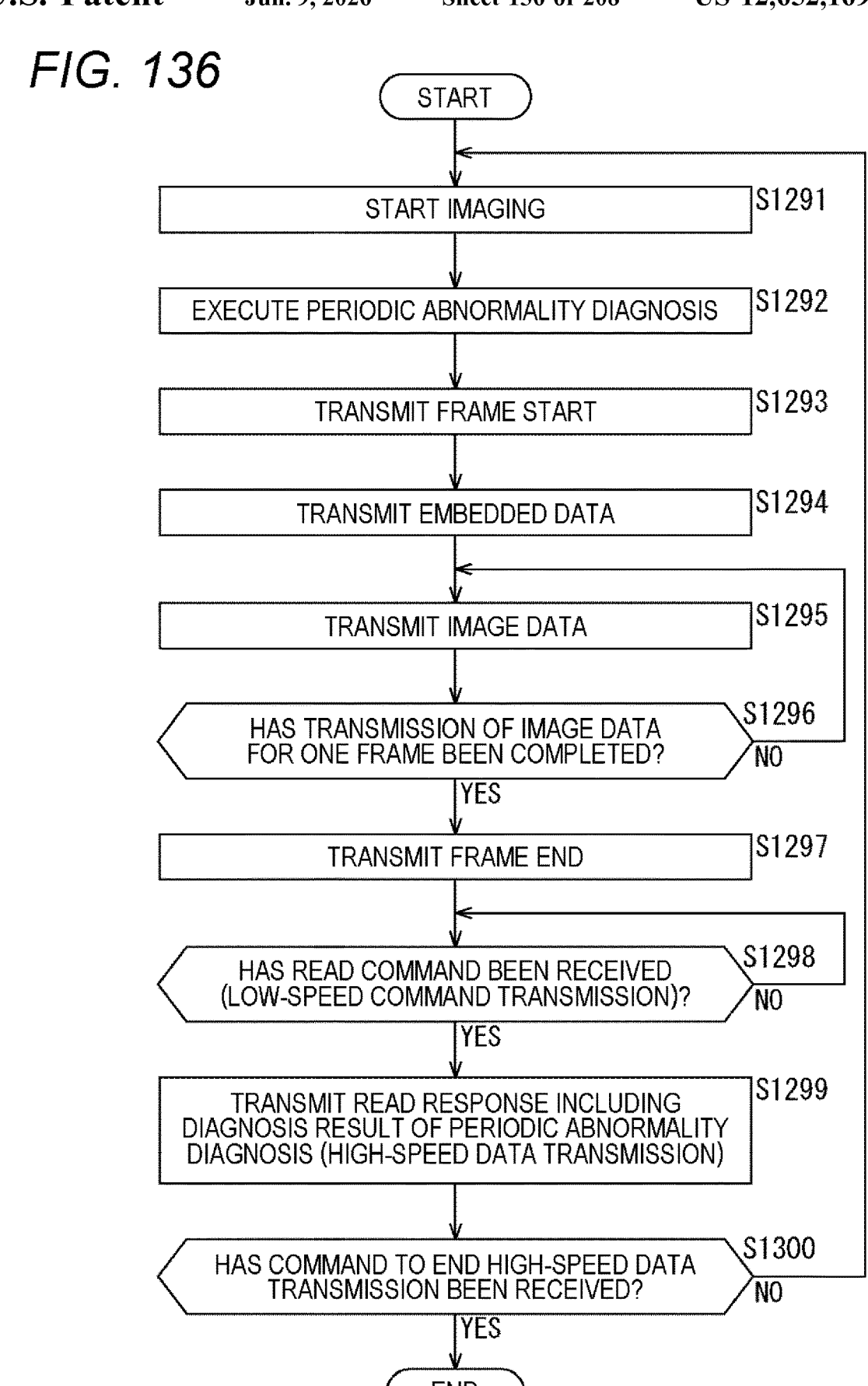

FIG. 136 is a flowchart illustrating an imaging transmission process (part 4) performed by the image sensor.

Figure 137:
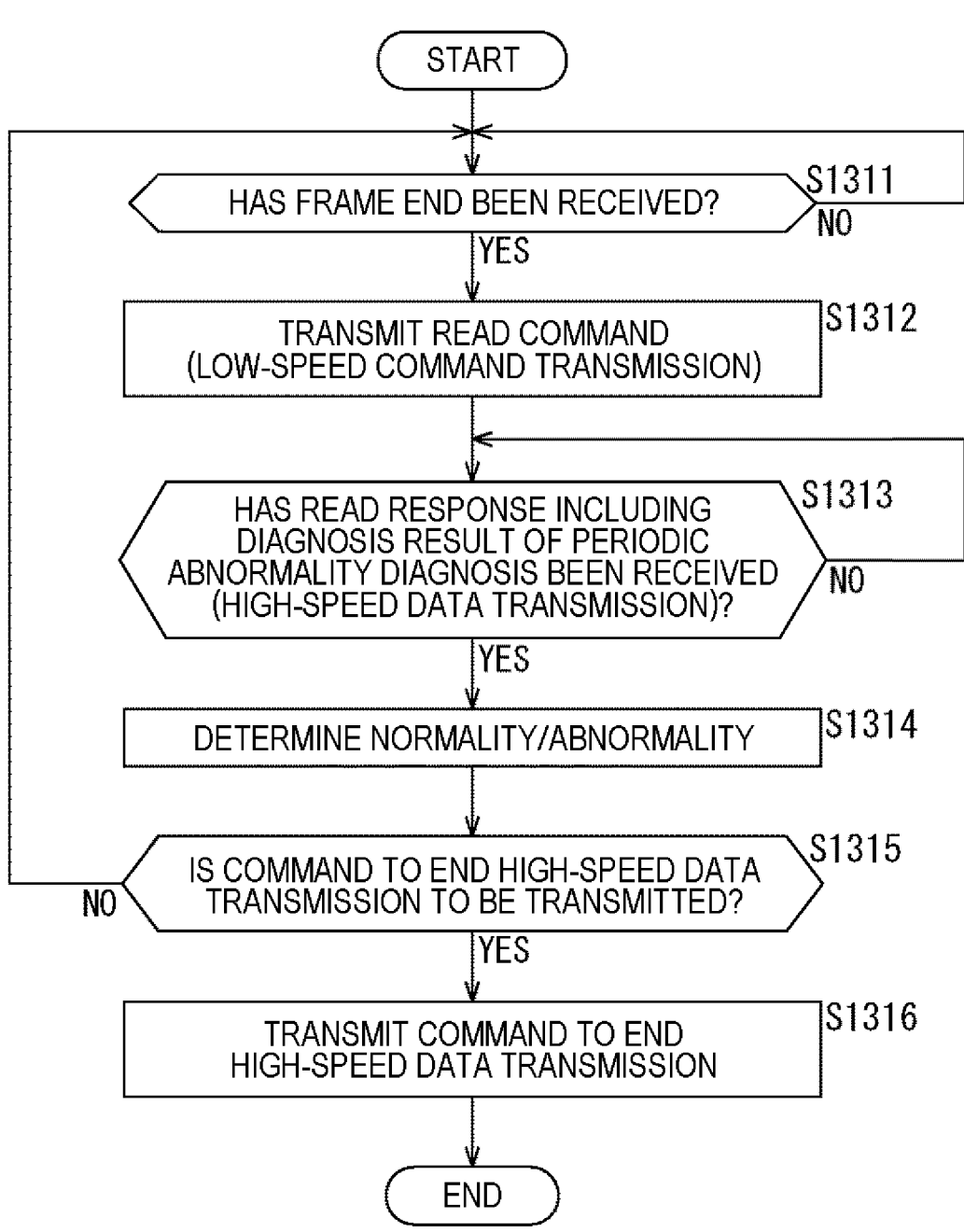

FIG. 137 is a flowchart illustrating an imaging transmission process (part 4) performed by the application processor.

Figure 138:
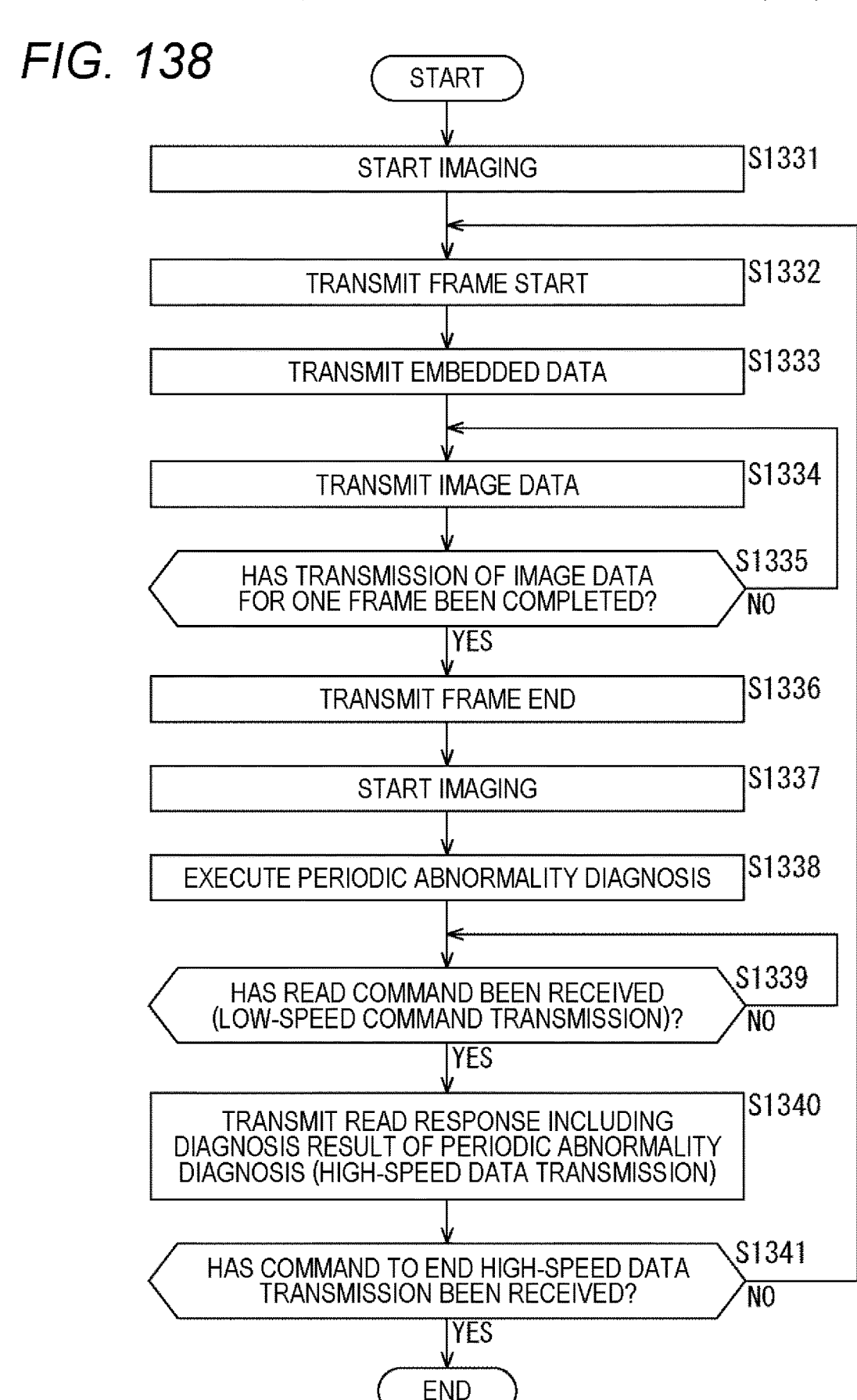

FIG. 138 is a flowchart illustrating an imaging transmission process (part 5) performed by the image sensor.

Figure 139:
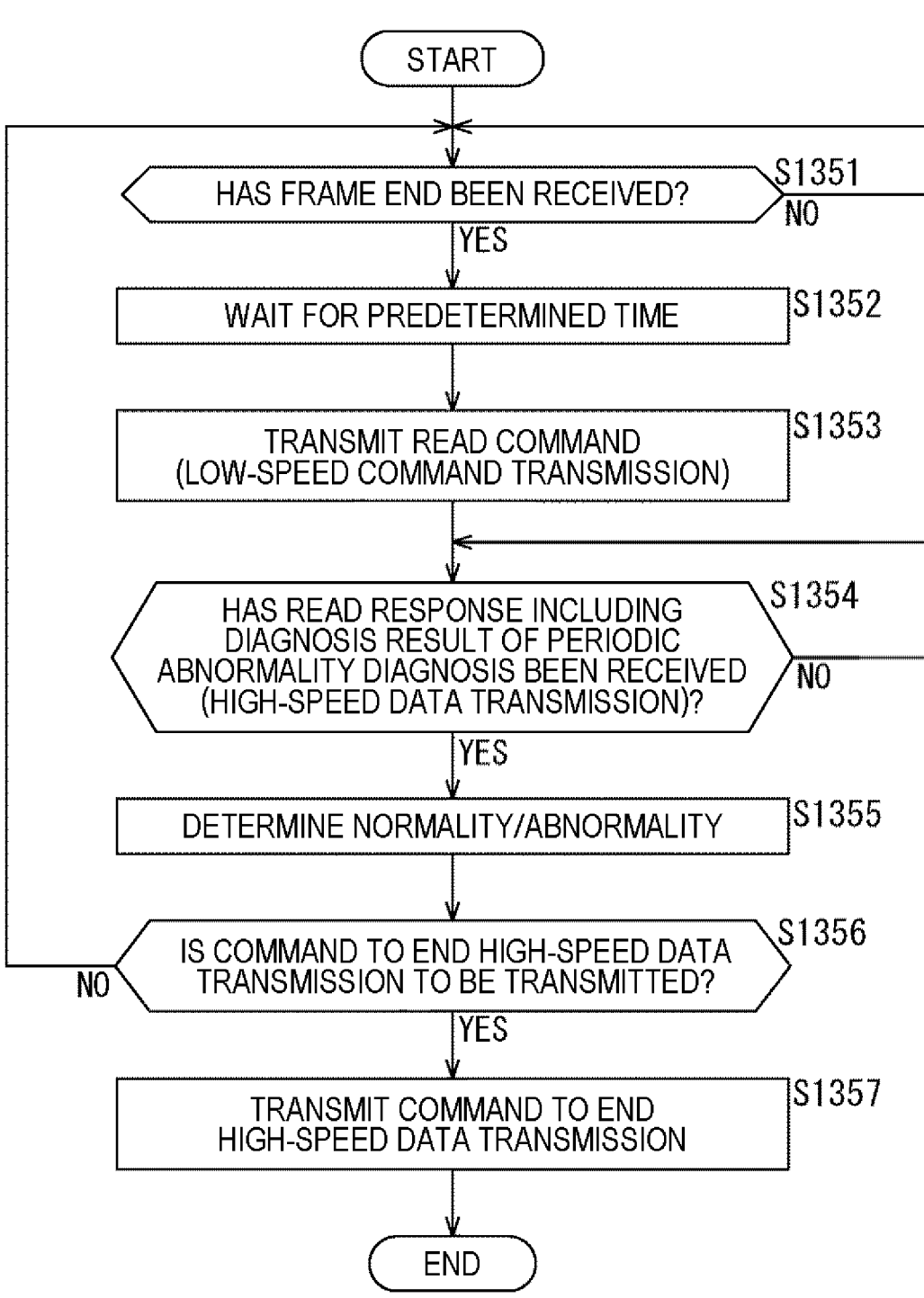

FIG. 139 is a flowchart illustrating an imaging transmission process (part 5) performed by the application processor.

Figure 140:
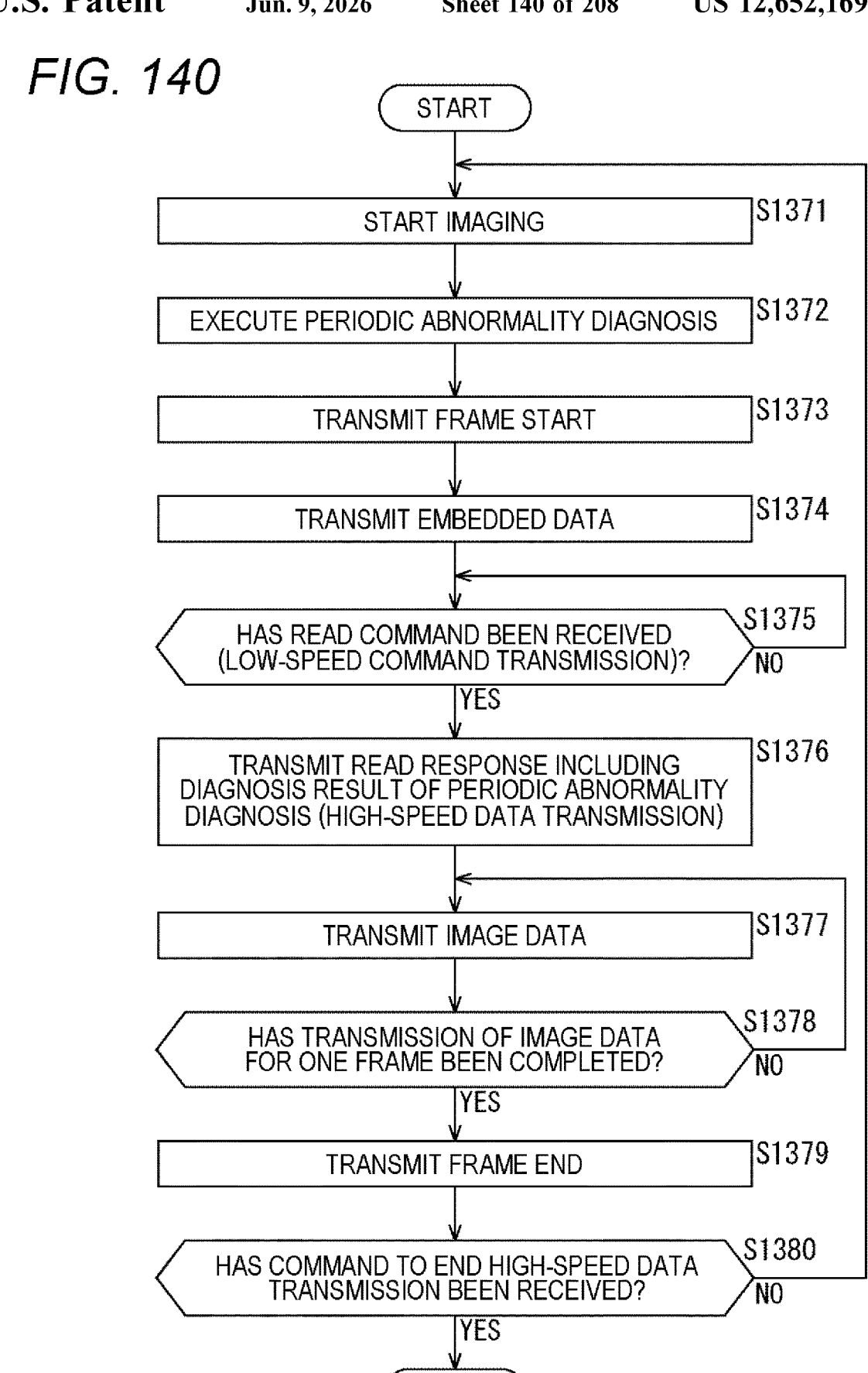

FIG. 140 is a flowchart illustrating an imaging transmission process (part 6) performed by the image sensor.

Figure 141:
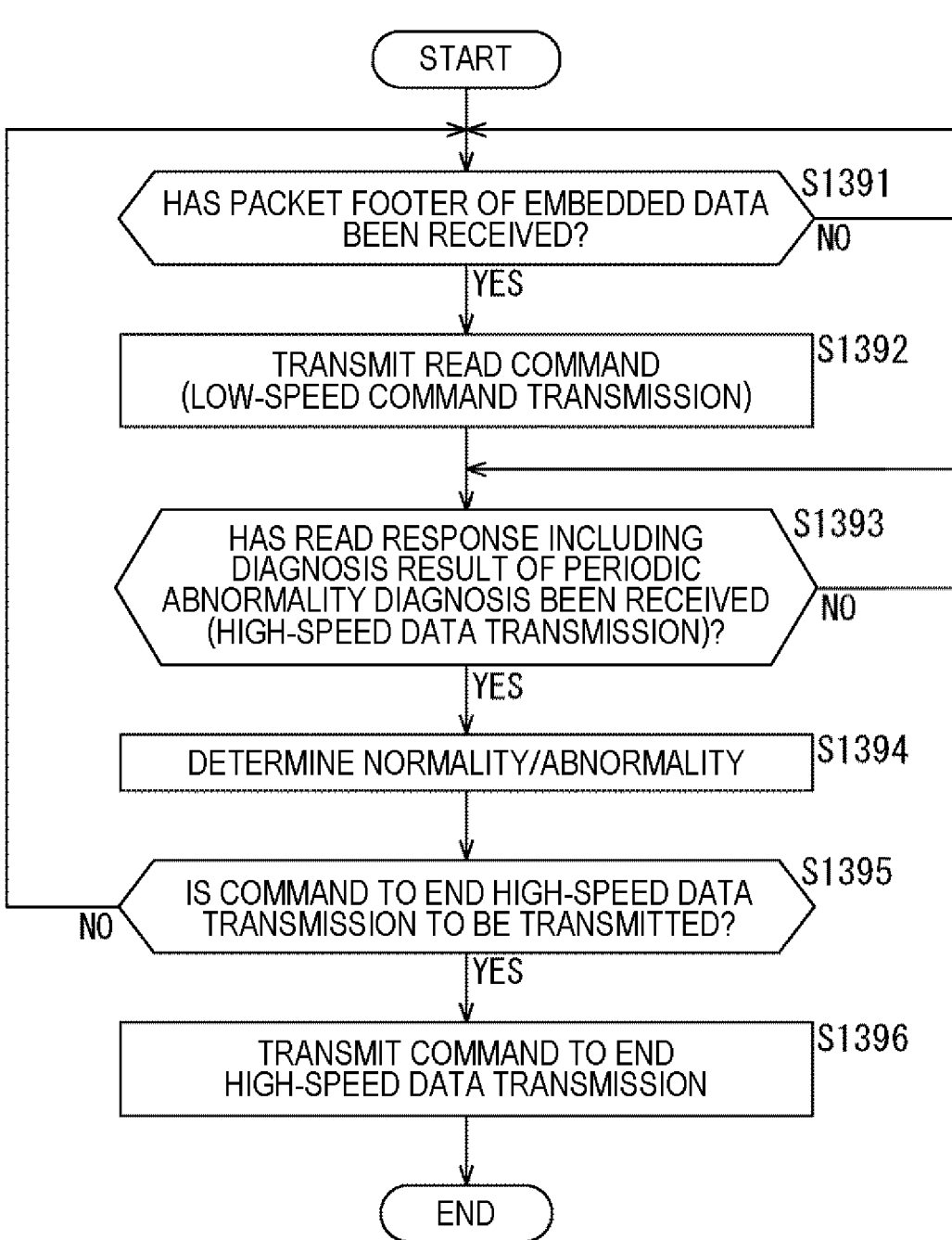

FIG. 141 is a flowchart illustrating an imaging transmission process (part 6) performed by the application processor.

Figure 142:
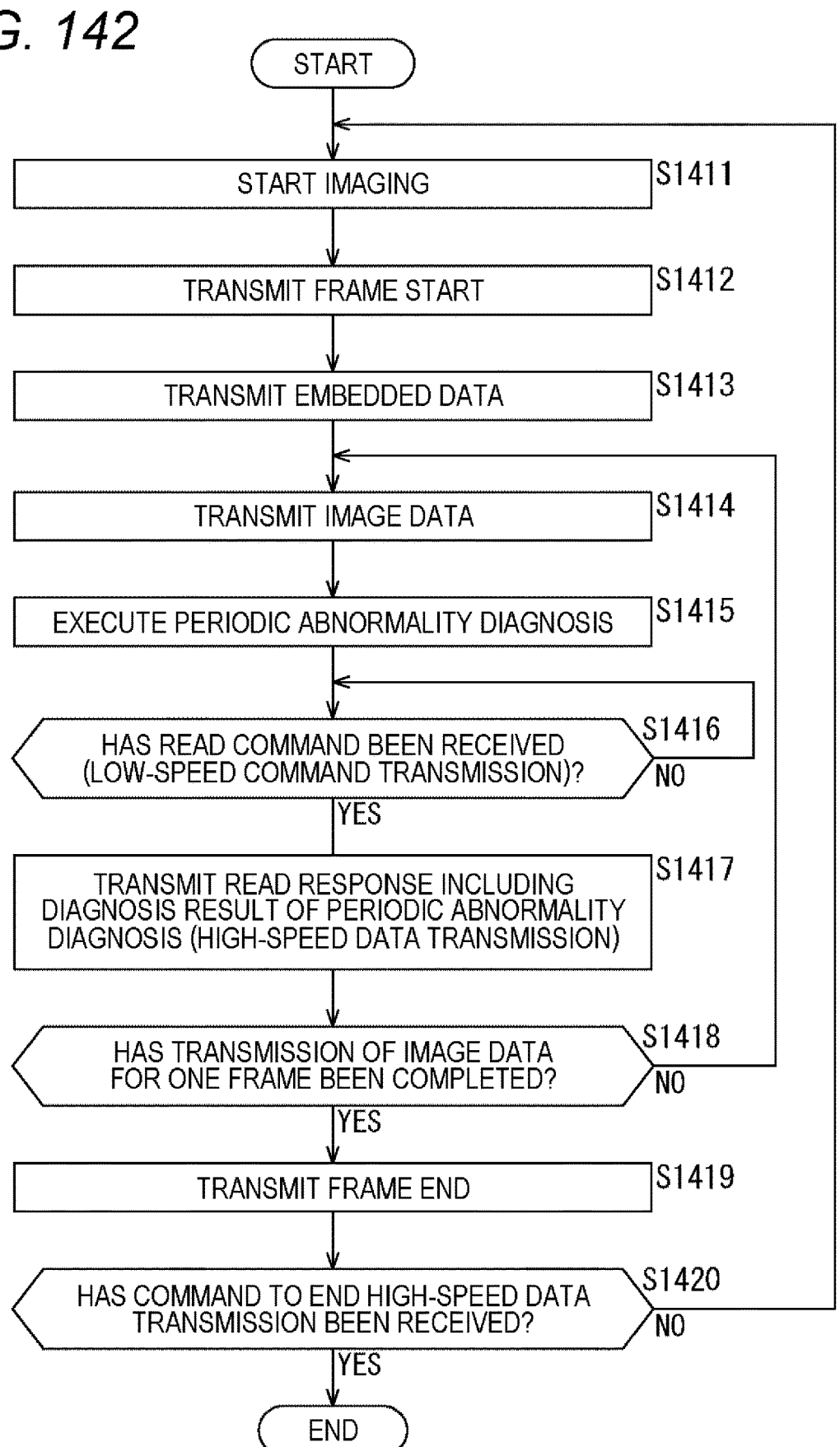

FIG. 142 is a flowchart illustrating an imaging transmission process (part 7) performed by the image sensor.

Figure 143:
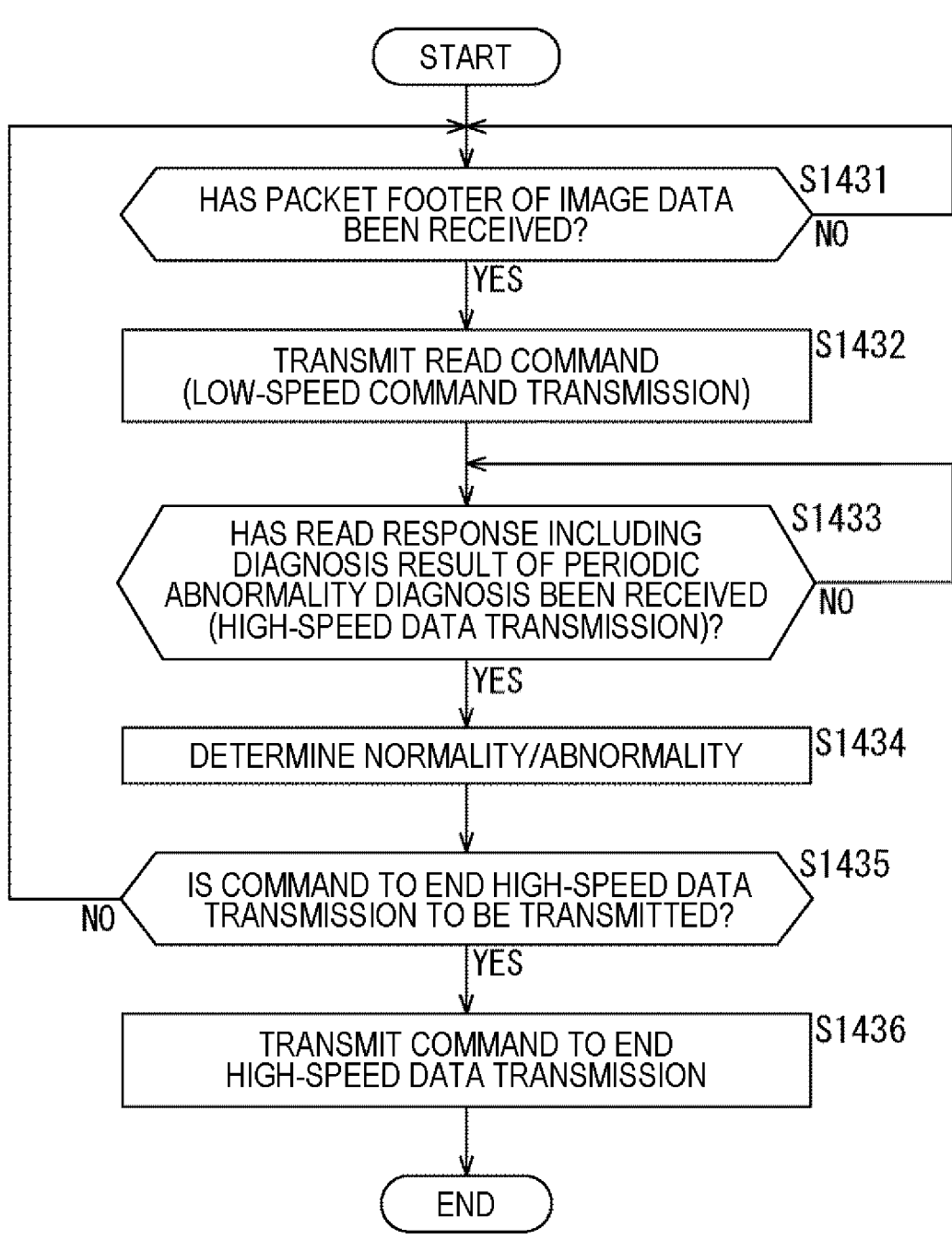

FIG. 143 is a flowchart illustrating an imaging transmission process (part 7) performed by the application processor.

Figure 144:
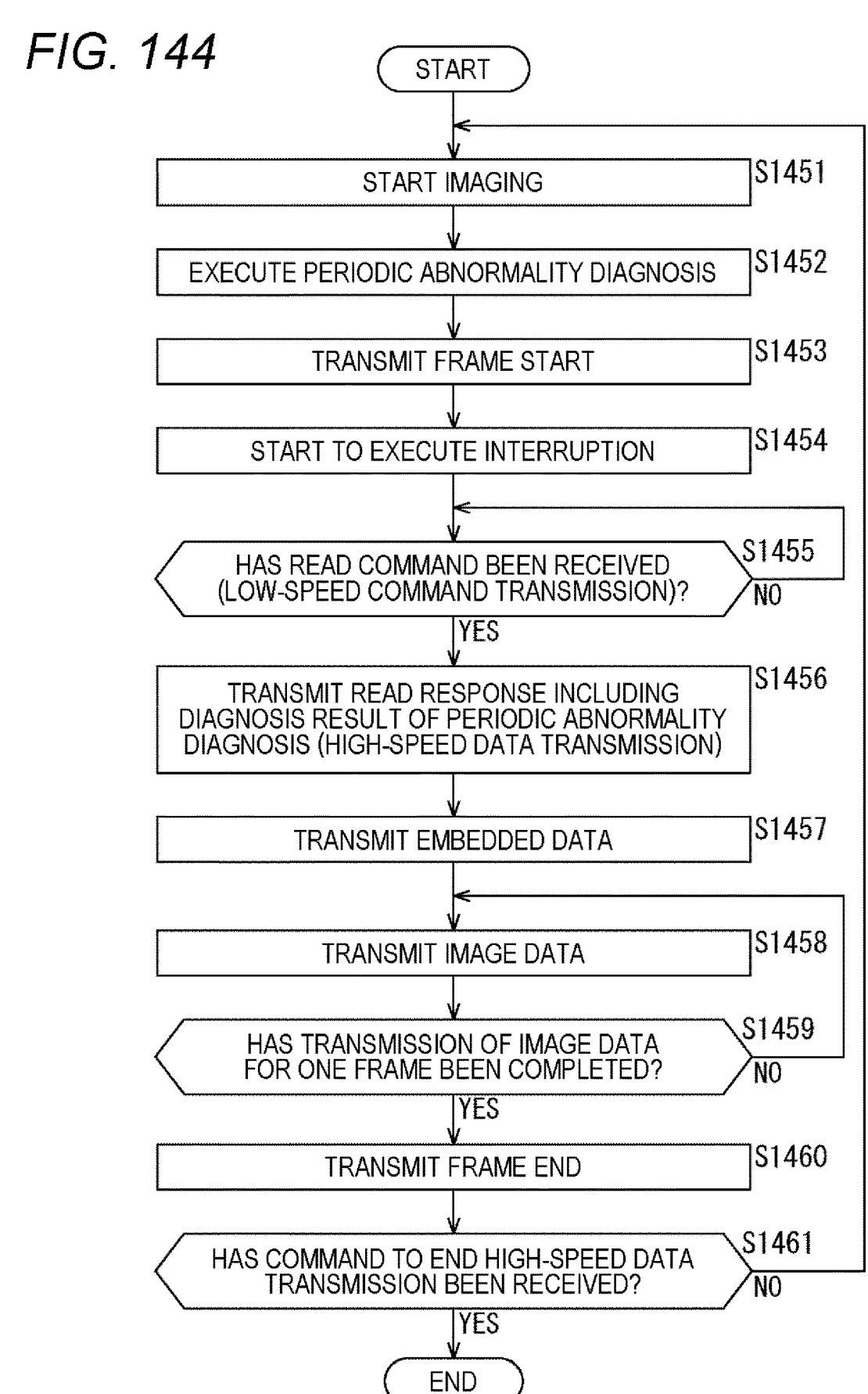

FIG. 144 is a flowchart illustrating an imaging transmission process (part 8) performed by the image sensor.

Figure 145:
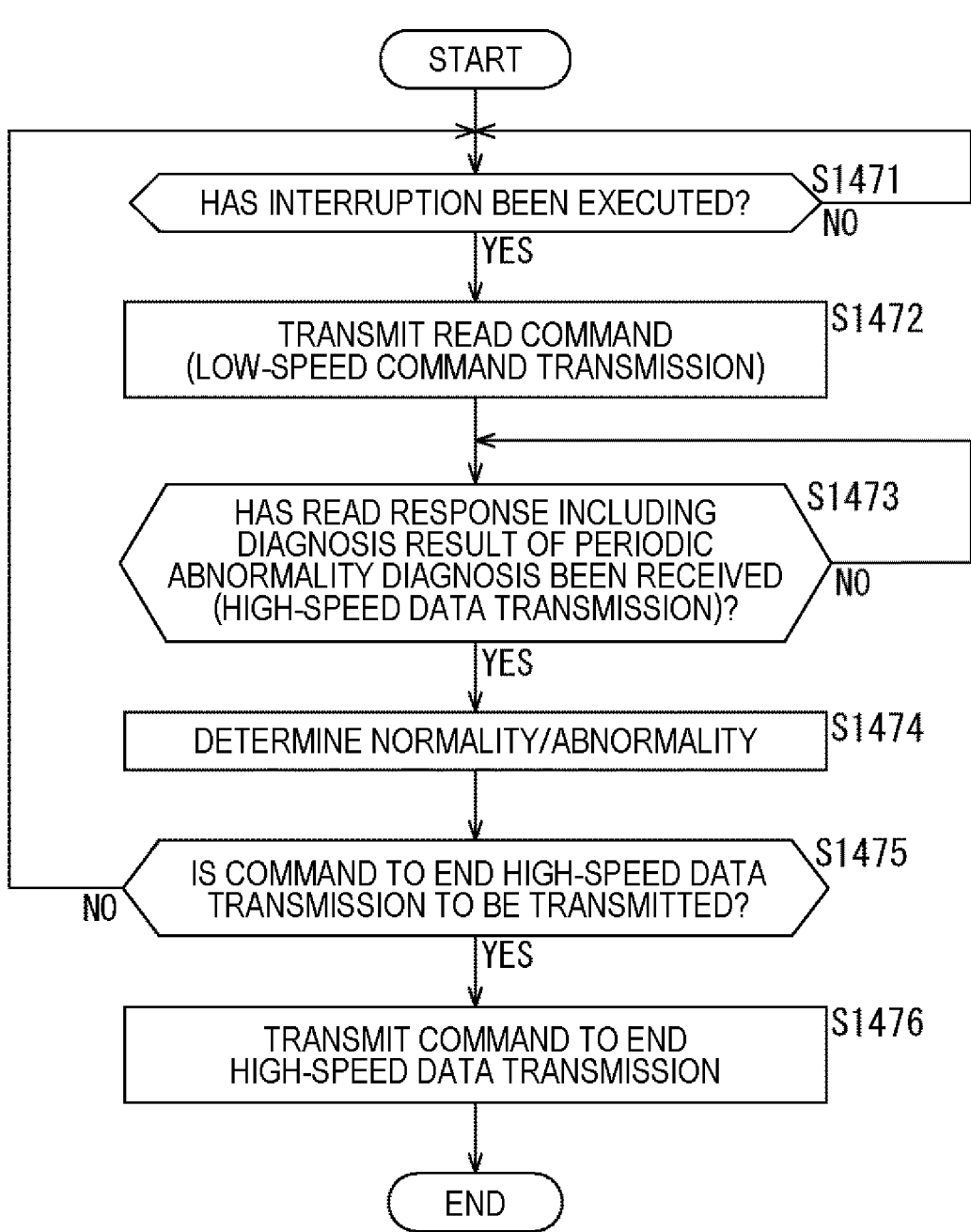

FIG. 145 is a flowchart illustrating an imaging transmission process (part 8) performed by the application processor.

Figure 146:
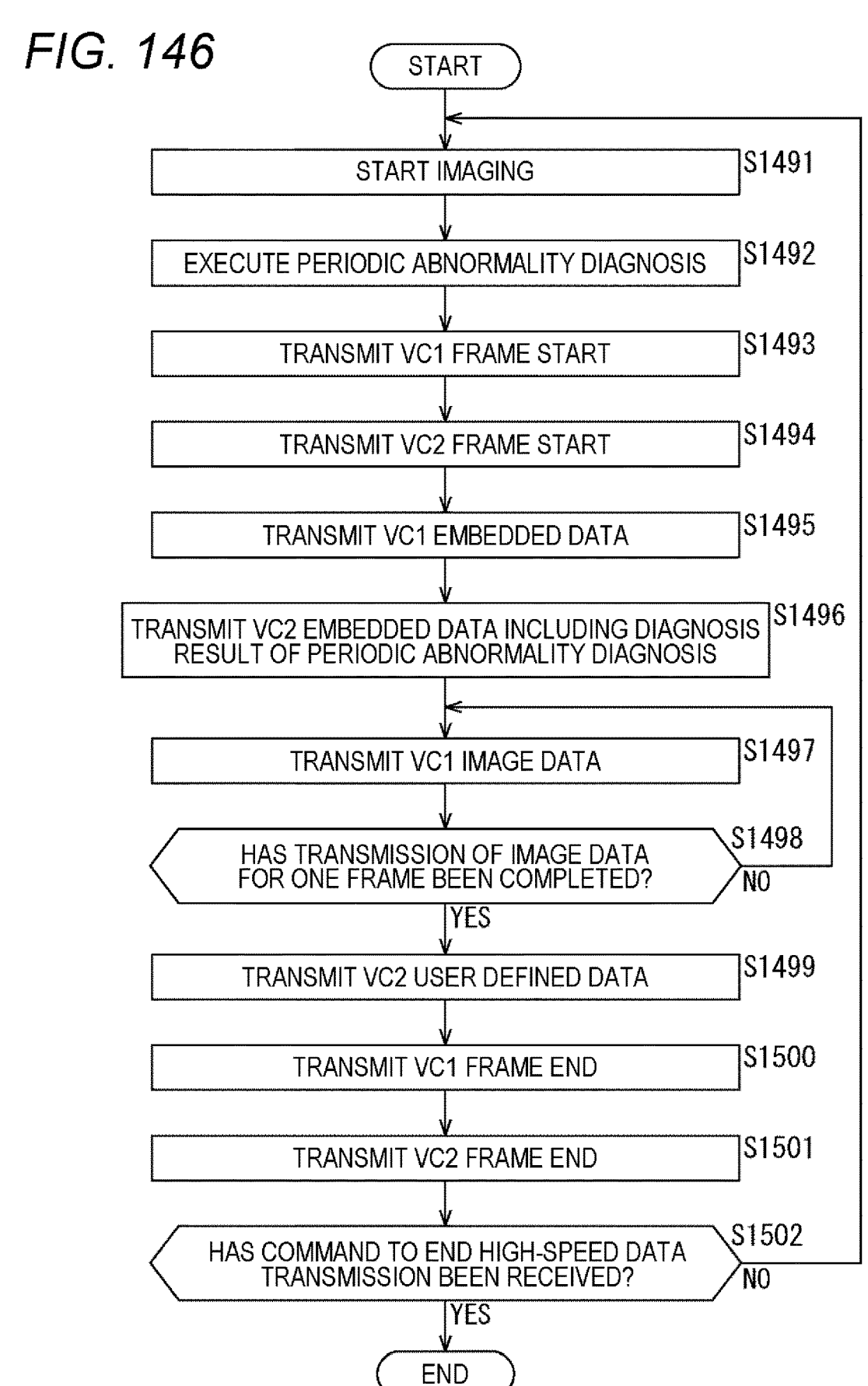

FIG. 146 is a flowchart illustrating an imaging transmission process (part 9).

Figure 147:
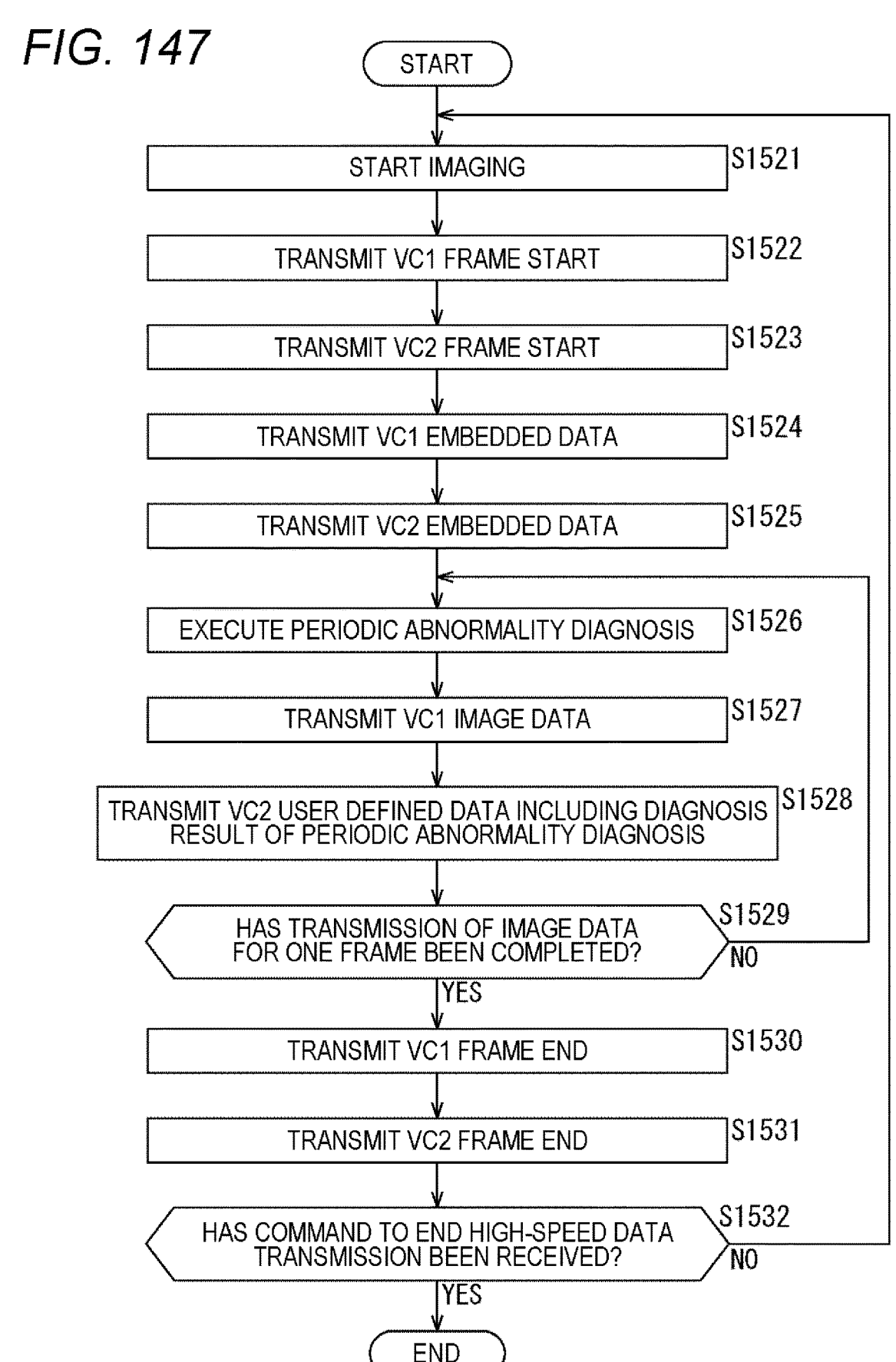

FIG. 147 is a flowchart illustrating an imaging transmission process (part 10).

Figure 148:
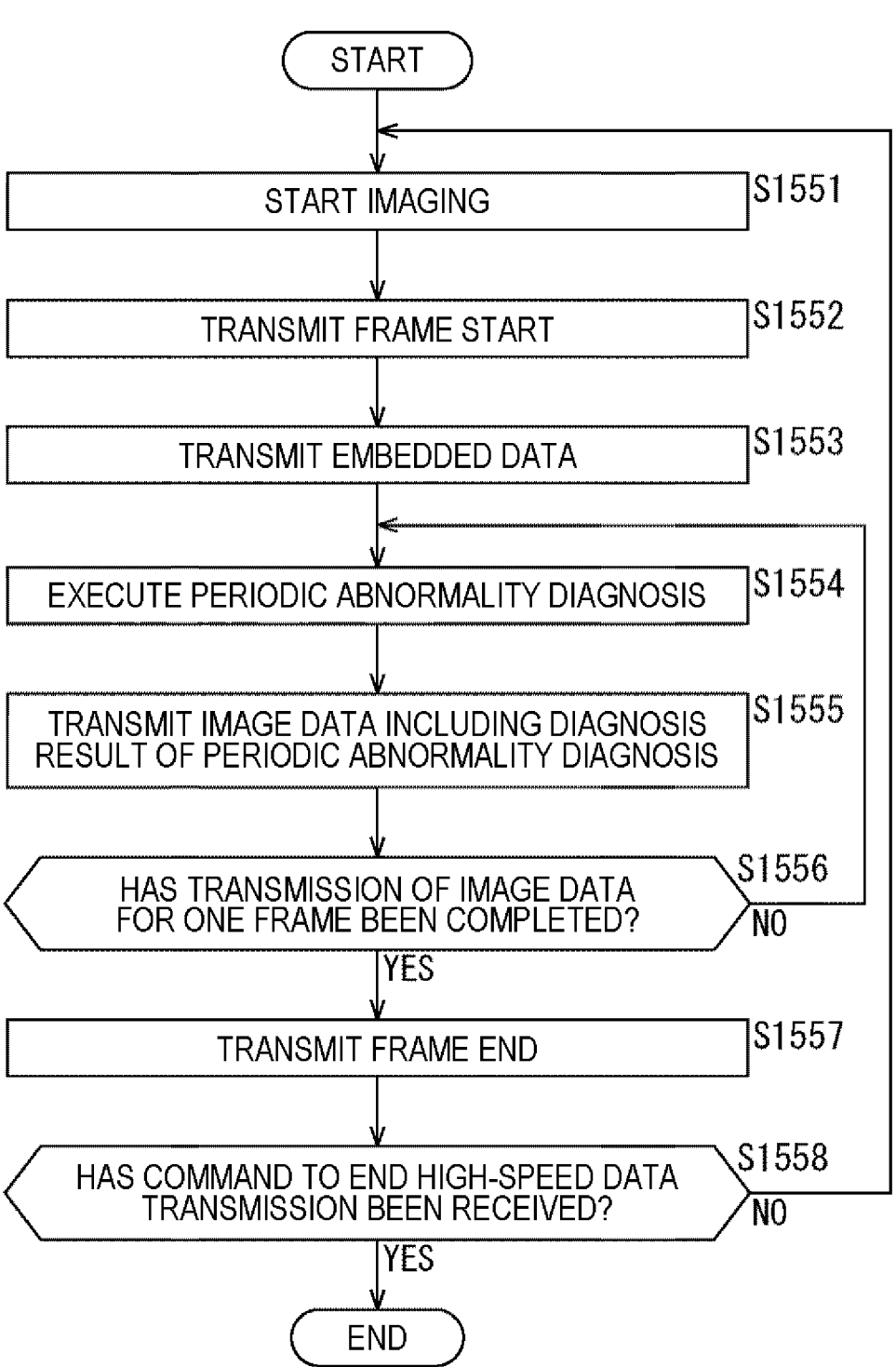

FIG. 148 is a flowchart illustrating an imaging transmission process (part 11).

FIG. 149 is a diagram for describing message count values using two types of count values having different Hamming distances.

FIG. 150 is a diagram for describing a method of detecting the presence or absence of a defect or falsification of a message count value using two types of count values.

FIG. 151 is a diagram for describing the method of detecting the presence or absence of a defect or falsification of a message count value using two types of count values.

Figure 152:
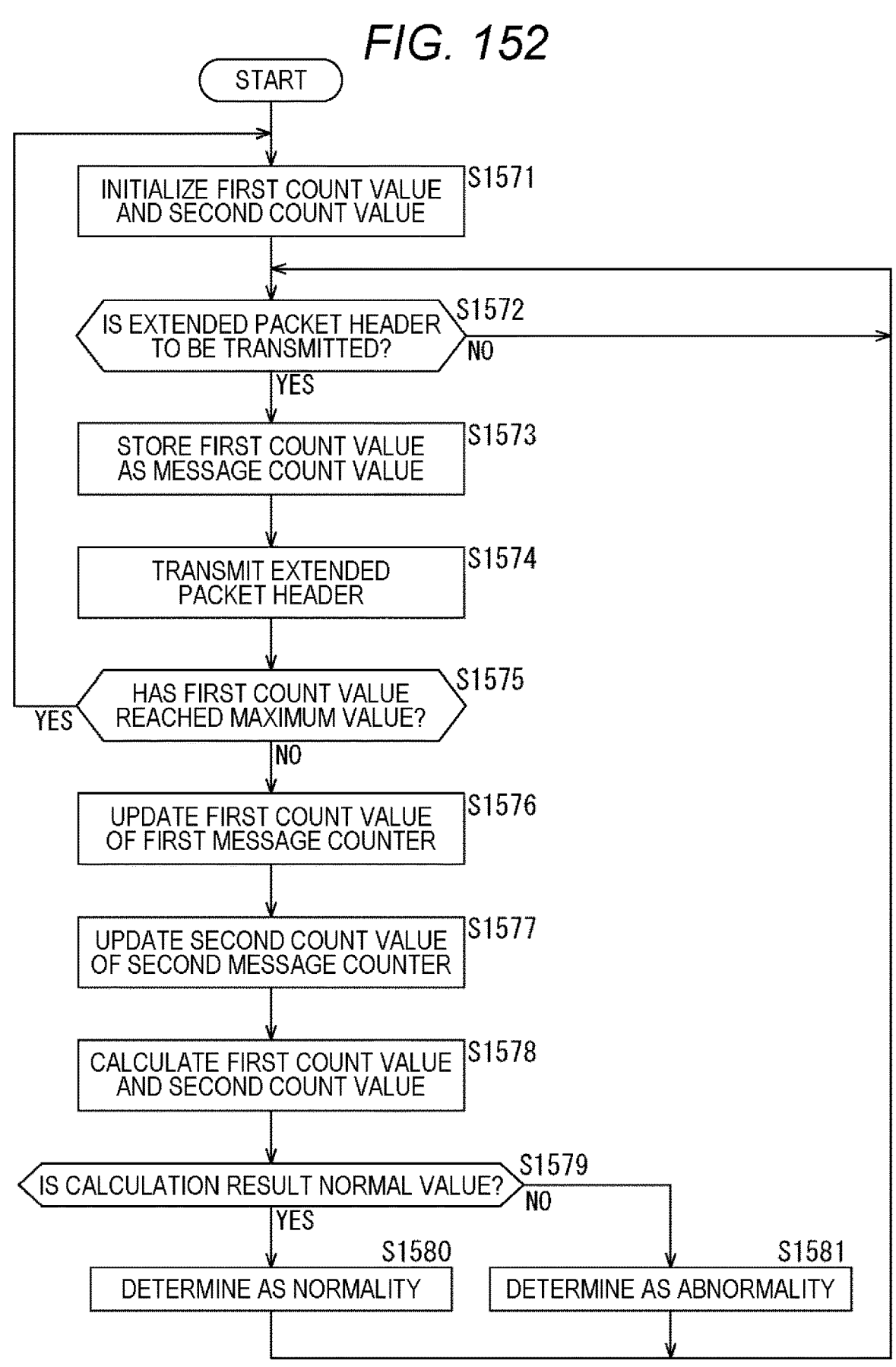

FIG. 152 is a flowchart illustrating a message counting process.

FIG. 153 is a diagram for describing a configuration example of an extended packet header ePH2 when a warning descriptor is set in a reserved region (Reserved) in the extended packet header ePH2.

FIG. 154 is a diagram for describing a description example of identification information using each bit of the warning descriptor (singular message).

FIG. 155 is a diagram illustrating a configuration example when a warning flash (for example, physical attack detection) is set as a first singular message in an extended packet header.

Figure 156:
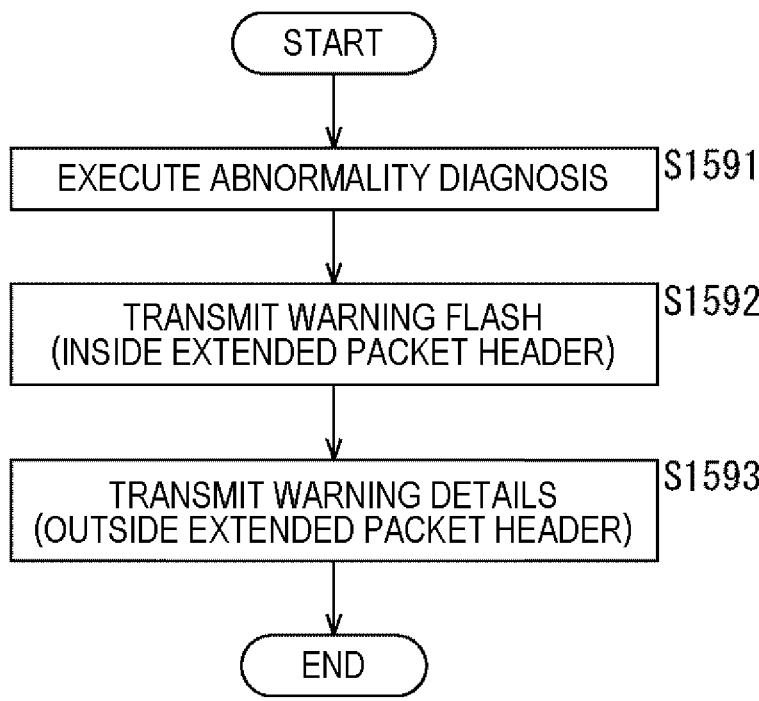

FIG. 156 is a flowchart for describing a transmission process of the image sensor when a singular message is separated and transmitted.

Figure 157:
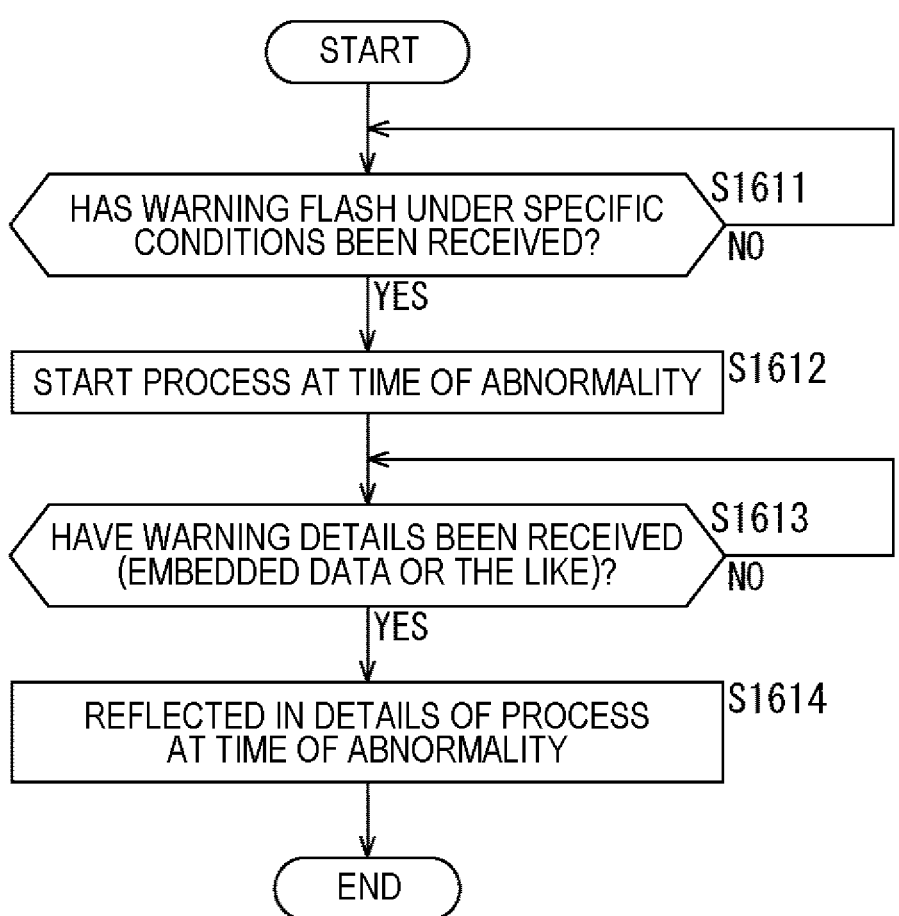

FIG. 157 is a flowchart for describing a transmission process of the application processor when a singular message is separated and transmitted.

Figure 158:
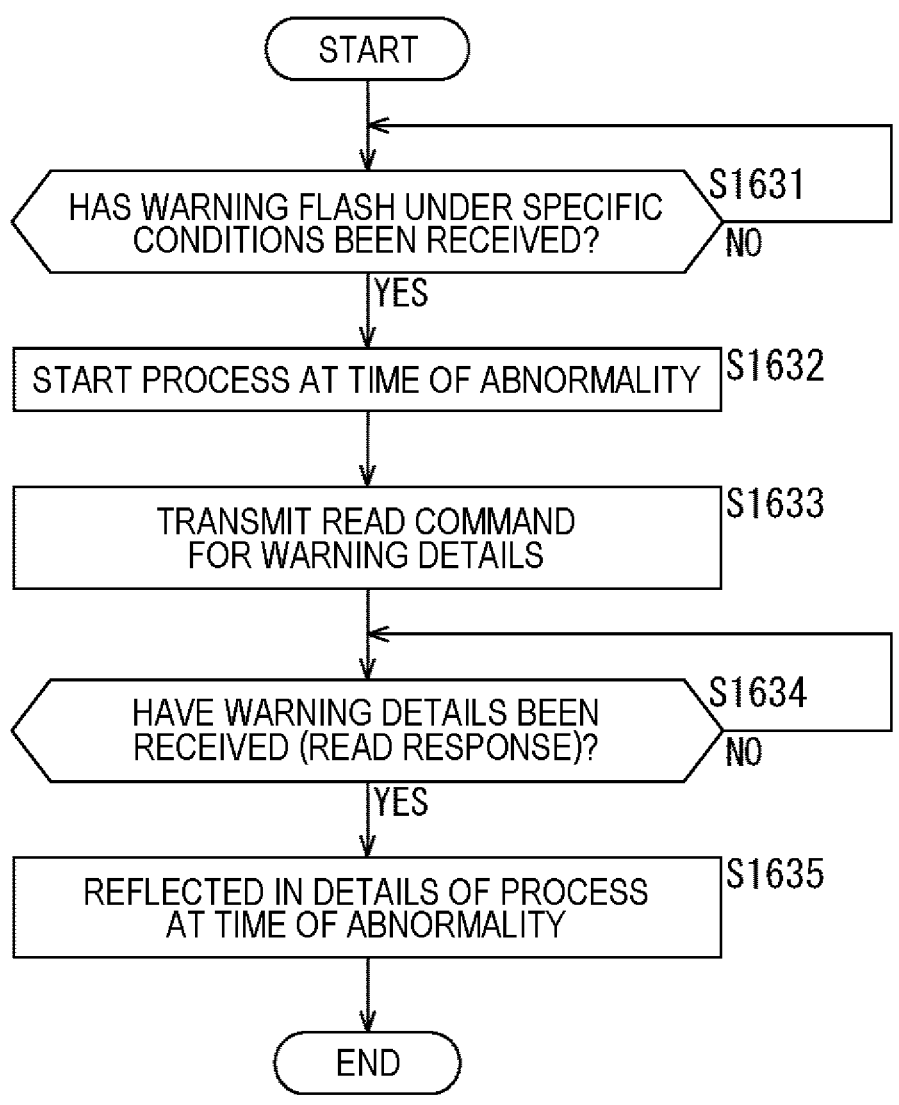

FIG. 158 is a flowchart for describing a transmission process when a singular message is separated and transmitted in a case where a read command for warning details is transmitted after a warning flash is transmitted.

FIG. 159 is a diagram illustrating a configuration example of a security descriptor in which any singular message such as the presence or absence of abnormality inside and outside an image sensor 1211 or the presence or absence of disturbance or attack on the image sensor 1211 is set.

Figure 160:
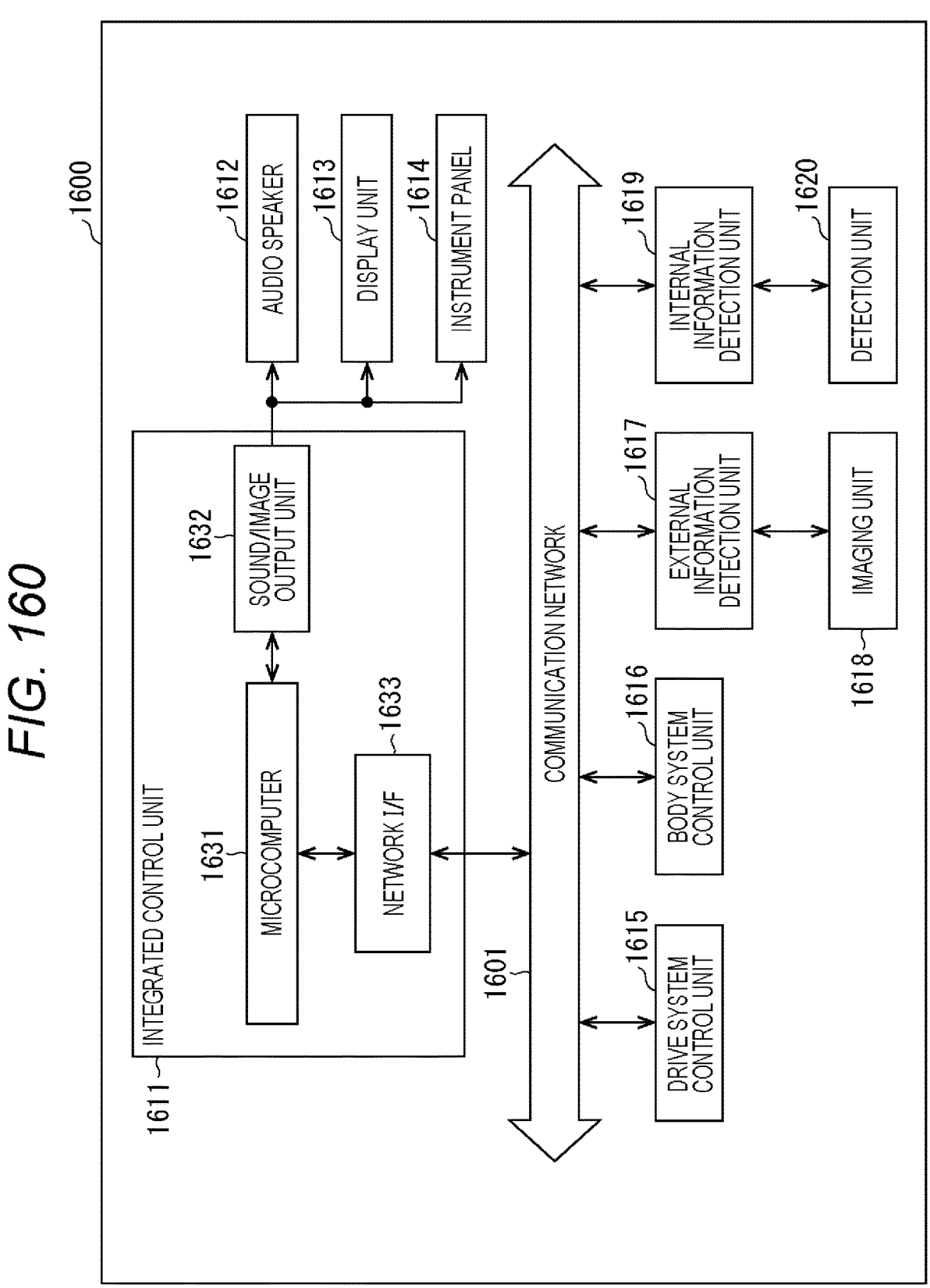

FIG. 160 is a block diagram illustrating a configuration example of a propulsion device in which an image sensor and an application processor are mounted.

Figure 161:
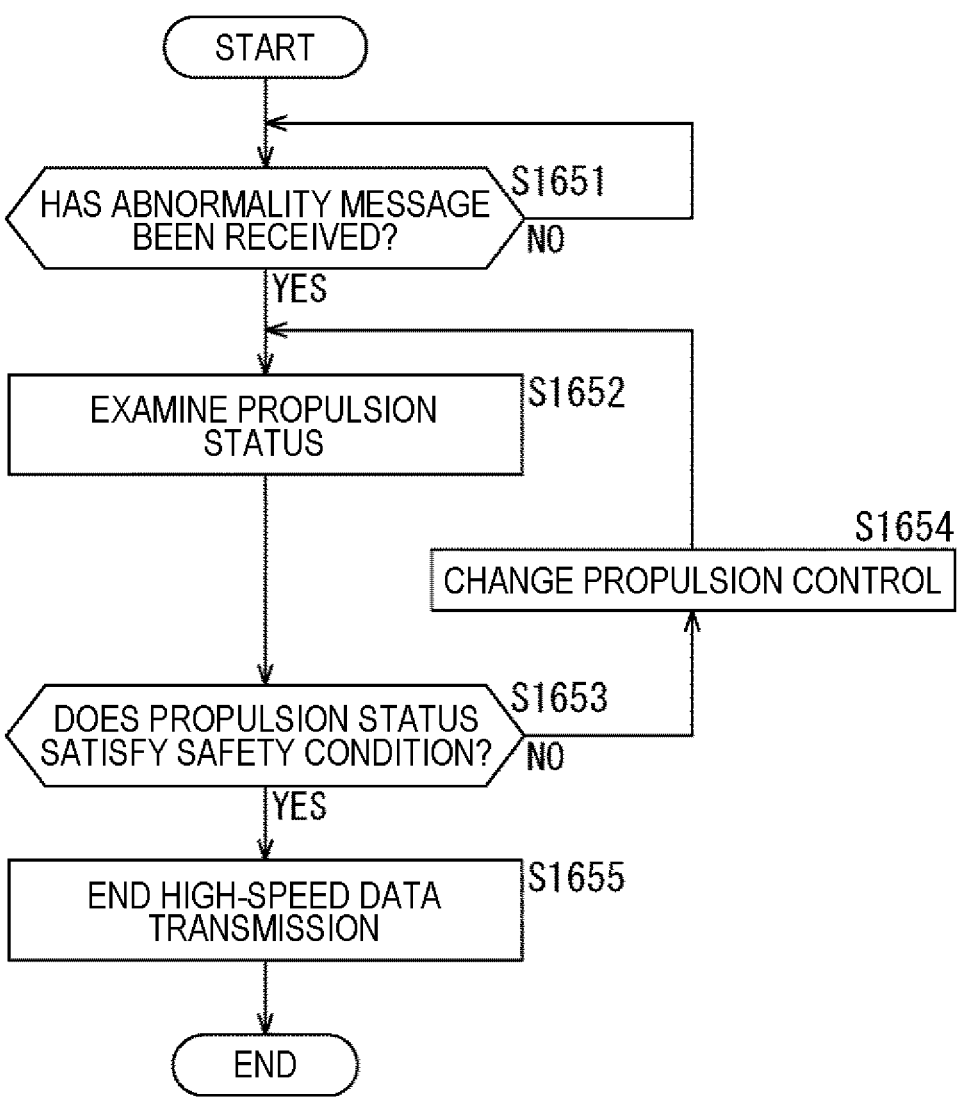

FIG. 161 is a diagram for describing a propulsion control process (part 1) of controlling propulsion of the propulsion device in FIG. 160.

Figure 162:
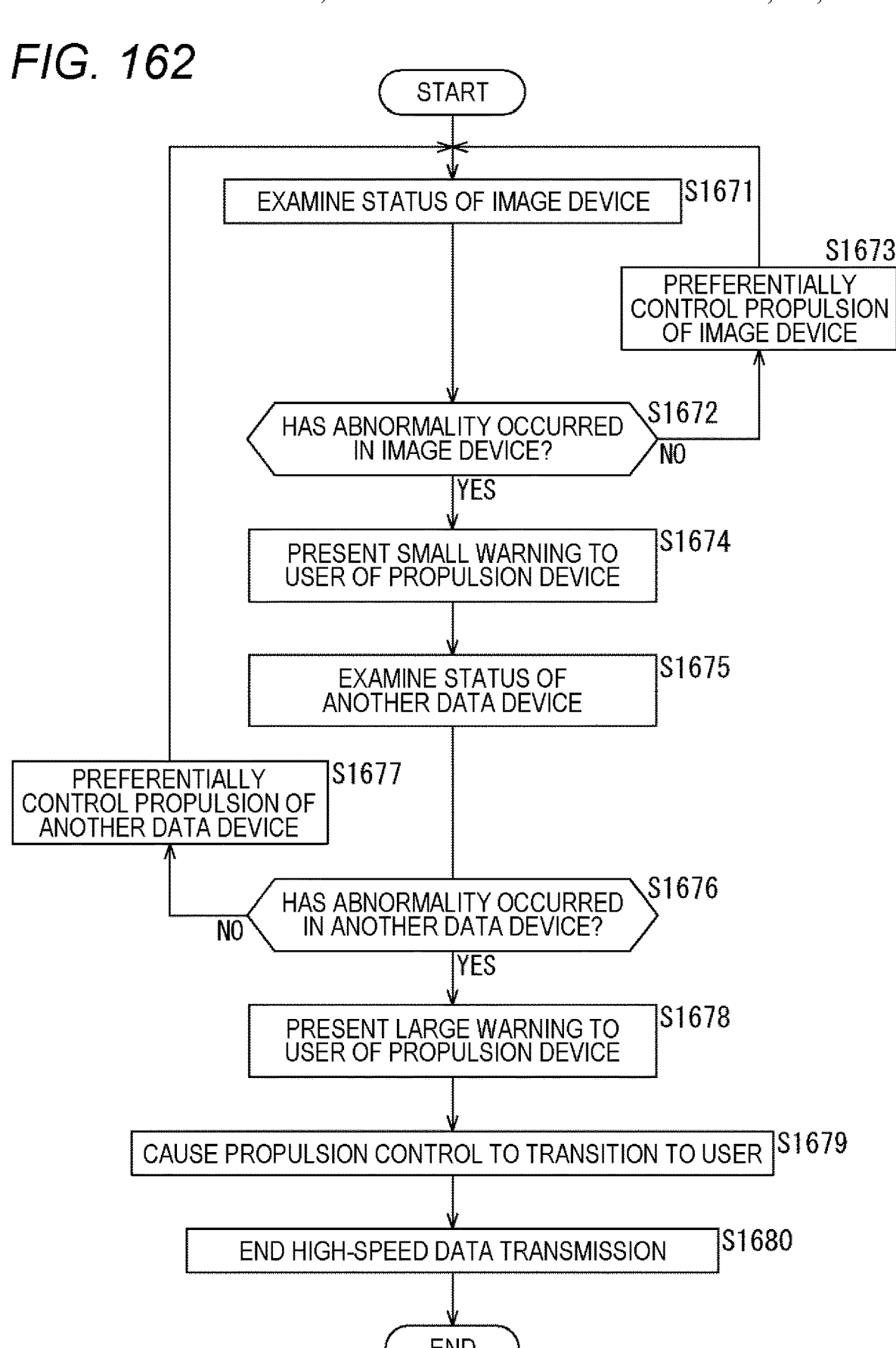

FIG. 162 is a diagram for describing a propulsion control process (part 2) of controlling propulsion of the propulsion device in FIG. 160.

Figure 163:
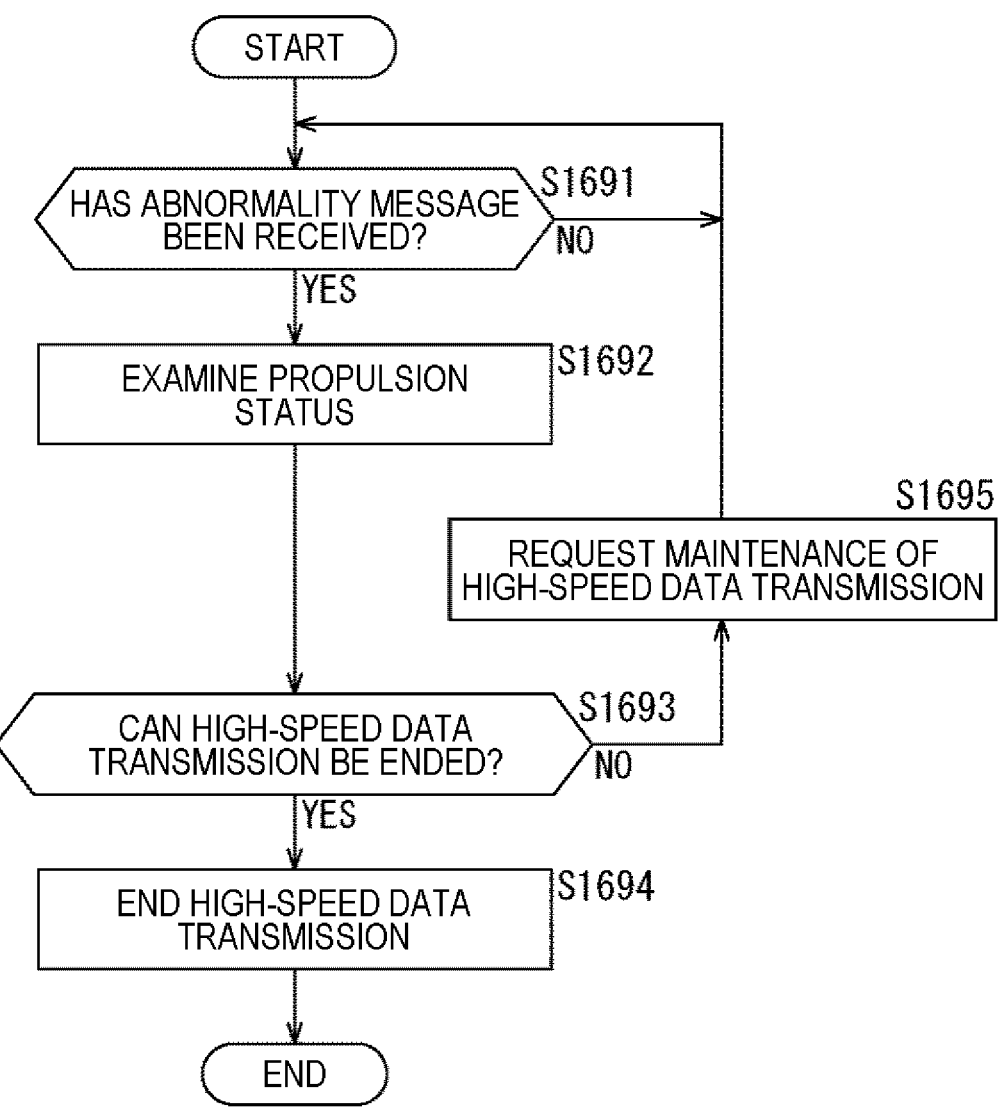

FIG. 163 is a diagram for describing a propulsion control process (part 3) performed by a microcomputer that controls propulsion of the propulsion device in FIG. 160.

Figure 164:
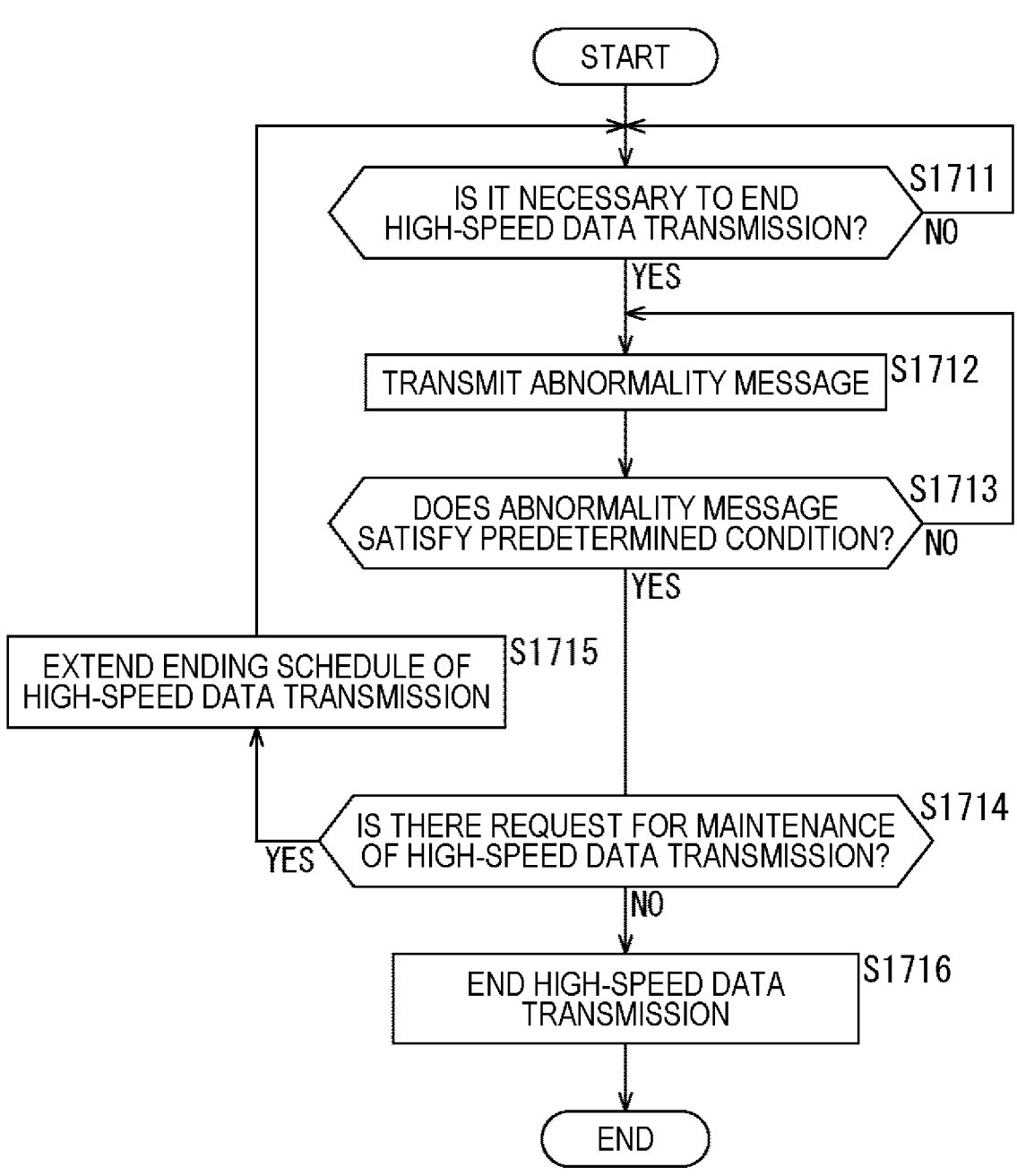

FIG. 164 is a diagram for describing a propulsion control process (part 3) performed by an imaging unit that controls propulsion of the propulsion device in FIG. 160.

FIG. 165 is a diagram for describing a configuration example of responder flag fields definitions for setting enabling (HBEAT_CAP=1) or disabling (HBEAT_CAP=0) of a HEARTBEAT function.

FIG. 166 is a diagram illustrating a configuration example of a HEARTBEAT request message.

FIG. 167 is a diagram illustrating a configuration example of a HEARTBEAT_ACK response message.

FIG. 168 is a diagram illustrating a configuration example of the HEARTBEAT_NAK response message.

FIG. 169 is a diagram illustrating a configuration example of an END_SESSION request message.

Figure 170:
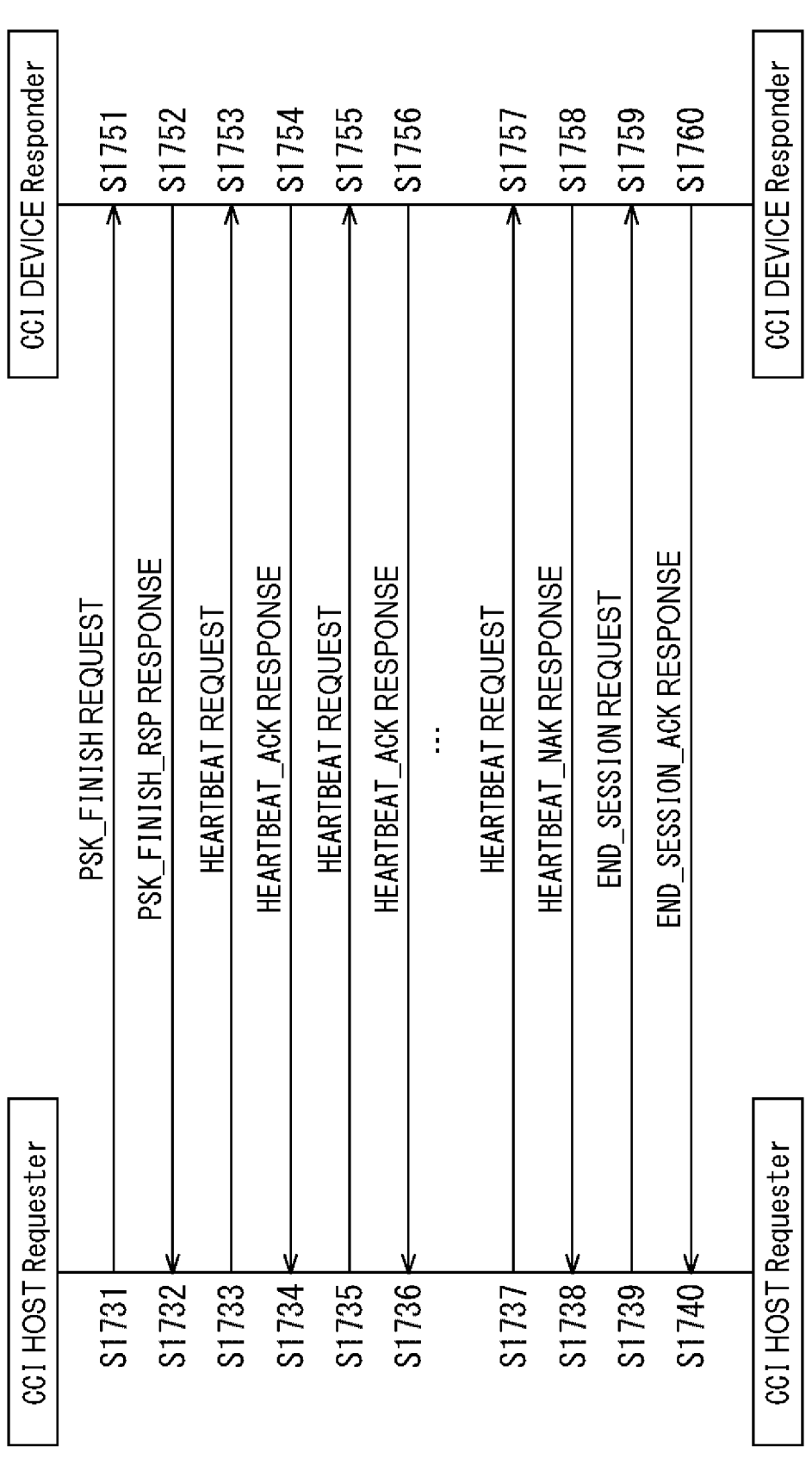

FIG. 170 is a flowchart illustrating HEARTBEAT processing (part 1).

FIG. 171 is a diagram illustrating a configuration example of an END_SESSION_NAK response message.

Figure 172:
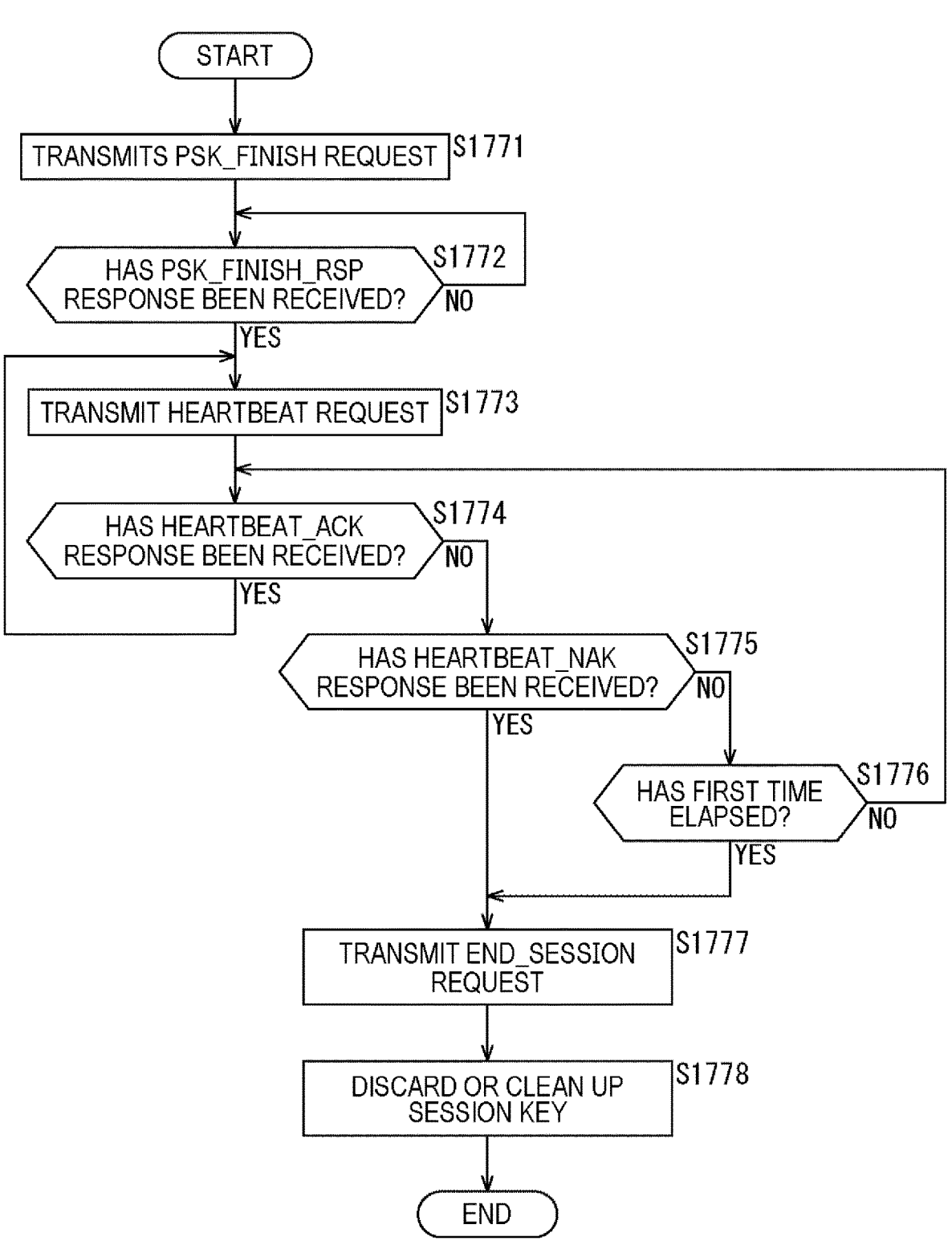

FIG. 172 is a flowchart illustrating HEARTBEAT processing (part 2) of a CCI host (requester).

Figure 173:
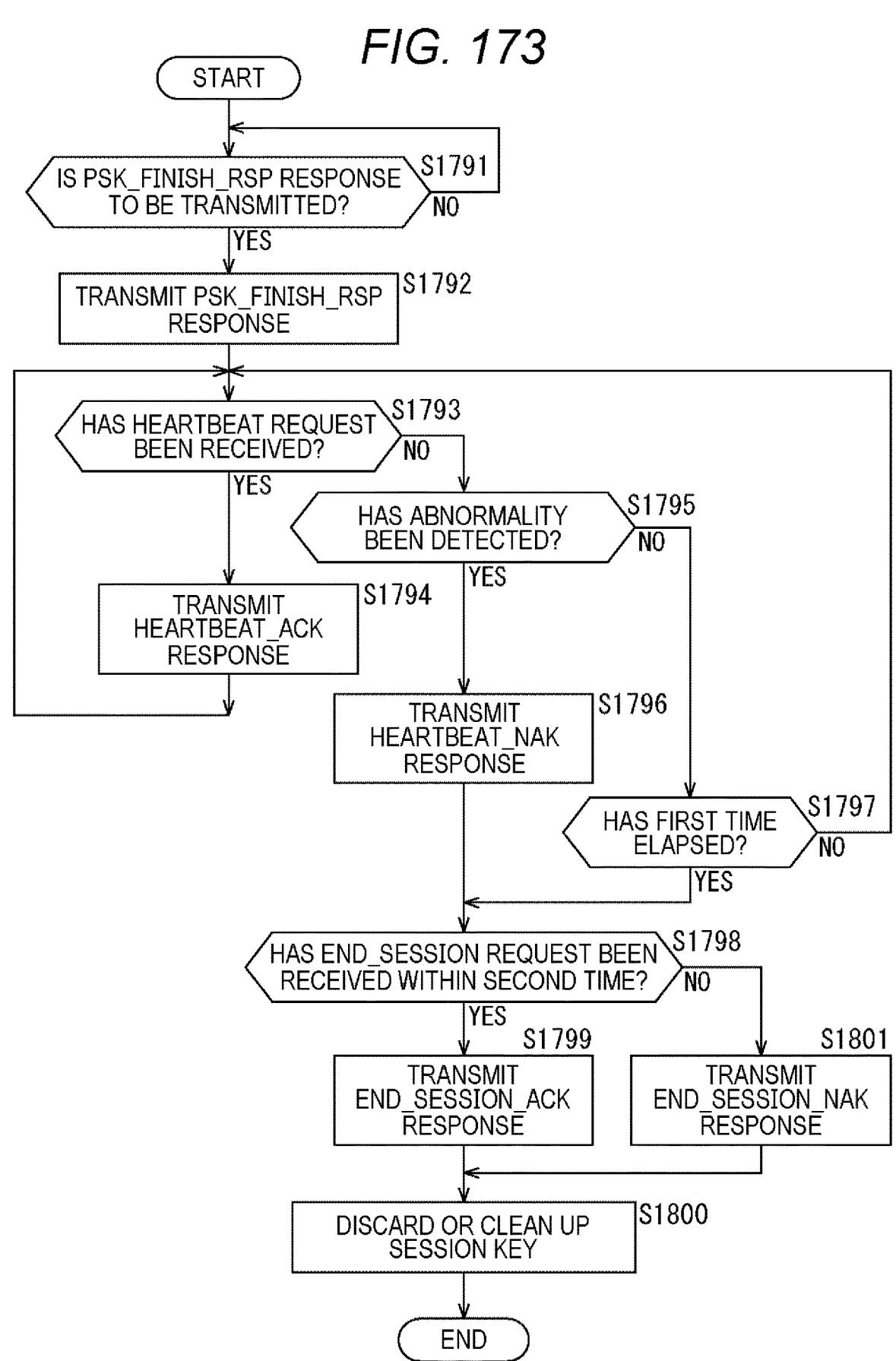

FIG. 173 is a flowchart illustrating HEARTBEAT processing (part 2) of a CCI device (responder).

Figure 174:
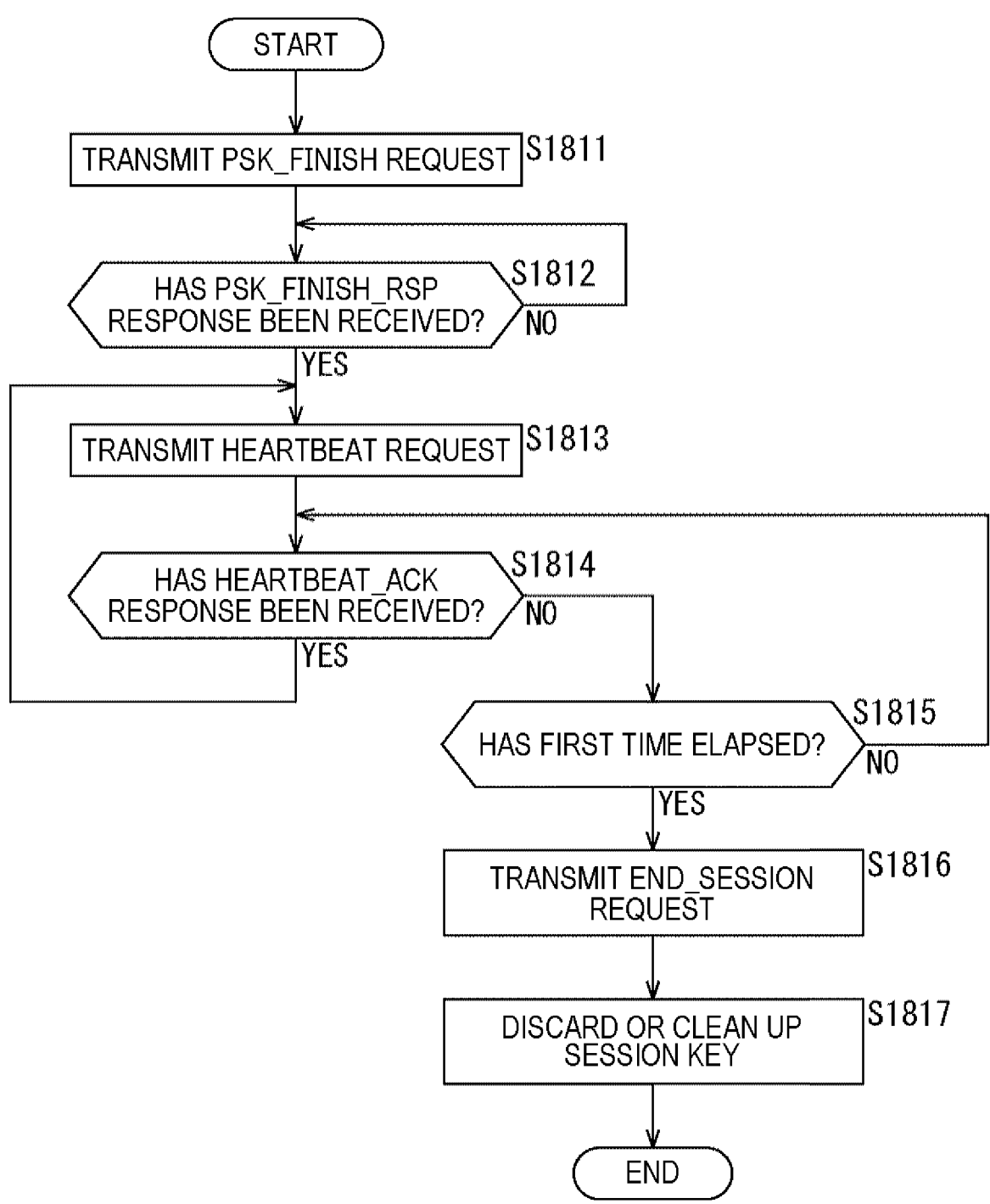

FIG. 174 is a flowchart illustrating HEARTBEAT processing (part 3) of a CCI host (requester).

Figure 175:
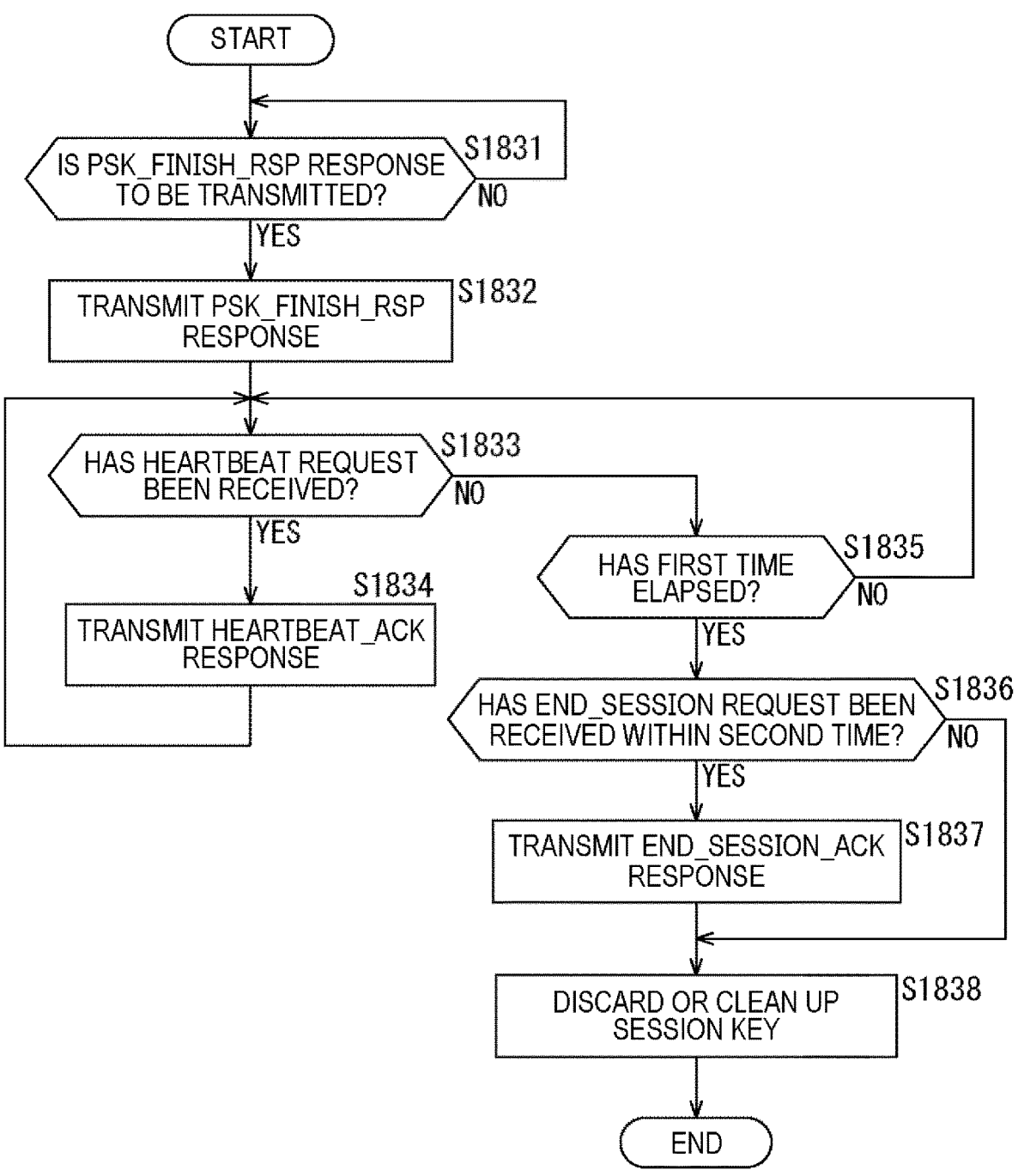

FIG. 175 is a flowchart illustrating HEARTBEAT processing (part 3) of a CCI device (responder).

FIG. 176 is a diagram illustrating a configuration example of an ERROR response message.

FIG. 177 is a diagram for describing a setting example of an error code and error data.

FIG. 178 is a diagram for describing a setting example of ExtendedErrorData.

FIG. 179 is a diagram for describing a setting example of registry or standards body ID in a case where a pseudo HEARTBEAT function is used.

FIG. 180 is a diagram for describing a setting example of a VENDOR_DEFINED_REQUEST request message.

FIG. 181 is a diagram for describing a setting example of a VENDOR_DEFINED_RESPONSE response message.

Figure 182:
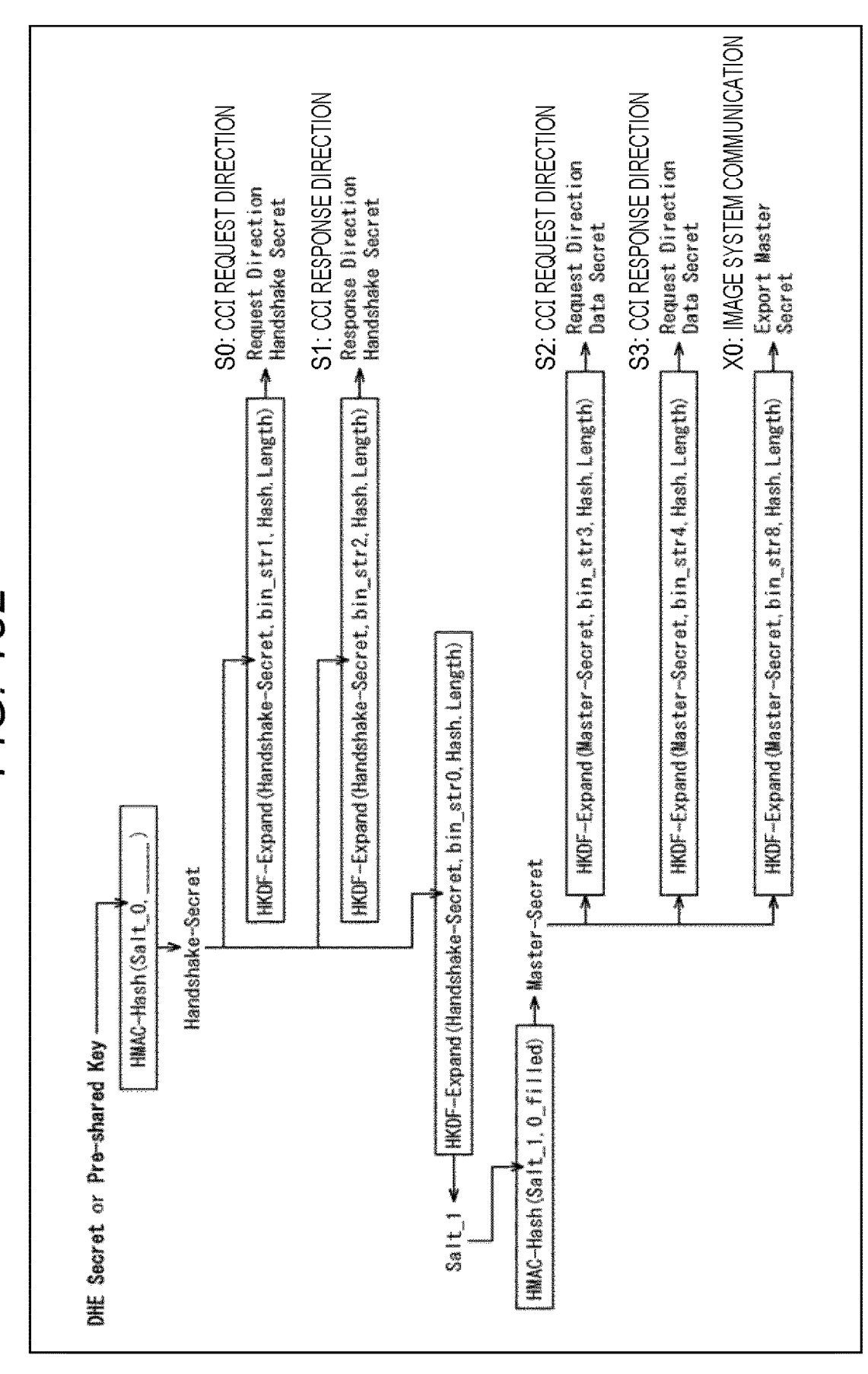

FIG. 182 is a diagram illustrating a key schedule of an SPDM.

FIG. 183 is a diagram illustrating an example of KEY_UPDATA_operations.

Figure 184:
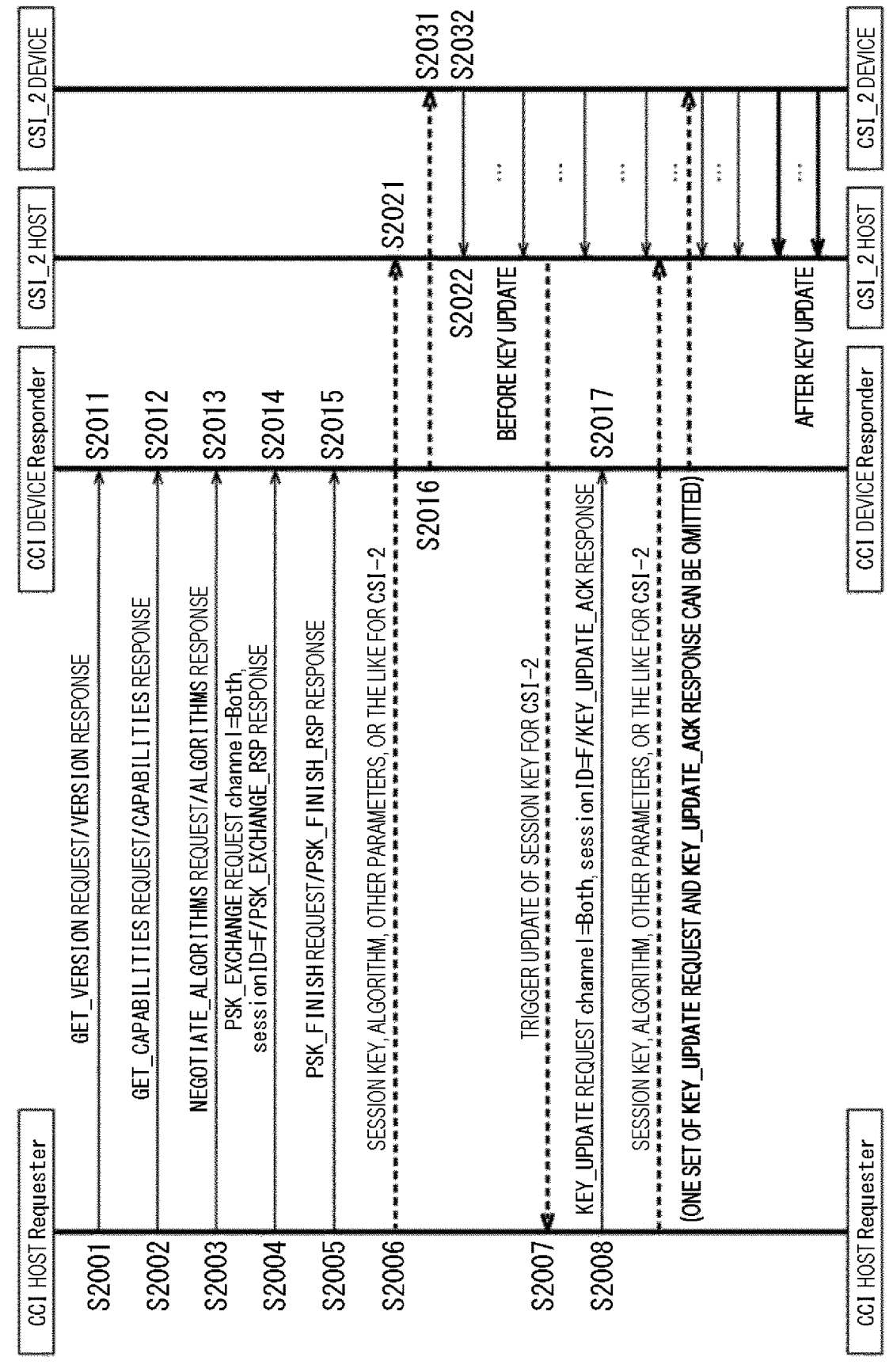

FIG. 184 is a flowchart illustrating an example of a flow of processing related to key update.

FIG. 185 is a diagram illustrating an example of ePH2.

Figure 186:
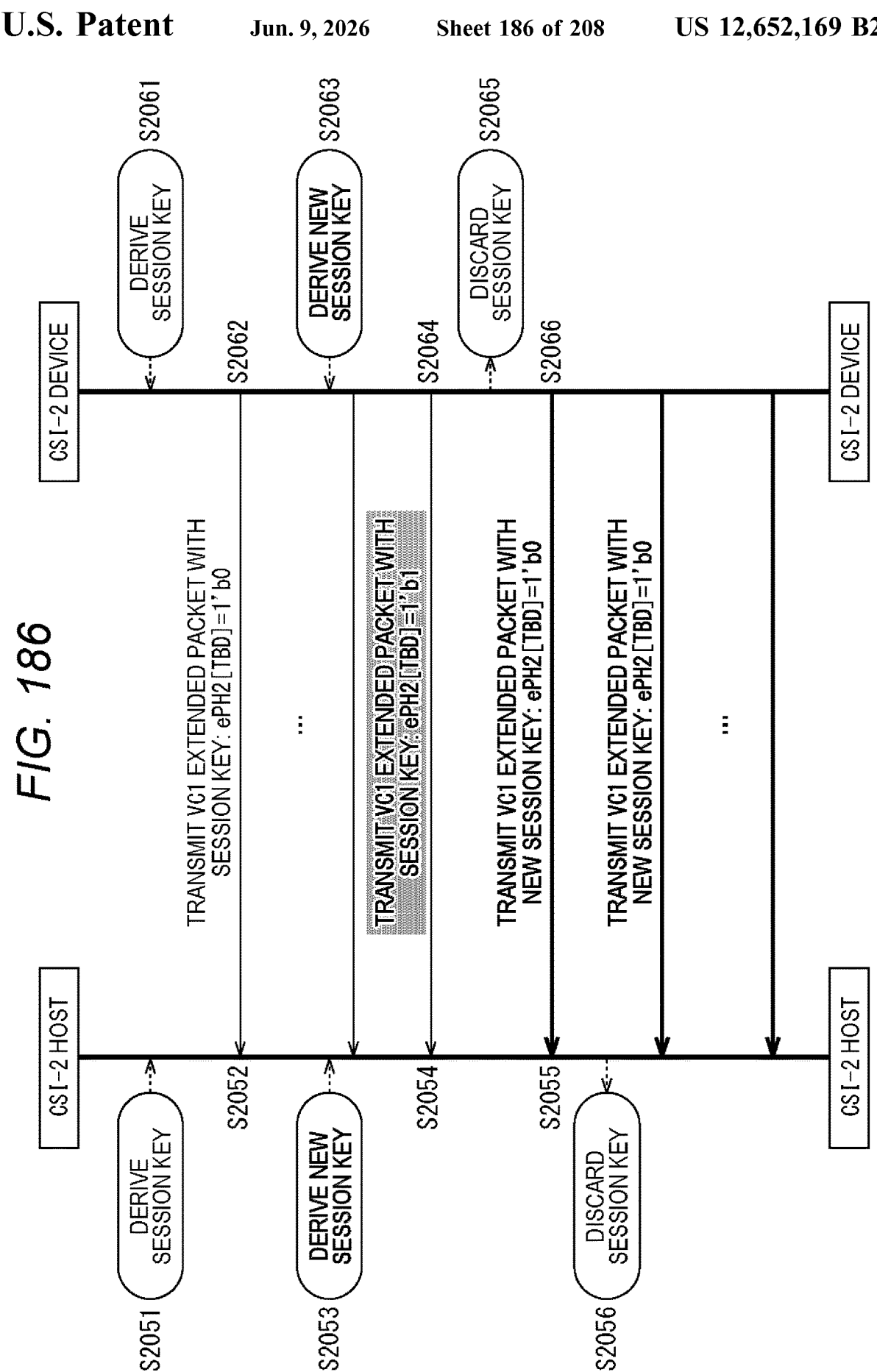

FIG. 186 is a flowchart illustrating an example of a flow of session key update.

Figure 187:
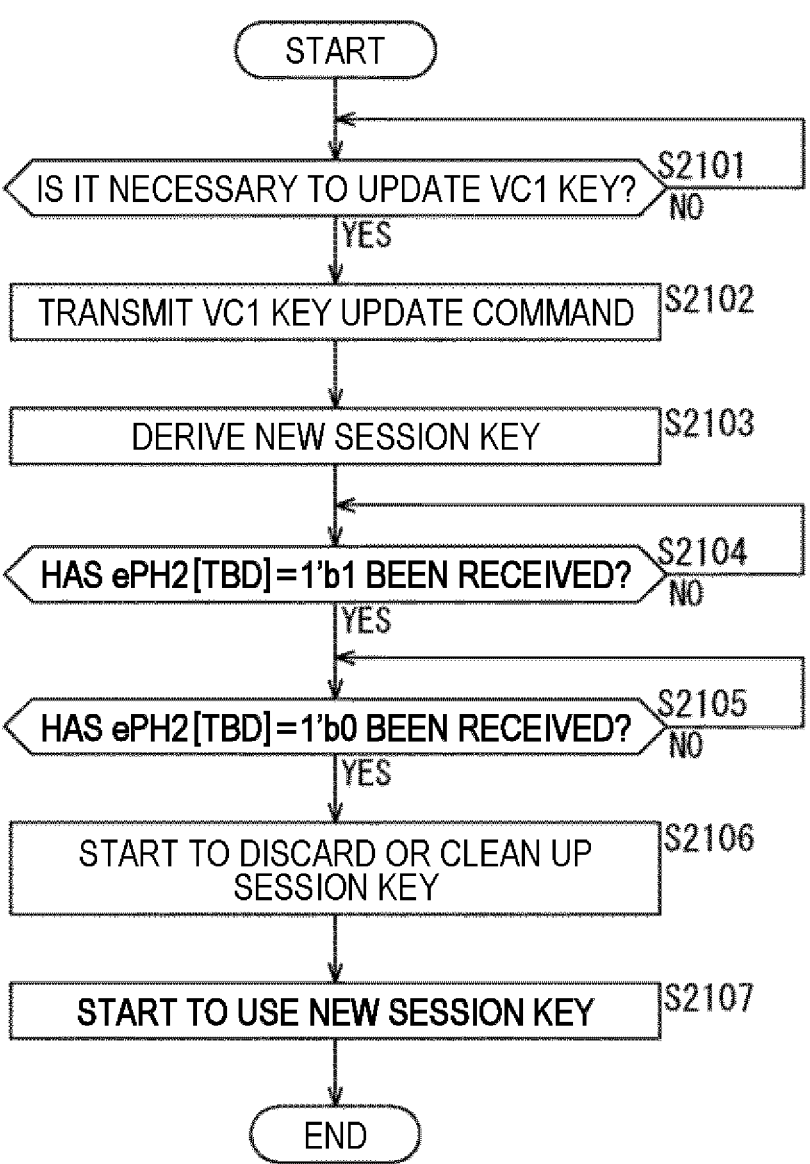

FIG. 187 is a flowchart illustrating an example of a flow of a processor process.

Figure 188:
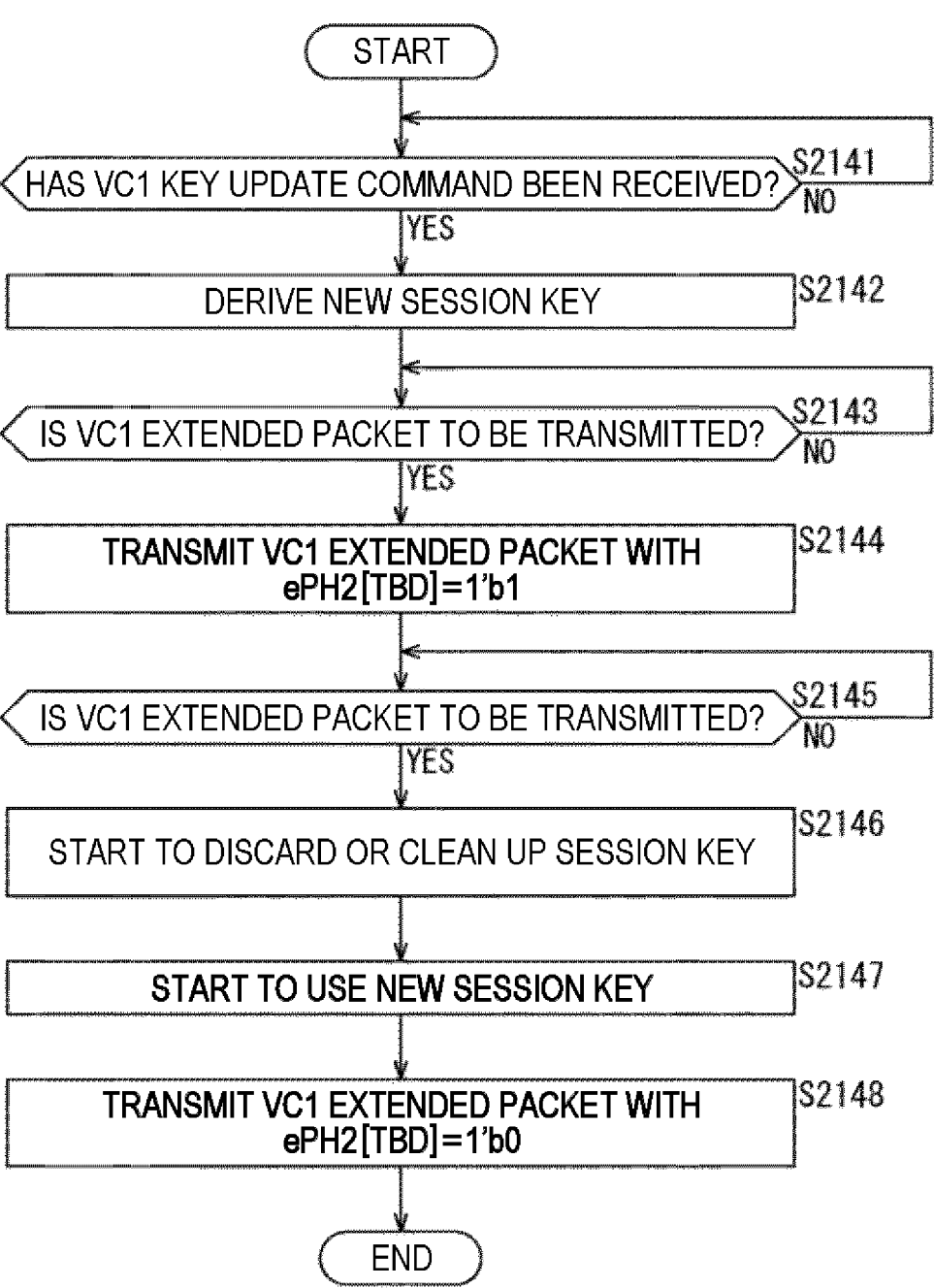

FIG. 188 is a flowchart illustrating an example of a flow of a sensor process.

Figure 189:
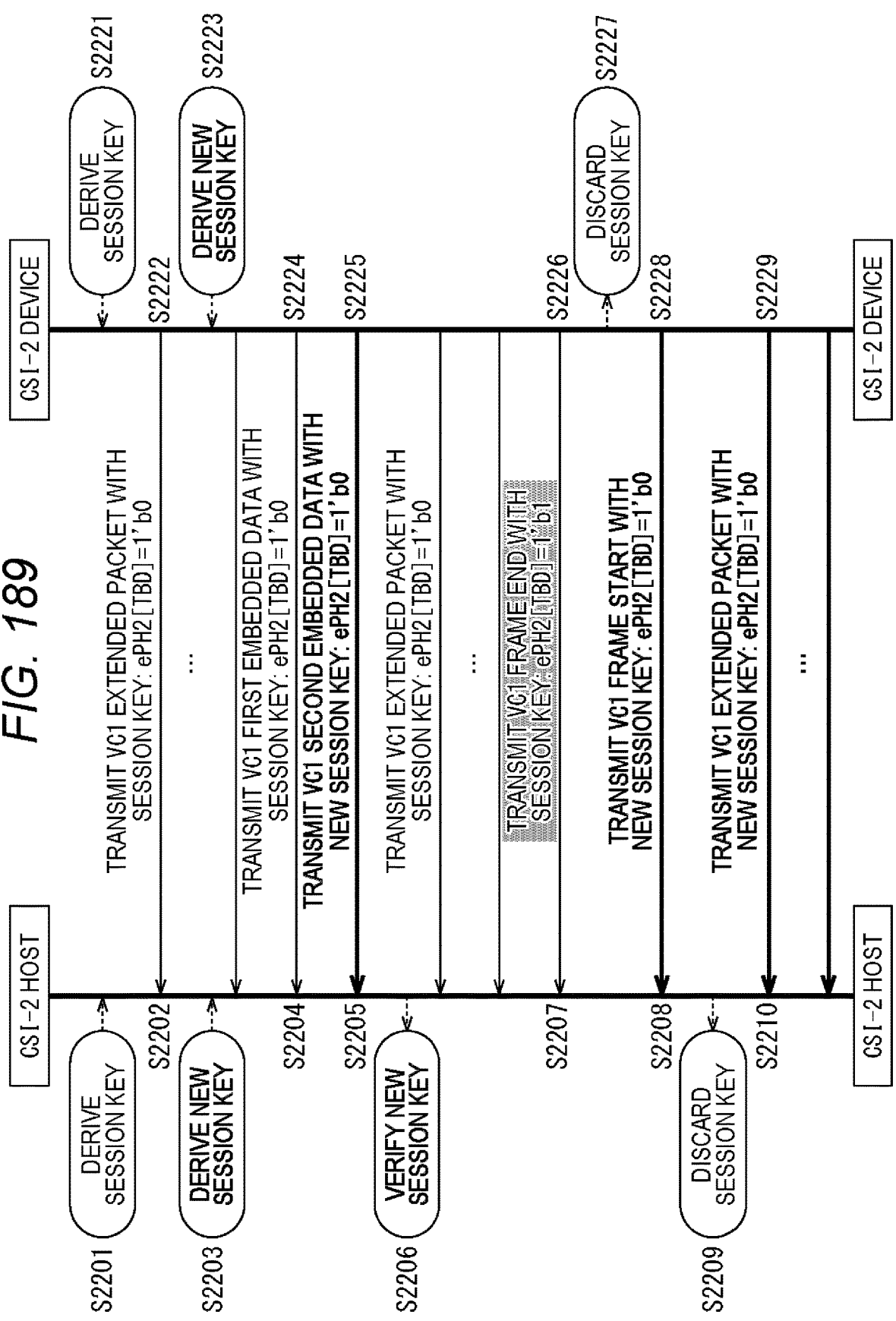

FIG. 189 is a flowchart illustrating an example of a flow of session key update.

Figure 190:
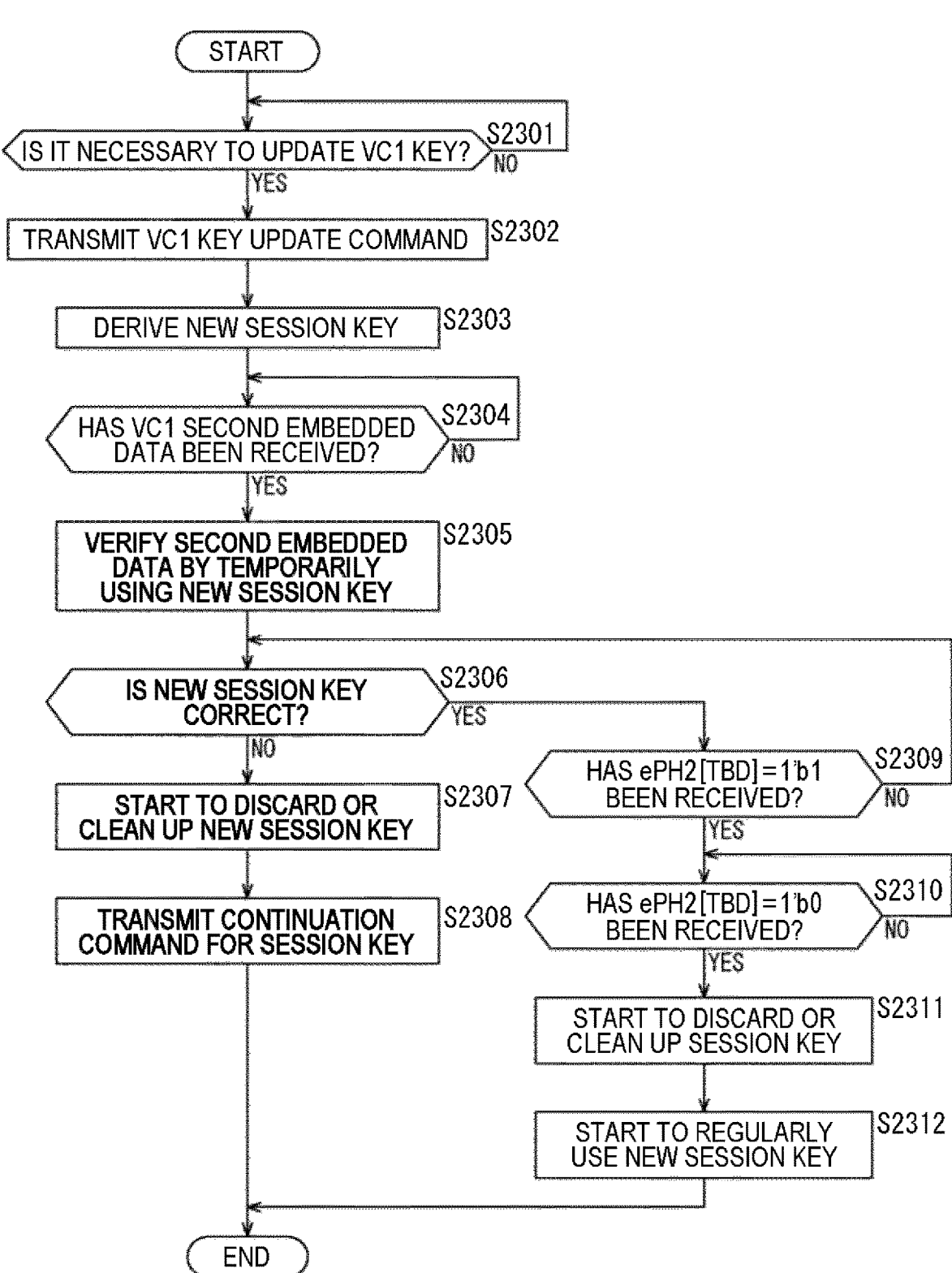

FIG. 190 is a flowchart illustrating an example of a flow of a processor process.

Figure 191:
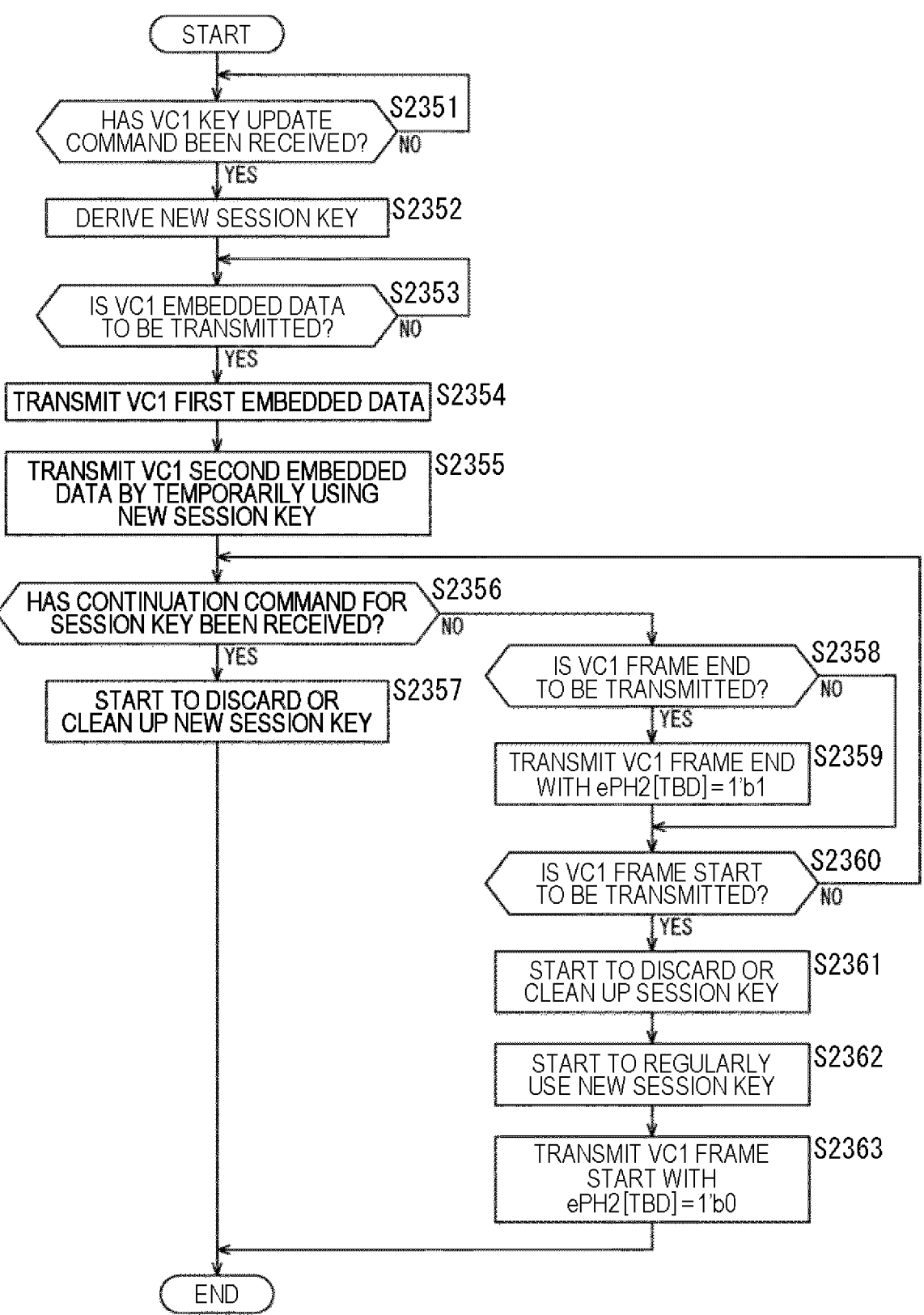

FIG. 191 is a flowchart illustrating an example of a flow of a sensor process.

Figure 192:
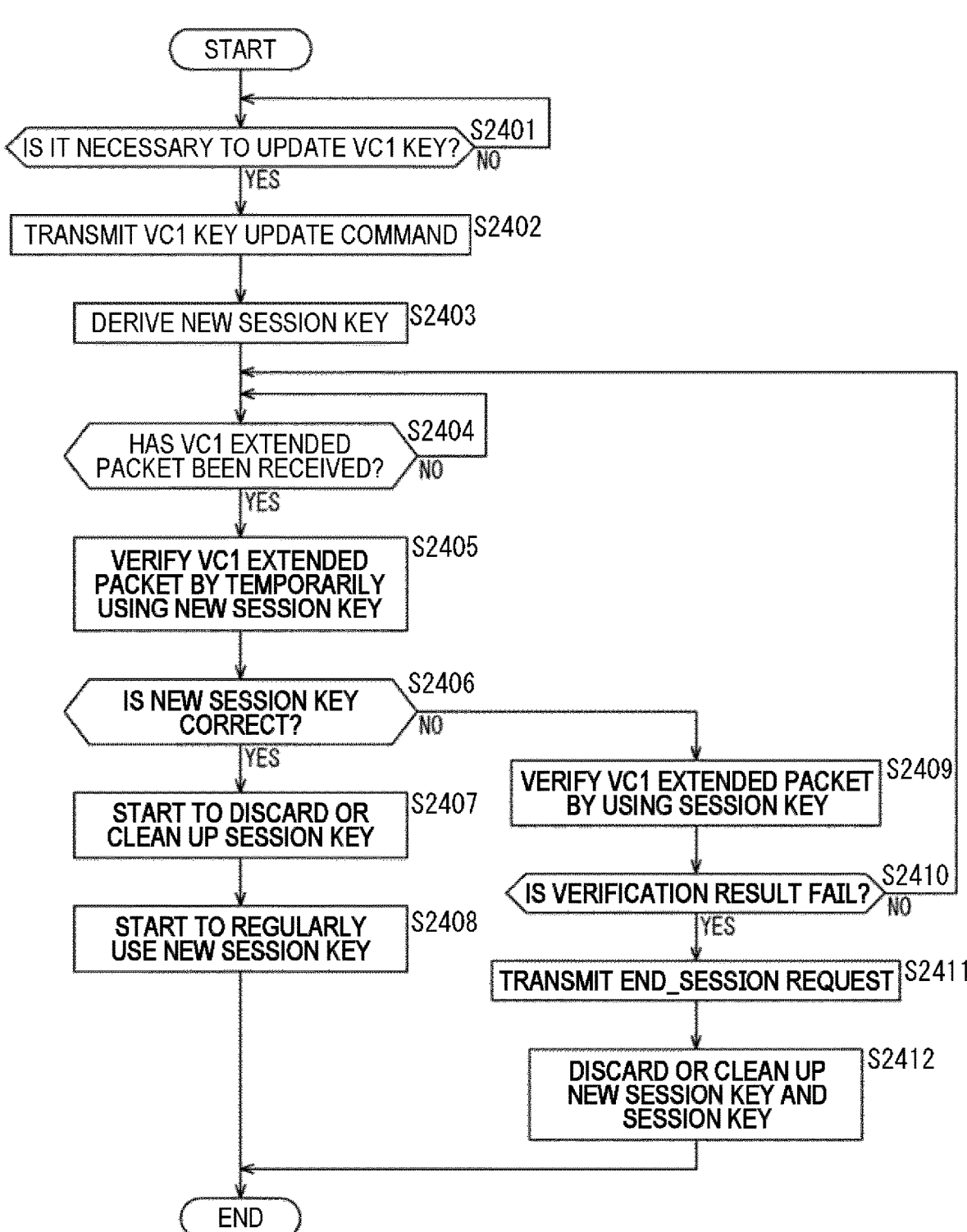

FIG. 192 is a flowchart illustrating an example of a flow of a processor process.

Figure 193:
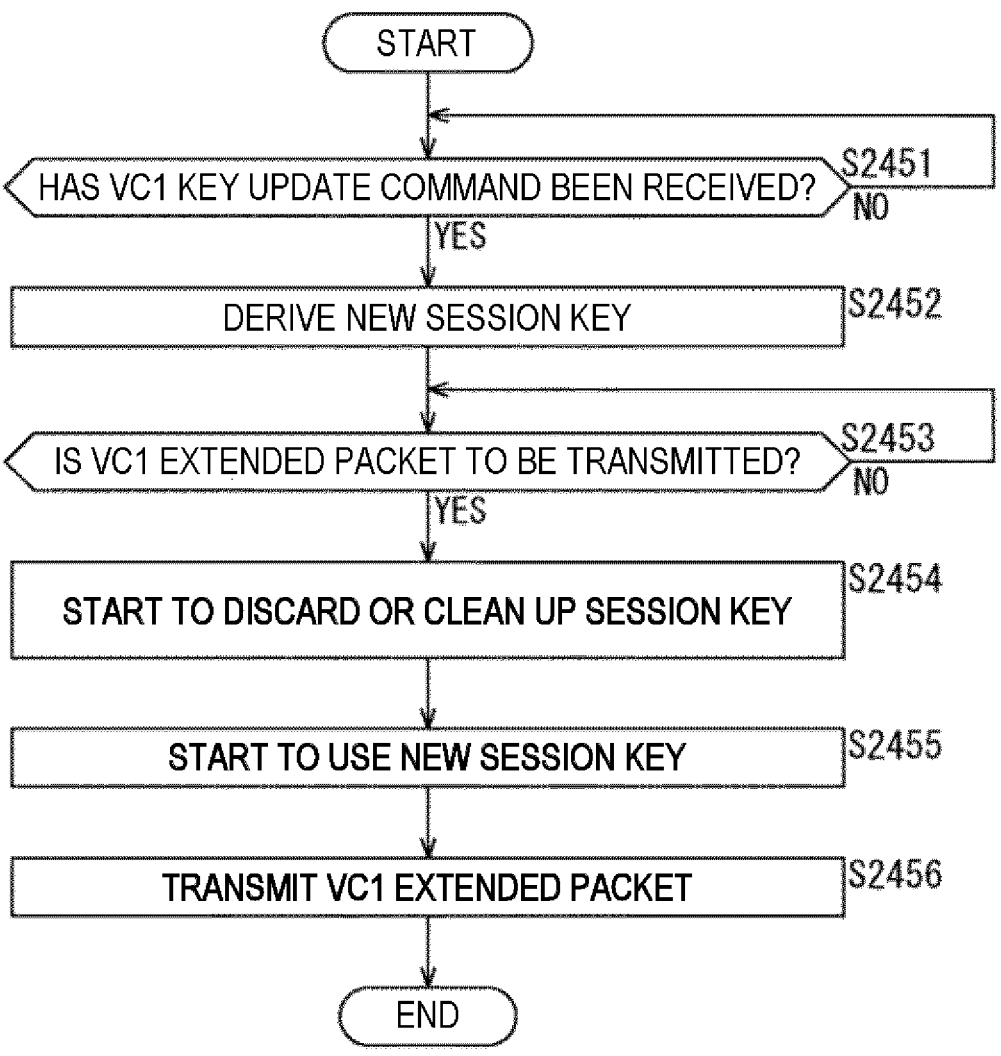

FIG. 193 is a flowchart illustrating an example of a flow of a sensor process.

Figure 194:
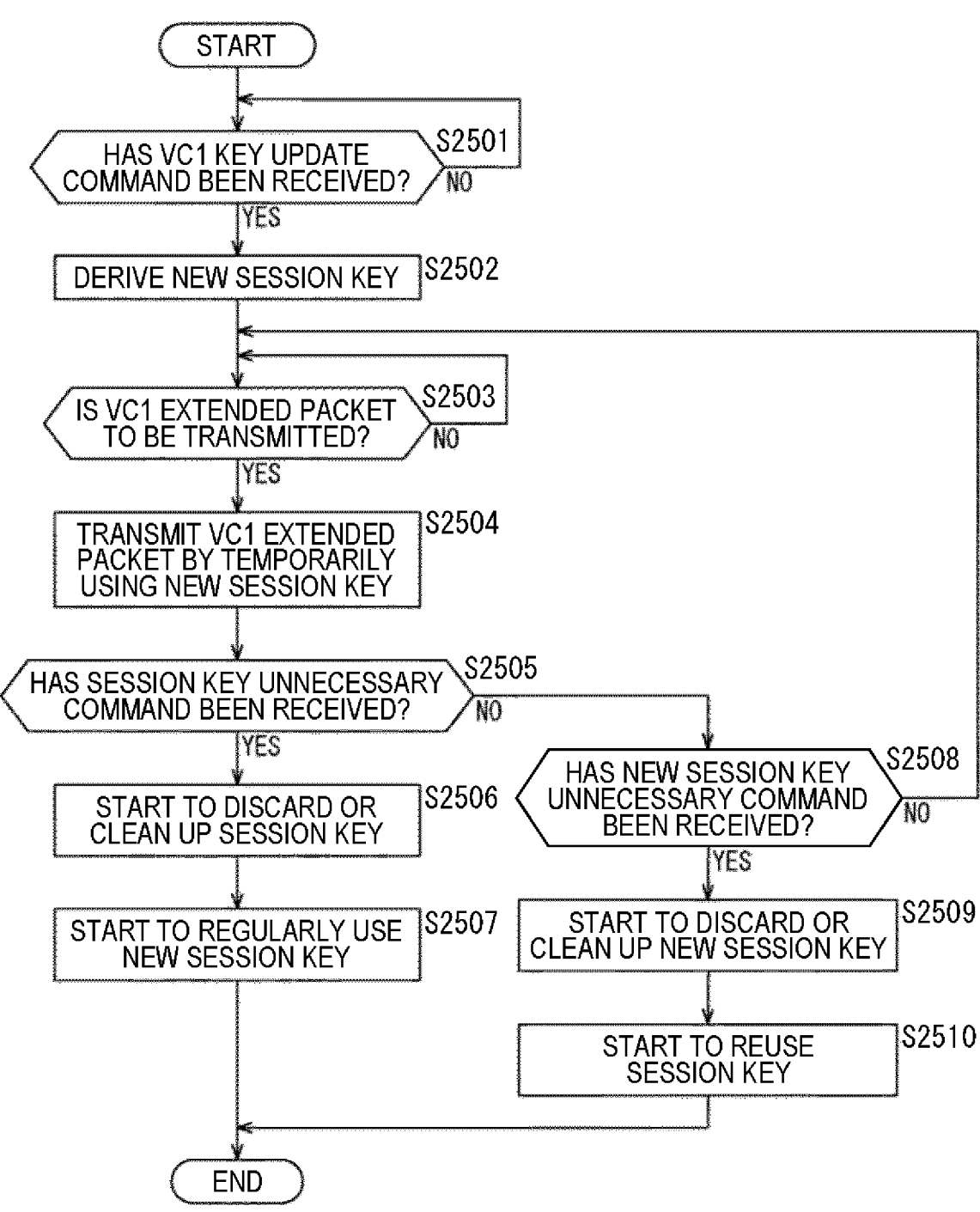

FIG. 194 is a flowchart illustrating an example of a flow of a sensor process.

FIG. 195 is a diagram illustrating an example of KeyUpdataReq and KeySwitchTiming.

Figure 196:
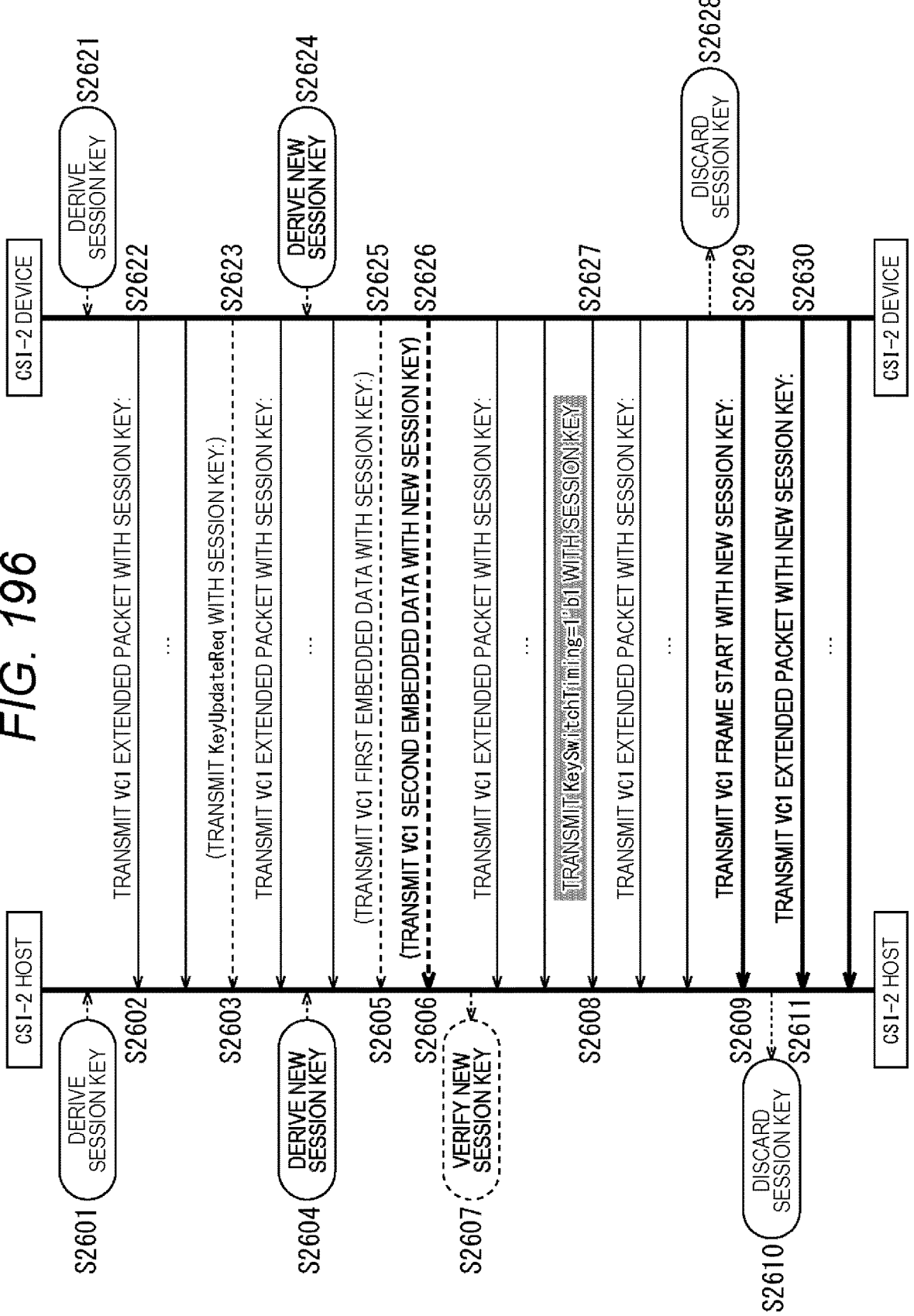

FIG. 196 is a flowchart illustrating an example of a flow of session key update.

Figure 197:
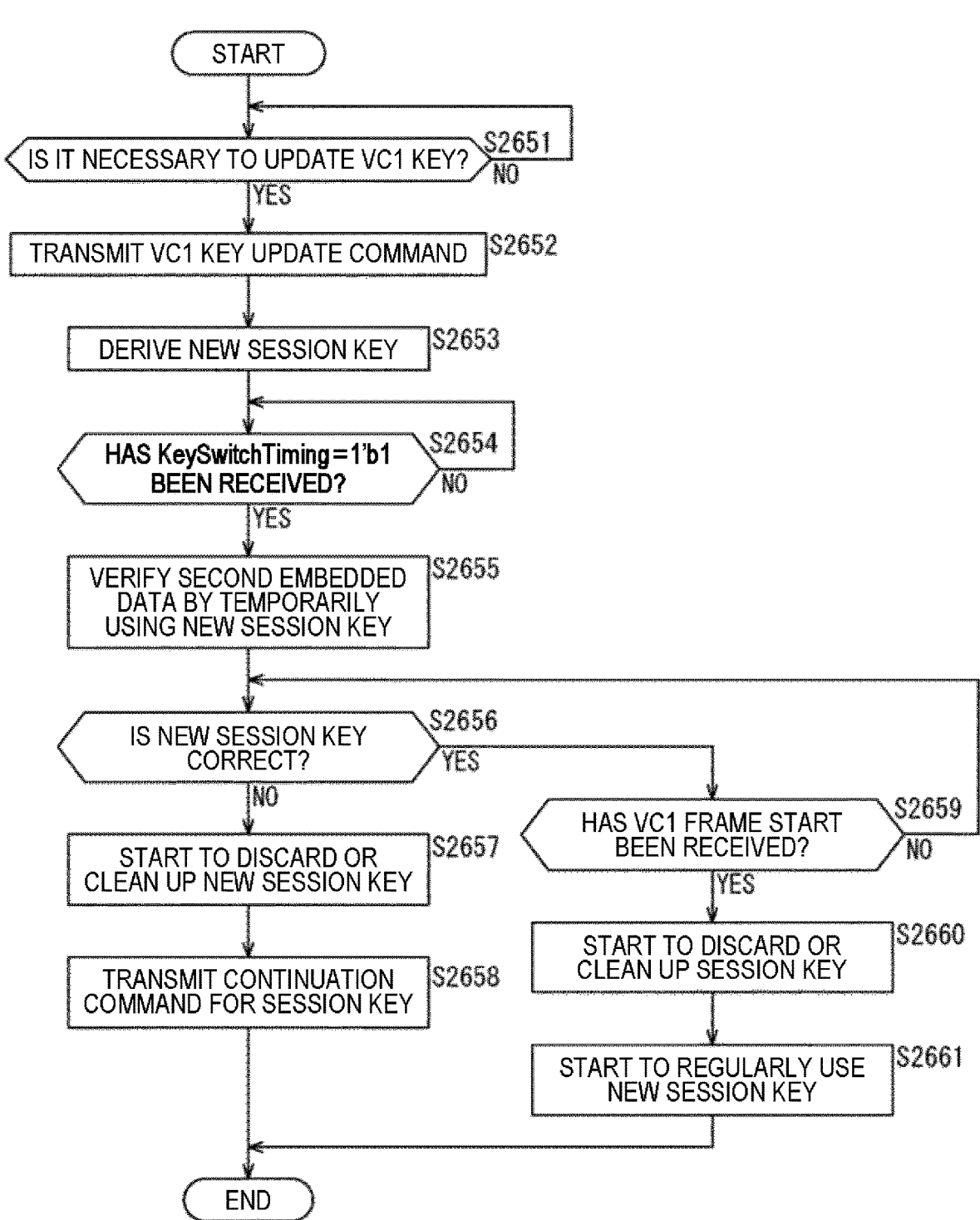

FIG. 197 is a flowchart illustrating an example of a flow of a processor process.

Figure 198:
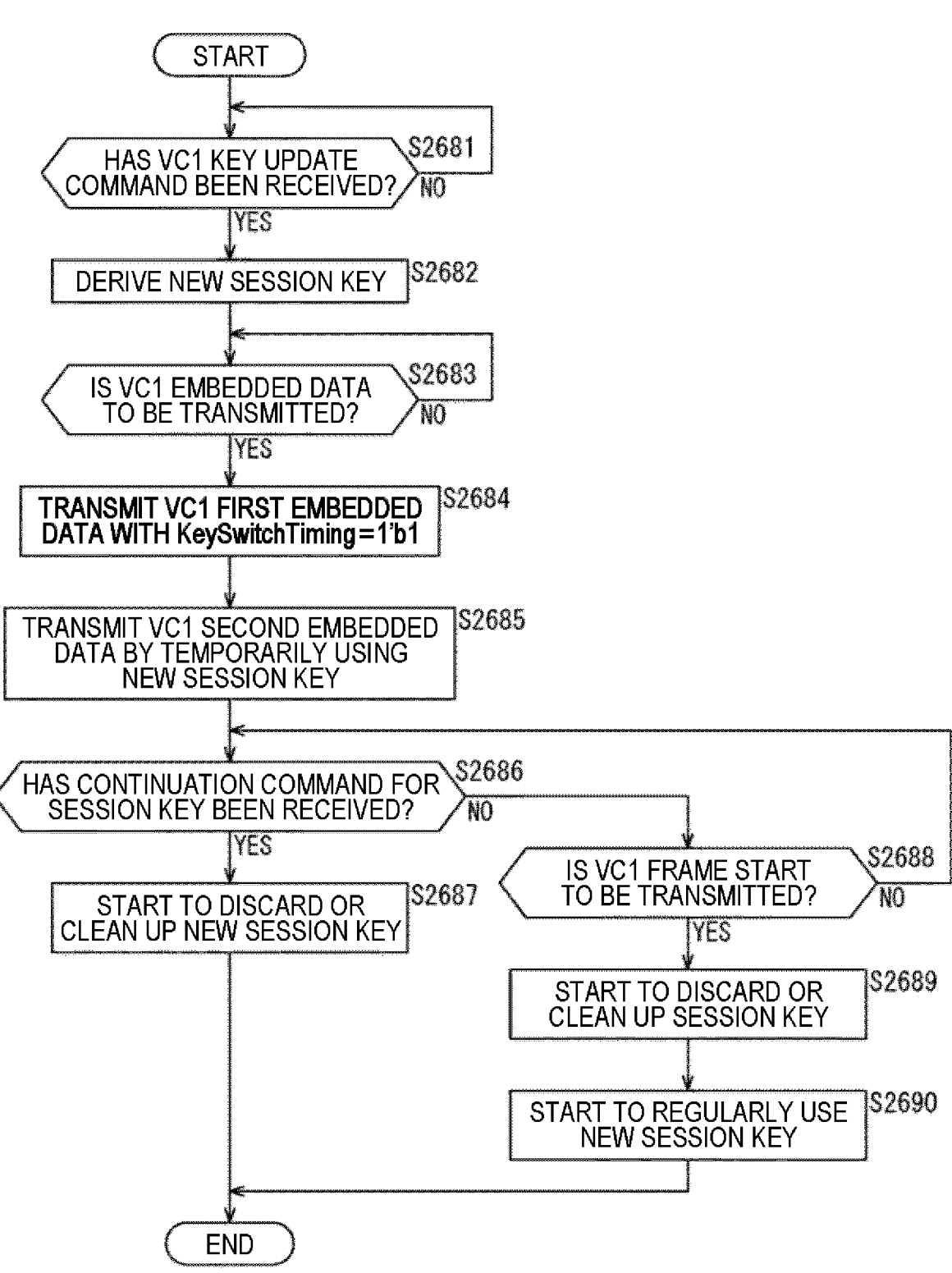

FIG. 198 is a flowchart illustrating an example of a flow of a sensor process.

Figure 199:
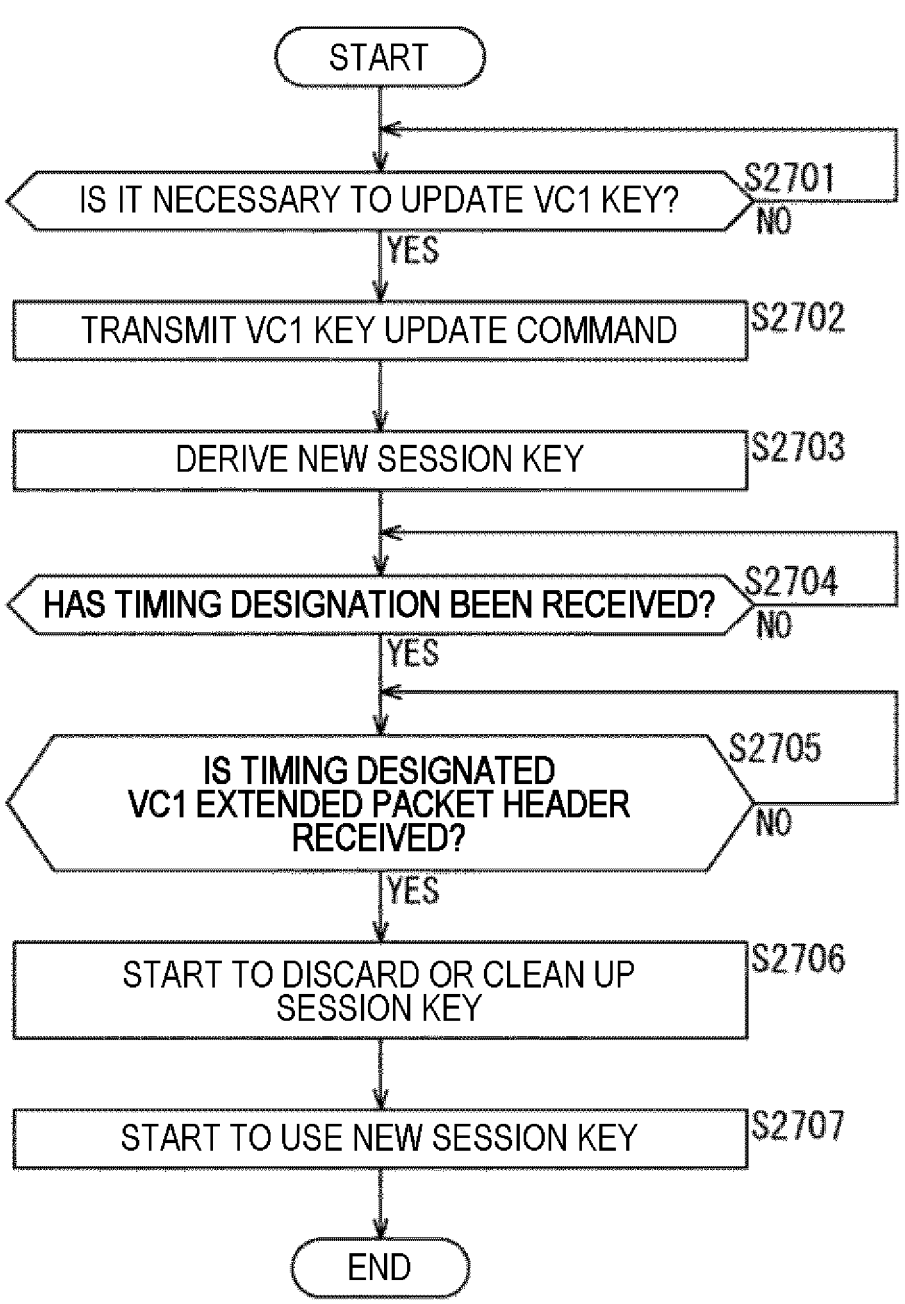

FIG. 199 is a flowchart illustrating an example of a flow of a processor process.

Figure 200:
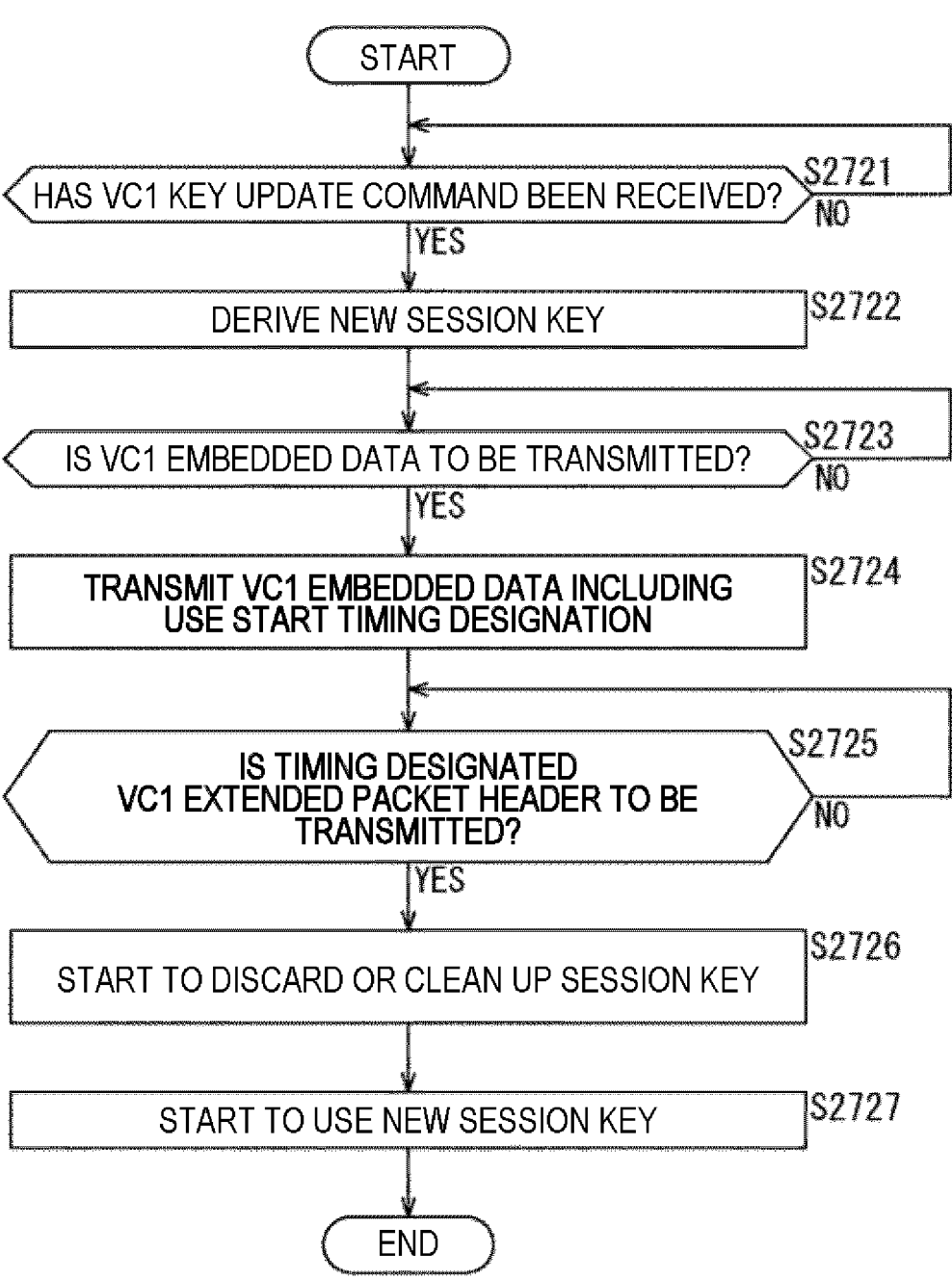

FIG. 200 is a flowchart illustrating an example of a flow of a sensor process.

Figure 201:
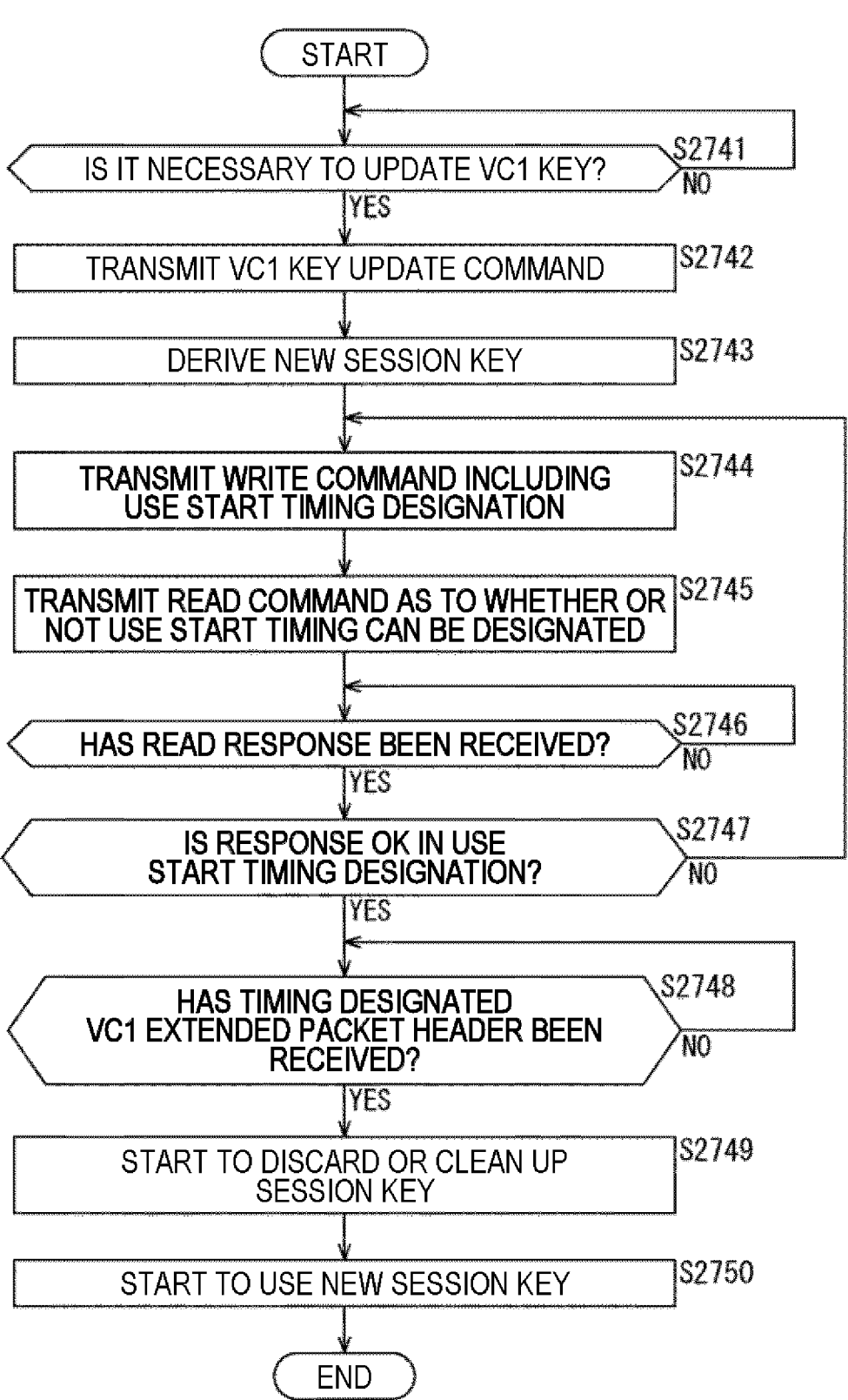

FIG. 201 is a flowchart illustrating an example of a flow of a processor process.

Figure 202:
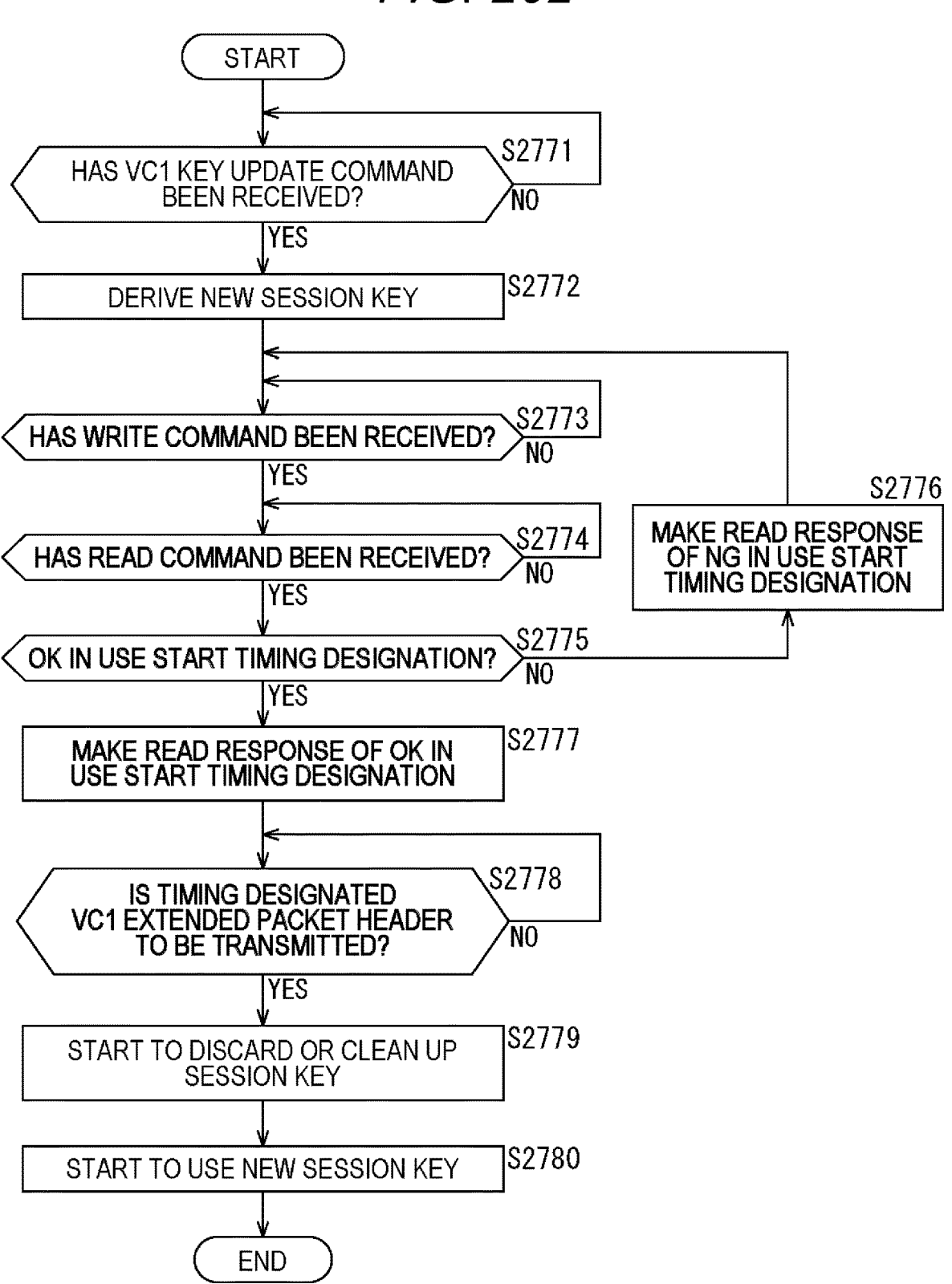

FIG. 202 is a flowchart illustrating an example of a flow of a sensor process.

Figure 203:
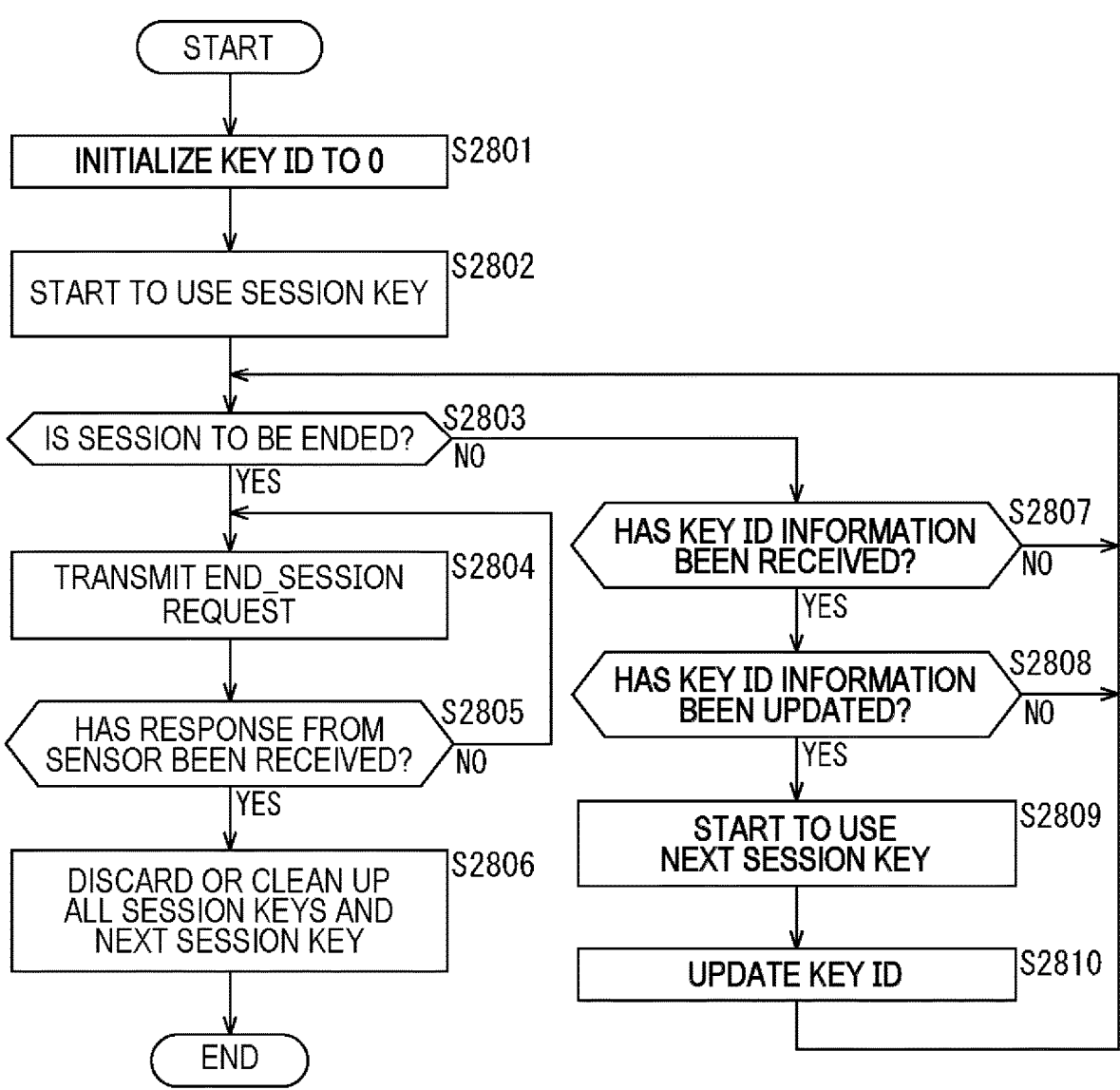

FIG. 203 is a flowchart illustrating an example of a flow of a processor process.

Figure 204:
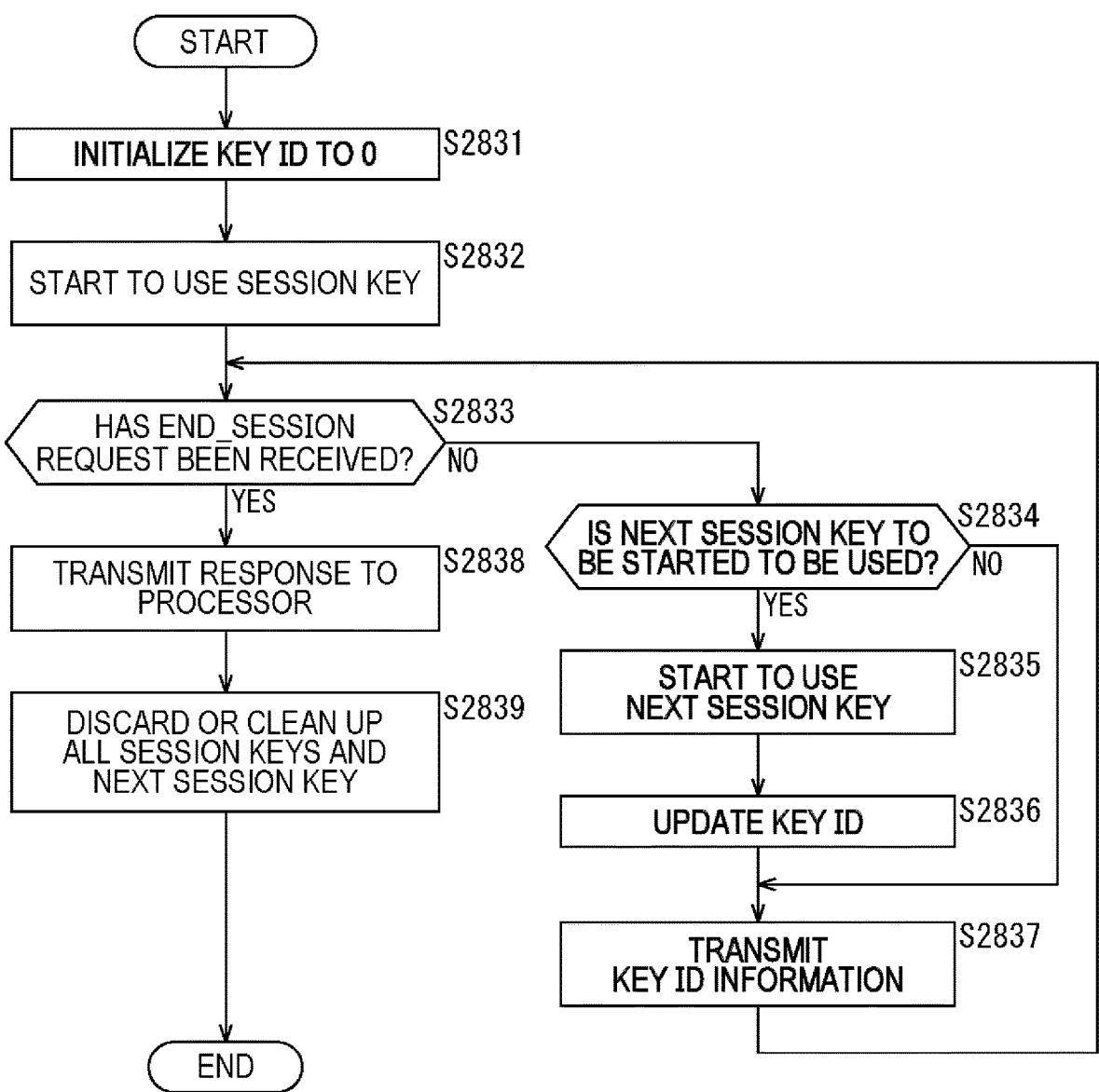

FIG. 204 is a flowchart illustrating an example of a flow of a sensor process.

FIG. 205 is a diagram illustrating an example of EvenOddkey.

Figure 206:
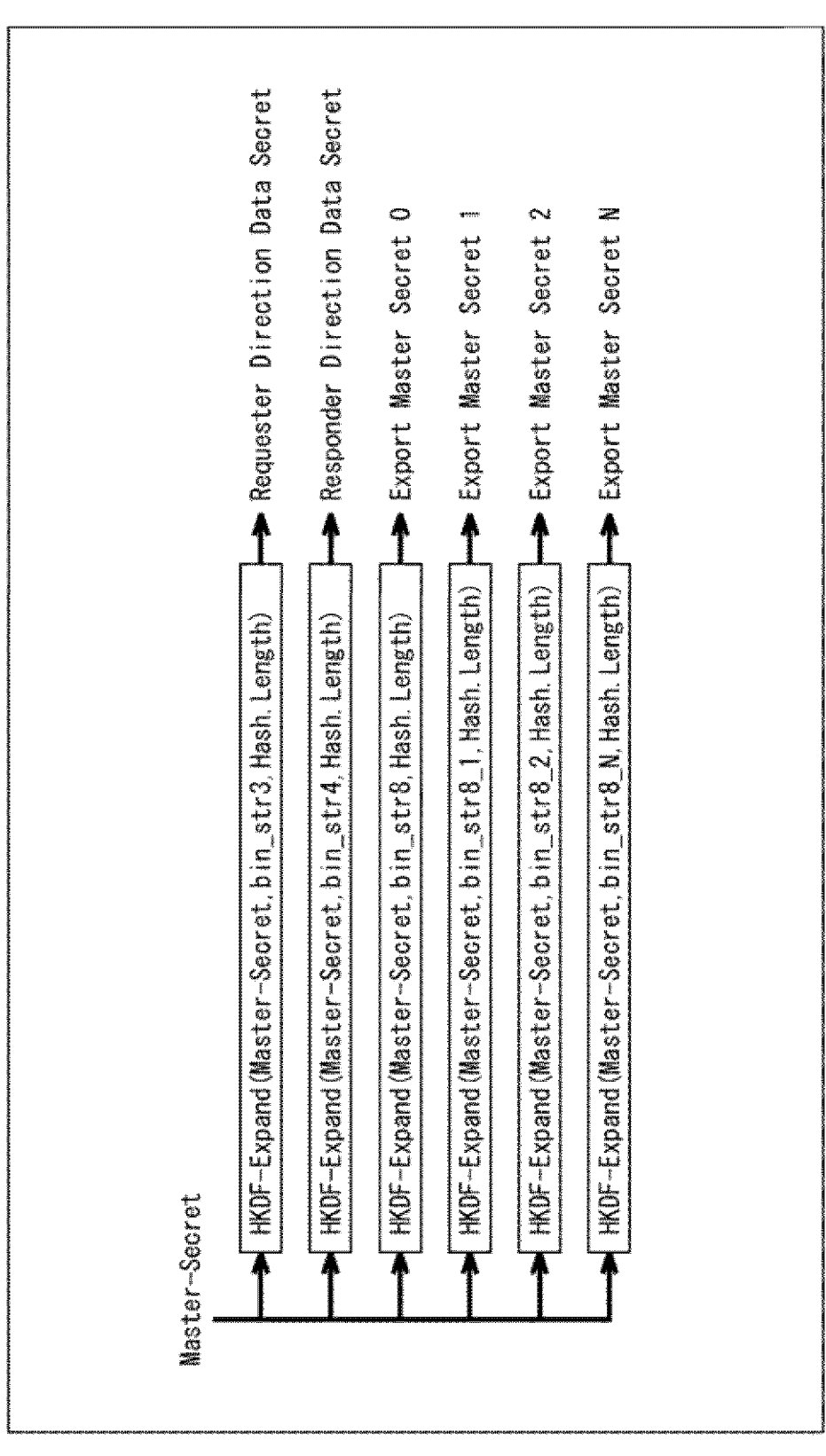

FIG. 206 is a diagram illustrating an example of deriving a session key.

Figure 207:
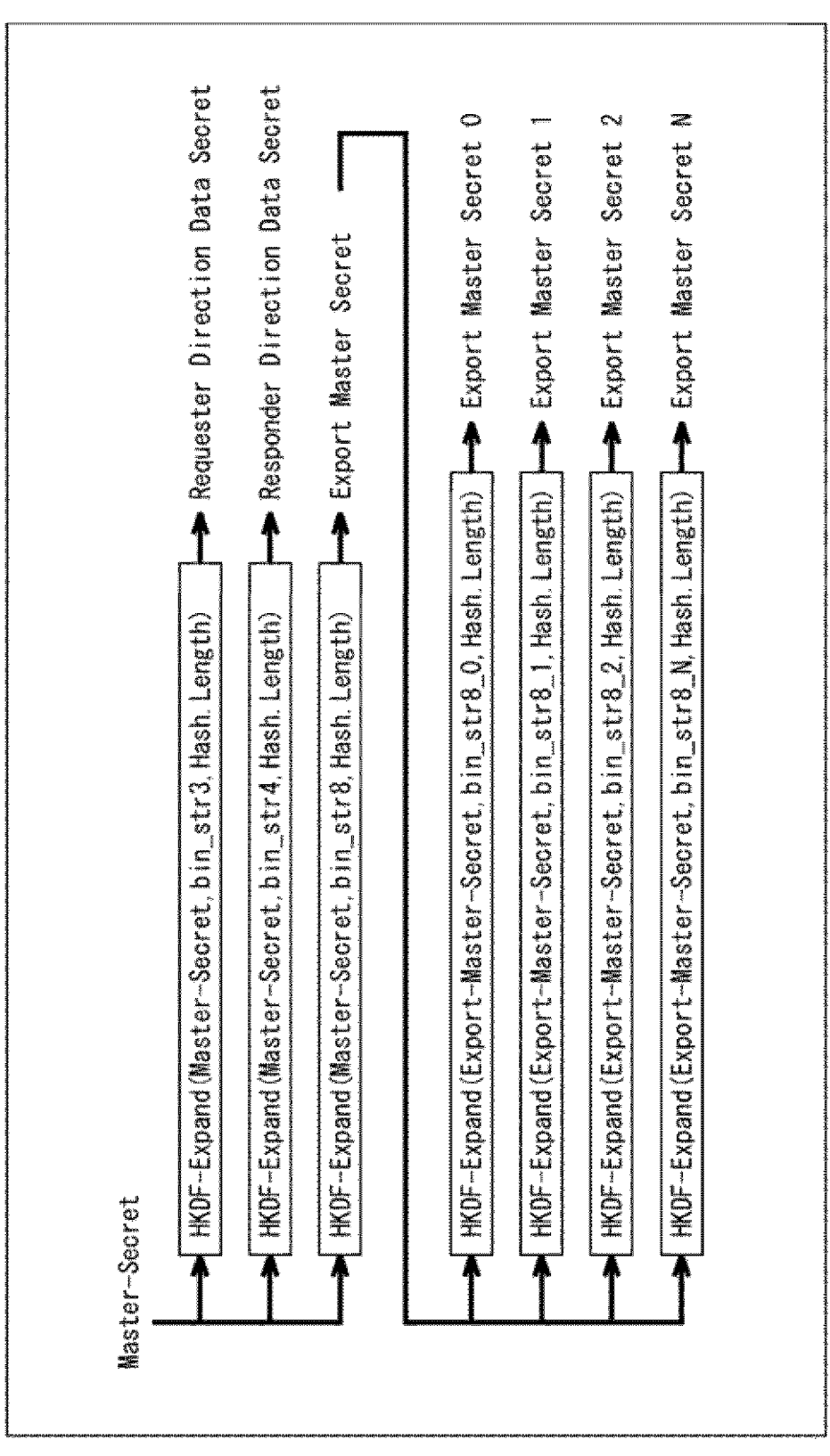

FIG. 207 is a diagram illustrating an example of deriving a session key.

Figure 208:
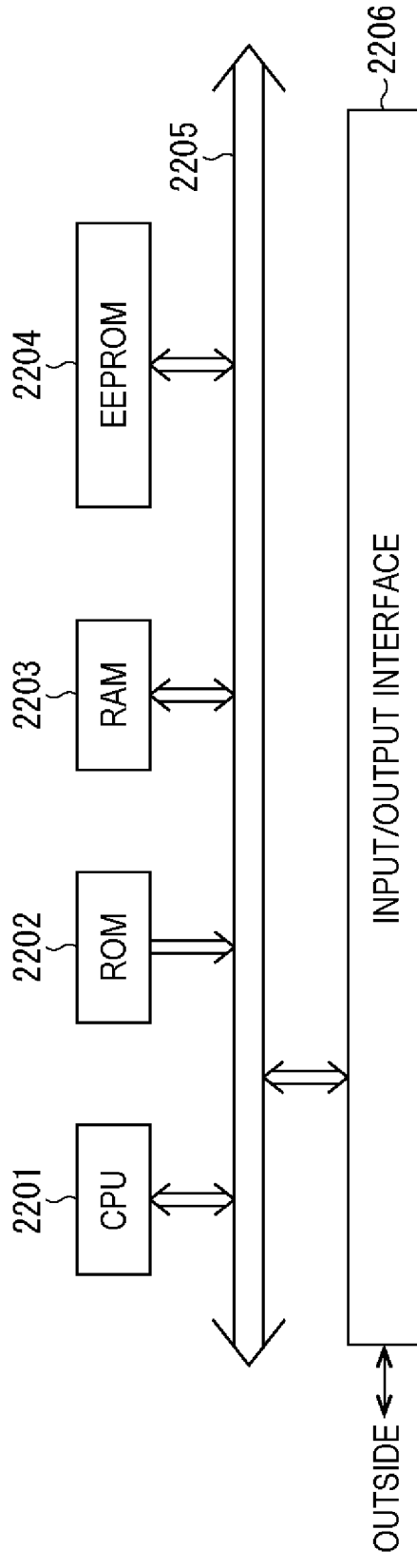

FIG. 208 is a block diagram illustrating a configuration example of an embodiment of a computer to which the present technology is applied.

MODE FOR CARRYING OUT THE INVENTION

Hereinafter, specific embodiments to which the present technology is applied will be described in detail with reference to the drawings.

Configuration Example of Communication System

FIG. 1 is a block diagram illustrating a configuration example of a first embodiment of a communication system to which the present technology is applied.

As illustrated in FIG. 1, a communication system 11 has a configuration in which an image sensor 21 and an application processor 22 are connected via a bus 23. For example, the communication system 11 is used for CSI-2 connection inside an existing mobile device such as a so-called smartphone.

The image sensor 21 is configured by incorporating an extension mode-compatible CSI-2 transmission circuit 31 together with, for example, a lens and an imaging element (none of which are illustrated). For example, the image sensor 21 transmits image data of an image acquired through imaging by an imaging element to the application processor 22 by the extension mode-compatible CSI-2 transmission circuit 31.

The application processor 22 is configured by incorporating an extension mode-compatible CSI-2 reception circuit 32 together with a large scale integration (LSI) that performs processing according to various applications executed by a mobile device including the communication system 11. For example, the application processor 22 may receive the image data transmitted from the image sensor 21 with the extension mode-compatible CSI-2 reception circuit 32, and perform processing according to an application on the image data with the LSI.

The bus 23 is a communication path for transmitting a signal in conformity with the CSI-2 standard, and for example, a transmission distance over which a signal can be transmitted is about 30 cm. Furthermore, as illustrated, the bus 23 connects the image sensor 21 to the application processor 22 via a plurality of signal lines (I2C, CLKP/N, D0P/N, D1P/N, D2P/N, and D3P/N).

The extension mode-compatible CSI-2 transmission circuit 31 and the extension mode-compatible CSI-2 reception circuit 32 are compatible with communication in the extension mode obtained by extending the CSI-2 standard, and can thus transmit and receive signals to and from each other. Note that detailed configurations of the extension mode-compatible CSI-2 transmission circuit 31 and the extension mode-compatible CSI-2 reception circuit 32 will be described later with reference to FIGS. 9 and 10.

Figure 2:
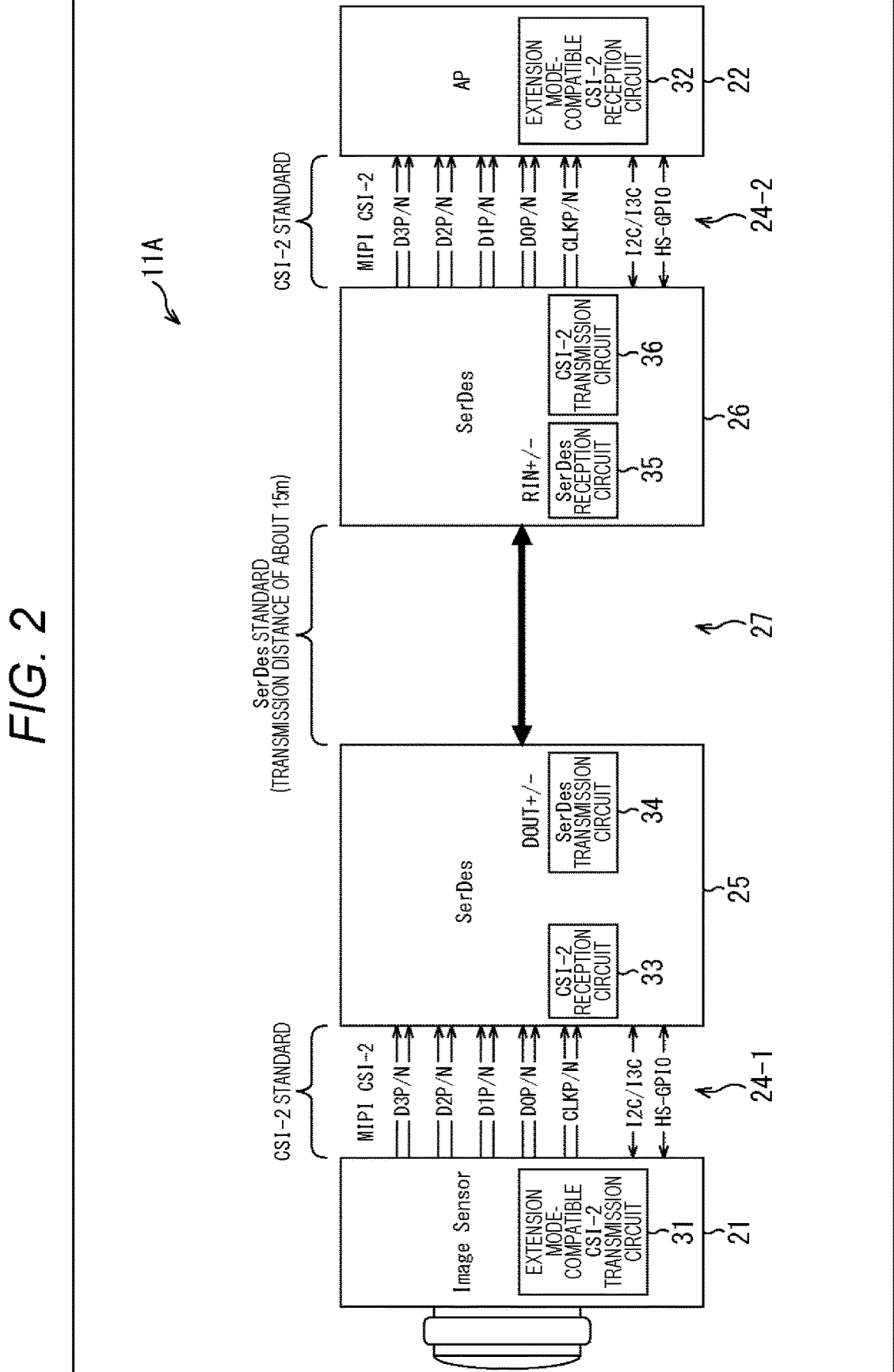
FIG. 2 is a block diagram illustrating a configuration example of a second embodiment of a communication system to which the present technology is applied.

FIG. 2 is a block diagram illustrating a configuration example of a second embodiment of a communication system to which the present technology is applied.

As illustrated in FIG. 2, a communication system 11A has a configuration in which an image sensor 21 and a SerDes device 25 are connected via a bus 24-1, an application processor 22 and a SerDes device 26 are connected via a bus 24-2, and the SerDes device 25 and the SerDes device 26 are connected via a bus 27. For example, the communication system 11A is used for connection in an existing in-vehicle camera.

Here, the image sensor 21 and the application processor 22 are configured similarly to the image sensor 21 and the application processor 22 in FIG. 1, and a detailed description thereof will be omitted.

The buses 24-1 and 24-2 are communication paths for transmitting signals in conformity with the CSI-2 standard, similarly to the bus 23 in FIG. 1, and include a plurality of signal lines (HS-GPIO, I2C/I3C, CLKP/N, D0P/N, D1P/N, D2P/N, and D3P/N) as illustrated.

The SerDes device 25 includes a CSI-2 reception circuit 33 and a serializer deserializer (SerDes) transmission circuit 34. For example, in the SerDes device 25, the CSI-2 reception circuit 33 performs communication conforming to the normal CSI-2 standard with the extension mode-compatible CSI-2 transmission circuit 31, and thus acquires a bit-parallel signal transmitted from the image sensor 21. Then, the SerDes device 25 converts the acquired signal into a bit-serial signal, and the SerDes transmission circuit 34 performs communication with the SerDes reception circuit 35 in one lane, and thus transmits the signal to the SerDes device 26.

The SerDes device 26 includes a SerDes reception circuit 35 and a CSI-2 transmission circuit 36. For example, in the SerDes device 26, the SerDes reception circuit 35 performs communication with the SerDes transmission circuit 34 in one lane, and thus acquires a transmitted bit-serial signal. Then, the SerDes device 26 converts the acquired signal into a bit-parallel signal, and the CSI-2 transmission circuit 36 performs communication conforming to the normal CSI-2 standard with the extension mode-compatible CSI-2 reception circuit 32, and thus transmits the signal to the application processor 22.

The bus 27 is a communication path for transmitting a signal in conformity with a standard such as A-PHY or Flat Panel Display (FPD)-LINK III, and for example, a transmission distance over which a signal can be transmitted is a long distance of about 15 m.

These long-range transmittable physical layer interfaces allow the automotive industry to utilize advanced driver assistance systems (ADAS), automated driving systems (ADS), and other surround sensor applications including cameras and in-vehicle infotainment (IVI) displays. The MIPI A-PHY has an asymmetric data link layer (asymmetric upper layer) in a point-to-point topology, allowing the same physical wiring to be shared in high speed data transmission, control data, and power, and allowing it to function as the basis for an end-to-end system designed to simplify integration of cameras, sensors, and displays, while also incorporating functional safety and security.

The communication systems 11 and 11A configured as described above can transmit and receive data with packets having an extended packet structure as will be described later by using the extension mode-compatible CSI-2 transmission circuit 31 and the extension mode-compatible CSI-2 reception circuit 32. Consequently, it is possible to support more various applications, for example, RAW24, SmartROI (Region of Interest), and Graceful Link Degradation (GLD) as will be described later.

First Structure Example of Packet Structure

A first structure example of a packet structure used for communication between the extension mode-compatible CSI-2 transmission circuit 31 and the extension mode-compatible CSI-2 reception circuit 32 will be described with reference to FIGS. 3 to 8.

Figure 3:
FIG. 3 is a diagram illustrating a first structure example of an overall packet structure of a D-PHY extended packet.

FIG. 3 illustrates an overall packet structure of a packet (hereinafter, referred to as a D-PHY extended packet) used in an extension mode of CSI-2 in a case where a physical layer is the D-PHY.

As illustrated in FIG. 3, the D-PHY extended packet has a packet structure in which a packet header and a packet footer are the same as those of the existing CSI-2 standard. For example, VC (VirtualChannel) indicating the number of lines of a virtual channel, a data type (DataType) indicating the type of data, WC (Word Count) indicating a data length of a payload, and VCX/ECC are stored in the packet header. In addition, a cyclic redundancy check (CRC) is stored in the packet footer.

Here, in the existing CSI-2 standard, as a data type transmitted in the packet header, 0x38 to 0x3F are defined as "reserved". Therefore, in the D-PHY extended packet, new setting information for identifying an extension mode on the reception side is defined by using a data type that is already reserved.

For example, as a data type, in a case of DataType [5:3]=3'b111, an extension mode, DataType [2]=Reserve (RES: reservation for future extension), and DataType [1:0]= extension mode type (prepare four extension modes) are defined.

That is, for example, DataType [5:3] is defined as the extension mode setting information and DataType [1:0] is defined as extension type setting information among 0x38 to 0x3F of the data type defined as "reserved" in the existing CSI-2 standard. The extension mode setting information indicates whether or not a mode is an extension mode, and for example, in a case where DataType [5:3] is 3'b111, this indicates that a mode is an extension mode. In addition, when four types including an extension mode 0, an extension mode 1, an extension mode 2, and an extension mode 3 are prepared as the type of the extension mode, the extension type setting information indicates a corresponding type among the four types. For example, in a case where DataType [1:0] is 2'b00, this indicates that the type of the extension mode is the extension mode 0.

Then, in the extension mode 0 (DataType [1:0]=2'b00), for example, a packet structure in which the payload is separated into four is defined. That is, as illustrated in FIG. 3, the payload in the extension mode 0 is separated into an extended packet header (ePH), an optional extended packet header (OePH), a legacy payload, and an optional extended packet footer (OePF). Note that the extended packet header may be repeatedly transmitted.

The extended packet header is disposed in the head corresponding to the payload in the existing CSI-2 standard, and needs to be always transmitted in the extension mode. For example, as illustrated, the extended packet header includes setting information such as an identification flag of SROI, an extended VC (VirtualChannel), an extended Data-Type, an optional flag of an OePH, and an optional flag of an OePF. Here, a 4-bit VC in the existing CSI-2 standard is extended to 8 bits by the extended VC, and a 4-bit DataType in the existing CSI-2 standard is extended to 8 bits by the extended DataType.

For example, in the D-PHY packet, 4 bits of VC of the existing packet header already exist, and a total number of bits can be set to eight by defining the extended VC of the extended packet header as four bits. Specifically, OePH [7:0]={5'h00, RSID, XY_POS, MC} and OePF [3:0]={3'h0, pCRC} can be defined, and ON/OFF of packet transmission required for each application can be controlled.

The optional extended packet header and the optional extended packet footer are selectively transmitted according to an application.

The legacy payload corresponds to the same payload as that in the existing CSI-2 standard.

As described above, data corresponding to various applications can be transmitted by setting the extended packet header, the optional extended packet header, and the optional extended packet footer as necessary. In addition, data transmitted in the extended packet header, the optional extended packet header, and the optional extended packet footer is 26 bits+6 bits of error correction code (ECC). As a result, it is possible to suppress increase in circuit scale by utilizing the circuit of the existing packet header and to improve error resistance.

Figure 4:
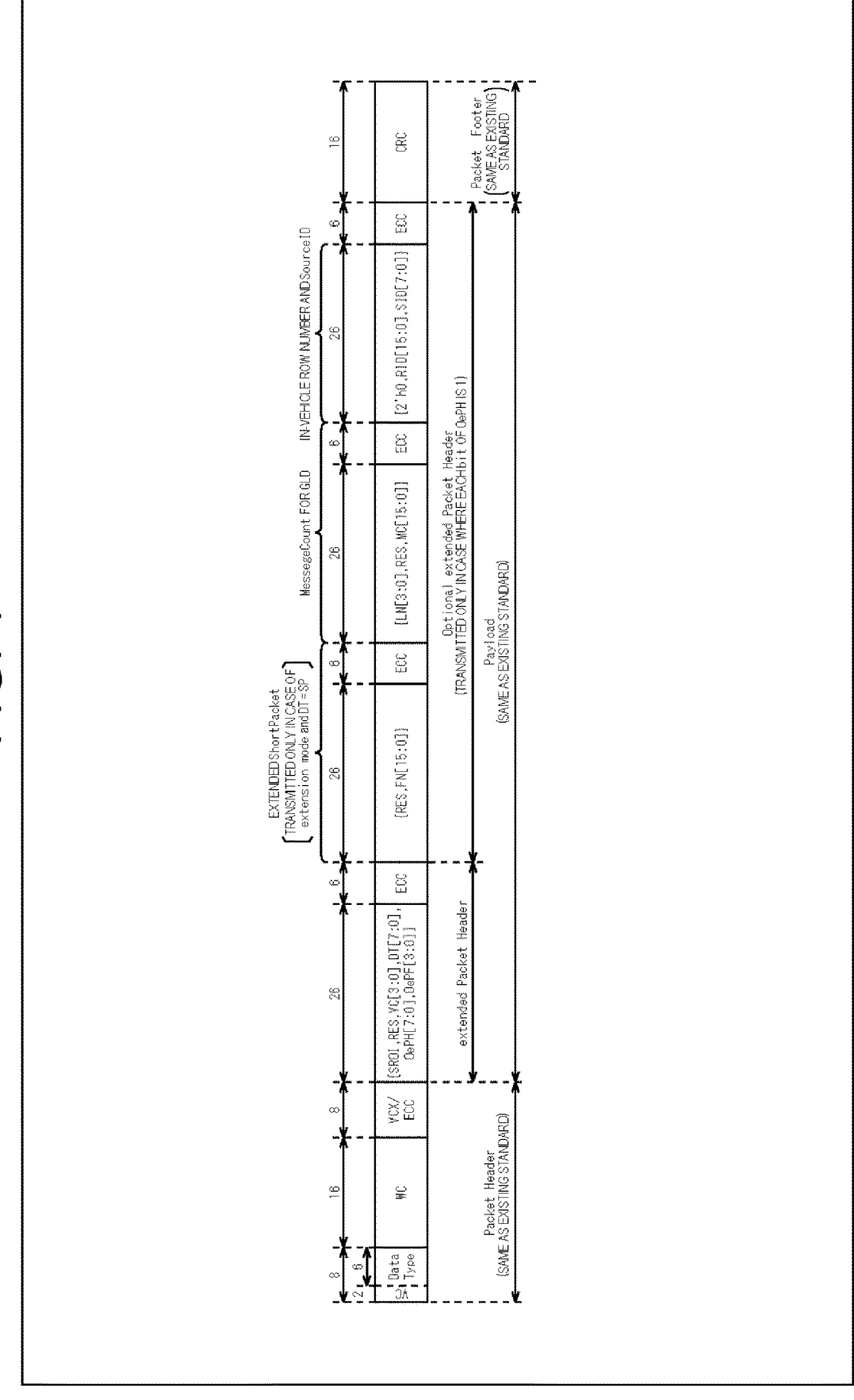
FIG. 4 is a diagram illustrating a first structure example of a packet structure of a D-PHY extended short packet.
Figure 5:
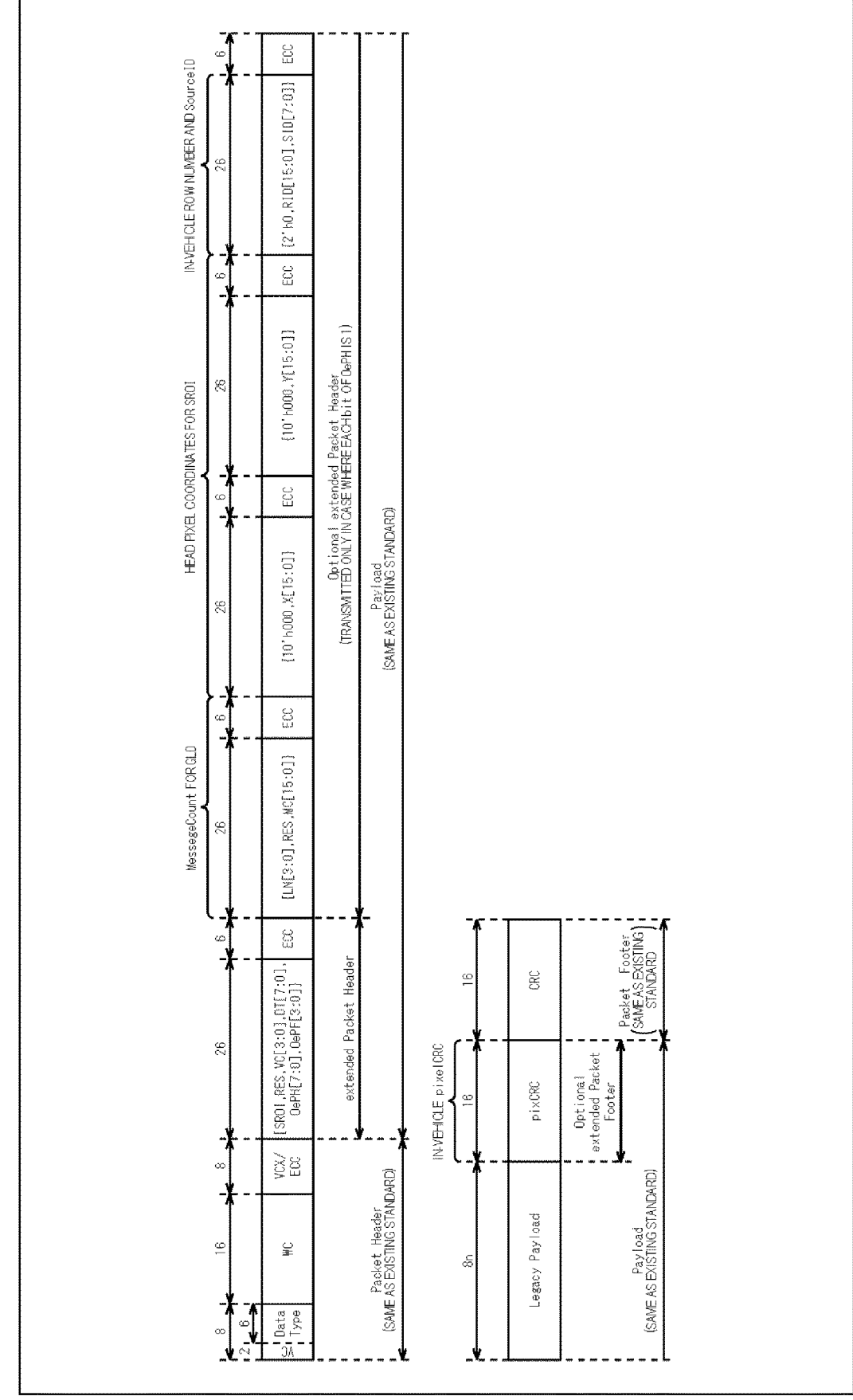
FIG. 5 is a diagram illustrating a first structure example of a packet structure of a D-PHY extended long packet.

As a specific application example of such a D-PHY extended packet, FIG. 4 illustrates a packet structure of a short packet (hereinafter, referred to as a D-PHY extended short packet) used in an extension mode of the CSI-2 in a case where a physical layer is the D-PHY. Similarly, FIG. 5 illustrates a packet structure of a long packet (hereinafter, referred to as a D-PHY extended long packet) used in an extension mode of the CSI-2 in a case where a physical layer is the D-PHY.

In the D-PHY extended short packet as illustrated in FIG. 4, the extension type setting information of the data type stored in the packet header indicates that the type of extension mode is the extension mode 0 (DT [5:0]=0x1C (5'b111_0_0)). In addition, the short packet setting information of the data type stored in the extended packet header indicates that the packet is a short packet (DT [7:0]=0x00 (Frame Start Code (Short Packet))).

As described above, in the extension mode, in a case where the data type stored in the extended packet header is DT [7:0]=0x00 to 0x0F, an extended short packet is set, and data in which a short packet data field of the extended short packet is included in the optional extended packet header is always transmitted. The short packet data field is the same as that defined in the existing CSI-2 standard.

Note that, when the extended short packet is transmitted, an MC (MessageCount for GLD) and an RSID (in-vehicle row number and a SourceID) of the optional extended packet header may be transmitted, but the legacy payload and the pCRC are unnecessary and are thus prohibited from being transmitted. In a case where the legacy payload and the pCRC are erroneously transmitted, the legacy payload and the pCRC are ignored on a receiving side.

Then, the extended short packet having the packet structure as illustrated in FIG. 4 allows a data type and a bit width of the virtual channel to be extended compared with the extended short packet according to the existing CSI-2 standard, and can thus support various applications defined by the optional extended packet header. Further, in a case where these functions are not necessary, an extended short packet conforming to the existing CSI-2 standard may be transmitted together with an extended long packet.

In the D-PHY extended long packet as illustrated in FIG. 5, the extension type setting information of the data type stored in the packet header indicates that the type of extension mode is the extension mode 0 (DT [5:0]=0x1C (5'b111_0_0)). In addition, the short packet setting information of the data type stored in the extended packet header indicates that the packet is other than a short packet (DT [7:0] and is other than 0x00 to 0x0F (=extended Long- Packt)). Therefore, in the extended long packet, data including the short packet data field is not transmitted.

In addition, according to the setting of the extended packet header, the optional extended packet header, the legacy payload, and the optional extended packet footer are stored in a payload according to the existing CSI-2 standard and transmitted. As described above, since the data is stored in the existing payload and transmitted, the existing SerDes transmission circuit 34 and SerDes reception circuit 35 (FIG. 2) recognize the data similarly to image data transmitted in the existing payload, and transmit the data to the subsequent stage without any change.

Then, the application processor 22 in the last stage can determine the extension mode according to the data type DT [5:0] of the packet header. Therefore, the application processor 22 can sequentially analyze the contents of the payload from the extended packet header and extract data in a desired extension mode.

Figure 6:
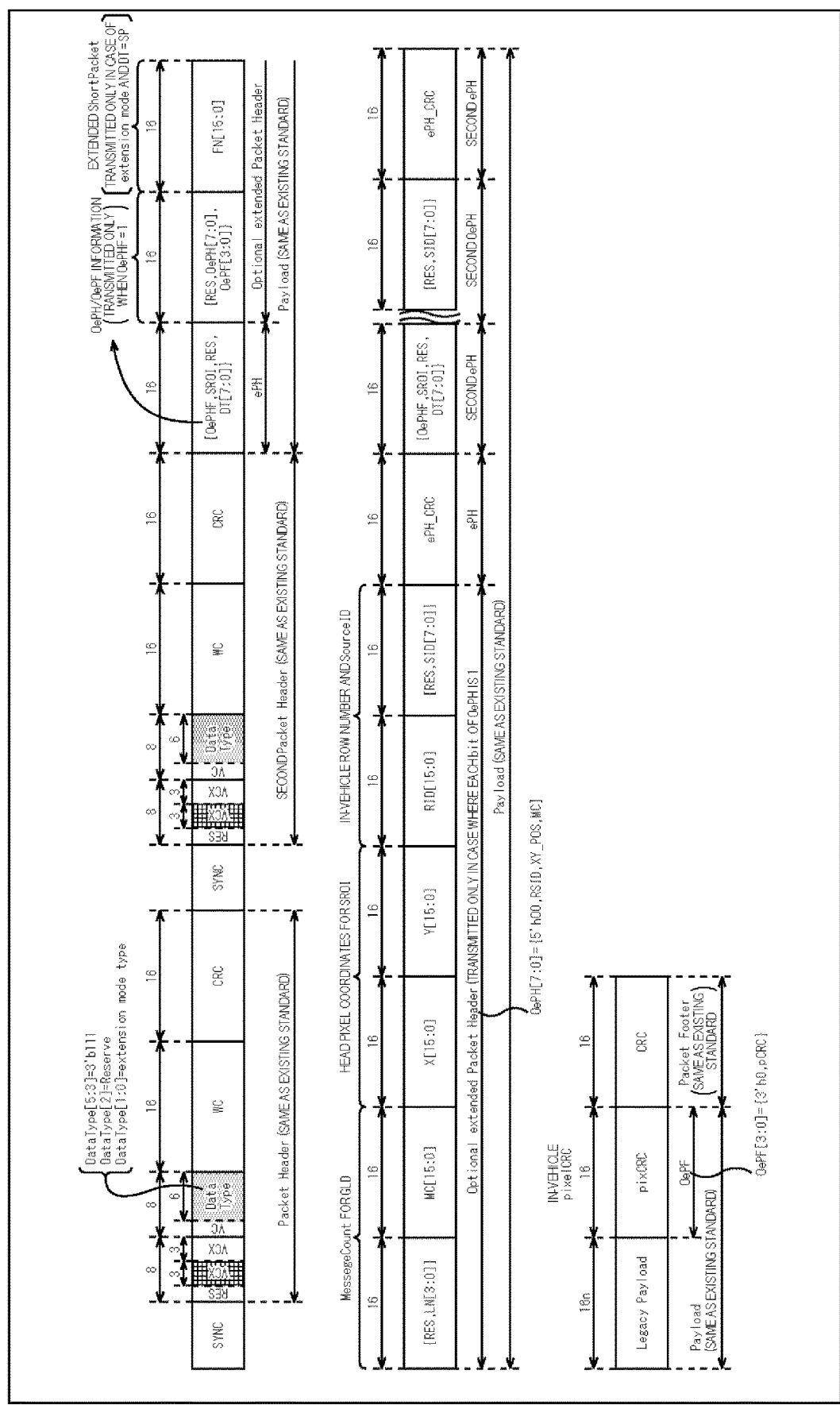
FIG. 6 is a diagram illustrating a first structure example of an overall packet structure of a C-PHY extended packet.

FIG. 6 illustrates an overall packet structure of a packet (hereinafter, referred to as a C-PHY extended packet) used in an extension mode of CSI-2 in a case where the physical layer is the C-PHY. Note that, in the C-PHY extended packet illustrated in FIG. 6, a description of a configuration common to the D-PHY extended packet in FIG. 3 will be omitted, and a different configuration will be described.

For example, in the C-PHY extended packet, similarly to the D-PHY extended packet in FIG. 3, an extension mode is identified by using a data type, and all data corresponding to each application executed by the application processor 22 is embedded in the payload and transmitted.

As illustrated in FIG. 6, similarly to the C-PHY packet according to the existing CSI-2 standard, in the C-PHY extended packet, a packet header is transmitted twice, and data is arranged in units of 16 bits for convenience of conversion of 16 bits into 7 symbols by the C-PHY. In addition, the extended packet header is disposed in the head of the payload, but regarding a virtual channel, in the case of the C-PHY, the head of the existing packet header is reserved for this purpose, and thus the virtual channel is not stored in the extended packet header. Of course, the virtual channel may be stored in the extended packet header similarly to the D-PHY extended packet.

In addition, since the optional extended packet header and the optional extended packet footer have a large bit depth, a flag such as an OePHF is prepared, and in a case where the flag is 1, OePH/OePF information is transmitted next. Then, after the ePH information and the OePH information, a CRC is transmitted as an extended packet header, and a packet header similarly configured is repeatedly transmitted twice. As described above, it is possible to achieve both circuit reusability and error resistance by making the structure similar to the mechanism in which the existing packet header is transmitted twice.

Figure 7:
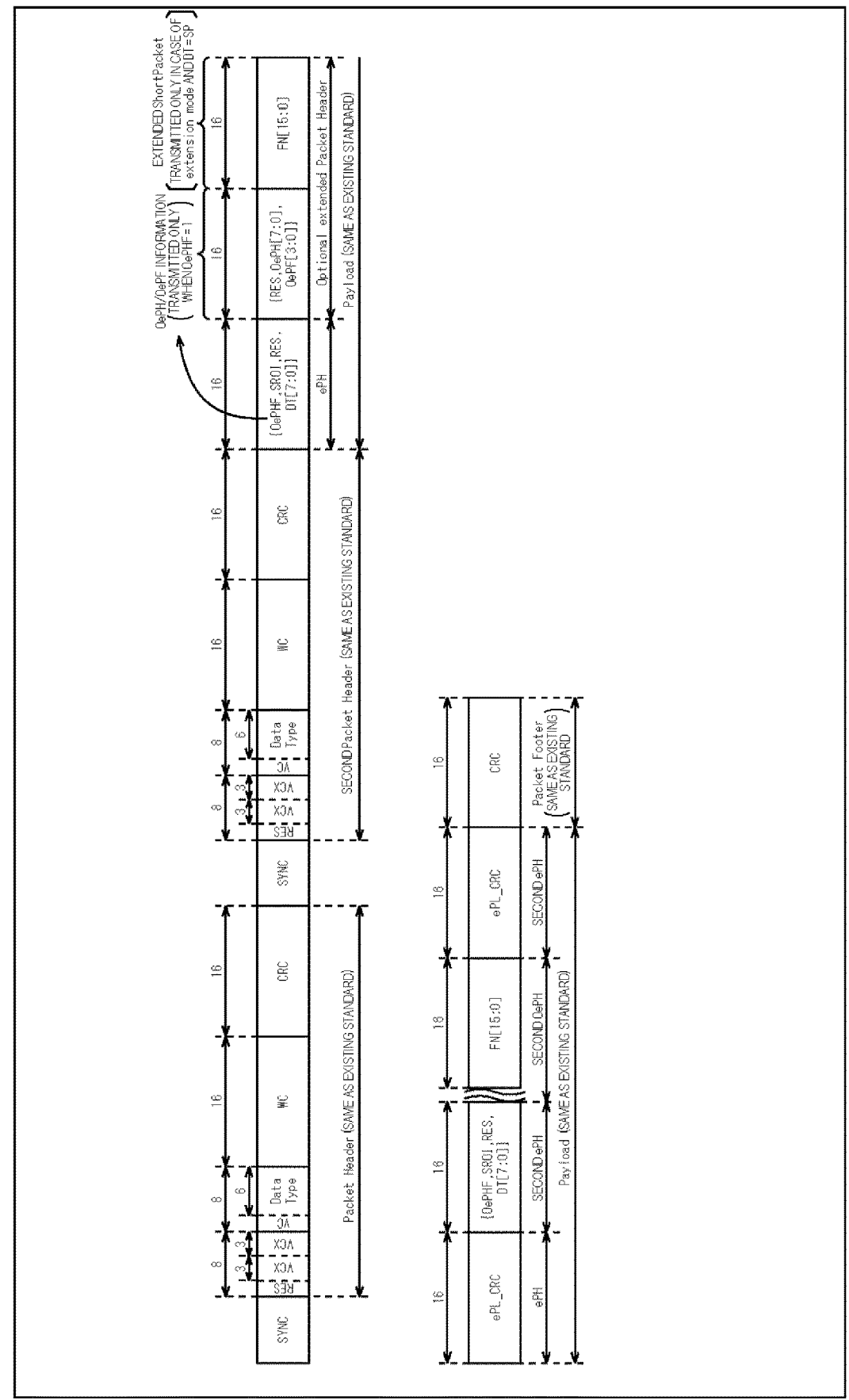
FIG. 7 is a diagram illustrating a first structure example of a packet structure of a C-PHY extended short packet.

As a specific application example of such a C-PHY extended packet, FIG. 7 illustrates a packet structure of a short packet (hereinafter, referred to as a C-PHY extended short packet) used in an extension mode of CSI-2 in a case where a physical layer is the C-PHY. Similarly, FIG. 8 illustrates a packet structure of a long packet (hereinafter, referred to as a C-PHY extended long packet) used in an extension mode of CSI-2 in a case where a physical layer is the C-PHY.

Figure 8:
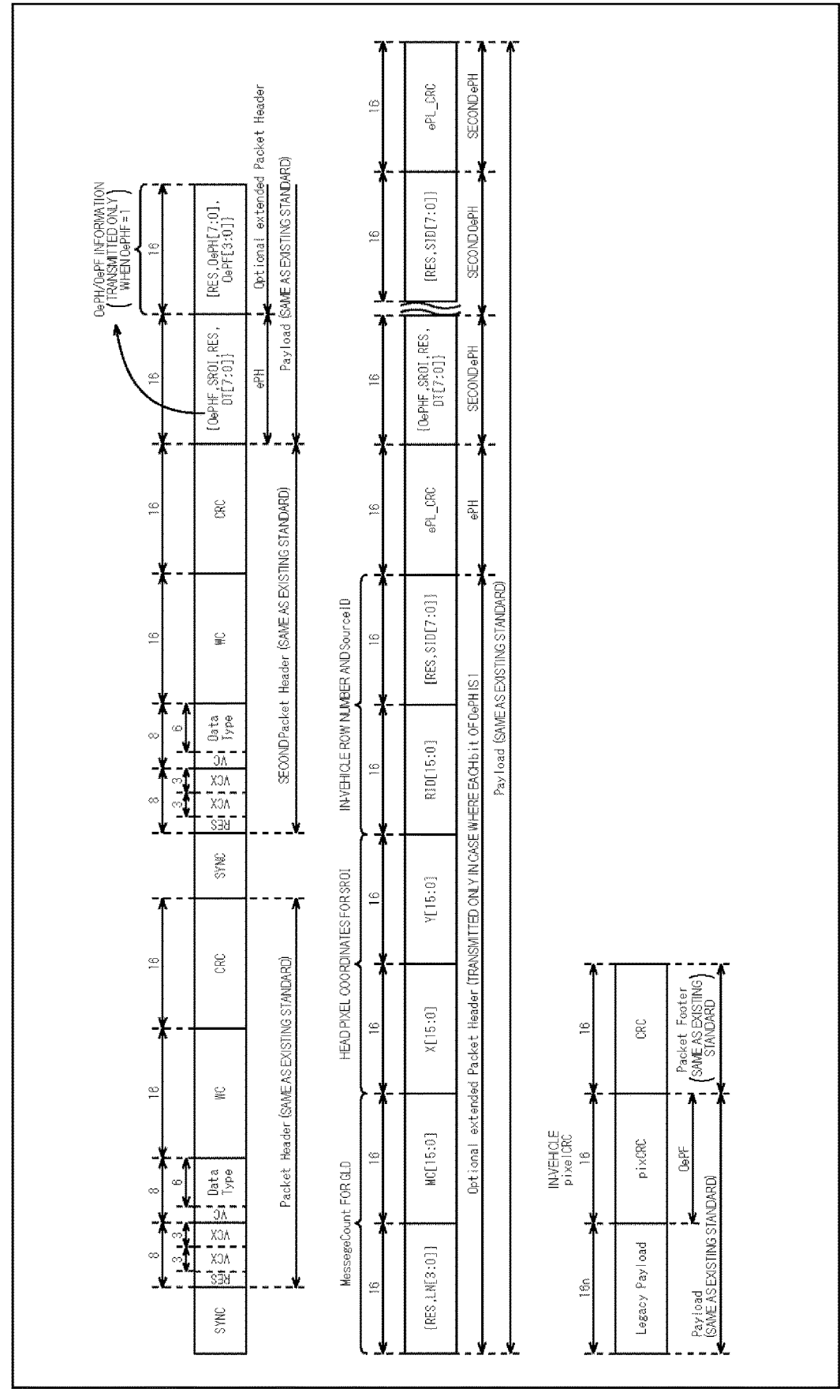
FIG. 8 is a diagram illustrating a first structure example of a packet structure of a C-PHY extended long packet.

Note that the C-PHY extended short packet illustrated in FIG. 7 does not have a great difference in packet structure from the D-PHY extended short packet illustrated in FIG. 4, and the C-PHY extended long packet illustrated in FIG. 8 does not have a great difference in packet structure from the D-PHY extended long packet illustrated in FIG. 5.

Configuration Examples of Image Sensor and Application Processor

Configuration Example of Image Sensor

Figure 9:
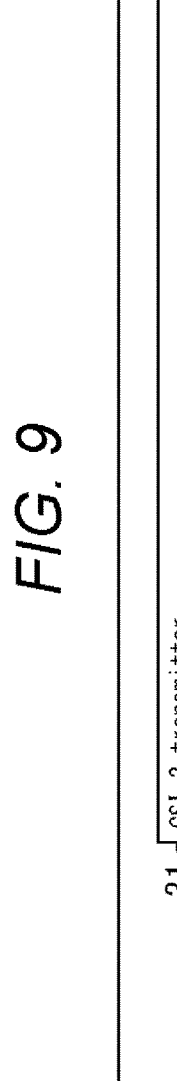
FIG. 9 is a block diagram illustrating a configuration example of an image sensor.

FIG. 9 is a block diagram illustrating a configuration example of the image sensor 21 including the extension mode-compatible CSI-2 transmission circuit 31.

As illustrated in FIG. 9, the image sensor 21 includes a pixel 41, an AD converter 42, an image processing unit 43, a pixel CRC calculation unit 44, a physical layer processing unit an I2C/I3C slave 46, and a register 47 in addition to the extension mode-compatible CSI-2 transmission circuit 31. In addition, the extension mode-compatible CSI-2 transmission circuit 31 includes a packing unit 51, a packet header generation unit 52, an extended packet header generation unit 53, an extended packet footer generation unit 54, selection units 55 and 56, a CRC calculation unit 57, a lane distribution unit 58, a CCI slave 59, and a controller 60.

The pixel 41 outputs an analog pixel signal corresponding to an amount of received light, and the analog-to-digital converter (ADC) 42 converts the pixel signal output from the pixel 41 into a digital pixel signal and supplies the pixel signal to the image processing unit 43. The image processing unit (image signal processor (ISP)) 43 supplies image data obtained by performing various types of image processing on an image based on the pixel signal to the pixel CRC calculation unit 44 and the packing unit 51. In addition, the image processing unit 43 supplies a data enable signal data en indicating whether or not the image data is valid to the packing unit 51 and the controller 60.

The pixel CRC calculation unit 44 calculates and obtains CRC for each pixel in the image data supplied from the image processing unit 43, and supplies the CRC to the extended packet footer generation unit 54.

The physical layer processing unit 45 can execute physical layer processing of both the C-PHY and the D-PHY. For example, the physical layer processing unit 45 executes the physical layer processing of the C-PHY in a case where a C-layer enable signal cphy_en supplied from the controller 60 is valid, and executes the physical layer processing of the D-PHY in a case where the C-layer enable signal cphy_en is invalid. Then, the physical layer processing unit 45 transmits a packet divided into four lanes by the lane distribution unit 58 to the application processor 22.

The I2C/I3C slave 46 performs communication under the initiative of the I2C/I3C master 72 (FIG. 10) of the application processor 22 on the basis of the Inter-Integrated Circuit (I2C) or Improved Inter Integrated Circuits (I3C) standard.

Various settings transmitted from the application processor 22 are written into the register 47 via the I2C/I3C slave 46 and the CCI slave 59. Here, examples of the settings written in the register 47 include a communication setting according to the CSI-2 standard, an extension mode setting indicating whether or not an extension mode is used, and a fixed communication setting necessary for communication in the extension mode.

The packing unit 51 performs a packing process of storing the image data supplied from the image processing unit 43 in a payload of the packet, and supplies the payload to the selection unit 55 and the lane distribution unit 58.

When an instruction for generating a packet header is given according to a packet header generation instruction signal ph_go supplied from the controller 60, the packet header generation unit 52 generates a packet header and supplies the packet header to the selection unit 55 and the lane distribution unit 58.

That is, the packet header generation unit 52 generates a packet header that stores setting information indicating a condition set for data transmitted in a packet, for example, a data type indicating the type of data, according to the existing CSI-2 standard. In addition, the packet header generation unit 52 stores extension mode setting information indicating whether or not an extension mode is an extension mode using an extended header in an unused area defined as "unused" in the existing CSI-2 standard in a data type that is setting information indicating the type of data transmitted in a packet. Moreover, the packet header generation unit 52 stores extension type setting information indicating which one of a plurality of types of extension modes prepared as an extension mode is, in the unused area.

The extended packet header generation unit 53 generates an extended packet header and an optional extended packet header in response to an extended packet header generation instruction signal eph_go and an extended packet header enable signal ePH en supplied from the controller 60, and supplies the extended packet header and the optional extended packet header to the selection unit 56 and the lane distribution unit 58. Further, an in-vehicle row number, a source identification (ID), and the like are supplied to the extended packet header generation unit 53 according to an application of the image sensor 21, and are stored in the extended packet header or the optional extended packet header as necessary.

In other words, the extended packet header generation unit 53 generates the extended packet header that stores setting information as illustrated in FIG. 3, for example, separately from the packet header generated by the packet header generation unit 52. Further, in a case where the optional extended packet header is transmitted, the extended packet header generation unit 53 stores optional extended packet header setting information indicating that the optional extended packet header is transmitted in the extended packet header as the optional extended packet header setting information (OePH [7:0]) indicating whether or not the optional extended packet header is transmitted, and generates the optional extended packet header following the extended packet header.

The extended packet footer generation unit 54 generates an optional extended packet footer in response to an extended packet footer generation instruction signal epf_go and an extended packet header enable signal ePF en supplied from the controller 60, and supplies the optional extended packet footer to the selection unit 56 and the lane distribution unit 58.

That is, in a case where a packet transmitted in the extension mode is an extended long packet that stores data transmitted as a payload in the existing CSI-2 standard, the extended packet footer generation unit 54 generates an optional extended packet footer disposed following a legacy payload in which data is stored.

Furthermore, the C-layer enable signal cphy_en is supplied from the controller 60 to the packet header generation unit 52, the extended packet header generation unit 53, and the extended packet footer generation unit 54. Then, in a case where the C-layer enable signal cphy_en indicates "valid", the packet header generation unit 52 generates a C-PHY packet header, the extended packet header generation unit 53 generates a C-PHY extended packet header and a C-PHY optional extended packet header, and the extended packet footer generation unit 54 generates a C-PHY optional extended packet footer. On the other hand, in a case where the C-layer enable signal cphy_en indicates "invalid", the packet header generation unit 52 generates a D-PHY packet header, the extended packet header generation unit 53 generates an extended packet header and a D-PHY optional extended packet header, and the extended packet footer generation unit 54 generates a D-PHY optional extended packet footer.

In a case where the C-layer enable signal cphy_en is valid according to the C-layer enable signal cphy_en supplied from the controller 60, the selection unit 55 selects the packet header supplied from the packet header generation unit 52 and supplies the packet header to the selection unit 56. On the other hand, in a case where the C-layer enable signal cphy_en is invalid, the selection unit 55 selects the payload supplied from the packing unit 51 and supplies the payload to the selection unit 56.

The selection unit 56 selects any one of the packet header or the payload selectively supplied via the selection unit 55, the extended packet header and the optional extended packet header supplied from the extended packet header generation unit 53, and the optional extended packet footer supplied from the extended packet footer generation unit 54 in response to the data selection signal data_sel supplied from the controller 60, and supplies the selected one to the CRC calculation unit 57.

The CRC calculation unit 57 calculates and obtains CRC of the packet header, the payload, the extended packet header, the optional extended packet header, or the optional extended packet footer selectively supplied via the selection unit 56, and supplies the CRC to the lane distribution unit 58.

Under the control of the controller 60, the lane distribution unit 58 distributes the payload supplied from the packing unit 51, the packet header supplied from the packet header generation unit 52, the extended packet header and the optional extended packet header supplied from the extended packet header generation unit 53, the optional extended packet footer supplied from the extended packet footer generation unit 54, and the CRC supplied from the CRC calculation unit 57 to four lanes according to the CSI-2 standard, to be supplied to the physical layer processing unit 45.

The Camera Control Interface (CCI) slave 59 performs communication under the initiative of the CCI master 88 (FIG. 10) of the application processor 22 on the basis of the CSI-2 standard.

The controller 60 reads various settings stored in the register 47, and controls each block configuring the extension mode-compatible CSI-2 transmission circuit 31 according to the settings. For example, the controller 60 controls switching between transmission of a packet having a packet structure according to the existing CSI-2 standard and transmission of a packet having a packet structure in the extension mode according to content of data to be transmitted.

The image sensor 21 is configured as described above, and can generate an extended packet having a packet structure as described with reference to FIGS. 3 to 8 and transmit the extended packet to the application processor 22.

Configuration Example of Application Processor

Figure 10:
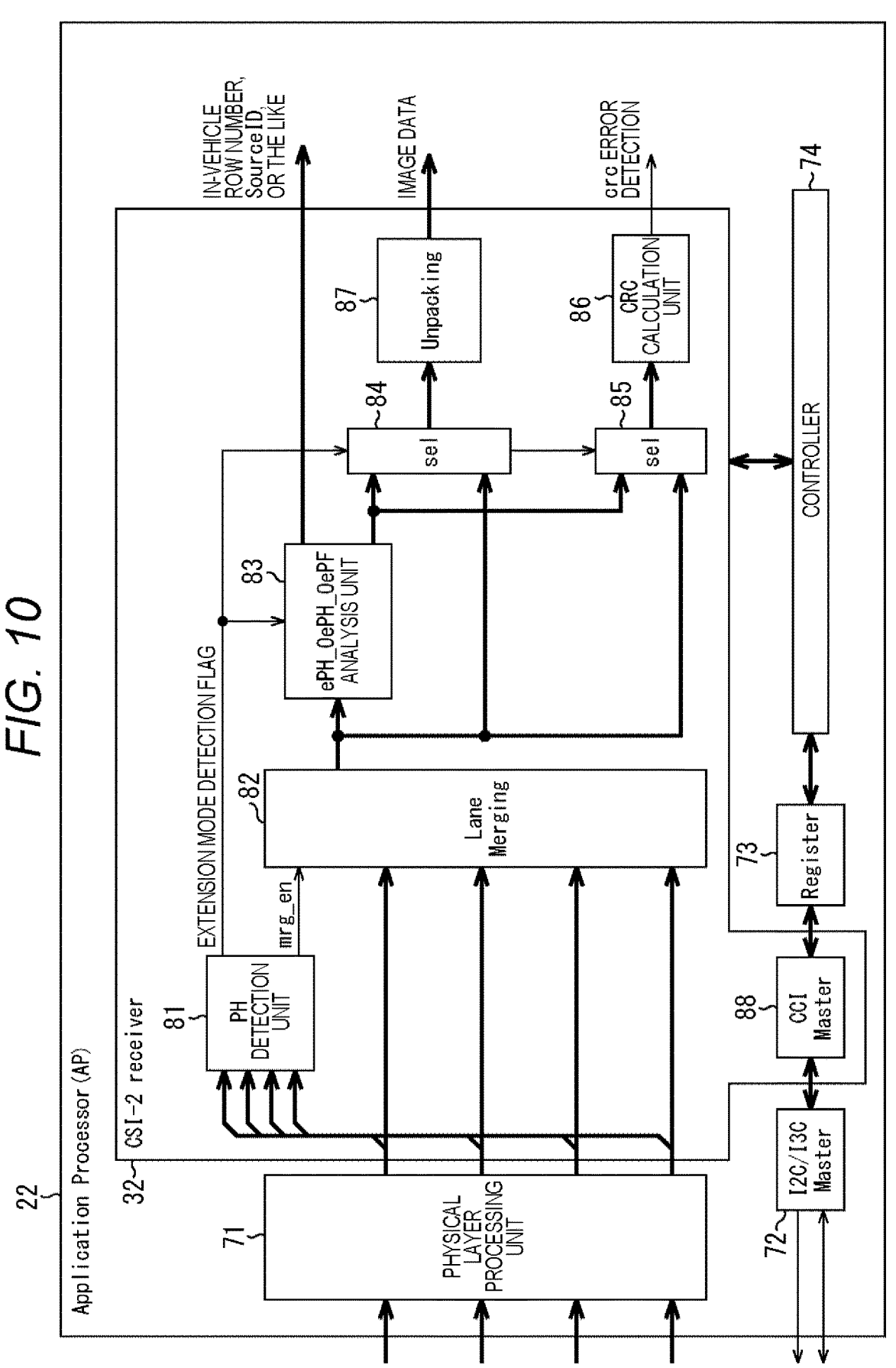
FIG. 10 is a block diagram illustrating a configuration example of an application processor.

FIG. 10 is a block diagram illustrating a configuration example of the application processor 22 including the extension mode-compatible CSI-2 reception circuit 32.

As illustrated in FIG. 10, the application processor 22 includes a physical layer processing unit 71, an I2C/I3C master 72, a register 73, and a controller 74 in addition to the extension mode-compatible CSI-2 reception circuit 32. In addition, the extension mode-compatible CSI-2 reception circuit 32 includes a packet header detection unit 81, a lane merging unit 82, an analysis unit 83, selection units 84 and 85, a CRC calculation unit 86, an unpacking unit 87, and a CCI master 88.

The physical layer processing unit 71 can execute physical layer processing of both the C-PHY and the D-PHY. As described above, in the physical layer processing unit 45 of the image sensor 21, the physical layer processing of one of the C-PHY or the D-PHY is performed, and the physical layer processing unit 71 executes the same physical layer processing as that executed in the physical layer processing unit 45.

The I2C/I3C master 72 leads communication of the image sensor 21 with the I2C/I3C slave 46 (FIG. 9) on the basis of the I2C or I3C standard.

Various settings to be written into the register 47 of the image sensor 21 by the controller 74 are recorded in the register 73.

The controller 74 controls each block configuring the application processor 22.

The packet header detection unit 81 detects the packet header from the packet supplied from the physical layer processing unit 71 and checks the data type stored in the packet header. Then, in a case where the extension mode setting information indicates the extension mode in the data type of the packet header (DataType [5:3]=3'b111), the packet header detection unit 81 supplies the extension mode detection flag indicating the extension mode to the analysis unit 83, the selection unit 84, and the selection unit 85. In addition, the packet header detection unit 81 supplies a merging enable signal mrg_en indicating whether or not merging of the divided four lanes is enabled to the lane merging unit 82 on the basis of the packet header.

That is, according to the existing CSI-2 standard, the packet header detection unit 81 detects the packet header in which setting information (a data type or the like) indicating a condition set for data transmitted in a packet is stored. In this case, the packet header detection unit 81 outputs the extension mode detection flag according to the extension mode setting information indicating whether or not an extension mode is the extension mode using the extended header and stored in the unused area defined as "unused" in the existing CSI-2 standard in the data type that is the setting information indicating the type of data transmitted in the packet, and thus switches between reception of the packet having the packet structure according to the existing CSI-2 standard and reception of the packet having the packet structure in the extension mode. Further, the packet header detection unit 81 recognizes which one of the plurality of types of extension modes prepared as the extension mode is, according to the extension mode type information stored in the unused area of the data type defined as "unused" in the existing CSI-2 standard.

In a case where the merging enable signal mrg_en supplied from the packet header detection unit 81 is valid, the lane merging unit 82 merges the packets divided into four lanes and supplied from the physical layer processing unit 71. Then, the lane merging unit 82 supplies the packet of one lane to the analysis unit 83, the selection unit 84, and the selection unit 85.

In a case where the extension mode detection flag supplied from the packet header detection unit 81 indicates the extension mode, the analysis unit 83 reads the extended packet header, the optional extended packet header, and the optional extended packet footer from the packet supplied from the lane merging unit 82 on the basis of the packet structure in the extension mode. Then, the analysis unit 83 analyzes the setting information stored in the extended packet header, the optional extended packet header, and the optional extended packet footer.

That is, the analysis unit 83 receives, as the extended header, the extended packet header disposed in the head of the payload conforming to the existing CSI-2 standard, and analyzes the setting information stored in the extended packet header. Further, in a case where the optional extended packet header setting information stored in the extended packet header indicates transmission of an optional extended packet header selectively transmitted according to an application, the analysis unit 83 receives the optional extended packet header following the extended packet header, and analyzes the setting information stored in the optional extended packet header. Further, in a case where the packet transmitted in the extension mode is an extended long packet that stores data transmitted as a payload in the existing CSI-2 standard, the analysis unit 83 receives the optional extended packet footer disposed following the legacy payload in which data is stored, and analyzes the optional extended packet footer.

Then, for example, the analysis unit 83 reads an in-vehicle row number, a source ID, and the like stored in the optional extended packet header, and outputs the read information to a subsequent LSI (not illustrated).

Note that, in a case where the extension mode detection flag supplied from the packet header detection unit 81 does not indicate the extension mode, that is, in a case where a packet having an existing packet structure is supplied, the analysis unit 83 stops without performing the above-described processing.

In accordance with the extension mode detection flag supplied from the packet header detection unit 81, the selection unit 84 selectively supplies data to the unpacking unit 87 on the basis of the packet structure of the existing packet or the packet structure of the extended packet.

The selection unit 85 selectively supplies data to the CRC calculation unit 86 on the basis of the packet structure of the existing packet or the packet structure of the extended packet according to the extension mode detection flag supplied from the packet header detection unit 81.

The CRC calculation unit 86 calculates CRC of the packet header, the payload, the extended packet header, the optional extended packet header, or the optional extended packet footer selectively supplied via the selection unit 85. Then, in a case where a CRC error is detected, the CRC calculation unit 86 outputs a crcCRC error detection signal indicating that the CRC error has been detected to the subsequent LSI (not illustrated).

The unpacking unit 87 performs an unpacking process of extracting the image data stored in the payload selectively supplied via the selection unit 84, and outputs the acquired image data to the subsequent LSI (not illustrated).

The CCI master 88 leads communication of the image sensor 21 with the CCI slave 59 (FIG. 9) on the basis of the CSI-2 standard.

The application processor 22 is configured as described above, and can acquire the image data by receiving the extended packet transmitted from the image sensor 21 and analyzing the setting information stored in the extended packet header, the optional extended packet header, and the optional extended packet footer.

<Communication Processing>

Communication processing performed by the image sensor 21 and the application processor 22 will be described with reference to FIGS. 11 to 14.

Figure 11:
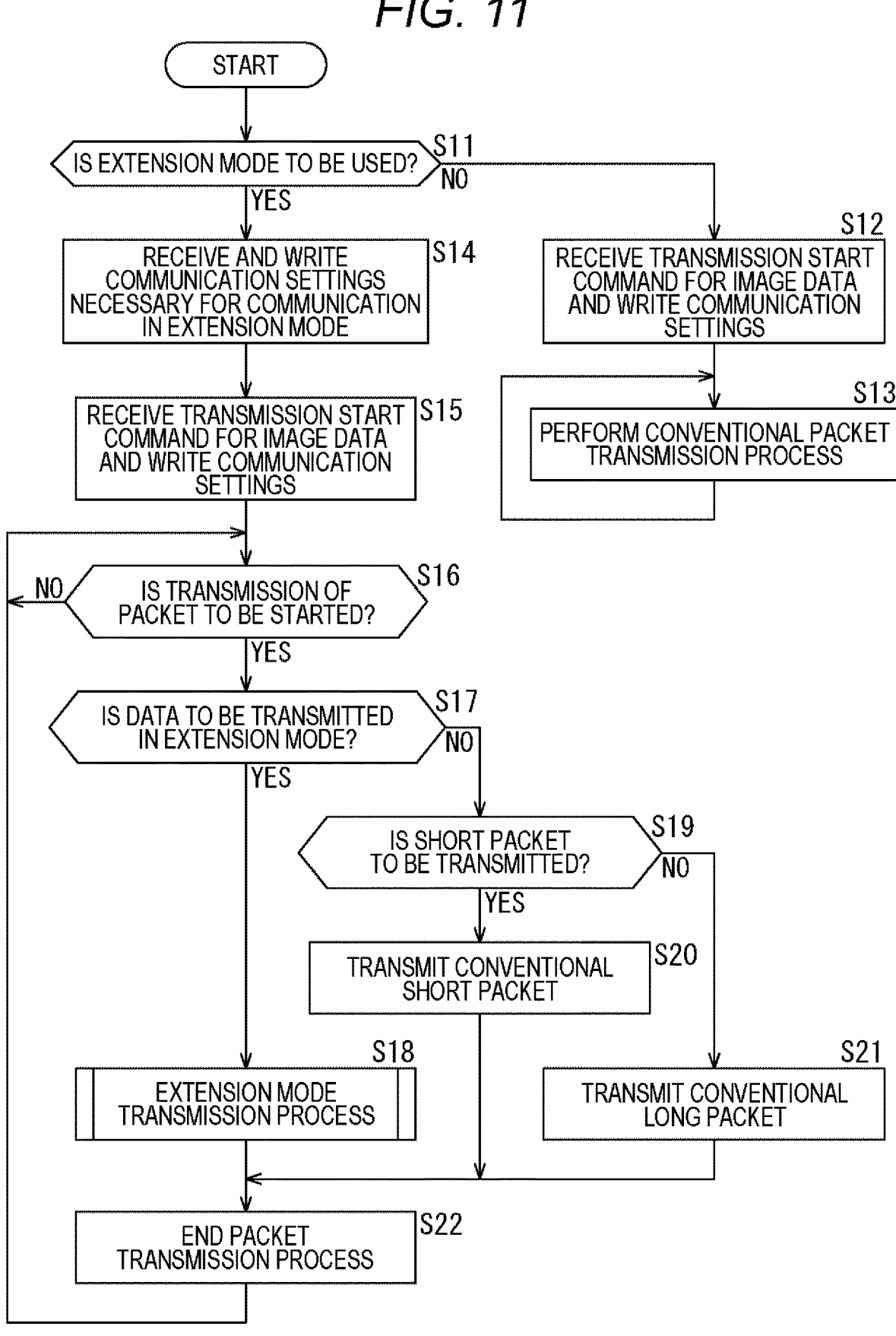
FIG. 11 is a flowchart illustrating a process in which the image sensor transmits a packet.

FIG. 11 is a flowchart for describing a process in which the image sensor 21 transmits a packet.

For example, when the image sensor 21 is connected to the application processor 22 via the bus 23, the process is started. In step S11, the controller 60 determines whether or not to use an extension mode when starting communication with the application processor 22. For example, the controller 60 checks the extension mode setting stored in the register 47 and determines to use the extension mode in a case where the extension mode setting indicating to use the extension mode has been written by the application processor 22.

In a case where the controller 60 determines not to use the extension mode in step S11, the process proceeds to step S12.

In step S12, the I2C/I3C slave 46 receives a command to start transmission of image data transmitted from the application processor 22 (in step S54 in FIG. 13 that will be described later). Further, the I2C/I3C slave 46 receives the communication setting according to the CSI-2 standard transmitted together with the transmission start command, and writes the communication setting into the register 47 via the CCI slave 59.

In step S13, the image sensor 21 executes a conventional packet transmission process of transmitting a packet having a packet structure conforming to the existing CSI-2 standard to the application processor 22 on the basis of the communication setting stored in the register 47.

On the other hand, in step S11, in a case where the controller 60 determines to use the extension mode, the process proceeds to step S14.

In step S14, the I2C/I3C slave 46 receives a fixed communication setting (for example, copying of PH/PF for each lane at the time of GLD) required for communication in the extension mode, and writes the fixed communication setting into the register 47 via the CCI slave 59.

In step S15, the I2C/I3C slave 46 receives a command to start transmission of the image data transmitted from the application processor 22 (in step S57 in FIG. 13 that will be described later). Further, the I2C/I3C slave 46 receives the communication setting according to the CSI-2 standard transmitted together with the transmission start command, and writes the communication setting into the register 47 via the CCI slave 59.

In step S16, the controller 60 determines whether or not to start packet transmission, and waits for the process until it is determined to start packet transmission.

Then, in a case where it is determined in step S16 that packet transmission is to be started, the process proceeds to step S17, and the controller 60 determines whether or not the data is to be transmitted in the extension mode. Here, according to the contents of transmission target data, for example, in a case where the data is transmitted in a use case of an application example as will be described later, the controller 60 determines that the data is to be transmitted in the extension mode.

Figure 12:
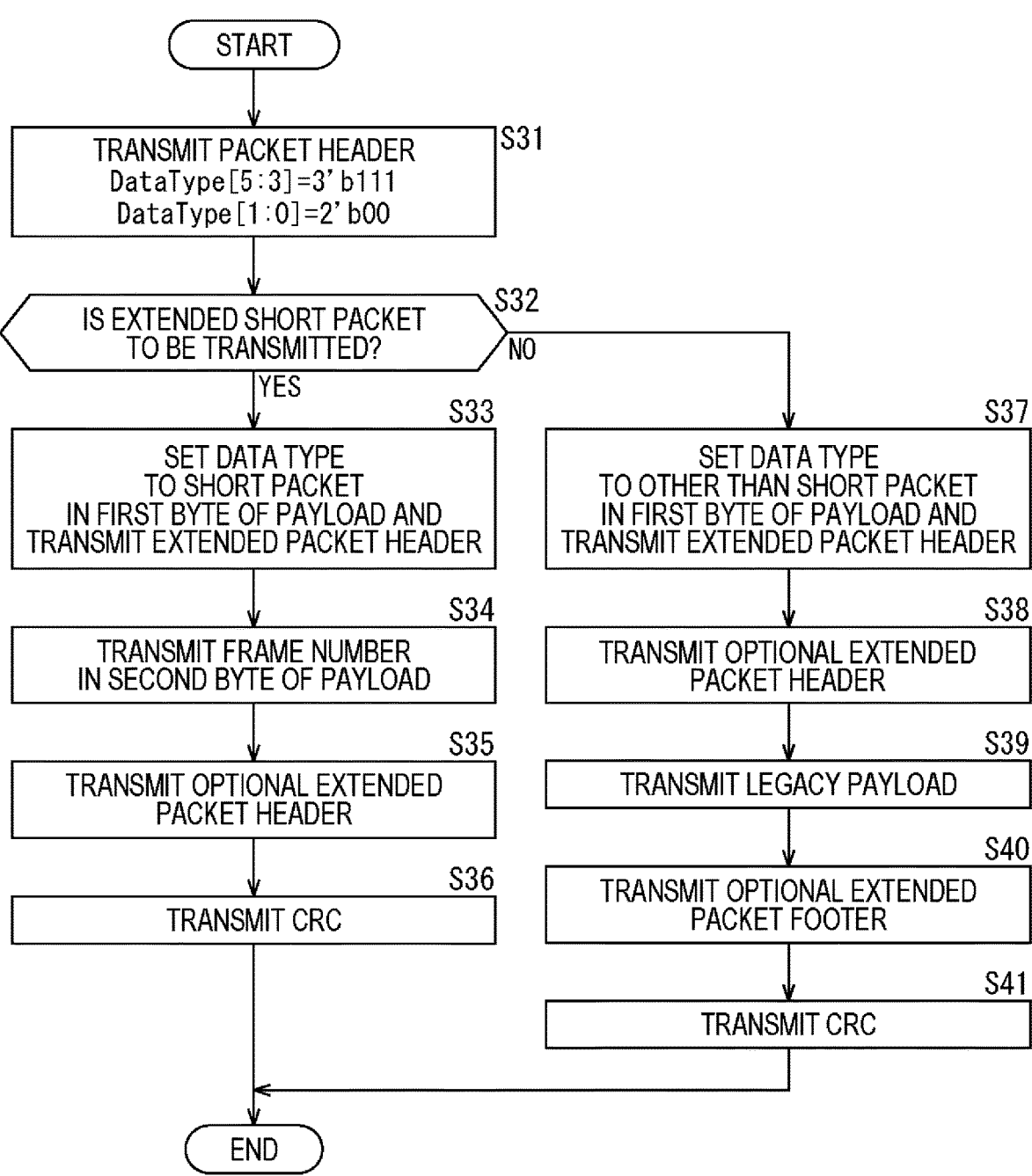
FIG. 12 is a flowchart for describing an extension mode transmission process.

In a case where the controller 60 determines in step S17 that the data is to be transmitted in the extension mode, the process proceeds to step S18, and an extension mode transmission process of transmitting an extended packet corresponding to the extension mode is performed (refer to FIG. 12).

On the other hand, in step S17, in a case where the controller 60 determines that the data is not to be transmitted in the extension mode, the process proceeds to step S19.

In step S19, the controller 60 determines whether or not to transmit a short packet. For example, the controller 60 determines to transmit a short packet at the start of a frame and at the end of the frame.

In step S19, in a case where the controller 60 determines to transmit a short packet, the process proceeds to step S20. In step S20, the packet header generation unit 52 generates a packet header and transmits a short packet having a conventional packet structure to the application processor 22.

On the other hand, in step S19, in a case where the controller 60 determines not to transmit a short packet (that is, a long packet is transmitted), the process proceeds to step S21. In step S21, the packing unit 51 stores the image data in the payload, and the CRC calculation unit 57 obtains CRC, and thus a long packet having a conventional packet structure is generated and transmitted to the application processor 22.

After the process in step S18, step S20, or step S21, the process proceeds to step S22, and the controller 60 ends the packet transmission process. Thereafter, the process returns to step S16, and then, a process of similarly transmitting a packet is repeatedly performed on the next packet.

FIG. 12 is a flowchart illustrating the extension mode transmission process performed in the process in step S18 in FIG. 11.

In step S31, the packet header generation unit 52 generates a packet header storing a VC, a data type, a WC, and the like, and transmits the packet header to the application processor 22. In this case, the packet header generation unit 52 writes the extension mode setting information (DataType [5:3]=3'b111) indicating the extension mode and the extension type setting information (DataType [1:0]=2'b00) identifying that a mode setting of the extension mode is the extension mode 0 into the data type of the packet header.

In step S32, the application processor 22 determines whether or not to transmit the extended short packet. For example, the controller 60 determines to transmit the extended short packet at the start of the frame and at the end of the frame.

In step S32, in a case where the application processor 22 determines to transmit an extended short packet, the process proceeds to step S33.

In step S33, the extended packet header generation unit 53 transmits an extended packet header in which the data type (DataType [7:0]) is set as a short packet in the first byte of the payload. In this case, the extended packet header generation unit 53 performs various settings (for example, OePH [7:0], OePF [3:0], or the like) to be stored in the extended packet header.

In step S34, the extended packet header generation unit 53 stores and transmits a frame number (FrameNumber: FN) in the second byte of the payload.

In step S35, the extended packet header generation unit 53 generates and transmits the optional extended packet header as illustrated in FIG. 4 according to the setting (OePH [7:0]) performed in step S33.

In step S36, the CRC calculation unit 57 obtains the CRC and transmits the CRC as a packet footer.

On the other hand, in step S32, in a case where the application processor 22 determines not to transmit the extended short packet (that is, a long packet is transmitted), the process proceeds to step S37.

In step S37, the extended packet header generation unit 53 transmits the extended packet header in which the data type (DataType [7:0]) is set to other than a short packet in the first byte of the payload. In this case, the extended packet header generation unit 53 performs various settings (for example, OePH [7:0], OePF [3:0], or the like) to be stored in the extended packet header.

In step S38, the extended packet header generation unit 53 generates and transmits the optional extended packet header as illustrated in FIG. 5 according to the setting (OePH [7:0]) performed in step S37.

In step S39, the packing unit 51 packs the image data supplied from the image processing unit 43, and generates and transmits a legacy payload.

In step S40, the extended packet footer generation unit 54 generates and transmits an optional extended packet footer as illustrated in FIG. 4 according to the setting (OePF [3:0]) performed in step S37.

In step S41, the CRC calculation unit 57 obtains the CRC and transmits the CRC as a packet footer.

Then, after the process in step S36 or S41, the extension mode transmission process is ended.

As described above, the image sensor 21 can generate and transmit the extended short packet or the extended long packet.

FIG. 13 is a flowchart for describing a process in which the application processor 22 receives a packet.

For example, when the image sensor 21 is connected to the application processor 22 via the bus 23, the process is started. In step S51, the controller 74 writes an initial setting (for example, which one of the C-PHY and the D-PHY is used as a physical layer) of image sensor 21 into register 73, and transmits the initial setting to the image sensor 21 by using the I2C/I3C master 72 via the CCI master 88. As a result, the initial setting is written into the register 47 of the image sensor 21.

In step S52, the controller 74 recognizes whether or not the image sensor 21 supports the extension mode. For example, the controller 74 can recognize whether or not the image sensor 21 supports the extension mode by acquiring a set value (for example, the extended PH/PF-support capability) stored in the register 47 of the image sensor 21 by the I2C/I3C master 72. Alternatively, the controller 74 can recognize whether or not the image sensor 21 supports the extension mode in advance on the basis of, for example, a manually input value.

In step S53, the controller 74 determines whether or not the image sensor 21 supports the extension mode and whether or not the use of the extension mode is required by an application executed by the application processor 22.

In step S53, in a case where the controller 74 determines that the image sensor 21 does not support the extension mode or the use of the extension mode is not required, the process proceeds to step S54.

In step S54, the controller 74 causes the I2C/I3C master 72 to transmit an image data transmission start command to the image sensor 21. In this case, the controller 74 also transmits a communication setting according to the CSI-2 standard.

In step S55, the application processor 22 performs a conventional packet reception process of receiving a packet having a packet structure conforming to the existing CSI-2 standard on the basis of the communication setting transmitted in step S54.

On the other hand, in step S53, in a case where the controller 74 determines that the image sensor 21 supports the extension mode and the use of the extension mode is required by the application executed by the application processor 22, the process proceeds to step S56.

In step S56, the I2C/I3C master 72 transmits a fixed communication setting required for communication in the extension mode before communication in the extension mode is started. As a result, the fixed communication setting is written into the register 47 of the image sensor 21 (step S14 in FIG. 11).

In step S57, the controller 74 causes the I2C/I3C master 72 to transmit an image data transmission start command to the image sensor 21. In this case, the controller 74 also transmits a communication setting according to the CSI-2 standard.

In step S58, the packet header detection unit 81 determines whether or not reception of the packet has been started by checking the data supplied from the physical layer processing unit 71, and waits for the process until it is determined that the reception of the packet has been started. For example, in a case where the packet header is detected from the data supplied from the physical layer processing unit 71, the packet header detection unit 81 determines that the reception of the packet has been started.

In step S58, in a case where the packet header detection unit 81 determines that the reception of the packet has been started, the process proceeds to step S59.

In step S59, the packet header detection unit 81 checks the data type of the packet header detected in step S58, and determines whether or not the packet of which reception has been started is an extended packet corresponding to the extension mode. For example, in a case where the extension mode setting information indicates the extension mode in the data type of the packet header (DataType [5:3]=3'b111), the packet header detection unit 81 determines that the packet of which reception has been started is an extended packet.

In step S59, in a case where the packet header detection unit 81 determines that the packet of which reception has been started is an extended packet, the process proceeds to step S60, and an extension mode reception process of receiving the extended packet is performed (refer to FIG. 14).

On the other hand, in step S59, in a case where the packet header detection unit 81 determines that the packet of which reception has been started is not an extended packet, the process proceeds to step S61.

In step S61, the packet header detection unit 81 checks the data type (DataType [5:0]) of the packet header detected in step S58, and determines whether or not the packet of which reception has been started is a short packet.

In step S61, in a case where the packet header detection unit 81 determines that the packet of which reception has been started is a short packet, the process proceeds to step S62. In step S62, the packet header detection unit 81 receives a short packet having a conventional packet structure transmitted from the image sensor 21.

On the other hand, in step S61, in a case where the packet header detection unit 81 determines that the packet of which reception has been started is not a short packet (that is, reception of a long packet is started), the process proceeds to step S63. In step S63, the unpacking unit 87 receives a payload of the long packet having the conventional packet structure transmitted from the image sensor 21 and extracts the image data, and the CRC calculation unit 86 receives the (WC+1)-th byte transmitted following the packet header as CRC.

After the process in step S60, step S62, or step S63, the process proceeds to step S64, and the controller 74 ends the packet reception process. Thereafter, the process returns to step S58, and then, a process of similarly receiving a packet is repeatedly performed on the next packet.

FIG. 14 is a flowchart illustrating the extension mode reception process performed in the process in step S60 in FIG. 13.

In step S71, the packet header detection unit 81 determines whether or not the mode setting of the extension mode is the extension mode 0. For example, in a case where the extension type setting information indicates the extension mode 0 in the data type of the packet header (DataType [1:0]=2'b00), the packet header detection unit 81 determines that the mode setting of the extension mode is the extension mode 0.

In step S71, in a case where the packet header detection unit 81 determines that the mode setting of the extension mode is the extension mode 0, the process proceeds to step S72. In step S72, the analysis unit 83 receives the first byte of the payload as an extended packet header.

In step S73, the analysis unit 83 checks the data type (DataType [7:0]) of the extended packet header received in step S72, and determines whether or not the packet of which reception has been started is an extended short packet.

In step S73, in a case where the analysis unit 83 determines that the packet is an extended short packet, the process proceeds to step S74. In step S74, the analysis unit 83 receives an optional extended packet header according to the setting (OePH [7:0]) stored in the extended packet header received in step S72.

In step S75, the CRC calculation unit 86 receives the (WC+1)-th byte transmitted following the optional extended packet header as CRC.

On the other hand, in step S73, in a case where the analysis unit 83 determines that the packet is not an extended short packet (that is, reception of the extended long packet is started), the process proceeds to step S76. In step S76, the analysis unit 83 receives the optional extended packet header according to the setting (OePH [7:0]) stored in the extended packet header received in step S72.

In step S77, the unpacking unit 87 receives the legacy payload of the extended long packet transmitted from the image sensor 21 and extracts the image data.

In step S78, the analysis unit 83 receives the optional extended packet footer according to the setting (OePF [3:0]) stored in the extended packet header received in step S72.

In step S79, the CRC calculation unit 86 receives the (WC+1)-th byte transmitted following the optional extended packet footer as CRC.

Then, in a case where it is determined in step S71 that the mode setting of the extension mode is not the extension mode 0, the extension mode reception process is ended after the process in step S75 or after the process in step S79.

As described above, the application processor 22 can acquire data by receiving the extended short packet or the extended long packet.

Second Structure Example of Packet Structure

A second structure example of a packet structure of a packet used in communication between the extension mode-compatible CSI-2 transmission circuit 31 and the extension mode-compatible CSI-2 reception circuit 32 will be described with reference to FIGS. 15 to 18.

In the first structure example illustrated in FIGS. 3 to 8, emphasis is placed on maintaining compatibility with the existing CSI-2 standard, and the packet header and the packet footer have the same packet structure as the existing CSI-2 standard, and the packet structure is extended by the extended packet header, the optional extended packet header, and the optional extended packet footer. On the other hand, in the second structure example described below, the packet header and the packet footer are different from the existing CSI-2 standard, and the packet structure is extended by the extended packet header and the extended packet footer.

FIG. 15 illustrates a packet structure of a short packet (hereinafter, a D-PHY extended short packet) used in an extension mode of CSI-2 in a case where a physical layer is the D-PHY.

In the D-PHY extended short packet illustrated in FIG. 15, the extension mode is identified by the data type stored in the same packet header as that of the existing CSI-2 standard, similarly to the D-PHY extended short packet of the first structure example illustrated in FIG. 4.

On the other hand, in the D-PHY extended short packet illustrated in FIG. 15, a frame number is stored in the short packet data field in the next 16 bits of the data type of the packet header, similarly to the short packet according to the existing CSI-2 standard. Then, subsequently to the packet header, an extended packet header configured similarly to the extended packet header illustrated in FIG. 4 is transmitted.

Therefore, the application processor 22 on a reception side can analyze the data type stored in the extended packet header and determine that the frame number is stored in the data field of the packet header in a case where the packet is an extended short packet.

Note that the optional extended packet header in the D-PHY extended short packet illustrated in FIG. 15 is configured similarly to the optional extended packet header in the D-PHY extended short packet of the first structure example illustrated in FIG. 4. However, since the optional extended packet header has a packet structure that is not embedded in the payload, it is not necessary to add CRC to the end.

FIG. 16 illustrates a packet structure of a long packet (hereinafter, a D-PHY extended long packet) used in an extension mode of CSI-2 in a case where a physical layer is the D-PHY.

In the D-PHY extended long packet illustrated in FIG. 16, extension data is transmitted as a part of a packet header or a packet footer without being embedded in a payload. Therefore, similarly to the existing standard, a WC of the head packet header merely indicates a byte length of the payload.

FIG. 17 illustrates a packet structure of a short packet (hereinafter, a C-PHY extended short packet) used in an extension mode of CSI-2 in a case where a physical layer is the C-PHY.

Since an extended portion in the C-PHY extended short packet illustrated in FIG. 17 is transmitted as extension of a packet header conforming to the existing CSI-2 standard, the extended portion such as an extended packet header is inserted after a frame number. Then, similarly to the existing CSI-2 standard, the packet header ends with CRC. Further, a packet structure in which these are transmitted twice with SYNC interposed therebetween is similar to a short packet conforming to the existing CSI-2 standard.

FIG. 18 illustrates a packet structure of a long packet (hereinafter, a C-PHY extended long packet) used in an extension mode of CSI-2 in a case where a physical layer is the C-PHY.

As described above, the C-PHY extended long packet illustrated in FIG. 18 is different from the C-PHY extended long packet of the first structure example illustrated in FIG. 8 in that a WC of the head packet header indicates only a byte length of the payload similarly to the existing standard.

As described above, with the packet structure of the extended packet of the second structure example illustrated in FIGS. 15 to 18, similarly to the packet structure (FIGS. 3 to 8) of the extended packet of the first structure example, it is possible to cope with various applications compared with the related art.

However, the extended packet of the second structure example has a packet structure in which the existing packet header or footer are extended without extension data being embedded in the existing payload. Therefore, in the case of employing the packet structure of the extended packet of the second structure example, it is not possible to minimize the influence that requires a change from the conventionally used communication system compared with the case of employing the packet structure of the extended packet of the first structure example. That is, for example, the existing SerDes transmission circuit 34 needs to be changed with respect to the SerDes reception circuit 35 (FIG. 2).

As described above, by employing the extended packet of the first structure example, it is possible to cope with various applications such as in-vehicle use, and it is also possible to construct an in-vehicle system while minimizing the influence that requires a change from the conventionally used communication system.

In addition, by employing the extended packet of the second structure example, it is possible to cope with various applications such as in-vehicle use although the conventionally used communication system is required to be changed.

Modification Examples of Image Sensor and Application Processor

Modification Example of Image Sensor

Modification examples of the image sensor and the application processor will be described with reference to FIGS. 19A and 19B.

Each block configuring the image sensor 21 in FIG. 9 and the application processor 22 in FIG. 10 described above is configured to be able to perform processes corresponding to both a D-layer packet and a C-layer packet. In contrast, for example, both a block for exclusively processing a D-PHY packet and a block for exclusively processing a C-PHY packet may be provided, and the processes may be switched in each block.

An image sensor 21A illustrated in-A of FIG. 19A includes a D-layer processing block unit 101, a C-layer processing block unit 102, a switching unit 103, and a controller 60.

The D-layer processing block unit 101 includes a block that exclusively performs processing of a D-PHY packet among the blocks configuring the image sensor 21 in FIG. 9. The C-layer processing block unit 102 includes a block that exclusively performs processing of a C-PHY packet among the blocks configuring the image sensor 21 in FIG. 9. Under the control of the controller 60, the switching unit 103 performs switching to output a D-PHY packet generated in the D-layer processing block unit 101 in a case where the D-PHY is used as a physical layer, and to output a C-PHY packet generated in the C-layer processing block unit 102 in a case where the C-PHY is used as a physical layer.

Modification Example of Application Processor

An application processor 22A illustrated in FIG. 19B includes a switching unit 111, a D-layer processing block unit 112, a C-layer processing block unit 113, and a controller 74.

The switching unit 111 performs switching to supply a packet transmitted from the image sensor 21A to one of the D-layer processing block unit 112 or the C-layer processing block unit 113 under the control of the controller 74. The D-layer processing block unit 112 includes a block that exclusively performs processing of a D-PHY packet among the blocks configuring the application processor 22 in FIG. 10. The C-layer processing block unit 113 includes a block that exclusively performs processing of a C-PHY packet among the blocks configuring the application processor 22 in FIG. 10.

In the image sensor 21A and the application processor 22A configured as described above, a physical layer to be used can be set between the controller 60 and the controller 74 before communication is started. Then, for example, in a case where the D-PHY is used as a physical layer, a D-PHY packet generated in the D-layer processing block unit 101 is transmitted via the switching unit 103, supplied to the D-layer processing block unit 112 via the switching unit 111, and processed. Furthermore, for example, in a case where the C-PHY is used as a physical layer, a C-PHY packet generated in the C-layer processing block unit 102 is transmitted via the switching unit 103, supplied to the C-layer processing block unit 113 via the switching unit 111, and processed.

Application Example of Extended Packet

Application of the above-described extended packet to, for example, the following use cases has been considered.

For example, it is considered that the extended packet is applied to a use case in which a higher-definition image (RAW24) is transmitted.

For example, when image data is transmitted in the RAW format, RAW6, RAW7, RAW8, RAW10, RAW12, RAW14, RAW16, and RAW20 are defined as data types to be stored in a packet header according to the existing CSI-2 standard. On the other hand, in recent years, transmission of a higher-definition image is expected in order to support automated driving using an in-vehicle camera. Therefore, it is possible to define, for example, higher-definition RAW24 as a data type of an extended packet header by extending a bit depth of the data type by applying the extended packet.

Further, it is considered that the extended packet is applied to SmartROI which is a technique for transmitting only an image region of interest on a screen.

For example, a large number of cameras are currently installed in a stadium, an airport, or the like. In a case where the entire image captured by such a camera is transmitted from the camera to a cloud server via a network such as the Internet, it is assumed that a band shortage of the Internet, an increase in computation amount or data amount on the cloud side, or the like occurs. Therefore, by cutting out only an image region of interest at the edge (camera side) and transmitting the image region of interest, it is expected to reduce a band shortage on the Internet, an increase in computation amount or data amount on the cloud side, and the like.

In a case where such an SROI is transmitted, it is necessary to transmit upper left coordinates of a rectangular region (ROI) together in order to transmit, to the reception side, a position to which the image region of interest corresponds in the entire screen. In addition, it is necessary to transmit data of the entire imaging screen at a predetermined timing by using a command from the reception side. Therefore, for example, an SROI image and data of the entire image (existing packet header) are mixed in frame units.

Therefore, by applying the extended packet, for example, coordinate data of 16 bits or more of each of the X coordinate and the Y coordinate can be transmitted.

Furthermore, a use case is considered in which the extended packet is applied to GLD in which communication continues by reducing a band or the number of lanes even in a case where channel deterioration occurs. Note that GLD is a proposal studied in CSI-2 ver 3.0.

For example, in automated driving, even if a part of a cable connecting cameras is disconnected at the time of collision, communication is required to continue by using a cable that is not disconnected, and a vehicle is required to be automatically retreated to a safety zone and then stopped. Therefore, an in-vehicle camera interface has at least a disconnection detection function, and requires information such as a row number (16 bits) indicating information regarding which row on the screen, SourceID (8 bits) indicating a camera that has transmitted the row number, and a message counter (16 bits) indicating a transmission number. Furthermore, in a case where these pieces of information are used in combination with the SROI as described above, it is conceivable that the information is transmitted in units of frames.

Therefore, these pieces of information can be transmitted by applying the extended packet.

First Configuration Example Adapted to E2E Protection

A configuration example adapted to a regulation for prohibiting packet falsification and the like on a transmission path will be described with reference to FIGS. 20 to 26.

For example, in the communication system 11A having the configuration described above with reference to FIG. 2, in a case where an interface is different between the image sensor 21 and the application processor 22, it is necessary to convert a packet on a transmission path. That is, in a case of a configuration in which a physical layer of the image sensor 21 is the D-PHY and a physical layer of the application processor 22 is the C-PHY, for example, it is necessary to convert the packet from a D-PHY packet to a C-PHY packet in the SerDes device 26.

As described above, in the configuration in which the packet conversion is performed in the SerDes device 26, for example, the regulation defined by ISO26262 (Functional Safety), that is, the regulation for prohibiting packet falsification and the like on a transmission path (hereinafter, referred to as End-toEnd (E2E) protection) is violated.

FIG. 20 is a block diagram illustrating a configuration example of a communication system 201 adapted to E2E protection as a third embodiment of the communication system to which the present technology is applied.

As illustrated in FIG. 20, the communication system 201 has a configuration in which an image sensor 211, a SerDes device 212, a SerDes device 213, and an application processor 214 are connected. Note that, although FIG. 20 illustrates the case where SERDES is the A-PHY as an example, a case of connection using other SERDES standards such as FPD-LINK3 is also included. In addition, in the SERDES standard, communication may be performed on the basis of the SERDES standard while maintaining the format of CIS-2 (at least an application specific payload). In addition, in SERDES, the physical layer processing units 237 and 247 may include a plurality of physical layer processing units of other SERDES standards in addition to the A-PHY, and the physical layer processing units may be switched according to applications.

The image sensor 211 includes at least an extension mode-compatible CSI-2 transmission circuit 221, a physical layer processing unit (hereinafter, referred to as a C/D-PHY physical layer processing unit) 222 corresponding to the C-PHY or the D-PHY or both, a slave (hereinafter, referred to as an I2C/I3C slave) 223 corresponding to I2C or I3C or both, and a CCI slave 224.

The SerDes device 212 includes at least a CSI-2 reception circuit 231, a C/D-PHY physical layer processing unit 232, an I2C/I3C master 233, a CCI master 234, a CSI-2 A-PHY packet generation unit 235, a CCI A-PHY packet transmission/reception unit 236, and a physical layer processing unit 237 corresponding to the A-PHY. For example, in the SerDes device 212, a C-PHY packet or the D-PHY packet is converted into an A-PHY packet, and this conversion is determined on the basis of a register setting or the like.

The SerDes device 213 includes at least a CSI-2 transmission circuit 241, a C/D-PHY physical layer processing unit 242, an I2C/I3C slave 243, a CCI slave 244, a CSI-2 A-PHY packet reception unit 245, a CCI A-PHY packet transmission/reception unit 246, and a physical layer processing unit 247 corresponding to the A-PHY. For example, in the SerDes device 213, an A-PHY packet is converted into a C-PHY packet or the D-PHY packet, and this conversion is determined on the basis of a register setting or the like.

The application processor 214 includes at least an extension mode-compatible CSI-2 reception circuit 251, a C/D-PHY physical layer processing unit 252, an I2C/I3C master 253, and a CCI master 254.

The communication system 201 is configured as described above, and the extended packet having the above-described structure is transmitted from the image sensor 211 and received by the application processor 214. Here, even when the communication system 201 is configured such that the physical layer processing unit 222 of the image sensor 211 corresponds to the D-PHY and the physical layer processing unit 252 of the application processor 22 corresponds to the C-PHY, it is necessary not to violate E2E protection.

Therefore, the communication system limits a protection range of E2E protection to an application specific payload (hereinafter, referred to as an AS payload), which is a payload specific to an application, so that the communication system 201 can be adapted to E2E protection. That is, the AS payload is prohibited from being changed at the time of conversion from an A-PHY packet to a C-PHY packet or the D-PHY packet or at the time of conversion from a C-PHY packet or the D-PHY packet to an A-PHY packet.

FIG. 21 illustrates a structure example of a D-PHY extended packet extended to support E2E protection.

As illustrated, in the D-PHY extended packet, an AS payload including an extended packet header (ePH), packet data, and an extended packet footer (ePF) is limited as a protection range of E2E protection.

Then, predetermined information necessary in a case where the protection range of E2E protection is limited to the AS payload is described in the extended packet header. For example, a packet count PC (Packet Count) indicating a data length of data stored in the AS payload is added as the predetermined information described in the extended packet header such that the data length of the packet data can be identified. That is, the packet data has the number of bytes determined by the packet count PC. Further, as the predetermined information described in the extended packet header, a virtual channel VC (Virtual Channel) indicating the number of lines of a virtual channel is copied to the existing packet header.

FIG. 22 illustrates a structure example of a C-PHY extended packet extended to support E2E protection.

As illustrated, similarly to the D-PHY extended packet, an AS payload including an extended packet header (ePH), packet data, and an extended packet footer (ePF) is limited as a protection range of E2E protection in the C-PHY extended packet. Then, similarly to the D-PHY extended packet, the packet count PC and the virtual channel VC are described in the extended packet header as predetermined information necessary in a case where the protection range of E2E protection is limited to the AS payload.

FIG. 23 illustrates a structure example of an A-PHY extended packet extended to support E2E protection.

As illustrated, also in the A-PHY extended packet, an AS payload including an extended packet header (ePH), packet data, and an extended packet footer (ePF) is limited as a protection range of E2E protection.

Here, as described with reference to FIG. 20, the communication system 201 generates the A-PHY extended packet from the D-PHY extended packet or the C-PHY extended packet transmitted from the image sensor 211 to the SerDes device 212. Therefore, the packet count PC and the virtual channel VC are already described in the extended packet header of the A-PHY extended packet.

By employing such a packet structure, the communication system 201 can avoid falsification of the AS payload on the transmission path and can observe E2E protection. Note that the packet structures illustrated in FIGS. 21 to 23 can be used by being partially replaced with corresponding packets of the packet structures as illustrated in FIGS. 3 to 8 and FIGS. 15 to 18, and a part of packet generation is replaced.

<Packet Transmission/Reception Process Adapted to E2E Protection>

FIG. 24 is a flowchart for describing a packet transmission/reception process adapted to E2E protection.

For example, when data (for example, image data) stored in the packet data is supplied to the extension mode-compatible CSI-2 transmission circuit 221, the process is started. Then, in step S101, in the image sensor 211, the extension mode-compatible CSI-2 transmission circuit 221 stores the supplied data in packet data. Further, the extension mode-compatible CSI-2 transmission circuit 221 generates an extended packet header in which the virtual channel VC and the packet count PC as illustrated in FIG. 21 or 22 are described. The extension mode-compatible CSI-2 transmission circuit 221 adds the extended packet header and an extended packet footer to the packet data to generate an AS payload.

In step S102, the extension mode-compatible CSI-2 transmission circuit 221 generates a C-PHY extended packet or the D-PHY extended packet by adding a C-PHY or D-PHY packet header and a C-PHY or D-PHY packet footer to the AS payload generated in step S101. Then, the extension mode-compatible CSI-2 transmission circuit 221 transmits the C-PHY extended packet or the D-PHY extended packet to the SerDes device 212 via the C/D-PHY physical layer processing unit 222.

In step S103, in the SerDes device 212, the CSI-2 reception circuit 231 receives the C-PHY extended packet or the D-PHY extended packet transmitted from the image sensor

211 in step S102 via the C/D-PHY physical layer processing unit 232. Then, the CSI-2 reception circuit 231 acquires the AS payload obtained by removing the packet header and the packet footer from the received extended packet, and supplies the AS payload to the CSI-2 A-PHY packet generation unit 235 without any change.

In step S104, in the SerDes device 212, the CSI-2 A-PHY packet generation unit 235 generates the A-PHY extended packet by adding the A-PHY packet header and the A-PHY packet footer to the AS payload supplied from the CSI-2 reception circuit 231. Then, the CSI-2 A-PHY packet generation unit 235 transmits the A-PHY extended packet to the SerDes device 213 via the physical layer processing unit 237 corresponding to the A-PHY.

In step S105, in the SerDes device 213, the A-PHY packet reception unit 245 for CSI-2 receives the A-PHY extended packet transmitted from the SerDes device 212 in step S104 via the physical layer processing unit 247 corresponding to the A-PHY. Then, the A-PHY packet reception unit 245 for CSI-2 acquires the AS payload obtained by removing the packet header and the packet footer from the received extended packet, and supplies the AS payload to the CSI-2 transmission circuit 241 without any change.

In step S106, the CSI-2 transmission circuit 241 generates a C-PHY or D-PHY extended packet by adding the C-PHY or D-PHY packet header and the C-PHY or D-PHY packet footer to the AS payload supplied from the A-PHY packet reception unit 245 for CSI-2 in step S105. Then, the CSI-2 transmission circuit 241 transmits the C-PHY or D-PHY extended packet to the application processor 214 via the C/D-PHY physical layer processing unit 242.

In step S107, in the application processor 214, the extension mode-compatible CSI-2 reception circuit 251 receives the C-PHY extended packet or the D-PHY extended packet transmitted from the SerDes device 213 in step S106 via the C/D-PHY physical layer processing unit 252. Then, the extension mode-compatible CSI-2 reception circuit 251 acquires the AS payload obtained by removing the packet header and the packet footer from the received extended packet, and outputs various types of data stored in the packet data of the AS payload to a subsequent LSI (not illustrated). Thereafter, the packet transmission/reception process adapted to E2E protection is ended, and similar processes are repeatedly performed on the next extended packet.

As described above, the communication system 201 can transmit and receive the extended packet without falsification of the AS payload on the transmission path by executing the packet transmission/reception process adapted to E2E protection. In this case, for example, even in a case where a physical layer of the image sensor 211 is the D-PHY and a physical layer of the application processor 214 is the C-PHY, that is, even in a case where the respective interfaces are different, E2E protection can be observed.

Detailed Configuration Example of Image Sensor 211

FIG. 25 is a block diagram illustrating a detailed configuration example of the image sensor 211. Note that, in the image sensor 211 illustrated in FIG. 25, constituents common to those of the image sensor 21 in FIG. 9 are denoted by the same reference numerals, and a detailed description thereof will be omitted.

That is, similarly to the image sensor 21 in FIG. 9, the image sensor 211 includes a pixel 41, an AD converter 42, an image processing unit 43, a register 47, and a controller 60. In addition, the I2C/I3C slave 223 and the CCI slave 224 included in the image sensor 211 respectively correspond to the I2C/I3C slave 46 and the CCI slave 59 in FIG. 9.

Then, the image sensor 211 includes an extension mode-compatible CSI-2 transmission circuit 221 and a physical layer processing unit 222, and the physical layer processing unit 222 corresponds to the A-PHY, the C-PHY, and the D-PHY.

The extension mode-compatible CSI-2 transmission circuit 221 includes an AS payload generation unit 301, a selector 302, an A-PHY packet generation unit 303, a C-PHY packet generation unit 304, a D-PHY packet generation unit 305, and a selector 306 in addition to the controller 60 and the CCI slave 224.

The AS payload generation unit 301 generates an AS payload limited as a protection range of E2E protection, and outputs the AS payload to the selector 302. For example, the AS payload generation unit 301 includes a packing unit 311, an extended packet header generation unit 312, and an extended packet footer generation unit 313.

The packing unit 311 packs image data supplied from the image processing unit 43 as transmission target data, and generates packet data of the number of bytes determined by the packet count PC. For example, the controller 60 can control the number of bytes of the packet data generated by the packing unit 311 according to a setting value (for example, an image size) stored in the register 47.

For example, as described with reference to FIGS. 21 to 23, the extended packet header generation unit 312 generates an extended packet header in which the packet count PC and the virtual channel VC are described, and adds the extended packet header to the packet data. The extended packet footer generation unit 313 generates and adds an extended packet footer to packet data.

Under the control of the controller 60, the selector 302 selects one of the A-PHY packet generation unit 303, the C-PHY packet generation unit 304, and the D-PHY packet generation unit 305 provided in parallel as an output destination of the AS payload supplied from the AS payload generation unit 301.

The A-PHY packet generation unit 303 generates an A-PHY extended packet from the AS payload supplied via the selector 302, and outputs the extended packet to the selector 306. For example, the A-PHY packet generation unit 303 includes an AAL generation unit 321, an A-PHY packet header generation unit 322, and an A-PHY packet footer generation unit 323.

For example, the A-PHY adaptation layer (AAL) generation unit 321 divides the AS payload generated by the AS payload generation unit 301 every 380 bytes in a hierarchy called an adaptation layer. Then, the A-PHY packet header generation unit 322 adds an A-PHY packet header to the divided AS payload, and the A-PHY packet footer generation unit 323 adds an A-PHY packet footer thereto.

The C-PHY packet generation unit 304 generates a C-PHY extended packet from the AS payload supplied via the selector 302, and outputs the extended packet to the selector 306. For example, the C-PHY packet generation unit 304 includes a C-PHY packet header generation unit 331, a C-PHY packet footer generation unit 332, and a C-PHY lane distribution unit 333.

For example, the C-PHY packet header generation unit 331 adds a C-PHY packet header to the AS payload generated by the AS payload generation unit 301, and the C-PHY packet footer generation unit 332 adds a C-PHY packet footer to the AS payload. Then, the C-PHY lane distribution unit 333 distributes the C-PHY extended packet to 3 lanes conforming to the CSI-2 standard.

The D-PHY packet generation unit 305 generates a D-PHY extended packet from the AS payload supplied via the selector 302, and outputs the extended packet to the selector 306. For example, the D-PHY packet generation unit 305 includes a D-PHY packet header generation unit 341, a D-PHY packet footer generation unit 342, and a D-PHY lane distribution unit 343.

For example, the D-PHY packet header generation unit 341 adds a D-PHY packet header to the AS payload generated by the AS payload generation unit 301, and the D-PHY packet footer generation unit 342 adds a D-PHY packet footer. Then, the D-PHY lane distribution unit 343 distributes the extended packet of the D-PHY to 4 lanes according to the CSI-2 standard.

Under the control of the controller 60, the selector 306 selects one of the A-PHY packet generation unit 303, the C-PHY packet generation unit 304, and the D-PHY packet generation unit 305 provided in parallel as an output source of the extended packet supplied to the physical layer processing unit 222.

Then, in a case where the A-PHY extended packet is supplied from the A-PHY packet generation unit 303, the physical layer processing unit 222 transmits the A-PHY extended packet in one lane. In addition, in a case where the C-PHY extended packet is supplied from the C-PHY packet generation unit 304, the physical layer processing unit 222 transmits the C-PHY extended packet in 3 lanes. In addition, in a case where the D-PHY extended packet is supplied from the D-PHY packet generation unit 305, the physical layer processing unit 222 transmits the D-PHY extended packet in four lanes.

In the image sensor 211 configured as described above, the extension mode-compatible CSI-2 transmission circuit 221 is configured such that the AS payload generation unit 301 is connected to the A-PHY packet generation unit 303, the C-PHY packet generation unit 304, and the D-PHY packet generation unit 305 via the selector 302. As a result, the image sensor 211 can generate the AS payload common to the A-PHY extended packet, the C-PHY extended packet, and the D-PHY extended packet by one AS payload generation unit 301. That is, the AS payload generation unit 301 can be shared by the A-PHY packet generation unit 303, the C-PHY packet generation unit 304, and the D-PHY packet generation unit 305, whereby the circuit scale can be reduced. Therefore, downsizing of the image sensor 211 can be realized.

Detailed Configuration Example of Application Processor 214

FIG. 26 is a block diagram illustrating a detailed configuration example of the application processor 214. Note that, in the application processor 214 illustrated in FIG. 26, components common to those of the application processor 22 in FIG. 10 are denoted by the same reference numerals, and a detailed description thereof is omitted.

That is, similarly to the application processor 22 in FIG. 10, the application processor 214 includes a register 73 and a controller 74. Note that controller 74 may be implemented by software. In addition, the I2C/I3C master 253 and the CCI master 254 included in the application processor 214 correspond to the I2C/I3C master 72 and the CCI master 88 in FIG. 10, respectively.

Then, the application processor 214 includes an extension mode-compatible CSI-2 reception circuit 251 and a physical layer processing unit 252, and the physical layer processing unit 252 supports the A-PHY, the C-PHY, and the D-PHY.

The extension mode-compatible CSI-2 reception circuit 251 includes a selector 401, an A-PHY packet reception unit 402, a C-PHY packet reception unit 403, a D-PHY packet reception unit 404, a selector 405, and an AS payload reception unit 406 in addition to the CCI master 254.

The selector 401 selects one of the A-PHY packet reception unit 402, the C-PHY packet reception unit 403, and the D-PHY packet reception unit 404 provided in parallel as an output destination of the extended packet supplied from the physical layer processing unit 252.

The A-PHY packet reception unit 402 receives the A-PHY extended packet supplied via the selector 401 and outputs the extended packet to the selector 405. For example, the A-PHY packet reception unit 402 includes an A-PHY packet header analysis unit 411, an A-PHY packet footer verification unit 412, and an AAL processing unit 413.

For example, the A-PHY packet header analysis unit 411 analyzes contents described in the A-PHY packet header and performs processing necessary for receiving the A-PHY extended packet, and the A-PHY packet footer verification unit 412 verifies the presence or absence of an error using the A-PHY packet footer. Then, the AAL processing unit 413 performs processing of combining the Adaptation Layers divided by the AAL generation unit 321 in FIG. 25.

The C-PHY packet reception unit 403 receives the C-PHY extended packet supplied via the selector 401 and outputs the extended packet to the selector 405. For example, the C-PHY packet reception unit 403 includes a C-PHY lane merging unit 421, a C-PHY packet header analysis unit 422, and a C-PHY packet footer verification unit 423.

For example, the C-PHY lane merging unit 421 merges the C-PHY extended packets distributed to 3 lanes according to the CSI-2 standard and supplied via the physical layer processing unit 252. Then, the C-PHY packet header analysis unit 422 analyzes contents described in the C-PHY packet header and performs processing necessary for receiving the C-PHY extended packet, and the C-PHY packet footer verification unit 423 verifies whether there is an error using the C-PHY packet footer.

The D-PHY packet reception unit 404 receives the D-PHY extended packet supplied via the selector 401 and outputs the extended packet to the selector 405. For example, the D-PHY packet reception unit 404 includes a D-PHY lane merging unit 431, a D-PHY packet header analysis unit 432, and a D-PHY packet footer verification unit 433.

For example, the D-PHY lane merging unit 431 merges D-PHY extended packets distributed into four lanes according to the CSI-2 standard and supplied via the physical layer processing unit 252. Then, the D-PHY packet header analysis unit 432 analyzes the contents described in the D-PHY packet header and performs a process necessary for receiving the D-PHY extended packet, and the D-PHY packet footer verification unit 433 verifies the presence or absence of an error by using the D-PHY packet footer.

The selector 405 selects one of the A-PHY packet reception unit 402, the C-PHY packet reception unit 403, and the D-PHY packet reception unit 404 provided in parallel as an output source of the extended packet supplied to the AS payload reception unit 406.

The AS payload reception unit 406 includes an unpacking unit 441, an extended packet header analysis unit 442, and an extended packet footer verification unit 443 to be correspond to the AS payload generation unit 301 in FIG. 25. The unpacking unit 441 unpacks the image data packed by the packing unit 311. The extended packet header analysis unit 442 analyzes the extended packet header generated by the extended packet header generation unit 312, and reads, for example, the packet count PC and the virtual channel VC. The extended packet footer verification unit 443 verifies the presence or absence of an error by using the extended packet footer added by the extended packet footer generation unit 313. Then, the AS payload reception unit 406 outputs various types of data stored in the packet data supplied via the selector 405, for example, image data, an in-vehicle row number, a SourceID, and a CRC error to a subsequent LSI (not illustrated).

In the application processor 214 configured as described above, the extension mode-compatible CSI-2 reception circuit 251 is configured such that the AS payload reception unit 406 is connected to the A-PHY packet reception unit 402, the C-PHY packet reception unit 403, and the D-PHY packet reception unit 404 via the selector 405. As a result, the application processor 214 can receive the AS payload common to the A-PHY extended packet, the C-PHY extended packet, and the D-PHY extended packet by the single AS payload reception unit 406. That is, the AS payload reception unit 406 can be shared by the A-PHY packet reception unit 402, the C-PHY packet reception unit 403, and the D-PHY packet reception unit 404, and thus a circuit scale can be reduced. Therefore, downsizing of the application processor 214 can be realized.

Second Configuration Example Adapted to E2E Protection

A second configuration example adapted to E2E protection will be described with reference to FIGS. 27 to 74.

Configuration Example of A-PHY Direct Connection Configuration

A communication system 501 illustrated in FIG. 27 has a direct connection configuration in which an image sensor 511 and an application processor 512 are directly connected via the A-PHY (not using a SerDes device as described with reference to FIG. 40 that will be described later).

The image sensor 511 includes an A-PHY processing unit 521, a CSIA processing unit 522, a CSI2 processing unit 523, a CSI2-FS processing unit 524, a CCI processing unit 525, a CCI-FS processing unit 526, and a register 527.

In the A-PHY processing unit 521, the CCI processing unit 525 is implemented as an upper layer, and has MIPI A-PHY connection with the A-PHY processing unit 531 of the application processor 512 to transmit and receive data including the extended packet header ePH and the extended packet footer ePF.

For example, the CCI-FS processing unit 526 compares a destination ID included in the extended packet header ePH with an ID (source ID) of the image sensor 511, and determines whether or not the image sensor 511 is accessed.

The application processor 512 includes an A-PHY processing unit 531, a CSIA processing unit 532, a CSI2 processing unit 533, a CSI2-FS processing unit 534, a CCI processing unit 535, a CCI-FS processing unit 536, a register 537, and a CCI-FS switch 538.

In the A-PHY processing unit 531, the CCI processing unit 535 is implemented as an upper layer, and has MIPI A-PHY connection with the A-PHY processing unit 521 of the image sensor 511 to transmit and receive data including the extended packet header ePH and the extended packet footer ePF.

For example, the CCI-FS processing unit 536 compares the destination ID included in the extended packet header ePH with the ID (source ID) included in the application processor 512, and determines whether or not the application processor 512 is accessed.

The CCI-FS switch 538 performs switching such that data is transmitted and received via the CCI-FS processing unit 536 in a case where the CCI-FS processing unit 536 is enabled, and data is transmitted and received without the CCI-FS processing unit 536 in a case where the CCI-FS processing unit 536 is disabled.

Transfer of a read command and read data in the communication system 501 will be described with reference to FIGS. 28 to 32.

FIG. 28 illustrates an example of a packet configuration of a read command generated in the CCI-FS processing unit 536 of the application processor 512 at the time of read access.

As illustrated in FIG. 28, the read command includes an extended packet header ePH* (*=n), an AP (CCI) payload, an extended packet footer ePF1, and an extended packet footer ePF0.

As illustrated, the extended packet header ePH* includes extended packet headers ePH0 to ePH3.

An extended VC, an extended DT, an extended PFEN, and an extended PHEN are stored in the extended packet header ePH0. For example, the extended DT is information indicating the CCI protocol (I2C), and a routing process is performed by using the extended DT.

The extended packet header ePH1 stores Source ID [7:1] and a packet length. For example, the source ID is information indicating a transmission source of the CCI protocol (I2C), and a response process is performed on the basis of the source ID. The packet length is information indicating a data length.

A security descriptor and a message counter are stored in extended packet header ePH2. The security descriptor indicates whether or not security is used, and indicates "8'h0" in a case where security is not used. The message counter is information indicating a bucket order and indicates a count value obtained by counting messages, and indicates "16'h5" when the message is the fifth message.

The extended packet header ePH3 stores destination ID [7:1], read/write, and a destination address. Destination ID [7:1] indicates a slave address of the CCI processing unit 525 of the image sensor 511, and is "7'h0D" in the illustrated example. For example, the destination ID is information indicating a transmission destination of the CCI protocol (I2C), and routing is performed on the basis of the destination ID and a communication path is referred to. The read/write indicates reading or writing of data, and indicates "1'b1" in the case of read. The destination address indicates an address of the register 527 of the image sensor 511 as a final destination, and is "0x0200" in the illustrated example.

For example, various types of data (Data 0 [7:0]) are stored in the AP (CCI) payload. The AP (CCI) payload may not be transmitted when security is off, and dummy data may be transmitted with data stored therein when security is on.

The extended packet footer ePF1 is not transmitted when security is turned off.

A CRC computed value is stored in the extended packet footer ePF0.

In the application processor 512, a read command having such a packet structure is generated in the CCI-FS processing unit 536 and supplied to the A-PHY processing unit 531.

FIG. 29 illustrates an example of a packet configuration of a read command output from the A-PHY processing unit 531 of the application processor 512 at the time of read access.

As illustrated in FIG. 29, the A-PHY processing unit 531 adds an A-PHY header and an A-PHY footer to the read command supplied from the CCI-FS processing unit 536 as a protection range of E2E protection.

The A-PHY processing unit 531 of the application processor 512 performs A-PHY transfer of the read command having such a packet structure. Then, in the image sensor 511, the A-PHY processing unit 521 removes the A-PHY header and the A-PHY footer from the read command. Thereafter, the read command is supplied to the CCI-FS processing unit 526 via the CCI processing unit 525 having the slave address "7'h0D" indicated by the destination ID.

FIG. 30 illustrates an example of packet structures of a read command supplied to the CCI-FS processing unit 526 and read data generated in the CCI-FS processing unit 526 at the time of read access.

As illustrated in FIG. 30, the read command having the packet structure illustrated in FIG. 28, that is, the read command set in the protection range of E2E protection in the A-PHY transfer is supplied to the CCI-FS processing unit 526.

As illustrated, the read data includes an extended packet header ePH* (*=n), an AP (CCI) payload, an extended packet footer ePF1, and an extended packet footer ePF0. Then, a read data value read from the address "0x0200" of the register 527 indicated by the source address information (destination address) of the extended packet header ePH of the read command is stored in the AP (CCI) payload.

In the image sensor 511, the read data having such a packet structure is generated in the CCI-FS processing unit 526 and supplied to the A-PHY processing unit 521.

FIG. 31 illustrates an example of a packet configuration of read data output from the A-PHY processing unit 521 of the image sensor 511 at the time of read access.

As illustrated in FIG. 31, the A-PHY processing unit 521 adds an A-PHY header and an A-PHY footer to read data supplied from the CCI-FS processing unit 526 as the protection range of E2E protection.

The A-PHY processing unit 521 of the image sensor 511 performs A-PHY transfer of the read data having such a packet structure. Then, in the application processor 512, the A-PHY processing unit 531 removes the A-PHY header and the A-PHY footer from the read data, and supplies the read data to the CCI-FS processing unit 536.

FIG. 32 illustrates an example of a packet structure of read data supplied to the CCI-FS processing unit 536 at the time of read access.

As illustrated in FIG. 32, the read data having the packet structure illustrated in FIG. 30, that is, the read data set in the protection range of E2E protection in the A-PHY transfer is supplied to the CCI-FS processing unit 536.

Transfer of write data in the communication system 501 will be described with reference to FIGS. 33 to 35. Note that a description will be made assuming that the CCI-FS processing unit 526 on the image sensor 511 side performs access from an enabled state.

FIG. 33 illustrates an example of a packet configuration of write data generated in the CCI-FS processing unit 536 of the application processor 512 at the time of write access.

As illustrated in FIG. 33, the write data includes an extended packet header ePH* (*=n), an AP (CCI) payload (write data), an extended packet footer ePF1, and an extended packet footer ePF0.

As illustrated, the extended packet header ePH* includes extended packet headers ePH0 to ePH3.

An extended VC, an extended DT, an extended PFEN, and an extended PHEN are stored in the extended packet header ePH0.

The extended packet header ePH1 stores Source ID [7:1] and a packet length.

A security descriptor and a message counter are stored in extended packet header ePH2. The security descriptor indicates whether or not security is used, and indicates "8'h0" in a case where security is not used. The message counter indicates a count value obtained by counting messages, and indicates "16'h4" when a message is the fourth message.

The extended packet header ePH3 stores destination ID [7:1], read/write, and a destination address. Destination ID [7:1] indicates a slave address of the CCI processing unit 525 of the image sensor 511, and is "7'h0D" in the illustrated example. The read/write indicates reading or writing of data, and indicates "1'b0" in the case of write. The destination address indicates an address of the register 527 of the image sensor 511 as a final destination, and is "0x1234" in the illustrated example.

In the AP (CCI) payload, data (Data 0 [7:0]) to be written into the image sensor 511 is stored, and a 0xFF value is write data.

The extended packet footer ePF1 is not transmitted when security is turned off.

A CRC computed value is stored in the extended packet footer ePF0.

In the application processor 512, the write data having such a packet structure is generated in the CCI-FS processing unit 536 and supplied to the A-PHY processing unit 531.

FIG. 34 illustrates an example of a packet configuration of write data output from the A-PHY processing unit 531 of the application processor 512 at the time of write access.

As illustrated in FIG. 34, the A-PHY processing unit 531 adds an A-PHY header and an A-PHY footer to the write data supplied from the CCI-FS processing unit 536 as the protection range of E2E Protection.

The write data having such a packet structure is A-PHY transferred by the A-PHY processing unit 531 of the application processor 512. Then, in the image sensor 511, the A-PHY processing unit 521 removes the A-PHY header and the A-PHY footer from the write data. Thereafter, the write data is supplied to the CCI-FS processing unit 526 via the CCI processing unit 525 having the slave address "7'h0D" indicated by the destination ID.

FIG. 35 illustrates an example of a packet structure of write data supplied to the CCI-FS processing unit 526 at the time of write access.

As illustrated in FIG. 35, the write data having the packet structure illustrated in FIG. 33, that is, the write data set in the protection range of E2E protection in the A-PHY transfer is supplied to the CCI-FS processing unit 526. Then, the CCI-FS processing unit 526 writes the data stored in the AP (CCI) payload from the address "0x1234" of the register 527 indicated by CCI command ID information, that is, source address information (destination address) of the extended packet header ePH of the read command.

An outline of the extended packet header ePH and the extended packet footer ePF will be described with reference to FIG. 36.

As illustrated in FIG. 36, a CCI-FS E2E packet includes an extended packet header ePH, packet data, and an extended packet footer ePF, and a packet length thereof is length=byte count×data byte width.

As the extended packet header ePH, fields such as an extended VC, an extended DT, and a message counter are used. The length of the extended packet header ePH may be changed by using a field value (epFEN field) of the extended packet header ePH.

The packet data includes, for example, PL pieces of data (Data 0 to Data PL-1), and the length thereof is length=packet length (PL)×data byte width. In the case of the read command, data is not stored in the packet data when security is off, and 1-byte dummy data is stored in the packet data when security is on. Write data corresponding to payload data is stored in the packet data in the case of write access. In the case of the read access, read data corresponding to payload data is stored in the packet data. When clock stretch (control code indicator=1 of ePH0) is used, a 1-byte data payload indicating the type of control is attached to packet data.

A length of the extended packet footer ePF1 may be changed by using a field setting value (epFEN field) of the extended packet header ePH. In addition, security-related information may be added.

CRC-32 that is computed from the packet data may be added to the extended packet footer ePF0 by using a field setting value of the extended packet header ePH.

Processing Example of Communication Processing

A communication process using CCI-FS performed in the communication system 501 illustrated in FIG. 27 will be described with reference to flowcharts of FIGS. 37 to 39.

As illustrated in FIG. 37, in steps S211 to S222, initial setting and a check operation are performed.

In step S211, read access to a capability register of the CCI-FS processing unit 526 is performed twice from the application processor 512 to the image sensor 511. Note that the number of times of performing the read access is not limited to two, and may be freely set, for example, in terms of functional safety, and may be one or three or more.

In step S212, in the application processor 512, the CSI2-FS processing unit 524 determines whether or not a capability register value of the CCI-FS processing unit 526 is 1'b1 twice for results of the read access in step S211. In step S212, in a case where it is determined that the capability register value of the CCI-FS processing unit 526 is not 1'b1 twice, the process proceeds to step S213.

In step S213, in the application processor 512, the CSI2-FS processing unit 524 determines whether or not the number of times of retransmission is three or more. Note that the number of times of retransmission is not limited to three, and may be set to any number, and the same applies to the number of times of retransmission described below. In a case where it is determined in step S213 that the number of times of retransmission is not three or more (one or two), the process returns to step S211, and similar processes are repeatedly performed thereafter.

On the other hand, in step S212, in a case where it is determined that the capability register value of the CCI-FS processing unit 526 is 1'b1 twice, the process proceeds to 214.

In step S214, write access to an enable register of the CCI-FS processing unit 526 is performed once from application processor 512 to the image sensor 511.

In step S215, in the image sensor 511, the CCI-FS processing unit 526 performs write access to the enable register of the CCI-FS processing unit 536 of the application processor 512 once.

In step S216, a slave address of the opposing image sensor 511 is set in the destination SID register of the CCI-FS processing unit 536 of the application processor 512.

In step S217, an ePH register of the CCI-FS processing unit 536 of the application processor 512 is set.

In step S218, the ePH register of the CCI-FS processing unit 526 is set from the application processor 512 to the image sensor 511.

In step S219, read access to the enable register and an error register of the CCI-FS processing unit 526 is performed from the application processor 512 to the image sensor 511.

In step S220, in the application processor 512, the CCI-FS processing unit 536 determines whether or not an enable register value of the CCI-FS processing unit 526 is 1'b1 and an error register value is 0 for results of the read access in step S219.

In step S220, in a case where it is determined that the Enable register value of the CCI-FS processing unit 526 is not 1'b1 or the error register value is not 0, the process proceeds to step S221.

In step S221, in the application processor 512, the CSI2-FS processing unit 524 determines whether or not the number of times of retransmission is three or more. In a case where it is determined in step S221 that the number of times of retransmission is three or more, the process returns to step S211, and similar processes are repeatedly performed thereafter.

On the other hand, in a case where it is determined in step S213 that the number of times of retransmission is three or more, or in a case where it is determined in step S221 that the number of times of retransmission is not three or more (one or two), the process proceeds to step S222.

In step S222, the communication in CCI is performed without using CCI-FS, and then the communication processing is ended.

On the other hand, in step S220, in a case where it is determined that the enable register value of the CCI-FS processing unit 526 is 1'b1 and the error register value is 0, the process proceeds to step S223.

As illustrated in FIG. 38, in steps S223 to S234, a write operation using CCI-FS is performed.

In step S223, the CCI-FS processing unit 536 of the application processor 512 sets the ePH register such that the write operation is performed.

In step S224, the CCI-FS processing unit 536 of the application processor 512 sets a write data register.

In step S225, the CCI-FS processing unit 536 of the application processor 512 sets a command execution register to 1.

In step S226, in the application processor 512, as illustrated in FIG. 34 described above, the A-PHY processing unit 531 adds an A-PHY header and an A-PHY footer to the write data generated by the CCI-FS processing unit 536 as the protection range of E2E protection, and performs A-PHY transfer.

In step S227, in the image sensor 511, the A-PHY processing unit 521 removes the A-PHY header and the A-PHY footer from the write data, and supplies the protection range of E2E protection to the CCI-FS processing unit 526.

In step S228, in the image sensor 511, the CCI-FS processing unit 526 checks the source ID of the image sensor 511 and the destination SID of the extended packet header ePH from the contents of the extended packet header ePH.

In step S229, in the image sensor 511, the CCI-FS processing unit 526 determines whether or not the source ID of the image sensor 511 checked in step S228 matches the destination SID of the extended packet header ePH.

In a case where it is determined in step S229 that the source ID of the image sensor 511 matches the destination SID of the extended packet header ePH, the process proceeds to step S230.

In step S230, in the image sensor 511, the CCI-FS processing unit 526 checks the message counter from the contents of the extended packet header ePH.

In step S231, in the image sensor 511, the CCI-FS processing unit 526 determines whether or not the message counter (reception) of the image sensor 511 checked in step S230 matches the message counter of the extended packet header ePH.

In a case where it is determined in step S231 that the message counter (reception) of the image sensor 511 matches the message counter of the extended packet header ePH, the process proceeds to step S232.

In step S232, in the image sensor 511, the CCI-FS processing unit 526 checks the CRC from the contents of the extended packet footer ePF.

In step S233, in the image sensor 511, the CCI-FS processing unit 526 determines whether or not a reception value (ePF0) of the extended packet footer ePF checked in step S232 matches a CRC computation result computed in the CCI-FS processing unit 526.

In a case where it is determined in step S233 that the reception value (ePF0) of the extended packet footer ePF matches the CRC computation result, the process proceeds to step S234.

In step S234, in the image sensor 511, the CCI-FS processing unit 526 performs write processing of writing write data into the address of the register 527 from the contents of the extended packet header ePH and the extended packet footer ePF. Thereafter, the process proceeds to step S235.

As illustrated in FIG. 39, in steps S235 to S247, a read operation using CCI-FS is performed.

In step S235, in the application processor 512, the CCI-FS processing unit 536 sets the ePH register such that the read operation is performed.

In step S236, in the application processor 512, the CCI-FS processing unit 536 sets the command execution register to 1.

In step S237, in the application processor 512, as illustrated in FIG. 29 described above, the A-PHY processing unit 531 adds an A-PHY header and an A-PHY footer to the write data generated by the CCI-FS processing unit 536 as the protection range of E2E protection, and performs A-PHY transfer.

In step S238, in the image sensor 511, the A-PHY processing unit 521 removes the A-PHY header and the A-PHY footer from the write data, and supplies the protection range of E2E protection to the CCI-FS processing unit 526.

In step S239, in the image sensor 511, the CCI-FS processing unit 526 checks the source ID of the image sensor 511 and the destination SID of the extended packet header ePH from the contents of the extended packet header ePH.

In step S240, in the image sensor 511, the CCI-FS processing unit 526 determines whether or not the source ID of the image sensor 511 checked in step S239 matches the destination SID of the extended packet header ePH.

In a case where it is determined in step S240 that the source ID of the image sensor 511 matches the destination SID of the extended packet header ePH, the process proceeds to step S241.

In step S241, in the image sensor 511, the CCI-FS processing unit 526 checks the message counter from the contents of the extended packet header ePH.

In step S242, in the image sensor 511, the CCI-FS processing unit 526 determines whether or not the message counter (reception) of the image sensor 511 checked in step S241 matches the message counter of the extended packet header ePH.

In a case where it is determined in step S242 that the message counter (reception) of the image sensor 511 matches the message counter of the extended packet header ePH, the process proceeds to step S243.

In step S243, in the image sensor 511, the CCI-FS processing unit 526 checks the CRC from the contents of the extended packet footer ePF.

In step S244, in the image sensor 511, the CCI-FS processing unit 526 determines whether or not the reception value (ePF0) of the extended packet footer ePF checked in step S243 matches the CRC computation result computed in the CCI-FS processing unit 526.

In a case where it is determined in step S244 that the reception value (ePF0) of the extended packet footer ePF matches the CRC computation result, the process is ended.

On the other hand, in a case where it is determined in step S229 in FIG. 38 or step S240 in FIG. 39 that the source ID of the image sensor 511 does not match the destination SID of the extended packet header ePH, the process proceeds to step S245.

In step S245, the error register (routing) on the image sensor 511 side is set to 1, and thereafter, the process is ended.

On the other hand, in a case where it is determined in step S231 in FIG. 38 or step S242 in FIG. 39 that the message counter (reception) of the image sensor 511 does not match the message counter of the extended packet header ePH, the process proceeds to step S246.

In step S246, the error register (MC) on the image sensor 511 side is set to 1, and thereafter, the process is ended.

On the other hand, in a case where it is determined in step S233 in FIG. 38 or step S244 in FIG. 39 that the reception value (ePF0) of the extended packet footer ePF does not match the CRC computation result, the process proceeds to step S247.

In step S247, the error register (CRC) on the image sensor 511 side is set to 1, and thereafter, the processing is ended.

Configuration Example of SerDes Connection Configuration

A communication system 601 illustrated in FIG. 40 has a SerDes connection configuration in which an image sensor 611 and an application processor 614 are connected via a SerDes device 612 on a slave side and a SerDes device 613 on a master side.

The image sensor 611 includes an I2C/I3C slave 621, a CCI processing unit 622, a CSI2-FS processing unit 623, and a register 624.

The SerDes device 612 on the slave side includes an A-PHY processing unit 631, a CSIA processing unit 632, a CSI2-FS processing unit 633, an I2C/I3C master 634, a CCI processing unit 635, a CCI-FS processing unit 636, and a register 637.

The SerDes device 613 on the master side includes an A-PHY processing unit 641, a CSIA processing unit 642, a CSI2-FS processing unit 643, an I2C/I3C slave 644, a CCI processing unit 645, a CCI-FS processing unit 646, and a register 647.

The application processor 614 includes an I2C/I3C master 651, a CCI processing unit 652, a CCI-FS processing unit 653, a register 654, and a CCI-FS switch 655.

Note that, in the SerDes connection configuration as illustrated in FIG. 40, in a case where the CCI configuration or the CCI-FS configuration is implemented as an upper protocol, another SerDes standard may be used. For example, by implementing the configurations of the extended packet header ePH, the extended packet footer ePF1, and the extended packet footer ePF0 as illustrated in FIG. 41 in a payload from an upper layer corresponding to the application layer or a layer below the application layer, it is possible to apply various SerDes-related applications such as PCIE, USB, DisplayPort, HDMI (registered trademark), LVDS, and FPD-LINK.

Transfer of a read command and read data in the communication system 601 will be described with reference to FIGS. 41 to 49.

FIG. 41 illustrates an example of a packet configuration of a read command generated in the CCI-FS processing unit 653 of the application processor 614 at the time of read access.

As illustrated in FIG. 41, the read command includes an extended packet header ePH* (*=n), an extended packet footer ePF1, and an extended packet footer ePF0. Note that details thereof are similar to those of the read command described above with reference to FIG. 28.

In the application processor 614, the read command having such a packet structure is generated in the CCI-FS processing unit 653 and supplied to the I2C/I3C master 651.

FIG. 42 illustrates an example of a packet configuration of a read command output from the I2C/I3C master 651 of the application processor 614 at the time of read access.

As illustrated in FIG. 42, following a start condition S, the I2C/I3C master 651 transmits a sensor address of a connection destination, that is, an address (Slave Address+W 8-bit) of the CCI processing unit 645 of the SerDes device 613 on the master side in the configuration illustrated in FIG. 40. In the example illustrated in FIG. 42, the address of the CCI processing unit 645 is Slave Address [7:1]=7'hOF. Following the address, register addresses (Register Address [15:8] and Register Address [7:0]) of the register 647 of the SerDes device 613 on the master side are transmitted. The I2C/I3C master 651 finally transmits a stop condition P following the extended packet header ePH* (*=n), the extended packet footer ePF1, and the extended packet footer ePF0.

The read command having such a packet structure is transferred from the I2C/I3C master 651 of the application processor 614 according to I2C/I3C. In the SerDes device 613 on the master side, the I2C/I3C slave 644 acquires the read command (the extended packet header ePH* (*=n), the extended packet footer ePF1, and the extended packet footer ePF0). The read command is supplied to the CCI processing unit 645 of Slave Address [7:1]=7'hOF, and then supplied to the A-PHY processing unit 641 via the CCI-FS processing unit 646, the CSI2-FS processing unit 643, and the CSIA processing unit 642.

FIG. 43 illustrates an example of a packet configuration of a read command output from the A-PHY processing unit 641 of the SerDes device 613 on the master side at the time of read access.

As illustrated in FIG. 43, the A-PHY processing unit 641 adds an A-PHY header and an A-PHY footer to the read command acquired by the I2C/I3C slave 644 as the protection range of E2E protection. Note that an address of the CCI processing unit 635 of the SerDes device 613 on the master side, for example, Slave Address [7:1]=7'h0E is added to the extended packet header ePH* (*=n) in the CSI2-FS processing unit 643.

The A-PHY processing unit 641 of the SerDes device 613 on the master side performs A-PHY transfer of the read command having such a packet structure. In the SerDes device 612 on the slave side, the A-PHY processing unit 631 removes the A-PHY header and the A-PHY footer from the read command. The read command is supplied to the CCI processing unit 635 having the slave address "7'h0E" indicated by the destination ID via the CSIA processing unit 632, the CSI2-FS processing unit 633, and the CCI-FS processing unit 636, and then supplied to the I2C/I3C master 634.

FIG. 44 illustrates an example of a packet configuration of a read command output from the I2C/I3C master 634 at the time of read access.

As illustrated in FIG. 44, following the start condition S, the I2C/I3C master 634 transmits a sensor address of the connection destination, that is, the address (Slave Address+W 8-bit) of the CCI processing unit 622 of the image sensor 611 in the configuration illustrated in FIG. 40. In the example illustrated in FIG. 44, an address of the CCI processing unit 622 is Slave Address [7:1]=7'h0D. Following the address, register addresses (Register Address [15:8] and Register Address [7:0]) of the register 624 of the image sensor 611 are transmitted. The I2C/I3C master 634 finally transmits the stop condition P following the extended packet header ePH* (*=n), the extended packet footer ePF1, and the extended packet footer ePF0.

The read command having such a packet structure is transferred according to I2C/I3C from the I2C/I3C master 634 of the SerDes device 612 on the slave side. Then, in the image sensor 611, the I2C/I3C slave 621 acquires the read command (the extended packet header ePH* (*=n), the extended packet footer ePF1, and the extended packet footer ePF0). The read command is supplied to the CSI2-FS processing unit 623 via the CCI processing unit 622 having Slave Address [7:1]=7'h0D.

FIG. 45 illustrates an example of packet structures of a read command supplied to the CSI2-FS processing unit 623 and read data generated in the CSI2-FS processing unit 623 at the time of the read access.

As illustrated in FIG. 45, the read command having the packet structure illustrated in FIG. 41, that is, the read command set in the protection range of E2E protection in the A-PHY transfer is supplied to the CSI2-FS processing unit 623.

As illustrated, the read data includes an extended packet header ePH* (*=n), an AP (CCI) payload, an extended packet footer ePF1, and an extended packet footer ePF0. Then, a read data value read from the address "0x0200" of the register 624 indicated by the source address information (destination address) of the extended packet header ePH of the read command is stored in the AP (CCI) payload.

In the image sensor 611, the read data having such a packet structure is generated in the CCI-FS processing unit 623 and supplied to the I2C/I3C slave 621 via the CCI processing unit 622.

FIG. 46 illustrates an example of a packet configuration of read data output from the I2C/I3C slave 621 of the image sensor 611 at the time of read access.

As illustrated in FIG. 46, following the start condition S, the I2C/I3C slave 621 transmits a sensor address of the connection destination, that is, an address (Slave Address+W 8-bit) of the I2C/I3C master 634 of the SerDes device 612 on the slave side in the configuration illustrated in FIG. 40. In the example illustrated in FIG. 46, the address of the I2C/I3C master 634 is Slave Address [7:1]=7'h0D. Following the address, a storage address of the read data (the address of the register 624 of the image sensor 611) is transmitted, and an address (Slave Address+R 8-bit) of the I2C/I3C master 634 of the SerDes device 612 on the slave side is transmitted. The stop condition P is transmitted last after the I2C/I3C slave 621 transmits the extended packet header ePH* (*=n), the AP (CCI) payload, the extended packet footer ePF1, and the extended packet footer ePF0.

The read command having such a packet structure is transferred from the I2C/I3C slave 621 of the image sensor 611 according to I2C/I3C. In the SerDes device 612 on the slave side, the I2C/I3C master 634 acquires the read data (the extended packet header ePH* (*=n), the AP (CCI) payload, the extended packet footer ePF1, and the extended packet footer ePF0). The read data is supplied to the CCI processing unit 635 having Slave Address [7:1]=7'h0E, and then supplied to the A-PHY processing unit 631 via the CCI-FS processing unit 636, the CSI2-FS processing unit 633, and the CSIA processing unit 632.

FIG. 47 illustrates an example of a packet configuration of read data output from the A-PHY processing unit 631 of the SerDes device 612 on the slave side at the time of read access.

As illustrated in FIG. 47, the A-PHY processing unit 631 adds an A-PHY header and an A-PHY footer to the read data acquired by the I2C/I3C master 634 as the protection range of E2E protection.

The A-PHY processing unit 631 of the SerDes device 612 on the slave side performs A-PHY transfer of the read data having such a packet structure. Then, in the SerDes device 613 on the master side, the A-PHY processing unit 641 removes the A-PHY header and the A-PHY footer from the read data. The read data is supplied to the I2C/I3C slave 644 via the CSIA processing unit 642, the CSI2-FS processing unit 643, the CCI-FS processing unit 646, and the CCI processing unit 635.

FIG. 48 illustrates an example of a packet configuration of read data output from the I2C/I3C slave 644 of the SerDes device 613 on the master side at the time of read access.

As illustrated in FIG. 48, following the start condition S, the I2C/I3C slave 644 transmits a sensor address of the connection destination, that is, an address (Slave Address+W 8-bit) of the CCI processing unit 635 of the SerDes device 613 on the master side in the configuration illustrated in FIG. 40. In the example illustrated in FIG. 48, the address of the CCI processing unit 635 is Slave Address [7:1]=7'h0F. Following the address, register addresses (Register Address [15:8] and Register Address [7:0]) of the register 647 of the SerDes device 613 on the master side are transmitted, and the address (Slave Address+R 8-bit) of the CCI processing unit 635 is transmitted. Subsequently, the I2C/I3C slave 644 transmits the extended packet header ePH* (*=n), the AP (CCI) payload, the extended packet footer ePF1, and the extended packet footer ePF0, and then finally transmits the stop condition P.

The read data having such a packet structure is transferred from the I2C/I3C slave 644 of the SerDes device 613 on the master side according to I2C/I3C. Then, in the application processor 614, the I2C/I3C master 651 acquires the read command (the extended packet header ePH* (*=n), the extended packet footer ePF1, and the extended packet footer ePF0) and supplies the read command to the CCI-FS processing unit 653.

FIG. 49 illustrates an example of a packet structure of read data supplied to the CCI-FS processing unit 653 at the time of read access.

As illustrated in FIG. 49, the read data having the packet structure illustrated in FIG. 45, that is, the read data set in the protection range of E2E protection in the A-PHY transfer is supplied to the CCI-FS processing unit 653.

Processing Example of Communication Processing

Communication processing using CCI-FS performed in the communication system 601 illustrated in FIG. 40 will be described with reference to flowcharts of FIGS. 50 to 57.

As illustrated in FIG. 50, in steps S301 to S317, initial setting and a check operation are performed.

In step S301, a slave address of the opposing image sensor 611 is set in the destination SID register of the CCI-FS processing unit 653 of the application processor 614.

In step S302, the ePH register of the CCI-FS processing unit 653 of the application processor 614 is set.

In step S303, a destination SID for a bridge configuration of the CCI-FS processing unit 653 of the application processor 614 is set, and the SerDes device 613 on the master side is registered. Here, it is assumed that address, attribution, and Timeout_no1 registers are set in a similar manner and are set in a similar manner hereinafter.

In step S304, the ePH register of the CCI-FS processing unit 643 is set from the application processor 614 to the SerDes device 613 on the master side.

In step S305, the application processor 614 sets the destination SID for the bridge configuration of the CCI-FS processing unit 643 for the SerDes device 613 on the master side, and registers the SerDes device 612 on the slave side.

In step S306, read access to the error register of the CCI-FS processing unit 643 is performed from the application processor 614 to the SerDes device 613 on the master side.

In step S307, in the application processor 614, the CCI-FS processing unit 653 determines whether or not a register value of the error register of the CCI-FS processing unit 643 of the SerDes device 613 on the master side is 0 as a result of the read access in step S306.

In a case where it is determined in step S307 that the register value of the error register of the CCI-FS processing unit 643 of the SerDes device 613 on the master side is not 0 (other than 0), the process proceeds to step S308.

In step S308, in the application processor 614, the CCI-FS processing unit 653 determines whether or not the number of times of retransmission is three or more, and in a case where it is determined that the number of times of retransmission is not three or more (one or two), the process returns to step S304, and similar processes are repeatedly performed thereafter.

On the other hand, in a case where it is determined in step S307 that the register value of the error register of the CCI-FS processing unit 643 of the SerDes device 613 on the master side is 0, the process proceeds to step S309.

In step S309, the ePH register of the CCI-FS processing unit 636 is set from the application processor 614 to the SerDes device 612 on the slave side.

In step S310, the application processor 614 sets the destination SID for the bridge configuration of the CCI-FS processing unit 636 for the SerDes device 612 on the slave side, and registers the SerDes device 612 on the slave side.

In step S311, read access to the error register of the CCI-FS processing unit 636 is performed from the application processor 614 to the SerDes device 612 on the slave side.

In step S312, in the application processor 614, the CCI-FS processing unit 653 determines whether or not a register value of the error register of the CCI-FS processing unit 636 of the SerDes device 612 on the slave side is 0 as a result of the read access in step S311.

In a case where it is determined in step S312 that the register value of the error register of the CCI-FS processing unit 636 of the SerDes device 612 on the slave side is not 0 (other than 0), the process proceeds to step S313.

In step S313, in the application processor 614, the CCI-FS processing unit 653 determines whether or not the number of times of retransmission is three or more, and in a case where it is determined that the number of times of retransmission is not three or more (one or two), the process returns to step S309, and similar processes are repeatedly performed thereafter.

On the other hand, in a case where it is determined in step S312 that the register value of the error register of the CCI-FS processing unit 636 of the SerDes device 612 on the slave side is 0, the process proceeds to step S314.

In step S314, the ePH register of the CCI-FS processing unit 623 is set from the application processor 614 to the image sensor 611.

In step S315, read access to the error register of the CCI-FS processing unit 623 is performed from the application processor 614 to the image sensor 611.

In step S316, in the application processor 614, the CCI-FS processing unit 653 determines whether or not a register value of the error register of the CCI-FS processing unit 623 of the image sensor 611 is 0 as a result of the read access in step S315.

In a case where it is determined in step S316 that the register value of the error register of the CCI-FS processing unit 623 of the image sensor 611 is not 0 (other than 0), the process proceeds to step S317.

In step S317, in the application processor 614, the CCI-FS processing unit 653 determines whether or not the number of times of retransmission is three or more, and in a case where it is determined that the number of times of retransmission is not three or more (one or two), the process returns to step S314, and similar processes are repeatedly performed thereafter.

Here, in a case where it is determined in step S308, step S313, or step S317 that the number of times of retransmission is three or more, the process returns to step S301, and similar processes are repeatedly performed thereafter.

On the other hand, in a case where it is determined in step S316 that the register value of the error register of the CCI-FS processing unit 623 of the image sensor 611 is 0, the process proceeds to step S318.

As illustrated in FIG. 51, in steps S318 to S327, a write operation using CCI-FS is performed.

In step S318, the CCI-FS processing unit 653 of the application processor 614 sets the ePH register such that the write operation is performed.

In step S319, the CCI-FS processing unit 653 of the application processor 614 sets the write data register.

In step S320, the CCI-FS processing unit 653 of the application processor 614 sets the command execution register to 1 and issues a write command.

In step S321, the application processor 614 performs Sequence A_Write (in a case of AP) processing that will be described later with reference to FIG. 53.

In step S322, the SerDes device 613 on the master side performs Sequence B (in a case of SerDes (master)) processing that will be described later with reference to FIG. 56. Note that, in FIG. 56, the Sequence B (in a case of SerDes (slave)) processing executed by the SerDes device 612 on the slave side will be described, but similar processes may also be executed by each corresponding block in the SerDes device 613 on the master side.

In step S323, the A-PHY processing unit 641 performs A-PHY transfer by adding the A-PHY header and the A-PHY footer via the CSI2-FS processing unit 643 and the CSIA processing unit 642 from the extended DT of the extended packet header ePH of the SerDes device 613 on the master side.

In step S324, the SerDes device 612 on the slave side performs Sequence B (in a case of SerDes (slave)) processing that will be described later with reference to FIG. 56.

In step S325, the SerDes device 612 on the slave side performs Sequence A_Write (in a case of SerDes (slave)) processing that will be described later with reference to FIG. 53. Note that, the Sequence A_Write (in a case of AP) processing executed by the application processor 614 will be described in FIG. 53, but similar processes may also be executed by each corresponding block in the SerDes device 612 on the slave side.

In step S326, the image sensor 611 performs Sequence B (in a case of image sensor) processing that will be described later with reference to FIG. 56. Note that, in FIG. 56, the Sequence B (in a case of SerDes (slave)) processing executed by the SerDes device 612 on the slave side will be described, but similar processes may also be executed by each corresponding block in the image sensor 611.

In step S327, in the image sensor 611, the CCI-FS processing unit 623 performs a write process of writing write data into an address of the register 624 from the contents of the extended packet header ePH and the extended packet footer ePF. Thereafter, the process proceeds to step S328.

As illustrated in FIG. 52, in steps S328 to S344, a read operation using CCI-FS is performed.

In step S328, the CCI-FS processing unit 653 of the application processor 614 sets the ePH register such that the read operation is performed.

In step S329, the CCI-FS processing unit 653 of the application processor 614 sets a read data register.

In step S330, the CCI-FS processing unit 653 of the application processor 614 sets the command execution register to 1 and issues a read command.

In step S331, the application processor 614 performs Sequence A_Read_CMD (in a case of AP) processing that will be described later with reference to FIG. 54. Here, in the Sequence A_Read_CMD (in a case of AP) processing, two branched processes are performed in parallel, the process proceeds to step S332 according to a branch A, and the process proceeds to step S339 according to a branch B.

In step S332, the SerDes device 613 on the master side performs Sequence B (in a case of SerDes (master)) processing that will be described later with reference to FIG. 56. Note that, in FIG. 56, the Sequence B (in a case of SerDes (slave)) processing executed by the SerDes device 612 on the slave side will be described, but similar processes may also be executed by each corresponding block in the SerDes device 613 on the master side.

In step S333, the A-PHY processing unit 641 performs A-PHY transfer by adding the A-PHY header and the A-PHY footer from the extended DT of the extended packet header ePH of the SerDes device 613 on the master side via the CSI2-FS processing unit 643 and the CSIA processing unit 642.

In step S334, the SerDes device 612 on the slave side performs Sequence B (in a case of SerDes (slave)) processing that will be described later with reference to FIG. 56.

In step S355, the SerDes device 612 on the slave side performs Sequence A_Read_CMD (in a case of SerDes (slave)) processing that will be described later with reference to FIG. 54. Note that, in FIG. 54, the Sequence A_Read_CMD (in a case of AP) processing executed in the application processor 614 will be described, but similar processes may also be executed by each corresponding block in the SerDes device 612 on the slave side. Here, in the Sequence A_Read_CMD (in a case of SerDes (slave)) processing, the process does not proceed to the branch A of the two branched processes, and the process proceeds to step S336 according to the branch B.

In step S336, the SerDes device 612 on the slave side performs Sequence A_Read_Data (in a case of SerDes (slave)) processing that will be described later with reference to FIG. 57. Note that, in FIG. 57, the Sequence A_Read_Data (in a case of AP) processing executed in the application processor 614 will be described, but similar processes may also be executed by each corresponding block in the SerDes device 612 on the slave side.

In step S337, the A-PHY processing unit 631 performs A-PHY transfer by adding the A-PHY header and the A-PHY footer from the extended DT of the extended packet header ePH of the SerDes device 612 on the slave side via the CSI2-FS processing unit 633 and the CSIA processing unit 632.

In step S338, the SerDes device 613 on the master side performs Sequence B (in a case of SerDes (master)) processing that will be described later with reference to FIG. 56. Note that, in FIG. 56, the Sequence B (in a case of SerDes (slave)) processing executed in the SerDes device 612 on the slave side will be described, but similar processes may also be executed by each corresponding block in the SerDes device 613 on the master side.

In step S339, the application processor 614 performs Sequence A_Read_Data (in a case of AP) processing that will be described later with reference to FIG. 57.

In step S340, the application processor 614 performs Sequence B (AP) processing that will be described later with reference to FIG. 56. Note that, in FIG. 56, the Sequence B (in a case of SerDes (slave)) processing executed in the SerDes device 612 on the slave side will be described, but, similar processes may also be executed by each corresponding block in the application processor 614.

In step S341, in the application processor 614, the CCI-FS processing unit 653 stores the read data in an address of the register 654 from the contents of the extended packet header ePH and the extended packet footer ePF.

In step S342, in the above-described read process, the image sensor 611, the SerDes device 612 on the slave side, the SerDes device 613 on the master side, and the application processor 614 check the error registers.

In step S343, the image sensor 611 and each device (the SerDes device 612 on the slave side, the SerDes device 613 on the master side, and the application processor 614) determine whether or not a register value of the error register of each CCI-FS processing unit is 0.

In a case where it is determined in step S343 that the register values of all the CCI-FS processing units are not 0 (there is a register value other than 0 in any of the register values), the process proceeds to step S344.

In step S344, an error-related register value of the CCI-FS processing unit of which the register value is not 0 is checked, the error register is cleared by one write, and a retransmission process is performed.

On the other hand, in a case where it is determined in step S343 that the register values of all the CCI-FS processing units are 0, or after the process in step S344, the processing is ended.

FIG. 53 is a flowchart for describing the Sequence A_Write (in a case of AP) processing performed in step S321 in FIG. 51. Note that, in FIG. 53, processing performed by the application processor 614 will be described as an example, but the Sequence A_Write (in a case of SerDes (slave)) processing in step S325 in FIG. 51 is similarly performed.

In step S351, in the application processor 614, the I2C/I3C master 651 issues a start command and a slave address (Slave Address+W 8-bit illustrated in FIG. 42).

In step S352, the application processor 614 determines whether or not the I2C/I3C master 651 has received an ACK response from the I2C/I3C slave 644 of the SerDes device 613 on the master side. In a case where it is determined in step S352 that the ACK response from the I2C/I3C slave 644 of the SerDes device 613 on the master side has been received, the process proceeds to step S353.

In step S353, in the application processor 614, the I2C/I3C master 651 issues a register address (Register Address [15:8] illustrated in FIG. 42). Here, every time the process in step S353 are repeatedly performed, as illustrated in FIG. 42, a payload after this register address is transmitted.

In step S354, the application processor 614 determines whether or not the I2C/I3C master 651 has received an ACK response from the I2C/I3C slave 644 of the SerDes device 613 on the master side. In a case where it is determined in step S354 that the ACK response from the I2C/I3C slave 644 of the SerDes device 613 on the master side has been received, the process proceeds to step S355.

In step S355, in the application processor 614, the I2C/I3C master 651 determines whether or not the transfer of the final data has been completed. In a case where it is determined in step S355 that the transfer of the final data has not been completed, the process returns to step S353, and similar processes are repeatedly performed thereafter.

On the other hand, in a case where it is determined in step S355 that the transfer of the final data has been completed, the process proceeds to step S356. In step S356, in the application processor 614, the I2C/I3C master 651 issues a stop command. As a result, the Sequence A_Write (at AP) processing is ended, and the process returns to step S322 in FIG. 51.

On the other hand, in a case where it is determined in step S352 or S354 that the ACK response from the I2C/I3C slave 644 of the SerDes device 613 on the master side has not been received, the process proceeds to step S357. In step S357, in the application processor 614, the I2C/I3C master 651 issues a stop command. In this case, the Sequence A_Write (in a case of AP) processing is ended, and the communication processing is also ended.

FIG. 54 is a flowchart for describing the Sequence A_Read_CMD (in a case of AP) processing performed in step S331 in FIG. 52. Note that, in FIG. 54, processing performed by the application processor 614 will be described as an example, but the Sequence A_Read_CMD (in a case of SerDes (slave)) processing in step S335 in FIG. 52 is similarly performed.

In step S361, in the application processor 614, the I2C/I3C master 651 issues a start command and a slave address (Slave Address+W 8-bit illustrated in FIG. 42) and starts a timer.

In step S362, the application processor 614 determines whether or not the I2C/I3C master 651 has received an ACK response from the I2C/I3C slave 644 of the SerDes device 613 on the master side. In a case where it is determined in step S362 that the ACK response from the I2C/I3C slave 644 of the SerDes device 613 on the master side has been received, the process proceeds to step S363.

In step S363, in the application processor 614, the I2C/I3C master 651 issues a register address (Register Address [15:8] illustrated in FIG. 42). Here, every time the process in step S363 are repeatedly performed, as illustrated in FIG. 42, a payload after this register address is transmitted.

In step S364, the application processor 614 determines whether or not the I2C/I3C master 651 has received an ACK response from the I2C/I3C slave 644 of the SerDes device 613 on the master side.

In a case where it is determined in step S364 that the ACK response from the I2C/I3C slave 644 of the SerDes device 613 on the master side has been received, the process proceeds to step S365.

In step S365, in the application processor 614, the I2C/I3C master 651 determines whether or not the transfer of the final data has been completed.

In a case where it is determined in step S365 that the transfer of the final data has been completed, the process proceeds to step S366.

In step S366, in the application processor 614, the I2C/I3C master 651 issues a stop command. Thereafter, the process branches into two, and the process proceeds to step S332 in FIG. 52 according to the branch A. On the other hand, the Sequence C (in a case of AP) processing (refer to FIG. 55 that will be described later) is performed in step S367 according to the branch B, and then the process proceeds to step S339 in FIG. 52.

On the other hand, in a case where it is determined in step S365 that the transfer of the final data has not been completed, the process proceeds to step S368.

In step S368, in the application processor 614, the I2C/I3C master 651 determines whether or not the timer started in step S361 has timed out. In a case where it is determined in step S368 that the timer has not timed out, the process returns to step S363, and similar processes are repeatedly performed thereafter.

On the other hand, in a case where it is determined in step S368 that the timer has timed out, the process proceeds to step S369.

In step S369, the application processor 614 sets 1 in the error register (Timeout), and stores the data of the extended packet header ePH and the extended packet footer ePF in an error-related register.

After the process in step S369, or in a case where it is determined in step S362 or S364 that the ACK response from the I2C/I3C slave 644 of the SerDes device 613 on the master side has not been received, the process proceeds to step S370.

In step S370, in the application processor 614, the I2C/I3C master 651 issues a stop command. In this case, the Sequence A_Read_CMD (in a case of AP) processing is ended, and the communication processing is also ended.

FIG. 55 is a flowchart illustrating the Sequence C (in a case of AP) processing performed in step S367 in FIG. 54. Note that, in FIG. 55, processing performed by the application processor 614 will be described as an example, but similar processes may also be performed in the SerDes device 612 on the slave side.

In step S381, in the application processor 614, the I2C/ I3C master 651 determines whether or not the timer started in step S361 in FIG. 54 has timed out, and the process waits until it is determined that the timer has timed out. When it is determined in step S381 that the timer has timed out, the process proceeds to step S382, and in the application processor 614, the I2C/I3C master 651 performs a polling operation.

In step S383, in the application processor 614, the I2C/ I3C master 651 determines whether or not a status register value of the read command is 1.

In a case where it is determined in step S383 that the status register value of the read command is 1, the process proceeds to step S384. In step S384, after the application processor 614 performs the read access, the process returns to step S339 in FIG. 52.

On the other hand, in a case where it is determined in step S383 that the status register value of the read command is not 1 (other than 1), the process proceeds to step S385. In step S385, the application processor 614 sets 1 in the error register (Timeout), and stores the data of the extended packet header ePH and the extended packet footer ePF in the error-related register.

In step S386, in the application processor 614, the I2C/ I3C master 651 issues a stop command. In this case, the Sequence C (at the time of AP) processing is ended, and the communication processing is also ended.

FIG. 56 is a flowchart for describing the Sequence B (in a case of SerDes (slave)) processing performed in steps S324 and S334 in FIG. 51. Note that processing performed by the SerDes device 612 on the slave side will be described as an example in FIG. 56, but the Sequence B (in a case of SerDes (master)) processing in step S322 in FIG. 51, the Sequence B (in case of image sensor) processing in step S326 in FIG. 51, and the Sequence B (in a case of SerDes (master)) processing in step S332 in FIG. 52 are also performed in a similar manner.

In step S391, in the SerDes device 612 on the slave side, the CCI-FS processing unit 636 checks the source ID of the SerDes device 612 on the slave side and the destination SID of the extended packet header ePH.

In step S392, in the SerDes device 612 on the slave side, the CCI-FS processing unit 636 determines whether or not the source ID of the SerDes device 612 on the slave side does not match the destination SID of the extended packet header ePH.

In step S392, in a case where it is determined that the source ID of the SerDes device 612 on the slave side does not match the destination SID of the extended packet header ePH, the process proceeds to step S393.

In step S393, in the SerDes device 612 on the slave side, the CCI-FS processing unit 636 checks the destination SID of the SerDes device 612 on the slave side and the destination SID of the extended packet header ePH.

In step S394, in the SerDes device 612 on the slave side, the CCI-FS processing unit 636 determines whether or not the source ID of the SerDes device 612 on the slave side matches the destination SID of the extended packet header ePH.

In step S394, in a case where it is determined that the source ID of the SerDes device 612 on the slave side matches the destination SID of the extended packet header ePH, the process proceeds to step S395.

In step S395, in the SerDes device 612 on the slave side, the CCI-FS processing unit 636 checks the message counter from the contents of the extended packet header ePH.

In step S396, in the SerDes device 612 on the slave side, the CCI-FS processing unit 636 determines whether or not the message counter in the SerDes device 612 on the slave side matches a reception value of the message counter checked from the contents of the extended packet header ePH.

In a case where it is determined in step S396 that the message counter in the SerDes device 612 on the slave side matches the reception value of the message counter checked from the contents of the extended packet header ePH, the process proceeds to step S397.

In step S397, in the SerDes device 612 on the slave side, the CCI-FS processing unit 636 checks the CRC computation result computed from the extended packet header ePH by the SerDes device 612 on the slave side and the reception value (ePF0) of the extended packet footer ePF.

In step S398, it is determined whether or not the reception value (ePF0) of the extended packet footer ePF matches the CRC computation result, and in a case where it is determined that the reception value (ePF0) matches the CRC computation result, the process returns to step S325 in FIG. 51.

On the other hand, in step S392, in a case where it is determined that the source ID of the SerDes device 612 on the slave side does not mismatch (matches) the destination SID of the extended packet header ePH, the process proceeds to step S399.

In steps S399 to S402, processes similar to those in steps S395 to S398 are performed.

In a case where it is determined in step S402 that the reception value (ePF0) of the extended packet footer ePF matches the CRC computation result, the process proceeds to step S403. In step S403, write access to the register 637 of the SerDes device 612 on the slave side is performed.

In step S394, in a case where it is determined that the source ID of the SerDes device 612 on the slave side does not match the destination SID of the extended packet header ePH, the process proceeds to step S404. In step S404, in the SerDes device 612 on the slave side, the CCI-FS processing unit 636 sets 1 in the error register [2] (routing), and stores the data of the extended packet header ePH and the extended packet footer ePF in the error-related register.

In a case where it is determined in step S398 or S402 that the reception value (ePF0) of the extended packet footer ePF does not match the CRC computation result, the process proceeds to step S405. In step S405, in the SerDes device 612 on the slave side, the CCI-FS processing unit 636 sets 1 in the error register (CRC), and stores the data of the extended packet header ePH and the extended packet footer ePF in the error-related register.

In a case where it is determined in step S396 or S400 that the message counter in the SerDes device 612 on the slave side does not match the reception value of the message counter checked from the contents of the extended packet header ePH, the process proceeds to step S406. In step S406, in the SerDes device 612 on the slave side, the CCI-FS processing unit 636 sets 1 in the error register (MC), and stores the data of the extended packet header ePH and the extended packet footer ePF in the error-related register.

After the processes in steps S403 to S406, the Sequence B (in a case of SerDes (slave)) processing is ended, and the communication processing is also ended.

Note that a combination of the CRC computation being allowed to be performed only for E2E protection, an error being detected in each device, and a packet being discarded or not discarded is assumed.

FIG. 57 is a flowchart illustrating the Sequence A_Read_Data (at the time of AP) processing performed in step S339 in FIG. 52. Note that, in FIG. 57, processing performed by the application processor 614 will be described as an example, but the Sequence A_Read_Data (in a case of SerDes (slave)) processing in step S336 in FIG. 52 is similarly performed.

In step S411, in the application processor 614, the I2C/I3C master 651 issues a start command and a slave address (Slave Address+W 8-bit illustrated in FIG. 48).

In step S412, the application processor 614 determines whether or not the I2C/I3C master 651 has received an ACK response from the I2C/I3C slave 644 of the SerDes device 613 on the master side. In a case where it is determined in step S412 that the ACK response from the I2C/I3C slave 644 of the SerDes device 613 on the master side has been received, the process proceeds to step S413.

In step S413, in the application processor 614, the I2C/I3C master 651 issues a start command and a slave address (Slave Address+R 8-bit illustrated in FIG. 48) and starts a timer.

In step S414, the application processor 614 determines whether or not the I2C/I3C master 651 has received an ACK response from the I2C/I3C slave 644 of the SerDes device 613 on the master side. In a case where it is determined in step S414 that the ACK response from the I2C/I3C slave 644 of the SerDes device 613 on the master side has been received, the process proceeds to step S415.

In step S415, in the application processor 614, the I2C/I3C master 651 acquires read data from the opposing I2C/I3C slave 644 on the application processor 614 side.

In step S416, it is determined whether or not the I2C/I3C master 651 of the application processor 614 has transmitted ACK and the opposing I2C/I3C slave 644 on the application processor 614 side has received the ACK.

In a case where it is determined in step S416 that the I2C/I3C master 651 of the application processor 614 has transmitted the ACK and the opposing I2C/I3C slave 644 on the application processor 614 side has received the ACK, the process proceeds to step S417.

In step S417, it is determined whether or not the I2C/I3C master 651 of the application processor 614 has transmitted NACK along with completion of the transfer of the final data.

In a case where it is determined in step S417 that NACK has been transmitted, the process proceeds to step S418. In step S418, in the application processor 614, the I2C/I3C master 651 issues a stop command. Consequently, the Sequence A_Read_Data (in a case of AP) processing is ended, and the process returns to step S340 in FIG. 52.

On the other hand, in a case where it is determined in step S417 that NACK has not been transmitted, the process proceeds to step S419.

In step S419, in the application processor 614, the I2C/I3C master 651 determines whether or not the timer started in step S413 has timed out. In a case where it is determined in step S419 that the timer has not timed out, the process returns to step S415, and similar processes are repeatedly performed thereafter.

On the other hand, in a case where it is determined in step S419 that the timer has timed out, the process proceeds to step S420.

In step S420, the application processor 614 sets 1 in the error register (Timeout), and stores the data of the extended packet header ePH and the extended packet footer ePF in the error-related register.

After the process in step S420 or in a case where it is determined in step S414 that the ACK response from the I2C/I3C slave 644 of the SerDes device 613 on the master side has not been received, the process proceeds to step S421. Similarly, in a case where it is determined in step S416 that the I2C/I3C master 651 of the application processor 614 has not transmitted ACK or the opposing I2C/I3C slave 644 on the application processor 614 side has not received the ACK, the process proceeds to step S421.

In step S421, in the application processor 614, the I2C/I3C master 651 issues a stop command. In this case, the Sequence A_Read_Data (in a case of AP) processing is ended, and the communication processing is also ended.

Here, there are three combinations described below as an access timing from the I2C/I3C master 634 to the I2C/I3C slave 621 when the I2C/I3C slave 621 performs output (refer to FIG. 46) and an access timing from the I2C/I3C master 651 to the I2C/I3C slave 644 when the I2C/I3C slave 644 of the SerDes device 613 on the master side performs output (refer to FIG. 48).

At a first access timing, polling is performed until read data is acquired, and the I2C/I3C master starts a read process after preparation for reading the read data is completed.

At a second access timing, the I2C/I3C master starts the read process after a lapse of a certain period of time.

At a third access timing, there are a mode in which the I2C/I3C master starts the read process after a lapse of a certain period of time using a clock stretch method (refer to FIG. 72 that will be described later), and at that time, the read data is transmitted in a lump, and a mode in which the read data is transmitted in a scattered manner (a clock stretch mode signal is asserted).

Configuration Example of Extended Packet Header ePH

FIGS. 58 to 60 are diagrams illustrating configuration examples of the extended packet header ePH.

FIG. 58 illustrates a detailed configuration example of the extended packet header ePH0, the extended packet header ePH1, and the extended packet header ePH2. The addition of the extended packet header ePH as illustrated is defined by using the ePH structures of the C-PHY and the D-PHY for the contents of the extended packet header ePH for CCI-FS.

FIG. 59 illustrates a detailed configuration example of the extended packet header ePH3. In the addition of the extended packet header ePH as illustrated, the contents of the extended packet header ePH are defined for CCI-FS.

FIG. 60 illustrates a detailed configuration example of the extended DT of the extended packet header ePH. For example, in order to support CCI-FS, "0xC0: For I2C" and "0xC1: For I3C" are added to the data type of the extended packet header ePH.

Example of Circuit Configuration of I2C

FIG. 61 illustrates a configuration example of conventional I2C hardware. For example, a configuration example of an I2C in a case of a host bus connection configuration is illustrated in hardware implementation, and a slave side may be configured to be able to receive AKC/NACK from a host. Of course, an example is shown, and host bus configurations do not necessarily match.

FIG. 62 illustrates waveforms at the time of data transfer on an I2C bus. Note that the I2C bus standard and CCI (I2C) are equivalent.

Configuration Example Related to CCI in Communication System 701

FIG. 63 is a block diagram illustrating a CCI-related configuration example in a communication system 701 having an A-PHY direct connection configuration, similarly to the communication system 501 illustrated in FIG. 27 described above.

As illustrated in FIG. 63, in the communication system 701, an image sensor 711 and an application processor 712 are directly connected via the A-PHY.

The image sensor 711 includes an A-PHY processing unit 721, a CSIA processing unit 722, a CSI2 processing unit 523, a CSI2-FS processing unit 724, a CCI processing unit 725, a CCI-FS processing unit 726, a register 727, and selectors 728-1 and 728-2. As illustrated, the selectors 728-1 and 728-2 are disposed to sandwich the CCI-FS processing unit 726, and can switch enabling and disabling of the CCI-FS processing unit 726 according to a CCI_FS_Enable signal of the register 727.

The application processor 712 includes an A-PHY processing unit 731, a CSIA processing unit 732, a CSI2 processing unit 733, a CSI2-FS processing unit 734, a CCI processing unit 735, a CCI-FS processing unit 736, a register 737, and selectors 738-1 and 738-2. As illustrated, the selectors 738-1 and 738-2 are disposed to sandwich the CCI-FS processing unit 736, and can switch enabling and disabling of the CCI-FS processing unit 736 according to the CCI_FS_Enable signal of the register 737.

For example, in a case where the CCI_FS_Enable signal indicates that CCI-FS is enabled (CCI_FS_Enable=1), data is transmitted and received via the CCI-FS processing unit 726 and the CCI-FS processing unit 736 as indicated by a dot chain line arrow. On the other hand, in a case where the CCI_FS_Enable signal indicates that the CCI-FS (CCI_FS_Enable=0) is disabled, data is transmitted and received without using the CCI-FS processing unit 726 and the CCI-FS processing unit 736 as indicated by a two-dot chain line arrow.

<Network Connection Form>

FIG. 64 illustrates an example of a network connection form (topology) of an A-PHY direct connection configuration and a SerDes connection configuration.

An application processor 801 is directly connected to an image sensor 802 via the A-PHY, and the image sensor 802 may have a connection form of being connected to a sensor 803 via I2C/I3C.

The application processor 801 is connected to a SerDes device 804 on the master side via the I2C/I3C, and the SerDes device 804 on the master side and a SerDes device 805 on the slave side are connected via the A-PHY. The SerDes device 805 on the slave side may have a connection form of being connected to the two sensors 806-1 and 806-2 via I2C/I3C.

<Circuit Configuration of CCI-FS Processing Unit>

FIG. 65 is a block diagram illustrating an example of a circuit configuration of a CCI-FS processing unit. A CCI-FS processing unit 901 and a register 902 illustrated in FIG. 65 have a configuration common to the CCI-FS processing unit and the register included in each device described above.

As illustrated in FIG. 65, in the CCI-FS processing unit 901, a CCI-FS switch, a register, or the like are provided in an upper layer, and a CCI processing unit is provided in a lower layer. The CCI-FS processing unit 901 includes a CCI-FS transmission unit 911 and a CCI-FS reception unit 912. Various types of register setting value information is supplied from the register 902 to the CCI-FS processing unit 901, and an error notification is supplied from the CCI-FS processing unit 901 to the register 902.

The CCI-FS transmission unit 911 includes an extended packet header ePH generation unit 921, an extended packet footer ePF generation unit 922, and a destination address check unit 923.

The extended packet header ePH generation unit 921 includes an MC generation unit 941 that generates a message counter and a packet length computation unit 942 that computes a packet length. The extended packet footer ePF generation unit 922 includes an extended packet footer ePF1 generation unit 943 that generates the extended packet footer ePF1 and a CRC computation unit 944 that computes CRC to be stored in the extended packet footer ePF0.

The CCI-FS reception unit 912 includes an extended packet header ePH check unit 931, an extended packet footer ePF check unit 932, and a destination address check unit 933.

The extended packet header ePH check unit 931 includes an MC check unit 951 that checks a message counter and a packet length computation/check unit 952 that computes and checks a packet length. The extended packet footer ePF check unit 932 includes an extended packet footer ePF1 check unit 953 that checks the extended packet footer ePF1 and a CRC computation unit 954 that computes CRC to be stored in the extended packet footer ePF0.

The CCI-FS processing unit 901 may check a destination address of data from the upper layer by using the CCI-FS transmission unit 911, generate the extended packet header ePH and the extended packet footer ePF, add the extended packet header ePH and the extended packet footer ePF to the data, and supply the data to the lower layer. The CCI-FS processing unit 901 may check a destination address of data from the lower layer by using the CCI-FS reception unit 912, check the extended packet header ePH and the extended packet footer ePF, and supply the extended packet header ePH and the extended packet footer ePF to the upper layer.

Here, an operation of the CCI-FS processing unit of each device configuring the communication system 601 of the configuration example of the SerDes connection configuration illustrated in FIG. 40 will be described.

The application processor 614 has a source ID indicating an own device in the extended packet header ePH in the application processor 614. Then, the CCI-FS processing unit 653 adds the above information and information having a destination ID indicating a device to be accessed.

The SerDes device 612 on the slave side and the SerDes device 613 on the master side have source IDs indicating own devices by being preset or as unique values. The CCI-FS processing unit 636 and the CCI-FS processing unit 646 perform presetting of the above information and information having destination IDs indicating a connected device and a target device.

Further, the CCI-FS processing unit 636 and the CCI-FS processing unit 646 compare the destination ID of the received extended packet header ePH with the own IDs (source IDs), and determine whether to access the CCI-FS processing unit or to indicate a target device (destination ID). For example, when the destination ID of the received extended packet header ePH matches the own ID (source ID), own register access is performed as access to an intermediate device (SerDes device). On the other hand, when the destination ID of the received extended packet header ePH does not match the own ID (source ID), data transfer is performed toward the connected device (destination ID) as access to a subsequent device.

As described above, the data is transferred on the basis of a source ID and a destination ID embedded in the extended packet header ePH, a source ID preset or as a unique value in an intermediate device (SerDes device) or a target device, and preset connection destination information, and access is performed toward the target device.

When the destination ID of the received extended packet header ePH matches the own ID (source ID), the CSI2-FS processing unit 623 of the image sensor 611 performs own register access as access to the image sensor 611.

As described above, as a source ID of each device, a value unique to each device, a preset value, or a combination thereof may be used.

FIGS. 66 to 68 are diagrams illustrating detailed configuration examples of the register 902.

FIG. 66 illustrates details of addresses 0x000 to 0x109 of the register 902. FIG. 67 illustrates a configuration example in a case of the bridge configuration as details of addresses 0x110 to 0x125 of the register 902.

FIG. 68 illustrates error-related registers as details of the address 0x200 of the register 902. FIG. 68 illustrates error-related registers (debug) as details of the address 0x300 and the address 0x400 of the register 902. FIG. 68 illustrates error injection-related registers (debug) as details of the address 0x800 of the register 902.

Modification Examples of Extended Packet Header ePH

Modification examples of the extended packet header ePH will be described with reference to FIGS. 69 and 70.

FIG. 69 illustrates a modification example of the extended packet header ePH in the packet configuration of the write data generated by the CCI-FS processing unit 536 of the application processor 512 at the time of write access as described above with reference to FIG. 33. The extended packet header ePH illustrated in FIG. 69 is different from the above-described configuration example illustrated in FIG. 33 in terms of configurations of the extended packet header ePH3 and the extended packet header ePH4.

FIG. 70 illustrates a modification example of the extended packet header ePH in the packet configuration of the write data generated in the CCI-FS processing unit 536 of the application processor 512 at the time of read access as described above with reference to FIG. 28. The extended packet header ePH illustrated in FIG. 70 is different from the above-described configuration example illustrated in FIG. 28 in terms of configurations of the extended packet header ePH3 and the extended packet header ePH4.

For example, in the extended packet header ePH illustrated in FIGS. 69 and 70, the following combination is assumed depending on implementation.

Read address information may be stored in the extended packet header ePH or may be stored in the AP (CCI) payload. Length information may be stored in the extended packet header ePH or may be stored in the AP (CCI) payload. CMD information may be stored in the CCI command ID of the extended packet header ePH. Start, resume, and end information of a command are referred to on the basis of the CCI command ID. CCI header length may be used to store CCI information (for example, a slave address) in the AP (CCI) payload. The CCI header length is information indicating a header length of the CCI protocol (I2C).

FIG. 71 is a diagram illustrating a flow between the image sensor 511 and the application processor 512 in the A-PHY direct connection configuration as illustrated in FIG. 27.

In the application processor 512, the CCI-FS switch 538 issues a read command and a write command. The CCI-FS switch 538 supplies the slave address (Slave Address+W 8-bit), the register addresses (Register Address [15:8], Register Address [7:0]), and the data (Data* (*=N) [7:0]) to the CCI processing unit 535. The CCI processing unit 535 converts the addresses and the data into an AP (CCI) payload and supplies the AP (CCI) payload to the A-PHY processing unit 531. The A-PHY processing unit 531 adds an A-PHY header and an A-PHY footer to the AP (CCI) payload and performs A-PHY transfer to the image sensor 511.

In the image sensor 511, the A-PHY processing unit 521 removes the A-PHY header and the A-PHY footer and supplies the AP (CCI) payload to the CCI processing unit 525. The CCI processing unit 525 converts the AP (CCI) payload, writes data into the register 527 according to a write command on the basis of the contents, and reads data from the register 527 according to a read command.

In this case, initial setting of CCI-FS Enable is performed by the CCI processing unit 525, and bus conversion of a register interface, an AHB bus, or the like is performed. Then, checking of the CCI-FS Enable setting is performed via the CCI processing unit 525 or the CCI-FS processing unit 526.

The CCI processing unit 525 converts read data (Data* (*=M) [7:0]) read from the register 527 in response to the read command into an AP (CCI) payload and supplies the AP (CCI) payload to the A-PHY processing unit 521. The A-PHY processing unit 521 adds an A-PHY header and an A-PHY footer to the AP (CCI) payload and performs A-PHY transfer to the application processor 512.

In the application processor 512, the A-PHY processing unit 531 removes the A-PHY header and the A-PHY footer and supplies the AP (CCI) payload to the CCI processing unit 535. The CCI processing unit 535 converts the AP (CCI) payload and supplies the read data (Data*=M) [7:0]) to the CCI-FS switch 538.

The CCI-FS switch 538 performs CCI-FS Enable setting and various register settings related to CCI-FS on the register 537. In this case, register access depends on implementation. The CCI-FS switch 538 performs various register settings related to CCI-FS on the register 527 via the register 537, the CCI-FS processing unit 536, the A-PHY processing unit 531, the A-PHY processing unit 521, and the CCI-FS processing unit 526.

In the application processor 512, the CCI-FS switch 538 issues a read command. The CCI-FS switch 538 supplies the slave address (Slave Address+W 8-bit), the register addresses (Register Address [15:8] and Register Address [7:0]), and the data (Data* (*=N) [7:0]) to the register 537. The CCI-FS processing unit 536 converts the addresses and the data into an AP (CCI) payload, adds the extended packet header ePH* (*=n), the extended packet footer ePF1, and the extended packet footer ePF0, and supplies the AP (CCI) payload to the A-PHY processing unit 531. The A-PHY processing unit 531 adds an A-PHY header and an A-PHY footer to the AP (CCI) payload, and performs A-PHY transfer to the image sensor 511.

In the image sensor 511, the A-PHY processing unit 521 removes the A-PHY header and the A-PHY footer, and supplies the extended packet header ePH* (*=n), the AP (CCI) payload, the extended packet footer ePF1, and the extended packet footer ePF0 to the CCI-FS processing unit 526. The CCI-FS processing unit 526 converts an AP (CCI)

payload and reads data from the register 527 according to the read command on the basis of the contents of the AP (CCI) payload. In this case, register access depends on implementation, and bus conversion of a register interface, an AHB bus, a CCI interface, or the like is performed.

The CCI-FS processing unit 526 converts the read data (Data* (*=M) [7:0]) read from the register 527 into an AP (CCI) payload in response to the read command, adds the extended packet header ePH* (*=n), the extended packet footer ePF1, and the extended packet footer ePF0, and supplies the AP (CCI) payload to the A-PHY processing unit 521. The A-PHY processing unit 521 adds an A-PHY header and an A-PHY footer thereto, and performs A-PHY transfer to the application processor 512.

In the application processor 512, the A-PHY processing unit 531 removes the A-PHY header and the A-PHY footer, and supplies the extended packet header ePH* (*=n), the AP (CCI) payload, the extended packet footer ePF1, and the extended packet footer ePF0 to the CCI-FS processing unit 536. The CCI-FS processing unit 536 converts the AP (CCI) payload and supplies the read data (Data* (*=M) [7:0]) to the CCI-FS switch 538.

Note that the above-described flow has been described by exemplifying the generation of the I2C/I3C command in hardware, but there are other combinations as follows.

In a case of software, as I2C/I3C generation in software a slave address, a register address, a payload, ACK response reception, transmission, and various control codes (S, Sr, ACK, NACK, and P) are generated (for example, an image of GPIO control) by the software. As generation of the I2C/I3C command in the software, a slave address, a register address, and a payload are issued from a CPU in response to ACK reception in a CPU bus setting.

In the case of hardware, data is set in an HW IP of I2C/I3C through transfer setting as I2C/I3C generation in hardware. The various control codes automatically respond in hardware. As generation of the I2C/I3C command in hardware, data is set in an HW IP of I2C/I3C through transfer setting, and transmission is performed by the command. The various control codes automatically respond in hardware.

FIG. 72 is a diagram illustrating a flow using the clock stretch method in write access and read access between the image sensor 611 and the application processor 614 in the SerDes connection configuration as illustrated in FIG. 40.

The CCI-FS switch 655 of the application processor 614 supplies a start command and a write command (Slave Address+W 8-bit) to the CCI processing unit 645 of the SerDes device 613 on the master side, and asserts the Scl_enb signal. In the SerDes device 613 on the master side, the CCI processing unit 645 supplies the write command to the A-PHY processing unit 641, and the A-PHY processing unit 641 adds an A-PHY header and an A-PHY footer to the write command and performs A-PHY transfer to the SerDes device 612 on the slave side.

In the SerDes device 612 on the slave side, the A-PHY processing unit 631 removes the A-PHY header and the A-PHY footer, and supplies the write command to the CCI processing unit 635 (slave). The CCI processing unit 635 (slave) negates the Scl_enb signal and supplies the write command to the CCI processing unit 635 (master). Here, the CCI processing unit 635 that performs communication with the SerDes device 613 on the master side and functions as a slave will be referred to as a CCI processing unit 635 (slave), and the CCI processing unit 635 that performs communication with the image sensor 611 side and functions as a master will be referred to as a CCI processing unit 635 (master).

The CCI processing unit 635 (master) transmits the start command and the write command to the image sensor 611.

In the image sensor 611, the CCI processing unit 622 receives the start command and the write command and supplies the commands to the CSI2-FS processing unit 623. The CSI2-FS processing unit 623 supplies an ACK response indicating that the reception is successful to the CCI processing unit 622, and the CCI processing unit 622 transmits the ACK response to the SerDes device 612 on the slave side.

In the SerDes device 612 on the slave side, when the CCI processing unit 635 (master) receives the ACK response and the Scl_enb signal is negated from the CCI processing unit 635 (slave), the ACK response is supplied to the CCI-FS processing unit 636. Thereafter, the CCI processing unit 635 (slave) asserts the Scl_enb signal to the CCI processing unit 635 (master).

The CCI-FS processing unit 636 supplies the ACK response to the A-PHY processing unit 631. The A-PHY processing unit 631 adds an A-PHY header and an A-PHY footer to the ACK response, and performs A-PHY transfer to the SerDes device 613 on the master side.

In the SerDes device 613 on the master side, the A-PHY processing unit 641 removes the A-PHY header and the A-PHY footer, and supplies an ACK response to the CCI processing unit 645. When the CCI-FS switch 655 of the application processor 614 negates the Scl_enb signal to the CCI processing unit 645, the CCI processing unit 645 transmits the ACK response to the application processor 614.

In the application processor 614, the CCI processing unit 652 receives the ACK response and supplies the ACK response to the CCI-FS switch 655 via the CCI-FS processing unit 653.

The CCI-FS switch 655 of the application processor 614 supplies a register address (Register Address [7:0]) to the CCI processing unit 645 of the SerDes device 613 on the master side, and asserts the Scl_enb signal. In the SerDes device 613 on the master side, the CCI processing unit 645 supplies a register address to the A-PHY processing unit 641, and the A-PHY processing unit 641 adds an A-PHY header and an A-PHY footer to the register address, and performs A-PHY transfer to the SerDes device 612 on the slave side.

In the SerDes device 612 on the slave side, the A-PHY processing unit 631 removes the A-PHY header and the A-PHY footer, and supplies the register address to the CCI processing unit 635 (slave). The CCI processing unit 635 (slave) negates the Scl_enb signal and supplies the register address to the CCI processing unit 635 (master). The CCI processing unit 635 (master) transmits the register address to the image sensor 611. Thereafter, the CCI processing unit 635 (slave) asserts the Scl_enb signal to the CCI processing unit 635 (master).

In the image sensor 611, the CCI processing unit 622 receives the register address and supplies the register address to the CSI2-FS processing unit 623. The CSI2-FS processing unit 623 supplies an ACK response indicating that the reception is successful to the CCI processing unit 622, and the CCI processing unit 622 transmits the ACK response to the SerDes device 612 on the slave side.

Thereafter, similarly to the processing described above, the ACK response is supplied to the CCI-FS switch 655.

In the application processor 614, the CCI-FS processing unit 653 transmits the extended packet header ePH* (*=n) to the SerDes device 613 on the master side under the control of the CCI-FS switch 655.

In the SerDes device 613 on the master side, when the CCI processing unit 645 receives the extended packet header ePH* (*=n) and the Scl_enb signal is asserted from the CCI-FS switch 655, the extended packet header ePH* (*=n) is supplied to the A-PHY processing unit 641. Thereafter, the CCI-FS switch 655 negates the Scl_enb signal to the CCI processing unit 645. The A-PHY processing unit 641 adds an A-PHY header and an A-PHY footer to the extended packet header ePH* (*=n) and performs A-PHY transfer to the SerDes device 612 on the slave side.

In the SerDes device 612 on the slave side, the A-PHY processing unit 631 removes the A-PHY header and the A-PHY footer, and supplies the extended packet header ePH* (*=n) to the CCI-FS processing unit 636. The CCI-FS processing unit 636 negates the Scl_enb signal and supplies the extended packet header ePH* (*=n) to the CCI processing unit 635 (master). The CCI processing unit 635 (master) transmits the extended packet header ePH* (*=n) to the image sensor 611. Thereafter, the CCI processing unit 635 (slave) asserts the Scl_enb signal to the CCI processing unit 635 (master).

In image sensor 611, the CSI2-FS processing unit 623 receives the extended packet header ePH* (*=n). The CSI2-FS processing unit 623 supplies an ACK response indicating that the reception is successful to the CCI processing unit 622, and the CCI processing unit 622 transmits the ACK response to the SerDes device 612 on the slave side.

Thereafter, similarly to the processing described above, the ACK response is supplied to the CCI-FS switch 655.

The CCI-FS switch 655 of the application processor 614 supplies the write data (Dara0 [7:0]) to the CCI processing unit 645 of the SerDes device 613 on the master side, and asserts the Scl_enb signal. In the SerDes device 613 on the master side, the CCI processing unit 645 supplies write data to the A-PHY processing unit 641, and the A-PHY processing unit 641 adds an A-PHY header and an A-PHY footer to the write data and performs A-PHY transfer to the SerDes device 612 on the slave side.

In the SerDes device 613 on the master side, when the CCI processing unit 645 receives the write data and the Scl_enb signal is asserted from the CCI-FS switch 655, the write data is supplied to the A-PHY processing unit 641. Thereafter, the CSI2-FS processing unit 653 negates the Scl_enb signal to the CCI processing unit 645 under the control of the CCI-FS switch 655. The A-PHY processing unit 641 adds an A-PHY header and an A-PHY footer to the write data and performs A-PHY transfer to the SerDes device 612 on the slave side.

In the SerDes device 612 on the slave side, the A-PHY processing unit 631 removes the A-PHY header and the A-PHY footer and supplies the write data to the CCI processing unit 635. The CCI processing unit 635 negates the Scl_enb signal and supplies the write data to the CCI processing unit 635 (master). The CCI processing unit 635 (master) transmits the write data to the image sensor 611. Thereafter, the CCI processing unit 635 (slave) asserts the Scl_enb signal to the CCI processing unit 635 (master).

In the image sensor 611, the CCI processing unit 622 receives the write data and supplies the write data to the CSI2-FS processing unit 623, and the CSI2-FS processing unit 623 writes the write data into the register 624. The CSI2-FS processing unit 623 supplies an ACK response indicating that the write data has been successfully written to the CCI processing unit 622, and the CCI processing unit 622 transmits an ACK response to the SerDes device 612 on the slave side.

Thereafter, similarly to the processing described above, the ACK response is supplied to the CCI-FS switch 655.

In the application processor 614, the CCI-FS processing unit 653 transmits the extended packet footer ePF0 to the SerDes device 613 on the master side under the control of the CCI-FS switch 655.

In the SerDes device 613 on the master side, the CCI processing unit 645 receives the extended packet footer ePF0, and supplies the extended packet footer ePF0 to the A-PHY processing unit 641 when the Scl_enb signal is asserted from the CCI-FS switch 655. Thereafter, the CCI-FS switch 655 negates the Scl_enb signal to the CCI processing unit 645. The A-PHY processing unit 641 adds an A-PHY header and an A-PHY footer to the extended packet footer ePF0, and performs A-PHY transfer to the SerDes device 612 on the slave side.

In the SerDes device 612 on the slave side, the A-PHY processing unit 631 removes the A-PHY header and the A-PHY footer and supplies the extended packet footer ePF0 to the CCI-FS processing unit 636. The CCI-FS processing unit 636 negates the Scl_enb signal and supplies the extended packet footer ePF0 to the CCI processing unit 635 (master). The CCI processing unit 635 (master) transmits the extended packet footer ePF0 to the image sensor 611. Thereafter, the CCI processing unit 635 (slave) asserts the Scl_enb signal to the CCI processing unit 635 (master).

In image sensor 611, the CSI2-FS processing unit 623 receives the extended packet footer ePF0. The CSI2-FS processing unit 623 supplies an ACK response indicating that the reception is successful to the CCI processing unit 622, and the CCI processing unit 622 transmits the ACK response to the SerDes device 612 on the slave side.

Thereafter, similarly to the processing described above, the ACK response is supplied to the CCI-FS switch 655.

The CCI-FS switch 655 of the application processor 614 supplies a repeat start command and a read command (Slave Address+R 8-bit) to the CCI processing unit 645 of the SerDes device 613 on the master side, and asserts the Scl_enb signal. In the SerDes device 613 on the master side, the CCI processing unit 645 supplies the read command to the A-PHY processing unit 641, and the A-PHY processing unit 641 adds an A-PHY header and an A-PHY footer to the read command and performs A-PHY transfer to the SerDes device 612 on the slave side.

In the SerDes device 612 on the slave side, the A-PHY processing unit 631 removes the A-PHY header and the A-PHY footer, and supplies the read command to the CCI processing unit 635 (slave). The CCI processing unit 635 (slave) negates the Scl_enb signal and supplies the read command to the CCI processing unit 635 (master). The CCI processing unit 635 (master) transmits the repeat start command and the read command to the image sensor 611.

In the image sensor 611, the CCI processing unit 622 receives the repeat start command and the read command and accesses the register 624. The CCI processing unit 622 transmits an ACK response indicating that the reception is successful to the SerDes device 612 on the slave side.

Thereafter, similarly to the processing described above, the ACK response is supplied to the CCI-FS switch 655.

In the image sensor 611, the CCI processing unit 622 reads the read data (Data 0 [7:0]) from the register 624 and transmits the read data to the SerDes device 612 on the slave side.

In the SerDes device 612 on the slave side, the CCI processing unit 635 (master) receives the read data and supplies the read data to the CCI processing unit 635 (slave), and the CCI processing unit 635 (slave) supplies the read data to the A-PHY processing unit 631. The A-PHY processing unit 631 adds an A-PHY header and an A-PHY footer to the read data, and performs A-PHY transfer to the SerDes device 613 on the master side.

In the SerDes device 613 on the master side, the A-PHY processing unit 641 removes the A-PHY header and the A-PHY footer and supplies the read data to the CCI processing unit 645, and the CCI processing unit 645 transmits the read data to the application processor 614.

In the application processor 614, the CCI processing unit 652 receives the read data and supplies the read data to the CCI-FS switch 655 via the CCI-FS processing unit 653.

The CCI-FS switch 655 transmits an NACK response and a stop command to the CCI processing unit 645. The CCI processing unit 645 supplies the NACK response and the stop command to the A-PHY processing unit 641. The A-PHY processing unit 641 adds an A-PHY header and an A-PHY footer to the NACK response and the stop command, and performs A-PHY transfer to the SerDes device 612 on the slave side.

In the SerDes device 612 on the slave side, the A-PHY processing unit 631 removes the A-PHY header and the A-PHY footer, and supplies the NACK response and the stop command to the CCI processing unit 635 (slave). The CCI processing unit 635 (slave) supplies the NACK response and the stop command to the CCI processing unit 635 (master), and the CCI processing unit 635 (master) transmits the NACK response and the stop command to the image sensor 611.

In the image sensor 611, the CCI processing unit 622 receives the NACK response and the stop command, and supplies the NACK response and the stop command to the CSI2-FS processing unit 623.

Note that, in the flow described with reference to FIG. 72, in the I2C control commands such as start, repeat start, ACK response, NACK response, and stop, a control code indicator of the extended packet header ePH0 is set to 1 and indicate each code allocated to 1 byte of payload.

Detailed Configuration Examples of Image Sensor and Application Processor

Detailed Configuration Example of Image Sensor

FIG. 73 is a block diagram illustrating a configuration example of a configuration in which the image sensor 211 illustrated in FIG. 25 described above includes a CCI-FS processing unit 1001. Note that, in the image sensor 211 illustrated in FIG. 73, constituents common to those of the image sensor 211 in FIG. 25 are denoted by the same reference numerals, and description thereof will be omitted.

As shown in FIG. 73, the CCI-FS processing unit 1001 is disposed between the CCI slave 224 and the register 47, and MUX units 1002-1 and 1002-2 are disposed to sandwich the CCI-FS processing unit 1001. In a case where the CCI-FS processing unit 1001 is enabled according to the cci_fs_en signal supplied from the register 47, the MUX units 1002-1 and 1002-2 transmit and receive data via the CCI-FS processing unit 1001. On the other hand, in a case where the CCI-FS processing unit 1001 is disabled according to the cci_fs_en signal supplied from the register 47, the MUX units 1002-1 and 1002-2 transmit and receive data without using the CCI-FS processing unit 1001.

Detailed Configuration Example of Application Processor

FIG. 74 is a block diagram illustrating a configuration example of a configuration in which the application processor 214 illustrated in FIG. 26 described above includes a CCI-FS processing unit 1101. Note that, in the application processor 214 illustrated in FIG. 74, constituents common to those of the application processor 214 in FIG. 26 are denoted by the same reference numerals, and description thereof will be omitted.

As illustrated in FIG. 74, the CCI-FS processing unit 1101 is disposed between the CCI master 254 and the register 73, and MUX units 1102-1 and 1102-2 are disposed to sandwich the CCI-FS processing unit 1101. In a case where the CCI-FS processing unit 1101 is enabled according to the cci_fs_en signal supplied from the register 73, the MUX units 1102-1 and 1102-2 transmit and receive data via the CCI-FS processing unit 1101. On the other hand, in a case where the CCI-FS processing unit 1101 is disabled according to the cci_fs_en signal supplied from the register 73, the MUX units 1102-1 and 1102-2 transmit and receive data without using the CCI-FS processing unit 1101.

Note that the following configuration may be employed as a method of mounting each field in the configuration of the extended packet header ePH. • The extended VC is not used in the Safe CCI. (A similar configuration is used to match a header field with extended header association in MIPI) • In the extended DT, the extended DT may be embedded in information related to a command of a bus from a host, or may have an implementation configuration of setting of a signal line from register setting. • Although a protocol is described as I2C, the same may be applied in an SDR mode of I3C.

Configuration Example of Communication System

A fourth embodiment of a communication system to which the present technology is applied will be described with reference to FIGS. 75A, 75B, 76, 77, 78, 79, 80, 81A, 81B, 81C, 81D, 82A, 82B, 82C, 82D, 83, 84, 85A, 85B, 86, 87, 88, 89, 90, 91, 92, 93, 94, 95, 96, 97, 98, 99, 100, 101, 102, 103, 104, 105, 106, 107, 108, 109, 110, 111, 112A, 112B, 113A, 113B, 113C, 113D, 113E, 114, 115, 116, 117A, and 117B.

FIGS. 75A and 75B are block diagrams of a communication system according to a fourth embodiment. FIG. 75A illustrates a communication system 1201 as a first variation, and FIG. 75B illustrates a communication system 1201A as a second variation.

The communication system 1201 illustrated in FIG. 75A is configured by directly connecting an image sensor 1211 and an application processor 1212.

The image sensor 1211 has a configuration in which an ALL layer 1222 is disposed on an A-PHY layer 1221, and a CSI-2 transmission unit 1223 and a CSI extension unit 1224, and a CCI slave 1225 and a CCI extension unit 1226 are disposed thereon. The image sensor 1211 can support the extended standard by providing the CSI extension unit 1224 to the CSI-2 transmission unit 1223 and providing the CCI extension unit 1226 to the CCI slave 1225.

The application processor 1212 has a configuration in which an ALL layer 1232 is disposed on an A-PHY layer 1231, and a CSI-2 reception unit 1233 and a CSI extension unit 1234, and a CCI master 1235 and a CCI extension unit 1236 are disposed thereon. The application processor 1212 can support the extended standard by providing the CSI extension unit 1234 to the CSI-2 reception unit 1233 and providing the CCI extension unit 1236 to the CCI master 1235. Note that the CSI extension may be referred to as Camera Service Extensions (CSE).

The communication system 1201A illustrated in of FIG. 75B is configured by connecting a display 1213 and an application processor 1212A. Note that the application processor 1212A includes a DSI-2 transmission unit 1233A and a DSI extension unit 1234A instead of the CSI-2 reception unit 1233 and the CSI extension unit 1234 of the application processor 1212 in FIG. 75A, and the other blocks have a common configuration with the application processor 1212.

The display 1213 has a configuration in which an ALL layer 1242 is disposed on an A-PHY layer 1241, and a DSI-2 reception unit 1243 and a DSI extension unit 1244, and a CCI slave 1245 and a CCI extension unit 1246 are disposed thereon. The display 1213 can support the extended standard by providing the DSI extension unit 1244 to the DSI-2 reception unit 1243 and the CCI extension unit 1246 to the CCI slave 1245. Note that the DSI extension may be referred to as Display Service Extensions (DSE).

The communication systems 1201 and 1201A configured as described above can perform at least high-speed data transmission of transmitting data of a frame including image data in one direction and low-speed command transmission (however, transmitting a command itself may be referred to as command transmission, and transmitting a response to a command may be referred to as command transmission) of transmitting a command related to high-speed data transmission in a reverse direction. For example, in the low-speed command transmission, at least transmission of a high-speed data transmission start command for requesting start of high-speed data transmission is performed, but the present technology is not limited thereto. In addition, high-speed data transmission is faster than low-speed command transmission, and is started in response to reception of a high-speed data transmission start command, but the present technology is not limited thereto.

However, the communication system 1201 in which a communication partner of the application processor 1212 is the image sensor 1211 and the communication system 1201A in which a communication partner of the application processor 1212A is the display 1213 are different in directions between high-speed data transmission and low-speed command transmission. That is, in the communication system 1201, image data is transmitted from the image sensor 1211 to the application processor 1212, and in the communication system 1201A, image data is transmitted from the application processor 1212A to the display 1213.

In the A-PHY based on the physical layer standard, high-speed data transmission and low-speed command transmission are performed via a part or the whole of a common communication path. In addition, the A-PHY supports an option that enables one or both of the power supply from the application processor 1212 to the image sensor 1211 and the power supply from the application processor 1212A to the display 1213 to be transmitted via a common communication path.

Meanwhile, the low-speed command transmission conforms to, for example, CCI based on the CSI-2 standard, and communication is performed on the basis of the I2C or I3C standard. In this case, in the low-speed command transmission, a command can be transmitted by sharing not only an independent physical layer of I2C or I3C but also a part or the whole of any physical layer such as the D-PHY, the C-PHY, and the A-PHY. On the other hand, in the high-speed data transmission, data is transmitted via a part or the whole of any physical layer such as the D-PHY, the C-PHY, and the A-PHY.

Note that, in a case where the low-speed command transmission conforms to, for example, Unified Serial Link (USL) within the CSI-2 standard, a command can be transmitted via a part or the whole of a physical layer such as either the D-PHY or the C-PHY. That is, the high-speed data transmission and the low-speed command transmission allow transmission via a part or the whole of any physical layer among the D-PHY, the C-PHY, A-PHY, I2C, and I3C.

Note that, in FIGS. 75A and 75B, the configuration example including the application processors 1212 and 1201A has been described. However, the communication systems 1201 and 1201A may include, for example, an electronic control unit (ECU). That is, a processor is not limited to the application processor 1212 as long as the processor can communicate with the image sensor 1211, the display 1213, or the like through direct connection or indirect connection. Furthermore, various sensors other than the image sensor 1211 may be provided.

The communication systems 1201 and 1201A configured as described above employ a nonce value transmission method or an initialization vector configuration including a nonce value as described below.

Specifically, a specific common key cryptography algorithm (for example, AES-GCM/GMAC) requires an initialization vector including a nonce value. Therefore, a setting rule of an initialization vector and a nonce value is agreed in advance between the image sensor 1211 and the application processor 1212A or between the display 1213 and the application processor 1212.

However, if misrecognition or falsification of a nonce value occurs in each of the image sensor 1211, the application processors 1212 and 1201A, and the display 1213, subsequent decryption of encrypted image data, authentication of a message, or the like fail. Therefore, in order to avoid a problem that the image data cannot be normally transmitted, a countermeasure technique related to misrecognition and falsification of a nonce value is required.

On the other hand, as a new security specification for the MIPI Camera Serial Interface (CSI) standard or the MIPI Display Serial Interface (DSI) standard, it has been necessary to define an initialization vector suitable for the CSI standard or the DSI standard. Therefore, the present technology discloses a nonce value transmission method or an initialization vector configuration including a nonce value suitable for an imaging device conforming to the CSI standard including the image sensor 1211 or a display device conforming to the DSI standard including the display 1213.

Note that processing performed between the image sensor 1211 and the application processor 1212 will be described below, but similar processes can be performed between the display 1213 and the application processor 1212A.

Detailed Configuration Example of Image Sensor in
FIGS. 75A and 75B

FIG. 76 is a block diagram illustrating a detailed configuration example of the image sensor 1211.

The image sensor 1211 includes a pixel 1301, an AD converter 1302, an image processing unit 1303, an extension mode-compatible CSI-2 transmission circuit 1304, a physical layer processing unit 1305, an I2C/I3C slave 1306, a storage unit 1307, a message counter 1308, a nonce update unit 1309, and a security unit 1310. Note that the pixel 1301, the AD converter 1302, the image processing unit 1303, the extension mode-compatible CSI-2 transmission circuit 1304, the physical layer processing unit 1305, the I2C/I3C slave 1306, and the storage unit 1307 are configured similarly to the respective corresponding blocks in the other embodiments described above, and thus detailed description thereof will be omitted.

The message counter 1308 updates a message count value in the image sensor 1211 each time an extended packet satisfying a predetermined count condition is transmitted.

The security unit 1310 derives a session key in the image sensor 1211, and generates first protection data (for example, an integrity calculation value calculated to protect integrity or encrypted data encrypted to protect confidentiality) of data to be transmitted at a high speed by using the session key.

Each time the security unit 1310 generates the first protection data, the nonce update unit 1309 updates a nonce (number used once) value in the image sensor 1211.

The image sensor 1211 configured as described above transmits a part or the whole of the nonce value and a part or the whole of the message count value to the application processor 1212 at a high speed. For example, a part or the whole of the nonce value may be a count value or a random number. In addition, a part or the whole of the nonce value is stored outside the extended packet header and transmitted, and image data is stored in the packet data and transmitted.

In the image sensor 1211, the message counter 1308 and the nonce update unit 1309 may be configured separately or integrally. For example, in a case where the message counter 1308 and the nonce update unit 1309 are configured separately, a nonce value and a message count value may be asynchronously updated. Consequently, it is possible to increase the degree of freedom of a nonce value and a message count value.

On the other hand, in a case where the message counter 1308 and the nonce update unit 1309 are integrally configured, a nonce value and a message count value may be synchronously updated. In that case, if a count value is used as a nonce value, a message count value can be shared with a part or the whole of a nonce value, and thus it is possible to reduce a bit width of the message counter 1308. That is, the message counter 1308 may be a part or the whole of the nonce update unit 1309, and may be partially or entirely shared by the nonce update unit 1309.

Detailed Configuration Example of Application Processor in FIGS. 75A and 75B FIG. 77 is a block diagram illustrating a detailed configuration example of the application processor 1212.

The application processor 1212 includes a physical layer processing unit 1321, an extension mode-compatible CSI-2 reception circuit 1322, an I2C/I3C master 1323, a storage unit 1324, a data verification unit 1325, a security unit 1326, and a controller 1327. Note that the physical layer processing unit 1321, the extension mode-compatible CSI-2 reception circuit 1322, the I2C/I3C master 1323, and the storage unit 1324 are configured similarly to the respective corresponding blocks in the other embodiments described above, and thus detailed description thereof will be omitted.

The data verification unit 1325 verifies validity of a nonce value or a message count value transmitted from the image sensor 1211 to the application processor 1212.

The security unit 1326 derives a session key in the application processor 1212 corresponding to a session key in the image sensor 1211, and verifies (integrity verification) or decrypts first protection data of image data by using the session key in the application processor 1212.

In a case where verification target data is a count value in the application processor 1212 configured as described above, the data verification unit 1325 can verify the continuity thereof. Furthermore, the data verification unit 1325 may include a counter and update a count value similarly to the image sensor 1211 to perform comparison and verification. Note that, in a case where verification target data is a random number, the data verification unit 1325 may verify the random number property. Note that the data verification unit 1325 may include the nonce update unit 1309 (or a message counter), and may verify or decrypt the first protection data by using the nonce update unit, or may verify verification target data by using the nonce update unit.

The image sensor 1211 and the application processor 1212 may be configured to be mounted on a desired mobile device. For example, the mobile device may be a portable mobile device, for example, any of a mobile phone, a smartphone, a digital camera, a game device, or the like. The mobile device may be a propulsion device, and may be, for example, any of a vehicle, a robot, a drone, or the like capable of propulsion (any of movable, running, walking, flying, or the like). The mobile device may be any of an autonomous vehicle, an autonomous robot, an autonomous drone, or the like that can be autonomously propelled with an artificial intelligence (AI) function. Propulsion of a propulsion device may be controlled by a user of the propulsion device, and the propulsion device may notify the user of instructions or warnings as needed. On the other hand, the propulsion device may be configured such that the propulsion device automatically controls the propulsion of the propulsion device.

The security units 1310 and 1326 may each include, for example, a security calculation unit that executes calculation for protecting image data. Therefore, the security units 1310 and 1326 can process any one of encryption calculation, decryption calculation, hash value calculation, message authentication code calculation, digital signature calculation, identification (ID) authentication, firmware measurement, encryption session key establishment, key exchange, key update, or the like by using the security calculation unit.

On the other hand, any of the security units 1310 and 1326, the nonce update unit 1309, the message counter 1308, and the data verification unit 1325 may be configured to be electrically directly connected to a memory. This memory may be electrically directly connected to a register, and any of the security units 1310 and 1326, the nonce update unit 1309, the message counter 1308, and the data verification unit 1325 may be electrically directly connected to the register. The memory may be a memory protected from either leakage or falsification of information in the memory. Such memories and registers are used as the storage units 1307 and 1324, respectively.

Any of key information (for example, a pre-shared key, a private key, a public key, or a session key), a certificate (for example, a root certificate, an intermediate certificate, or a leaf certificate), cryptographic algorithm information, or the like may be stored in the storage units 1307 and 1324. The storage units 1307 and 1324 may store any of function information of the image sensor 1211 or the application processor 1212, ID information (for example, a source ID, a destination ID, or a final destination ID) of the image sensor 1211 or the application processor 1212, firmware information of the image sensor 1211 or the application processor 1212, or the like. The storage units 1307 and 1324 may store any of session information (for example, a session ID) that will be described later, a calculation value (for example, an initial value, an intermediate value, or a final value) of the security calculation unit, an initialization vector, a nonce value, a message count value, a frame number (frame count value), or the like.

Any one of the security units 1310 and 1326, the nonce update unit 1309, the message counter 1308, and the data verification unit 1325 can determine the presence or absence of a defect, for example, by the image sensor 1211 or the application processor 1212 storing any one of a nonce value, a count value, an integrity calculation value, encryption information, or the like for a plurality of times in the storage unit 1307 or 1324, and can take measures (for example, a request for retransmission of data at a failure point and transmission of an abnormal message) in response thereto. Furthermore, in a case where any of the nonce value, the count value, the integrity calculation value, the encryption information, or the like is periodically stored in the protected storage unit 1307 or 1324, if an accident of a mobile device occurs, there is also an effect that a cause of the accident can be easily identified by analyzing the protected storage unit 1307 or 1324.

<Session>

A requestor and a responder, that is, the application processor 1212 and the image sensor 1211 may have one or more communication channels through a session. In the following description, a session will be described by using a configuration in which the application processor 1212 is a requester and the image sensor 1211 is a responder as an example. Of course, the application processor 1212 may be a responder, and the image sensor 1211 may be a requester.

In addition, the requester and the responder can construct a secure communication channel by using temporarily fixed encryption information. Specifically, the session provides either encryption or message authentication, or both. The session includes, for example, three stages such as a session handshake stage, an application stage, and a session termination stage.

The session handshake stage begins with, for example, a key exchange request (either PSK_EXCHANGE or KEY_EXCHANGE) from the requestor to derive a session key, such as a session secret or an encryption key, and to use the session key to protect communication. The purpose of this stage is, for example, to first establish trust between the responder and the requestor before either side transmits application data (for example, image data). Further, some degree of integrity of handshake and synchronicity with a derived handshake secret may be ensured.

In a case where an error occurs in this stage, the session may immediately end and proceed to the session end. If the handshake is successful, for example, the stage ends with a finish response (FINISH_RSP or PSK_FINISH_RSP) from the responder and the application stage begins. If the handshake is completed once and all verifications are passed, the session reaches the application stage where either the responder or requestor may transmit application data.

The application stage ends, for example, in a case where an end request (END_SESSION) is issued from the requestor or in a case where an error occurs. The next stage is the session termination stage.

The session termination stage is, for example, merely an internal stage, and there is no explicit message transmitted or received. Both the requestor and the responder discard or clean up session keys such as all derived session secrets or encryption keys, when the session ends. The requestor and responder may have other internal data associated with this session and may also wish to clean up the data.

The session secret is used, for example, to derive an encryption key and a salt used in an Authenticated Encryption with Additional Data (AEAD) function. The derivation of an encryption key may frequently use HMAC as defined in RFC2104 and HKDF-Expand described in RFC5869. The session secret may include a single secret or a plurality of types of secrets. The session key may include a single key or a plurality of types of keys.

Processing Example of High-Speed Data
Transmission and Low-Speed Command
Transmission Communication processing in which high-speed data transmission and low-speed command transmission are performed between the image sensor 1211 and the application processor 1212 will be described with reference to FIGS. 78 to 80.

FIG. 78 is a flowchart illustrating a first processing example of the communication processing.

Here, the extension mode-compatible CSI-2 reception circuit 1322 of the application processor 1212 functions as a CCI host (requester) and a CSI-2 host. The extension mode-compatible CSI-2 transmission circuit 1304 of the image sensor 1211 functions as a CCI device (responder) and a CSI-2 device. The CCI host transmits a request message to the CCI device, and in response to receiving the request message, the CCI device transmits a response message to the CCI host.

In step S501, a GET VERSION request and a VERSION response are made between the CCI host of the extension mode-compatible CSI-2 reception circuit 1322 and the CCI device of the extension mode-compatible CSI-2 transmission circuit 1304. As a result, the extension mode-compatible CSI-2 reception circuit 1322 acquires the Security Protocol and Data Model (SPDM) version of the endpoint.

In step S502, a GET CAPABILITIES request and a CAPABILITIES response are made between the CCI host of the extension mode-compatible CSI-2 reception circuit 1322 and the CCI device of the extension mode-compatible CSI-2 transmission circuit 1304. As a result, the extension mode-compatible CSI-2 reception circuit 1322 acquires the SPDM function of the endpoint.

In step S503, a NEGOTIATE ALGORITHMS request and an ALGORITHMS response are made between the CCI host of the extension mode-compatible CSI-2 reception circuit 1322 and the CCI device of the extension mode-compatible CSI-2 transmission circuit 1304. As a result, the extension mode-compatible CSI-2 reception circuit 1322 negotiates a cryptographic algorithm with the extension mode-compatible CSI-2 transmission circuit 1304.

In step S504, a PSK_EXCHANGE request and a PSK_EXCHANGE_RSP response are made between the CCI host of the extension mode-compatible CSI-2 reception circuit 1322 and the CCI device of the extension mode-compatible CSI-2 transmission circuit 1304. As a result, the extension mode-compatible CSI-2 reception circuit 1322 and the extension mode-compatible CSI-2 transmission circuit 1304 derive a session key for CCI such as a session secret or an encryption key.

In step S505, a PSK_FINISH request and a PSK_FINISH_RSP response are made between the CCI host of the extension mode-compatible CSI-2 reception circuit 1322 and the CCI device of the extension mode-compatible CSI-2 transmission circuit 1304. As a result, the extension mode-compatible CSI-2 reception circuit 1322 ascertains a pre-shared key (PSK) and proves to the responder that the session key for CCI derived in step S504 is correct.

In step S506, a PSK_EXCHANGE request and a PSK_EXCHANGE_RSP response are made between the CCI host of the extension mode-compatible CSI-2 reception circuit 1322 and the CCI device of the extension mode-compatible CSI-2 transmission circuit 1304. As a result, the extension mode-compatible CSI-2 reception circuit 1322 and the extension mode-compatible CSI-2 transmission circuit 1304 derive a session key for CSI-2 such as a session secret or an encryption key.

In step S507, a PSK_FINISH request and a PSK_FINISH_RSP response are made between the CCI host of the extension mode-compatible CSI-2 reception circuit 1322 and the CCI device of the extension mode-compatible CSI-2 transmission circuit 1304. As a result, the extension mode-compatible CSI-2 reception circuit 1322 ascertains a pre-shared key (PSK) and proves to the responder that the session key for CSI-2 derived in step S506 is correct.

Here, the proof of the session key in steps S505 and S507 is realized by a MAC value computed with a finished key of the requester and a message of this session. Then, subsequent CCI communication and CSI-2 communication are protected by using the session keys derived in steps S504 and S506.

In step S508, in the extension mode-compatible CSI-2 reception circuit 1322, a session secret, a session key, an algorithm, other parameters, or the like for CSI-2 are supplied from the CCI host to the CSI-2 host.

In step S509, in the extension mode-compatible CSI-2 transmission circuit 1304, a session secret, a session key, an algorithm, other parameters, or the like for CSI-2 are supplied from the CCI device to the CSI-2 device.

In step S510, the CSI-2 device of the extension mode-compatible CSI-2 transmission circuit 1304 transmits image data to the CSI-2 host of the extension mode-compatible CSI-2 reception circuit 1322 through high-speed data communication. For example, the high-speed data communication is continuously performed until a timing of updating the session key for CSI-2.

In step S511, in the extension mode-compatible CSI-2 reception circuit 1322, a trigger for updating the session key for CSI-2 is supplied from the CSI-2 host to the CCI host. However, a trigger may be provided to the CCI host from the CSI-2 device or the CCI device, or a self-trigger may be provided to the CCI host from the CCI host.

In step S512, a KEY_UPDATE request and a KEY_UPDATE ACK response are made between the CCI host of the extension mode-compatible CSI-2 reception circuit 1322 and the CCI device of the extension mode-compatible CSI-2 transmission circuit 1304. Consequently, the session key is updated and a part of the old session key is discarded. Note that, in a case where the session key includes a plurality of types of keys (a request direction key, a response direction key, or the like), some or all of the keys may be updated. In addition, the KEY_UPDATE request may be issued from the responder by using a GET_ENCAPSULATED_REQUEST mechanism that will be described later.

In step S513, a process similar to that in step S512 is performed, and the KEY_UPDATE request and the KEY_UPDATE ACK response are made twice. As a result, the rest (whole) of the old session key that has not been discarded only by the process in step S512 is discarded.

In step S514, in the extension mode-compatible CSI-2 reception circuit 1322, a session secret, a session key (after update), an algorithm, other parameters, or the like for CSI-2 are supplied from the CCI host to the CSI-2 host.

In step S515, in the extension mode-compatible CSI-2 transmission circuit 1304, a session secret, a session key (after update), an algorithm, other parameters, or the like for CSI-2 are supplied from the CCI device to the CSI-2 device.

In step S516, similarly to step S510, transmission of image data using high-speed data communication is started, and processes similar to those in steps S510 to S515 are repeatedly performed.

Note that, in the first processing example of the communication processing, the session key for CCI and the session key for CSI-2 are different, the session IDs are different between CCI and CSI-2, and the session secrets are different between CCI and CSI-2. Not limited to this, as in a second processing example of the communication processing, the session key for CCI and the session key for CSI-2 may be the same, the session IDs may be the same for CCI and CSI-2, and the session secrets may be the same for CCI and CSI-2.

FIG. 79 is a flowchart illustrating the second processing example of the communication processing.

In steps S521 to S523, processes similar to those in steps S501 to S503 in FIG. 78 are performed.

In step S524, a PSK_EXCHANGE request and a PSK_EXCHANGE_RSP response are made between the CCI host of the extension mode-compatible CSI-2 reception circuit 1322 and the CCI device of the extension mode-compatible CSI-2 transmission circuit 1304. Here, in the second process example of the communication process, the same session secret for CCI and the same session secret for CSI-2 are derived.

That is, the session key for CCI and the session key for CSI-2 can be derived from the same session secret. Alternatively, a session key for uplink and a session key for downlink (reverse direction to uplink) may be derived from the same session secret. Alternatively, a common session key for CCI and CSI-2 may be derived from the same session secret. Note that, even in a case where sessions for CCI and CSI-2 are the same, session secrets, session keys, or the like may be different between CCI and CSI-2.

Thereafter, in steps S525 to S534, processes similar to those in steps S507 to S516 in FIG. 78 are performed.

Here, the pre-shared key PSK key exchange scheme provides an option for the requester and the responder to perform mutual authentication and session key establishment with symmetric key cryptography. This option is particularly useful for endpoints that do not support asymmetric key cryptography or certificate processing. Even in a case where asymmetric key cryptography is supported, this option can also be used to speed up session key establishment. This option requires the requestor and responder to ascertain in advance a common PSK before handshaking.

Basically, a PSK functions as a base for mutual authentication credential information and session key establishment. Thus, only two endpoints and potentially trusted third parties that provision a PSK to the two endpoints may ascertain a value of the PSK. The requestor may be paired with a plurality of responders. Similarly, the responder may be paired with a plurality of requestors. The pair of the requestor and the responder may be provisioned with one or more PSKs.

An endpoint may operate as a requestor for one device and simultaneously operate as a responder for another device. A transport layer needs to identify a peer and establish communication between two endpoints before PSK-based session key exchange is started.

A PSK may be provisioned in a trusted environment, for example, during a safe manufacturing process. A PSK may be agreed between two endpoints by using a secure protocol in an untrusted environment. A size of the provisioned PSK depends on the security strength requirements of an application, but should be 128 bits or more, desirably 256 bits or more. During PSK provisioning, the endpoint function and supported algorithms may perform communication to peers. Therefore, during session key establishment using the PSK option, GET CAPABILITIES and NEGOTIATE ALGO-RITHMS of the SPDM command are not required.

This option defines two message pairs such as PSK_EX-CHANGE/PSK_EXCHANGE_RSP and PSK_FINISH/PSK FINISH_RSP. The PSK_EXCHANGE message has three functions, that is, a function of prompting the responder to acquire a specific PSK, a function of exchanging context between the requester and the responder, and a function of proving to the requester that the responder ascertains a correct PSK and has derived the correct session key.

FIG. 80 is a flowchart illustrating a third processing example of the communication processing.

In steps S541 to S543, processes similar to those in steps S501 to S503 in FIG. 78 are performed.

In step S544, a GET DIGESTS request and a DIGESTS response are made between the CCI host of the extension mode-compatible CSI-2 reception circuit 1322 and the CCI device of the extension mode-compatible CSI-2 transmission circuit 1304. As a result, the extension mode-compatible CSI-2 reception circuit 1322 acquires a certificate chain digest from the extension mode-compatible CSI-2 transmission circuit 1304.

In step S545, a GET_CERTIFICATE request and a CER-TIFICATE response are made between the CCI host of the extension mode-compatible CSI-2 reception circuit 1322 and the CCI device of the extension mode-compatible CSI-2 transmission circuit 1304. As a result, the extension mode-compatible CSI-2 reception circuit 1322 acquires a certificate chain from the extension mode-compatible CSI-2 transmission circuit 1304. Note that the acquisition of the certificate chain may be executed a plurality of times.

In step S546, a CHALLENGE request and a CHALLEN-GE_AUTH response are made between the CCI host of the extension mode-compatible CSI-2 reception circuit 1322 and the CCI device of the extension mode-compatible CSI-2 transmission circuit 1304. As a result, the extension mode-compatible CSI-2 reception circuit 1322 can authenticate the extension mode-compatible CSI-2 transmission circuit 1304 through the challenge-response protocol.

In step S547, a KEY_EXCHANGE request (channel=CCI and sessionID=D) and a KEY_EXCHANG-E_RSP response are made between the CCI host of the extension mode-compatible CSI-2 reception circuit 1322 and the CCI device of the extension mode-compatible CSI-2 transmission circuit 1304. As a result, a handshake between the requestor and the responder for the purpose of authentication of the responder (or optionally both parties) is started. Then, the encryption parameter is negotiated in addition to the content negotiated in the last NEGOTIATE ALGORITHMS/ALGORITHMS exchange, and the shared key information is established.

In step S548, the CCI host of the extension mode-compatible CSI-2 reception circuit 1322 transmits GET_ENCAPSULATED_REQUEST to the CCI device of the extension mode-compatible CSI-2 transmission circuit 1304.

In step S549, the CCI device of the extension mode-compatible CSI-2 transmission circuit 1304 transmits ENCAPSULATED_REQUEST (GET DIGESTS request) to the CCI host of the extension mode-compatible CSI-2 reception circuit 1322.

In step S550, the CCI host of the extension mode-compatible CSI-2 reception circuit 1322 transmits DELIV- ER_ENCAPSULATED_RESPONSE (DIGESTS response) to the CCI device of the extension mode-compatible CSI-2 transmission circuit 1304. As a result, the CCI device of the extension mode-compatible CSI-2 transmission circuit 1304 acquires the certificate chain digest from the CCI host of the extension mode-compatible CSI-2 reception circuit 1322.

In step S551, the CCI device of the extension mode-compatible CSI-2 transmission circuit 1304 transmits ENCAPSULATED_RESPONSE ACK (GET_CERTIFI-CATE request) to the CCI host of the extension mode-compatible CSI-2 reception circuit 1322.

In step S552, the CCI host of the extension mode-compatible CSI-2 reception circuit 1322 transmits DELIV-ER_ENCAPSULATED_RESPONSE (CERTIFICATE response) to the CCI device of the extension mode-compatible CSI-2 transmission circuit 1304. Consequently, the CCI device (responder) may acquire the certificate chain from the CCI host (requestor). Note that this processing may be executed a plurality of times.

In step S553, the CCI device of the extension mode-compatible CSI-2 transmission circuit 1304 transmits ENCAPSULATED_RESPONSE ACK to the CCI host of the extension mode-compatible CSI-2 reception circuit 1322.

In step S554, a FINISH request and a FINISH_RSP response are made between the CCI host of the extension mode-compatible CSI-2 reception circuit 1322 and the CCI device of the extension mode-compatible CSI-2 transmission circuit 1304. As a result, the handshake between the CCI host of the extension mode-compatible CSI-2 reception circuit 1322 and the CCI device of the extension mode-compatible CSI-2 transmission circuit 1304, which is started by the KEY_EXCHANGE request in step S547, is completed.

In step S555, a GET MEASUREMENTS request and a MEASUREMENTS response are made between the CCI host of the extension mode-compatible CSI-2 reception circuit 1322 and the CCI device of the extension mode-compatible CSI-2 transmission circuit 1304. As a result, the CCI host of the extension mode-compatible CSI-2 reception circuit 1322 acquires measurement data from the CCI device of the extension mode-compatible CSI-2 transmission circuit 1304. Note that the GET MEASUREMENTS request may be issued from the responder by using the GET_EN-CAPSULATED_REQUEST mechanism described above. Similarly, other requests may also be issued from the responder by using the GET_ENCAPSULATED_RE-QUEST mechanism described above.

Thereafter, in step S556, a KEY_EXCHANGE request (channel=CSI-2 and sessionID=E) and a KEY_EXCHANG-E_RSP response are made similarly to step S547, and in step S557, a FINISH request and a FINISH_RSP response are made similarly to step S554. Then, in steps S558 to S566, processes similar to those in steps S508 to S516 in FIG. 78 are performed.

<Data Verification Process>

A data verification process using a verification packet and a verification target packet will be described with reference to FIGS. 81A, 81B, 81C, 81D, 82A, 82B, 82C, 82D, and 83.

As illustrated in FIGS. 81A, 81B, 81C, 81D, 82A, 82B, 82C, and 82D, the extended packet includes the packet header PH, the extended packet header ePH, packet data, the extended packet footer ePF, and the packet footer PF. With the extended packet having such a configuration, a frame start, embedded data, image data, user defined data, a frame end, a write command (CCI Write), a read command (CCI Read), and a read response (CCI Read return value) can be configured. Note that some or all of the packet header PH, the extended packet header ePH, the packet data, the extended packet footer ePF, and the packet footer PF may be omitted. That is, a packet configuration including at least the extended packet header ePH and the packet data is defined as an extended packet.

Incidentally, there is a possibility that any one of the extended packet header ePH, the packet data, and the extended packet footer ePF is not normally received (the message is lost) due to noise, interference, or an attack. Therefore, it is desirable that a verification packet for verifying the integrity of the extended packet header ePH, the packet data, and the extended packet footer remainder ePF1 is stored in the extended packet footer end ePF0. For verification of the integrity, for example, CRC32 of cyclic redundancy check, which is a type of error detection code, is used. In addition, as a generation polynomial of the CRC32, for example, $X^{32}+X^{26}+X^{23}+X^{22}+X^{16}+X^{12}+X^{11}+X^{10}+X^{8}+X^{7}+X^{5}+X^{4}+X^{2}+X+1$ is used.

The packet data may be used for the verification target packet. Alternatively, the extended packet header and the packet data may be used for the verification target packet. Alternatively, the packet data and the extended packet footer remainder (ePF1) may be used for the verification target packet. Alternatively, the extended packet header, the packet data, and the extended packet footer remainder (ePF1) may be used for the verification target packet. At least packet data is protected by such a verification target packet.

That is, the image sensor 1211 includes a second protection unit (for example, a CRC calculation unit) that generates second protection data (for example, a CRC computation value) of the packet data without using a session key. The second protection data is stored, for example, in the extended packet footer ePF based on high-speed data transmission. That is, the second protection data is stored in any of a frame start, embedded data, image data, user defined data, a frame end, a write command (CCI Write), a read command (CCI Read), and a read response (CCI Read return value).

A security function (security feature) may be defined in the extended packet footer ePF1 or ePF0. That is, a security calculation unit (for example, an encryption calculation unit, a decryption calculation unit, a hash value calculation unit, a message authentication code calculation unit, and a digital signature calculation unit) may be provided in the image sensor 1211. Then, results of the security calculation (for example, a hash value, a message authentication code, and a digital signature) may be stored in the extended packet footer ePF.

The results of the security calculation may be stored only in the extended packet footer ePF1 instead of the extended packet footer ePF0, or may be outside the extended packet footer instead of the extended packet footer (for example, in embedded data or in a read response). The security calculation unit included in the image sensor 1211 is included in the security unit 1310.

As the message authentication code (MAC), any one of a Galois MAC (GMAC), a cipher-based MAC (CMAC), a hash-based MAC (HMAC), or the like may be used. For example, any of an AES-GMAC, an AES-CMAC, an SHA2-HMAC, an SHA3-HMAC, or the like to which the Advanced Encryption Standard (AES) or the Secure Hash Algorithm (SHA) is applied may be used. Note that a block length of the AES is 128 bits, and any one of 128 bits, 192 bits, or 256 bits is selected as a key length of the AES.

For example, any security information such as a hash (particularly, a cryptographic hash) value, a message authentication code, and a digital signature may be stored in the extended packet footer with the packet data as the verification target packet or with the extended packet header and the packet data as the verification target packet. In that case, it is possible to provide further resistance against malicious falsification from an attacker. Note that, in the extended packet footer "ePF1" or "ePF1 and ePF0", CRC as cyclic redundancy check, which is a type of the error detection code, may be stored.

That is, the image sensor 1211 may include integrity calculation units (for example, a first protection unit=a security calculation unit and a second protection unit=a CRC calculation unit), and an integrity calculation value (for example, the first protection data and the second protection data) that is a result of calculating the integrity may be stored in the extended packet footer. Note that the CRC can be used for functional safety, and its integrity can be used to prevent a hardware failure from being detected. On the other hand, the integrity of the security function can be used to detect intentional interference or attack. That is, the security calculation unit calculates an integrity calculation value based on encryption, and the CRC calculation unit calculates an integrity calculation value not based on encryption.

For example, the application processor 1212 can verify the integrity of a verification target packet by using a verification packet. In a case where it is determined that there is an abnormality, for example, any process such as transmission of a request message requesting retransmission of a packet including the verification target packet and the verification packet, transmission of a request message inquiring the image sensor 1211 whether there is an abnormality in the image sensor 1211, transmission of a request message requesting the image sensor 1211 to stop some or all of functions of the image sensor 1211, propulsion stop of a propulsion device, change of propulsion control of the propulsion device, and change of priority data used for propulsion control may be executed.

Note that the integrity calculation value may be stored in any of, for example, embedded data, image data (packet data), user defined data, a write command, a read command, or a read response. In this case, the integrity calculation value may not be stored in the extended packet footer. For example, the integrity calculation value may be stored not in units of lines of an image but in units of frames of an image, and in this case, the integrity is efficiently calculated. In that case, the integrity calculation value is stored, for example, in embedded data or in a read response after image data is transmitted.

Figure 81A:
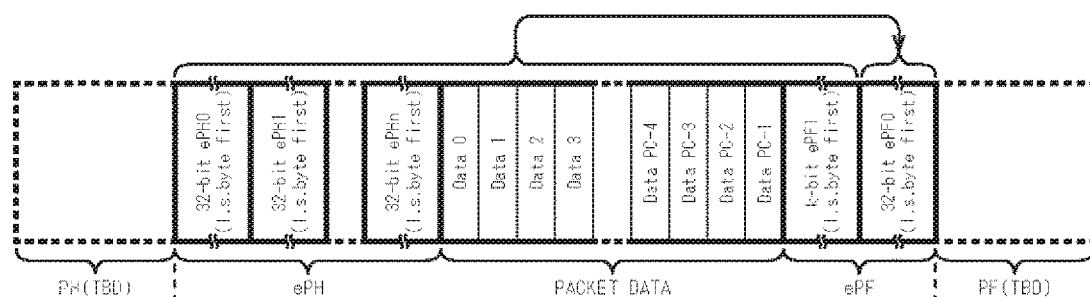

The extended packet illustrated in FIG. 81A has a configuration example in which the extended packet header ePH, the packet data, and the extended packet footer remainder ePF1 are set as a verification target packet, and the extended packet footer end ePF0 storing a computation value obtained through security calculation using the verification target packet is set as a verification packet.

Figure 81B:
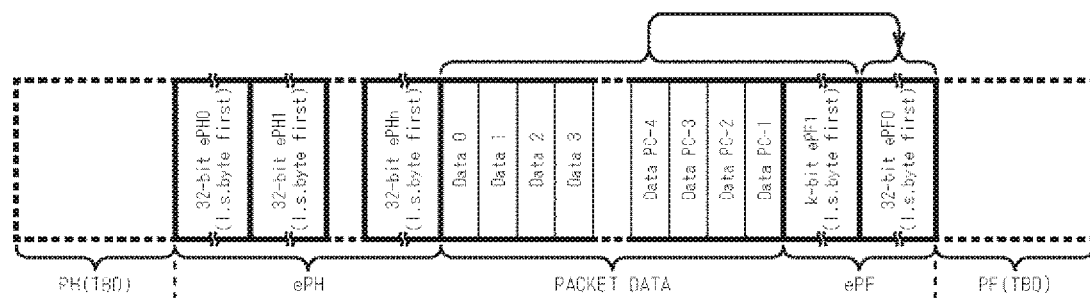

The extended packet illustrated in FIG. 81B is a configuration example in which the packet data and the extended packet footer remainder ePF1 are set as a verification target packet, and the extended packet footer end ePF0 storing a computation value obtained through security calculation using the verification target packet is set as a verification packet.

Figure 81C:
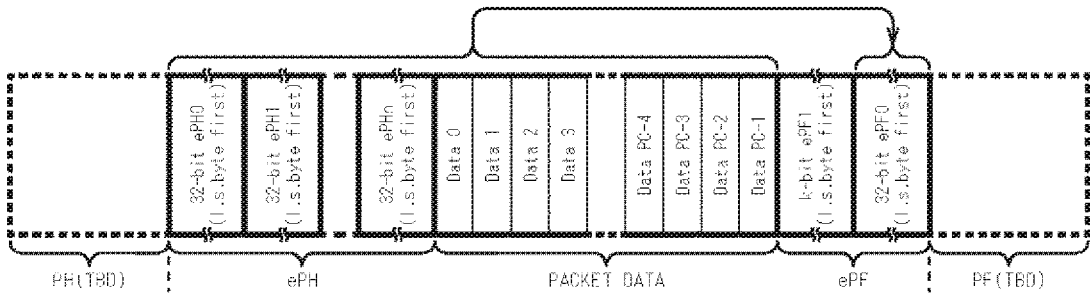

The extended packet illustrated in FIG. 81C has a configuration example in which the extended packet header ePH and the packet data are set as a verification target packet, and the extended packet footer end ePF0 storing a computation value obtained through security calculation using the verification target packet is set as a verification packet.

Figure 81D:
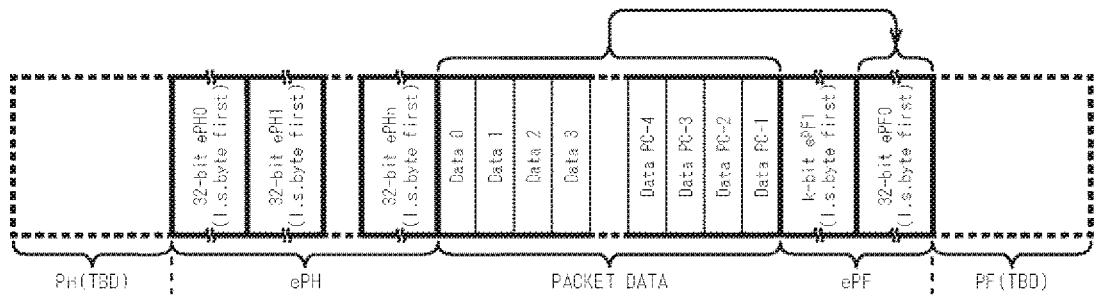

The extended packet illustrated in FIG. 81D has a configuration example in which packet data is set as a verification target packet, and an extended packet footer end ePF0 storing a computation value obtained through security calculation using the verification target packet is set as a verification packet.

The extended packet illustrated in FIG. 82A has a configuration example in which the extended packet header ePH and the packet data are set as a verification target packet, and the extended packet footer remainder ePF1 storing a computation value obtained through security calculation using the verification target packet is set as a verification packet.

The extended packet illustrated in FIG. 82B is a configuration example in which the extended packet header ePH and the packet data are set as a verification target packet, and the extended packet footer remainder ePF1 and the extended packet footer end ePF0 storing a computation value obtained through security calculation using the verification target packet are set as a verification packet.

The extended packet illustrated in FIG. 82C has a configuration example in which the packet data is set as a verification target packet, and the extended packet footer remainder ePF1 storing a computation value obtained through security calculation using the verification target packet is set as a verification packet.

The extended packet illustrated in FIG. 82D is a configuration example in which the packet data is set as a verification target packet, and the extended packet footer remainder ePF1 and the extended packet footer end ePF0 storing a computation value obtained through security calculation using the verification target packet are set as a verification packet.

FIG. 83 is a flowchart for describing a data verification process performed in the application processor 1212.

When the extended packet transmitted from the image sensor 1211 is received by the extension mode-compatible CSI-2 reception circuit 1322 in step S601, the security unit 1326 receives the verification target packet of the extended packet. Then, when the security unit 1326 completes the reception of the verification target packet, the process proceeds to step S602. Note that even if the reception of the entire verification target packet is not completed, the process may proceed to step S602 if the reception of at least a part (for example, 128 bits) from which computation of security calculation can be started is completed. In that case, the rest of the verification target packet is continuously received until the reception of the entire verification target packet is completed.

In step S602, the security unit 1326 starts computation for a computation value obtained through security calculation using at least a part of the verification target packet received in step S601.

In step S603, the security unit 1326 receives the verification packet transmitted from the image sensor 1211 via the extension mode-compatible CSI-2 reception circuit 1322. Then, when the security unit 1326 completes the reception of the verification packet and acquires a reception value (the computation value computed by the image sensor 1211) stored in the verification packet, the process proceeds to step S604.

In step S604, when the security unit 1326 completes the computation of the computation value obtained through security calculation using the verification target packet started in step S602 (that is, the entire verification target packet is received, and the computation using the entire packet is completed), the process proceeds to step S605.

In step S605, the security unit 1326 determines whether or not the reception value received in step S603 matches the computation value obtained in step S604.

In step S605, in a case where the security unit 1326 determines that the reception value matches the computation value, the process proceeds to step S606. In this case, in step S606, the security unit 1326 determines that the extended packet received by the extension mode-compatible CSI-2 reception circuit 1322 is normal, and the process is ended.

On the other hand, in step S605, in a case where the security unit 1326 determines that the reception value does not match the computation value, the process proceeds to step S607. In this case, in step S607, the security unit 1326 determines that an abnormality has occurred in the extended packet received by the extension mode-compatible CSI-2 reception circuit 1322, and the process is ended.

<Securement of Functional Safety Using Message Count Value>

The image sensor 1211 may store a message count value counted by the message counter 1308 in the extended packet header or the extended packet footer to ensure functional safety (for example, detecting and properly treating missing messages). For example, the message counter 1308 included in the image sensor 1211 may store a message count value that is incremented or decremented each time a message is transmitted from the image sensor 1211. Note that the image sensor 1211 may have a configuration in which the independent message counter 1308 is provided for each virtual channel or a configuration in which the message counter 1308 common to virtual channels is provided.

The message counter 1308 sets a message count value to an initial value (for example, 0 or a maximum value) in a first packet including an extended packet header of a certain virtual channel, and increments or decrements the message count value each time data including the extended packet header of the certain virtual channel is transmitted. Further, for example, in a case where data not including the extended packet header is transmitted, the message counter 1308 resumes counting when data including the extended packet header is transmitted next time without incrementing or decrementing the message count value.

The message counter 1308 may continue counting regardless of a frame start or a frame end. Then, in a case where the message count value is counted to a specified value (for example, a maximum value or 0), the message counter 1308 returns the next message count value to the initial value (for example, 0 or a maximum value) and performs counting. Note that a part of the extended packet header may store a part of a nonce value.

Note that, in a case where a message is missing, a reception side (the image sensor 1211 or the application processor 1212) that receives the message count value can immediately detect the missing. For example, a Denial-of-service (DoS) attack or the like that infringes on the availability of the image sensor 1211 or the application processor 1212 by intentionally mixing an enormous amount of messages is also immediately detected on the reception side. Therefore, the message count value is desirably stored in the extended packet header. By making it possible to detect such missing, an attack, or the like in a shorter time, a reception side can start responding to the missing or the attack in a shorter time, which is particularly advantageous for propulsion devices capable of performing high-speed movement or high-speed operation, for example.

Note that a message count value or an integrity calculation value may also be stored for a write command (CCI Write), a read command (CCI Read), or a read response (CCI Read return value), and an element related to the extended packet may be applied. In that case, it is possible to support functional safety, protect integrity, or the like for a write command, a read command, or a read response.

FIG. 84 is a flowchart for describing a message count value transmission process in which the image sensor 1211 transmits a message count value.

In step S611, the message counter 1308 initializes a message count value to be set to 0.

In step S612, the extension mode-compatible CSI-2 transmission circuit 1304 determines whether or not to transmit an extended packet header, and waits for the process until it is determined to transmit an extended packet header. Then, in step S612, in a case where the extension mode-compatible CSI-2 transmission circuit 1304 determines to transmit an extended packet header, the process proceeds to step S613.

In step S613, the extension mode-compatible CSI-2 transmission circuit 1304 acquires the message count value from the message counter 1308 and stores the message count value in the extended packet header.

In step S614, the extension mode-compatible CSI-2 transmission circuit 1304 transmits the extended packet header storing the message count value in step S613.

In step S615, the message counter 1308 determines whether or not the message count value has been counted up to the maximum value. In step S615, in a case where the message counter 1308 determines that the message count value has not been counted up to the maximum value, the process proceeds to step S616.

In step S616, the message counter 1308 increments the message count value. Thereafter, the process returns to step S612, and similar processes are repeatedly performed thereafter.

On the other hand, in a case where the message counter 1308 determines in step S615 that the message count value has been counted up to the maximum value, the process returns to step S611 in which the message count value is initialized, and similar processes are repeatedly performed thereafter.

Note that, in addition to incrementing the message count value as described above, for example, the message count value may be initialized to be set to the maximum value, and may be decremented.

Embedded Data

Embedded data will be described with reference to FIGS. 85A, 85B, 86, 87, and 88.

The image sensor 1211 may cause additional information such as device setting information to be included in a data stream by using embedded data. The embedded data includes one or more lines (rows), and may include any of configuration data of the image sensor 1211, a register value conforming to a standard, a vendor-specific register value, a description of a frame format, a statistical value, or the like.

FIG. 85A illustrates embedded data for one line, and illustrates a configuration in which embedded data in a desired data amount is continuously disposed following an embedded data format code, and padding characters are disposed in the rest of the data.

The embedded data includes information related to image data or user defined data. Therefore, the image data or the user defined data may be compressed data, but the embedded data is desirably data that is not compressed (uncompressed data). Therefore, in a case where data compression is used, compressed data (image data or user defined data) and uncompressed data (embedded data) are mixed in a frame for high-speed data transmission.

In the embedded data, a plurality of lines (rows) of the embedded data may be provided according to the number of register values added to the embedded data. In addition, the number of rows of the embedded data may be designated by a part of the description in a frame format in the first embedded data row in the frame. A line length of the embedded data may be shorter than a line length of the image data or the user defined data, but it is not preferable to exceed the line length of the image data or the user defined data, and it is preferable to be the same as the line length of the image data or the user defined data. A first pixel value of the embedded data may indicate a format used for the embedded data.

A part or the whole of a nonce value may be stored and transmitted in at least a part of embedded data indicating a vendor specific code (Vendor specific) or a reserved code (Reserved for future use) as illustrated in FIG. 85B. The embedded data in the frame is stored either between the frame start and the first image data or the user defined data, or between the last image data or the user defined data and the frame end. However, the embedded data between the last image data or the user defined data and the frame end may be omitted.

FIG. 86 illustrates an example of a data structure of image data for two frames transmitted from the image sensor 1211.

As illustrated in FIG. 86, after a frame start (VC1 FS) of a first virtual channel is transmitted, a frame start (VC2 FS) of a second virtual channel is transmitted following a read command and a read response. Next, first embedded data (VC1 Emb Data) of the first virtual channel and first embedded data (VC2 Emb Data) of the second virtual channel are transmitted. Then, image data (VC1 Img Data) of the first virtual channel and user defined data (VC2 UD Data) of the second virtual channel for one frame are transmitted. When the transmission for one frame is completed, second embedded data (VC1 Emb Data) of the first virtual channel and second embedded data (VC2 Emb Data) of the second virtual channel are transmitted. Thereafter, after a frame end (VC1 FE) of the first virtual channel is transmitted, a frame end (VC2 FE) of the second virtual channel is transmitted following the read command and the read response.

FIG. 86 illustrates an example in which a message count value is shared by the first virtual channel and the second virtual channel. In this case, independent sage counters may be provided in the first virtual channel and the second virtual channel. In addition, the user defined data may be image data or the like.

Here, a part or the whole of a nonce value is stored, for example, in a period from the frame start to the frame end or in a period from the frame end to the frame start (frame blanking period). Furthermore, the nonce value within the period from the frame start to the frame end may be stored, for example, in any of embedded data, image data, non-image data, or a line blanking period. In addition, the nonce value may be stored in the second virtual channel.

The frame start and the frame end are defined, and thus, for example, it is possible to notify the processor of the start and end of high-speed data transmission from the image sensor. Furthermore, the image sensor can keep the frame transmission cycle constant. Note that the embedded data is data in which an attribute indicating image data, information (metadata) related to the image data, or the like are stored.

In the present embodiment, an example in which high-speed data transmission of a nonce value is executed without hindering high-speed data transmission of image data will be described. That is, an example in which high-speed data transmission of image data and high-speed data transmission of a nonce value are executed in series instead of parallel execution will be described. However, in a case where communication paths are different between high-speed data transmission of image data and transmission of a nonce value (high-speed data transmission or low-speed command transmission), parallel execution may be performed.

Note that since the high-speed data transmission and the low-speed command transmission can be separated in frequency by a filter, the transmissions may be partially or entirely duplicated (executed in parallel) as long as there is no problem in power consumption. A part or the whole of the nonce value may be transmitted every multiple frames, but it is desirable that a part or the whole of the nonce value is transmitted every frame, for example, for reasons such as frame missing. For example, a frame start (Frame Start; FS) packet includes frame start code (Data Type=0x00), and a frame end (Frame End; FE) packet includes a frame end code (Data Type=0x01).

FIG. 87 is a flowchart for describing an image data transmission process in which the image sensor 1211 transmits image data.

In step S621, the extension mode-compatible CSI-2 transmission circuit 1304 determines whether or not a command to start high-speed data transmission has been received, and waits for the process until it is determined that a command to start high-speed data transmission has been received. Then, in a case where the extension mode-compatible CSI-2 transmission circuit 1304 determines that a command to start high-speed data transmission has been received in step S621, the process proceeds to step S622.

In step S622, the pixel 1301 starts imaging, and image data output from the pixel 1301 is supplied to the extension mode-compatible CSI-2 transmission circuit 1304 via the AD converter 1302 and the image processing unit 1303.

In step S623, the extension mode-compatible CSI-2 transmission circuit 1304 transmits the frame start of the first virtual channel.

In step S624, the extension mode-compatible CSI-2 transmission circuit 1304 transmits the frame start of the second virtual channel.

In step S625, the extension mode-compatible CSI-2 transmission circuit 1304 transmits the first embedded data of the first virtual channel.

In step S626, the extension mode-compatible CSI-2 transmission circuit 1304 transmits the first embedded data of the second virtual channel.

In step S627, the extension mode-compatible CSI-2 transmission circuit 1304 transmits the image data of the first virtual channel.

In step S628, the extension mode-compatible CSI-2 transmission circuit 1304 transmits the user defined data of the second virtual channel.

In step S629, the extension mode-compatible CSI-2 transmission circuit 1304 determines whether or not transmission of the image data for one frame has been completed.

In a case where the extension mode-compatible CSI-2 transmission circuit 1304 determines in step S629 that the transmission of the image data for one frame has not been completed, the process returns to step S627, and similar processes are repeatedly performed thereafter. On the other hand, in step S629, in a case where the extension mode-compatible CSI-2 transmission circuit 1304 determines that the transmission of the image data for one frame has been completed, the process proceeds to step S630.

In step S630, the extension mode-compatible CSI-2 transmission circuit 1304 transmits the second embedded data of the first virtual channel.

In step S631, the extension mode-compatible CSI-2 transmission circuit 1304 transmits the second embedded data of the second virtual channel.

In step S632, the extension mode-compatible CSI-2 transmission circuit 1304 transmits the frame end of the first virtual channel.

In step S633, the extension mode-compatible CSI-2 transmission circuit 1304 transmits the frame end of the second virtual channel.

In step S634, the extension mode-compatible CSI-2 transmission circuit 1304 determines whether or not a command to end the high-speed data transmission has been received.

In step S634, in a case where the extension mode-compatible CSI-2 transmission circuit 1304 determines that a command to end the high-speed data transmission has not been received, the process returns to step S622, and similar processes are repeatedly performed thereafter. On the other hand, in a case where the extension mode-compatible CSI-2 transmission circuit 1304 determines in step S634 that a command to end the high-speed data transmission has been received, the process is ended.

The imaging start may be continuously executed until a command to end the high-speed data transmission is received, or may be executed each time a command to end the high-speed data transmission is received.

FIG. 88 is a flowchart for describing an integrity calculation value transmission process in which the image sensor 1211 transmits an integrity calculation value.

In step S641, the security unit 1310 derives a session key of the first virtual channel.

In step S642, the security unit 1310 derives a session key of the second virtual channel.

In step S643, the message counter 1308 initializes an upper count value of the message count value to be set to 0.

In step S644, the message counter 1308 initializes a lower count value of the message count value to be set to 0.

In step S645, the extension mode-compatible CSI-2 transmission circuit 1304 determines whether or not to end the session, and in a case where it is determined not to end the session, the process proceeds to step S646.

In step S646, the extension mode-compatible CSI-2 transmission circuit 1304 determines whether or not to transmit the extended packet of the first virtual channel.

In a case where the extension mode-compatible CSI-2 transmission circuit 1304 determines not to transmit the extended packet of the first virtual channel in step S646, the process returns to step S645, and similar processes are repeatedly performed thereafter. On the other hand, in step S646, in a case where the extension mode-compatible CSI-2 transmission circuit 1304 determines to transmit the extended packet of the first virtual channel, the process proceeds to step S647.

In step S647, the security unit 1310 calculates an integrity calculation value of the first virtual channel by using the session key of the first virtual channel derived in step S641.

In step S648, the extension mode-compatible CSI-2 transmission circuit 1304 disposes the integrity calculation value calculated in step S647 in the extended packet of the first virtual channel, and transmits the extended packet of the first virtual channel.

In step S649, the extension mode-compatible CSI-2 transmission circuit 1304 determines whether or not to transmit the extended packet of the second virtual channel, and waits for the process until it is determined to transmit the extended packet of the second virtual channel. Then, in step S649, in a case where the extension mode-compatible CSI-2 transmission circuit 1304 determines to transmit the extended packet of the second virtual channel, the process proceeds to step S650.

In step S650, the security unit 1310 calculates an integrity calculation value of the second virtual channel by using the session key of the second virtual channel derived in step S642.

In step S651, the extension mode-compatible CSI-2 transmission circuit 1304 disposes the integrity calculation value calculated in step S650 in the extended packet of the second virtual channel, and transmits the extended packet of the second virtual channel.

In step S652, the message counter 1308 determines whether or not the lower count value of the message count value has been counted up to the maximum value.

In step S652, in a case where the message counter 1308 determines that the lower count value of the message count value has not been counted up to the maximum value, the process proceeds to step S653. In step S653, after the message counter 1308 increments the lower count value of the message count value, the process returns to step S645, and the similar processes are repeatedly performed thereafter.

On the other hand, in step S652, in a case where the message counter 1308 determines that the lower count value of the message count value has been counted up to the maximum value, the process proceeds to step S654. In step S654, after the message counter 1308 increments the upper count value of the message count value, the process returns to step S644, and similar processes are repeatedly performed thereafter.

Then, in step S645, in a case where the extension mode-compatible CSI-2 transmission circuit 1304 determines to end the session, the process proceeds to step S655.

In step S655, the security unit 1310 discards or cleans up the session key of the first virtual channel and the session key of the second virtual channel, and then the process is ended.

Modification Example of Data Structure of Image Data

A data structure of image data will be described with reference to FIGS. 89 to 91.

FIG. 89 illustrates a first modification example of the data structure of the image data.

In the data structure of the image data illustrated in FIG. 89, a message count value shared by the first virtual channel and the second virtual channel is used.

However, the session key or the message counter may be shared by the first virtual channel and the second virtual channel. In addition, the image data or the embedded data may be replaced with other data. For example, the embedded data may be replaced with image data. On the other hand, the message counter may be shared by counting across virtual channels (VC).

FIG. 90 illustrates a second modification example of the data structure of the image data.

In the data structure of the image data illustrated in FIG. 90, independent message count values are used in Write (CCI write command), Read1 (CCI read command), and Read2 (CCI read response).

FIG. 91 illustrates a third modification example of the data structure of the image data.

In the data structure of the image data illustrated in FIG. 91, independent message count values are provided in CCI uplink (Write and Read1) and CCI downlink (Read2). That is, the message count value may be shared by Write (CCI write command) and Read1 (CCI read command).

<Nonce Value>

Since a nonce value is, for example, a number used once for the same session key, the nonce value is used as a part or the whole of an initialization vector for encryption calculation or decryption calculation using the session key. Therefore, a nonce used by the image sensor 1211 for the encryption calculation is transmitted from the image sensor 1211 and received by the application processor 1212, and thus the application processor 1212 can obtain a nonce value necessary for the decryption calculation.

That is, it is desirable that the image sensor 1211 transmits the nonce value before transmitting the image data. Specifically, a part or the whole of a nonce value corresponding to the image data in a certain frame is stored in any of a read response, user defined data, embedded data (immediately after the image data), a frame end, a frame start, embedded data (immediately before the image data), or the like from completion of transmission of the last image data in the frame immediately before to the start of transmission of the first image data in the certain frame.

For example, the application processor 1212 that is a master of low-speed command transmission may transmit, according to low-speed command transmission, a read command for requesting the application processor 1212 to read a nonce value in the image sensor 1211 in accordance with start of reception or completion of reception of any of a frame start, embedded data, image data, user defined data, a frame end, or the like transmitted according to high-speed data transmission from the image sensor 1211 that is a slave of the low-speed command transmission.

The image sensor 1211 receives the read command transmitted from the application processor 1212 and transmits a nonce value corresponding thereto according to high-speed data transmission. Then, the application processor 1212 receives the read response such that the image sensor 1211 can notify the application processor 1212 of the nonce value.

Since the nonce value of which the image sensor 1211 has notified is used in the application processor 1212, it is desirable that a part or the whole of the nonce value is transmitted within a frame blanking period in which image data between the frame end and the next frame start is not transmitted. However, for the first frame (Frame Number=1), the first nonce value (initial value) may be agreed in advance between the image sensor 1211 and the application processor 1212, or a part or the whole of the first nonce value may be received by the application processor 1212 before the start of transmission of the image data.

This read command corresponds to, for example, Read of Read/Write in the I2C or I3C standard. On the other hand, the read response corresponds to a Read return value. Note that, in order to adjust a timing of the read response, a timer that waits for a predetermined time may be provided between reception of the high-speed data transmission by the application processor 1212 and transmission of the read command.

<I2C and I3C>

An inter-integrated circuit serial bus, sometimes referred to as an I2C bus or an I$^2$C bus, is a serial single-ended computer bus intended to be used in connecting a low-speed peripheral device to the application processor 1212. The I2C bus is a multi-master bus on which each device can act as a master and a slave for various messages transmitted on the I2C bus.

The I2C bus can transmit data by using only two bidirectional open drain connectors including a serial data line (SDA) and a serial clock line (SCL). The connectors typically include signal lines terminated by pull-up resistors. A protocol for managing an operation of the I2C bus defines the basic type of messages, and each of those messages starts with START and ends with STOP. The I2C bus uses 7-bit addressing and defines two types of nodes.

The master node is a node that generates a clock and starts communication with the slave node. The slave node is a node that receives the clock and responds when addressed by the master. The I2C bus is a multi-master bus, which means that there can be any number of master nodes. Further, the roles of the master and the slave may be changed between messages (that is, after STOP is sent). In the present embodiment, which is a camera implementation, unidirectional transmission may be used to capture images from a sensor and transmit such image data to a memory in a baseband processor, and, on the other hand, control data may be exchanged between the baseband processor and the sensor as well as other peripheral devices.

In one example, the camera control interface (CCI) protocol may be used for such control data between a baseband processor and an image sensor (or one or a plurality of slave nodes). In one example, the CCI protocol may be implemented via an I2C serial bus between an image sensor and a baseband processor. Conventional I2C systems, that is, camera control interface-based camera systems use a separate interrupt (IRQ) line for each slave device to allow the slave node to indicate to the master node that the slave node desires to use the bus.

On the other hand, the communication standard of I3C is a standard for performing communication via two signal lines such as an SDA line for transmitting data and an SCL line for transmitting a clock signal. In this standard, a device (such as a processor) is classified into a device that operates as a master or a slave and a device that operates only as a slave. For example, the processor operates as a master or a slave, and the sensor operates only as a slave.

Here, the master is a device that controls the slave, and the slave is a device that operates according to the control of the master. In addition, in I3C, a plurality of slaves may be connected to one master. Furthermore, a plurality of masters may transmit a signal to one slave, and this communication will be hereinafter referred to as "multi-master communication". Furthermore, communication may be performed between the slaves without using the master, and this communication will be referred to as "peer-to-peer communication". In addition, while the SDA line is in communication (busy) by communication of another device, the slave can interrupt the communication to perform communication, and this interruption will be referred to as "in-band Interrupt".

In the above-described multi-master communication, in-band interrupt, and peer-to-peer communication, signals simultaneously transmitted by a plurality of devices may collide on the SDA line. For example, if another slave performs in-band interrupt and transmits a signal to the master while the master transmits a signal to a certain slave, the signal from the master and the signal from the slave collide with each other. Therefore, a device in I3C has a function of detecting collision and arbitrating devices.

Since synchronization with the application processor 1212 can be easily performed by using the above-described interruption function, the nonce related information is transmitted according to a timing determined by the image sensor 1211 by performing the interruption at the timing determined by the image sensor 1211. However, the image sensor 1211 may trigger the read command through the in-band interrupt and transmit the read response accordingly, or may omit the read command through the in-band interrupt and transmit the read response.

<Integrity Calculation Value Processing>

Integrity calculation value processing will be described with reference to FIGS. 92 to 95.

FIG. 92 is a flowchart illustrating a first processing example of the integrity calculation value processing in which the image sensor 1211 transmits an integrity calculation value.

In step S661, the security unit 1310 derives a session key.

In step S662, the message counter 1308 initializes a message count value to be set to 0.

In step S663, the extension mode-compatible CSI-2 transmission circuit 1304 determines whether or not to end the session, and in a case where it is determined not to end the session, the process proceeds to step S664.

In step S664, the extension mode-compatible CSI-2 transmission circuit 1304 determines whether or not to transmit an extended packet.

In a case where the extension mode-compatible CSI-2 transmission circuit 1304 determines not to transmit an extended packet in step S664, the process returns to step S663, and similar processes are repeatedly performed thereafter. On the other hand, in a case where the extension mode-compatible CSI-2 transmission circuit 1304 determines to transmit an extended packet in step S664, the process proceeds to step S665.

In step S665, the security unit 1310 calculates an integrity calculation value using the message count value.

In step S666, the extension mode-compatible CSI-2 transmission circuit 1304 disposes the integrity calculation value calculated in step S665 in the extended packet, and transmits the extended packet.

In step S667, the message counter 1308 determines whether or not the message count value has been counted up to the maximum value. In step S667, in a case where the message counter 1308 determines that the message count value has not been counted up to the maximum value, the process proceeds to step S668.

In step S668, the message counter 1308 increments the message count value. Thereafter, the process returns to step S663, and similar processes are repeatedly performed thereafter.

On the other hand, in step S667, in a case where the message counter 1308 determines that the message count value has been counted up to the maximum value, the process proceeds to step S669. In step S669, after the security unit 1310 updates the session key, the process returns to step S662, and similar processes are repeatedly performed thereafter.

Then, in step S663, in a case where the extension mode-compatible CSI-2 transmission circuit 1304 determines to end the session, the process proceeds to step S670.

In step S670, the security unit 1310 discards or cleans up the session key, and then the process is ended.

As described above, in a case where a MAC value for each image line is calculated, stored in the extended packet footer, and transmitted, the message count value is incremented by 1 every time the extended packet is transmitted, and thus, the message count value makes one round $2^{16}$ times. For example, in a case where 4K data with a frame rate of 60 fps and the number of pixels of 4096×2160

(horizontal×vertical) is transmitted, assuming that extended packets of 2163 lines obtained by adding three lines of a frame start, embedded data, and a frame end are transmitted within one frame, the message count value makes one round $(2^{16})/(60×2163)≈0.5$ seconds.

For example, in a case where the image sensor 1211 calculates a MAC value such as a Galois Message Authentication Code (GMAC) value for a message by using the same initialization vector value with the same session key and transmits the message and the MAC value, an attacker can easily obtain the session key by computing simultaneous equations for the message and the MAC value. In that case, since the attacker can freely falsify the MAC value, attacks such as message forgery, falsification, and replay become possible. Therefore, in a case where the message count value is used as a variable portion of the initialization vector, that is, a nonce value, it is necessary to update the session key before the message count value makes one round. For example, the session key may be updated before the nonce value makes one round (rollover) by utilizing a period of frame blanking or line blanking.

FIG. 93 is a flowchart illustrating a second processing example of the integrity calculation value processing in which the image sensor 1211 transmits an integrity calculation value.

In step S681, the security unit 1310 derives a session key.

In step S682, the message counter 1308 initializes an upper count value of the message count value to be set to 0.

In step S683, the message counter 1308 initializes a lower count value of the message count value to be set to 0.

In step S684, the extension mode-compatible CSI-2 transmission circuit 1304 determines whether or not to end the session, and in a case where it is determined not to end the session, the process proceeds to step S685.

In step S685, the extension mode-compatible CSI-2 transmission circuit 1304 determines whether or not to transmit an extended packet.

In a case where the extension mode-compatible CSI-2 transmission circuit 1304 determines not to transmit an extended packet in step S685, the process returns to step S684, and similar processes are repeatedly performed thereafter. On the other hand, in a case where the extension mode-compatible CSI-2 transmission circuit 1304 determines to transmit an extended packet in step S685, the process proceeds to step S686.

In step S686, the security unit 1310 calculates an integrity calculation value by using the upper count value and the lower count value of the message count value.

In step S687, the extension mode-compatible CSI-2 transmission circuit 1304 disposes the integrity calculation value calculated in step S686 in the extended packet, and transmits the extended packet.

In step S688, the message counter 1308 determines whether or not the lower count value of the message count value has been counted up to the maximum value. In step S688, in a case where the message counter 1308 determines that the lower count value of the message count value has not been counted up to the maximum value, the process proceeds to step S689.

In step S689, the message counter 1308 increments the lower count value of the message count value. Thereafter, the process returns to step S684, and similar processes are repeatedly performed thereafter.

On the other hand, in step S688, in a case where the message counter 1308 determines that the lower count value of the message count value has been counted up to the maximum value, the process proceeds to step S690. In step S690, after the message counter 1308 increments the upper count value of the message count value, the process returns to step S683, and similar processes are repeatedly performed thereafter.

Then, in step S684, in a case where the extension mode-compatible CSI-2 transmission circuit 1304 determines to end the session, the process proceeds to step S691.

In step S691, the security unit 1310 discards or cleans up the session key, and then the process is ended.

As described above, in a case where the message count value is used as a part of the initialization vector, that is, a part of a nonce value (for example, the lower count value), the rest of the nonce value (for example, the upper count value) is also used together, and thus it is unnecessary to update the session key or it is possible to reduce a frequency of updating the session key.

For example, in a case where 4K data with a frame rate of 60 fps and the number of pixels of 4096×2160 (horizontal×vertical) is transmitted, the nonce value makes one round in $2^{32}÷60÷2163≈9$ hours when the upper count value having a 16-bit width is used together $2^{36}÷60÷2163≈6$ days when the upper count value having a 20-bit width is used together $2^{40}÷60÷2163≈98$ days when the upper count value having a 24-bit width is used together $2^{44}÷60÷2163≈4$ years when the upper count value having a 28-bit width is used together $2^{48}÷60÷2163≈69$ years when the upper count value having a 32-bit width is used together.

Here, in a case where the power supply of the image sensor 1211 or the application processor 1212 is restarted (turned on after being turned off), key exchange is required before the protected image data is transmitted again, and thus the session key is updated. For example, in general in-vehicle applications, a possibility that the power supply is not restarted for 6 days or more is low, and a possibility that the power supply is not restarted for 4 years or more is extremely low. Therefore, widths of 20 to 28 bits are sufficient for the upper count value. Of course, the present technology is not limited thereto, and a bit width larger than that may be used.

For example, in a case of an oil-supply-type vehicle, the power supply may be turned off at the time of oil supply, and even in a case of an oil-supply-type or a rechargeable vehicle, when the power supply is turned off at the time of vehicle inspection, key exchange is required before the protected image data is transmitted again, and thus the session key is updated. For example, in a case where an image sensor for Internet of Things or Intelligence of Things (IoT) is assumed, since it is also assumed that the power supply is not restarted, a 32-bit width is sufficient for the upper count value. Of course, the present technology is not limited thereto, and a bit width larger than that may be used.

FIG. 94 is a flowchart illustrating a third processing example of the integrity calculation value processing in which the image sensor 1211 transmits an integrity calculation value.

In step S701, the security unit 1310 derives a session key.

In step S702, the message counter 1308 initializes a frame count value to be set to 1.

In step S703, the extension mode-compatible CSI-2 transmission circuit 1304 determines whether or not to end the session, and in a case where it is determined not to end the session, the process proceeds to step S704.

In step S704, the extension mode-compatible CSI-2 transmission circuit 1304 determines whether or not to transmit an extended packet.

In a case where the extension mode-compatible CSI-2 transmission circuit 1304 determines not to transmit an extended packet in step S704, the process returns to step S703, and similar processes are repeatedly performed thereafter. On the other hand, in a case where the extension mode-compatible CSI-2 transmission circuit 1304 determines to transmit an extended packet in step S704, the process proceeds to step S705.

In step S705, the security unit 1310 prepares calculation of an integrity calculation value performed by using the frame count value.

In step S706, the extension mode-compatible CSI-2 transmission circuit 1304 transmits the extended packet.

In step S707, the extension mode-compatible CSI-2 transmission circuit 1304 determines whether or not transmission other than the frame end in the frame has been completed. In step S707, in a case where the extension mode-compatible CSI-2 transmission circuit 1304 determines that transmission other than the frame end in the frame has not been completed, the process returns to step S703, and similar processes are repeatedly performed thereafter. On the other hand, in step S707, in a case where the extension mode-compatible CSI-2 transmission circuit 1304 determines that the transmission other than the frame end in the frame has been completed, the process proceeds to step S708.

In step S708, the security unit 1310 completes the calculation of the integrity calculation value performed by using the frame count value.

In step S709, the extension mode-compatible CSI-2 transmission circuit 1304 transmits the integrity calculation value together with the frame end.

In step S710, the message counter 1308 determines whether or not the frame count value has been counted up to the specified value. In step S710, in a case where the message counter 1308 determines that the frame count value has not been counted up to a specified value, the process proceeds to step S711.

In step S711, the message counter 1308 increments the frame count value. Thereafter, the process returns to step S703, and similar processes are repeatedly performed thereafter.

On the other hand, in step S710, in a case where the message counter 1308 determines that the frame count value has been counted up to the specified value, the process proceeds to step S712. In step S712, after the security unit 1310 updates the session key, the process returns to step S702, and similar processes are repeatedly performed thereafter.

Then, in step S703, in a case where the extension mode-compatible CSI-2 transmission circuit 1304 determines to end the session, the process proceeds to step S713.

In step S713, the security unit 1310 discards or cleans up the session key, and then the process is ended.

As described above, the image sensor 1211 may calculate an integrity calculation value for each image frame and collectively transmit the integrity calculation values. The integrity calculation value in that case is stored and transmitted in embedded data after the image data, in the user defined data, or in the read response.

The frame start or the frame end may include, for example, a 16-bit frame number. This frame number may be the same between a frame start and a frame end corresponding to a predetermined frame. In a case where the 16-bit frame number is used, it is desirable that a frame number is, but not limited to, a non-zero value to distinguish from use cases where the frame number does not work and remains set to 0.

The frame number is incremented by 1 or 2 for each frame start packet having the same virtual channel, and is periodically reset to 1. For example, in a case where an image frame is masked (that is, it is not transmitted) due to damage, the frame number may be incremented by 2.

In order to cope with such a case, increments of 1 or 2 may be freely mixed in a sequence of frame numbers as necessary. That is, in a case where the frame number is incremented by 1, the frame number makes one round $2^{16}-1$ times. Furthermore, in a case where the frame rate is 60 fps, the frame number makes one round in $(2^{16}\div1)\div60\approx18$ minutes.

For example, in a case where the image sensor 1211 calculates a MAC value such as a Galois Message Authentication Code (GMAC) value for a message by using the same initialization vector value with the same session key and transmits the message and the MAC value, an attacker can easily obtain the session key by computing simultaneous equations for the message and the MAC value. In that case, since the attacker can freely falsify the MAC value, attacks such as message forgery, falsification, and replay become possible.

Therefore, in a case where the frame number is used as an initialization vector, that is, a nonce value, it is necessary to update the session key before the frame number makes one round. For example, the session key may be updated before the nonce value makes one round (rollover) by utilizing a period of frame blanking or line blanking.

FIG. 95 is a flowchart illustrating a fourth processing example of the integrity calculation value processing in which the image sensor 1211 transmits an integrity calculation value.

In step S721, the security unit 1310 derives a session key.

In step S722, the message counter 1308 initializes an upper count value of the frame count value to be set to 0.

In step S723, the message counter 1308 initializes a lower count value of the frame count value to be set to 1.

In step S724, the extension mode-compatible CSI-2 transmission circuit 1304 determines whether or not to end the session, and in a case where it is determined not to end the session, the process proceeds to step S725.

In step S725, the extension mode-compatible CSI-2 transmission circuit 1304 determines whether or not to transmit an extended packet.

In a case where the extension mode-compatible CSI-2 transmission circuit 1304 determines not to transmit an extended packet in step S725, the process returns to step S724, and similar processes are repeatedly performed thereafter. On the other hand, in a case where the extension mode-compatible CSI-2 transmission circuit 1304 determines to transmit an extended packet in step S725, the process proceeds to step S726.

In step S726, the security unit 1310 prepares calculation of an integrity calculation value performed by using the upper count value and the lower count value of the frame count value.

In step S727, the extension mode-compatible CSI-2 transmission circuit 1304 transmits the extended packet.

In step S728, the extension mode-compatible CSI-2 transmission circuit 1304 determines whether or not transmission other than the frame end in the frame has been completed. In step S728, in a case where the extension mode-compatible CSI-2 transmission circuit 1304 determines that transmission other than the frame end in the frame has not been completed, the process returns to step S724, and similar processes are repeatedly performed thereafter. On the other hand, in step S728, in a case where the extension mode-compatible CSI-2 transmission circuit 1304 determines that transmission other than the frame end in the frame has been completed, the process proceeds to step S729.

In step S729, the security unit 1310 completes the calculation of the integrity calculation value performed by using the upper count value and the lower count value of the frame count value.

In step S730, the extension mode-compatible CSI-2 transmission circuit 1304 transmits the integrity calculation value together with the frame end.

In step S731, the message counter 1308 determines whether or not the lower count value of the frame count value has been counted up to a specified value. In step S731, in a case where the message counter 1308 determines that the lower count value of the frame count value has not been counted up to the specified value, the process proceeds to step S732.

In step S732, the message counter 1308 increments the lower count value of the frame count value. Thereafter, the process returns to step S724, and similar processes are repeatedly performed thereafter.

On the other hand, in step S731, in a case where the message counter 1308 determines that the lower count value of the frame count value has been counted up to the specified value, the process proceeds to step S733. In step S733, after the security unit 1310 increments the upper count value of the frame count value, the process returns to step S723, and similar processes are repeatedly performed thereafter.

Then, in step S724, in a case where the extension mode-compatible CSI-2 transmission circuit 1304 determines to end the session, the process proceeds to step S734.

In step S734, the security unit 1310 discards or cleans up the session key, and then the process is ended.

As described above, in a case where a frame number is used as a part of the initialization vector, that is, a part of a nonce value (for example, a lower count value), the rest of the nonce value (for example, the upper count value) is also used together, and thus it is unnecessary to update the session key or it is possible to reduce a frequency of updating the session key.

For example, in a case where the nonce value is incremented by 1 at 60 fps, the nonce value makes one round in $2^4 \times (2^{18}-1) \div 60 \approx 5$ hours when the upper count value having a 4-bit width is used together $2^8 \times (2^{18}-1) \div 60 \approx 78$ hours when the upper count value having an 8-bit width is used together $2^{12} \times (2^{18}-1) \div 60 \approx 52$ days when the upper count value having a 12-bit width is used together $2^{16} \times (2^{18}-1) \div 60 \approx 828$ days when the upper count value having a 16-bit width is used together $2^{20} \times (2^{16}-1) \div 60 \approx 36$ years when the upper count value having a 20-bit width is used together $2^{24} \times (2^{16}-1) \div 60 \approx 581$ years when the upper count value having a 24-bit width is used together.

Here, in a case where the power supply of the image sensor 1211 or the application processor 1212 is restarted (turned on after being turned off), key exchange is required before the protected image data is transmitted again, and thus the session key is updated. For example, in general in-vehicle applications, since the possibility that the power supply is not restarted for three days or more is low and the possibility that the power supply is not restarted for two years or more is extremely low, widths of 8 to 16 bits are sufficient for the upper count value. Of course, the present technology is not limited thereto, and a bit width larger than that may be used.

For example, in a case of an oil-supply-type vehicle, the power supply may be turned off at the time of oil supply, and even in a case of an oil-supply-type or a rechargeable vehicle, when the power supply is turned off at the time of vehicle inspection, key exchange is required before the protected image data is transmitted again, and thus the session key is updated. For example, in a case where an image sensor for Internet of Things (IoT) or Intellingence of Things (IoT) is assumed, since it is also assumed that the power supply is not restarted, widths of 20 to 24 bits are sufficient for the upper count value. Of course, the present technology is not limited thereto, and a bit width larger than that may be used.

<Encryption and Decryption>

Encryption and decryption will be described with reference to FIGS. 96 to 100.

FIG. 96 illustrates an example of an initial counter block in which an initialization vector is stored.

As illustrated in FIG. 96, by making a structure of the initialization vector common and making a value different between virtual channels, simpler implementation can be enabled. In addition, a common session key or count value is used between virtual channels of CSI-2.

A 128-bit initial counter block is used for encryption or message authentication by Advanced Encryption Standard (AES)-Galois/Counter Mode (GCM) or Galois Message Authentication Code (AES-GMAC).

For example, a GHASH function as illustrated in FIG. 97, a GCTR function as illustrated in FIG. 98, or the like may be used to encrypt the initial counter block.

The initialization vector is used for encryption using a GCM-authenticated encryption (AE) function having an authenticated encryption function as illustrated in FIG. 99 and decryption using a GCM-authenticated decryption (AD) function having an authenticated decryption function as illustrated in FIG. 100. However, the initialization vector may be limitedly used for one function of the encryption (decryption) or the message authentication.

For example, when an initialization vector IV, plaintext P, and additional authentication data A are input to the GCM-AE function, the plaintext P is encrypted, and as a result, encrypted text C and an authentication tag T are output.

On the other hand, when the initialization vector IV, the encrypted text C, the additional authentication data A, and the authentication tag T are input to the GCM-AD function, the encrypted text C is decrypted and the plaintext P is output, and in a case where the authentication tag T and an authentication tag T 'do not match, a result (FAIL) indicating that the authentication has failed is output.

<First Transmission Method for Integrity Calculation Value>

A first transmission method for an integrity calculation value MAC will be described with reference to FIGS. 101 to 105.

FIG. 101 illustrates a data structure of image data for transmitting the integrity calculation value MAC for each line. As described above, the transmission method of transmitting the integrity calculation value MAC for each line will be hereinafter referred to as a line MAC method as appropriate.

As illustrated, the integrity calculation value MAC is transmitted per line of CSI-2, per CCI command, or per CCI return. As described above, in a case where the initialization vectors have the same value between them, more session keys are required.

For example, when the same initialization vector and the same session key are used, it is assumed that this causes the integrity calculation value MAC to be falsified.

Therefore, for the same initialization vector, it is proposed to use a total of four session keys for each of a VC0 command, VC0 return, VC1, and VC2.

On the other hand, for different initialization vectors, it is proposed to use three or less session keys.

In a first case, a first session key for uplink is used in the VC0 command, and a second session key for downlink is used in VC0 return, VC1, and VC2. In a second case, a first session key for CCI is used in VC0, and a second session key for CSI-2 is used in VC1 and VC2. In a third case, one session key for all is used in VC0, VC1, and VC2.

In addition, a total of two message count values are used. A common message count value in CSI-2 is used between VC1 and VC2, and an independent message count value in CCI is used in VC0.

Note that, although an example in which a common message counter is used between the virtual channels of CSI-2 is illustrated, an independent message counter may be used between the virtual channels of CSI-2. In this case, a part of the flowchart may be deleted. In addition, in this case, a message counter may be synchronized or asynchronous between the virtual channels of the CSI-2. For example, it may be desirable to make a message counter common from the viewpoint of implementation efficiency, or it may be desirable to make a message counter independent from the viewpoint of safety.

For example, the initialization vector having the structure illustrated in FIG. 102 is common to all virtual channels (CSI-2 and CCI). Then, a part or the whole of the initialization vector is transmitted from the transmission side to the reception side as illustrated in FIG. 103. Note that a specified value (for example, $0^2$ or $1^2$) may be used as reserved (Res) 2 bits. In addition, a value exchanged in advance may be used as a source ID or a final destination ID. In addition, the reception side may use a value ascertained by the reception side instead of a value transmitted from the transmission side to the reception side, as a part or the whole of the initialization vector. In addition, in a case where a part or the whole of the initialization vector is transmitted from the transmission side to the reception side, it is desirable that the part or all of the initialization vector is transmitted without being encrypted (in plaintext), but the present technology is not limited thereto.

Although FIG. 103 illustrates an example in which the additional message count value is stored outside the extended packet header and transmitted, the additional message count value and the message count value may be stored outside the extended packet header and transmitted. In this case, the message count value may also be stored in the extended packet header and transmitted. Note that only a part of the additional message count value may be used. For example, in a case where the additional message count value in the initialization vector is 40 bits, an actual additional message count value may be a 16-bit counter, and the count value may be stored in a part (for example, 16 bits on the LSB side) of the additional message count value in the initialization vector, and a specified value (for example, $0^{24}$ or $1^{24}$) may be stored in the rest (for example, 24 bits on the MSB side) of the additional message count value in the initialization vector. In addition, a specified value (for example, $0^{40}$ or $1^{40}$) may be stored in the entire additional message count value in the initialization vector.

Furthermore, a part or the whole of the initialization vector transmitted and set from the image sensor 1211 to the application processor 1212 may be configured not to be transmitted from the image sensor 1211 to the application processor 1212, and may be set on the basis of pre-agreement, register setting, or the like.

FIG. 104 illustrates an example of an extended format of CSI-2 or CCI.

For example, a head bit (Reserved and eVC) or a quasi-head bit (eVC) of the required extended packet header ePH0 is used as an initialization vector. Then, immediately after receiving the bit, the application processor 1212 can start computation of the GCTR function illustrated in FIG. 98 described above. That is, the transmission side and the reception side may be configured to be able to determine values of initialization vector components other than the eVC before transmitting or receiving the eVC value.

A transmission process in the line MAC method in which the image sensor 1211 transmits an integrity calculation value MAC for each line will be described with reference to a flowchart of FIG. 105.

In step S741, the security unit 1310 derives a common session key.

In step S742, the message counter 1308 initializes an upper count value of the message count value to be set to 0.

In step S743, the message counter 1308 initializes a lower count value of the message count value to be set to 0.

In step S744, the extension mode-compatible CSI-2 transmission circuit 1304 determines whether or not to end the session, and in a case where it is determined not to end the session, the process proceeds to step S745.

In step S745, the extension mode-compatible CSI-2 transmission circuit 1304 determines whether or not to transmit an extended packet of the first virtual channel.

In a case where the extension mode-compatible CSI-2 transmission circuit 1304 determines not to transmit an extended packet of the first virtual channel in step S745, the process returns to step S744, and similar processes are repeatedly performed thereafter. On the other hand, in step S745, in a case where the extension mode-compatible CSI-2 transmission circuit 1304 determines to transmit an extended packet of the first virtual channel, the process proceeds to step S746.

In step S746, the security unit 1310 calculates an integrity calculation value of the first virtual channel by using the common session key derived in step S741.

In step S747, the extension mode-compatible CSI-2 transmission circuit 1304 disposes the integrity calculation value calculated in step S746 in the extended packet of the first virtual channel, and transmits the extended packet of the first virtual channel.

In step S748, the extension mode-compatible CSI-2 transmission circuit 1304 determines whether or not to transmit an extended packet of the second virtual channel, and waits for the process until it is determined to transmit an extended packet of the second virtual channel. Then, in step S748, in a case where the extension mode-compatible CSI-2 transmission circuit 1304 determines to transmit an extended packet of the second virtual channel, the process proceeds to step S749.

In step S749, the security unit 1310 calculates an integrity calculation value of the second virtual channel by using the common session key derived in step S741.

In step S750, the extension mode-compatible CSI-2 transmission circuit 1304 disposes the integrity calculation value calculated in step S749 in the extended packet of the second virtual channel, and transmits the extended packet of the second virtual channel.

In step S751, the message counter 1308 determines whether or not the lower count value of the message count value has been counted up to the maximum value.

In step S751, in a case where the message counter 1308 determines that the lower count value of the message count value has not been counted up to the maximum value, the process proceeds to step S752. In step S752, after the message counter 1308 increments the lower count value of the message count value, the process returns to step S744, and similar processes are repeatedly performed thereafter.

On the other hand, in step S751, in a case where the message counter 1308 determines that the lower count value of the message count value has been counted up to the maximum value, the process proceeds to step S753. In step S753, after the message counter 1308 increments the upper count value of the message count value, the process returns to step S743, and similar processes are repeatedly performed thereafter.

Then, in step S744, in a case where the extension mode-compatible CSI-2 transmission circuit 1304 determines to end the session, the process proceeds to step S754.

In step S754, the security unit 1310 discards or cleans up the common session key, and then the process is ended.

As described above, the initialization vector configuration includes the extended virtual channel eVC or the virtual channel VC, so that a session key or a message counter can be shared among a plurality of types of CSI-2 virtual channels. In addition, a session key can be shared between the CSI-2 and the CCI. Note that, in a case where a substantial number of lines is different between virtual channels of CSI-2, for example, a message counter can be shared by unifying the number of lines with dummy data.

The process described with reference to FIG. 105 is an example in which the message count value is set to a lower count value and the additional message count value is set to an upper count value, and is an example in a case where there are two types of CSI-2 virtual channels.

On the other hand, the initialization vector configuration may include an extended data type eDT or a data type DT. In this case, similarly, a session key or a message counter can be shared among a plurality of data types.

Note that Reserved, the extended virtual channel eVC, and the extended data type eDT are stored as a head bit of the CSI-2/CCI extension format example, so that the processor can immediately start calculation of a part (CIPHK) of the GCTR calculation when some or all of them are received. Furthermore, in a case where a frame configuration has been agreed in advance between the image sensor 1211 and the application processor 1212, the application processor 1212 may start the calculation of a part (CIPHK) of the GCTR calculation without receiving these. That is, such an initialization vector configuration is advantageous in terms of calculation time.

Note that the additional message count value is transmitted from the image sensor 1211 to the application processor 1212, and thus the application processor 1212 can use this value as an initialization vector. Consequently, the application processor 1212 may not include the additional message counter from the viewpoint of implementation efficiency, or may include the additional message counter from the viewpoint of safety. In addition, in a case where the application processor 1212 includes an additional message counter, the image sensor 1211 may be configured not to transmit an additional message count value. That is, in a case where the initialization vector includes the extended virtual channel eVC, transmission of the additional message count value is not essential.

Second Disposition Example of Integrity Calculation Value

A second disposition example of the integrity calculation value MAC will be described with reference to FIGS. 106 to 109.

FIG. 106 illustrates a data structure of image data in which the integrity calculation value MAC is disposed for each frame. As described above, the transmission method of transmitting the integrity calculation value MAC for each frame will be hereinafter referred to as a frame MAC method as appropriate.

As illustrated, only the integrity calculation value MAC disposed in the extended packet footer remainder ePF1 of the frame end is valid, and the remaining integrity calculation value MAC is invalid. Further, the integrity calculation value MAC is derived from the extended packet header ePH, the packet data, and the extended packet footer ePF of each line except the last extended packet footer ePF of the frame.

For example, the initialization vector having the structure illustrated in FIG. 107 is common to the line MAC and the frame MAC (only CSI-2). Then, as illustrated in FIG. 108, the initialization vector is transmitted from the transmission side to the reception side.

FIG. 108 illustrates an example in which the additional frame number is stored outside the extended packet header and transmitted. In addition, the additional frame number and the frame number may be stored outside the extended packet header and transmitted. In that case, the frame number may also be stored in the frame start and transmitted. Note that only a part of the additional frame number may be used. For example, in a case where the additional frame number in the initialization vector is 24 bits, an actual additional frame number may be a 16-bit counter, the count value may be stored in a part (for example, 16 bits on the LSB side) of the additional frame number in the initialization vector, and a specified value (for example, $0^8$ or $1^8$) may be stored in the rest (for example, 8 bits on the MSB side) of the additional frame number in the initialization vector. In addition, a specified value (for example, $0^{24}$ or $1^{24}$) may be stored in the entire additional frame number in the initialization vector.

Furthermore, a part or the whole of the initialization vector transmitted and set from the image sensor 1211 to the application processor 1212 may be configured not to be transmitted from the image sensor 1211 to the application processor 1212, and may be set on the basis of pre-agreement, register setting, or the like.

A transmission process in the frame MAC method in which the image sensor 1211 transmits the integrity calculation value MAC for each frame will be described with reference to a flowchart of FIG. 109.

In step S761, the security unit 1310 derives a session key.

In step S762, the message counter 1308 initializes an upper count value for which the additional frame number is used to be set to 0.

In step S763, the message counter 1308 initializes a lower count value for which the frame number is used to be set to 1.

In step S764, the extension mode-compatible CSI-2 transmission circuit 1304 determines whether or not to end the session, and in a case where it is determined not to end the session, the process proceeds to step S765.

In step S765, the extension mode-compatible CSI-2 transmission circuit 1304 determines whether or not to transmit an extended packet.

In a case where the extension mode-compatible CSI-2 transmission circuit 1304 determines not to transmit an extended packet in step S765, the process returns to step S764, and similar processes are repeatedly performed thereafter. On the other hand, in a case where the extension mode-compatible CSI-2 transmission circuit 1304 determines to transmit an extended packet in step S765, the process proceeds to step S766.

In step S766, the extension mode-compatible CSI-2 transmission circuit 1304 transmits the extended packet.

In step S767, the message counter 1308 determines whether or not the message count value has been counted up to the maximum value.

In step S767, in a case where the message counter 1308 determines that the message count value has been counted up to the maximum value, the process proceeds to step S768. In step S768, the message counter 1308 initializes and sets the message count value to be set to 0.

On the other hand, in step S767, in a case where the message counter 1308 determines that the message count value has not been counted up to the maximum value, the process proceeds to step S769. In step S769, the message counter 1308 increments the message count value.

After the processes in steps S768 and S769, the process proceeds to step S770, and the extension mode-compatible CSI-2 transmission circuit 1304 determines whether or not transmission of all the extended packets in the frame has been completed.

In a case where the extension mode-compatible CSI-2 transmission circuit 1304 determines in step S770 that transmission of all the extended packets in the frame has not been completed, the process returns to step S764, and similar processes are repeatedly performed thereafter.

On the other hand, in a case where the extension mode-compatible CSI-2 transmission circuit 1304 determines in step S770 that transmission of all the extended packets in the frame has been completed, the process proceeds to step S771.

In step S771, the message counter 1308 determines whether or not the lower count value has been counted up to a specified value.

In step S771, in a case where the message counter 1308 determines that the lower count value has not been counted up to the specified value, the process proceeds to step S772. In step S772, after the message counter 1308 increments the lower count value, the process returns to step S764, and similar processes are repeatedly performed thereafter.

On the other hand, in step S771, in a case where the message counter 1308 determines that the lower count value has been counted up to the specified value, the process proceeds to step S773. In step S773, after the message counter 1308 increments the upper count value, the process returns to step S763, and similar processes are repeatedly performed thereafter.

Then, in step S764, in a case where the extension mode-compatible CSI-2 transmission circuit 1304 determines to end the session, the process proceeds to step S774.

In step S774, the security unit 1310 discards or cleans up the common session key, and then the process is ended.

As described above, the process described with reference to FIG. 109 is an example in which the frame number is set as the lower count value and the additional frame number is set as the upper count value. However, the calculation and transmission of the integrity calculation value, the virtual channel, the session key update, or the like are omitted, but may be combined with some or all of the above-described flowcharts. The same applies to other flowcharts.

Note that, since there is a possibility that increments of 1 or 2 are mixed in the frame number, it is desirable to increment the upper count value in a case where the lower count value is a specified value (for example, the maximum or maximum value −1). However, if the increment of the frame number is only 1, the upper count value may be incremented in a case where the lower count value is the maximum value.

Note that the frame number is transmitted from the image sensor 1211 to the application processor 1212, and thus the application processor 1212 can use this value for an initialization vector. Therefore, the application processor 1212 may not include the frame counter from the viewpoint of implementation efficiency, or may include the frame counter from the viewpoint of safety. Furthermore, in a case where the application processor 1212 includes the frame counter, the image sensor 1211 may be configured not to transmit the frame number. That is, in a case where the initialization vector includes the extended virtual channel eVC, transmission of the frame number is not essential.

Further, the additional frame number is transmitted from the image sensor 1211 to the application processor 1212, and thus the application processor 1212 can use this value for an initialization vector. Therefore, the application processor 1212 may not include the additional frame counter from the viewpoint of implementation efficiency, or may include the additional frame counter from the viewpoint of safety. Furthermore, in a case where the application processor 1212 includes the additional frame counter, the image sensor 1211 may be configured not to transmit the additional frame number.

In the case of the frame MAC method, as the message count value in the initialization vector, a specified value (for example, $0^{16}$ or $1^{16}$) may be stored, or a message count value of a specific extended packet (for example, a frame start or a frame end) may be stored. On the other hand, in the case of the line MAC method, a message count value is stored as the message count value in the initialization vector.

<Selection of Transmission Method for Integrity Calculation Value MAC>

Selection of a transmission method for the integrity calculation value MAC will be described with reference to FIGS. 110 and 111.

FIG. 110 is a flowchart for describing a selection process in which the image sensor 1211 selects a transmission method for the integrity calculation value MAC.

In step S781, the extension mode-compatible CSI-2 transmission circuit 1304 determines whether or not to transmit the integrity calculation value MAC according to the line MAC method.

In step S781, in a case where the extension mode-compatible CSI-2 transmission circuit 1304 determines to transmit the integrity calculation value MAC according to the line MAC method, the process proceeds to step S782. In step S782, the extension mode-compatible CSI-2 transmission circuit 1304 selects the line MAC method.

On the other hand, in a case where the extension mode-compatible CSI-2 transmission circuit 1304 determines not to transmit the integrity calculation value MAC according to the line MAC method in step S781, the process proceeds to step S783.

In step S783, the extension mode-compatible CSI-2 transmission circuit 1304 determines whether or not to transmit the integrity calculation value MAC according to the frame MAC method.

In step S783, in a case where the extension mode-compatible CSI-2 transmission circuit 1304 determines to transmit the integrity calculation value MAC according to the frame MAC method, the process proceeds to step S784. In step S784, the extension mode-compatible CSI-2 transmission circuit 1304 selects the frame MAC method.

On the other hand, in step S783, in a case where the extension mode-compatible CSI-2 transmission circuit 1304 determines not to transmit the integrity calculation value MAC according to the frame MAC method, the process proceeds to step S785. In step S785, the extension mode-compatible CSI-2 transmission circuit 1304 selects a non-MAC method of not transmitting the integrity calculation value MAC.

After the process in step S782, step S784, or step S785, the process proceeds to step S786. In step S786, the extension mode-compatible CSI-2 transmission circuit 1304 transmits security MAC information (refer to FIG. 111) indicating one of the line MAC method, the frame MAC method, or the non-MAC method, and then the process is ended. However, security MAC information to which 2 bits are allocated is illustrated in FIG. 111, but different bit depths may be allocated (for example, 1 bit or 8 bits). In addition, not transmitting a MAC value (for example, No MAC) may be allocated to the reserved region data (Reserved for future use).

As described above, the image sensor 1211 can freely select whether to transmit a MAC value according to the line MAC method (select the line MAC method), to transmit a MAC value according to the frame MAC method (select the frame MAC method), or not to transmit a MAC value (select the non-MAC method). Alternatively, the image sensor 1211 may select one of them in advance in agreement with the application processor 1212. For example, the image sensor 1211 may first select the line MAC method and switch the line MAC method to another method (for example, the frame MAC method) in a case where predetermined conditions are satisfied. For example, the frame MAC method may be selected first, and switched to another method (for example, the line MAC method) in a case where predetermined conditions are satisfied. For example, the non-MAC method may be selected first, and switched to another method (for example, the frame MAC method) in a case where a predetermined condition is satisfied.

Then, whether to select the line MAC method, the frame MAC method, or the non-MAC method is stored, for example, in a Security Descriptor in an extended packet header (for example, ePH2), in embedded data, in user defined data, in a read response, or the like, and transmitted from the image sensor 1211. In response to the reception, the application processor 1212 may support switching between the transmission methods for the integrity calculation value MAC.

Note that, in order to avoid confusion of the initialization vector, when the transmission methods for the integrity calculation value MAC are switched, it is desirable that a switched transmission method is transmitted from the image sensor between the start of the frame end transmission and the completion of the frame start transmission, but the present technology is not limited thereto.

Note that the initialization vector may include security MAC information for identifying whether a MAC method is the line MAC method or the frame MAC method. In that case, since the initialization vectors are not reliably duplicated between the line MAC method and the frame MAC method, switching of a transmission method for the integrity calculation value MAC is facilitated. In a case where there is no security MAC information, for example, depending on a switching timing of the transmission method for the integrity calculation value MAC, it may be necessary to designate a value to be stored in the message counter 1308 in order to avoid duplication of the initialization vectors.

<Message Count Value and Frame Count Value>

A message count value and a frame count value will be described with reference to FIGS. 112A, 112B, 113A, 113B, 113C, 113D, 113E, 114, and 115.

FIGS. 112A and 112B illustrate an examples of a cycle in which the message count value and the frame count value roll over.

As illustrated in FIG. 112A, in a case of 60 fps and 2160 rows of pixels, the message count value rolls over in about 9 hours for the upper count value of 16 bits and the lower count value of 16 bits. Similarly, the message count value rolls over in about 6 days for the upper count value of 20 bits and the lower count value of 16 bits, about 96 days for the upper count value of 24 bits and the lower count value of 16 bits, about 4 years for the upper count value of 28 bits and the lower count value of 16 bits, and about 69 years for the upper count value of 32 bits and the lower count value of 16 bits.

As illustrated in FIG. 112B, in a case of 60 fps and 1 increment, the frame count value rolls over in about 5 hours for the upper count value of 4 bits and the lower count value of 16 bits. Similarly, the frame count value rolls over in about 78 hours for the upper count value of 8 bits and the lower count value of 16 bits, in about 52 days for the upper count value of 12 bits and the lower count value of 16 bits, in about 828 days for the upper count value of 16 bits and the lower count value of 16 bits, in about 36 years for the upper count value of 20 bits and the lower count value of 16 bits, and in about 581 years for the upper count value of 24 bits and the lower count value of 16 bits.

As illustrated in FIG. 113, the initialization vector configuration may include a salt including a random number. However, for example, in a case where a random number is not generated, the salt may be a specified value (for example, $0^{32}$ or $1^{32}$).

As illustrated in FIG. 113B, the initialization vector configuration may not include a message count value (including a frame count value). Furthermore, the initialization vector may include a source ID or a final destination ID. Note that the initialization vector may include an additional frame number, a frame number, an additional message count value, and a message count value.

As illustrated in FIG. 113C, the initialization vector configuration may include an SPDM session ID. On the other hand, an XOR result of a source ID and a final destination ID may be included such that a bit width can be saved.

As illustrated in FIG. 113D, an SPDM session ID may include a ReqSessionID and a RspSessionID that will be described later.

As illustrated in FIG. 113E, the initialization vector configuration may include security protocol information (for example, SPDM/HDCP), an extended data type, or a data type.

Note that an arrangement order of the respective elements illustrated in FIG. 133 may be replaced. The MSB side (upper count value) and the LSB side (lower count value) may be exchanged. Some elements may be replaced with

US 12,652,169 B2

Page 103 / 104 other elements (for example, some or all of the salt, the parameters in the ePH, and the initialization vector component described above).

FIG. 114 is a flowchart for describing a data verification process in which the application processor 1212 performs data verification by using a message count value.

In step S791, the security unit 1326 derives a session key.

In step S792, the data verification unit 1325 initializes a processor message count value to be set to 0.

In step S793, the data verification unit 1325 initializes a processor additional message count value to be set to 0.

In step S794, the extension mode-compatible CSI-2 reception circuit 1322 determines whether or not to end the session, and in a case where it is determined not to end the session, the process proceeds to step S795.

In step S795, the data verification unit 1325 determines whether or not an additional message count value has been received from the image sensor 1211. In step S795, in a case where the data verification unit 1325 determines that the additional message count value has been received from the image sensor 1211, the process proceeds to step S796.

In step S796, the data verification unit 1325 determines whether or not the processor additional message count value and the additional message count value of the image sensor 1211 do not match.

In step S796, in a case where the data verification unit 1325 determines that the processor additional message count value and the additional message count value of the image sensor 1211 do not mismatch (match), the process proceeds to step S797. On the other hand, also in a case where the data verification unit 1325 determines in step S795 that the additional message count value has not been received from the image sensor 1211, the process proceeds to step S797.

In step S797, the data verification unit 1325 determines whether or not a message count value has been received from the image sensor 1211. In step S797, in a case where the data verification unit 1325 determines that the message count value has been received from the image sensor 1211, the process proceeds to step S798.

In step S798, the data verification unit 1325 determines whether or not the processor message count value and the message count value of the image sensor 1211 do not match.

In step S798, in a case where the data verification unit 1325 determines that the processor message count value and the message count value of the image sensor 1211 do not mismatch (match), the process proceeds to step S799.

In step S799, the data verification unit 1325 determines whether or not the processor message count value has been counted up to the maximum value. In step S799, in a case where the data verification unit 1325 determines that the processor message count value has been counted up to the maximum value, the process proceeds to step S800.

In step S800, the data verification unit 1325 initializes the processor message count value to be set to 0.

In step S801, the data verification unit 1325 determines whether or not the processor additional message count value has been counted up to the maximum value. In step S801, in a case where the data verification unit 1325 determines that the processor additional message count value has been counted up to the maximum value, the process proceeds to step S802.

In step S802, the security unit 1326 updates the session key.

In step S803, the data verification unit 1325 initializes the processor additional message count value to be set to 0. Thereafter, the process returns to step S794, and similar processes are repeatedly performed thereafter.

On the other hand, in step S797, in a case where the data verification unit 1325 determines that the message count value has not been received from the image sensor 1211, the process returns to step S794, and similar processes are repeatedly performed thereafter.

On the other hand, in a case where the data verification unit 1325 determines in step S799 that the processor message count value has not been counted up to the maximum value, the process proceeds to step S804. In step S804, the data verification unit 1325 increments the processor message count value, and thereafter, the process returns to step S794, and similar processes are repeatedly performed thereafter.

On the other hand, in step S801, in a case where the data verification unit 1325 determines that the processor additional message count value has not been counted up to the maximum value, the process proceeds to step S805. In step S805, the data verification unit 1325 increments the processor additional message count value, and thereafter, the process returns to step S794, and similar processes are repeatedly performed thereafter.

On the other hand, in step S796, in a case where the data verification unit 1325 determines that the processor additional message count value and the additional message count value of the image sensor 1211 do not match, the process proceeds to step S806. In addition, also in a case where the data verification unit 1325 determines in step S798 that the processor message count value and the message count value of the image sensor 1211 do not match, the process proceeds to step S806.

In step S806, the data verification unit 1325 performs an in-abnormal-state process assuming that an abnormality has occurred, and the process proceeds to step S807. In addition, also in a case where the extension mode-compatible CSI-2 reception circuit 1322 determines to end the session in step S794, the process proceeds to step S807.

In step S807, the security unit 1326 discards or cleans up the session key, and then the process is ended.

FIG. 115 is a diagram for describing a reflection process in which the application processor 1212 reflects a frame count value and an additional frame count value in an initialization vector.

In step S811, the security unit 1326 derives a session key.

In step S812, the data verification unit 1325 initializes a processor frame count value to be set to 1.

In step S813, the data verification unit 1325 initializes a processor additional frame count value to be set to 0.

In step S814, the data verification unit 1325 determines whether or not a frame count value has been received from the image sensor 1211, and waits for the process until it is determined that the frame count value has been received from the image sensor 1211. Then, in step S814, in a case where the data verification unit 1325 determines that the frame count value has been received from the image sensor 1211, the process proceeds to step S815.

In step S815, the security unit 1326 reflects the frame count value in the initialization vector.

In step S816, the data verification unit 1325 determines whether or not an additional frame count value has been received from the image sensor 1211, and waits for the process until it is determined that an additional frame count value has been received from the image sensor 1211. Then, in step S816, in a case where the data verification unit 1325 determines that the frame additional count value has been received from the image sensor 1211, the process proceeds to step S817.

In step S817, the security unit 1326 reflects the additional frame count value in the initialization vector.

In step S818, the data verification unit 1325 determines whether or not the frame count value and the additional frame count value have been counted up to a specified value. In step S818, in a case where the data verification unit 1325 determines that the frame count value and the additional frame count value have been counted up to the specified value, the process proceeds to step S819.

In step S819, the security unit 1326 updates the session key.

After the process in step S819 or in a case where the data verification unit 1325 determines that the frame count value and the additional frame count value have not been counted up to the specified value in step S818, the process proceeds to step S820.

In step S820, the extension mode-compatible CSI-2 reception circuit 1322 determines whether or not to end the session, and in a case where it is determined not to end the session, the process returns to step S814, and similar processes are repeatedly performed thereafter.

On the other hand, in step S820, in a case where the extension mode-compatible CSI-2 reception circuit 1322 determines to end the session, the process proceeds to step S821.

In step S821, the security unit 1326 discards or cleans up the session key, and then the process is ended.

Note that, although the message count value is incremented by 1, the increment of the frame count value (frame number) may be freely mixed with the increment of 1 or 2 in a sequence. Therefore, it is desirable that a value transmitted from the image sensor is preferentially used as the frame count value and the additional frame count value.

On the other hand, as the message count value and the additional message count value, a value counted by the application processor 1212 may be preferentially used over a value transmitted from the image sensor 1211 in order to quickly start the decryption calculation. Note that the process described with reference to the flowcharts of FIGS. 114 and 115 may be configured such that the session key is not updated.

Abbreviations are eP: extended Packet, eVC: extended Virtual Channel, and eDT: extended Data Type. Although the initialization vector example for AES-GCM/GMAC has been described, the present technology may be applied to block encryption (for example, DES: Data Encryption Standard or Triple DES) other than AES, algorithms (for example, CCM: Counter with Cipher block chaining-MAC) other than GCM/GMAC, different key lengths (for example, other than 128 bits), or different IV lengths (for example, other than 96 bits) after components, arrangement order, numerical values, and the like are adjusted as necessary.

Some or all of RandomData or OpaqueData in KEY_EXCHANGE request message, RandomData in the Successful KEY_EXCHANGE_RSP response message, Requester-Context or OpaquePSKData in the PSK_EXCHANGE request message, and ResponderContext in the PSK_EXCHANGE_RSP message in the SPDM specification based on Distributed Management Task Force (DMTF) publicly available may be used as a salt.

On the other hand, the session ID is stored as 1 Byte in, for example, Param2 in the PSK_EXCHANGE_RSP message or in the KEY_EXCHANGE_RSP response message, and is transmitted from an SPDM responder (for example, the image sensor) to an SPDM requester. Note that the PSK_EXCHANGE_RSP message and the KEY_EXCHANGE_RSP response message are SPDM options, but the PSK_EXCHANGE_RSP message corresponding to the common key encryption scheme or the KEY_EXCHANG- E_RSP response message corresponding to the public key encryption scheme is substantially essential in order to derive an SPDM session key, and a session ID may be included in the initialization vector. However, it is desirable that the session ID is different from previous five sessions or active sessions for the same endpoint.

Further, the PSK_EXCHANGE request message or the KEY_EXCHANGE request message may include ReqSessionID (for example, 2 bytes) as a requester-side session ID, the PSK_EXCHANGE_RSP response message or the Successful KEY_EXCHANGE_RSP response message may include RspSessionID (for example, 2 bytes) as a responder-side session ID, and a session ID=Concatenate (ReqSessionID, RspSessionID) obtained by concatenating the two IDs (for example, 4 bytes) may be used as a unique session ID between the requestor and the responder. In this case, a session key or a message counter can be shared among a plurality of types of sessions.

On the other hand, in display applications (for example, DSI-2), High-bandwidth Digital Content Protection (HDCP) may be used as a security protocol instead of SPDM. Therefore, security protocol information (refer to FIG. 116) for identifying whether to use SPDM or HDCP may be included in the initialization vector. However, although FIG. 116 illustrates the security protocol information to which 2 bits are allocated, different bit depths may be allocated (for example, 1 bit or 8 bits). In addition, not corresponding to a security protocol (for example, No security protocol) may be allocated to reserved region data (Reserved for future use).

For example, bits dedicated to SPDM or HDCP may be allocated and defined in a new format, in an ePH format (for example, Reserved, eVC, eDT, or Security Descriptor), in a session ID, or the like, and included in the initialization vector. In this case, a session key or a message counter can be shared between a plurality of types of security protocols. Similarly, a part of the extended packet header may be included in the initialization vector, for example, a Security Descriptor (for example, also referred to as a Service Descriptor) may be included in the initialization vector. In that case, a session key or a message counter can be shared between different Security Descriptors.

The image sensor 1211 or the application processor 1212 may use a value stored and received in an extended packet header (for example, ePH4) instead of pre-exchange as a source ID or a final destination ID as illustrated in FIGS. 117A and 117B.

Note that, as a connection form in which three or more devices (for example, a plurality of cameras and a plurality of displays) are connected via cables to perform communication, there is a daisy chain method in which a next device is connected to a previous device in a "piggyback manner", and a source ID and a final destination ID are included in the initialization vector, so that a session key or a message counter can be shared between a plurality of devices.

However, the source ID and the final destination ID are replaced by, for example, a command to the image sensor or data from the image sensor. In order to avoid this, the source ID and the final destination ID in the initialization vector may be defined as, for example, a host ID and a device ID. However, for example, since the image sensor can be a host or a device (non-host), it may be desirable to define the IDs as the source ID and the final destination ID.

Therefore, for example, an ID obtained by performing a logical operation (for example, XOR) on the source ID and the final destination ID may be used. In that case, there is also an effect that a bit width defined in the initialization vector is saved. Note that, in the case of I2C or I3C, the source ID or the final destination ID may store the master address or the slave address as illustrated in FIGS. 117A and 117B described above.

Note that, for example, in a case where image data is transmitted from the image sensor 1211 to the application processor 1212 in the data structure in FIG. 86 described above, in order to realize E2E protection, a device ID of the image sensor 1211 is stored as the source ID, and a device ID of the application processor 1212 is stored as the final destination ID.

On the other hand, for example, in a case where a command is transmitted from the application processor 1212 to the image sensor 1211 in the data structure in FIG. 86 described above, in order to realize E2E protection, a device ID of the application processor 1212 is stored as the source ID, and a device ID of the image sensor 1211 is stored as the final destination ID. In this case, a device ID of the SerDes device 25 or the SerDes device 26 as illustrated in FIG. 2 is an intermediate destination ID, and is desirably distinguished from the final destination ID in some cases. However, in some cases, the final destination ID in the IV format may be replaced with a destination ID. In addition, an eVC may be replaced with a VC, and an eDT may be replaced with a DT.

Furthermore, an eVC or a VC may be an ID (stream ID) of any of a video stream, an audio stream, a camera stream, a display stream, or the like. Furthermore, since an audio stream may be used as a stream instead of a video stream, stream information for identifying whether or not a stream is a video stream or an audio stream may be included in the initialization vector. In this case, a session key or a message counter can be shared between the video stream and the audio stream.

A part or the whole of a nonce value may be stored and transmitted in data of different virtual channels (for example, in a frame start, in embedded data, in image data, and in a frame end). This is effective, for example, in a case where there is no room to store a part or the whole of the nonce value in the data of a specific virtual channel.

On the other hand, a part or the whole of the nonce value may be stored and transmitted in at least a part of packet data (Generic Short Packet Data Types or Generic Long Packet Data Types), user defined data (User Defined Byte-based Data), or reserved region data (Reserved for future use) in a virtual channel different from a virtual channel for image data transmission. That is, a part or the whole of the nonce value may be stored in non-image data.

Note that, in the above description, the start of imaging is specified, but the end of imaging is not specified. This is because an imaging method differs depending on, for example, whether or not an imaging method is a global shutter method or a rolling shutter method. For example, in the case of the global shutter method, since all the pixels can perform imaging at the same time, imaging may be ended before the next process, or imaging may be ended before first image data in a frame is transmitted. On the other hand, in the case of the rolling shutter method, at least a part of imaging and high-speed data transmission executed in each row of pixels may be redundantly executed (executed in parallel), and thus the imaging is only required to be completed before last image data in a frame is transmitted. Furthermore, an imaging start position is an example, and imaging may be executed with a delay to a position before first image data in a frame is transmitted.

Detailed Configuration Example of Image Sensor that Detects Presence or Absence of Abnormality and Transmits Message According to Detection Result as Singular Message to Application Processor In an imaging device that is mounted on a vehicle and can detects a failure in an imaging element having a structure in which a plurality of substrates is stacked, a technology is disclosed in which a row drive unit provided on a second substrate detects a failure depending on whether or not a timing at which a control signal for controlling accumulation and reading of pixel signals of a pixel array provided on a first substrate is output coincides with a timing at which the control signal output from the row drive unit passes through the pixel array and is detected (refer to WO 2017/209221 A).

However, during a driving assistance process or an automated driving process, an abnormality of a sensor causes a state directly leading to a fatal accident. Therefore, when the abnormality of the sensor is detected by the above-described failure detection, it is necessary to warn a vehicle from the sensor as soon as possible. In addition, in a case where the above-described failure detection is executed, if the sensor suddenly stops streaming of image data when the abnormality of the sensor is detected, the image data is interrupted during driving depending on a timing, and thus the driving assistance process and the automated driving process are interrupted, so that there is a risk of inducing danger.

On the other hand, a technology is disclosed in which, in order to provide a solid-state imaging device capable of outputting a more accurate abnormality detection signal, the imaging device includes a pixel that outputs a pixel signal that is an analog signal, a reading unit that converts the pixel signal into a digital signal to generate a digital pixel signal, a storage unit that stores the digital pixel signal, and a first inspection signal output unit that outputs a first inspection signal to the storage unit and causes the storage unit to store the first inspection signal, in which the first inspection signal stored in the storage unit is output from the storage unit in a period after output of a digital pixel signal of a certain frame is finished and before output of a digital pixel signal of a next frame is started (refer to Japanese Patent Application Laid-Open No. 2018-121325).

In a case where such a technology is applied, an image processing unit outside the imaging device determines whether or not the first inspection signal matches an expected value, but it takes time to determine whether or not the first inspection signal matches the expected value. In addition, the imaging device does not ascertain the determination result from the image processing unit. In addition, there is a possibility that the first inspection signal is falsified by at least one of noise, interference, or an attack by an attacker, and thus there is a possibility that it is determined that the signal is abnormal even though it is normal, or it is determined that the signal is normal even though it is abnormal.

That is, in any case, in a propulsion device that controls propulsion of a vehicle, a robot, a drone, or the like capable of propulsion such as traveling, walking, flying, or the like, there is a possibility that an abnormality of a sensor cannot be appropriately handled and safety is lowered.

Therefore, the image sensor 1211 may detect the presence or absence of abnormality, and transmit a message corresponding to a detection result to the application processor 1212 according to high-speed data communication for transmitting image data as a singular message.

With such a configuration, it is possible to promptly notify the application processor 1212 of a singular message which is a message related to the presence or absence of abnormality of the image sensor 1211.

As a result, in the application processor 1212, it is possible to quickly and appropriately handle the abnormality of the image sensor 1211, and it is possible to further improve safety.

Here, a detailed configuration example of the image sensor 1211 that detects the presence or absence of abnormality and transmits a message corresponding to a detection result to the application processor as a singular message will be described with reference to FIG. 118. FIG. 118 is a block diagram illustrating a detailed configuration example of the image sensor 1211 that detects the presence or absence of abnormality and transmits a message corresponding to a detection result to the application processor as a singular message.

The image sensor 1211 in FIG. 118 includes a pixel 1501, an AD converter 1502, an image processing unit 1503, an extension mode-compatible CSI-2 transmission circuit 1504, a physical layer processing unit 1505, an I2C/I3C slave 1506, a storage unit 1507, a disturbance detection unit 1508, a failure detection unit 1509, a security unit 1510, an infringement detection unit 1511, and a temperature measurement unit 1512.

Note that the pixel 1501, the AD converter 1502, the image processing unit 1503, the extension mode-compatible CSI-2 transmission circuit 1504, the physical layer processing unit 1505, the I2C/I3C slave 1506, and the storage unit 1507 have similar functions as those of the corresponding pixel 1301, AD converter 1302, the image processing unit 1303, the extension mode-compatible CSI-2 transmission circuit 1304, the physical layer processing unit 1305, the I2C/I3C slave 1306, and the storage unit 1307 in other embodiments, and thus detailed description thereof will be omitted.

The disturbance detection unit 1508 is electrically directly or indirectly connected to at least one of the pixel 1501, the AD converter 1502, or the image processing unit 1503. Note that FIG. 119 illustrates an example in which the disturbance detection unit 1508 is connected to all of the pixel 1501, the AD converter 1502, and the image processing unit 1503, but it is sufficient that the disturbance detection unit is connected to at least one of them.

The disturbance detection unit 1508 detects an abnormality from the presence or absence of a light irradiation attack (disturbance) that substantially invalidates or falsifies an image from the image sensor 1211 on the basis of an output result of at least one of a pixel signal including an analog signal output through photoelectric conversion corresponding to an amount of light received in the pixel 1501, a pixel signal converted into a digital signal by the AD converter 1502, or image data subjected to image processing output from the image processing unit 1503, and notifies the application processor 1212 of a singular message based on the detection result according to high-speed data communication for transmitting image data.

With such a configuration, the application processor 1212 can quickly perform handling corresponding to the singular message by acquiring the singular message corresponding to the presence or absence of the disturbance according to the high-speed data communication.

The failure detection unit 1509 is electrically directly connected or indirectly connected to, for example, a communication path or the physical layer processing unit 1505.

The failure detection unit 1509 detects the presence or absence of an injection attack such as disabling some or all operations in the image sensor 1211, causing a malfunction, causing false information to flow in, or causing information to flow out, for example, by any of power injection, electromagnetic irradiation (injection), or laser irradiation (injection) with respect to the image sensor 1211, and notifies the application processor 1212 of a singular message based on a detection result according to the high-speed data communication for transmitting image data.

Furthermore, the failure detection unit 1509 detects the presence or absence of an insertion attack such as disabling some or all of operations in the image sensor 1211, causing a malfunction, causing false information to flow in, or causing information to flow out by inserting a hardware troy (that is, a foreign substance) that adversely affects the image sensor 1211, and notifies the application processor 1212 of a singular message based on a detection result according to the high-speed data communication for transmitting image data.

With such a configuration, the application processor 1212 can quickly perform handling corresponding to the singular message by acquiring the singular message corresponding to the presence or absence of a failure according to the high-speed data communication.

For example, the infringement detection unit 1511 is electrically directly connected or indirectly connected to the security unit 1510, detects an abnormality of the security unit 1510, and notifies the application processor 1212 of a singular message based on a detection result according to the high-speed data communication for transmitting image data.

For example, in addition to an injection attack that disables some or all of the operations in the image sensor 1211, causes a malfunction, causes false information to flow in, or causes information to flow out, the security unit 1510 may be subjected to an analysis attack (power analysis attack or electromagnetic analysis attack) that causes information in the image sensor 1211 to flow out by analyzing power used for the image sensor 1211 or electromagnetism generated from the image sensor 1211.

Therefore, the infringement detection unit 1511 logically detects the presence or absence of falsification in the security unit 1510 due to the injection attack, or physically detects whether or not an attack object (for example, a probe) necessary for power analysis or electromagnetic analysis is present in the vicinity of the security unit 1510, and notifies the application processor 1212 of a singular message based on a detection result according to the high-speed data communication for transmitting image data.

With such a configuration, the application processor 1212 can quickly perform handling corresponding to the singular message by acquiring the singular message corresponding to the presence or absence of an infringement according to the high-speed data communication.

The temperature measurement unit 1512 measures the temperature of the image sensor 1211, and notifies the application processor 1212 of a singular message according to the high-speed data communication for transmitting image data on the basis of whether or not the temperature is in a state of being lower than an upper limit value (first threshold value) and higher than a lower limit value (second threshold value) of an operation guarantee temperature.

With such a configuration, the application processor 1212 can quickly perform handling corresponding to the singular message by acquiring the singular message corresponding to the operation temperature of the image sensor 1211 according to the high-speed data communication.

The message counter 1513 has a basic function similar to message counter 1308 (FIG. 76), but further uses a first counter that is incremented or decremented and a second count that is incremented or decremented as a message count value. The message counter 1513 uses the first counter and the second counter to improve resistance to malfunction or falsification of a message count value. Note that details of the message counter 1513 will be described later with reference to FIGS. 150 to 152. Of course, the message counter 1308 (only one of the first counter or the second count) may be used instead of the message counter 1513.

<Disturbance Detection by Disturbance Detection Unit (Part 1)>

For example, when the image sensor 1211 is irradiated with any of visible light, infrared light, laser light, or the like having an intensity higher than a predetermined intensity, an image captured by the image sensor 1211 is substantially invalidated or falsified.

Therefore, for example, in a case where any of visible light, infrared light, laser light, or the like having an intensity higher than a predetermined intensity is detected, it can be considered that an abnormality caused by a light irradiation attack (disturbance) has occurred.

Therefore, in a case where any of visible light, infrared light, laser light, and the like having an intensity higher than a predetermined intensity is detected on the basis of the output result, the disturbance detection unit 1508 notifies the application processor 1212 of a message indicating that an abnormality has occurred as a singular message according to the high-speed data communication for transmitting image data.

As a result, since a notification of the singular message indicating that the abnormality has occurred in the image sensor 1211 is provided according to the high-speed data communication for transmitting image data, the application processor 1212 can quickly perform handling corresponding to the singular message.

More specifically, in a case where the image sensor 1211 receives disturbance of invalidation, at least any of pixel values of R, G, B, IR, or the like of each pixel group within a predetermined range (a part or the whole of an effective pixel region) approaches saturation.

That is, a pixel value of the pixel group within the predetermined range is equal to or greater than the first threshold value (upper limit value). Therefore, in a case where it is detected that the pixel value of the pixel group within the predetermined range is equal to or greater than the first threshold value (upper limit value), for example, an abnormality message indicating that the pixel value of the pixel of the image sensor 1211 is approaching saturation is transmitted to the application processor 1212 as a singular message.

Note that, in addition to the light irradiation attack, in a case where pixel values of pixels in a wide range (predetermined range) are approaching saturation, an abnormality message indicating that an abnormality has occurred in the pixels in the wide range may be transmitted as a singular message. Such a notification of the singular message is effective, for example, even in a case where the image sensor 1211 is accidentally irradiated with disturbance light.

On the other hand, for example, there is also a light shielding attack (disturbance) in which the surface (light reception surface) of the image sensor 1211 is shielded by at least one of paint, a blackout curtain, a haze, a shielding material, or the like, and an image captured by the image sensor 1211 is substantially invalidated.

Therefore, in a case where it is detected that the surface of the image sensor 1211 is shielded, the image sensor 1211 notifies the application processor 1212 of a singular message as a message indicating abnormality.

As a result, the application processor 1212 that receives the singular message can quickly perform handling corresponding to the singular message.

More specifically, in a case where the image sensor 1211 receives disturbance of invalidation due to shielding, a pixel value of at least one of R, G, B, IR, or the like of each of the pixel groups within the predetermined range is close to the second threshold value (lower limit value).

In other words, in a case where the image sensor 1211 receives disturbance of invalidation due to shielding, the pixel value of the pixel group within the predetermined range is equal to or smaller than the second threshold value, and it is detected that shielding has occurred. Therefore, in a case where shielding is detected, for example, the image sensor 1211 transmits an abnormality message indicating an abnormality in which the pixel value is close to the second threshold value as a singular message.

Note that, in addition to the light shielding attack, an abnormality message may be transmitted in a case where a pixel value in a wide range (predetermined range) is close to the second threshold value (lower limit value). Such a notification of the singular message is effective even in a case where the surface (light reception surface) of the image sensor 1211 is accidentally shielded (disturbed), for example.

Note that, in a case where an abnormality indicating the disturbance of invalidation of the image sensor 1211 is not detected on the basis of the detection result from the disturbance detection unit 1508, a message indicating normality may be transmitted as a singular message, or no singular message may be transmitted.

Thus, the first threshold value (upper limit) and the second threshold value (lower limit) used by the disturbance detection unit 1508 may be stored in advance in the storage unit 1507, for example. In this case, the disturbance detection unit 1508 may read and use the first threshold value (upper limit value) and the second threshold value (lower limit value) stored in the storage unit 1507. In addition, the first threshold value (upper limit value) and the second threshold value (lower limit value) may be freely set.

(Disturbance Detection Process in Disturbance Detection Unit (Part 1))

Next, a disturbance detection process (part 1) in the disturbance detection unit 1508 will be described with reference to a flowchart of FIG. 119.

In step S1001, at least one of imaging processing in the pixel 1501, AD conversion processing in the AD converter 1502, or image processing in the image processing unit 1503 is executed, and a processing result is output to the disturbance detection unit 1508.

In step S1002, the disturbance detection unit 1508 determines whether or not a pixel value of a pixel group within a predetermined range is equal to or greater than the first threshold value (upper limit value) (greater than the upper limit value) on the basis of at least one processing result of the imaging processing in the pixel 1501, the AD conversion processing in the AD converter 1502, or the image processing in the image processing unit 1503.

In a case where it is determined in step S1002 that the pixel value of the pixel group within the predetermined range is equal to or greater than the first threshold value (upper limit value), the process proceeds to step S1003.

In step S1003, the disturbance detection unit 1508 transmits, to the application processor 1212, a singular message including a first abnormality message indicating that the pixel value of the pixel group within the predetermined range is equal to or greater than the first threshold value (upper limit value), any of visible light, infrared light, laser light, or the like having an intensity higher than a predetermined intensity has been detected, and an abnormality caused by a light irradiation attack (disturbance) has occurred.

Furthermore, in a case where it is determined in step S1002 that the pixel value of the pixel group within the predetermined range is not equal to or greater than the first threshold value (upper limit value), the process proceeds to step S1004.

In step S1004, the disturbance detection unit 1508 determines whether or not the pixel value of the pixel group within the predetermined range is equal to or smaller than the second threshold value (lower limit value) (smaller than the lower limit value) on the basis of at least one processing result of the imaging processing in the pixel 1501, the AD conversion processing in the AD converter 1502, or the image processing in the image processing unit 1503.

In a case where it is determined in step S1004 that the pixel value of the pixel group within the predetermined range is equal to or smaller than the second threshold value (lower limit value), the process proceeds to step S1005.

In step S1005, the disturbance detection unit 1508 transmits, to the application processor 1212, a singular message including a second abnormality message indicating that the pixel value of the pixel group within the predetermined range is equal to or smaller than the second threshold value (lower limit value), and for example, the surface (light reception surface) of the image sensor 1211 is shielded by at least one of paint, a blackout curtain, a haze, a shielding material, or the like, and an abnormality caused by a light shielding attack (disturbance) that substantially invalidates an image captured by the image sensor 1211 has occurred.

Furthermore, in a case where it is determined in step S1004 that the pixel value of the pixel group within the predetermined range is not equal to or smaller than the second threshold value (lower limit value), the process proceeds to step S1006.

In step S1006, the disturbance detection unit 1508 transmits, to the application processor 1212, a singular message including a normality message indicating that no abnormality has occurred due to an attack (disturbance) that substantially invalidates an image captured by the image sensor 1211.

Through the above process, in a case where an attack (disturbance) on the image sensor 1211 occurs, a notification is provided according to the high-speed data communication for transmitting image data, and thus, it is possible to perform quick and appropriate handling in the application processor 1212.

<Disturbance Detection in Disturbance Detection Unit (Part 2)>

In the above description, an example has been described in which the presence or absence of an attack (disturbance) on the image sensor 1211 due to a change in light intensity is detected and a notification of a singular message is provided.

When the image sensor 1211 functions as a distance measuring sensor using a time of flight (ToF) method, the image sensor 1211 detects a light reception pattern corresponding to a light emission pattern of laser light emitted from a light source to recognize the light as reflected light of the light emitted from an own light source, and distinguishes the light reception pattern from light reception patterns from other light sources. In this case, the distance measuring sensor realizes distance measurement in units of pixels according to a round-trip time based on a difference between an irradiation timing and a light reception timing of light emitted from an own light source, and generates a distance image from a distance measurement result.

Here, the distance image is an image generated from a distance pixel signal based on a distance measured by measuring a distance in a depth direction of a subject from the distance measuring sensor for each pixel. In this case, the distance measuring sensor is implemented as a configuration including, for example, an illumination unit, an imaging unit, a control unit, a display unit, and a storage unit.

However, if this light emission pattern (light reception pattern) is falsified for some reason, the light emission pattern emitted from an own light source cannot be recognized, so that appropriate distance measurement cannot be realized, and thus a state of the occurrence of an abnormality is brought.

Therefore, the disturbance detection unit 1508 may store a light emission pattern (light reception pattern) as a storage pattern in advance in the storage unit 1507, and detect the presence or absence of the occurrence of abnormality through comparison with a light reception pattern actually received by the image sensor 1211.

The illumination unit includes an illumination control unit and a laser light source. The illumination control unit controls a pattern in which the laser light source emits irradiation light (laser light) under the control of the control unit. For example, the illumination control unit controls a pattern (light emission pattern) in which the laser light source emits the irradiation light according to irradiation codes included in an irradiation signal supplied from the control unit.

The imaging unit includes a lens, an imaging element, and a signal processing circuit. The lens forms an image of incident light on an imaging surface of the imaging element. The lens may be freely configured, and for example, may be configured by a plurality of lens groups. The imaging element is implemented by, for example, the image sensor 1211 including a complementary metal oxide semiconductor (CMOS) image sensor using a ToF method. The imaging element images a subject under the control of the control unit, and supplies an image signal obtained as a result to the signal processing circuit. For example, the imaging element generates a pixel signal indicating a correlation between a reference signal supplied from the control unit and received light including reflected light obtained by reflecting irradiation light emitted from the laser light source at a subject, and supplies the pixel signal to the signal processing circuit. Note that the reference signal includes a reference code indicating a pattern used to detect a correlation with the received light.

Here, in a case where there is an abnormality in a result extracted by the image sensor 1211 from the received light for any of light reception patterns such as a light reception waveform pattern, a light reception spot pattern, a light reception dot pattern, and a light reception trajectory pattern, and an abnormality message may be transmitted from the imaging unit (corresponding to the image sensor 1211) including an imaging element (corresponding to a pixel and a converter) and a signal processing circuit (corresponding to an image processing unit) to the control unit (corresponding to the application processor 1212).

On the other hand, the light reception pattern may be transmitted as a singular message instead of storing a storage pattern in the storage unit in the image sensor 1211. In this case, a storage pattern is stored in a storage unit (for example, the application processor 1212) outside the image sensor 1211, and is compared with the light reception pattern such that it is determined whether or not the light reception pattern is normal or abnormal.

<Light Reception Pattern>

In a case where a light reception pattern itself is transmitted, information related to pixels that are not receiving light may not be transmitted at a high speed. For example, in a case where a pixel indicated by a white circle is a dot pattern indicating a pixel that is receiving light as illustrated in FIG. 120, only information related to the dot pattern of receiving light indicated by the white circle may be transmitted at a high speed. For example, pixels that are not receiving light are used to determine whether or not a light reception spot pattern and a light reception dot pattern are normal or abnormal. In this case, the image sensor 1211 can determine whether or not the light reception pattern is normal or abnormal while minimizing an amount of data to be transmitted at a high speed.

In addition, in a case of a periodic light reception dot pattern, the number of types of storage patterns stored in the storage unit can be reduced. For example, in a case where a pixel that receives light with a first pixel value indicated by a white circle and a pixel that receives light with a second pixel value indicated by a hatched circle as illustrated in FIG. 121 are dot patterns indicating pixels that are receiving light, if dot patterns for two rows, that is, a dot pattern for an odd row and a dot pattern for an even row are stored in the storage unit 1507, it is possible to determine whether or not an actual light reception pattern is normal or abnormal. As described above, in the periodic light reception dot pattern and the like, a storage pattern is stored by storing only the dot patterns for the number of repeatedly expressed rows in the storage unit 1507, so that a storage capacity can be reduced.

Furthermore, whether or not the light reception waveform pattern is normal or abnormal may be determined by storing the storage pattern in the storage unit 1507, but the light reception waveform pattern is irrelevant to image data or an image pattern. Therefore, the presence or absence of abnormality in the light reception waveform pattern is determined, and thus the influence on the capacity of the storage unit 1507 can be reduced even if any pattern such as the light reception spot pattern, the light reception dot pattern, and the light reception trajectory pattern is complicated.

(Disturbance Detection Process in Disturbance Detection Unit (Part 2))

Next, a disturbance detection process (part 2) using a light reception pattern in the disturbance detection unit 1508 will be described with reference to a flowchart of FIG. 122.

In step S1031, at least one of imaging processing in the pixel 1501, AD conversion processing in the AD converter 1502, or image processing in the image processing unit 1503 is executed, and a processing result is output to the disturbance detection unit 1508.

In step S1032, the disturbance detection unit 1508 extracts a light reception pattern on the basis of at least one processing result of the imaging processing in the pixel 1501, the AD conversion processing in the AD converter 1502, or the image processing in the image processing unit 1503.

In step S1033, the disturbance detection unit 1508 reads a storage pattern, which is a normal light reception pattern stored in advance in the storage unit 1507, and compares the storage pattern with the light reception pattern.

In step S1034, the disturbance detection unit 1508 determines whether or not the light reception pattern matches the storage pattern on the basis of a comparison result between the light reception pattern and the storage pattern.

In a case where it is determined in step S1034 that the light reception pattern matches the storage pattern, the process proceeds to step S1035.

In step S1035, the disturbance detection unit 1508 considers that no abnormality has occurred in the distance measurement sensor implemented by the image sensor 1211, and transmits a singular message including a normality message indicating that no abnormality has occurred to the application processor 1212.

In a case where it is determined in step S1034 that the light reception pattern does not match the storage pattern, the process proceeds to step S1036.

In step S1036, the disturbance detection unit 1508 considers that an abnormality has occurred in the distance measurement sensor implemented by the image sensor 1211, and transmits a singular message including an abnormality message indicating that the abnormality has occurred to the application processor 1212.

Through the above process, in a case where the distance measuring sensor is implemented by the image sensor 1211, when an abnormality occurs in the light reception pattern, the application processor 1212 is notified of a corresponding singular message according to the high-speed data communication for transmitting image data. As a result, the application processor 1212 can quickly and appropriately handle the abnormality that has occurred in the image sensor 1211.

<Detection of Failure by Failure Detection Unit>

Next, failure detection by the failure detection unit 1509 will be described.

In a case where the image sensor 1211 is subjected to an injection attack such as disabling some or all operations in the image sensor 1211, causing a malfunction, causing false information to flow in, or causing information to flow out, an abnormal change occurs in a voltage state or a clock state of the physical layer.

Therefore, the failure detection unit 1509 detects a change in the voltage state or a change in the clock state of the physical layer.

In a case where the failure detection unit 1509 detects an abnormal change in the voltage state of the physical layer, for example, the failure detection unit notifies the application processor 1212 of a singular message including a first abnormality message indicating that power abnormality, voltage abnormality (for example, a voltage amplitude, a voltage polarity, or IR drop), or the like occurs in the image sensor 1211 according to the high-speed data communication for transmitting image data.

In addition, in a case where the failure detection unit 1509 detects an abnormal change in the clock state of the physical layer, the failure detection unit notifies the application processor 1212 of a singular message including a second abnormality message indicating that a clock abnormality (for example, a frequency, a periodicity, the number of times, and the jitter of the clock) has occurred according to the high-speed data communication for transmitting image data.

Note that the failure detection unit 1509 may transmit a message indicating an abnormality as a singular message in a case where an abnormality occurs not only due to an injection attack but also due to accidental noise, interference, or the like.

Furthermore, for example, there is an insertion attack that disables or malfunctions some or all of the operations in the image sensor 1211, causes false information to flow in, or causes information to flow out by inserting a hardware troy (that is, a foreign substance) that is activated in a case where a specific condition is satisfied and adversely affects the image sensor 1211.

In a case where the image sensor 1211 is subjected to an insertion attack, an abnormal change occurs in electrical characteristics (for example, a Z value of an impedance value, an R value of a resistance value, an L value of an inductance value, a C value of a capacitance value, and a Q value of a quality factor), transmission characteristics (for example, data transmission quality, insertion loss, and reflection loss), or the like.

Therefore, the failure detection unit 1509 detects the electrical characteristics, and in a case where an abnormal change in the electrical characteristics is detected, for example, the application processor 1212 is notified of a third abnormality message indicating that the abnormality in the electrical characteristics has occurred in the image sensor 1211 as a singular message according to the high-speed data communication for transmitting image data.

In addition, the failure detection unit 1509 detects the transmission characteristics, and in a case where an abnormal change in the transmission characteristics is detected, for example, the application processor 1212 is notified of a fourth abnormality message indicating that the abnormality in the transmission characteristics has occurred in the image sensor 1211 as a singular message according to the high-speed data communication for transmitting image data.

Note that the failure detection unit 1509 may detect the presence or absence of the opening or the short circuit of the communication path or the physical layer processing unit 1505, that is, the disconnection or the compression, and the possibility thereof, and transmit a singular message indicating that the abnormality has occurred in a case where the abnormality has occurred according to the detection result.

In addition, the failure detection unit 1509 may transmit a message indicating an abnormality as a singular message not only in a case where an abnormality occurs due to an insertion attack but also due to any of accidental damage, a secular change, a temperature change, or the like.

Note that, in a case where no abnormality is detected, the failure detection unit 1509 may transmit a singular message including a normality message or may not transmit a singular message.

(Failure Detection Process in Failure Detection Unit)

Next, a failure detection process in the failure detection unit 1509 will be described with reference to a flowchart of FIG. 123.

In step S1051, the failure detection unit 1509 detects a voltage state of the physical layer.

In step S1052, the failure detection unit 1509 determines whether or not the voltage state of the physical layer is outside a threshold range, that is, whether or not an abnormal change has occurred.

In a case where it is determined in step S1052 that the voltage state of the physical layer is outside the threshold range and an abnormal change has occurred, the process proceeds to step S1053.

In step S1053, the failure detection unit 1509 notifies the application processor 1212 of a singular message including a first abnormality message indicating that a power abnormality, a voltage abnormality (for example, a voltage amplitude, a voltage polarity, or IR drop), or the like occurs in the image sensor 1211 according to the high-speed data communication for transmitting image data.

Furthermore, in a case where it is determined in step S1052 that the voltage state of the physical layer is not outside the threshold range, the process proceeds to step S1054.

In step S1054, the failure detection unit 1509 detects a clock state of the physical layer.

In step S1055, the failure detection unit 1509 determines whether or not the clock state of the physical layer is outside a threshold range, that is, whether or not an abnormal change has occurred.

In a case where it is determined in step S1055 that the clock state of the physical layer is outside the threshold range and an abnormal change has occurred, the process proceeds to step S1056.

In step S1056, the failure detection unit 1509 notifies the application processor 1212 of a singular message including a second abnormality message indicating that a clock abnormality (for example, a frequency, a periodicity, the number of times, and the jitter of the clock) has occurred according to the high-speed data communication for transmitting image data.

Furthermore, in a case where it is determined in step S1055 that the clock state of the physical layer is not outside the threshold range, the process proceeds to step S1057.

In step S1057, the failure detection unit 1509 detects electrical characteristics.

In step S1058, the failure detection unit 1509 determines whether or not the electrical characteristics are outside the threshold range, that is, whether or not an abnormal change has occurred.

In a case where it is determined in step S1058 that the electrical characteristics are outside the threshold range and an abnormal change has occurred, the process proceeds to step S1059.

In step S1059, the failure detection unit 1509 notifies the application processor 1212 of a third abnormality message indicating that the abnormality in the electrical characteristics has occurred in the image sensor 1211 according to the high-speed data communication for transmitting image data as a singular message.

Furthermore, in a case where it is determined in step S1058 that no abnormal change in the electrical characteristics has occurred, the process proceeds to step S1060.

In step S1060, the failure detection unit 1509 detects transmission characteristics.

In step S1061, the failure detection unit 1509 determines whether or not the transmission characteristics are outside the threshold range, that is, whether or not an abnormal change has occurred.

In a case where it is determined in step S1061 that the transmission characteristics are outside the threshold range and an abnormal change has occurred, the process proceeds to step S1062.

In step S1062, the failure detection unit 1509 notifies the application processor 1212 of a fourth abnormality message indicating that the abnormality in the transmission characteristic has occurred in the image sensor 1211 according to the high-speed data communication for transmitting image data as a singular message.

Furthermore, in a case where it is determined in step S1061 that no abnormal change in the transmission characteristics has occurred, the process proceeds to step S1063.

In step S1063, the failure detection unit 1509 notifies the application processor 1212 of a message indicating that the image sensor 1211 is normal as a singular message according to the high-speed data communication for transmitting image data.

Through the above process, it is possible to detect the presence or absence of an injection attack or an insertion attack, and in a case where the injection attack or the insertion attack is detected, it is possible to notify the application processor 1212 of a singular message including a message indicating that an abnormality has occurred.

As a result, the application processor 1212 can quickly and appropriately perform handling corresponding to the singular message by acquiring the singular message corresponding to the presence or absence of a failure according to the high-speed data communication.

<Detection of Abnormality of Security Unit by Infringement Detection Unit>

Next, abnormality detection of the security unit 1510 by the infringement detection unit 1511 will be described.

In addition to an injection attack such as disabling some or all of operations in the image sensor 1211, causing a malfunction, causing false information to flow in, or causing information to flow out, for example, the security unit 1510 may be subjected to an analysis attack (a power analysis attack or an electromagnetic analysis attack) that causes information in the image sensor 1211 to flow out by analyzing power used for the image sensor 1211 or electromagnetism generated from the image sensor 1211.

Therefore, in addition to the abnormality detection described above, the infringement detection unit 1511 detects the presence or absence of an abnormality related to the infringement by logically detecting the presence or absence of falsification the inside of the security unit 1510 due to an injection attack or physically detecting whether or not an attack object (for example, a probe) necessary for power analysis or electromagnetic analysis is near the security unit 1510, and transmits an abnormality message as a singular message in a case where the abnormality is detected.

(Abnormality Detection Process for Security Unit in Infringement Detection Unit)

Next, an abnormality detection process for the security unit 1510 in the infringement detection unit 1511 will be described with reference to a flowchart of FIG. 124.

In step S1081, the infringement detection unit 1511 detects information indicating a logical state of the security unit 1510.

In step S1082, the infringement detection unit 1511 determines whether or not falsification has occurred inside the security unit 1510 on the basis of the detected information indicating the logical state of the security unit 1510.

In a case where it is determined in step S1082 that falsification has occurred inside the security unit 1510, the process proceeds to step S1083.

In step S1083, the infringement detection unit 1511 notifies the application processor 1212 of a first abnormality message indicating that falsification in the security unit 1510 associated with the injection attack has occurred according to the high-speed data communication for transmitting image data as a singular message.

In a case where it is determined in step S1082 that falsification has not occurred in the security unit 1510, the process proceeds to step S1084.

In step S1084, the infringement detection unit 1511 detects information indicating a physical state of the security unit 1510.

In step S1085, the infringement detection unit 1511 determines whether or not an attack object (for example, a probe)

necessary for power analysis or electromagnetic analysis is present near the security unit 1510 on the basis of the information indicating the detected physical state of the security unit 1510.

In a case where it is determined in step S1085 that the attack object (for example, a probe) necessary for the power analysis or the electromagnetic analysis used for the analysis attack is near the security unit 1510, the process proceeds to step S1086.

In step S1086, the infringement detection unit 1511 notifies the application processor 1212 of a second abnormality message indicating that an attack object (for example, a probe) necessary for power analysis or electromagnetic analysis is near the security unit 1510 and there is a possibility of being subjected to the power analysis attack or the electromagnetic analysis attack as a singular message according to the high-speed data communication for transmitting image data.

In a case where it is determined in step S1085 that the attack object (for example, a probe) necessary for power analysis or electromagnetic analysis is not near the security unit 1510, the process proceeds to step S1087.

In step S1087, the infringement detection unit 1511 notifies the application processor 1212 of a message indicating that the image sensor 1211 is normal as a singular message according to the high-speed data communication for transmitting image data.

Through the above process, it is possible to detect infringement such as the presence or absence of logical falsification of the security unit 1510 associated with an injection attack or the presence or absence of the possibility of an analysis attack, and in a case where the infringement is detected, it is possible to notify the application processor 1212 of a singular message including a message indicating that an abnormality associated with the infringement has occurred.

As a result, the application processor 1212 can quickly and appropriately perform handling corresponding to the singular message by acquiring the singular message corresponding to the presence or absence of the infringement according to the high-speed data communication.

<Abnormality Detection by Temperature Measurement Unit>

Next, abnormality detection by the temperature measurement unit 1512 will be described.

There is a temperature attack that causes the image sensor 1211 to malfunction such that the internal temperature of the image sensor 1211 or the external temperature of the image sensor 1211, the internal temperature of the communication path, or the external temperature of the communication path is intentionally forced, and thus the operation guarantee temperature of the image sensor 1211 or the communication path falls outside a range.

Therefore, the temperature measurement unit 1512 detects the presence or absence of a temperature attack on the image sensor 1211 and the communication path.

That is, since the image sensor 1211 has an upper limit value (first threshold value) and a lower limit value (second threshold value) of the operation guarantee temperature, when the temperature of the image sensor 1211 is in a state of being higher than the first threshold value (upper limit value) or a state of being lower than the second threshold value (lower limit value), the temperature measurement unit 1512 notifies the application processor 1212 of a message indicating that an abnormality has occurred as a singular message.

Note that in a case where the temperature measured by the temperature measurement unit 1512 is within the operation guarantee range, the temperature measurement unit 1512 may transmit a singular message indicating normality or may not transmit a singular message. In addition, instead of the abnormality message or the normality message, a value of a measured temperature may be transmitted as a singular message.

Furthermore, a plurality of temperature measurement units 1512 may be provided for functional safety, and a singular message indicating abnormality may be transmitted in a case where each measurement result falls outside a threshold range. In that case, even if an abnormality occurs in some of the temperature measurement units 1512, the abnormality can be handled.

In addition, the application processor 1212 that receives a singular message analyzes a singular message group acquired a plurality of times, and can thus ascertain a range or a position where the abnormality occurs in the temperature measurement unit 1512.

(Abnormality Detection Process in Temperature Measurement Unit)

Next, an abnormality detection process in the temperature measurement unit 1512 will be described with reference to a flowchart of FIG. 125.

In step S1101, the temperature measurement unit 1512 measures the temperature in the image sensor 1211.

In step S1102, the temperature measurement unit 1512 determines whether or not the measured temperature of the image sensor 1211 is equal to or higher than a first threshold value (upper limit value) (higher than the first threshold value).

In a case where it is determined in step S1102 that the measured temperature of the image sensor 1211 is equal to or higher than the first threshold value (upper limit value), the process proceeds to step S1103.

In step S1103, the temperature measurement unit 1512 notifies the application processor 1212 of a singular message including a first abnormality message indicating that the image sensor 1211 is at the operation guarantee temperature or higher and an abnormality has occurred according to the high-speed data communication for transmitting image data.

Furthermore, in a case where it is determined in step S1102 that the measured temperature of the image sensor 1211 is not equal to or higher than the first threshold value (upper limit value), the process proceeds to step S1104.

In step S1104, the temperature measurement unit 1512 determines whether or not the measured temperature of the image sensor 1211 is equal to or lower than the second threshold value (lower limit value) (lower than the second threshold value).

In a case where it is determined in step S1104 that the measured temperature of the image sensor 1211 is equal to or lower than the second threshold value (lower limit value), the process proceeds to step S1105.

In step S1105, the temperature measurement unit 1512 notifies the application processor 1212 of a singular message including a second abnormality message indicating that the image sensor 1211 is at or below the operation guarantee temperature and that an abnormality has occurred according to the high-speed data communication for transmitting image data.

In a case where it is determined in step S1104 that the measured temperature of the image sensor 1211 is not equal to or lower than the second threshold value (lower limit value), the process proceeds to step S1106.

In step S1106, the temperature measurement unit 1512 transmits, to the application processor 1212, a singular message including a normality message indicating that the temperature of the image sensor 1211 is within the operation guarantee temperature and no abnormality has occurred.

Through the above process, in a case where a temperature attack on the image sensor 1211 occurs, a notification is provided according to the high-speed data communication for transmitting image data, and thus, it is possible to realize quick and appropriate handling in the application processor 1212.

Detailed Configuration Example of Application Processor that Detects Presence or Absence of Abnormality on Basis of State and Characteristics of Image Sensor In the above description, an example has been described in which the image sensor 1211 detects the presence or absence of an own abnormality and transmits a singular message corresponding to a detection result to the application processor 1212.

However, the application processor 1212 may acquire a state or characteristics of the image sensor 1211 to detect the presence or absence of abnormality.

FIG. 126 illustrates a configuration example of the application processor 1212 that acquires a state or characteristics of the image sensor 1211 and detects the presence or absence of abnormality.

The application processor 1212 in FIG. 126 includes a physical layer processing unit 1551, an extension mode-compatible CSI-2 reception circuit 1552, an I2C/I3C master 1553, a storage unit 1554, a controller 1555, a disturbance detection unit 1556, a failure detection unit 1557, a security unit 1558, an infringement detection unit 1559, and a temperature measurement unit 1560.

Note that the disturbance detection unit 1556, the failure detection unit 1557, the security unit 1558, the infringement detection unit 1559, and the temperature measurement unit 1560 all execute processing according to a state or characteristics supplied from the image sensor 1211. However, basic functions are similar to those of the disturbance detection unit 1508, the failure detection unit 1509, the security unit 1510, the infringement detection unit 1511, and the temperature measurement unit 1512 in FIG. 118, respectively.

In addition, the physical layer processing unit 1551, the extension mode-compatible CSI-2 reception circuit 1552, the I2C/I3C master 1553, the storage unit 1554, the security unit 1558, and the controller 1555 are configured similarly to the respective blocks corresponding to the physical layer processing unit 1321, the extension mode-compatible CSI-2 reception circuit 1322, the I2C/I3C master 1323, the storage unit 1324, the security unit 1326, and the controller 1327 in FIG. 77, and the detailed description thereof will be omitted.

On the basis of image data supplied from the image sensor 1211 via the extension mode-compatible CSI-2 reception circuit 1552, the disturbance detection unit 1556 compares any of the light reception waveform pattern, the light reception spot pattern, the light reception dot pattern, the light reception locus pattern, or the like with a storage pattern stored in advance in the storage unit 1554 to determine whether or not the image sensor 1211 or the image data is normal or abnormal.

The disturbance detection unit 1556 may output a determination result as to whether or not the image sensor 1211 or the image data is normal or abnormal to the subsequent stage as a singular message.

Furthermore, the disturbance detection units 1508 and 1577 may be provided in the image sensor 1211 and the application processor 1212, respectively. In a case where both the disturbance detection units 1508 and 1577 are provided, for example, it is possible to double determine the presence or absence of abnormality. Therefore, even if either the disturbance detection unit 1508 in the image sensor 1211 or the disturbance detection unit 1577 in the application processor 1212 is attacked, it is possible to detect the presence or absence of disturbance on the image sensor 1211.

The failure detection unit 1557 is electrically directly connected or indirectly connected to a communication path or the physical layer processing unit 1551 in the application processor 1212.

In addition, the failure detection units 1509 and 1557 may be provided in the image sensor 1211 and the application processor 1212, respectively.

For example, the image sensor 1211 measures own electrical characteristics and transmits the electrical characteristics as a singular message to the application processor 1212 according to the high-speed data communication for transmitting image data.

The failure detection unit 1557 recognizes the electrical characteristics in the communication path through a calibration process by measuring the electrical characteristics in "the image sensor 1211+the communication path (physical layer)".

Since the hardware troy can be inserted into the communication path (for example, in a wire), the presence or absence of the hardware troy can be detected with high accuracy by detecting a change in the electrical characteristics in the communication path.

Similarly, the security unit 1558, the infringement detection unit 1559, and the temperature measurement unit 1560 may be provided not only in the application processor 1212 but also in the image sensor 1211.

That is, the security units 1510 and 1558, the infringement detection units 1511 and 1559, and the temperature measurement units 1512 and 1560 may be provided in the image sensor 1211 and the application processor 1212, respectively.

Any of the disturbance detection unit 1556, the failure detection unit 1557, the security unit 1558, the infringement detection unit 1559, or the temperature measurement unit 1560 may be electrically directly connected to a memory.

This memory may be electrically directly connected to the register described above, and any of the disturbance detection unit 1556, the failure detection unit 1557, the security unit 1558, the infringement detection unit 1559, or the temperature measurement unit 1560 may be electrically directly connected to the register.

The memory may be a memory protected from either leakage or falsification of information in the memory. Here, the memory and the register will be collectively referred to as a storage unit 1554. Any of the disturbance detection unit 1556, the failure detection unit 1557, the security unit 1558, the infringement detection unit 1559, or the temperature measurement unit 1560 can determine that any of continuous disturbance, continuous failure, or continuous infringement is received in a short time or that there is a temperature load for a long time by storing a plurality of detection results in the storage unit 1554, for example, and an abnormality message indicating such a situation may be transmitted.

Note that any of the storage pattern, the threshold value, the first threshold value, or the second threshold value may be read from the storage unit 1554. In addition, any of the storage pattern, the threshold value, the first threshold value, or the second threshold value may be written into the storage unit 1507 in the image sensor 1211 by the application processor 1212 via at least I2C or I3C.

As described above, since a detection result is periodically stored in the protected storage unit 1507 outside the application processor 1212, for example, in the image sensor 1211, when an accident occurs in the application processor 1212, the protected storage unit 1507 in the external image sensor 1211 is analyzed, so that it is possible to easily specify a cause of the accident occurrence. Similarly, since a detection result is periodically stored outside the image sensor 1211, for example, in the protected storage unit 1554 in the application processor 1212, when an accident occurs in the image sensor 1211, the protected storage unit 1554 in the external application processor 1212 is analyzed, so that it is possible to easily specify a cause of the accident occurrence.

Any of the disturbance detection unit 1556, the failure detection unit 1557, the security unit 1558, the infringement detection unit 1559, or the temperature measurement unit 1560 may be electrically directly connected to the extension mode-compatible CSI-2 reception circuit 1552, and each detection result may be directly transmitted from the extension mode-compatible CSI-2 reception circuit 1552.

In addition, any of the disturbance detection unit 1556, the failure detection unit 1557, the security unit 1558, the infringement detection unit 1559, or the temperature measurement unit 1560 may be electrically indirectly connected to the extension mode-compatible CSI-2 reception circuit 1552 via the storage unit 1554 or the like, and each detection result may be indirectly transmitted from the extension mode-compatible CSI-2 reception circuit 1552.

Further, a singular message may be directly output from the extension mode-compatible CSI-2 reception circuit 1552, or may be indirectly output from the extension mode-compatible CSI-2 reception circuit 1552 via the storage unit 1554 or the like.

In addition, any of the disturbance detection unit 1556, the failure detection unit 1557, the security unit 1558, the infringement detection unit 1559, or the temperature measurement unit 1560 may be electrically directly connected to the communication path, or may be electrically indirectly connected to the communication path via the storage unit 1554 or the like.

Note that a communication path used at least for high-speed data transmission is considered to have higher sensitivity to attack detection because the communication path is superior in high-frequency characteristics to a communication path used only for low-speed command transmission.

Furthermore, in a case where power is supplied to the image sensor 1211 via a part or the whole of the communication path used for high-speed data transmission, an operation of the image sensor 1211 or an image data stream can be disabled only by invalidating the power supply at least temporarily.

For example, a part or the whole of the communication path used for high-speed data transmission is replaced with a communication path into which the hardware troy is inserted, and an accident of a mobile device (propulsion device) may be easily induced only by activating the hardware troy wirelessly or by starting a timer. That is, the failure detection unit 1557 is suitable for a physical layer used at least for high-speed data transmission compared with a communication path specialized for low-speed command transmission, and is particularly suitable for a physical layer used also for power transmission.

Any of the disturbance detection units 1508 and 1556, the failure detection units 1509 and 1557, the security units 1510 and 1558, the infringement detection units 1511 and 1559, or the temperature measurement units 1512 and 1560 may be included in another block.

For example, at least a part of the disturbance detection unit 1508 may be included in any of the pixel 1501, the AD converter 1502, the image processing unit 1503, the storage unit 1507, or the extension mode-compatible CSI-2 transmission circuit 1504.

In addition, for example, at least a part of the disturbance detection unit 1556 may be included in either the extension mode-compatible CSI-2 reception circuit 1552 or the storage unit 1554.

Further, for example, at least a part of the failure detection unit 1509 may be included in any of the physical layer processing unit 1505, the storage unit 1507, or the extension mode-compatible CSI-2 transmission circuit 1504.

In addition, for example, at least a part of the failure detection unit 1557 may be included in either the extension mode-compatible CSI-2 reception circuit 1552 or the storage unit 1554.

Further, for example, any of the security unit 1510, the infringement detection unit 1511, or the temperature measurement unit 1512 may be at least partially included in either the storage unit 1507 or the extension mode-compatible CSI-2 transmission circuit 1504.

In addition, for example, any of the security unit 1558, the infringement detection unit 1559, and the temperature measurement unit 1560 may be at least partially included in either the storage unit 1554 or the extension mode-compatible CSI-2 reception circuit 1552.

In addition, any of the pixel 1501, the AD converter 1502, the image processing unit 1503, the physical layer processing unit 1505, the extension mode-compatible CSI-2 transmission circuit 1504, the extension mode-compatible CSI-2 reception circuit 1552, the storage units 1507 and 1554, the I2C/I3C slave 1506, the I2C/I3C master 1553, the disturbance detection units 1508 and 1556, the failure detection units 1509 and 1557, the security units 1510 and 1558, the infringement detection units 1511 and 1559, or the temperature measurement units 1512 and 1560 may be directly or indirectly controlled by a controller, a control unit, or a new control unit (not illustrated) of a mobile device (propulsion device).

<Process of Detecting Presence or Absence of Abnormality of Image Sensor in Application Processor>

Next, a process of detecting the presence or absence of abnormality of the image sensor in the application processor will be described with reference to the flowcharts of FIGS. 127 and 128.

Note that the flowchart of FIG. 127 illustrates a process of the image sensor 1211, and the flowchart of FIG. 128 illustrates a process of the application processor 1212.

In step S1131 (FIG. 127), the image sensor 1211 detects an own state or characteristics required to determine the presence or absence of abnormality.

More specifically, each of the disturbance detection unit 1508, the failure detection unit 1509, the infringement detection unit 1511, and the temperature measurement unit 1512 in the image sensor 1211 described above detects a state or characteristics required when determining the presence or absence of an abnormality in the image sensor 1211.

However, in this process, only various states or characteristics are detected, and the presence or absence of abnormality is not determined.

In step S1132, the image sensor 1211 transmits the detected state or characteristics thereof as a singular message according to the high-speed data communication for transmitting image data.

More specifically, each of the disturbance detection unit 1508, the failure detection unit 1509, the infringement detection unit 1511, and the temperature measurement unit 1512 transmits a state or characteristics required when determining the presence or absence of abnormality in the image sensor 1211 as a singular message according to the high-speed data communication for transmitting image data.

Note that the process performed by the disturbance detection unit 1508, the failure detection unit 1509, the infringement detection unit 1511, and the temperature measurement unit 1512 of the image sensor 1211 as described above will be hereinafter expressed in a simplified manner such that the image sensor 1211 detects an own state or characteristics and the image sensor 1211 transmits the detected own state or characteristics to the application processor 1212.

In step S1151 (FIG. 128), the application processor 1212 determines whether or not the singular message transmitted from the image sensor 1211 has been received.

More specifically, each of the disturbance detection unit 1556, the failure detection unit 1557, the infringement detection unit 1559, and the temperature measurement unit 1560 of the application processor 1212 determines whether or not a singular message has been received from at least any of the disturbance detection unit 1508, the failure detection unit 1509, the infringement detection unit 1511, or the temperature measurement unit 1512 of the image sensor 1211. However, any of the security unit 1558, the controller 1555, the extension mode-compatible CSI-2 reception circuit 1552, the physical layer processing unit 1551, or the like may determine whether or not a singular message has been received from at least any of the disturbance detection unit 1508, the failure detection unit 1509, the infringement detection unit 1511, or the temperature measurement unit 1512 of the image sensor 1211.

In a case where it is determined in step S1151 that the singular message has been received, the process proceeds to step S1152.

In step S1152, the application processor 1212 detects the state or the characteristics of the image sensor 1211 transmitted as the singular message.

More specifically, at least any of the disturbance detection unit 1556, the failure detection unit 1557, the infringement detection unit 1559, or the temperature measurement unit 1560 of the application processor 1212 detects the state or the characteristics for detecting each abnormality included in the received singular message.

In step S1153, the application processor 1212 corrects the detected state or characteristics of the image sensor 1211 by performing a calibration process.

More specifically, at least any of the disturbance detection unit 1556, the failure detection unit 1557, the infringement detection unit 1559, or the temperature measurement unit 1560 of the application processor 1212 applies a calibration process to the detected state or characteristics to correct the detected state or characteristics. However, any of the security unit 1558, the controller 1555, the extension mode-compatible CSI-2 reception circuit 1552, the physical layer processing unit 1551, or the like may apply a calibration process to the detected state or characteristics to correct the detected state or characteristics.

In step S1154, the application processor 1212 determines whether or not the state or the characteristics of the image sensor 1211 corrected through the calibration process are out of a threshold range regarded as being normal.

More specifically, at least any of the disturbance detection unit 1556, the failure detection unit 1557, the infringement detection unit 1559, or the temperature measurement unit 1560 of the application processor 1212 determines whether or not the state or the characteristics corrected through the calibration process are out of the threshold range regarded as being normal. However, any of the security unit 1558, the controller 1555, the extension mode-compatible CSI-2 reception circuit 1552, the physical layer processing unit 1551, or the like may determine whether or not the state or the characteristics corrected through the calibration process are out of the threshold range regarded as being normal. Note that specific processes related to the determination as to whether or not each state or characteristic is out of the threshold range regarded as being normal is the processes described with reference to the flowcharts of FIGS. 119 and 122 to 125.

In a case where it is determined in step S1154 that the state or the characteristics are out of the threshold range regarded as being normal, the process proceeds to step S1155.

In step S1155, the application processor 1212 considers that the image sensor 1211 is abnormal.

In addition, in a case where it is determined in step S1154 that the state or the characteristics are not out of the threshold range regarded as being normal, the process proceeds to step S1156.

In step S1156, the application processor 1212 assumes that the image sensor 1211 is normal.

That is, in a case where at least any of the security unit 1558, the controller 1555, the extension mode-compatible CSI-2 reception circuit 1552, the physical layer processing unit 1551, the disturbance detection unit 1556, the failure detection unit 1557, the infringement detection unit 1559, or the temperature measurement unit 1560 of the application processor 1212 determines that the state or the characteristics corrected through the calibration process are out of the threshold range regarded as being normal, the image sensor 1211 is regarded as being abnormal, and in a case where it is determined that the state or the characteristics are not out of the threshold range, the image sensor 1211 is regarded as being normal.

Through the above process, the application processor 1212 can also determine the presence or absence of abnormality of the image sensor 1211, and even if an abnormality occurs in the image sensor 1211, the application processor 1212 can quickly and appropriately perform handling.

Note that the process in which the disturbance detection unit 1556, the failure detection unit 1557, the infringement detection unit 1559, and the temperature measurement unit 1560 of the application processor 1212 described above determine the presence or absence of abnormality of the image sensor 1211 will be simply referred to as a process in which the application processor 1212 determines the presence or absence of abnormality of the image sensor 1211 on the basis of a state or characteristics of the image sensor 1211 or abnormality diagnosis (process). However, the application processor 1212 may detect the presence or absence of abnormality without acquiring a state and characteristics of the image sensor 1211. That is, each of the disturbance detection unit 1556, the failure detection unit 1557, the infringement detection unit 1559, and the temperature measurement unit 1560 of the application processor 1212 may detect a state or characteristics required when determining the presence or absence of abnormality in the application processor 1212 and determine the presence or absence of abnormality.

Example in which High-Speed Data Transmission
of Singular Message is Executed without Hindering
High-Speed Data Transmission of Image Data In the above description, it is assumed that a singular message is transmitted according to high-speed data transmission of image data. However, when the high-speed data transmission is performed without considering a transmission timing, there is a possibility that the high-speed data transmission of image data is hindered.

Therefore, an example in which high-speed data transmission of a singular message is performed without hindering high-speed data transmission of image data will be described.

In order to perform high-speed data transmission of a singular message without hindering high-speed data transmission of image data, it is necessary to perform transmission in accordance with transmission timings of various types of data using high-speed data transmission of image data.

Therefore, a singular message needs to be transmitted within a period from the frame start to the frame end or within a period from the frame end to the frame start (frame blanking period) when image data is transmitted.

Here, the singular message can be transmitted within the period from the frame start to the frame end in any of the frame start, the embedded data, the image data, the non-image data (a read response and user defined data), the frame end, and the line blanking period, for example, as illustrated in FIG. 129. Note that, for example, when a CCI channel is allocated to VC0, VC0 in FIG. 129 may be replaced with VC1, and VC1 in FIG. 129 may be replaced with VC2.

Note that, hereinafter, an example in which high-speed data transmission of image data and high-speed data transmission of a singular message are executed in series instead of parallel execution will be described. However, in a case where a communication path is different between high-speed data transmission of image data and transmission of a singular message (high-speed data transmission or low-speed command transmission), parallel execution may be performed.

In addition, since the high-speed data transmission and the low-speed command transmission can be separated in frequency by a filter, the transmissions may be partially or entirely duplicated (executed in parallel) as long as there is no problem in power consumption.

Furthermore, the above-described process of detecting the presence or absence of own abnormality in the image sensor 1211 and the process of detecting the presence or absence of abnormality of the image sensor 1211 based on a state or characteristics from the image sensor 1211 in the application processor 121 will be hereinafter referred to as abnormality diagnosis (process) in the image sensor 1211 and abnormality diagnosis (process) in the application processor 1212, respectively.

Here, in the abnormality diagnosis (process) in the image sensor 1211, in a case where the image sensor 1211 determines the presence or absence of abnormality on the basis of an own state or characteristics, a series of processes in which the image sensor 1211 determines the presence or absence of own abnormality is the abnormality diagnosis (process).

On the other hand, in a case where abnormality diagnosis (process) of the image sensor 1211 is performed in the application processor 1212 on the basis of a state or characteristics of the image sensor 1211, the abnormality diagnosis (process) in the image sensor 1211 is a process of only detecting an own state or characteristics (the presence or absence of abnormality is not determined).

In addition, the abnormality diagnosis performed at a predetermined time interval or a predetermined operation interval will be referred to as periodic abnormality diagnosis, and the abnormality diagnosis performed at the beginning of the process will be referred to as initial abnormality diagnosis.

A singular message which is a result of the periodic abnormality diagnosis may be stored in a vendor specific code (Vendor specific), a reserved code (Reserved for future use), or at least a part of the embedded data indicating a code newly defined as a singular message from the reserved code and transmitted.

Furthermore, the singular message may be stored in a newly defined packet and transmitted, or may be stored in a user defined region packet or a reserved region packet and transmitted.

For example, a part or the whole of a reserved region in the extended packet header may be newly defined as a singular message. Furthermore, for example, a part or the whole of a user defined region (for example, User defined metadata) of the extended packet header may be newly defined as a singular message.

In addition, for example, a part or the whole of each of the already defined extended packet header and extended packet footer may be used as a singular message.

However, the singular message stored in the extended packet header has higher immediacy than that stored in the extended packet footer (abnormality can be recognized immediately in a process of a mobile device). The singular message may be a part or the whole of the extended packet footer ePF1 or ePF0. In a case where the singular message is stored in the extended packet header or the extended packet footer, there is also an effect of obtaining backward compatibility.

<Process in Case where High-Speed Data Transmission of Singular Message is Executed without Hindering High-Speed Data Transmission of Image Data>

Next, a process of the image sensor 1211 in a case where high-speed data transmission of a singular message is executed without hindering high-speed data transmission of image data will be described with reference to a flowchart of FIG. 130.

In step S1171, the image sensor 1211 executes initial abnormality diagnosis.

In step S1172, the image sensor 1211 (the extension mode-compatible CSI-2 transmission circuit 1504 thereof) determines whether or not a command to start high-speed data transmission has been received, and waits for the process until it is determined that a command to start high-speed data transmission has been received. Then, in a case where the extension mode-compatible CSI-2 transmission circuit 1504 determines that a command to start high-speed data transmission has been received in step S1172, the process proceeds to step S1173.

In step S1173, the image sensor 1211 determines whether or not an initial abnormality has occurred in the image sensor 1211 according to the initial abnormality diagnosis.

In a case where it is determined in step S1173 that there is the initial abnormality, the process proceeds to step S1174.

In step S1174, the image sensor 1211 (the extension mode-compatible CSI-2 transmission circuit 1504 thereof) transmits an initial abnormality message.

That is, in this case, an imaging transmission process is not performed thereafter.

On the other hand, in a case where it is determined in step S1173 that no initial abnormality has occurred, the process proceeds to step S1175.

In step S1175, the image sensor 1211 executes the imaging transmission process, and image data captured by the pixel 1501, subjected to AD conversion by the AD converter 1502, and subjected to image processing by the image processing unit 1503 is supplied to the extension mode-compatible CSI-2 transmission circuit 1504 and transmitted to the application processor 1212.

<Imaging Transmission Process (Part 1)>

Here, an imaging transmission process (part 1) will be described with reference to a flowchart of FIG. 131.

In step S1191, the pixel 1501 starts imaging, and image data output from the pixel 1501 is supplied to the extension mode-compatible CSI-2 transmission circuit 1504 via the AD converter 1502 and the image processing unit 1503.

In step S1192, the image sensor 1211 executes periodic abnormality diagnosis.

In step S1193, the extension mode-compatible CSI-2 transmission circuit 1504 transmits a frame start of a virtual channel.

In step S1194, the extension mode-compatible CSI-2 transmission circuit 1504 transmits embedded data of the virtual channel. In this case, the extension mode-compatible CSI-2 transmission circuit 1504 transmits the embedded data of the virtual channel including a singular message that is a diagnosis result of the periodic abnormality diagnosis.

In step S1195, the extension mode-compatible CSI-2 transmission circuit 1504 transmits image data of the virtual channel.

In step S1196, the extension mode-compatible CSI-2 transmission circuit 1504 determines whether or not transmission of image data for one frame has been completed.

In a case where the extension mode-compatible CSI-2 transmission circuit 1504 determines in step S1196 that the transmission of the image data for one frame has not been completed, the process returns to step S1195, and similar processes are repeatedly performed thereafter. On the other hand, in step S1196, in a case where the extension mode-compatible CSI-2 transmission circuit 1504 determines that the transmission of the image data for one frame has been completed, the process proceeds to step S1197.

In step S1197, the extension mode-compatible CSI-2 transmission circuit 1504 transmits a frame end of the virtual channel.

In step S1198, the extension mode-compatible CSI-2 transmission circuit 1504 determines whether or not a command to end the high-speed data transmission has been received.

In step S1198, in a case where the extension mode-compatible CSI-2 transmission circuit 1504 determines that a command to end the high-speed data transmission has not been received, the process returns to step S1191, and similar processes are repeatedly performed thereafter. On the other hand, in a case where the extension mode-compatible CSI-2 transmission circuit 1504 determines in step S1198 that a command to end the high-speed data transmission has been received, the process is ended.

The imaging transmission process may be continuously executed until a command to end the high-speed data transmission is received, or may be executed each time a command to start the high-speed data transmission is received.

Through the above process, it is possible to transmit a singular message according to high-speed data transmission without hindering high-speed data transmission of the image data.

Application Example of Imaging Transmission Process

In the above description, an example has been described in which the imaging transmission process is ended in a case where a command to end the high-speed data transmission has been received, but the process may be ended in a case where a command to start high-speed data transmission is not received.

A flowchart of FIG. 132 illustrates an application example of an imaging transmission process in which the process is ended in a case where a command to start high-speed data transmission is not received.

Note that the processes in steps S1211 to S1217 in FIG. 132 are similar to the processes in steps S1191 to S1197 in FIG. 131, and thus description thereof will be omitted.

That is, in step S1218, in a case where the extension mode-compatible CSI-2 transmission circuit 1504 determines that a command to start the high-speed data transmission has been received, the process returns to step S1211, and similar processes are repeatedly performed thereafter. On the other hand, in a case where the extension mode-compatible CSI-2 transmission circuit 1504 determines in step S1218 that a command to start the high-speed data transmission has not been received, the process is ended.

Also in the above process, it is possible to transmit a singular message according to high-speed data transmission without hindering high-speed data transmission of image data.

<Imaging Transmission Process (Part 2)>

In the above description, the example has been described in which a singular message that is a diagnosis result of the periodic abnormality diagnosis is included in the embedded data and transmitted. However, periodic abnormality diagnosis for the second time (second periodic abnormality diagnosis) may be executed, and a singular message may be included in second embedded data and transmitted.

FIG. 133 is a flowchart for describing imaging transmission process in which periodic abnormality diagnosis for the second time (second periodic abnormality diagnosis) is executed, and a singular message that is a diagnosis result of the second periodic abnormality diagnosis is included in second embedded data and transmitted.

Note that the processes in steps S1231, S1233, S1235, S1236, S1239, and S1240 in FIG. 133 are similar to the processes in steps S1191, S1193, and S1195 to S1198 in FIG. 131, and thus description thereof will be omitted.

That is, when the image data is supplied to the extension mode-compatible CSI-2 transmission circuit 1504 through the process in step S1231, the image sensor 1211 performs periodic abnormality diagnosis for the first time (first periodic abnormality diagnosis) in step S1232.

When the frame start of the virtual channel is transmitted in step S1233, the extension mode-compatible CSI-2 transmission circuit 1504 transmits first embedded data of the virtual channel in step S1234. In this case, the extension mode-compatible CSI-2 transmission circuit 1504 transmits the first embedded data of the virtual channel including a singular message that is a diagnosis result of the first periodic abnormality diagnosis.

When the transmission of the image data for one frame has been completed in steps S1235 and S1236, the image sensor 1211 executes periodic abnormality diagnosis for the second time (second periodic abnormality diagnosis) in step S1237.

In step S1238, the extension mode-compatible CSI-2 transmission circuit 1504 transmits the second embedded data of the virtual channel. In this case, the extension mode-compatible CSI-2 transmission circuit 1504 transmits the second embedded data of the virtual channel including a singular message that is a diagnosis result of the second periodic abnormality diagnosis.

Then, when a frame end of the virtual channel is transmitted in step S1239 and a command to end the high-speed data transmission is received in step S1240, the process is ended.

Through the above process, it is possible to transmit a singular message according to high-speed data transmission without hindering high-speed data transmission of the image data.

In addition, in the above process, since the second periodic abnormality diagnosis is executed during the line blanking period, the maximum value of power consumption is not influenced (the periodic abnormality diagnosis is not performed simultaneously with the transmission). Furthermore, the periodic abnormality diagnosis may be executed outside the line blanking period.

In addition, since the singular message corresponding to the diagnosis result of the periodic abnormality diagnosis is stored in the embedded data immediately after the frame start and immediately before the frame end, a mobile device (propulsion device) can determine an abnormality occurrence timing. For example, it is possible to determine whether an abnormality occurs continuously, before transmission of image data, or after transmission of image data. Note that the first embedded data may not be configured. In addition, there may be a configuration in which the first periodic abnormality diagnosis is not executed, and only the second periodic abnormality diagnosis is executed.

<Imaging Transmission Process (Part 3)>

In the above description, an example has been described in which periodic abnormality diagnosis for the second time (second periodic abnormality diagnosis) is executed, and a singular message corresponding to a diagnosis result of the second periodic abnormality diagnosis is included in second embedded data and transmitted. However, the diagnosis result of the periodic abnormality diagnosis may be included in a read response and transmitted.

That is, in a case where a frame start signal transmitted according to high-speed data transmission is received from the image sensor 1211 that is a slave of low-speed command transmission, the application processor 1212 that is a master of the low-speed command transmission transmits a read command for requesting the application processor 1212 to read a singular message in the image sensor 1211 according to the low-speed command transmission.

The image sensor 1211 receives the read command transmitted from the application processor 1212, and transmits a read response including a singular message corresponding to the read command according to the high-speed data transmission.

The application processor 1212 can receive a notification of the singular message from the image sensor 1211 by receiving a read response including the singular message.

That is, the singular message may be transmitted within a period of line blanking during which no image data is transmitted between the frame start and the frame end, and in particular, it is desirable that the singular message is transmitted within a period between the frame start and the image data. This read command corresponds to, for example, Read of Read/Write in the I2C or I3C standard. The read response corresponds to a read return value. As a result, it is possible to quickly provide a notification of an abnormality before transmission of image data without influencing the maximum value of power consumption.

Here, an imaging transmission process in which a diagnosis result of periodic abnormality diagnosis is included in a read response and transmitted will be described with reference to flowcharts of FIGS. 134 and 135.

Note that the flowchart of FIG. 134 illustrates a process of the image sensor 1211, and the flowchart of FIG. 135 illustrates a process of the application processor 1212.

Furthermore, the processes in steps S1251 to 1253 and S1257 to S1260 are similar to the processes in steps S1191 to S1193 and S1195 to S1198 of FIG. 131, and thus description thereof will be omitted.

That is, in steps S1251 to S1253 (FIG. 134), imaging is started, periodic abnormality diagnosis is executed, and a frame start is transmitted. Further, in step S1271 (FIG. 135), the extension mode-compatible CSI-2 reception circuit 1552 of the application processor 1212 determines whether or not the frame start transmitted from the image sensor 1211 has been received, and repeatedly performs similar processes until it is determined that the frame start has been received.

Then, in a case where it is determined in step S1271 that the frame start transmitted from the image sensor 1211 has been received, the process proceeds to step S1272.

In step S1272, the extension mode-compatible CSI-2 reception circuit 1552 transmits a read command to the image sensor 1211 according to low-speed command transmission.

In response to this, in step S1254 (FIG. 134), the extension mode-compatible CSI-2 transmission circuit 1504 of the image sensor 1211 determines whether or not the read command transmitted from the application processor 1212 has been received, and repeatedly performs similar processes until it is determined that the read command has been received.

Then, in a case where it is determined in step S1254 that the read command has been received, the process proceeds to step S1255.

In step S1255, the extension mode-compatible CSI-2 transmission circuit 1504 transmits a read response including a singular message that is a diagnosis result of the periodic abnormality diagnosis to the application processor 1212 according to high-speed data transmission for transmitting image data.

In response to this, in step S1273 (FIG. 135), the extension mode-compatible CSI-2 reception circuit 1552 of the application processor 1212 determines whether or not the read response including the singular message that is the diagnosis result of the periodic abnormality diagnosis transmitted from the image sensor 1211 has been received, and repeatedly performs similar processes until it is determined that the read response has been received.

Then, in a case where it is determined in step S1273 that the read response including the singular message that is the diagnosis result of the periodic abnormality diagnosis transmitted from the image sensor 1211 has been received, the process proceeds to step S1274.

In step S1274, the application processor 1212 determines whether the image sensor 1211 is normal or abnormal on the basis of the singular message included in the received read response.

In step S1275, the application processor 1212 determines whether or not to transmit a command to end the high-speed data transmission, and in a case where it is determined not to end the high-speed data transmission, the process returns to step S1271, and the subsequent processes are repeatedly performed.

Then, in a case where it is determined in step S1275 to transmit a command to end the high-speed data transmission, in step S1276, the extension mode-compatible CSI-2 reception circuit 1552 transmits the command to end the high-speed data transmission to the image sensor 1211, and the process is ended.

Note that, in this process, in step S1256, the singular message that is the diagnosis result of the periodic abnormality diagnosis may be transmitted in a state in which the singular message is not included in the embedded data.

Through the above process, a diagnosis result of the periodic abnormality diagnosis can be included in a read response and transmit.

<Imaging Transmission Process (Part 4)>

In the above description, an example has been described in which a read command is transmitted according to a frame start, and a singular message that is a diagnosis result of the periodic abnormality diagnosis is included in a read response and transmitted. However, a read command may be transmitted according to a frame end, and a diagnosis result of the periodic abnormality diagnosis may be included in a read response and transmitted.

In a case where a frame end signal transmitted according to high-speed data transmission is received from the image sensor 1211 that is a slave of low-speed command transmission, the application processor 1212 that is a master of the low-speed command transmission transmits a read command for requesting the application processor 1212 to read a singular message in the image sensor 1211 according to the low-speed command transmission.

The image sensor 1211 receives the read command transmitted from the application processor 1212 and transmits a singular message (read response) corresponding thereto according to high-speed data transmission.

Then, the application processor 1212 acquires a notification of the singular message from the image sensor 122 by receiving the read response.

That is, the singular message is transmitted within a frame blanking period in which no image data is transmitted between the frame end and the next frame start.

Here, with reference to flowcharts of FIGS. 136 and 137, an imaging transmission process will be described in which a read command is transmitted according to a frame end, and a diagnosis result of periodic abnormality diagnosis is included in a read response and transmitted.

The flowchart of FIG. 136 illustrates a process of the image sensor 1211, and the flowchart of FIG. 137 illustrates a process of the application processor 1212.

Furthermore, the processes in steps S1291 to S1297 and S1300 in FIG. 136 are similar to the processes in steps S1251 to S1253 and S1256 to S1260 in FIG. 134, and thus description thereof will be omitted.

Furthermore, since the processes in steps S1312 to S1316 in FIG. 137 are similar to the processes in steps S1272 to S1276 in FIG. 135, description thereof will be omitted.

That is, in the image sensor 1211, an image is captured through the processes in steps S1291 to S1297 (FIG. 136), periodic abnormality diagnosis is executed, and a frame start, embedded data, image data, and a frame end are transmitted.

In response to this, in step S1311 (FIG. 137), the extension mode-compatible CSI-2 reception circuit 1552 of the application processor 1212 determines whether or not the frame end transmitted from the image sensor 1211 has been received, and repeatedly performs similar processes until it is determined that the frame end has been received.

Then, in a case where it is determined in step S1311 that the frame end transmitted from the image sensor 1211 has been received, the process proceeds to step S1312.

In step S1312, the extension mode-compatible CSI-2 reception circuit 1552 transmits a read command to the image sensor 1211 according to low-speed command transmission.

In response to this, in step S1298 (FIG. 136), the extension mode-compatible CSI-2 transmission circuit 1504 of the image sensor 1211 determines whether or not the read command transmitted from the application processor 1212 has been received, and repeatedly performs similar processes until it is determined that the read command has been received.

Then, in a case where it is determined in step S1298 that the read command has been received, the process proceeds to step S1299.

In step S1299, the extension mode-compatible CSI-2 transmission circuit 1504 transmits a read response including a singular message that is a diagnosis result of the periodic abnormality diagnosis to the application processor 1212 according to high-speed data transmission for transmitting image data.

In response to this, through the processes in steps S1313 to S1316 (FIG. 135), the application processor 1212 receives the read response including the singular message that is the diagnosis result of the periodic abnormality diagnosis transmitted from the image sensor 1211, determines whether the image sensor 1211 is normal or abnormal, and ends the process when a command to end the high-speed data transmission is transmitted.

Through the above process, a read command can be transmitted according to a frame end, and a diagnosis result of periodic abnormality diagnosis can be included in a read response and transmitted.

As a result, a singular message can be transmitted within a period of frame blanking during which no image data is transmitted between the frame end and the next frame start.

<Imaging Transmission Process (Part 5)>

In the above description, an example has been described in which a read command is transmitted according to a frame end, and a diagnosis result of periodic abnormality diagnosis is included in a read response and transmitted. However, a read response including a singular message may be transmitted immediately before frame start transmission.

That is, for example, in the image sensor 1211, the periodic abnormality diagnosis is executed between transmission of the frame end and transmission of the next frame start. Then, the application processor 1212 waits for a predetermined time until the periodic abnormality diagnosis is completed in the image sensor 1211 after the frame end is received, and then transmits a read command. Note that a timer for counting time may be provided, and a standby time may be counted by the timer.

Through such a process, it is possible to notify that there is a possibility that an abnormality occurs in an operation of the image sensor 1211 or that an abnormality has occurred, from the image sensor 1211 to the application processor 1212 in the shortest time without influencing the maximum value of power consumption before image data of the second and subsequent frames is transmitted.

Here, with reference to flowcharts of FIGS. 138 and 139, an imaging transmission process will be described in which a read command is transmitted according to a frame end, and a diagnosis result of periodic abnormality diagnosis is included in a read response and transmitted.

The flowchart of FIG. 138 illustrates a process of the image sensor 1211, and the flowchart of FIG. 139 illustrates a process of the application processor 1212.

Furthermore, the processes in steps S1331 to S1336 and S1339 to S1340 in FIG. 138 are similar to the processes in steps S1291 and S1293 to S1299 in FIG. 136, and thus description thereof will be omitted.

Furthermore, since the processes in steps S1351 and S1353 to S1357 in FIG. 139 are similar to the processes in steps S1311 to S1316 in FIG. 137, description thereof will be omitted.

That is, when an image is captured and a frame start, embedded data, image data, and a frame end are transmitted in steps S1331 to S1336 (FIG. 138), the pixel 1501 starts imaging in step S1337, and image data output from the pixel 1501 is supplied to the extension mode-compatible CSI-2 transmission circuit 1504 via the AD converter 1502 and the image processing unit 1503.

In step S1338, the image sensor 1211 executes periodic abnormality diagnosis.

On the other hand, when the frame end is received in step S1351 (FIG. 139), the application processor 1212 waits for a predetermined time in step S1352. This predetermined time is a time until the periodic abnormality diagnosis process in step S1338 in the image sensor 1211 is completed.

Then, after waiting for the processing time in the process in step S1352, the process proceeds to step S1353, and a read command is transmitted to the image sensor 1211.

In the image sensor 1211, a read response including a singular message corresponding to a diagnosis result of the periodic abnormality diagnosis is transmitted to the application processor 1212 according to high-speed data transmission for transmitting image data in response to the read command through the processes in steps S1339 and S1340 (FIG. 138). Note that, in a case where a command to end the high-speed data transmission has not been received in step S1341, the process returns to the process in step S1332, and the subsequent processes are repeatedly performed. Then, in step S1341, when the command to end the high-speed data transmission is received, the process is ended.

Through the above process, it is possible to quickly notify the application processor 1212 of a possibility of an operation abnormality or the operation abnormality of the image sensor 1211 without influencing the maximum value of power consumption before image data of the second and subsequent frames is transmitted.

<Imaging Transmission Process (Part 6)>

In the above description, an example has been described in which a read response including a singular message can be transmitted immediately before frame start transmission. However, transmission of a read command or transmission of a read response may be performed within a line blanking period after transmission of embedded data.

Through such a process, it is possible to quickly notify the application processor 1212 of a possibility of an operation abnormality or the occurrence of the operation abnormality of the image sensor 1211 without influencing the maximum value of power consumption before image data is transmitted.

Here, an imaging transmission process in which transmission of a read command or transmission of a read response is performed within a line blanking period after transmission of embedded data will be described with reference to flowcharts of FIGS. 140 and 141.

The flowchart of FIG. 140 illustrates a process of the image sensor 1211, and the flowchart of FIG. 141 illustrates a process of the application processor 1212.

Furthermore, the processes in steps S1371 to S1373 and S1375 to S1380 in FIG. 140 are similar to the processes in steps S1251 to S1255 and S1257 to S1260 in FIG. 134, and thus description thereof will be omitted.

Furthermore, the processes in steps S1392 to S1396 in FIG. 141 are similar to the processes in steps S1272 to S1276 in FIG. 135, and thus description thereof will be omitted.

That is, when an image is captured, periodic abnormality diagnosis is executed, and a frame start is transmitted through the processes in steps S1371 to S1373 (FIG. 140), the extension mode-compatible CSI-2 transmission circuit 1504 transmits embedded data of the virtual channel in step S1374.

On the other hand, in the application processor 1212, in step S1391 (FIG. 141), the extension mode-compatible CSI-2 reception circuit 1552 of the application processor 1212 determines whether or not a packet footer of the embedded data transmitted from the image sensor 1211 has been received, and repeatedly performs similar processes until it is determined that the packet footer has been received.

Then, in a case where it is determined in step S1391 that the packet footer of the embedded data transmitted from the image sensor 1211 has been received, the process proceeds to step S1392.

In step S1392, the extension mode-compatible CSI-2 reception circuit 1552 transmits a read command to the image sensor 1211 according to low-speed command transmission.

In the image sensor 1211, a read response including a singular message corresponding to a diagnosis result of the periodic abnormality diagnosis is transmitted to the application processor 1212 according to high-speed data transmission for transmitting image data in response to the read command through the processes in steps S1375 and S1376 (FIG. 140).

Through the above process, it is possible to quickly notify the application processor 1212 of a possibility of an operation abnormality or the occurrence of the operation abnormality of the image sensor 1211 before image data is transmitted without influencing the maximum value of power consumption, and thus it is possible to quickly perform handling corresponding to the singular message.

<Imaging Transmission Process (Part 7)>

In the above description, the example in which transmission of a read command and transmission of a read response are performed within the line blanking period after transmission of embedded data has been described, but the transmission of the read command and the transmission of the read response may be performed within the line blanking period after transmission of image data.

In this case, since the image sensor 1211 performs periodic abnormality diagnosis for each line of the image data and transmits a singular message, it is possible to quickly notify the application processor 1212 of the singular message corresponding to the image data for each row without influencing the maximum value of power consumption.

Here, an imaging transmission process in which transmission of a read command and transmission of a read response are performed within a line blanking period after transmission of image data will be described with reference to flowcharts of FIGS. 142 and 143.

The flowchart of FIG. 142 illustrates a process of the image sensor 1211, and the flowchart of FIG. 143 illustrates a process of the application processor 1212.

Furthermore, the processes in steps S1411 to S1413, S1416, S1417, S1419, and S1420 in FIG. 142 are similar to the processes in steps S1371, S1373 to S1376, S1379, and S1380 in FIG. 140, and thus description thereof will be omitted.

Furthermore, the processes in steps S1432 to S1436 in FIG. 143 are similar to the processes in steps 1392 to S1396 in FIG. 141, and thus description thereof will be omitted.

That is, when an image is captured, a frame start is transmitted, and embedded data is transmitted through the processes in steps S1411 to S1413 (FIG. 142), the extension mode-compatible CSI-2 transmission circuit 1504 transmits image data of the virtual channel in step S1414.

In step S1415, the image sensor 1211 executes periodic abnormality diagnosis.

On the other hand, in the application processor 1212, in step S1431 (FIG. 143), the extension mode-compatible CSI-2 reception circuit 1552 of the application processor 1212 determines whether or not a packet footer of the image data transmitted from the image sensor 1211 has been received, and repeatedly performs similar processes until it is determined that the packet footer has been received.

Then, in a case where it is determined in step S1431 that the packet footer of the image data transmitted from the image sensor 1211 has been received, the process proceeds to step S1432.

In step S1432, the extension mode-compatible CSI-2 reception circuit 1552 transmits a read command to the image sensor 1211 according to low-speed command transmission.

In the image sensor 1211, a read response including a singular message corresponding to a diagnosis result of the periodic abnormality diagnosis is transmitted to the application processor 1212 according to high-speed data transmission for transmitting the image data in response to the read command through the processes in steps S1416 and S1417 (FIG. 142).

Further, in step S1418, the extension mode-compatible CSI-2 transmission circuit 1504 determines whether or not transmission of image data for one frame has been completed.

In a case where the extension mode-compatible CSI-2 transmission circuit 1504 determines in step S1418 that the transmission of the image data for one frame has not been completed, the process returns to step S1414, and similar processes are repeatedly performed thereafter. On the other hand, in step S1418, in a case where the extension mode-compatible CSI-2 transmission circuit 1504 determines that the transmission of the image data for one frame has been completed, the process proceeds to step S1419.

Through the above process, the image sensor 1211 performs the periodic abnormality diagnosis for each line of the image data and transmits the singular message, so that it is possible to quickly notify the application processor 1212 of the singular message corresponding to the image data for each row without influencing the maximum value of power consumption.

As a result, the application processor 1212 can quickly perform handling corresponding to the singular message.

<Imaging Transmission Process (Part 8)>

In the above description, an example has been described in which transmission of a read command and transmission of a read response are performed within the line blanking period after transmission of image data. However, a singular message may be transmitted by using an interrupt function.

In a case where the interrupt function is used, since the image sensor 1211 can be easily synchronized with the application processor 1212, it is possible to transmit the singular message at a timing determined by the image sensor 1211 by executing interruption at the timing determined by the image sensor 1211.

Note that the image sensor 1211 may trigger a read command according to the in-band interrupt and transmit a read response accordingly, or may omit a read command according to the in-band interrupt and transmit a read response.

Here, with reference to flowcharts of FIGS. 144 and 145, an imaging transmission process in which a singular message is transmitted by using the interrupt function will be described.

The flowchart of FIG. 144 illustrates a process of the image sensor 1211, and the flowchart of FIG. 145 illustrates a process of the application processor 1212.

Furthermore, the processes in steps S1451 to S1453, S1455, S1456, and S1458 to S1461 of FIG. 144 are similar to the processes in steps S1371 to S1373, and S1375 to S1380 in FIG. 140, and thus description thereof will be omitted.

Furthermore, the processes in steps S1472 to S1476 in FIG. 145 are similar to the processes in steps 1392 to S1396 in FIG. 141, and thus description thereof will be omitted.

That is, through the processes in steps S1451 to S1453 (FIG. 144), the image sensor 1211 captures an image, executes periodic abnormality diagnosis, and transmits a frame start.

In step S1454, the extension mode-compatible CSI-2 transmission circuit 1504 notifies the application processor 1212 of the start of execution of interruption.

On the other hand, in the application processor 1212, in step S1471 (FIG. 145), the extension mode-compatible CSI-2 reception circuit 1552 of the application processor 1212 determines whether or not a notification indicating the start of execution of interruption transmitted from the image sensor 1211 has been received, and repeatedly performs similar processes until it is determined that the notification has been received.

Then, in a case where it is determined in step S1471 that the notification indicating the start of execution of interruption transmitted from the image sensor 1211 has been received, the process proceeds to step S1472.

In step S1432, the extension mode-compatible CSI-2 reception circuit 1552 transmits a read command to the image sensor 1211 according to low-speed command transmission.

In the image sensor 1211, a read response including a singular message corresponding to a diagnosis result of the periodic abnormality diagnosis is transmitted to the application processor 1212 according to high-speed data transmission for transmitting the image data in response to the read command through the processes in steps S1455 and S1456 (FIG. 144).

Further, in step S1457, the extension mode-compatible CSI-2 transmission circuit 1504 transmits the embedded data.

Since the interrupt function can be used through the above process, it is possible to transmit a singular message to the application processor 1212 at a timing determined by the image sensor 1211 by executing interruption at the timing determined by the image sensor 1211.

Note that the image sensor 1211 may trigger a read command according to the in-band interrupt and transmit a read response accordingly, or may omit a read command according to the in-band interrupt and transmit a read response.

<Imaging Transmission Process (Part 9)>

In the above description, an example in which a singular message is transmitted by using the interrupt function has been described, but a singular message may be stored in data (for example, in embedded data) of a virtual channel different from a virtual channel for transmitting image data and transmitted.

The singular message is stored in data of a virtual channel different from a virtual channel for transmitting image data and transmitted, and thus it is possible to transmit the singular message even in a case where there is no room to store the singular message in embedded data of the virtual channel for transmitting image data.

Note that since the periodic abnormality diagnosis is executed within the frame blanking period, it is possible to prevent the periodic abnormality diagnosis from being performed simultaneously with the transmission, so that the maximum value of power consumption is not influenced. In addition, the periodic abnormality diagnosis may be executed outside the frame blanking period.

Consequently, it is possible to quickly notify the application processor 1212 of a possibility of an operation abnormality and the occurrence of the operation abnormality of the image sensor 1211 before image data is transmitted.

Here, with reference to a flowchart of FIG. 146, an imaging transmission process in which a singular message is stored in data of a virtual channel different from a virtual channel for transmitting image data by the image sensor 1211 and transmitted will be described.

Note that, here, a process of transmitting image data in the first virtual channel (VC1) and transmitting embedded data including a singular message in the second virtual channel (VC2) will be described.

In step S1491, the pixel 1501 starts imaging, and image data output from the pixel 1501 is supplied to the extension mode-compatible CSI-2 transmission circuit 1504 via the AD converter 1502 and the image processing unit 1503.

In step S1492, the image sensor 1211 executes periodic abnormality diagnosis.

In step S1493, the extension mode-compatible CSI-2 transmission circuit 1504 transmits a frame start of the first virtual channel.

In step S1494, the extension mode-compatible CSI-2 transmission circuit 1504 transmits a frame start of the second virtual channel.

In step S1495, the extension mode-compatible CSI-2 transmission circuit 1504 transmits embedded data of the first virtual channel.

In step S1496, the extension mode-compatible CSI-2 transmission circuit 1504 transmits embedded data of the second virtual channel. In this case, the extension mode-compatible CSI-2 transmission circuit 1504 transmits the embedded data of the second virtual channel including a singular message corresponding to a diagnosis result of the periodic abnormality diagnosis.

In step S1497, the extension mode-compatible CSI-2 transmission circuit 1504 transmits image data of the first virtual channel.

In step S1498, the extension mode-compatible CSI-2 transmission circuit 1504 determines whether or not transmission of image data for one frame has been completed.

In a case where the extension mode-compatible CSI-2 transmission circuit 1504 determines in step S1498 that transmission of the image data for one frame has not been completed, the process returns to step S1497, and similar processes are repeatedly performed thereafter. On the other hand, in step S1498, in a case where the extension mode-compatible CSI-2 transmission circuit 1504 determines that transmission of the image data for one frame has been completed, the process proceeds to step S1499.

In step S1499, the extension mode-compatible CSI-2 transmission circuit 1504 transmits user defined data of the second virtual channel.

In step S1500, the extension mode-compatible CSI-2 transmission circuit 1504 transmits a frame end of the first virtual channel.

In step S1501, the extension mode-compatible CSI-2 transmission circuit 1504 transmits a frame end of the second virtual channel.

In step S1502, the extension mode-compatible CSI-2 transmission circuit 1504 determines whether or not a command to end the high-speed data transmission has been received.

In step S1502, in a case where the extension mode-compatible CSI-2 transmission circuit 1504 determines that a command to end the high-speed data transmission has not been received, the process returns to step S1491, and similar processes are repeatedly performed thereafter. On the other hand, in a case where the extension mode-compatible CSI-2 transmission circuit 1504 determines in step S1502 that a command to end the high-speed data transmission has been received, the process is ended.

Through the above process, it is possible to transmit a singular message even in a case where there is no room to store the singular message in embedded data of a virtual channel for transmitting image data.

<Imaging Transmission Process (Part 10)>

In the above description, an example has been described in which a singular message is stored and transmitted in data (for example, in the embedded data) of a virtual channel different from the virtual channel for transmitting image data. However, the singular message may be stored and transmitted in at least a part of non-image data of a virtual channel different from a virtual channel for transmitting image data.

The non-image data is, for example, packet data (for example, Generic Short Packet Data Types or Generic Long Packet Data Types), user defined data (User Defined Byte-based Data), or reserved region data (Reserved for future use).

In a case where the singular message is stored in at least a part of the non-image data of a virtual channel different from a virtual channel for transmitting image data, the image sensor 1211 transmits the singular message for each line of image data, and thus it is possible to quickly transmit the singular message corresponding to the image data for each row.

As a result, the application processor 1212 that receives the singular message can quickly perform handling corresponding to the singular message.

Since the periodic abnormality diagnosis is executed within the line blanking period before transmission of image data, the periodic abnormality diagnosis is not performed simultaneously with the transmission, so that the maximum value of power consumption is not influenced. In addition, the periodic abnormality diagnosis may be executed outside the line blanking period.

Here, with reference to a flowchart of FIG. 147, an imaging transmission process will be described in which a singular message is stored in at least a part of non-image data in a virtual channel different from a virtual channel for transmitting image data and transmitted.

Note that, here, process of transmitting image data in the first virtual channel (VC1) and transmitting user defined data including a singular message in the second virtual channel (VC2) will be described.

Furthermore, the processes in steps S1521 to S1525 and steps S1530 to S1532 of the flowchart of FIG. 147 are similar to the processes in steps S1491, S1493 to S1496, and S1500 to S1502 in the flowchart of FIG. 146, and thus description thereof will be omitted. However, the process in step S1525 is different from the process in step S1496 in that a diagnosis result of the periodic abnormality diagnosis is not included.

That is, when imaging is started and the frame start and the embedded data of each of the first virtual channel and the second virtual channel are transmitted through the processes in steps S1521 to S1525, the process proceeds to step S1526.

In step S1526, the image sensor 1211 executes periodic abnormality diagnosis.

In step S1527, the extension mode-compatible CSI-2 transmission circuit 1504 transmits image data of the first virtual channel.

In step S1528, the extension mode-compatible CSI-2 transmission circuit 1504 transmits user defined data of the second virtual channel. In this case, the extension mode-compatible CSI-2 transmission circuit 1504 transmits the user defined data of the second virtual channel including a singular message corresponding to a diagnosis result of the periodic abnormality diagnosis.

In step S1529, the extension mode-compatible CSI-2 transmission circuit 1504 determines whether or not transmission of the image data for one frame has been completed.

In a case where the extension mode-compatible CSI-2 transmission circuit 1504 determines in step S1529 that transmission of the image data for one frame has not been completed, the process returns to step S1526, and similar processes are repeatedly performed thereafter. On the other hand, in step S1529, in a case where the extension mode-compatible CSI-2 transmission circuit 1504 determines that transmission of the image data for one frame has been completed, the process proceeds to step S1530.

Then, in steps S1530 and S1531, frame ends of the first virtual channel and the first virtual channel are transmitted.

Through the above process, since the image sensor transmits a singular message for each line of image data, it is possible to quickly transmit the singular message corresponding to the image data for each row.

As a result, the application processor 1212 that receives the singular message can quickly perform handling corresponding to the singular message.

Furthermore, in the above description, the example in which the user defined data including the singular message is transmitted has been described. However, the non-image data including the singular message may not be user defined data, and may be, for example, packet data including the singular message or reserved region data.

<Imaging Transmission Process (Part 11)>

In the above description, an example has been described in which a singular message is stored in at least a part of non-image data in a virtual channel different from a virtual channel for transmitting image data and transmitted. However, the singular message may be stored in image data and transmitted.

In a case where the singular message is stored in image data and transmitted, the image sensor 1211 transmits the singular message for each line of the image data, and thus it is possible to quickly transmit the singular message corresponding to the image data for each row.

As a result, the application processor 1212 that receives the singular message can quickly perform handling corresponding to the singular message.

In addition, since the periodic abnormality diagnosis is executed within the line blanking period, the periodic abnormality diagnosis is not performed simultaneously with the transmission, and thus, the maximum value of power consumption is not influenced.

Furthermore, the periodic abnormality diagnosis may be executed outside the line blanking period.

In addition, in a case where the singular message is stored in the image data, a visible digital watermark message or an invisible digital watermark message may be superimposed and stored.

For example, a predetermined message (for example, warning display) may be stored as a singular message by using a visible digital watermark. In addition, a count message (predetermined message) indicating a countdown or a countup until the image sensor 1211 ends high-speed data transmission may be stored by using a visible digital watermark.

These may be expressions (for example, a fixed pattern) that can be recognized by a person or expressions (for example, a random pattern) that cannot be recognized by a person. In addition, the count message may be stored by using an invisible digital watermark that is difficult to visually recognize with naked eyes due to a minute image change.

Here, an imaging transmission process in which a singular message is stored in image data and transmitted will be described with reference to a flowchart of FIG. 148.

Note that the processes in steps S1551 and S1552 and steps S1557 and S1558 in the flowchart of FIG. 148 are similar to the processes in steps S1191, S1193, S1197, and S1198 in the flowchart of FIG. 131, and thus description thereof will be omitted.

That is, when the imaging is started and the frame start is transmitted through the processes in steps S1551 and S1552 and the embedded data is transmitted through the process in step S1553, the process proceeds to step S1554.

In step S1554, the image sensor 1211 executes periodic abnormality diagnosis.

In step S1555, the extension mode-compatible CSI-2 transmission circuit 1504 transmits image data of the virtual channel. In this case, the extension mode-compatible CSI-2 transmission circuit 1504 transmits the image data of the virtual channel including a singular message corresponding to a diagnosis result of the periodic abnormality diagnosis.

In step S1556, the extension mode-compatible CSI-2 transmission circuit 1504 determines whether or not transmission of the image data for one frame has been completed.

In a case where the extension mode-compatible CSI-2 transmission circuit 1504 determines in step S1556 that transmission of the image data for one frame has not been completed, the process returns to step S1554, and similar processes are repeatedly performed thereafter. On the other hand, in step S1556, in a case where the extension mode-compatible CSI-2 transmission circuit 1504 determines that transmission of the image data for one frame has been completed, the process proceeds to step S1557.

Then, in step S1557, a frame end of the virtual channel is transmitted.

Through the above process, the image sensor 1211 can transmit the singular message for each line of image data, and the singular message corresponding to the image data for each row can be quickly transmitted to the application processor 1212.

As a result, the application processor 1212 that receives the singular message can quickly perform handling corresponding to the singular message.

Note that, in the above description, the start of imaging is explicitly described, but the end of imaging is not explicitly described. This is because an imaging method differs depending on, for example, whether or not an imaging method is a global shutter method or a rolling shutter method.

For example, in the case of the global shutter method, since all the pixels can perform imaging at the same time, imaging may be ended before the next process, or imaging may be ended before first image data in a frame is transmitted.

On the other hand, in the case of the rolling shutter method, at least a part of imaging and high-speed data transmission executed in each row of pixels may be redundantly executed (executed in parallel), and thus the imaging may be completed before last image data in a frame is transmitted.

Furthermore, the imaging start timing is an example, and imaging may be executed with a delay to a timing before first image data in a frame is transmitted, for example.

Furthermore, the timing of the periodic abnormality diagnosis is also an example, and for example, the periodic abnormality diagnosis may be executed with a delay to a timing before the singular message is transmitted.

<Message Count Value>

The message counter 1513 generates a message counter (message count value) by incrementing or decrementing any of Humming Distance (HD)≥1 count (binary code) or HD=1 count (gray code).

Note that, in FIG. 149, an example of a message count value including a binary code of Humming Distance (HD)≥1 is illustrated on the left side in the drawing, and an example of a message count value including a gray code of HD=1 is illustrated on the right side in the drawing, both of which are incremented downward in the drawing.

In particular, in a case where the message counter (message count value) is a gray code, the Hamming distance associated with the increment or the decrement is constant, so that the resistance to the power observation attack and the electromagnetic observation attack can be improved.

The message count value may switch between a first code method and a second code method (for example, a binary code method and a gray code method) as a counting method.

Furthermore, in a case where counting methods for the message count value are switched as necessary, additional information may be transmitted from the image sensor 1211 to the application processor 1212 without changing an amount of data to be transmitted.

For example, in a case where an abnormality is detected in the image sensor 1211, counting methods for the message count value may be switched, and abnormality information (for example, the presence or absence of abnormality) may be transmitted from the image sensor 1211 to the application processor 1212 according to a counting method.

In particular, in a case where the binary code and the gray code are switched, it is possible to transmit the additional information while maintaining increment or decrement of the message counter.

In a case where the image sensor 1211 switches the binary code and the gray code, in order to enable the application processor 1212 to determine whether it is count switching or a defect of message transmission and reception, it is desirable to perform switching at a timing in consideration of a code period (an example of a code period of 16 counts at 4 bits on the left side description), but the present technology is not limited thereto.

In a case where the image sensor 1211 includes the first counter and the second counter that are related to each other, it is possible to verify the presence or absence of a defect or falsification of the message counter.

For example, the presence or absence of a defect or falsification of the counter may be verified from a result of calculation (for example, addition) of the first counter to be incremented and the second counter to be decremented.

That is, for example, in a case where the first counter that increments the binary code and the second counter that decrements the binary code are used, as illustrated in FIG. 150, each addition result is always "1111" unless there is a defect or falsification. Therefore, in a case where each addition result is "1111", since the first counter and the second counter are normal values, it is possible to verify the presence or absence of a defect or falsification depending on whether or not an addition result is a normal value including "1111".

In addition, the presence or absence of a defect or falsification of the counter may be verified from a result of calculation (for example, subtraction) of the first counter and the second counter having the same count direction.

That is, for example, in the case of the first counter that increments the gray code and the second counter that decrements the gray code, as illustrated in FIG. 151, each subtraction result is always "0000" unless there is a defect or falsification. Therefore, in a case where each subtraction result is "0000", since the first counter and the second counter are normal values, it is possible to verify the presence or absence of a defect or falsification depending on whether or not a subtraction result is a normal value including "0000".

<Message Counting Process>

Next, a message counting process will be described with reference to a flowchart of FIG. 152.

In step S1571, the message counter 1513 initializes the first count value and the second count value.

In step S1572, the extension mode-compatible CSI-2 transmission circuit 1504 determines whether or not to transmit an extended packet header, and waits for the processing until it is determined to transmit an extended packet header.

In a case where it is determined in step S1572 to transmit an extended packet header, the process proceeds to step S1573.

In step S1573, the extension mode-compatible CSI-2 transmission circuit 1504 acquires the first count value as a message count value from the message counter 1513, and stores the first count value in the extended packet header.

In step S1574, the extension mode-compatible CSI-2 transmission circuit 1504 transmits the extended packet header to the application processor 1212.

In step S1575, the message counter 1513 determines whether or not the first count value is the maximum value.

In a case where it is determined in step S1575 that the first count value is the maximum value, the process returns to step S1571, and the first count value and the second count value are initialized.

In addition, in a case where it is determined in step S1575 that the first count value is not the maximum value, the process proceeds to step S1576.

In step S1576, the message counter 1513 updates (increments or decrements) the first count value of the first message counter.

In step S1577, the message counter 1513 updates (increments or decrements) the second count value of the second message counter.

In step S1578, the message counter 1513 calculates (adds or subtracts) the first count value and the second count value.

In step S1579, the message counter 1513 determines whether or not the calculation result is a normal value.

In a case where it is determined in step S1579 that the calculation result is a normal value, the process proceeds to step S1580.

In step S1580, the message counter 1513 determines that the first count value and the second count value are normal.

In a case where it is determined in step S1579 that the calculation result is not a normal value, the process proceeds to step S1581.

In step S1581, the message counter 1513 determines that at least one of the first count value or the second count value is abnormal.

Through the above process, it is possible to improve resistance to a defect or falsification with respect to a count value of the message counter.

Note that the image sensor 1211 may transmit a normality message in a case where it is determined that a count value is normal, and transmit an abnormality message in a case where it is determined that a count value is abnormal as a singular message. Further, the message count value may be used as a singular message such as an abnormality message.

On the other hand, the singular message may be stored in an extended packet footer outside the frame end (for example, in the frame start, in the embedded data, and in the image data). In addition, an integrity calculation value based on encryption of data including a singular message may be stored in the extended packet footer in the frame end. Further, an integrity calculation value based on encryption of data including a singular message may be stored in the packet data in the embedded data, rather than in the extended packet footer.

As described above, the description has been made by using the example in which the singular message or the additional information are transmitted from the image sensor 1211 to the application processor 1212, but the singular message or the additional information may be transmitted from the application processor 1212 to the image sensor 1211 or the display 1213 according to a similar idea.

<Storage of Information for Identifying Abnormality>

The extended packet header or the extended packet footer may store a warning descriptor (singular message) defined to identify any of, for example, a fatal warning (detection of a serious abnormality), a sensor-internal warning (detection of an abnormality caused inside the sensor), a sensor-external warning (detection of an abnormality caused outside the sensor), a power-source warning (detection of an abnormality caused by a power source), a clock-source warning (detection of an abnormality caused by a clock source), the others warning (detection of an abnormality caused by the others), a physical warning (detection of a physical abnormality), a logical warning (detection of a logical abnormality), a power warning (detection of a power abnormality), a voltage warning (detection of a voltage abnormality), a current warning (detection of a current abnormality), an electromagnetic warning (detection of an electromagnetic abnormality), clock warning (detection of a clock abnormality), a thermal warning (detection of a temperature abnormality), a channel warning (detection of a transmission channel abnormality), a message warning (detection of a message abnormality), an attack warning (detection of an attack), a tamper warning (for example, detection of infringement), a blind warning (for example, detection of a disturbance), a saturation warning (for example, detection of a disturbance), a fake warning (for example, a detection of a disturbance), a foreign object warning (for example, detection of a failure), a probe warning (for example, detection of an infringement or a failure), or a DOS warning (for example, detection of a message count abnormality).

The warning descriptor (singular message) may be stored in at least a part of a vendor specific region (Vendor specific), a user defined region (User defined), or a reserved region (Reserved for Future Use).

Furthermore, any item in the warning descriptor (singular message) may be defined in any of the extended packet header (for example, Security Descriptor), the extended packet footer (for example, ePF1), the embedded data, the read response, or the like.

Note that FIG. 153 illustrates a configuration example of the extended packet header ePH2 when a warning descriptor is set in a reserved region (Reserved) in the extended packet header ePH2 in FIG. 58.

Furthermore, FIG. 154 illustrates a description example of identification information using each bit of a warning descriptor (singular message).

<Separation of Singular Message>

Transmission of a singular message may be separated into transmission of a first singular message and transmission of a second singular message.

Since the extended packet header is transmitted every high-speed data transmission of a line (row) such as image data, it is desirable that a bit width be short. However, since the immediacy is high, for example, a part of warning flash (for example, Physical attack detection) or warning information may be allocated and stored as the first singular message.

On the other hand, for example, information (warning details) indicating details of the warning information is allocated to the second singular message, stored outside the extended packet header, and transmitted.

FIG. 155 illustrates an example in which warning flash (for example, Physical attack detection) is set as the first singular message in the extended packet header.

<Transmission Process when Singular Message is Separated and Transmitted>

Next, with reference to flowcharts of FIGS. 156 and 157, a transmission process when a singular message is separated and transmitted will be described.

Note that the flowchart of FIG. 156 illustrates a process of the image sensor 1211, and the flowchart of FIG. 157 illustrates a process of the application processor 1212.

In step S1591 (FIG. 156), the image sensor 1211 executes abnormality diagnosis.

In step S1592, the extension mode-compatible CSI-2 transmission circuit 1504 transmits an extended packet header including warning flash that is a first singular message.

In step S1593, the extension mode-compatible CSI-2 transmission circuit 1504 transmits, for example, embedded data including warning details that are a second singular message outside the extended packet header.

On the other hand, in step S1611, the application processor 1212 determines whether or not the extended packet header including the warning flash has been received, and repeatedly performs similar processes until the extended packet header including the warning flash has been received.

In a case where it is determined in step S1611 that the extended packet header including the warning flash has been received, the process proceeds to step S1612.

In step S1612, the application processor 1212 starts a process at the time of abnormality on the basis of the warning flash.

In step S1613, the application processor 1212 determines whether or not the extended packet header of the embedded data or the like including the warning details has been received, and repeatedly performs similar processes until it is determined that the extended packet header has been received.

Then, in a case where it is determined in step S1613 that the extended packet header of the embedded data or the like including the warning details has been received, the process proceeds to step S1614.

In step S1614, the application processor 1212 reflects information regarding the warning details in the process at the time of abnormality.

Through the above process, in a case where an abnormality is detected according to abnormality diagnosis, warning flash (for example, Physical attack detection) with high immediacy can be quickly transmitted to the application processor 1212, and the process at the time of abnormality can be quickly started.

Modification Example of Transmission Process
when Singular Message is Separated and
Transmitted In the above description, an example has been described in which warning flash is transmitted as the first singular message. However, after the warning flash is transmitted, a read command for warning details may be transmitted, and the warning details may be transmitted as a read response from the image sensor 1211.

Next, with reference to a flowchart of FIG. 158, a transmission process when a singular message is separated and transmitted in a case where a read command for warning details is transmitted after warning flash is transmitted will be described.

Note that the processes in steps S1631, S1632, S1634, and S1635 in the flowchart of FIG. 158 are similar to the processes in steps S1611 to S1613 in the flowchart of FIG. 157, and thus description thereof will be omitted.

That is, when warning flash is received and a process at the time of abnormality is started through the processes in steps S1631 and S1632, the application processor 1212 transmits a read command in step S1633.

In response to this, the image sensor 1211 transmits a read response to the application processor 1212 in response to the read command.

Then, through the processes in steps S1634 and S1635, warning details are received and reflected in the process at the time of abnormality.

Through the above process, in a case where an abnormality is detected according to abnormality diagnosis, warning flash (for example, Physical attack detection) with high immediacy can be quickly transmitted to the application processor 1212, and further, warning details can be quickly reflected in the process at the time of abnormality.

<Security Descriptor>

The extended packet header or the extended packet footer may store a security descriptor (also referred to as, for example, a service descriptor) in which any of, for example, the presence or absence of encryption of packet data (payload), the presence or absence of a hash value, a message authentication code, or a digital signature in the extended packet footer, or a hash value, a message authentication code, or an algorithm type of the digital signature in the extended packet footer is defined.

Furthermore, the image sensor 1211 may use this security descriptor to notify the application processor 1212 of a singular message related to any of the presence or absence of abnormality inside and outside the image sensor 1211, the presence or absence of disturbance or attack on the image sensor 1211, or the like.

As a message authentication code (MAC), any of Galois MAC (GMAC), cipher-based MAC (CMAC), hash-based MAC (HMAC), or the like may be used. For example, any of an AES-GMAC, an AES-CMAC, an SHA2-HMAC, an SHA3-HMAC, or the like to which the Advanced Encryption Standard (AES) or the Secure Hash Algorithm (SHA) is applied may be used.

FIG. 159 illustrates an example in which a singular message related to any of the presence or absence of abnormality inside and outside the image sensor 1211, the presence or absence of disturbance or attack on the image sensor 1211, or the like is set in the security descriptor in FIG. 153.

Example of Configuration Mounted on Propulsion Device

The image sensor 1211 and the application processor 1212 may be configured to be mounted on a desired propulsion device.

The propulsion device may be any of, for example, a vehicle, a robot, or a drone capable of performing propulsion (any of operation, running, walking, flying, or the like), or any of an autonomous vehicle, an autonomous robot, an autonomous drone, or the like capable of performing autonomous propulsion with an artificial intelligence (AI) function mounted thereon.

Propulsion of the propulsion device may be controlled by a user of the propulsion device, and the propulsion device may provide instructions or warnings to the user as needed. On the other hand, the propulsion device may be configured such that the propulsion device automatedly controls own propulsion.

FIG. 160 is a block diagram illustrating a schematic configuration example of a propulsion control system which is an example of a control system of a propulsion device on which the image sensor 1211 and the application processor 1212 described above are mounted.

A propulsion control system 1600 includes a plurality of electronic control units connected via a communication network 1601. In the example illustrated in FIG. 160, the propulsion control system 1600 includes a drive system control unit 1615, a body system control unit 1616, an external information detection unit 1617, an internal information detection unit 1619, and an integrated control unit 1611. Furthermore, as a functional configuration of the integrated control unit 1611, a microcomputer 1631, a sound/image output unit 1632, and an in-vehicle network interface (I/F) 1633 are illustrated.

The drive system control unit 1615 controls operations of devices related to the drive system of the propulsion device according to various programs.

The body system control unit 1616 controls operations of various devices mounted on the propulsion device according to various programs.

The external information detection unit 1617 detects information outside a propulsion device on which the propulsion control system 1600 is mounted. For example, an imaging unit 1618 is connected to the external information detection unit 1617. The external information detection unit 1617 causes the imaging unit 1618 to capture an image outside the propulsion device and receives the captured image. The external information detection unit 1617 may perform an object detection process or a distance measurement process of a person, a car, an obstacle, a sign, a character on a road surface, or the like on the basis of the received image. Furthermore, the external information detection unit 1617 may have a configuration corresponding to the application processor 1212.

The imaging unit 1618 has a configuration corresponding to the image sensor 1211, and is an optical sensor that receives light and outputs an electric signal corresponding to an amount of received light. The imaging unit 1618 may output the electric signal as an image or may output the electric signal as distance measurement information. Furthermore, the light received by the imaging unit 1618 may be visible light or invisible light such as infrared rays.

The internal information detection unit 1619 detects information inside the propulsion device. A detection unit 1620 that detects information inside the propulsion device may be connected to the internal information detection unit 1619. Here, the information inside the propulsion device is, for example, information such as a temperature and an ambient humidity of the propulsion device.

The microcomputer 1631 may calculate various control target values on the basis of information inside and outside the propulsion device acquired by the external information detection unit 1617 or the internal information detection unit 1619, and output a control instruction to the drive system control unit 1615. Furthermore, the microcomputer 1631 may have a configuration corresponding to the application processor 1212.

In addition, the microcomputer 1631 controls propulsion on the basis of the information around the propulsion device acquired by the external information detection unit 1617 or the internal information detection unit 1619, and can thus perform cooperative control for the purpose of automated driving or the like in which a vehicle autonomously travels without depending on an operation of a user.

As described above, since the imaging unit 1618 has a configuration corresponding to the image sensor 1211 and the external information detection unit 1617 and/or the microcomputer 1631 has a configuration corresponding to the application processor 1212, the imaging unit 1618 and the external information detection unit 1617 and/or the microcomputer 1631 mutually realize high-speed data communication.

Furthermore, the microcomputer 1631 may output a control instruction to the body system control unit 1616 on the basis of information outside the propulsion device acquired by the external information detection unit 1617.

The sound/image output unit 1632 transmits an output signal of at least one of sound or an image to an output device capable of visually or audibly notifying an occupant of the propulsion device or the outside of the propulsion device of information. In the example in FIG. 160, an audio speaker 1612, a display unit 1613, and an instrument panel 1614 are illustrated as the output device. The display unit 1613 may include, for example, at least one of an on-board display or a head-up display.

<Propulsion Control Process (Part 1)>

In a case where an abnormality message is received (for example, received once, received a plurality of number of times, and continuously received) by the propulsion control system 1600 in FIG. 160, the propulsion device may examine a propulsion status (for example, a propulsion speed of the propulsion device and the presence or absence of an obstacle around the propulsion device) of the propulsion device, and end the high-speed data transmission when the propulsion status satisfies a safety condition, or change the propulsion control (for example, decelerates the propulsion device or guides the propulsion device to a position where there are few obstacles) when the propulsion status does not satisfy the safety condition.

Here, the above-described propulsion control process performed by the propulsion control system 1600 will be described with reference to a flowchart of FIG. 161.

In step S1651, the external information detection unit 1617 and/or the microcomputer 1631 corresponding to the application processor 1212 determines whether or not (a singular message including) an abnormality message indicating that an abnormality has occurred has been received from the imaging unit 1618 corresponding to the image sensor 1211, and repeatedly performs similar processes until it is determined that an abnormality message has been received.

In this process, it may be determined whether or not the abnormality message has been received on the basis of any of whether a singular message including the abnormality message has been received once, a plurality of number of times, or continuously.

In a case where it is determined in step S1651 that the abnormality message has been received, the process proceeds to step S1652.

In step S1652, the external information detection unit 1617 and/or the microcomputer 1631 examines a propulsion status. More specifically, the external information detection unit 1617 and/or the microcomputer 1631 examines, for example, a propulsion speed of the propulsion device, the presence or absence of an obstacle around the propulsion device, or the like as the propulsion status.

In step S1653, the external information detection unit 1617 and/or the microcomputer 1631 determines whether or not the propulsion status satisfies a safety condition. That is, whether or not the propulsion status satisfies the safety condition is determined on the basis of whether or not a propulsion speed of the propulsion device is higher than a predetermined speed, whether or not an obstacle around the propulsion device is present within a predetermined distance, or the like.

In a case where it is determined in step S1653 that the propulsion status does not satisfy the safety condition, the process proceeds to step S1654.

In step S1654, the external information detection unit 1617 and/or the microcomputer 1631 changes the propulsion control such that the propulsion status satisfies the safety condition, and the process returns to step S1652.

That is, for example, the external information detection unit 1617 and/or the microcomputer 1631 controls the drive system control unit 1615 or the body system control unit 1616 until the propulsion status satisfies the safety condition, and repeatedly performs, for example, a process of changing the propulsion control such that the propulsion speed of the propulsion device is lower than a predetermined speed or changing the propulsion control such that the obstacle around the propulsion device is not present within a predetermined distance.

Then, in a case where it is determined in step 1653 that the propulsion status satisfies the safety condition, the process proceeds to step S1655.

In step S1655, the external information detection unit 1617 and/or the microcomputer 1631 corresponding to the application processor 1212 ends the high-speed data transmission with the imaging unit 1618 corresponding to the image sensor 1211.

Through the above process, the external information detection unit 1617 and/or the microcomputer 1631 corresponding to the application processor 1212 does not immediately end the high-speed data transmission even if the abnormality message is supplied from the imaging unit 1618 corresponding to the image sensor 1211, but ends the high-speed data transmission after changing the propulsion control until the propulsion status satisfies the safety condition.

As a result, even if it is ascertained that an abnormality has occurred in the imaging unit 1618 corresponding to the image sensor 1211, it is possible to prevent the propulsion control from falling into a fatal state due to the high-speed data transmission being immediately ended and thus image data required for the propulsion control not being suddenly transmitted.

<Propulsion Control Process (Part 2)>

The application processor 1212 of the propulsion control system 1600 that controls the propulsion device may include an image device (a first sensor communicating with a first information processing device or a first processor) that captures or displays image data and other data devices (a second sensor communicating with a second information processing device, a first processor, or a second processor) that acquire or display other data.

The propulsion control system 1600 may examine a status of the image device (first sensor), and preferentially use image data from the image device (data acquired by the first sensor) for the propulsion control in a case where no abnormality occurs in the image device (first sensor).

Further, in a case where an abnormality has occurred in the image device (first sensor), the propulsion control system 1600 may notify the user of the propulsion device of a small warning. Then, a status of the other data device (second sensor) may be examined, and in a case where no abnormality occurs in the other data device (second sensor), the other data (data acquired by the second sensor) of the other data device may be preferentially used for the propulsion control.

Further, in a case where an abnormality has occurred in the other data device (second sensor), the propulsion control system 1600 may notify the user of the propulsion device of a large warning, and then transfer the propulsion control to the user to end the high-speed data transmission.

Note that the image device (first sensor) and the other data device (second sensor) may have the same type of configuration or different types of configurations. That is, the image device (first sensor) and the other data device (second sensor) may be any of image sensors such as a visible light sensor, an infrared light sensor, an ultraviolet light sensor, a polarization sensor, a distance measuring sensor, a ToF sensor, and a LiDAR sensor, a millimeter wave radar sensor, an ultrasonic radar sensor, a GPS sensor, a GNSS sensor, an RF distance measuring sensor, an RF positioning sensor, or the like.

Here, the above-described propulsion control process performed by the propulsion control system 1600 will be described with reference to a flowchart of FIG. 162.

In step S1671, the external information detection unit 1617 and/or the microcomputer 1631 corresponding to the application processor 1212 examines a status of the image device (first sensor). More specifically, the external information detection unit 1617 and/or the microcomputer 1631 examines the status, for example, by acquiring a diagnosis result of abnormality diagnosis in the image device (first sensor).

In step S1672, the external information detection unit 1617 and/or the microcomputer 1631 determines whether or not an abnormality has occurred in the image device (first sensor) on the basis of the status of the image device (first sensor).

In a case where it is determined in step S1672 that no abnormality has occurred in the image device (first sensor), the process proceeds to step S1673.

In step S1673, the external information detection unit 1617 and/or the microcomputer 1631 preferentially uses the data acquired by the image device (first sensor) to control the propulsion of the propulsion device, and the process returns to step S1671, and the subsequent processes are repeatedly performed.

That is, as long as no abnormality has occurred in the image device (first sensor), the propulsion of the propulsion device is controlled by using the data acquired by the image device (first sensor).

In a case where it is determined in step S1672 that an abnormality has occurred in the image device (first sensor), the process proceeds to step S1674.

In step S1674, the external information detection unit 1617 and/or the microcomputer 1631 controls the sound/ image output unit 1632 to present information regarding a small warning indicating that an abnormality has occurred in the image device (first sensor) to the user of the propulsion device by using at least one of sound or an image by using at least any of the audio speaker 1612, the display unit 1613, or the instrument panel 1614.

In step S1675, the external information detection unit 1617 and/or the microcomputer 1631 examines a status of the other data device (second sensor). More specifically, the external information detection unit 1617 and/or the microcomputer 1631 examine the status by acquiring a diagnosis result of the abnormality diagnosis in the other data device (second sensor).

In step S1676, the external information detection unit 1617 and/or the microcomputer 1631 determines whether or not an abnormality has occurred in the other data device (second sensor) on the basis of the status of the other data device (second sensor).

In a case where it is determined in step S1676 that no abnormality has occurred in the other data device (second sensor), the process proceeds to step S1677.

In step S1677, the external information detection unit 1617 and/or the microcomputer 1631 preferentially uses the data acquired by the other data device (second sensor) to control the propulsion of the propulsion device, and the process returns to step S1671 and the subsequent processes are repeatedly performed.

That is, even if an abnormality occurs in the image device (first sensor), the propulsion of the propulsion device is controlled by using the data acquired by the other data device (second sensor) as long as an abnormality does not occur in the other data device (second sensor).

In a case where it is determined in step S1676 that an abnormality has occurred in the other data device (second sensor), the process proceeds to step S1678.

In step S1678, the external information detection unit 1617 and/or the microcomputer 1631 controls the sound/ image output unit 1632 to present information regarding a large warning indicating that an abnormality has occurred in both the image device (first sensor) and the other data device (second sensor) to the user of the propulsion device by using at least one of sound or an image by using at least any of the audio speaker 1612, the display unit 1613, or the instrument panel 1614.

In this case, since a status in which the autonomous propulsion is difficult is brought, information for prompting the user to execute the propulsion control of the propulsion device may be presented in the large warning.

In step S1679, in the external information detection unit 1617 and/or the microcomputer 1631, the propulsion control of the propulsion device transitions to control corresponding to an operation signal generated through an operation of an operation unit (not illustrated) or the like by the user. However, before the process in step S1679, the propulsion control of the propulsion device may transition to control corresponding to the operation signal generated through an operation of the operation unit (not illustrated) or the like by the user.

In step S1680, the external information detection unit 1617 and/or the microcomputer 1631 ends the high-speed data transmission with the image device (first sensor) and the other data device (second sensor) corresponding to the image sensor 1211, and enters a state of not receiving input of image data from the image device (first sensor) or data from the other data device (second sensor).

Through the above process, when an abnormality occurs in the imaging device (first sensor) corresponding to the image sensor 1211, a small warning is presented to present the occurrence of the abnormality, and the propulsion control is executed on the basis of data acquired by the other data device (second sensor).

In addition, when an abnormality occurs in the other data device (second sensor) in addition to the imaging device (first sensor), a large warning is presented to present a state in which autonomous propulsion control is disabled due to the occurrence of the abnormality, so that switching to the propulsion control by the user is performed and the high-speed data communication is ended.

As a result, even if an abnormality occurs in some sensors (image devices (first sensors)) that acquire data required for propulsion control, propulsion control based on data acquired by other sensors (other data devices (second sensors)) can be performed, so that propulsion control with higher safety can be realized.

In addition, in a case where an abnormality occurs in any of the sensors, the propulsion control is shifted to the user, and thus the propulsion control is not continued with uncertain data acquired by the sensor in which the abnormality occurs, and safe propulsion control can be realized.

<Propulsion Control Process (Part 3)>

In a case where an abnormality message is received (for example, received once, received a plurality of number of times, and continuously received) as a singular message, the propulsion control system 1600 (the external information detection unit 1617 and/or the microcomputer 1631 corresponding to the application processor 1212 thereof) controlling propulsion of the propulsion device may examine a propulsion status and end the high-speed data transmission in a state in which the high-speed data transmission can be ended.

Further, in a state in which the high-speed data transmission cannot be ended, the propulsion control system 1600 (the external information detection unit 1617 and/or the microcomputer 1631 corresponding to the application processor 1212 thereof) that controls the propulsion of the propulsion device may request the image sensor 1211 to maintain the high-speed data transmission.

As a result, the high-speed data transmission is ended not by the imaging unit 1618 (corresponding to the image sensor 1211) of the propulsion control system 1600 but by the external information detection unit 1617 and/or the microcomputer 1631 (corresponding to the application processor 1212) that controls the propulsion of the propulsion device, so that it is possible to avoid a problem caused by unilaterally ending the high-speed data transmission on the image sensor 1211 side.

In addition, the imaging unit 1618 corresponding to the image sensor 1211 may transmit an abnormality message as a singular message in a case where it is necessary to end the high-speed data transmission, and may end the high-speed data transmission in a case where the propulsion device does not request maintenance of the high-speed data transmission after the abnormality message satisfies a predetermined condition (for example, after a predetermined time elapses, after a predetermined number of abnormality messages are transmitted, and after an abnormality message having a countdown function or a countup function reaches a predetermined value).

On the other hand, in a case where maintenance of the high-speed data transmission is requested from the propulsion device ((corresponding to the application processor 1212 of) the external information detection unit 1617 and/or the microcomputer 1631), the imaging unit 1618 corresponding to the image sensor 1211 may extend an ending schedule of the high-speed data transmission. For example, a predetermined time or a predetermined number of times may be extended, or a count value indicating a countdown or a countup may be reset (for example, reset to an initial value).

Note that (the imaging unit 1618 corresponding to) the image sensor 1211 may desire to end the high-speed data transmission in order to perform any high-speed data transmission disabling process such as updating, initializing, resetting, restarting, or completely blocking some function, for example. However, if the high-speed data transmission is ended without permission of the external information detection unit 1617 and/or the microcomputer 1631 corresponding to the application processor 1212, an accident of the propulsion device may thus occur.

Through the above process, since the imaging unit 1618 corresponding to the image sensor 1211 does not end the high-speed data transmission without permission of the external information detection unit 1617 and/or the microcomputer 1631 corresponding to the application processor 1212, a problem caused by sudden ending of the high-speed data transmission from the imaging unit 1618 to the application processor 1212 is avoided.

As described above, the image device and the processor may be a part of a propulsion device provided with a propulsion unit in which propulsion is controlled either directly or indirectly as needed by using image data.

Next, the above-described propulsion control process will be described with reference to flowcharts of FIGS. 163 and 164.

Note that the flowchart of FIG. 163 illustrates a process of the external information detection unit 1617 and/or the microcomputer 1631 corresponding to the application processor 1212 in the propulsion control system 1600 that controls the propulsion device, and the flowchart of FIG. 164 illustrates a process of the imaging unit 1618 corresponding to the image sensor 1211.

In step S1691 (FIG. 163), the external information detection unit 1617 and/or the microcomputer 1631 determines whether or not (a singular message including) an abnormality message is received from the imaging unit 1618 corresponding to the image sensor 1211 has been received, and repeatedly performs similar processes until it is determined that the abnormality message has been received.

In a case where it is determined in step S1691 that the abnormality message has been received, the process proceeds to step S1692.

In step S1692, the external information detection unit 1617 and/or the microcomputer 1631 examines a propulsion status.

In step S1693, the external information detection unit 1617 and/or the microcomputer 1631 determines whether or not a state is a state in which the high-speed data transmission can be ended on the basis of the propulsion status.

In step S1693, when a state is a state in which the high-speed data transmission can be ended, the process proceeds to step S1694.

In step S1694, the external information detection unit 1617 and/or the microcomputer 1631 ends the high-speed data communication, does not receive the supply of the image data from the imaging unit 1618 corresponding to the image sensor 1211, and ends the process.

On the other hand, in step S1963, when a state is not a state in which the high-speed data transmission cannot be ended, the process proceeds to step S1695.

In step S1695, the external information detection unit 1617 and/or the microcomputer 1631 transmits information for requesting maintenance of the high-speed data transmission to the imaging unit 1618 corresponding to the image sensor 1211.

On the other hand, in step S1711, the imaging unit 1618 corresponding to the image sensor 1211 determines whether or not an abnormality has occurred and it is necessary to end the high-speed data transmission, and repeatedly performs similar processes until it is determined that it is necessary to end the high-speed data transmission.

In a case where it is determined in step S1711 that it is necessary to end the high-speed data transmission, the process proceeds to step S1712.

In step S1712, the imaging unit 1618 transmits a singular message including the abnormality message to the external information detection unit 1617 and/or the microcomputer 1631 corresponding to the application processor 1212.

In step S1713, the imaging unit 1618 determines whether or not the abnormality message satisfies a predetermined condition. The predetermined condition is, for example, whether a predetermined time has elapsed, whether a predetermined number of abnormality messages have been transmitted, or whether an abnormality message having a countdown function or a countup function has reached a predetermined value.

In a case where it is determined in step S1713 that the abnormality message satisfies the predetermined condition, the process proceeds to step S1714.

In step S1714, the imaging unit 1618 determines whether or not there is a request for maintaining the high-speed data transmission from the external information detection unit 1617 and/or the microcomputer 1631 corresponding to the application processor 1212.

In a case where it is determined in step S1714 that there is a request for maintaining the high-speed data transmission, the process proceeds to step S1715.

In step S1715, the imaging unit 1618 extends an ending schedule of the high-speed data transmission, and the process returns to step S1711.

On the other hand, in a case where it is determined in step S1714 that there is no request for maintaining high-speed data transmission, the process proceeds to step S1716.

In step S1716, the imaging unit 1618 ends the high-speed data transmission, and enters a state of not transmitting the image data to the external information detection unit 1617 and/or the microcomputer 1631 corresponding to the application processor 1212.

Through the above process, the high-speed data transmission is ended not by the imaging unit 1618 (corresponding to the image sensor 1211) but by the external information detection unit 1617 and/or the microcomputer 1631 (corresponding to the application processor 1212) of the propulsion control system 1600 that controls the propulsion of the propulsion device, so that it is possible to avoid a problem caused by unilaterally ending the high-speed data transmission on the image sensor 1211 side.

Note that the description has been made by using an example in which there is a possibility that an abnormality (negative status) occurs in the imaging unit 1618 corresponding to the image sensor 1211, or it is warned that the abnormality has occurred, but the present technology is not limited thereto.

For example, a possibility that a positive status occurs in the imaging unit 1618 corresponding to the image sensor 1211 or the fact that the positive status has occurred may be transmitted. Furthermore, a possibility that a change in a status that is not negative or positive may occur in the imaging unit 1618 corresponding to the image sensor 1211 or the fact that the change has occurred may be transmitted.

Therefore, the abnormality message described above may be a message different from that during the normal time or the usual time, such as an improvement message or a change message. As described above, a normality message or a typical message may be transmitted as a singular message during the normal time or the usual time. In addition, only in a case of a message different from that during the normal time or the usual time, a singular message may be transmitted. In addition, although the description has been made by using an example in which a singular message is used in the propulsion control system 1600 in the propulsion device, the present technology is not limited thereto, and the singular message may be used in any mobile device such as a smartphone or a digital camera. Furthermore, the description has been made by using the example in which a singular message is transmitted while maintaining an image data stream, but the present technology is not limited thereto, and for example, the singular message may be configured to be transmitted after transmission of image data is stopped.

A timing or a position of an element configuring any drawing such as a block diagram or a flowchart is an example, and may be configured to be different. The embodiment described in each example described above has various modification examples. That is, some of the constituents of each example described above may be omitted, some or all of the constituents may be altered, or some or all of the constituents may be changed.

In addition, some of the constituents may be replaced with other constituents, or some or all of the constituents may be added with other constituents. Furthermore, some or all of the constituents may be divided into a plurality of constituents, some or all of the constituents may be separated into a plurality of constituents, or at least some of the plurality of divided or separated constituents may have different functions or characteristics.

Furthermore, at least a part of each constituent may be moved to form a different embodiment. Furthermore, a coupling element or a relay element may be added to at least some of combinations of the respective constituents to form different embodiments.

In addition, a switching function may be added to at least some of the combinations of the constituents to form different embodiments. The present embodiment is not limited to the configurations described in the above-described examples, and various changes can be made without departing from the concept of the present technology. Note that the effects described in the present specification are merely examples and are not limited, and other effects may be achieved.

In the present specification, processes performed by a computer according to a program are not necessarily performed in time series in the order described as the flowchart. That is, the processes performed by the computer according to the program also include processes executed in parallel or individually (for example, parallel processes or processes using an object).

Furthermore, the program may be processed by one computer (processor) or may be processed in a distributed manner by a plurality of computers. Furthermore, the program may be transferred to a remote computer and executed. Furthermore, in the present specification, a system means a set of a plurality of constituents (devices, modules (components), or the like), and it does not matter whether or not all the constituents are in the same casing.

Therefore, a plurality of devices stored in separate casings and connected via a network and one device in which a plurality of modules is stored in one casing are all systems.

In addition, for example, a configuration described as one device (or a processing unit) may be divided and configured as a plurality of devices (or processing units). Conversely, the configurations described above as a plurality of devices (or processing units) may be collectively configured as one device (or a processing unit).

Further, a configuration other than the above-described configuration may be added to the configuration of each device (or each processing unit). Furthermore, as long as the configuration and the operation of the entire system are substantially the same, a part of the configuration of a certain device (or a processing unit) may be included in the configuration of another device (or another processing unit).

Moreover, for example, the present technology can employ a configuration of cloud computing in which one function is shared and processed in cooperation by a plurality of devices via a network. Furthermore, for example, the above-described program can be executed in any device.

In that case, it is sufficient that the device has a necessary function (a functional block or the like) and can obtain necessary information. In addition, for example, each step described in the above-described flowchart may be performed by one device or may be shared and performed by a plurality of devices.

Further, in a case where a plurality of processes is included in one step, the plurality of processes included in the one step may be performed by one device or may be shared and performed by a plurality of devices. In other words, a plurality of processes included in one step may also be executed as processes of a plurality of steps. Conversely, the process described as a plurality of steps may be collectively executed as one step.

Note that, in the program executed by the computer, processes in steps describing the program may be executed in a time series in the order described in the present specification, or may be executed in parallel or individually at necessary timings such as when a call is made. That is, as long as there is no contradiction, the process in each step may be executed in an order different from the above-described order.

Furthermore, the processes in the steps describing this program may be executed in parallel with the processing of another program, or may be executed in combination with the processing of another program.

In addition, a plurality of the present technologies described in the present specification may be implemented independently as a single body as long as there is no contradiction. Of course, a plurality of any present technologies may be implemented in combination. For example, some or all of the present technologies described in a certain embodiment may be implemented in combination with some or all of the present technologies described in another embodiment. Further, some or all of any present technologies described above may be implemented in combination with other technologies not described above.

<Method of Stopping Data Stream>

(Heartbeat Function)

In a case where a HEARTBEAT function is supported by both a requestor and a responder, the HEARTBEAT function can be used to determine whether or not to continue a session.

Here, the requestor and the responder are constituents respectively corresponding to the application processor 1212 and the image sensor 1211, and may have one or more communication channels according to the session.

Hereinafter, an example in which a session is formed will be described by using a configuration example in which the external information detection unit 1617 and/or the microcomputer 1631 corresponding to the application processor 1212 is a requester and the imaging unit 1618 corresponding to the image sensor 1211 is a responder in the propulsion control system 1600 that controls propulsion of a propulsion device. Of course, the external information detection unit 1617 and/or the microcomputer 1631 may be a responder, and the imaging unit 1618 may be a requester.

While in a session, the requester or the responder transmits a HEARTBEAT request message within a HEART-BEAT period (HeartbeatPeriod). HeartbeatPeriod is stored and designated by the responder in Param1 in a PSK_EX-CHANGE_RSP response message or in a Successful KEY_EXCHANGE_RSP response message, for example.

A HEARTBEAT request message transmission side ends the session in a case where no HEARTBEAT_ACK response message or ERROR response message from the HEART-BEAT request message reception side is received within "predetermined value (for example, 2)×HEARTBEAT period (=first time)".

The HEARTBEAT request message transmission side may retry transmitting the HEARTBEAT request message, and waits for a response from the HEARTBEAT request message reception side for a predetermined time before retrying.

The HEARTBEAT request message reception side ends the session in a case where no HEARTBEAT request message is received in the "predetermined value (for example, 2)×HEARTBEAT period".

In such a case, there is a possibility that a data stream is stopped due to an operation of the imaging unit 1618 because of an attack or a malfunction on the imaging unit 1618 corresponding to the image sensor 1211.

For example, in a case where the imaging unit 1618 corresponding to the image sensor 1211 is mounted on a propulsion device such as a vehicle, a drone, or a robot, and a data stream from the imaging unit 1618 is used in the external information detection unit 1617 and/or the microcomputer 1631 of the propulsion control system 1600 that controls propulsion of the propulsion device, if the data stream is suddenly stopped, the propulsion control is influenced, and in the worst case, a fatal accident may be caused.

Therefore, in such a case where the data stream is stopped, the HEARTBEAT function is disabled (HBEAT_CAP=0), and the data stream is not stopped by a responder (the imaging unit 1618 corresponding to the image sensor 1211) without permission of a requester (the external information detection unit 1617 and/or the microcomputer 1631 corresponding to the application processor 1212).

By preventing the data stream from being stopped without permission of the requester (the external information detection unit 1617 and/or the microcomputer 1631 corresponding to the application processor 1212), it is possible to avoid the stop of the data stream caused by an operation of the responder (the imaging unit 1618 corresponding to the image sensor 1211).

Furthermore, the requester (the external information detection unit 1617 and/or the microcomputer 1631 corresponding to the application processor 1212) may determine whether or not it is necessary to continue the session on the basis of a count value (for example, a value of the message counter) transmitted from the responder (the imaging unit 1618 corresponding to the image sensor 1211).

Further, in such a case where the data stream is suddenly stopped, the HEARTBEAT function is enabled (HBEAT-_CAP=1), so that the session ending regarding the HEART-BEAT period is not a mandatory requirement (for example, expressed as "shall" or "must") but may be a non-mandatory requirement (arbitrary requirement expressed by, for example, "should" or "may"). Specifically, the session ending related to the HEARTBEAT period may be a mandatory requirement for the HEARTBEAT request message transmission side, and a non-mandatory requirement for the HEARTBEAT request message reception side. In addition, the session ending related to the HEARTBEAT period may be a non-mandatory requirement for the HEARTBEAT request message transmission side, and may be a mandatory requirement for the HEARTBEAT request message reception side. In addition, the session ending related to the HEARTBEAT period may be a non-mandatory requirement for the HEARTBEAT request message transmission side, and may be a non-mandatory requirement for the HEART-BEAT request message reception side. Note that, in the publicly available SPDM standard, the session ending related to the HEARTBEAT period may be defined not as a mandatory requirement but as a non-mandatory require-ment, in the security standard that refers to a part or the whole of the SPDM standard, the session ending related to the HEARTBEAT period may be defined not as a mandatory requirement but as a non-mandatory requirement, or in the security standard that does not refer to the SPDM standard, the session ending related to the HEARTBEAT period may be defined as a mandatory requirement but as a non-mandatory requirement.

Furthermore, the responder (the imaging unit 1618 corresponding to the image sensor 1211) may include a detection circuit or a prediction circuit for an attack, a malfunction, or the like on the responder, and may detect or predict that there is a possibility that a singular status occurs in the responder or image data (including that the singular status has already occurred).

For example, when the responder (the imaging unit 1618 corresponding to the image sensor 1211) transmits a HEARTBEAT_NAK response message to the requester (the external information detection unit 1617 and/or the microcomputer 1631 corresponding to the application processor 1212) that is a communication host, the requester (the external information detection unit 1617 and/or the microcomputer 1631) can be notified of the occurrence of a defect of the responder (the imaging unit 1618), and thus, can determine whether or not it is necessary to stop an own data stream (for example, reserved regions of 0x00, 0x05 to 0x5F, 0x62, and 0x6D to 0x7D can be newly allocated as Values).

When it is determined to stop the data stream, the requester (the external information detection unit 1617 and/or the microcomputer 1631) transmits an END_SESSION request to the responder (the imaging unit 1618), and stops the high-speed data communication for transmitting the data stream. However, the transmission of the END_SESSION request may be performed after a predetermined time has elapsed since the determination to stop the data stream (for example, a HEARTBEAT_NAK response message has been received, an ERROR response message has been received, or the first time period has elapsed), or may be suspended until a propulsion status satisfies the safety condition.

As a result, the requester (the external information detection unit 1617 and/or the microcomputer 1631) can stop the data stream, for example, after a safe status is reached even if the data stream is stopped, and thus it is possible to suppress the occurrence of a fatal accident caused by the influence on the propulsion control.

FIG. 165 illustrates a configuration example of Responder flag fields definitions for setting enabling (HBEAT_CAP=1) or disabling (HBEAT_CAP=0) of the HEARTBEAT function. Although this is a configuration example of a responder, similarly, a requestor may correspond to HBEAT_ CAP which corresponds to Requester flag fields definitions and in which Value in Responder flag fields definitions is replaced from Responder to Requester. FIG. 166 illustrates a configuration example of a HEARTBEAT request message. FIG. 167 illustrates a configuration example of a HEARTBEAT_ACK response message. FIG. 168 illustrates a configuration example of a HEARTBEAT-_NAK response message. FIG. 169 illustrates a configuration example of an END_SESSION request message. Note that a configuration example in which a Value of SPDM-Version is V1.1 or TBD is illustrated, but other Values (for example, V1.2 (=0x12), V1.3 (=0x13), or V2.0 (=0x20)) may be used. In addition, in a case where there is a change from SPDM Version 1.1.0 which is publicly available, for example, in a case where the session ending related to the HEARTBEAT period is not a mandatory requirement but is a non-mandatory requirement, SPDMVersion may be set as another Value. That is, at least any description of Offset, Bytes, or Value of SPDMVersion may conform to the latest specification of the SPDM standard that is publicly available. Similarly, at least any description of Offset, Field, Bytes (Size in bytes), Value, Size, Bit, Description, Name, Error code, Error data, ExtendedError-Data, ID, Vendor ID length, Registry or standards body name, bit assign, Remarks, eDT, eVC, Addr, Initial Value, Setting Data, Attribute, Detail, Embedded Data Format Code, Security MAC, Security protocol, or the like used in the chart or description related to the present application may conform to the SPDM standard, the standard in DMTF, the standard in MIPI, or the latest specification of another standard.

The HEARTBEAT_NAK response message is a singular message of an abnormality message. Furthermore, in the HEARTBEAT_NAK response message, a notification of a singular status may be provided by defining a new region such as Param1 or Param2 and allocating corresponding bits. That is, any other singular message described above may be stored in the HEARTBEAT_NAK response message.

<HEARTBEAT Processing (Part 1)>

Next, the HEARTBEAT processing (part 1) will be described with reference to the timing chart of FIG. 170.

Here, the left part of FIG. 170 illustrates operation timings of the external information detection unit 1617 and/or the microcomputer 1631 corresponding to the application processor 1212 which is a CCI host (requester).

Furthermore, the right part of FIG. 170 illustrates operation timings of the imaging unit 1618 corresponding to the image sensor 1211 which is a CCI device (responder).

That is, the CCI host (requester) transmits a PSK_FINISH request message to the CCI device (responder) through the processes in steps S1731 and S1751 (similar to a part of step S507 or S525).

Through the processes in steps S1752 and S1732, the CCI device (responder) transmits a PSK_FINISH_RSP response message to the CCI host (requestor) (similar to a part of steps S507 or S525).

This process enables the HEARTBEAT function.

Through the processes in steps S1733 and S1753, the CCI host (requester) transmits a HEARTBEAT request message to the CCI device (responder).

In response to this, the CCI device (responder) transmits a HEARTBEAT_ACK response message to the CCI host (requester) through the processes in steps S1754 and S1734.

Thereafter, the CCI host (requester) transmits a HEART-BEAT request message to the CCI device (responder) every HEARTBEAT period (HeartbeatPeriod), and in response to this, a process in which the CCI device (responder) transmits the HEARTBEAT_ACK response message to the CCI host (requester) is repeatedly performed.

That is, as illustrated in steps S1733 to S1736 and S1753 to S1756, as long as this process is continuously repeatedly performed, it is recognized that a communication state is normally established.

Here, it is assumed that when an abnormality is detected in the CCI device (responder), for example, a communication state cannot be established. Then, the CCI device (responder) transmits the HEARTBEAT_NAK response message to the CCI host (requester) as in the processes in steps S1758 and S1738 in response to the HEARTBEAT request message transmitted to the CCI host (requester) through the processes in steps S1737 and S1757. However, in a state in which the communication state can be established, the HEARTBEAT_NAK response message may be transmitted to the CCI host (requester) as an abnormality message.

When the CCI host (requester) receives the HEART-BEAT_NAK response message through the process in step S1738, an END_SESSION request message declaring ending of the session (and high-speed data communication) is transmitted to the CCI device (responder) through the process in step S1739, and a session key is discarded or cleaned up. However, the CCI host (requester) may discard or clean up the session key in the following case, for example, after a predetermined time has elapsed since transmitting the END_SESSION request message, or after receiving an END_SESSION ACK response message, an END_SESSION_NAK response message, or an ERROR response message described below from the CCI device (responder).

In response to this, when the CCI device (responder) receives the END_SESSION request message in step S1759, the CCI device (responder) transmits an END_SESSION ACK response message to the CCI host (requester) in step S1760, discards or cleans up the session key, and ends the session (and the high-speed data communication).

This process disables the HEARTBEAT function.

Through the series of processes as described above, even if an abnormality occurs in the CCI device, the HEARTBEAT_NAK response message is supplied to the CCI host, and after the series of processes is performed, the session (and the high-speed data communication) is ended and the data stream is stopped. Therefore, the CCI device is prevented from stopping the data stream without permission of the CCI host.

Note that, in a case where the CCI device (responder) cannot receive the HEARTBEAT request message for each HEARTBEAT period (HeartbeatPeriod) for some reason, the CCI host (requester) transmits the END_SESSION request message to the CCI device (responder), and ends the session (and the high-speed data communication).

That is, also in this case, the ending of the session (and the high-speed data communication) is performed by transmitting the END_SESSION request message according to determination of the CCI host (requester), so that the CCI device is prevented from stopping the data stream without permission of the CCI host.

<HEARTBEAT Processing (Part 2)>

Even in a case where the CCI device (responder) detects an abnormality or in a case where a HEARTBEAT request message is not received within a predetermined time (=first time), an END_SESSION request message from the CCI host (requester) may not be received in the CCI device (responder) within a predetermined time (=second time). Here, the first time is a time corresponding to "predetermined value (for example, 2)×HEARTBEAT period (HeartbeatPeriod)", and the second time is a further elapsed time from when the time corresponding to "predetermined value (for example, 2)×HEARTBEAT period (HeartbeatPeriod)" elapses until the END_SESSION request message is transmitted.

Therefore, in a case where the END_SESSION request message is not received by the CCI device (responder) within a predetermined time (=second time), an END_SESSION_NAK response message indicating that the END_SESSION request message is not received by the CCI device (responder) within the predetermined time (=second time) may be defined, and the CCI device (responder) may notify the CCI host (requester) of the END_SESSION request message.

FIG. 171 illustrates a configuration example of an END_SESSION_NAK response message indicating that an END_SESSION request message is not received by the CCI device (responder) within a predetermined time (=second time).

Furthermore, in the END_SESSION_NAK response message, for example, a notification of a singular status may be provided by defining a new region such as Param1 or Param2 in FIG. 171 and allocating a corresponding bit. That is, any of the above-described singular messages, abnormality messages, or additional information may be stored.

Next, the HEARTBEAT processing (part 2) will be described with reference to flowcharts of FIGS. 172 and 173.

Note that the flowchart of FIG. 172 illustrates a process of a CCI host (requester), and the flowchart of FIG. 173 illustrates a process of a CCI device (responder).

In step S1771 (FIG. 172), the CCI host (requestor) transmits a PSK_FINISH request message to the CCI device (responder).

In response to this, in step S1791 (FIG. 173), the CCI device (responder) determines whether or not to transmit a PSK_FINISH_RSP response message to the CCI host (requestor) on the basis of whether or not the PSK_FINISH request message has been transmitted, and repeatedly performs similar processes until it is determined to transmit the PSK_FINISH_RSP response message.

Then, in a case where it is determined in step S1791 to transmit the PSK_FINISH_RSP response message, the CCI device (responder) transmits the PSK_FINISH_RSP response message to the CCI host (requester) in step S1792.

Here, in step S1772, the CCI host (requester) determines whether or not the PSK_FINISH_RSP response message has been received from the CCI device (responder), and repeatedly performs similar processes until it is determined that the PSK_FINISH_RSP response message has been received.

In a case where it is determined in step S1772 that the PSK_FINISH_RSP response message has been received, the process proceeds to step S1773.

In step S1773, the CCI host (requester) transmits a HEARTBEAT request message to the CCI device (responder).

In response to this, in step S1793 (FIG. 173), the CCI device (responder) determines whether or not the HEARTBEAT request message has been received.

In a case where it is determined in step S1793 that the HEARTBEAT request message has been received, the process proceeds to step S1794.

In step S1794, the CCI device (responder) transmits a HEARTBEAT_ACK response message to the CCI host (requester), and the process returns to step S1793.

Here, in step S1774 (FIG. 172), the CCI host (requester) determines whether or not the HEARTBEAT_ACK response message has been received.

In a case where it is determined in step S1774 that the HEARTBEAT_ACK response message has been received, the process returns to step S1773.

As long as the process in which the CCI host (requestor) transmits the HEARTBEAT request to the CCI device (responder) and the CCI device (responder) returns the HEARTBEAT_ACK response message to the CCI host (requestor) in response to this is repeatedly performed, the processes in steps S1773 and S1774 (FIG. 172) and steps S1793 and S1794 (FIG. 173) are repeatedly performed.

That is, as long as a state in which communication between the CCI host (requester) and the CCI device (responder) is established is maintained, the process in which the CCI host (requester) transmits the HEARTBEAT request message to the CCI device (responder) in the HEARTBEAT period (HeartbeatPeriod) and the CCI device (responder) returns the HEARTBEAT_ACK response message to the CCI host (requester) in response to this is repeatedly performed.

On the other hand, in a case where it is determined in step S1793 (FIG. 173) that the HEARTBEAT request message has not been received, the process proceeds to step S1795.

In step S1795, the CCI device (responder) determines whether or not an abnormality has been detected through abnormality diagnosis.

In a case where it is determined in step S1795 that an abnormality has been detected, the process proceeds to step S1796.

In step S1796, the CCI device (responder) transmits a HEARTBEAT_NAK response message to the CCI host (requestor).

On the other hand, in a case where it is determined in step S1774 (FIG. 172) that the HEARTBEAT_ACK response message has not been received, the process proceeds to step S1775.

In step S1775, the CCI device (responder) determines whether or not the HEARTBEAT_NAK response message has been received.

In a case where it is determined in step S1775 that the HEARTBEAT_NAK response message has been received, the process proceeds to step S1777.

In step S1777, the CCI host (requester) transmits an END_SESSION request message to the CCI device (responder).

In step S1778, the CCI host (requester) discards or cleans up a session key, and ends the session (and the high-speed data communication).

On the other hand, in step S1798 (FIG. 173), the CCI device (responder) determines whether or not the END_SESSION request message has been received after the first time has elapsed and before the second time has further elapsed.

In a case where it is determined in step S1798 that the END_SESSION request message has been received, the process proceeds to step S1799.

In step S1799, the CCI device (responder) transmits an END_SESSION ACK response message to the CCI host (requester).

In step S1800, the CCI device (responder) discards or cleans up the session key to end the session (and the high-speed data communication).

That is, when an abnormality is detected in the CCI device (responder), the HEARTBEAT_NAK response message is transmitted to the CCI host (requestor), the END_SESSION request message is transmitted to the CCI device (responder), and the ENDSESSION_ACK response message is transmitted to the CCI host (requestor) in response to this, so that in both the CCI host (requestor) and the CCI device (responder), the session key is discarded or cleaned up, and the session (and the high-speed data communication) is ended.

In addition, in a case where no abnormality is detected in step S1795 (FIG. 173), the process proceeds to step S1797.

In step S1797, the CCI device (responder) determines whether or not the first time has elapsed since receiving the immediately preceding HEARTBEAT request message.

In a case where it is determined in step S1797 that the first time has not elapsed since receiving the immediately preceding HEARTBEAT request message, the process returns to step S1793.

On the other hand, in a case where the HEARTBEAT_NAK response message is not received in step S1775, the process proceeds to step S1776.

In step S1776, the CCI device (responder) determines whether or not the first time has elapsed since transmitting the immediately preceding HEARTBEAT request.

In a case where it is determined in step S1776 that the first time corresponding to "predetermined value (for example, 2)×HEARTBEAT period (HeartbeatPeriod)" has not elapsed since transmitting the immediately preceding HEARTBEAT request message, the process returns to step S1774.

That is, in a case where no abnormality is detected in a state in which the CCI device (responder) cannot receive the HEARTBEAT request message, the processes in steps S1774 to S1776 (FIG. 172) and the processes in steps S1793, S1795, and S1797 (FIG. 173) are repeatedly performed until the first time elapses.

Then, in step S1776 (FIG. 172), when the first time has elapsed, the process proceeds to steps S1777 and S1778, and the CCI host (requester) transmits an END_SESSION request message, discards or cleans up the session key, and ends the session (and the high-speed data communication).

In addition, in the CCI device (responder), in step S1797 (FIG. 173), when the first time has elapsed, the process proceeds to step S1798.

In this case, the processes in steps S1798 to S1800 are performed.

Therefore, even in a state in which no abnormality is detected in the CCI device (responder), when a state in which the HEARTBEAT request message cannot be received during the first time or more continues in the CCI device (responder), the session (and the high-speed data communication) is ended on the basis of the END_SES-SION request message from the CCI host (requester).

Further, in a case where it is determined in step S1798 that the END_SESSION request message is not received after the first time elapses and before the second time elapses since receiving the previous HEARTBEAT request message, the process proceeds to step S1801.

In step S1801, the CCI device (responder) transmits an END_SESSION_NAK response message to the CCI host (requester).

As a result, in a case where a state in which the END-_SESSION request message cannot be received in the CCI device (responder) for some reason continues during the second time or more after the first time elapses since receiving the previous HEARTBEAT request message, the END_SESSION_NAK response message is transmitted to the CCI host (requester), and the session (and the high-speed data communication) is ended.

In this case, the CCI device (responder) ends the high-speed data communication according to own determination, but since the END_SESSION_NAK response message is transmitted to the CCI host (requester), the CCI host (requester) can recognize that the high-speed data communication is ended in the CCI device (responder).

In addition, in this process, in a case where an abnormality is detected, the CCI device (responder) immediately notifies the CCI host (requester) of the abnormality before waiting for a predetermined time (=first time). Further, the HEART-BEAT_NAK response message may be replaced with the singular message, the abnormality message, or the additional information described above. Note that a process similar to step S1796 (transmit the HEARTBEAT_NAK response) may be added between the process in step S1797 (has the first time elapsed?) and the process in step S1798 (has the END_SESSION request been received within the second time?). That is, in a case where the first time has elapsed, the HEARTBEAT_NAK response may be transmitted. Further, a part (for example, Param1 or Param2) or the whole of the message may be different between the HEARTBEAT_NAK response in a case where an abnormality has been detected and the HEARTBEAT_NAK response in a case where the first time has elapsed.

<HEARTBEAT Processing (Part 3)>

At least one of the HEARTBEAT_NAK response or the END_SESSION_NAK response message may be omitted.

Here, the HEARTBEAT processing (part 3) in which both the HEARTBEAT_NAK response message and the END_SESSION_NAK response message are omitted will be described with reference to flowcharts of FIGS. 174 and 175.

Note that the flowchart of FIG. 174 illustrates a process of a CCI host (requester), and the flowchart of FIG. 175 illustrates a process of a CCI device (responder).

Here, the processes in steps S1811 to S1817 in FIG. 174 correspond to the processes in steps S1771 to S1774 and steps S1776 to S1778 in FIG. 172, and thus description thereof will be omitted. Furthermore, the processes in steps S1831 to S1838 in FIG. 175 correspond to the processes in steps S1791 to S1794 and steps S1797 to S1800 in FIG. 173, and thus description thereof will be omitted.

That is, in the process of the CCI host (requester) in FIG. 174, regardless of the presence or absence of an abnormality based on an abnormality diagnosis result, in a case where the first time has elapsed after the previous HEARTBEAT request message is received, it is considered that communication with the CCI device (responder) cannot be performed, the END_SESSION request message is transmitted, and the session (and the high-speed data communication) is ended.

Furthermore, in the process of the CCI device (responder) in FIG. 175, in a case where the next HEARTBEAT_ACK response message cannot be received until the first time elapses after the previous HEARTBEAT_ACK response message is received, it is considered that communication with the CCI host (requester) cannot be performed, and further, in a case where the END_SESSION request message is transmitted before the second time elapses, the END_SESSION ACK response message is transmitted, and the session (and the high-speed data communication) is ended.

On the other hand, moreover, when the END_SESSION request message is not transmitted until the second time elapses, the session (and the high-speed data communication) is ended as it is.

Also in the above process, in a case where the CCI device (responder) cannot receive the HEARTBEAT request message for each HEARTBEAT period (HeartbeatPeriod) for some reason, the session (and the high-speed data communication) can be ended.

In addition, also in this process, the ending of the session (and the high-speed data communication) is basically performed by transmitting the END_SESSION request message according to determination of the CCI host (requester), and thus it is also possible to prevent the CCI device from stopping a data stream without permission of the CCI host. However, in this process, in a case where the END_SESSION request message cannot be received during the second time or more, the session including high-speed data communication is ended according to determination of the CCI device (responder).

Application Example 1 of HEARTBEAT Processing

The CCI device (responder) may transmit an ERROR response message to the CCI host (requester) in a case where an abnormality such as an error or a defect occurs.

That is, the CCI device (responder) may transmit, to the CCI host (requester), an ERROR response message corresponding to an error or a defect related to the HEARTBEAT function instead of at least one of the HEARTBEAT_NAK response message or the END_SESSION_NAK response message.

The ERROR response message has a configuration illustrated in FIG. 176, for example. As illustrated in FIG. 176, in the ERROR response message, for example, a notification of a singular status may be provided by defining regions of Param1 (Error code), Param2 (Error data), and Extended-ErrorData, and allocating corresponding bits.

That is, at least any of the singular message, the abnormality message, or the additional information described above may be stored. In addition, an existing Error code (for example, Unspecified, InvalidSession (Value: 0x02, Description: The record layer used an invalid session ID., Error data: This shall be the invalid session ID., and ExtendedErrorData: No extended error data is provided)) may be used as an ERROR response message corresponding to an error or a defect related to the HEARTBEAT function, END_SESSION request message or the like.

FIG. 177 illustrates setting examples of Error code and Error data. However, the Reserved region or the Vendor/Other Standards Defined region may be defined as a new error region corresponding to an error or a defect related to the HEARTBEAT function, the END_SESSION request message, or the like. In addition, a setting in the Error code and error data table in the SPDM specification defined by the publicly available SPDM standard may be used. Furthermore, FIG. 178 illustrates a setting example of Extended-ErrorData.

Application Example 2 of HEARTBEAT Processing

The HEARTBEAT function may be realized in a pseudo manner by pseudo-defining a HEARTBEAT request message in a VENDOR_DEFINED_REQUEST request message and pseudo-defining a HEARTBEAT_ACK response (and a HEARTBEAT_NAK response) message in a VENDOR_DEFINED_RESPONSE response message instead of the HEARTBEAT request and the HEARTBEAT_ACK response.

Hereinafter, the pseudo HEARTBEAT function realized by the VENDOR_DEFINED_REQUEST request message and the VENDOR_DEFINED_RESPONSE response message will be simply referred to as a pseudo HEARTBEAT function.

That is, in a case where the pseudo HEARTBEAT function is used, the HEARTBEAT function can be disabled (HBEAT_CAP=0).

Note that FIG. 179 illustrates a setting example of Registry or standards body ID in a case where the pseudo HEARTBEAT function is realized. However, a setting in the Registry or standards body ID table in the SPDM specification defined by the publicly available SPDM standard may be used. That is, the present technology may be applied to a standard defined by at least any of standards bodies such as Distributed Management Task Force (DMTF), Trusted Computing Group (TCG), Universal Serial Bus (USB), Peripheral Component Interconnect Special Interest Group (PCI-SIG), Internet Assigned Numbers Authority (IRNA), HDBaseT, Mobile Industry Processor Interface (MIPI), Compute Express Link (CXL), and Joint Electron Device Engineering Council (JEDEC), or may be applied to a HEARTBEAT equivalent function or an END_SESSION equivalent function in a standard defined by at least any of these standards bodies or other standards bodies. In addition, FIGS. 180 and 181 illustrate setting examples of the VENDOR_DEFINED_REQUEST request message and the VENDOR_DEFINED_RESPONSE response message in a case where the pseudo HEARTBEAT function is realized. However, the pseudo HEARTBEAT function may be defined by other messages conforming to the SPDM standard, messages conforming to the CCI standard, messages conforming to other standards, or the like. Similarly, an END_SESSION function may be realized in a pseudo manner by pseudo-defining the END_SESSION request message in the VENDOR_DEFINED_REQUEST request message and pseudo-defining the END_SESSION ACK response (and the END_SESSION_NAK response) message in the VENDOR_DEFINED_RESPONSE response message instead of the END_SESSION request and the END_SESSION ACK response. Hereinafter, the pseudo END_SESSION function realized by the VENDOR_DEFINED_REQUEST request message and the VENDOR_DEFINED_RESPONSE response message will be simply referred to as a pseudo END_SESSION function. However, the pseudo END_SESSION function may be defined by other messages conforming to the SPDM standard, messages conforming to the CCI standard, messages conforming to other standards, or the like.

<Key Update in Image System Communication>

The present technology discloses key update of a session key (an encryption key or a MAC key) suitable for application to, for example, the Camera Serial Interface (CSI) standard or the Display Serial Interface (DSI) standard of the Mobile Industry Processor Interface (MIPI) Alliance. The present technology is particularly suitable for application to the CSI-2 standard or the DSI-2 standard. Note that the CSI-2 standard or the DSI-2 standard includes control system communication (referred to as CCI communication) and image system communication (referred to as controlled system communication, CSI-2 communication, or DSI-2 communication). The control system communication includes transmission of any of a write command (CCI Write), a read command (CCI Read), a read response (CCI Read return value), or the like, and is bidirectional communication. The image system communication includes transmission of any of a frame start, embedded data, image data, user defined data, a frame end, or the like, and is unidirectional communication. Then, the present technology is suitable when a session key (an encryption key or a MAC key) derived by using control system communication is applied to image system communication. On the other hand, in order to add a security function to the control system communication and the image system communication, the Security Protocol and Data Model (SPDM) standard based on Distributed Management Task Force (DMTF) can be applied. Therefore, the present technology is suitable when the SPDM standard is applied to the control system communication that is bidirectional communication and the controlled system communication that is unidirectional communication, but does not need to conform to the SPDM standard.

<SPDM>

In the SPDM standard based on the DMTF disclosed in Non Patent Document 1, as illustrated in FIG. 182, four major secrets (S0: Request-direction handshake secret, S1: Response-direction handshake secret, S2: Request-direction data secret, and S3: Response-direction data secret) can be derived from a key schedule, and at least one export master secret can be derived. Then, a session key (an encryption key or a MAC key) can be derived from the secret (session secret).

Each secret is applied to a specific transmission direction and is valid only within a specific time frame. Each of these four major secrets is used to derive a session key (an encryption key or a MAC key) used within the AEAD function selected in the ALGORITHMS response. In addition, each of these four major secrets may also be used to derive an initialization vector (IV) used within the AEAD function.

S0 and S1 are only used during a session handshake phase, and S0 can be applied to all requests and S1 can be applied to all responses from KEY_EXCHANGE or PSK_EXCHANGE to FINISH or PSK_FINISH. Further, S0 and S1 are used to derive Finished key used to compute a RequesterVerifyData region in the SPDM message and a ResponderVerifyData region in the SPDM message, respectively.

S2 and S3 can be used for all pieces of data transmitted during an application phase of a session, S2 only applies to all pieces of data moved from a requestor to a responder, and S3 only applies to all pieces of data moved from the responder to the requestor.

In a case where these four major packets are updated, 12.8 major secrets update disclosed in Non Patent Document 1 may be applied.

After SPDM-key exchange is successful, additional session keys (encryption keys or MAC keys) may be derived from the export master secret. In a case of updating the export master secret, a definition obtained by correcting or slightly correcting the 12.8 Major secrets update disclosed in Non Patent Document 1 may be applied, or a new definition may be applied.

<Update of Export Master Secret>

For example, as illustrated in FIG. 183, an export master secret may be updated, and a new session key (an encryption key or a MAC key) may be derived and applied to image system communication.

According to the SPDM standard based on the DMTF disclosed in Non Patent Document 1, it is not possible to update the export master secret. Therefore, as illustrated in FIG. 183, Operation (for example, UpdateExportMaster) for updating the export master secret is added as KEY_UPDATE operations. Although Value and Description are examples, a different Value may be further defined, and an Operation (for example, Export Master Secret 1, Export Master Secret 2, . . . ) for updating another export master secret may be added if there is another export master secret.

<Key Use Start Timing is Undetermined and Key Verification Function is not Supported>

In a case where the SPDM standard based on the DMTF disclosed in Non Patent Document 1 is applied to image system communication so that the export master secret can be updated as described above, regarding a request direction data secret and a response direction data secret, use start timings of a new secret and session key (an encryption key or a MAC key) are determined according to the KEY_UPDATE request message and the KEY_UPDATE ACK response message. In contrast, regarding the export master secret, there is a possibility that use start timings of a new secret and a session key (an encryption key or a MAC key) are not fixed.

In addition, for the request direction data secret and the response direction data secret, whether a new session key (an encryption key or a MAC key) has been correctly derived can be verified on the basis of Operation of VerifyNewKey, but for the export master secret, there is a possibility that whether the new session key (an encryption key or a MAC key) has been correctly derived cannot be verified on the basis of Operation of VerifyNewKey.

Therefore, a use start timing of the new session key is designated. In addition, the new session key is verified.

<Designation of Use Start Timing of New Session Key>

FIG. 184 is a flowchart illustrating an example of communication processing using a session key between the image sensor 1211 and the application processor 1212 illustrated in FIG. 75A. The image sensor 1211 has a configuration as illustrated in FIG. 76. The application processor 1212 has a configuration as illustrated in FIG. 77.

In the application processor 1212, the extension mode-compatible CSI-2 reception circuit 1322 and/or the security unit 1326 functions as a CCI host (requester), and the extension mode-compatible CSI-2 reception circuit 1322 and/or the security unit 1326 functions as a CSI-2 host. In the image sensor 1211, the extension mode-compatible CSI-2 transmission circuit 1304 and/or the security unit 1310 functions as a CCI device (responder), and the extension mode-compatible CSI-2 transmission circuit 1304 and/or the security unit 1310 functions as a CSI-2 device. The CCI host transmits a request message to the CCI device, and in response to receiving the request message, the CCI device transmits a response message to the CCI host.

The CCI host and the CSI-2 host are integral or separate, and the CCI device and the CSI-2 device are integral or separate. In addition, bidirectional low-speed command transmission is performed between the CCI host and the CCI device, and unidirectional high-speed data transmission is performed between the CSI-2 host and the CSI-2 device.

In steps S2001 and S2011, a GET VERSION request and a VERSION response are made between the CCI host of the extension mode-compatible CSI-2 reception circuit 1322 and/or the security unit 1326 and the CCI device of the extension mode-compatible CSI-2 transmission circuit 1304 and/or the security unit 1310. As a result, the extension mode-compatible CSI-2 reception circuit 1322 and/or the security unit 1326 obtains an SPDM version of an endpoint.

In steps S2002 and S2012, a GET CAPABILITIES request and a CAPABILITIES response are made between the CCI host of the extension mode-compatible CSI-2 reception circuit 1322 and/or the security unit 1326 and the CCI device of the extension mode-compatible CSI-2 transmission circuit 1304 and/or the security unit 1310. As a result, the extension mode-compatible CSI-2 reception circuit 1322 and/or the security unit 1326 acquires an SPDM function of the endpoint.

In steps S2003 and S2013, a NEGOTIATE ALGORITHMS request and an ALGORITHMS response are made between the CCI host of the extension mode-compatible CSI-2 reception circuit 1322 and/or the security unit 1326 and the CCI device of the extension mode-compatible CSI-2 transmission circuit 1304 and/or the security unit 1310. As a result, the extension mode-compatible CSI-2 reception circuit 1322 and/or the security unit 1326 negotiates a cryptographic algorithm with the extension mode-compatible CSI-2 transmission circuit 1304 and/or the security unit 1310.

In steps S2004 and S2014, a PSK_EXCHANGE request and a PSK_EXCHANGE_RSP response are made between the CCI host of the extension mode-compatible CSI-2 reception circuit 1322 and/or the security unit 1326 and the CCI device of the extension mode-compatible CSI-2 transmission circuit 1304 and/or the security unit 1310. As a result, the extension mode-compatible CSI-2 reception circuit 1322 and/or the security unit 1326 and the extension mode-compatible CSI-2 transmission circuit 1304 and/or the security unit 1310 derive a session key for CCI such as a session secret or an encryption key.

In steps S2005 and S2015, a PSK_FINISH request and a PSK_FINISH_RSP response are made between the CCI host of the extension mode-compatible CSI-2 reception circuit 1322 and/or the security unit 1326 and the CCI device of the extension mode-compatible CSI-2 transmission circuit 1304 and/or the security unit 1310. As a result, the extension mode-compatible CSI-2 reception circuit 1322 and/or the security unit 1326 ascertains a pre-shared key (PSK) and proves to the responder that the session key for CCI derived in steps S2004 and S2014 is correct.

In step S2006, the CCI host of the extension mode-compatible CSI-2 reception circuit 1322 and/or the security unit 1326 supplies information such as a session key, an algorithm, and other parameters for CSI-2 to the CSI-2 host of the extension mode-compatible CSI-2 reception circuit 1322 and/or the security unit 1326. In step S2021, the CSI-2 host of the extension mode-compatible CSI-2 reception circuit 1322 and/or the security unit 1326 acquires these pieces of information.

In step S2016, the CCI device of the extension mode-compatible CSI-2 transmission circuit 1304 and/or the security unit 1310 supplies information such as a session key, an algorithm, and other parameters for CSI-2 to the CSI-2 device of the extension mode-compatible CSI-2 transmission circuit 1304 and/or the security unit 1310. In step S2031, the CSI-2 device of the extension mode-compatible CSI-2 transmission circuit 1304 and/or the security unit 1310 acquires these pieces of information.

The CSI-2 host of the extension mode-compatible CSI-2 reception circuit 1322 and/or the security unit 1326 and the CSI-2 device of the extension mode-compatible CSI-2 transmission circuit 1304 and/or the security unit 1310 that have obtained the information perform communication using the session key thereafter (the group of arrows in and after step S2022 and step S2032).

For CCI, the session secret and the session key are updated between the CCI host and the CCI device by a KEY_UPDATE request and a KEY_UPDATE ACK response to which Operation of UpdateKey or UpdateAllKeys is applied, and a KEY_UPDATE request and a KEY_UPDATE ACK response to which Operation of VerifyNewKey is applied.

For CSI-2, for example, when the CCI host is triggered to update the session key for CSI-2, the session secret and the session key are updated between the CCI host and the CCI device by a KEY_UPDATE request and a KEY_UPDATE ACK response to which Operation of UpdateExportMaster is applied, and the updated session key (new session key) is applied between the CSI-2 host and the CSI-2 device (steps S2008 and S2017). That is, in the key update for CSI-2, a set of KEY_UPDATE request and KEY_UPDATE ACK response can be omitted.

However, since the new session key updated by using the low-speed command transmission between the CCI host and the CCI device is applied to high-speed data transmission between the CSI-2 host and the CSI-2 device, it is desirable to designate a use start timing of the new session key in order to avoid erroneous use of the new and old session keys.

Image system communication (CSI-2) is generally faster than part or the whole of control system communication (CCI), and a total amount of data to be transmitted is generally large. Therefore, in a case where the new session key (an encryption key or a MAC key) updated by using control system communication is applied to image system communication, there has been a possibility that a use start timing of the new session key does not match between the sensor and the processor.

Therefore, in order to avoid timing mismatch, a packet is extended, and a use start timing of the new session key is designated. For example, in a packet header of the extended packet, as illustrated in FIG. 185, the extended packet of ePH2 [TBD]=1'b1 is transmitted to designate a use start timing of the new session key.

An example of a processing flow in that case will be described with reference to a flowchart of FIG. 186. The CSI-2 host derives a session key in step S2051, and the CSI-2 device derives a session key in step S2061. Thereafter, communication is performed by using the session keys (current session key). The CSI-2 device transmits a VC1 extended packet with ePH2 [TBD]=1'b0 by using the current session key (step S2062) and the CSI-2 host receives the VC1 extended packet (step S2052). The subsequent communication is similarly performed.

Thereafter, at a predetermined timing, the CSI-2 host and the CSI-2 device each derive a new session key (S2053, S2063). The CSI-2 device transmits a VC1 extended packet with ePH2 [TBD]=1'b1 by using the current session key (step S2064) and the CSI-2 host receives the VC1 extended packet (step S2054). Consequently, a use start timing of the new session key is designated.

Thereafter, communication is performed by using the new session keys. That is, the session key is updated according to designation of the use start timing, and the use of the new session key is started. The CSI-2 device transmits a VC1 extended packet with ePH2 [TBD]=1'b0 using the new session key (step S2066) and the CSI-2 host receives the VC1 extended packet (step S2055). The subsequent communication is similarly performed.

Note that at a predetermined timing, each of the CSI-2 host and the CSI-2 device discards the session key before being updated (old session key) (S2056 and S2065).

As described above, since the use start timing of the new session key can be designated, the session key can be updated at an appropriate timing. In addition, the use start timing of the new session key is designated by the extended packet header as described above, and thus the use of the new session key can be started in any line (any timing).

Although the example in which the use start timing of the new session key is designated by the extended packet header has been described above, the use start timing of the new session key may be designated by embedded data, a read response (including in-band interrupt), or the like.

Note that although FIG. 186 illustrates the fastest timing at which the old session key can be discarded, a timing at which the old session key can be discarded may be delayed. In this case, the new session key and the old session key are stored, and thus it is possible to cope with a status in which the old session key is required. For example, a timing of discarding the old session key may be delayed until immediately before deriving the next new session key. In that case, the sensor and the processor store two types of session keys at all times or substantially all times. The same applies to other examples.

Note that, although an example in which the virtual channel of the extended packet is VC1 has been described, the same applies to cases of other virtual channels. That is, VC1 may be replaced with VC2, VC3, or the like, or VC1 may be omitted.

The sensor may designate a use start timing of the new session key by using the extended packet header. An example of a flow of a processor process which is a process of the application processor 1212 in that case will be described with reference to a flowchart of FIG. 187.

When the processor process is started, in step S2101, the extension mode-compatible CSI-2 reception circuit 1322 and/or the security unit 1326 of the application processor 1212 determines whether or not VC1 key update is necessary, and waits until the VC1 key update is necessary. In a case where it is determined that the VC1 key update is necessary, the process proceeds to step S2102.

In step S2102, the extension mode-compatible CSI-2 reception circuit 1322 and/or the security unit 1326 transmits a VC1 key update command. In addition, in step S2103, the extension mode-compatible CSI-2 reception circuit 1322 and/or the security unit 1326 derive a new session key.

In step S2104, the extension mode-compatible CSI-2 reception circuit 1322 and/or the security unit 1326 determines whether or not a VC1 extended packet of ePH2 [TBD]=1'b1 has been received, and waits until it is determined that the VC1 extended packet has been received. In a case where it is determined that the VC1 extended packet has been received, the process proceeds to step S2105.

In step S2105, the extension mode-compatible CSI-2 reception circuit 1322 and/or the security unit 1326 determines whether or not a VC1 extended packet of ePH2 [TBD]=1'b0 has been received, and waits until it is determined that the VC1 extended packet has been received. In a case where it is determined that the VC1 extended packet has been received, the process proceeds to step S2106.

In step S2106, the extension mode-compatible CSI-2 reception circuit 1322 and/or the security unit 1326 starts to discard or clean up the old session key.

In step S2107, the extension mode-compatible CSI-2 reception circuit 1322 and/or the security unit 1326 start to use the new session key.

When the process in step S2107 is ended, the processor process is ended.

An example of a flow of a sensor process which is a process of the image sensor 1211 will be described with reference to a flowchart of FIG. 188. This sensor process is a process corresponding to the processor process of FIG. 187.

When the sensor process is started, in step S2141, the extension mode-compatible CSI-2 transmission circuit 1304 and/or the security unit 1310 of the image sensor 1211 determine whether or not the VC1 key update command transmitted from the application processor 1212 in step S2102 in FIG. 187 has been received, and waits until it is determined that the VC1 key update command has been received. In a case where it is determined that the VC1 key update command has been received, the process proceeds to step S2142.

In step S2142, the extension mode-compatible CSI-2 transmission circuit 1304 and/or the security unit 1310 derive a new session key.

In step S2143, the extension mode-compatible CSI-2 transmission circuit 1304 and/or the security unit 1310 determines whether or not to transmit the VC1 extended packet and waits until it is determined to transmit the VC1 extended packet. In a case where it is determined to transmit the VC1 extended packet, the process proceeds to step S2144.

In step S2144, the extension mode-compatible CSI-2 transmission circuit 1304 and/or the security unit 1310 transmits a VC1 extended packet with ePH2 [TBD]=1'b1. The VC1 extended packet is received by the application processor 1212 in step S2104.

In step S2145, the extension mode-compatible CSI-2 transmission circuit 1304 and/or the security unit 1310 determines whether or not to transmit the VC1 extended packet and waits until it is determined to transmit the VC1 extended packet. In a case where it is determined to transmit the VC1 extended packet, the process proceeds to step S2146.

In step S2146, the extension mode-compatible CSI-2 transmission circuit 1304 and/or the security unit 1310 starts to discard or clean up the old session key.

In step S2147, the extension mode-compatible CSI-2 transmission circuit 1304 and/or the security unit 1310 start to use the new session key.

In step S2148, the extension mode-compatible CSI-2 transmission circuit 1304 and/or the security unit 1310 transmit the VC1 extended packet with ePH2 [TBD]=1'b0.

When the process in step S2148 is ended, the sensor process is ended.

The application processor 1212 performs the processor process as described above, and the image sensor 1211 performs the sensor process as described above, so that a use start timing of the new session key can be designated and the session key can be updated as illustrated in the flowchart of FIG. 186.

<Verification of Session Key>

Operation of VerifyNewKey in KEY_UPDATE operations in the KEY_UPDATE request message can be applied to control system communication (CCI) that is bidirectional communication, but cannot be applied to image system communication (CSI-2) that is unidirectional communication. Thus, it is verified in the image system communication that a new session key (an encryption key or a MAC key) updated by using the control system communication is correctly derived.

Specifically, for example, the sensor calculates a MAC value of a part of embedded data (second embedded data) by using the new session key derived by the sensor, and transmits the second embedded data stored in packet data and the MAC value stored in an extended packet footer to the processor. Then, the processor receives the second embedded data and the MAC value, calculates the MAC value of the second embedded data by using a new session key derived by the processor, and determines that the new session key has been correctly derived in a case where a calculation result of the MAC value matches a reception result. This new session key verification is suitable in the case of the line MAC method.

An example of a processing flow in that case will be described with reference to a flowchart of FIG. 189. The CSI-2 host derives a session key in step S2201, and the CSI-2 device derives a session key in step S2221. Thereafter, communication is performed by using the session keys (current session key). The CSI-2 device transmits a VC1 extended packet with ePH2 [TBD]=1'b0 by using the current session key (step S2222) and the CSI-2 host receives the VC1 extended packet (step S2202). The subsequent communication is similarly performed.

Thereafter, at a predetermined timing, the CSI-2 host and the CSI-2 device each derive a new session key (S2203 and S2223). The CSI-2 device transmits VC1 first embedded data with ePH2 [TBD]=1'b0 by using the current session key (step S2224) and the CSI-2 host receives the VC1 first embedded data (step S2204). Consequently, a use start timing of the new session key is designated.

Then, the CSI-2 device transmits VC1 second embedded data with ePH2 [TBD]=1'b0 by using the new session key (step S2225), and the CSI-2 host receives the VC1 second embedded data (step S2205). Verification of the new session key is started by using the second embedded data. That is, in step S2206, the CSI-2 host verifies the new session key.

That is, as described above, the CSI-2 device calculates a MAC value of a part of the embedded data (second embedded data) by using the new session key derived by the CSI-2 device, and transmits the second embedded data stored in packet data and the MAC value stored in an extended packet footer to the CSI-2 host. Then, the CSI-2 host receives the second embedded data and the MAC value, calculates the MAC value of the second embedded data by using a new session key derived by the CSI-2 host, and compares the calculation result of the MAC value with the reception result. In a case where the two match, the CSI-2 host determines that the new session key has been correctly derived.

In a case where it is determined that the new session key is correctly derived, the session key is updated. That is, use of the new session key is started.

Thus, the CSI-2 device transmits a VC1 frame end with ePH2 [TBD]=1'b1 by using the current session key (step S2226) and the CSI-2 host receives the VC1 frame end (step S2207).

Then, the CSI-2 device then transmits a VC1 frame start with ePH2 [TBD]=1'b0 by using the new session key (step S2228) and the CSI-2 host receives the VC1 frame start (step S2208). Thereafter, the CSI-2 device transmits a VC1 extended packet with ePH2 [TBD]=1'b0 by using the new session key (step S2229) and the CSI-2 host receives the VC1 extended packet (step S2210). The subsequent communication is similarly performed.

Note that at a predetermined timing, each of the CSI-2 host and the CSI-2 device discards the session key before being updated (old session key) (S2209 and S2227).

As described above, since the new session key can be verified, the session key can be updated to a correct session key. That is, the session key can be updated more accurately.

Note that the session key verification procedure is not limited to this example. For example, the sensor encrypts a part of the embedded data (second embedded data) by using the new session key derived by the sensor, and transmits the second embedded data to the processor. Then, the processor receives the second embedded data, decrypts the second embedded data by using the new session key derived by the processor, and determines that the new session key has been correctly derived if the result is as expected. The session key may be verified according to such a procedure.

Incidentally, a transmission order of the first embedded data and the second embedded data may be different. In addition, third embedded data (session key, ePH2 [TBD]=1'b0) may be transmitted after the second embedded data. In addition, the number of rows of embedded data may be variable or fixed according to the presence or absence of new session key verification. In addition, the description has been made by using an example in which the new session key is verified by using a part of the embedded data (second embedded data), but similarly, the new session key may be verified by using a part or the whole of data in the image system communication (specifically, packet data in an extended packet) such as a part of image data (second image data) or a part of user defined data (second user defined data).

An example of a flow of a processor process in this case will be described with reference to a flowchart of FIG. 190. In a case where an extended packet header is used, since VerifyNewKey of SPDM cannot be applied to CSI-2, a new session key is verified by using a part of embedded data in a framework of CSI-2.

When the processor process is started, in step S2301, the extension mode-compatible CSI-2 reception circuit 1322 and/or the security unit 1326 of the application processor 1212 determines whether or not VC1 key update is necessary, and waits until the VC1 key update is necessary. In a case where it is determined that the VC1 key update is necessary, the process proceeds to step S2302.

In step S2302, the extension mode-compatible CSI-2 reception circuit 1322 and/or the security unit 1326 transmits a VC1 key update command. In addition, in step S2303, the extension mode-compatible CSI-2 reception circuit 1322 and/or the security unit 1326 derive a new session key.

In step S2304, the extension mode-compatible CSI-2 reception circuit 1322 and/or the security unit 1326 determines whether or not VC1 second embedded data has been received, and waits until it is determined that the VC1 second embedded data has been received. In a case where it is determined that the VC1 second embedded data has been received, the process proceeds to step S2305.

In step S2305, the extension mode-compatible CSI-2 reception circuit 1322 and/or the security unit 1326 verifies the second embedded data by temporarily using the new session key. Then, in step S2306, the extension mode-compatible CSI-2 reception circuit 1322 and/or the security unit 1326 determine whether or not the new session key is correct on the basis of the verification result. In a case where it is determined that the new session key is not correct, the process proceeds to step S2307.

In step S2307, the extension mode-compatible CSI-2 reception circuit 1322 and/or the security unit 1326 starts to discard or clean up the new session key. In step S2308, the extension mode-compatible CSI-2 reception circuit 1322 and/or the security unit 1326 transmits a continuation command of the current session key. That is, the update of the session key is canceled. When the process in step S2308 is ended, the processor process is ended.

In addition, in a case where it is determined in step S2306 that the new session key is correct, the process proceeds to step S2309. In step S2309, the extension mode-compatible CSI-2 reception circuit 1322 and/or the security unit 1326 determine whether or not a VC1 frame end of ePH2 [TBD]=1'b1 using the current session key has been received. In a case where it is determined that the VC1 frame end has not been received, the process returns to step S2306, and the subsequent processes are repeatedly performed.

In addition, in a case where it is determined in step S2309 that the VC1 frame end of ePH2 [TBD]=1'b1 has been received, the process proceeds to step S2310. In step S2310, the extension mode-compatible CSI-2 reception circuit 1322 and/or the security unit 1326 determines whether or not a VC1 frame start of ePH2 [TBD]=1'b0 using the new session key has been received, and waits until it is determined that the VC1 frame start has been received. In a case where it is determined that the VC1 frame start has been received, the process proceeds to step S2311.

In step S2311, the extension mode-compatible CSI-2 reception circuit 1322 and/or the security unit 1326 starts to discard or clean up the old session key.

In step S2312, the extension mode-compatible CSI-2 reception circuit 1322 and/or the security unit 1326 starts regular use of the new session key.

When the process in step S2312 is ended, the processor process is ended.

An example of a flow of sensor process in this case will be described with reference to a flowchart of FIG. 191. This sensor process is a process corresponding to the processor process in FIG. 190.

When the sensor process is started, in step S2351, the extension mode-compatible CSI-2 transmission circuit 1304 and/or the security unit 1310 of the image sensor 1211 determines whether or not the VC1 key update command transmitted from the application processor 1212 in step S2302 in FIG. 190 has been received, and waits until it is determined that the VC1 key update command has been received. In a case where it is determined that the VC1 key update command has been received, the process proceeds to step S2352.

In step S2352, the extension mode-compatible CSI-2 transmission circuit 1304 and/or the security unit 1310 derive a new session key.

In step S2353, the extension mode-compatible CSI-2 transmission circuit 1304 and/or the security unit 1310 determines whether or not to transmit VC1 embedded data, and waits until it is determined to transmit the VC1 embedded data. In a case where it is determined to transmit the VC1 embedded data, the process proceeds to step S2354.

In step S2354, the extension mode-compatible CSI-2 transmission circuit 1304 and/or the security unit 1310 transmits the VC1 first embedded data to the application processor 1212.

In step S2355, the extension mode-compatible CSI-2 transmission circuit 1304 and/or the security unit 1310 transmits VC1 second embedded data by temporarily using the new session key. The VC1 second embedded data is received by the application processor 1212 in step S2304.

In step S2356, the extension mode-compatible CSI-2 transmission circuit 1304 and/or the security unit 1310 determines whether or not a session key continuation command transmitted from the application processor 1212 in step S2308 has been received. In a case where it is determined that the command has been received, the process proceeds to step S2357. In this case, updating of the session key is stopped, and use of the current session key continues. Therefore, in step S2357, the extension mode-compatible CSI-2 transmission circuit 1304 and/or the security unit 1310 starts to discard or clean up the new session key. When the process in step S2357 is ended, the sensor process is ended.

In addition, in a case where it is determined in step S2356 that the session key continuation command has not been received, the process proceeds to step S2358. In step S2358, the extension mode-compatible CSI-2 transmission circuit 1304 and/or the security unit 1310 determine whether or not to transmit a VC1 frame end. In a case where it is determined to transmit the VC1 frame end, the process proceeds to step S2359. In step S2359, the extension mode-compatible CSI-2 transmission circuit 1304 and/or the security unit 1310 transmits the VC1 frame end with ePH2 [TBD]=1'b1. The VC1 frame end is received by the application processor 1212 in step S2309.

When the process in step S2359 is ended, the process proceeds to step S2360. In addition, in a case where it is determined in step S2358 not to transmit the VC1 frame end, the process proceeds to step S2360.

In step S2360, the extension mode-compatible CSI-2 transmission circuit 1304 and/or the security unit 1310 determine whether or not to transmit a VC1 frame start. In a case where it is determined not to transmit the VC1 frame start, the process returns to step S2356, and the subsequent processes are repeatedly performed.

In addition, in a case where it is determined in step S2360 to transmit the VC1 frame start, the process proceeds to step S2361. In step S2361, the extension mode-compatible CSI-2 transmission circuit 1304 and/or the security unit 1310 starts to discard or clean up the old session key.

In step S2362, the extension mode-compatible CSI-2 transmission circuit 1304 and/or the security unit 1310 start regular use of the new session key.

In step S2363, the extension mode-compatible CSI-2 transmission circuit 1304 and/or the security unit 1310 transmit the VC1 frame start with ePH2 [TBD]=1'b0. This VC1 frame start is received by the application processor 1212 in step S2310.

When the process in step S2363 is ended, the sensor process is ended.

The application processor 1212 performs the processor process as described above, and the image sensor 1211 performs the sensor process as described above, so that the new session key can be verified as illustrated in the flowchart of FIG. 189.

<Omission of Designation of New Session Key Use Start Timing>

Designation of a use start timing of a new session key may be omitted, and the new session key may be verified. An extended packet may be verified by temporarily using the new session key. For example, a MAC value or decryption of the extended packet is verified by temporarily using the new session key, and in a case where a verification result is FAIL, the MAC value or decryption of the extended packet is verified by using the session key regularly used. Then, in a case where the verification result is also FAIL, an END_SESSION request is transmitted, and the session is ended by discarding or cleaning up the new session key and the session key. In a case where it can be determined that the new session key is correctly derived, the session key starts to be discarded or cleaned up, and regular use of the new session key is started.

An example of a flow of a processor process in this case will be described with reference to a flowchart of FIG. 192. When the processor process is started, in step S2401, the extension mode-compatible CSI-2 reception circuit 1322 and/or the security unit 1326 of the application processor 1212 determines whether or not VC1 key update is necessary, and waits until the VC1 key update is necessary. In a case where it is determined that the VC1 key update is necessary, the process proceeds to step S2402.

In step S2402, the extension mode-compatible CSI-2 reception circuit 1322 and/or the security unit 1326 transmits a VC1 key update command. In addition, in step S2403, the extension mode-compatible CSI-2 reception circuit 1322 and/or the security unit 1326 derives a new session key.

In step S2404, the extension mode-compatible CSI-2 reception circuit 1322 and/or the security unit 1326 determines whether or not a VC1 extended packet has been received, and waits until it is determined that the VC1 extended packet has been received. In a case where it is determined that the VC1 extended packet has been received, the process proceeds to step S2405.

In step S2405, the extension mode-compatible CSI-2 reception circuit 1322 and/or the security unit 1326 verifies the VC1 extended packet by temporarily using the new session key. In step S2406, the extension mode-compatible CSI-2 reception circuit 1322 and/or the security unit 1326 determines whether or not the new session key is correct on the basis of the verification result.

In a case where it is determined that the new session key is correct, the process proceeds to step S2407. In step S2407, the extension mode-compatible CSI-2 reception circuit 1322 and/or the security unit 1326 starts to discard or clean up the old session key. Then, in step S2408, the extension mode-compatible CSI-2 reception circuit 1322 and/or the security unit 1326 starts regular use of the new session key. When the process in step S2408 is ended, the processor process is ended.

In addition, in a case where it is determined in step S2406 that the new session key is incorrect, the process proceeds to step S2409. In step S2409, the extension mode-compatible CSI-2 reception circuit 1322 and/or the security unit 1326 verifies the VC1 extended packet by using the current session key.

In step S2410, the extension mode-compatible CSI-2 reception circuit 1322 and/or the security unit 1326 determines whether or not the verification result is FAIL. In a case where it is determined that the verification result is not FAIL, the process returns to step S2404, and the subsequent processes are repeatedly performed.

In a case where it is determined in step S2410 that the verification result is FAIL, the process proceeds to step S2411. In step S2411, the extension mode-compatible CSI-2 reception circuit 1322 and/or the security unit 1326 transmits an END_SESSION request. Then, in step S2412, the extension mode-compatible CSI-2 reception circuit 1322 and/or the security unit 1326 discards or cleans up the current session key together with the new session key. As a result, the session is ended. When the process in step S2412 is ended, the processor process is ended.

An example of a flow of a sensor process in this case will be described with reference to a flowchart of FIG. 193. This sensor process is a process corresponding to the processor process in FIG. 192.

When the sensor process is started, in step S2451, the extension mode-compatible CSI-2 transmission circuit 1304 and/or the security unit 1310 of the image sensor 1211 determines whether or not the VC1 key update command transmitted from the application processor 1212 in step S2402 in FIG. 192 has been received, and waits until it is determined that the VC1 key update command has been received. In a case where it is determined that the VC1 key update command has been received, the process proceeds to step S2452.

In step S2452, the extension mode-compatible CSI-2 transmission circuit 1304 and/or the security unit 1310 derives a new session key.

In step S2453, the extension mode-compatible CSI-2 transmission circuit 1304 and/or the security unit 1310 determines whether or not to transmit a VC1 extended packet and waits until it is determined to transmit the VC1 extended packet. In a case where it is determined to transmit the VC1 extended packet, the process proceeds to step S2454.

In step S2454, the extension mode-compatible CSI-2 transmission circuit 1304 and/or the security unit 1310 starts to discard or clean up the current session key.

In step S2455, the extension mode-compatible CSI-2 transmission circuit 1304 and/or the security unit 1310 starts to use the new session key.

In step S2456, the extension mode-compatible CSI-2 transmission circuit 1304 and/or the security unit 1310 transmits the VC1 extended packet. The VC1 extended packet is received by the application processor 1212 in step S2404.

When the process in step S2456 is ended, the sensor process is ended.

The application processor 1212 performs the processor process as described above, and the image sensor 1211 performs the sensor process as described above, so that the new session key can be verified.

This example is an example in which the processor verifies that the new session key has been derived correctly. As described above, although the processor process is heavy, the sensor process is light, which is suitable in a case where a resource of the sensor is limited more than a resource of the processor.

Note that, although a configuration example suitable for the line MAC is illustrated, a configuration example suitable for the frame MAC can be obtained by changing a part (for example, a VC1 extended packet is received). In addition, use start timing designation may be used together.

<Selection of Session Key According to Instruction from Processor>

The sensor may select a session key in response to an instruction from the processor. For example, the image sensor may transmit an extended packet (verification target data) by temporarily using a new session key, and start reuse of a session key according to an extended packet verification result from the processor.

Further, the processor may transmit a session key unnecessary command or a new session key unnecessary command according to an extended packet verification result. In contrast, the image sensor may select whether to start regular use of the new session key or to start reuse of the session key in response to the session key unnecessary command or the new session key unnecessary command. If the image sensor can select the session key or the new session key, the session key unnecessary command and the new session key unnecessary command may be different commands.

An example of a flow of a sensor process in that case will be described with reference to a flowchart of FIG. 194. When the sensor process is started, in step S2501, the extension mode-compatible CSI-2 transmission circuit 1304 and/or the security unit 1310 of the image sensor 1211 determines whether or not a VC1 key update command is received, and waits until it is determined that the VC1 key update command is received. In a case where it is determined that the VC1 key update command has been received, the process proceeds to step S2502.

In step S2502, the extension mode-compatible CSI-2 transmission circuit 1304 and/or the security unit 1310 derives a new session key.

In step S2503, the extension mode-compatible CSI-2 transmission circuit 1304 and/or the security unit 1310 determines whether or not to transmit a VC1 extended packet and waits until it is determined to transmit the VC1 extended packet. In a case where it is determined to transmit the VC1 extended packet, the process proceeds to step S2504.

In step S2504, the extension mode-compatible CSI-2 transmission circuit 1304 and/or the security unit 1310 transmits the VC1 extended packet by temporarily using the new session key.

In step S2505, the extension mode-compatible CSI-2 transmission circuit 1304 and/or the security unit 1310 determines whether or not the current session key unnecessary command has been received. In a case where it is determined that the current session key unnecessary command has been received, the process proceeds to step S2506. In this case, the session key is updated.

In step S2506, the extension mode-compatible CSI-2 transmission circuit 1304 and/or the security unit 1310 starts to discard or clean up the current session key.

In step S2507, the extension mode-compatible CSI-2 transmission circuit 1304 and/or the security unit 1310 starts regular use of the new session key. When the process in step S2507 is ended, the sensor process is ended.

In addition, in a case where it is determined in step S2505 that the current session key unnecessary command has not been received, the process proceeds to step S2508.

In step S2508, the extension mode-compatible CSI-2 transmission circuit 1304 and/or the security unit 1310 determines whether or not the new session key unnecessary command has been received. In a case where it is determined that the new session key unnecessary command has not been received, the process returns to step S2503, and the subsequent processes are repeatedly performed.

In addition, in a case where it is determined in step S2508 that the new session key unnecessary command has been received, the process proceeds to step S2509.

In step S2509, the extension mode-compatible CSI-2 transmission circuit 1304 and/or the security unit 1310 starts to discard or clean up the new session key.

In step S2510, the extension mode-compatible CSI-2 transmission circuit 1304 and/or the security unit 1310 starts to reuse the current session key. When the process in step S2510 is ended, the sensor process is ended.

By performing the sensor process as described above, the image sensor 1211 can select whether to start regular use of the new session key or start reuse of the session key according to the session key unnecessary command or the new session key unnecessary command supplied from the application processor 1212.

<Use of KeyUpdateReq and KeySwitchTiming>

For example, as illustrated in FIG. 195, the use start timing of the new session key may be designated by using KeyUpdateReq or KeySwitchTiming.

KeyUpdateReq or KeySwitchTiming is stored, for example, in embedded data and transmitted. However, KeyUpdateReq or KeySwitchTiming may be stored and transmitted in any of image data, user defined data, or a read response (including in-band interrupt). In addition, any of a Field name, Bits allocation, Value definition, or the like of KeyUpdateReq or KeySwitchTiming may be different. In addition, KeyUpdateReq is transmitted to trigger a KEY_UPDATE request message with the CCI host, but transmission of KeyUpdateReq may be unnecessary. In that case, instead of the CSI-2 device, the CSI-2 host or the CCI host triggers the KEY_UPDATE request message. In addition, in a case of using the GET_ENCAPSULATED_REQUEST mechanism, the CSI-2 device may trigger the KEY_UPDATE request message with the CCI device. In addition, transmission of the second embedded data and verification of the new session key may be unnecessary.

An example of a flow of a process in a case where KeyUpdateReq or KeySwitchTiming is used will be described with reference to a flowchart of FIG. 196. The CSI-2 host derives a session key in step S2601, and the CSI-2 device derives a session key in step S2621. Thereafter, communication is performed by using the session keys (current session key). The CSI-2 device transmits the VC1 extended packet by using the current session key (step S2622), and the CSI-2 host receives the current session key (step S2602). The subsequent communication is similarly performed.

Thereafter, at a predetermined timing, the CSI-2 device transmits embedded data in which KeyUpdataReq is stored by using the current session key in step S2623. The CSI-2 host receives the embedded data in step S2603.

Then, the CSI-2 host and the CSI-2 device each derive a new session key (S2604 and S2624).

In step S2625, the CSI-2 device transmits VC1 first embedded data by using the current session key. In step S2605, the CSI-2 host receives the VC1 first embedded data.

Then, in step S2626, the CSI-2 device transmits VC1 second embedded data by temporarily using the new session key. In step S2606, the CSI-2 host receives the VC1 second embedded data. In step S2607, the CSI-2 host verifies the new session key.

In a case where it is determined that the new session key has been correctly derived, the session key is updated at a designated timing. That is, use of the new session key is started.

Therefore, in step S2627, the CSI-2 device transmits KeySwitchiming=1'b1 by using the current session key. In step S2608, the CIS-2 host receives KeySwitchTiming.

In step S2629, the CSI-2 device transmits a VC1 frame start by regularly using the new session key. In step S2609, the CSI-2 host receives the VC1 frame start.

In step S2630, the CSI-2 device transmits a VC1 extended packet by regularly using the new session key. In step S2611, the CSI-2 host receives the VC1 extended packet. The subsequent communication is similarly performed.

Note that at a predetermined timing, each of the CSI-2 host and the CSI-2 device discards the session key before being updated (old session key) (S2610 and S2628).

As described above, a use start timing of the new session key can be designated by using KeyUpdateReq or KeySwitchTiming.

An example of a flow of a processor process in this case will be described with reference to a flowchart of FIG. 197. When the processor process is started, in step S2651, the extension mode-compatible CSI-2 reception circuit 1322 and/or the security unit 1326 of the application processor 1212 determines whether or not VC1 key update is necessary, and waits until the VC1 key update is necessary. In a case where it is determined that the VC1 key update is necessary, the process proceeds to step S2652.

In step S2652, the extension mode-compatible CSI-2 reception circuit 1322 and/or the security unit 1326 transmits a VC1 key update command. In addition, in step S2653, the extension mode-compatible CSI-2 reception circuit 1322 and/or the security unit 1326 derives a new session key.

In step S2654, the extension mode-compatible CSI-2 reception circuit 1322 and/or the security unit 1326 determines whether or not the VC1 first embedded data of KeySwitchTiming=1'b1 has been received, and waits until it is determined that the VC1 first embedded data has been received. In a case where it is determined that the VC1 first embedded data has been received, the process proceeds to step S2655.

In step S2655, the extension mode-compatible CSI-2 reception circuit 1322 and/or the security unit 1326 verifies the second embedded data by temporarily using the new session key. Then, in step S2656, the extension mode-compatible CSI-2 reception circuit 1322 and/or the security unit 1326 determines whether or not the new session key is correct on the basis of the verification result. In a case where it is determined that the new session key is not correct, the process proceeds to step S2657.

In step S2657, the extension mode-compatible CSI-2 reception circuit 1322 and/or the security unit 1326 starts to discard or clean up the new session key. In step S2658, the extension mode-compatible CSI-2 reception circuit 1322 and/or the security unit 1326 transmits a continuation com-mand of the current session key. When the process in step S2658 is ended, the processor process is ended.

In addition, in a case where it is determined in step S2656 that the new session key is correct, the process proceeds to step S2659. In step S2659, the extension mode-compatible CSI-2 reception circuit 1322 and/or the security unit 1326 determines whether or not a VC1 frame start has been received. In a case where it is determined that the VC1 frame start has not been received, the process returns to step S2656, and the subsequent processes are repeatedly per-formed.

Furthermore, in a case where it is determined in step S2659 that VC1 frame start has been received, the process proceeds to step S2660. In step S2660, the extension mode-compatible CSI-2 reception circuit 1322 and/or the security unit 1326 starts to discard or clean up the current session key.

In step S2661, the extension mode-compatible CSI-2 reception circuit 1322 and/or the security unit 1326 starts regular use of the new session key. When the process in step S2661 is ended, the processor process is ended.

An example of a flow of a sensor process in this case will be described with reference to a flowchart of FIG. 198. This sensor process is a process corresponding to the processor process in FIG. 197.

When the sensor process is started, in step S2681, the extension mode-compatible CSI-2 transmission circuit 1304 and/or the security unit 1310 of the image sensor 1211 determines whether or not the VC1 key update command transmitted from the application processor 1212 in step S2652 in FIG. 197 has been received, and waits until it is determined that the VC1 key update command has been received. In a case where it is determined that the VC1 key update command has been received, the process proceeds to step S2682.

In step S2682, the extension mode-compatible CSI-2 transmission circuit 1304 and/or the security unit 1310 derives a new session key.

In step S2683, the extension mode-compatible CSI-2 transmission circuit 1304 and/or the security unit 1310 determines whether or not to transmit VC1 embedded data, and waits until it is determined to transmit the VC1 embed-ded data. In a case where it is determined to transmit the VC1 embedded data, the process proceeds to step S2684.

In step S2684, the extension mode-compatible CSI-2 transmission circuit 1304 and/or the security unit 1310 transmits VC1 first embedded data with KeySwitchTiming=1'b1.

In step S2685, the extension mode-compatible CSI-2 transmission circuit 1304 and/or the security unit 1310 transmits VC1 second embedded data by temporarily using the new session key.

In step S2686, the extension mode-compatible CSI-2 transmission circuit 1304 and/or the security unit 1310 determines whether or not a session key continuation com-mand transmitted from the application processor 1212 in step S2658 has been received. In a case where it is deter-mined that the command has been received, the process proceeds to step S2687. In step S2687, the extension mode-compatible CSI-2 transmission circuit 1304 and/or the secu-rity unit 1310 starts to discard or clean up the new session key. When the process in step S2687 is ended, the sensor process is ended.

In addition, in a case where it is determined in step S2686 that the session key continuation command has not been received, the process proceeds to step S2688. In step S2688, the extension mode-compatible CSI-2 transmission circuit 1304 and/or the security unit 1310 determines whether or not to transmit a VC1 frame start. In a case where it is determined not to transmit the VC1 frame start, the process returns to step S2686, and the subsequent processes are repeatedly performed.

In addition, in a case where it is determined in step S2688 to transmit the VC1 frame start, the process proceeds to step S2689. In step S2689, the extension mode-compatible CSI-2 transmission circuit 1304 and/or the security unit 1310 starts to discard or clean up the current session key.

In step S2690, the extension mode-compatible CSI-2 transmission circuit 1304 and/or the security unit 1310 starts regular use of the new session key. When the process in step S2690 is ended, the sensor process is ended.

The application processor 1212 performs the processor process as described above, and the image sensor 1211 performs the sensor process as described above, so that the new session key can be verified as illustrated in the flowchart of FIG. 196.

Note that, in a case where the sensor or the processor includes an additional message counter, an additional message count value is initialized to be set to 0 when starting use or regular use (excluding temporary use) of the new session key. However, in that case, it is desirable not to initialize a message count value.

Further, in a case where the new session key is temporarily used, for example, the new session key may be temporarily used by setting the additional message count value to the maximum value. Alternatively, for example, the additional message count value may be set to 0 to temporarily use the new session key, and the additional message count value may be set to 1 when starting regular use of the new session key.

On the other hand, use or regular use (excluding temporary use) of the new session key may be started at a timing at which the message count value reaches an initial value (for example, 0). In this case, the number of times the new session key can be used is maximized.

Furthermore, in a case where the sensor or the processor includes an additional frame counter, an additional frame count value is initialized to be set to 0 when starting use or regular use (excluding temporary use) of the new session key.

However, in that case, it is desirable not to initialize the frame count value. Further, in a case where the new session key is temporarily used, for example, the new session key may be temporarily used by setting the additional frame count value to the maximum value. Alternatively, for example, the additional frame count value may be set to 0 to temporarily use the new session key, and the additional frame count value may be set to 1 when starting regular use of the new session key.

In contrast, use or regular use (excluding temporary use) of the new session key may be started at a timing at which the frame count value reaches an initial value (for example, 1). In this case, the number of times the new session key can be used is maximized.

<Designation of Use Start Timing of New Session Key Using Embedded Data or Read Response>

A use start timing of the new session key may be designated by using embedded data or a read response. A message for designating a use start timing (use start timing designation) may be stored in embedded data, image data, user defined data, or a read response (including the in-band interrupt) and transmitted. The use start timing designation may include a message count value (a value of a message counter). In this case, use of the new session key may be started from a part or the whole of an extended packet for a message count value designated as a use start timing. In addition, the use start timing designation may include a frame number (frame count value). In this case, the use of the new session key may be started from a part or the whole of an extended packet for a frame number designated as a use start timing. Furthermore, the use start timing designation may include a value of eDT (extended data type) or DT (data type). In that case, the use of the new session key may be started from a part or the whole of an extended packet for an eDT or a DT designated as a use start timing transmitted after the next line.

An example of a flow of a processor process in this case will be described with reference to a flowchart of FIG. 199. When the processor process is started, in step S2701, the extension mode-compatible CSI-2 reception circuit 1322 and/or the security unit 1326 of the application processor 1212 determines whether or not VC1 key update is necessary, and waits until the VC1 key update is necessary. In a case where it is determined that the VC1 key update is necessary, the process proceeds to step S2702.

In step S2702, the extension mode-compatible CSI-2 reception circuit 1322 and/or the security unit 1326 transmits a VC1 key update command. In addition, in step S2703, the extension mode-compatible CSI-2 reception circuit 1322 and/or the security unit 1326 derives a new session key.

In step S2704, the extension mode-compatible CSI-2 reception circuit 1322 and/or the security unit 1326 determines whether or not timing designation has been received, and waits until it is determined that timing designation has been received. In a case where it is determined that the timing designation has been received, the process proceeds to step S2705.

In step S2705, the extension mode-compatible CSI-2 reception circuit 1322 and/or the security unit 1326 determines whether or not a timing designated VC1 extended packet header has been received, and waits until it is determined that the timing designated VC1 extended packet header has been received. In a case where it is determined that the timing designated VC1 extended packet header has been received, the process proceeds to step S2706.

In step S2706, the extension mode-compatible CSI-2 reception circuit 1322 and/or the security unit 1326 starts to discard or clean up the current session key.

In step S2707, the extension mode-compatible CSI-2 reception circuit 1322 and/or the security unit 1326 starts to use the new session key.

When the process in step S2707 is ended, the processor process is ended.

An example of a flow of a sensor process which is a process of the image sensor 1211 will be described with reference to a flowchart of FIG. 200. This sensor process is a process corresponding to the processor process in FIG. 199.

When the sensor process is started, in step S2721, the extension mode-compatible CSI-2 transmission circuit 1304 and/or the security unit 1310 of the image sensor 1211 determines whether or not a VC1 key update command has been received, and waits until it is determined that the VC1 key update command has been received. In a case where it is determined that the VC1 key update command has been received, the process proceeds to step S2722.

In step S2722, the extension mode-compatible CSI-2 transmission circuit 1304 and/or the security unit 1310 derives a new session key.

In step S2723, the extension mode-compatible CSI-2 transmission circuit 1304 and/or the security unit 1310 determines whether or not to transmit VC1 embedded data, and waits until it is determined to transmit the VC1 embedded data. In a case where it is determined to transmit the VC1 embedded data, the process proceeds to step S2724.

In step S2724, the extension mode-compatible CSI-2 transmission circuit 1304 and/or the security unit 1310 transmits the VC1 embedded data including use start timing designation.

In step S2725, the extension mode-compatible CSI-2 transmission circuit 1304 and/or the security unit 1310 determines whether or not to transmit a timing designated VC1 extended packet header, and waits until it is determined to transmit the VC1 extended packet header. In a case where it is determined to transmit the timing designated VC1 extended packet header, the process proceeds to step S2726.

In step S2726, the extension mode-compatible CSI-2 transmission circuit 1304 and/or the security unit 1310 starts to discard or clean up the current session key.

In step S2727, the extension mode-compatible CSI-2 transmission circuit 1304 and/or the security unit 1310 starts to use the new session key.

When the process in step S2727 is ended, the sensor process is ended.

The application processor 1212 performs the processor process as described above, and the image sensor 1211 performs the sensor process as described above, so that a use start timing of the new session key can be designated by using embedded data or a read response.

<Designation of Use Start Timing of New Session Key Using Write Command>

The processor may designate a use start timing of the new session key by using a write command. That is, a message for designating a use start timing (use start timing designation) may be stored in the write command and transmitted. The use start timing designation may include a message count value (a value of a message counter). In this case, use of the new session key may be started from a part or the whole of an extended packet for a message count value designated as a use start timing. In addition, the use start timing designation may include a frame number (frame count value). In this case, the use of the new session key may be started from a part or the whole of an extended packet for a frame number designated as a use start timing. Furthermore, the use start timing designation may include a value of eDT (extended data type) or DT (data type). In that case, the use of the new session key may be started from a part or the whole of an extended packet for an eDT or a DT designated as a use start timing transmitted after a read response of OK in the use start timing designation.

An example of a flow of a processor process in this case will be described with reference to a flowchart of FIG. 201. When the processor process is started, in step S2741, the extension mode-compatible CSI-2 reception circuit 1322 and/or the security unit 1326 of the application processor 1212 determines whether or not VC1 key update is necessary, and waits until the VC1 key update is necessary. In a case where it is determined that the VC1 key update is necessary, the process proceeds to step S2742.

In step S2742, the extension mode-compatible CSI-2 reception circuit 1322 and/or the security unit 1326 transmits a VC1 key update command. In addition, in step S2743, the extension mode-compatible CSI-2 reception circuit 1322 and/or the security unit 1326 derives a new session key.

In step S2744, the extension mode-compatible CSI-2 reception circuit 1322 and/or the security unit 1326 transmits a write command including use start timing designation.

In step S2745, the extension mode-compatible CSI-2 reception circuit 1322 and/or the security unit 1326 transmits a read command as to whether or not a use start timing can be designated.

In step S2746, the extension mode-compatible CSI-2 reception circuit 1322 and/or the security unit 1326 determines whether or not a read response has been received, and waits until it is determined that the read response has been received. In a case where it is determined that the read response has been received, the process proceeds to step S2747.

In step S2747, the extension mode-compatible CSI-2 reception circuit 1322 and/or the security unit 1326 determines whether or not a response is OK in the use start timing designation. In a case where the response is not OK at the use start timing, the process returns to step S2744, and the subsequent processes are repeatedly performed.

In addition, in a case where it is determined in step S2747 that the response is OK in the use start timing designation, the process proceeds to step S2748.

In step S2748, the extension mode-compatible CSI-2 reception circuit 1322 and/or the security unit 1326 determines whether or not the timing designated VC1 extended packet header has been received, and waits until it is determined that the timing designated VC1 extended packet header has been received. In a case where it is determined that the timing designated VC1 extended packet header has been received, the process proceeds to step S2749.

In step S2749, the extension mode-compatible CSI-2 reception circuit 1322 and/or the security unit 1326 starts to discard or clean up the current session key.

In step S2750, the extension mode-compatible CSI-2 reception circuit 1322 and/or the security unit 1326 starts to use the new session key.

When the process in step S2750 is ended, the processor process is ended.

An example of a flow of a sensor process which is a process of the image sensor 1211 will be described with reference to a flowchart of FIG. 202. This sensor process is a process corresponding to the processor process in FIG. 201.

When the sensor process is started, in step S2771, the extension mode-compatible CSI-2 transmission circuit 1304 and/or the security unit 1310 of the image sensor 1211 determines whether or not a VC1 key update command has been received, and waits until it is determined that the VC1 key update command has been received. In a case where it is determined that the VC1 key update command has been received, the process proceeds to step S2772.

In step S2772, the extension mode-compatible CSI-2 transmission circuit 1304 and/or the security unit 1310 derives a new session key.

In step S2773, the extension mode-compatible CSI-2 transmission circuit 1304 and/or the security unit 1310 determines whether or not a write command has been received, and waits until it is determined that the write command has been received. In a case where it is determined that the write command has been received, the process proceeds to step S2774.

In step S2774, the extension mode-compatible CSI-2 transmission circuit 1304 and/or the security unit 1310 determines whether or not a read command has been received, and waits until it is determined that the read command has been received. In a case where it is determined that the read command has been received, the process proceeds to step S2775.

In step S2775, the extension mode-compatible CSI-2 transmission circuit 1304 and/or the security unit 1310 determines whether or not OK is provided in the use start timing designation. In a case where it is determined that OK is not provided at the use start timing, the process proceeds to step S2776.

In step S2776, the extension mode-compatible CSI-2 transmission circuit 1304 and/or the security unit 1310 make a read response of NG in the use start timing designation. When the process in step S2776 is ended, the process returns to step S2773, and the subsequent processes are repeated.

In a case where it is determined in step S2775 that OK is provided at the use start timing, the process proceeds to step S2777.

In step S2777, the extension mode-compatible CSI-2 transmission circuit 1304 and/or the security unit 1310 make a read response of OK in the use start timing designation.

In step S2778, the extension mode-compatible CSI-2 transmission circuit 1304 and/or the security unit 1310 determines whether or not to transmit a timing designated VC1 extended packet header, and waits until it is determined to transmit the VC1 extended packet header. In a case where it is determined that the timing designated VC1 extended packet header is to be transmitted, the process proceeds to step S2779.

In step S2779, the extension mode-compatible CSI-2 transmission circuit 1304 and/or the security unit 1310 starts to discard or clean up the current session key.

In step S2780, the extension mode-compatible CSI-2 transmission circuit 1304 and/or the security unit 1310 starts to use the new session key.

When the process in step S2780 is ended, the sensor process is ended.

The application processor 1212 performs the processor process as described above, and the image sensor 1211 performs the sensor process as described above, so that a use start timing of the new session key can be designated by using the write command.

<Designation of Use Start Timing of New Session Key Using Key ID Information>

A use start timing of the next session key (new session key) may be designated by transmitting key ID information updated (for example, an increment, a decrement, or a random number) according to the use start of the next session key (new session key).

An example of a flow of a processor process in that case will be described with reference to FIG. 203. When the processor process is started, the extension mode-compatible CSI-2 reception circuit 1322 and/or the security unit 1326 of the application processor 1212 initializes a key ID to 0 in step S2801.

In step S2802, the extension mode-compatible CSI-2 reception circuit 1322 and/or the security unit 1326 starts to use a session key.

In step S2803, the extension mode-compatible CSI-2 reception circuit 1322 and/or the security unit 1326 determines whether or not to end the session. In a case where it is determined to end the session, the process proceeds to step S2804.

In step S2804, the extension mode-compatible CSI-2 reception circuit 1322 and/or the security unit 1326 transmits an END_SESSION request.

In step S2805, the extension mode-compatible CSI-2 reception circuit 1322 and/or the security unit 1326 determines whether or not a response has been received from the image sensor 1211. In a case where it is determined that a response has not been received, the process returns to step S2804, and the subsequent processes are repeatedly performed. In a case where it is determined in step S2805 that a response has been received, the process proceeds to step S2806.

In step S2806, the extension mode-compatible CSI-2 reception circuit 1322 and/or the security unit 1326 discards or cleans up all session keys and next session key (new session key). When the process in step S2806 is ended, the processor process is ended.

In addition, in a case where it is determined in step S2803 not to end the session, the process proceeds to step S2807.

In step S2807, the extension mode-compatible CSI-2 reception circuit 1322 and/or the security unit 1326 determines whether or not key ID information has been received. In a case where it is determined that the key ID information has not been received, the process returns to step S2803, and the subsequent processes are repeatedly performed. In a case where it is determined in step S2807 that the key ID information has been received, the process proceeds to step S2808.

In step S2808, the extension mode-compatible CSI-2 reception circuit 1322 and/or the security unit 1326 determines whether or not the key ID information has been updated. In a case where it is determined that the key ID information has not been updated, the process returns to step S2803, and the subsequent processes are repeatedly performed. In a case where it is determined in step S2808 that the key ID information has been updated, the process proceeds to step S2809.

In step S2809, the extension mode-compatible CSI-2 reception circuit 1322 and/or the security unit 1326 starts to use the next session key (new session key).

In step S2810, the extension mode-compatible CSI-2 reception circuit 1322 and/or the security unit 1326 update the key ID. When the process in step S2810 is ended, the process returns to step S2803, and the subsequent processes are repeatedly performed.

An example of a flow of a sensor process which is a process of the image sensor 1211 will be described with reference to a flowchart of FIG. 204. This sensor process is a process corresponding to the processor process in FIG. 203.

When the sensor process is started, in step S2831, the extension mode-compatible CSI-2 transmission circuit 1304 and/or the security unit 1310 of the image sensor 1211 initialize the key ID to 0.

In step S2832, the extension mode-compatible CSI-2 transmission circuit 1304 and/or the security unit 1310 starts to use the session key.

In step S2833, the extension mode-compatible CSI-2 transmission circuit 1304 and/or the security unit 1310 determines whether or not an END_SESSION request has been received. In a case where it is determined that the END_SESSION request has not been received, the process proceeds to step S2834.

In step S2834, the extension mode-compatible CSI-2 transmission circuit 1304 and/or the security unit 1310 determines whether or not to start to use the next session key (new session key). In a case where it is determined to start to use the next session key, the process proceeds to step S2835.

In step S2835, the extension mode-compatible CSI-2 transmission circuit 1304 and/or the security unit 1310 starts to use the next session key (new session key).

In step S2836, the extension mode-compatible CSI-2 transmission circuit 1304 and/or the security unit 1310 updates the key ID. When the process in step S2836 is ended, the process proceeds to step S2837. In addition, in a case where it is determined in step S2834 not to start to use the next session key (new session key), the process proceeds to step S2837.

In step S2837, the extension mode-compatible CSI-2 transmission circuit 1304 and/or the security unit 1310 transmits the key ID information. When the process in step S2837 is ended, the process returns to step S2833, and the subsequent processes are repeated.

Furthermore, in a case where it is determined in step S2833 that the END_SESSION request has been received, the process proceeds to step S2838.

In step S2838, the extension mode-compatible CSI-2 transmission circuit 1304 and/or the security unit 1310 transmits a response to the application processor 1212.

In step S2839, the extension mode-compatible CSI-2 transmission circuit 1304 and/or the security unit 1310 discards or cleans up all session keys and next session key (new session key).

When the process in step S2839 is ended, the sensor process is ended.

The application processor 1212 performs the processor process as described above, and the image sensor 1211 performs the sensor process as described above, so that a use start timing of the new session key can be designated by using the key ID information.

The key ID information may be a value of a key ID or, for example, as illustrated in FIG. 205, may be information indicating whether a key ID used this time or a key ID used next time is an even number (Even key) or an odd number (Odd key). Further, the key ID may be information indicating whether a key ID is an even number (Even key) or an odd number (Odd key). However, the key ID information may include only 0 (even number) and 1 (odd number).

<Derivation of Plurality of Session Keys>

A plurality of session keys (encryption keys or MAC keys) may be derived from one export master secret. For example, this is effective in a case where it is desired to make session keys different for each virtual channel or each extended virtual channel.

In addition, as in examples illustrated in FIGS. 206 and 207, a plurality of export master secrets (0 . . . N) may be derived, and a session key (an encryption key or a MAC key) may be derived from each of the plurality of export master secrets. In this case, only some of the export master secrets may be updated by designating an export master secrets to be updated. Export-Master-Secret, bin_str8_1, . . . , bin_str8_N, or the like in HKDF-Expand are examples, and another character may be stored.

Definitions of HKDF-Expand, Hash.Length, bin_str3, bin_str4, bin_str8, BinConcat, Version, TH2, or the like are as disclosed in Non Patent Document 1. As bin_str8_0, . . . , and bin_str8_N for example, definitions of bin_str8_0=BinConcat (Hash.Length, Version, "exp master 0", TH2); . . . , bin_str8_N=BinConcat (Hash.Length, Version, "exp master N", TH2); are applied, but another definition may be applied.

Incidentally, for example, control system communication including a CCI host (control system communication host) and a CCI device (control system communication device) is also referred to as a control plane (Configuration, status, capabilities, not application data. Options include CCI out-of-band (I2C/I3C), USL in-band, and ACMD/ACMP using mailbox registers). For example, image system communication including a CSI-2 host (image system communication host) and a CSI-2 device (image system communication device) is also referred to as data plane (Pixels, content, application data). Further, the control system communication host and the image system communication host may be integrated or may be separate. In addition, the control system communication device and the image system communication device may be integrated or may be separate. In addition, in a case where the image system communication host is a DSI-2 host and the image system communication device is a display (DSI-2 device), directions of arrows between the image system communication host (the CSI-2 host in the drawing) and the image system communication device (the CSI-2 device in the drawing) in FIGS. 78, 79, 80, 184, 186, 189, and 196 are opposite.

Meanwhile, in the above description, an example in which the session key or the new session key between the image system communication host and the image system communication device is derived from the SPDM key schedule has been described, but the present technology is not limited thereto. For example, a key generated by a secure session manager controller (SSMC) or an application processor (also referred to as an SoC or a system on chip) that is both the control system communication host and the image system communication host and received by the control system communication device via a protected session (for example, an SPDM session) between an image sensor, a display, or one end of a bridge that is both the control system communication device and the image system communication device and the control system communication host may be used as a session key or a new session key between the image system communication host and the image system communication device. In addition, a key generated by the SSMC or the application processor that is the control system communication host and received by the control system communication device via a protected session (for example, an SPDM session) between the one end of the bridge, the image sensor, the display, or the other end of the bridge that is the control system communication device and the control system communication host may be used as a session key or a new session key between the application processor or the one end of the bridge that is the image system communication host and the one end of the bridge (here, in a case where one end of the bridge is not the image system communication host), the image sensor, the display, or the other end of the bridge that is the image system communication device. In addition, a key generated by the SSMC that is the control system communication host and received by the control system communication device via a protected session (for example, an SPDM session) between the application processor, the one end of the bridge, the image sensor, the display, or the other end of the bridge that is the control system communication device and the control system communication host may be used as a session key or a new session key between the application processor, or the one end of the bridge that is the image system communication host and the one end of the bridge (here, in a case where one end of the bridge is not the image system communication host), the image sensor, the display, or the other end of the bridge that is the image system communication device. Note that the SSMC and a part or the whole of the application processor may be integrated or may be separate. In addition, transmission of a session key or a new session key for image system communication via a protected session (for example, an SPDM session) between the control system communication host and the control system communication device may be performed by a Vendor defined SPDM message (for example, a VENDOR_DEFINED_REQUEST request message or a VENDOR_DEFINED_RESPONSE response message). That is, in a case where the control system communication host generates a session key or a new session key between the image system communication host and the image system communication device, the control system communication device does not need to derive an export master secret, and a KEY_UPDATE request and a KEY_UPDATE ACK response in FIG. 184 may be omitted. In addition, the control system communication host may derive and generate the session key or the new session key from the export master secret between the image system communication host and the image system communication device, may derive and generate the session key or the new session key from a secret different from the export master secret, may generate the session key or the new session key from an intrinsic random number generator or a pseudorandom number generator, or may generate the session key or the new session key by using means different from these. In addition, the session key or the new session key between the image system communication host and the image system communication device may be a group key that can be used between (among three or more) a first image system communication host, a first image system communication device, and a second image system communication host or a second image system communication device. That is, the image system communication host or the image system communication device may support not only unicast (one-to-one) transmission or reception but also multicast (one-to-many) transmission or reception.

Incidentally, in a case where the control system communication host and the image system communication host are separate, there is a problem in use start timing of a session key or a new session key for image system communication. For example, in a case where the image system communication host is an application processor or one end of a bridge and the image system communication device is an image sensor or the other end of the bridge, there is a problem that the image sensor or the other end of the bridge does not ascertain whether a session key or a new session key for image system communication has been received (can be used) by the application processor or the one end of the bridge that is the image system communication host. This can be solved by the control system communication host first transmitting the session key or the new session key for image system communication to the control system communication device (for example, an application processor, a display, or one end of a bridge corresponding to the image sensor) on an image system data reception side, and then transmitting the same session key or the same new session key to the control system communication device (for example, an application processor corresponding to an image sensor or a display, one end of a bridge (here, in a case where one end of the bridge is not on the image system data reception side), and the other end of the bridge) on an image system data transmission side. Alternatively, this can be solved by the control system communication host managing a use start timing of the session key or the new session key for image system communication, transmitting information indicating that the use of the session key or the new session key for image system communication can be started from the control system communication host to the control system communication device on an image system data transmission side, and the image system data transmission side starting to use the session key or the new session key for image system communication in response to the reception.

A protection unit that protects first communication (for example, control system communication) and second communication (for example, image system communication) faster than the first communication may include a first security calculation unit and a second security calculation unit. In addition, the same cryptographic algorithm may be applied to the first security computation unit and the second security calculation unit, or different cryptographic algorithms may be applied to the first security calculation unit and the second security calculation unit. For example, any of AES-GCM, AES-GMAC, a block encryption CCM mode, HMAC, or CMAC may be applied to the first security calculation unit for image system communication, and a combination of any of a block encryption CBC (Cipher Block Chaining) mode or a block encryption CTR (Counter) mode and either HMAC or CMAC may be applied to the second security calculation unit for control system communication. In addition, a combination of either the block encryption CBC mode or the block encryption CTR mode and either the HMAC or the CMAC may be applied to the first security calculation unit for the image system communication, and either the AES-GCM or the block encryption CCM mode may be applied to the second security calculation unit for the control system communication. That is, while a protected session (for example, a non-SPDM session) between the image system communication host and the image system communication device needs to be protected by at least message authentication, transmission of a session key or a new session key via a protected session (for example, an SPDM session) between the control system communication host and the control system communication device needs to be protected by encryption and message authentication. However, even in a protected session (for example, an SPDM session) between the control system communication host and the control system communication device, a message that is not related to the session key or the new session key may be protected by message authentication without being encrypted, or may be protected by encryption and message authentication. For example, a part or the whole of the Vendor defined SPDM message (for example, the VENDOR_DEFINED_REQUEST request message or the VENDOR_DEFINED_RESPONSE response message) may be protected by encryption and message authentication, and the rest of the HEARTBEAT request message, the HEARTBEAT_ACK response message, the HEARTBEAT_NAK response message, the ERROR response message, the KEY_UPDATE request, the KEY_UPDATE ACK response, or the Vendor defined SPDM message may be protected by message authentication without encryption, or may be protected by encryption and message authentication. Further, a message transmitted from the control system communication host to the control system communication device may be protected by encryption and message authentication, and a message transmitted from the control system communication device to the control system communication host may be protected by message authentication without encryption, or may be protected by encryption and message authentication.

Meanwhile, although FIG. 159 illustrates a case where the service descriptor in the extended packet header includes a bit flag for message authentication ON/OFF (Enable/Disable), this bit flag may be falsified by an attacker. That is, there is a risk that the message authentication in the image system communication is disabled by the attacker. In addition, the same applies to a case where the service descriptor in the extended packet header includes a bit flag for security function ON/OFF including message authentication instead of a bit flag for message authentication ON/OFF. Further, for example, it may be defined that ePH2 [27:25]=Service Descriptor [3:1]=0b000: without message authentication and without encryption (security function is disabled), ePH2

[27:25]=Service Descriptor [3:1]=0b001: with message authentication and with encryption (security function is enabled), and ePH2 [27:25]=Service Descriptor [3:1] =0b010: with message authentication and without encryption (security function is enabled). However, these bit allocations or expressions may be different. However, there is a case where an implementer switches between enabling and disabling of message authentication or a security function including message authentication in image system communication while ascertaining this risk. In this case, information (for example, 1'b1: allowing disabling of message authentication or the security function including the message authentication by Service Descriptor; 1'b0: not allowing disabling of message authentication or the security function including the message authentication by the service descriptor) indicating whether or not to allow disabling of the message authentication or the security function including the message authentication in the image system communication is desirably transmitted from the control system communication host to the control system communication device via a protected session (for example, an SPDM session) between the control system communication host and the control system communication device. However, these bits (1'b1/1'b0) may be allocated in reverse, or may be allocated to a region of two or more bits instead of a region of one bit. Another implementer who cannot tolerate the risk that the message authentication in the image system communication is disabled by an attacker does not allow disabling of the message authentication or the security function including the message authentication in the image system communication, so that the message authentication in the image system communication can be prevented from being disabled (falsified) by the attacker. That is, information indicating whether or not to allow disabling of the message authentication or the security function including the message authentication in the image system communication (information related to disabling) may be transmitted from the control system communication host or received by the control system communication device by using the control system communication protected by a session key for control system communication (for example, as a part or the whole of other parameters information) before the image system communication is started (for example, an extended packet of image system communication is transmitted or received), and information indicating disabling or enabling of a part or the whole of the message authentication or the security function including the message authentication in the image system communication may be stored in an extended packet (for example, an extended packet header, a service descriptor, or packet data) of the image system communication and received by the image system data reception side or transmitted from the image system data transmission side. In addition, information indicating whether or not to allow disabling of the message authentication or the security function including the message authentication in the image system communication (information related to invalidation) may be transmitted from the control system communication host or received by the control system communication device by using the control system communication protected by a session key for control system communication (for example, as a part or the whole of the other parameters information) before use of the session key or the new session key for image system communication is started on the image system data transmission side, and information indicating disabling or enabling of a part or the whole of the message authentication or the security function including the message authentication in the image system communication may be stored in an extended packet (for example, an extended packet header, a service descriptor, or packet data) of image system communication and received by the image system data reception side or transmitted from the image system data transmission side in response to start of use of the session key or the new session key for image system communication on the image system data transmission side (or after the use is started on the image system data transmission side). However, transmission or reception of information (information related to invalidation) indicating whether or not to allow invalidation of the message authentication or the security function including the message authentication in the image system communication may be substituted by prior agreement (private contract) between the image system communication host and the image system communication device. That is, the information indicating disabling or enabling of a part or the whole of the message authentication or the security function including the message authentication in the image system communication is stored in an extended packet (for example, an extended packet header, a service descriptor, or packet data) of the image system communication according to the information agreed in advance, transmitted from the image system data transmission side, received by the image system data reception side, and in a case where information agreed in advance and the received information are different, the image system data reception side may determine that the extended packet has been falsified. On the other hand, enabling of the message authentication or the security function including the message authentication in image system communication may be allowed. That is, after information indicating disabling of the message authentication or the security function including the message authentication in the image system communication is stored in an extended packet (for example, an extended packet header, a service descriptor, or packet data) of the image system communication and transmitted from the image system data transmission side or received by the image system data reception side, information indicating enabling of a part or the whole of the message authentication or the security function including the message authentication in the image system communication may be stored in the extended packet (for example, an extended packet header, a service descriptor, or packet data) of the image system communication and transmitted from the image system data transmission side or received by the image system data reception side according to the start of use of the session key or the new session key for image system communication on the image system data transmission side (or after the use is started on the image system data transmission side). In addition, information (information related to disabling) for giving a command or making a request for disabling of the message authentication or the security function including the message authentication in image system communication may be transmitted from the control system communication host to the control system communication device via a protected session (for example, an SPDM session) between the control system communication host and the control system communication device. That is, information (information related to disabling) for giving a command or making a request for disabling of the message authentication or the security function including the message authentication in image system communication may be transmitted from the control system communication host or received by the control system communication device by using control system communication protected by a session key for control system communication (for example, as a part or the whole of other parameters information) before the image system communication is started (for example, an extended packet of image system communication is transmitted or received). Further, the message authentication or the security function including the message authentication in the image system communication may be enabled by using an extended packet (for example, an extended packet header, a service descriptor, or packet data) of the image system communication, and may be disabled by using the control system communication protected by a session key for control system communication. Also in this case, disabling (falsification) of message authentication in image system communication by an attacker can be prevented.

Incidentally, in a case where a combination of either the block encryption CBC mode or the block encryption CTR mode and either the HMAC or the CMAC is applied to the security calculation unit for image system communication, an encryption key and a MAC key are necessary. The above use start timing designation of the session key or the new session key may include first use start timing designation for the encryption key (for example, for authenticated encryption, for block encryption CBC mode, or for block encryption CTR mode) and second use start timing designation for the MAC key (for example, for HMAC or for CMAC). For example, the first use start timing designation may include information related to a first key ID (for example, for authenticated encryption, for block encryption CBC mode, or for block encryption CTR mode), and the second use start timing designation may include information related to a second key ID (for example, for HMAC or for CMAC). For example, the first use start timing designation may be transmitted (that is, the use of the encryption key is started according to the use start timing designation) from the image system data transmission side to the image system data reception side according to the start of use of the encryption key (a session key or a new session key) on the image system data transmission side, and the second use start timing designation may be transmitted (that is, the use of the MAC key is started according to the use start timing designation) from the image system data transmission side to the image system data reception side according to the start of use of the MAC key (a session key or a new session key) on the image system data transmission side. Furthermore, on the image system data transmission side or the image system data reception side, use of the encryption key (a session key or a new session key) may be started according to the first use start timing designation, or use of the MAC key (a session key or a new session key) may be started according to the second use start timing designation. However, the second use start timing designation may not be provided, and use of the encryption key and the MAC key (a session key or a new session key) may be started on the image system data transmission side or the image system data reception side according to the first use start timing designation (that is, the use start timing designation).

Incidentally, the session key and the new session key for image system communication may be transmitted from the control system communication host to the control system communication device via a protected session (for example, an SPDM session) between the control system communication host and the control system communication device before protected image system communication (transmission of image system data) is started. However, when a session key and two or more new session keys for image system communication are transmitted from the control system communication host to the control system communication device before protected image system communication (transmission of image system data) is started, since three or more key slots (for example, a memory area) for storing the keys are required on the control system communication host side or the control system communication device side, it is desirable that the session key and the new session key be transmitted (or received) and discarded such that the number of keys stored on the control system communication host side or the control system communication device side is two at most by alternately writing the latest new session key in two key slots on the control system communication host side each time the latest new session key is transmitted from the control system communication host or alternately writing the latest new session key in two key slots on the control system communication device side each time the latest new session key is received by the control system communication device, but the present technology is not limited thereto.

Incidentally, information such as a session key for image system communication (including a new session key), an algorithm, or other parameters is transmitted from the control system communication host to the control system communication device via a protected session (for example, an SPDM session) between the control system communication host and the control system communication device, but the algorithm information may include information regarding a cryptographic algorithm, and the other parameters information may include key ID information corresponding to a session key or a new session key for image system communication. The key ID information may be, for example, first session key (session key)=0, second session key (first new session key)=1, third session key (second new session key)=2, fourth session key (third new session key)=3, . . . , may be first session key (session key)=1'b0, second session key (first new session key)=1'b1, third session key (second new session key)=1'b0, fourth session key (third new session key)=1'b1, . . . , may be first session key (session key)=1, second session key (first new session key)=2, third session key (second new session key)=3, fourth session key (third new session key)=4, . . . , or may be first session key (session key)=1'b1, second session key (first new session key)=1'b0, third session key (second new session key)=1'b1, or fourth session key (third new session key)=1'b0, . . . , or a value of the key ID information may roll over. Further, the key ID information may be, for example, a number of a key slot in which a session key or a new session key is written. Then, the image system communication host or the image system communication device which is a control system communication device can start to use the session key or the new session key for image system communication according to information (for example, information corresponding to a key ID of a key scheduled to be started to be used or a key started to be used among session keys or new session keys for image system communication, and information indicating whether a key ID of a key scheduled to be started to be used or a key started to be used among session keys or new session keys for image system communication is an even number (Even key) or an odd number (Odd key)) related to the key ID transmitted from the image system data transmission side to the image system data reception side via any of the extended packet header, the packet data, the service descriptor, or the like. However, since the extended packet header or the service descriptor is transmitted a large number of times for each line corresponding to the extended packet (a total amount of data is large), the restriction of an amount of information that can be stored is more severe than for the Vendor defined SPDM message of a small number of times (a total amount of data is small) used in a case where the session key or the new session key for image system communication is transmitted. Therefore, it is desirable that an information amount of the key ID information stored in the extended packet header or the service descriptor is equal to or less than an information amount of the key ID information stored in the Vendor defined SPDM message, but the present technology is not limited thereto. That is, information (for example, a part or the whole of the key ID information, information corresponding to a key ID of a key scheduled to be started to be used or a key started to be used among session keys or new session keys for image system communication, and information indicating whether a key ID of a key scheduled to be started to be used or a key started to be used among session keys or new session keys for image system communication is an even number (Even key) or an odd number (Odd key)) related to the key ID may be transmitted from the control system communication host or received by the control system communication device by using the control system communication protected by the session key for control system communication (for example, as a part or the whole of the other parameters information) before the use of the session key or the new session key for image system communication is started on the image system data transmitting side, stored in the extended packet of the image system communication in response to the start of use of the session key or the new session key for image system communication on the image system data transmitting side (or after the use is started on the image system data transmitting side), and received by the image system data reception side or transmitted from the image system data transmitting side. Further, information (for example, a part or the whole of the key ID information) related to the key ID may be transmitted from the control system communication host or received by the control system communication device by using the control system communication protected by the session key for control system communication (for example, as a part or the whole of the other parameters information) before the use of the session key or the new session key for image system communication is started on the image system data transmitting side, and the information (for example, information corresponding to a key ID of a key scheduled to be started to be used or a key started to be used among session keys or new session keys for image system communication, and information indicating whether a key ID of a key scheduled to be started to be used or a key started to be used among session keys or new session keys for image system communication is an even number (Even key) or an odd number (Odd key)) obtained by compressing an information amount of the information related to the key ID may be stored in the extended packet of the image system communication and received by the image system data reception side or transmitted from the image system data transmitting side in response to the start of use of the session key or the new session key for image system communication on the image system data transmitting side (or after the use is started on the image system data transmitting side). In addition, in a case where the latest new session key for image system communication and the information related to the key ID corresponding to the new session key (for example, a part or the whole of the key ID information) are transmitted from the control system communication host and received by the control system communication device by using the control system communication (for example, the VENDOR_DEFINED_REQUEST request message) protected by the session key for control system communication, information (for example, a part or the whole of the key ID information) related to two session keys for image system communication stored by the control system communication device or two key IDs corresponding to the new session keys may be transmitted from the control system communication device to the control system communication host by using the control system communication (for example, the VENDOR_DEFINED_RESPONSE response message) as a response. In addition, in a case where the latest new session key for image system communication and information (for example, a part or the whole of the key ID information) related to a key ID corresponding to the new session key are transmitted from the control system communication host and received by the control system communication device by using control system communication (for example, the VENDOR_DEFINED_REQUEST request message) protected by the session key for control system communication, information indicating the presence or absence of a defect (for example, whether or not the two key IDs are discontinuous, whether or not the two key IDs are both even numbers, whether or not the two key IDs are both odd numbers, or whether or not the two key IDs are unexpected key slot numbers) related to the two key IDs may be transmitted from the control system communication device to the control system communication host by using control system communication (for example, the VENDOR_DEFINED_RESPONSE response message) as a response. In such a case, since the control system communication host can check in advance that there is no error in the information (for example, information corresponding to a key ID of a key scheduled to be started to be used or a key started to be used among session keys or new session keys for image system communication, and information indicating whether a key ID of a key scheduled to be started to be used or a key started to be used among session keys or new session keys for image system communication is an even number (Even key) or an odd number (Odd key)) obtained by compressing an information amount of the information related to the key ID for image system communication stored by the control system communication device, erroneous encryption (decryption) or message authentication by the image system communication host or the image system communication device which is a control system communication device can be avoided. For example, in a case where the control system communication host determines that there is a defect in the two session keys for image system communication or new session keys for image system communication stored by the control system communication device on the basis of information transmitted from the control system communication device by using control system communication (for example, the VENDOR_DEFINED_RESPONSE response message) and received by the control system communication host, the control system communication host may further derive or generate a new session key (latest session key), and transmit the latest session key and information related to a key ID corresponding to the latest session key from the control system communication host to the control system communication device by using control system communication (for example, the VENDOR_DEFINED_REQUEST request message) protected by the session key for control system communication. Further, for example, in a case where the control system communication host determines that there is no defect in the two new session keys for image system communication stored by the control system communication device on the basis of information transmitted from the control system communication device by using control system communication (for example, the VENDOR_DEFINE-D_RESPONSE response message) and received by the control system communication host, information indicating that use of the latest new session keys for image system communication may be started may be transmitted from the control system communication host to the control system communication device (in particular, the image system data transmission side) by using control system communication (for example, the VENDOR_DEFINED_REQUEST request message) protected by the session key for control system communication. However, for example, ePH2 [27:25]=Service Descriptor [3:1]=0b001: with message authentication and with encryption•Key1 (Even key), ePH2 [27:25]=Service Descriptor [3:1]=0b010: with message authentication and without encryption•Key2 (Even key), ePH2 [27:25]= Service Descriptor [3:1]=0b100: with message authentication and with encryption•Key3 (Odd key), ePH2 [27:25] =Service Descriptor [3:1]=0b101: with message authentication and without encryption•Key4 (Odd key) may be defined. Further, for example, ePH2 [27:25]=Service Descriptor [3:1]=0b001: with message authentication and with encryption•Key1 (Odd key), ePH2 [27:25]=Service Descriptor [3:1]=0b010: with message authentication•without encryption•Key2 (Odd key), ePH2 [27:25]=Service Descriptor [3:1]=0b100: with message authentication•with encryption•Key3 (Even key), ePH2 [27: 25]=Service Descriptor [3:1]=0b101: with message authentication•without encryption•Key4 (Even key) may be defined. In these cases, since it is necessary to change the session key by switching (ON/OFF) between enabling and disabling of encryption, for example, by defining ePH2 [27:25]=Service Descriptor [3:1]=0b011: with message authentication, without encryption, Key1, ePH2 [27:25]= Service Descriptor [3:1]=0b110: with message authentication, without encryption, Key3, switching (ON/OFF) between enabling and disabling of encryption may be performed with the same session key. Specifically, "enabling/ disabling (ON/OFF)" of encryption can be switched with the same session key by switching "0b001/0b011" or switching "0b100/0b110", but these bit allocations or expressions may be different. For example, ePH2 [27:25]=Service Descriptor [3:1]=0b010: with message authentication and without encryption•Key1, ePH2 [27:25]=Service Descriptor [3:1]= 0b101: with message authentication and without encryption•Key3 may be defined, and Key1 or Key3 may be replaced with Key0, or Key2 or Key4 may be replaced with Key1. Similarly, for example, by defining that ePH2 [27: 25]=Service Descriptor [3:1]=0b011: with message authentication and with encryption•Key2, and ePH2 [27:25]=Service Descriptor [3:1]=0b110: with message authentication and with encryption•Key4, enabling and disabling of encryption may be switched (ON/OFF) with the same session key. Specifically, "enable/disable (ON/OFF)" of encryption can be switched with the same session key by switching "0b011/0b010" or switching "0b110/0b101", but these bit allocations or expressions may be different. In addition, information (for example, 1'b1: Key1 and Key2 are different, and 1'b0: Key1 and Key2 are the same) indicating whether or not Key1 and Key2 are the same or information (for example, 1'b1: Key3 and Key4 are different, and 1'b0: Key3 and Key4 are the same) indicating whether or not Key3 and Key4 are the same may be transmitted from the control system communication host to the control system communication device via a protected session (for example, an SPDM session) between the control system communication host and the control system communication device to switch (ON/OFF) between enabling and disabling of encryption with the same session key. However, these bits (1'b1/ 1'b0) may be allocated in reverse, or may be allocated to a region of two or more bits instead of a region of one bit. That is, the information indicating whether or not Key1 and Key2 are the same or the information indicating whether or not Key3 and Key4 are the same may be transmitted from the control system communication host or received by the control system communication device by using control system communication protected by the session key for control system communication (for example, as a part or the whole of the other parameters information) before the image system communication is started (for example, an extended packet of image system communication is transmitted or received), and the information (for example, designation of any of Key1, Key2, Key3, or Key4) corresponding to a key ID of a key scheduled to be started to be used or a key started to be used among session keys or new session keys for image system communication may be stored in an extended packet (for example, an extended packet header, a service descriptor, or packet data) of image system communication and received by the image system data reception side or transmitted from the image system data transmitting side.

In addition, the information indicating whether or not Key1 and Key2 are the same or the information indicating whether or not Key3 and Key4 are the same may be transmitted from the control system communication host or received by the control system communication device by using control system communication protected by the session key for control system communication (for example, as a part or the whole of the other parameters information) before the use of the session key or the new session key for image system communication is started on the image system data transmission side, and the information (for example, designation of any of Key1, Key2, Key3, or Key4) corresponding to a key ID of a key scheduled to be started to be used or a key started to be used among session keys or new session keys for image system communication may be stored in an extended packet (for example, an extended packet header, a service descriptor, or packet data) of the image system communication and received by the image system data reception side or transmitted from the image system data transmission side in response to the start of use on the image system data transmission side of the session key or the new session key for image system communication (or after the use is started on the image system data transmission side). Further, transmission or reception of the information indicating whether or not the Key1 and the Key2 are the same or the information indicating whether or not the Key3 and the Key4 are the same may be substituted by a prior agreement (private contract) between the image system communication host and the image system communication device. That is, each of the image system communication host and the image system communication device may determine whether or not Key1 and Key2 are the same or whether or not Key3 and Key4 are the same according to information agreed in advance, or may switch (ON/OFF) between enabling and disabling of encryption with the same session key according to information agreed in advance. Specifically, in a case where it is agreed in advance that the Key1 and the Key2 are the same or the Key3 and the Key4 are the same, "enabling/disabling (ON/OFF)" of encryption can be switched with the same session key by switching "0b001/0b010" or switching "0b100/0b101", but these bit allocations or expressions may be different.

Configuration Example of Computer

FIG. 208 is a block diagram illustrating a configuration example of hardware of a computer that executes the above-described series of processes according to a program.

In the computer, a central processing unit (CPU) 2201, a read only memory (ROM) 2202, a random access memory (RAM) 2203, and an electrically erasable programmable read only memory (EEPROM) 2204 are connected to each other via a bus 2205. An input/output interface 2206 is further connected to the bus 2205, and the input/output interface 2206 is connected to the outside.

In the computer configured as described above, for example, the CPU 2201 loads a program stored in the ROM 2202 and the EEPROM 2204 into the RAM 2203 via the bus 2205 and executes the program, so that the above-described series of processes is performed. In addition, the program executed by the computer (CPU 2201) may be written in advance in the ROM 2202, installed in the EEPROM 2204 from the outside via the input/output interface 2206, or updated.

Here, in the present specification, the processes performed by the computer according to the program are not necessarily performed in time series in the order described as the flowchart. That is, the processes performed by the computer according to the program also include processes executed in parallel or individually (for example, parallel processes or processes using an object).

Furthermore, the program may be processed by one computer (processor) or may be processed in a distributed manner by a plurality of computers. Furthermore, the program may be transferred to a remote computer and executed.

Furthermore, in the present specification, a system means a set of a plurality of constituents (devices, modules (components), or the like), and it does not matter whether or not all the constituents are in the same casing. Therefore, a plurality of devices stored in separate casings and connected via a network and one device in which a plurality of modules is stored in one casing are all systems.

In addition, for example, a configuration described as one device (or a processing unit) may be divided and configured as a plurality of devices (or processing units). Conversely, the configurations described above as a plurality of devices (or processing units) may be collectively configured as one device (or a processing unit). Further, a configuration other than the above-described configuration may be added to the configuration of each device (or each processing unit). Furthermore, as long as the configuration or the operation of the entire system is substantially the same, a part of a configuration of a certain device (or a processing unit) may be included in a configuration of another device (or another processing unit).

Furthermore, for example, the present technology may have a configuration of cloud computing in which one function is shared and processed in cooperation by a plurality of devices via a network.

Furthermore, for example, the above-described program can be executed in any device. In that case, it is sufficient that the device has a necessary function (a functional block or the like) and can obtain necessary information.

In addition, for example, each step described in the above-described flowchart may be performed by one device or may be shared and performed by a plurality of devices. Further, in a case where a plurality of processes is included in one step, the plurality of processes included in the one step may be performed by one device or may be shared and performed by a plurality of devices. In other words, a plurality of processes included in one step may also be executed as processes of a plurality of steps. Conversely, the process described as a plurality of steps may be collectively executed as one step.

Note that, in the program executed by the computer, processes in steps describing the program may be executed in a time series in the order described in the present specification, or may be executed in parallel or individually at necessary timings such as when a call is made. That is, as long as there is no contradiction, the process in each step may be executed in an order different from the above-described order. Furthermore, the processes in the steps describing this program may be executed in parallel with the processing of another program, or may be executed in combination with the processing of another program.

Note that a plurality of the present technologies described in the present specification can be implemented independently as a single body as long as there is no contradiction. Of course, a plurality of any present technologies may be implemented in combination. For example, some or all of the present technologies described in a certain embodiment may be implemented in combination with some or all of the present technologies described in another embodiment. Further, some or all of any present technologies described above may be implemented in combination with other technologies not described above.

Combination Example of Configuration

Note that the present technology may also have the following configurations.

(1) An information processing device including:

a protection unit that protects first communication and second communication faster than the first communication, in which the first communication includes transmission or reception of a command to control the second communication or a response to the command, the protection unit derives a first secret from a key schedule by using the first communication, derives a first session key related to the first secret, and uses the first session key for encryption or message authentication of the first communication, the protection unit receives a second session key by using the first communication protected by the first session key, or derives or generates a second session key and transmits the second session key by using the first communication protected by the first session key, or derives a second secret from the key schedule to derive a second session key related to the second secret, and uses the second session key for encryption or message authentication of the second communication, the protection unit receives a third session key by using the first communication protected by the first session key, or derives or generates a third session key and transmits the third session key by using the first communication protected by the first session key, or derives a third session key related to the second secret in addition to the second session key, and the third session key is started to be used instead of the second session key.

(2) The information processing device according to (1), in which the third session key is started to be used in response to use start timing designation.

(3) The information processing device according to (2), in which the use start timing designation is transmitted or received by using the second communication.

(4) The information processing device according to (3), in which the use start timing designation is stored in an extended packet and is transmitted or received.

(5) The information processing device according to (4), in which the use start timing designation is stored in a packet header in the extended packet and is transmitted or received.

(6) The information processing device according to (4) or (5), in which the use start timing designation is stored in packet data in the extended packet and is transmitted or received.

(7) The information processing device according to any one of (2) to (6), in which the use start timing designation is transmitted or received by using the first communication.

(8) The information processing device according to (7), in which the use start timing designation is stored in a read response and is transmitted or received.

(9) The information processing device according to (7) or (8), in which the use start timing designation is stored in a write command and is transmitted or received.

(10) The information processing device according to any one of (2) to (9), in which the use start timing designation includes information related to a message count value, a frame number, or a data type.

(11) The information processing device according to any one of (2) to (10), in which the use start timing designation includes information related to a key ID corresponding to the second session key or the third session key.

(12) The information processing device according to (11), in which the information related to the key ID is transmitted or received by using the first communication protected by the first session key before use of the second session key or the third session key is started, and is stored in an extended packet of the second communication and received or transmitted in response to start of use of the second session key or the third session key.

(13) The information processing device according to (11) or (12), in which information related to the key ID is transmitted or received by using the first communication protected by the first session key before use of the second session key or the third session key is started, and information obtained by compressing an information amount of the information related to the key ID is stored in an extended packet of the second communication and received or transmitted in response to start of use of the second session key or the third session key.

(14) The information processing device according to any one of (1) to (13), in which whether the third session key has been correctly derived is subjected to key verification.

(15) The information processing device according to (14), in which the key verification is performed by using verification target data that is transmitted or received according to the second communication.

(16) The information processing device according to (15), in which the verification target data is stored in an extended packet and is transmitted or received.

(17) The information processing device according to (15) or (16), in which whether the first session key has been correctly derived is verified by using data that is transmitted or received according to the first communication.

(18) The information processing device according to any one of (1) to (17), in which the second session key is derived from the second secret, and the third session key is derived from a third secret that is derived from the second secret.

(19) A mobile device including:

a protection unit that protects first communication and second communication faster than the first communication, in which the first communication includes transmission or reception of a command to control the second communication or a response to the command, the protection unit derives a first secret from a key schedule by using the first communication, derives a first session key related to the first secret, and uses the first session key for encryption or message authentication of the first communication, the protection unit receives a second session key by using the first communication protected by the first session key, or derives or generates a second session key and transmits the second session key by using the first communication protected by the first session key, or derives a second secret from the key schedule to derive a second session key related to the second secret, and uses the second session key for encryption or message authentication of the second communication, the protection unit receives a third session key by using the first communication protected by the first session key, or derives or generates a third session key and transmits the third session key by using the first communication protected by the first session key, or derives a third session key related to the second secret in addition to the second session key, and the third session key is started to be used instead of the second session key.

(20) A communication system including:

a protection unit that protects first communication and second communication faster than the first communication, in which the first communication includes transmission or reception of a command to control the second communication or a response to the command, the protection unit derives a first secret from a key schedule by using the first communication, derives a first session key related to the first secret, and uses the first session key for encryption or message authentication of the first communication, the protection unit receives a second session key by using the first communication protected by the first session key, or derives or generates a second session key and transmits the second session key by using the first communication protected by the first session key, or derives a second secret from the key schedule to derive a second session key related to the second secret, and uses the second session key for encryption or message authentication of the second communication, the protection unit receives a third session key by using the first communication protected by the first session key, or derives or generates a third session key and transmits the third session key by using the first communication protected by the first session key, or derives a third session key related to the second secret in addition to the second session key, and the third session key is started to be used instead of the second session key.

Note that the present embodiment is not limited to the above-described embodiment, and various modifications can be made without departing from the concept of the present disclosure. Furthermore, the effects described in the present specification are merely examples and are not limited, and other effects may be provided.

REFERENCE SIGNS LIST

1201 Communication system
1211 Image sensor
1212 Application processor
1213 Display
1301 Pixel
1302 AD converter
1303 Image processing unit
1304 Extension mode-compatible CSI-2 transmission circuit
1305 Physical layer processing unit
1306 I2C/I3C slave
1307 Storage unit
1308 Message counter
1309 Nonce update unit
1310 Security unit
1321 Physical layer processing unit
1322 Extension mode-compatible CSI-2 reception circuit
1323 I2C/I3C master
1324 Storage unit
1325 Data verification unit
1326 Security unit
1327 Controller
1501 Pixel
1502 AD converter
1503 Image processing unit
1504 Extension mode-compatible CSI-2 transmission circuit
1505 Physical layer processing unit
1506 I2C/I3C slave
1507 Storage unit
1508 Disturbance detection unit
1509 Failure detection unit
1510 Security unit
1511 Infringement detection unit
1512 Temperature measurement unit
1513 Message counter
1551 Physical layer processing unit
1552 Extension mode-compatible CSI-2 reception circuit
1553 I2C/I3C master
1554 Storage unit
1555 Controller
1556 Disturbance detection unit
1557 Failure detection unit
1558 Security unit 1559 Infringement detection unit
1560 Temperature measurement unit

The invention claimed is:

1. An information processing device, comprising:

a central processing unit (CPU) configured to:

execute at least one of first communication or second communication, wherein, in the second communication, the CPU is further configured to one of transmit or receive a first frame including an extended packet header and first packet data;

derive a first secret from a key schedule based on the first communication;

derive a first session key related to the first secret;

protect the first communication based on the derived first session key;

one of:

receive a second session key based on the protected first communication;

one of derive or generate the second session key, and transmit the second session key, wherein the second session key is transmitted based on the protected first communication; or derive a second secret from the key schedule and derive the second session key related to the second secret;

protect the second communication based on:

a value of a source ID, one of a value of a virtual channel or an extended virtual channel, one of a value of a frame counter or a value of an additional frame number, and the second session key; and one of transmit or receive, in the protected second communication, the first frame that further includes a frame end, wherein the frame end includes a first extended packet footer including a first message authentication code (MAC) value for:

at least one of a part or a whole of the extended packet header, and at least one of a part or a whole of the first packet data, and the first MAC value is based on the second session key.

2. The information processing device according to claim 1, wherein the CPU is further configured to protect the second communication based on an initialization vector and the second session key, and the initialization vector includes a value of the source ID, one of a value of the virtual channel or the extended virtual channel, and one of a value of the frame counter or a value of the additional frame number.

3. The information processing device according to claim 1, wherein the first packet data stores embedded data, the CPU is further configured to one of transmit or receive, in the protected second communication, a second extended packet footer of the embedded data including a second MAC value for at least one of a part or a whole of the embedded data, and the second MAC value is based on the second session key.

4. The information processing device according to claim 1, wherein the CPU is further configured to:

one of transmit or receive, in the second communication, a second frame including a packet header and second packet data, wherein the second packet data stores first embedded data; and one of transmit or receive, in the protected second communication, a second MAC value for at least a part of the second packet data, the second MAC value is based on the second session key, and one of the transmission or the reception of the second MAC value is via the first embedded data.

5. The information processing device according to claim 4, wherein the second packet data further stores second embedded data, the CPU is further configured to one of transmit or receive, in the protected second communication, a third MAC value for at least a part of the second embedded data, the third MAC value is based on the second session key, one of the transmission or the reception of the third MAC value is via the second embedded data, the second frame further includes a frame start, at least one of image data or user defined data, and a frame end, the second embedded data is transmitted or received between the frame start and at least one of the image data or the user defined data, and the first embedded data is transmitted or received between at least one of the image data or the user defined data and the frame end.

6. The information processing device according to claim 4, wherein the second frame further includes the extended packet header.

7. The information processing device according to claim 1, wherein the CPU is further configured to:

one of transmit or receive, in the second communication, a line including the extended packet header and the first packet data; and one of transmit or receive, in the protected second communication, the line that further includes the first extended packet footer including the first MAC value.

8. The information processing device according to claim 1, wherein the first packet data stores first embedded data, the CPU is further configured to one of transmit or receive, in the protected second communication, related information of a MAC mode that protects the second communication, and one of the transmission or the reception of the related information is via one of the extended packet header protected by the second session key, or the first embedded data of the first packet data protected by the second session key.

9. The information processing device according to claim 8, wherein the CPU is further configured to:

one of transmit or receive, in the second communication, the first frame that further includes a frame start; and select a mode from at least two of a first MAC mode, a second MAC mode, or a non-MAC mode start as the MAC mode for protection of at least one of the part or the whole of the first packet data of the first frame, and the selection of the mode is before completion of the transmission of the frame start.

10. The information processing device according to claim 1, wherein the CPU is further configured to:

one of transmit or receive, in the protected first communication, a first key ID indicating a number of a key slot corresponding to the second session key; and one of transmit or receive, in the protected second communication, related information of the first key ID, the related information indicates that the second communication is protected by the second session key, the second communication is faster than the first communication, and the related information of the first key ID has a smaller data amount than a data amount of the first key ID.

11. The information processing device according to claim 1, wherein the CPU is further configured to one of transmit or receive, in the protected second communication, first embedded data protected by the second session key, the first embedded data includes related information of a first key ID, and the related information of the first key ID indicates that the second communication is protected by the second session key.

12. The information processing device according to claim 11, wherein the CPU is further configured to:

one of:

receive a third session key based on the protected first communication;

one of derive or generate the third session key, and transmit the third session key, wherein the third session key is transmitted based on the protected first communication; or derive a third secret from the key schedule and derive the third session key related to the third secret;

use the third session key, instead of the second session key, for the protection of the second communication; and one of transmit or receive, in the second communication protected by the third session key, second embedded data protected by the third session key, the second embedded data includes related information of a second key ID, and the related information of the second key ID indicates that the second communication is protected by the third session key.

13. The information processing device according to claim 1, wherein the CPU is further configured to one of transmit or receive, in the protected first communication, one of a write command or a read response protected by the first session key, one of the write command or the read response includes related information of a first key ID, and the related information includes an indication to start usage of the second session key for the second communication.

14. The information processing device according to claim 13, wherein the CPU is further configured to:

one of:

receive a third session key based on the protected first communication;

one of derive or generate the third session key, and transmit the third session key, wherein the third session key is transmitted based on the protected first communication; or derive a third secret from the key schedule and derive the third session key related to the third secret; and one of transmit or receive, in the protected first communication, one of the write command or the read response protected by the first session key, one of the write command or the read response further includes related information of a second key ID, the related information of the second key ID includes an indication to start usage of the third session key for the second communication, and the second communication is protected based on the third session key, instead of the second session key.

15. The information processing device according to claim 1, wherein the CPU is further configured to:

one of:

receive a third session key based on the protected first communication;

one of derive or generate the third session key, and transmit the third session key, wherein the third session key is transmitted based on the protected first communication; or derive a third secret from the key schedule and derive the third session key related to the third secret; and one of transmit or receive, in the protected second communication, a use start timing designation of the third session key, and the second communication is protected based on the third session key, instead of the second session key.

16. The information processing device according to claim 1, wherein the CPU is further configured to:

one of:

receive a third session key based on the protected first communication;

one of derive or generate the third session key, and transmit the third session key, wherein the third session key is transmitted based on the protected first communication; or derive a third secret from the key schedule and derive the third session key related to the third secret; and start usage of the third session key, instead of the second session key, for calculation of a second MAC value for at least a part of embedded data.

17. The information processing device according to claim 1, wherein the CPU is further configured to:

one of:

receive a third session key based on the protected first communication;

one of derive or generate the third session key, and transmit the third session key, wherein the third session key is transmitted based on the protected first communication; or derive a third secret from the key schedule and derive the third session key related to the third secret; and alternately update the second session key and the third session key.

18. A mobile device, comprising:

a central processing unit (CPU) configured to:

execute at least one of first communication or second communication, wherein, in the second communication, the CPU is further configured to one of transmit or receive a frame including an extended packet header and packet data;

derive a first secret from a key schedule based on the first communication;

derive a first session key related to the first secret;

protect the first communication based on the derived first session key;

one of:

receive a second session key based on the protected first communication;

one of derive or generate the second session key, and transmit the second session key, wherein the second session key is transmitted based on the protected first communication; or derive a second secret from the key schedule and derive the second session key related to the second secret;

protect the second communication based on:

a value of a source ID, one of a value of a virtual channel or an extended virtual channel, one of a value of a frame counter or a value of an additional frame number, and the second session key; and one of transmit or receive, in the protected second communication, the frame that further includes a frame end, wherein the frame end includes a first extended packet footer including a first message authentication code (MAC) value for:

at least one of a part or a whole of the extended packet header, and at least one of a part or a whole of the packet data, and the first MAC value is based on the second session key.

19. A communication system, comprising:

a central processing unit (CPU) configured to:

execute at least one of first communication or second communication, wherein, in the second communication, the CPU is further configured to one of transmit or receive a frame including an extended packet header and packet data;

derive a first secret from a key schedule based on the first communication;

derive a first session key related to the first secret;

protect the first communication based on the derived first session key;

one of:

receive a second session key based on the protected first communication;

one of derive or generate the second session key, and transmit the second session key, wherein the second session key is transmitted based on the protected first communication; or derive a second secret from the key schedule and derive the second session key related to the second secret;

protect the second communication based on:

a value of a source ID, one of a value of a virtual channel or an extended virtual channel, one of a value of a frame counter or a value of an additional frame number, and the second session key; and one of transmit or receive, in the protected second communication, the frame that further includes a frame end, wherein the frame end includes a first extended packet footer including a first message authentication code (MAC) value for:

at least one of a part or a whole of the extended packet header, and at least one of a part or a whole of the packet data, and the first MAC value is based on the second session key.

20. An information processing device, comprising:

a central processing unit (CPU) configured to:

execute at least one of first communication or second communication;

derive a first secret from a key schedule based on the first communication;

derive a first session key related to the first secret;

protect the first communication based on the first session key;

one of:

receive a second session key based on the protected first communication;

one of derive or generate the second session key, and transmit the second session key, wherein the second session key is transmitted based on the protected first communication; or derive a second secret from the key schedule and derive the second session key related to the second secret;

protect the second communication based on:

a value of a source ID, one of a value of a virtual channel or an extended virtual channel, one of a value of a frame counter or a value of an additional frame number, and the second session key; and one of transmit or receive, in the protected second communication, embedded data protected by the second session key, wherein the embedded data includes related information of a first key ID, and the related information of the first key ID indicates that the second communication is protected by the second session key.

*    *    *    *    *